US008316449B2

(12) United States Patent
Ginter et al.

(10) Patent No.: US 8,316,449 B2

(45) Date of Patent: Nov. 20, 2012

(54) SYSTEMS AND METHODS FOR SECURE TRANSACTION MANAGEMENT AND ELECTRONIC RIGHTS PROTECTION

(75) Inventors: Karl L. Ginter, Beltsville, MD (US); Victor H. Shear, Bethesda, MD (US); Francis J. Spahn, El Cerrito, CA (US); David M. Van Wie, Sunnyvale, CA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 64 days.

(21) Appl. No.: 11/827,996

(22) Filed: Jul. 13, 2007

(65) Prior Publication Data

US 2007/0261125 A1 Nov. 8, 2007

Related U.S. Application Data

(63) Continuation of application No. 11/231,355, filed on Sep. 20, 2005, which is a continuation of application No. 09/698,044, filed on Oct. 30, 2000, now Pat. No. 6,948,070, which is a continuation of application No. 09/208,017, filed on Dec. 9, 1998, now Pat. No. 6,253,193, which is a continuation of application No. 08/964,333, filed on Nov. 4, 1997, now Pat. No. 5,982,891, which is a continuation of application No. 08/388,107, filed on Feb. 13, 1995, now abandoned.

(51) Int. Cl.
*G06F 7/04* (2006.01)

(52) U.S. Cl. ............................... 726/26; 726/27; 705/51

(58) Field of Classification Search .............. 726/26–27; 705/51

See application file for complete search history.

(56) References Cited

U.S. PATENT DOCUMENTS 3,790,700 A 2/1974 Callais et al.
4,162,483 A 7/1979 Entenman
(Continued)

FOREIGN PATENT DOCUMENTS

EP 0128672 A1 12/1984
(Continued)

OTHER PUBLICATIONS

Advisory Action dated Sep. 24, 2001, issued in related U.S. Appl. No. 09/328,671, filed Jun. 9, 1999, Ginter et al.

(Continued)

*Primary Examiner* — Samson Lemma

(74) *Attorney, Agent, or Firm* — Finnegan, Henderson, Farabow, Garrett & Dunner LLP

(57) ABSTRACT

The present invention provides systems and methods for secure transaction management and electronic rights protection. Electronic appliances such as computers equipped in accordance with the present invention help to ensure that information is accessed and used only in authorized ways, and maintain the integrity, availability, and/or confidentiality of the information. Such electronic appliances provide a distributed virtual distribution environment (VDE) that may enforce a secure chain of handling and control, for example, to control and/or meter or otherwise monitor use of electronically stored or disseminated information. Such a virtual distribution environment may be used to protect rights of various participants in electronic commerce and other electronic or electronic-facilitated transactions. Distributed and other operating systems, environments and architectures, such as, for example, those using tamper-resistant hardware-based processors, may establish security at each node. These techniques may be used to support an all-electronic information distribution, for example, utilizing the "electronic highway."

13 Claims, 146 Drawing Sheets

U.S. PATENT DOCUMENTS

| | | | | |
|---|---|---|---|---|
| 4,393,269 | A | 7/1983 | Konheim et al. | |
| 4,558,413 | A | 12/1985 | Schmidt et al. | |
| 4,658,093 | A | 4/1987 | Hellman | |
| 4,672,572 | A | 6/1987 | Alsberg | |
| 4,685,055 | A | 8/1987 | Thomas | |
| 4,700,296 | A | 10/1987 | Palmer, Jr. et al. | |
| 4,713,753 | A | 12/1987 | Boebert et al. | |
| 4,731,840 | A | 3/1988 | Mniszewski et al. | |
| 4,740,269 | A | 4/1988 | Berger et al. | |
| 4,740,886 | A | 4/1988 | Tanifuji et al. | |
| 4,757,534 | A | 7/1988 | Matyas et al. | |
| 4,799,156 | A | 1/1989 | Shavit et al. | |
| 4,811,382 | A | 3/1989 | Sleevi | |
| 4,823,264 | A | 4/1989 | Deming | |
| 4,827,508 | A | 5/1989 | Shear | |
| 4,866,769 | A | 9/1989 | Karp | |
| 4,919,545 | A | 4/1990 | Yu | |
| 4,930,073 | A | 5/1990 | Cina, Jr. | |
| 4,975,647 | A | 12/1990 | Downer et al. | |
| 5,005,099 | A | 4/1991 | Perryman et al. | |
| 5,008,927 | A | 4/1991 | Weiss et al. | |
| 5,010,571 | A | 4/1991 | Katznelson et al. | |
| 5,050,213 | A | 9/1991 | Shear | |
| 5,051,891 | A | 9/1991 | MacPhail | |
| 5,103,476 | A | 4/1992 | Waite et al. | |
| 5,111,390 | A | 5/1992 | Ketcham | |
| 5,204,897 | A * | 4/1993 | Wyman | 710/200 |
| 5,214,702 | A | 5/1993 | Fischer | |
| 5,220,604 | A | 6/1993 | Gasser et al. | |
| 5,224,163 | A | 6/1993 | Gasser et al. | |
| 5,247,575 | A | 9/1993 | Sprague et al. | |
| 5,260,999 | A | 11/1993 | Wyman | |
| 5,261,070 | A | 11/1993 | Ohta | |
| 5,276,735 | A | 1/1994 | Boebert et al. | |
| 5,287,407 | A | 2/1994 | Holmes | |
| 5,293,422 | A | 3/1994 | Loiacono | |
| 5,311,591 | A | 5/1994 | Fischer | |
| 5,319,705 | A | 6/1994 | Halter et al. | |
| 5,319,707 | A | 6/1994 | Wasilewski et al. | |
| 5,321,749 | A | 6/1994 | Virga | |
| 5,343,527 | A | 8/1994 | Moore | |
| 5,347,578 | A | 9/1994 | Duxbury | |
| 5,381,527 | A | 1/1995 | Inniss et al. | |
| 5,388,211 | A | 2/1995 | Hornbuckle | |
| 5,390,247 | A | 2/1995 | Fischer | |
| 5,390,330 | A | 2/1995 | Talati | |
| 5,392,351 | A | 2/1995 | Hasabe et al. | |
| 5,392,353 | A | 2/1995 | Morales | |
| 5,412,717 | A | 5/1995 | Fischer | |
| 5,428,525 | A | 6/1995 | Cappelaere et al. | |
| 5,435,003 | A | 7/1995 | Chng et al. | |
| 5,448,729 | A | 9/1995 | Murdock | |
| 5,453,601 | A | 9/1995 | Rosen | |
| 5,457,746 | A | 10/1995 | Dolphin | |
| 5,473,692 | A | 12/1995 | Davis | |
| 5,478,960 | A | 12/1995 | Landscheidt et al. | |
| 5,485,577 | A | 1/1996 | Eyer et al. | |
| 5,491,800 | A | 2/1996 | Goldsmith et al. | |
| 5,495,412 | A | 2/1996 | Theissen | |
| 5,499,298 | A | 3/1996 | Narasimhalu et al. | |
| 5,504,814 | A | 4/1996 | Miyahara | |
| 5,504,818 | A | 4/1996 | Okano | |
| 5,504,837 | A | 4/1996 | Griffeth et al. | |
| 5,508,913 | A | 4/1996 | Yamamoto et al. | |
| 5,509,070 | A | 4/1996 | Schull | |
| 5,509,074 | A | 4/1996 | Choudhury et al. | |
| 5,557,678 | A | 9/1996 | Ganesan | |
| 5,557,742 | A | 9/1996 | Smaha et al. | |
| 5,563,946 | A | 10/1996 | Cooper et al. | |
| 5,600,844 | A | 2/1997 | Shaw et al. | |
| 5,606,609 | A | 2/1997 | Houser et al. | |
| 5,615,268 | A | 3/1997 | Bisbee et al. | |
| 5,621,797 | A | 4/1997 | Rosen | |
| 5,629,980 | A | 5/1997 | Stefik et al. | |
| 5,634,012 | A * | 5/1997 | Stefik et al. | 705/39 |
| 5,638,443 | A | 6/1997 | Stefik et al. | |
| 5,640,546 | A | 6/1997 | Gopinath et al. | |
| 5,659,350 | A | 8/1997 | Hendricks et al. | |
| 5,666,411 | A | 9/1997 | McCarty | |
| 5,678,170 | A | 10/1997 | Grube et al. | |
| 5,682,325 | A | 10/1997 | Lightfoot et al. | |
| 5,715,403 | A | 2/1998 | Stefik | |
| 5,719,938 | A | 2/1998 | Haas et al. | |
| 5,732,400 | A | 3/1998 | Mandler et al. | |
| 5,734,719 | A | 3/1998 | Tseudosetal | |
| 5,734,823 | A | 3/1998 | Saigh et al. | |
| 5,748,960 | A | 5/1998 | Fischer | |
| 5,752,238 | A | 5/1998 | Dedrick | |
| 5,757,914 | A | 5/1998 | McManis | |
| 5,759,101 | A | 6/1998 | Von Kohorn | |
| 5,768,521 | A | 6/1998 | Dedrick | |
| 5,818,447 | A | 10/1998 | Wolf et al. | |
| 5,832,227 | A | 11/1998 | Anderson et al. | |
| 5,845,281 | A | 12/1998 | Benson et al. | |
| 5,910,987 | A | 6/1999 | Ginter et al. | |
| 5,915,019 | A | 6/1999 | Ginter et al. | |
| 5,933,497 | A | 8/1999 | Beetcher et al. | |
| 5,933,498 | A | 8/1999 | Schneck et al. | |
| 5,949,876 | A | 9/1999 | Ginter et al. | |
| 5,982,891 | A | 11/1999 | Ginter et al. | |
| 6,138,119 | A | 10/2000 | Hall et al. | |
| 6,175,717 | B1 | 1/2001 | Rebec et al. | |
| 6,236,971 | B1 | 5/2001 | Stefik et al. | |
| 6,314,409 | B2 | 11/2001 | Schneck et al. | |
| 6,330,670 | B1 * | 12/2001 | England et al. | 713/2 |
| 6,412,070 | B1 | 6/2002 | Van Dyke et al. | |
| 6,553,178 | B2 | 4/2003 | Abecassis | |
| 7,120,800 | B2 | 10/2006 | Ginter et al. | |
| 2001/0041053 | A1 | 11/2001 | Abecassis | |

FOREIGN PATENT DOCUMENTS

| | | | | |
|---|---|---|---|---|
| EP | 0268139 | A1 | | 5/1988 |
| EP | 0297347 | A1 | | 1/1989 |
| EP | 0398493 | A2 | | 11/1990 |
| EP | 0399822 | A1 | | 11/1990 |
| EP | 0421409 | A1 | | 4/1991 |
| EP | 0538464 | B1 | | 4/1993 |
| EP | 0565314 | A1 | | 10/1993 |
| EP | 0590519 | | | 4/1994 |
| EP | 0715243 | A1 | | 6/1996 |
| FR | 2688902 | A1 | | 9/1993 |
| GB | 2264796 | A | | 9/1993 |
| JP | 01296363 | A | | 11/1989 |
| JP | 04-321136 | A | | 11/1992 |
| JP | 05173892 | A | | 7/1993 |
| JP | 05197732 | A | | 8/1993 |
| JP | 05258463 | A | | 10/1993 |
| JP | 06035637 | A | | 2/1994 |
| JP | 06035807 | A | | 2/1994 |
| JP | 06095870 | A | | 4/1994 |
| JP | 06103058 | A | | 4/1994 |
| JP | 06152585 | A | | 5/1994 |
| JP | 06161719 | A | | 6/1994 |
| WO | WO 89/06398 | A1 | | 7/1989 |
| WO | WO 90/02382 | A1 | | 3/1990 |
| WO | WO 90/13865 | A1 | | 11/1990 |
| WO | WO 92/20022 | A1 | | 11/1992 |
| WO | WO 9220022 | A1 | * | 11/1992 |
| WO | WO 93/01550 | A1 | | 1/1993 |
| WO | WO 96/24092 | A1 | | 8/1996 |

OTHER PUBLICATIONS

Before the Board of Patent Appeals and Interferences,*Ex parte* Kazuya Miyazaki, Harumitsu Nakajima and Tetsuo Nakakawaji, Appeal No. 2003-1329, U.S. Appl. No. 09/131,386, Heard: Jan. 6, 2004, paper No. 29.

Corrected Notice of Allowance dated Mar. 2, 2005, issued in related U.S. Appl. No. 09/698,044, filed Oct. 30, 2000, Ginter et al.

Notice of Allowance dated Dec. 21, 1998, issued in related U.S. Appl. No. 08/760,440, filed Dec. 4, 1996, Ginter et al.

Notice of Allowance dated Dec. 22, 2004, issued in related U.S. Appl. No. 09/698,044, filed Oct. 30, 2000, Ginter et al.

Notice of Allowance dated Dec. 7, 1998, issued in related U.S. Appl. No. 08/964,333, filed Nov. 4, 1997, Ginter et al.

Notice of Allowance dated Jan. 13, 1999, issued in related U.S. Appl. No. 08/778,256, filed Jan. 8, 1997, Ginter et al.

Notice of Allowance dated Jan. 29, 2001 issued in related U.S. Appl. No. 09/335,465, filed Jun. 17, 1999, Ginter et al.
Notice of Allowance dated Jun. 13, 2000, issued in related U.S. Appl. No. 09/328,671, filed Jun. 9, 1999, Ginter et al.
Notice of Allowance dated Jun. 29, 2004 issued in related U.S. Appl. No. 10/157,061, filed Oct. 23, 2003, Ginter et al.
Notice of Allowance dated May 14, 2003 issued in related U.S. Appl. No. 10/106,742, filed Mar. 25, 2002, Ginter et al.
Notice of Allowance dated Aug. 10, 2005, issued in related U.S. Appl. No. 09/328,668, filed Jun. 9, 1999, Ginter et al.
Notice of Allowance dated Aug. 23, 2005 issued in related U.S. Appl. No. 10/157,061, filed May 30, 2002, Ginter et al.
Notice of Allowance dated Nov. 6, 2001 issued in related U.S. Appl. No. 09/327,405, filed Jun. 7, 1999, Ginter et al.
Notice of Allowance dated Oct. 29, 2002 issued in related U.S. Appl. No. 09/342,899, filed Jun. 29, 1999, Ginter et al.
Notice of Allowance dated Oct. 6, 2005 issued in related U.S. Appl. No. 09/342,899, filed Jun. 29, 1999, Ginter et al.
Notice of Allowance dated Sep. 14, 2001 issued in related U.S. Appl. No. 09/389,967, filed Sep. 3, 1999, Ginter et al.
Notice of Allowance dated Sep. 22, 1998, issued in related U.S. Appl. No. 08/780,393, filed Jan. 8, 1997, Ginter et al.
Notice of Allowance dated Sep. 8, 2005 issued in related U.S. Appl. No. 09/764,370, filed Jan. 19, 2001, Ginter et al.
Office Action dated Apr. 15, 1998, issued in related U.S. Appl. No. 08/780,393, filed Jan. 8, 1997, Ginter et al.
Office Action dated Apr. 22, 2002, issued in related U.S. Appl. No. 09/328,671, filed Jun. 9, 1999, Ginter et al.
Office Action dated Aug. 28, 2003 issued in related U.S. Appl. No. 09/678,252, filed Oct. 3, 2000, Ginter et al.
Office Action dated Aug. 7, 2003, issued in related U.S. Appl. No. 09/698,044, filed Octoer 30, 2000, Ginter et al.
Office Action dated Sep. 23, 1998, issued in related U.S. Appl. No. 08/760,440, filed Dec. 4, 1996, Ginter et al.
Office Action dated Dec. 19, 2000 issued in related U.S. Appl. No. 09/411,205, filed Oct. 4, 1999, Ginter et al.
Office Action dated Sep. 1, 2000, issued in related U.S. Appl. No. 09/328,671, filed Jun. 9, 1999, Ginter et al.
Office Action dated Dec. 20, 1996 , issued in related U.S. Appl. No. 08/388,107, filed Feb. 13, 1995, Ginter et al.
Office Action dated Dec. 24, 1997, issued in related U.S. Appl. No. 08/780,545, filed Jan. 8, 1997, Ginter et al.
Office Action dated Dec. 6, 2000, issued in related U.S. Appl. No. 09/328,671, filed Jun. 9, 1999, Ginter et al.
Office Action dated Feb. 13, 2003, issued in related U.S. Appl. No. 09/328,671, filed Jun. 9, 1999, Ginter et al.
Office Action dated Jan. 24, 2000 issued in related U.S. Appl. No. 09/335,465, filed Jun. 17, 1999, Ginter et al.
Office Action dated Jul. 17, 2000 issued in related U.S. Appl. No. 09/335,465, filed Jun. 17, 1999, Ginter et al.
Office Action dated Jul. 18, 1997, issued in related U.S. Appl. No. 08/778,256, filed Jan. 8, 1997, Ginter et al.
Office Action dated Jun. 12, 2000 issued in related U.S. Appl. No. 09/342,899, filed Jun. 29, 1999, Ginter et al.
Office Action dated Jun. 17, 2005 issued in related U.S. Appl. No. 10/607,562, filed Jun. 25, 2003, Ginter et al.
Office Action dated Jun. 26, 2003 issued in related U.S. Appl. No. 09/342,899, filed Jun. 29, 1999, Ginter et al.
Office Action dated Jun. 30, 2003, issued in related U.S. Appl. No. 09/328,671, filed Jun. 9, 1999, Ginter et al.
Office Action dated Mar. 11, 1998, issued in related U.S. Appl. No. 08/761,080, filed Dec. 4, 1996, Ginter et al.
Office Action dated Mar. 11, 2005 issued in related U.S. Appl. No. 09/342,899, filed Jun. 29, 1999, Ginter et al.
Office Action dated Mar. 15, 2000, issued in related U.S. Appl. No. 08/780,545, filed Jun. 9, 1999, Ginter et al.
Office Action dated Mar. 22, 2004 issued in related U.S. Appl. No. 09/342,899, filed Jun. 29, 1999, Ginter et al.
Office Action dated Mar. 22, 2004 issued in related U.S. Appl. No. 09/764,370, filed Jan. 19, 2001, Ginter et al.
Office Action dated Mar. 24, 2005 issued in related U.S. Appl. No. 10/157,061, filed Oct. 28, 2003, Ginter et al.
Office Action dated Mar. 30, 2001 issued in related U.S. Appl. No. 09/389,967, filed Sep. 3, 1999, Ginter et al.
Office Action dated May 27, 2005 issued in related U.S. Appl. No. 10/157,061, filed Oct. 23, 2003, Ginter et al.
Office Action dated Nov. 9, 1998, issued in related U.S. Appl. No. 08/761,080, filed Dec. 4, 1996, Ginter et al.
Office Action dated Sep. 22, 1998, issued in related U.S. Appl. No. 08/780,545, filed Jan. 8, 1997, Ginter et al.
Office Action dated Sep. 22, 1998, issued in related U.S. Appl. No. 08/964,333, filed Nov. 4, 1997 , Ginter et al.
Office Action dated Sep. 26, 2003 issued in related U.S. Appl. No. 09/870,801, filed Jun. 1, 2001, Ginter et al.
Final Office Action dated Jan. 4, 2005 issued in related U.S. Appl. No. 09/764,370, filed Jan. 19, 2001, Ginter et al.
Final Office Action dated Jun. 1, 2004 issued in related U.S. Appl. No. 09/678,252, filed Oct. 3, 2000, Ginter et al.
Final Office Action dated Jun. 14, 2001, issued in related U.S. Appl. No. 09/328,671, filed Jun. 9, 1999, Ginter et al.
Final Office Action dated Jan. 16, 2001 issued in related U.S. Appl. No. 09/389,967, filed Sep. 3, 1999, Ginter et al.
Final Office Action dated Jun. 29, 2005, issued in related U.S. Appl. No. 09/328,671, filed Jun. 9, 1999, Ginter et al.
Final Office Action dated Apr. 28, 1997 issued in related U.S. Appl. No. 08/761,080, filed Dec. 4, 1996, Ginter et al.
Final Office Action dated Mar. 19, 2002 issued in related U.S. Appl. No. 09/342,899, filed Jun. 29, 1999, Ginter et al.
Final Office Action dated Mar. 24, 2004, issued in related U.S. Appl. No. 09/328,671, filed Jun. 9, 1999, Ginter et al.
Final Office Action dated May 16, 2001, issued in related U.S. Appl. No. 09/328,671, filed Jun. 9, 1999, Ginter et al.
Notice of Allowability dated Aug. 4, 1997, issued in related U.S. Appl. No. 08/388,107, filed Feb. 13, 1995, Ginter et al.
Notice of Allowability dated Jun. 7, 2000, issued in related U.S. Appl. No. 09/208,017, filed Dec. 9, 1998, Ginter et al.
Notice of Allowance dated Aug. 18, 2000, issued in related U.S. Appl. No. 09/208,017, filed Dec. 9, 1998, Ginter et al.
Notice of Allowance dated Aug. 23, 2005 issued in related U.S. Appl. No. 10/696,659, filed Oct. 28, 2003, Ginter et al.
Final Office Action dated Jan. 28, 2003 issued in related U.S. Appl. No. 09/411,205, filed Oct. 4, 1999, Ginter et al.
Notice of Allowance dated Jun. 30, 2005 issued in related U.S. Appl. No. 09/678,252, filed Oct. 3, 2000, Ginter et al.
Notice of Allowance dated May 1, 2006 issued in related U.S. Appl. No. 09/870,801, filed Jun. 1, 2001, Ginter et al.
Office Action dated Dec. 19, 2000 issued in related U.S. Appl. No. 09/327,405, filed Jun. 6, 1999, Ginter et al.
Office Action dated Jun. 13, 2001 issued in related U.S. Appl. No. 09/342,899, filed Jun. 29, 1999, Ginter et al.
Final Office Action dated Apr. 10, 2001 issued in related U.S. Appl. No. 09/342,899, filed Jun. 29, 1999, Ginter et al.
Office Action dated Jul. 28, 1997 issued in related issued U.S. Appl. No. 08/780,393, filed Jan. 8, 1997, Ginter et al.
Office Action dated Apr. 15, 1998 issued in related issued U.S. Appl. No. 08/780,393, filed Jan. 8, 1997, Ginter et al.
Office Action dated Oct. 23, 2003 issued in related issued U.S. Appl. No. 10/157,061, filed May 30, 2002, Ginter et al.
Office Action dated Jun. 17, 2009 issued in related issued U.S. Appl. No. 11/090,982, filed Mar. 24, 2005, Ginter et al.
Office Action dated Sep. 25, 1996 issued in related issued U.S. Appl. No. 08/388,107, filed Feb. 13, 1995, Ginter et al.
Office Action dated Jul. 29, 2009 issued in related issued U.S. Appl. No. 11/359,979, filed Feb. 21, 2006, Ginter et al.
Notice of Allowability dated Jan. 21, 1999 issued in related issued U.S. Appl. No. 08/780,545, filed Jan. 8, 1997, Ginter et al.
Notice of Allowance dated Dec. 14, 1998 issued in related issued U.S. Appl. No. 08/780,545, filed Jan. 8, 1997, Ginter et al.
Notice of Allowance dated Nov. 26, 2001 issued in related issued U.S. Appl. No. 09/328,671, filed Jun. 9, 1999, Ginter et al.
Office Action dated Nov. 6, 2000 issued in related issued U.S. Appl. No. 09/208,017, filed Dec. 9, 1998, Ginter et al.
Notice of Allowability dated Jan. 12, 1999 issued in related issued U.S. Appl. No. 08/780,393, filed Jan. 8, 1997, Ginter et al.

Notice of Allowance dated Nov. 18, 2004 issued in related issued U.S. Appl. No. 09/678,252, filed Oct. 3, 2000, Ginter et al.
Notice of Allowance dated Dec. 2, 2003 issued in related issued U.S. Appl. No. 09/698,044, filed Oct. 30, 2000, Ginter et al.
Notice of Allowance dated Jun. 13, 2000 issued in related issued U.S. Appl. No. 09/328,671, filed Jun. 9, 1999, Ginter et al.
Notice of Allowance dated Apr. 28, 1998 in related U.S. Appl. No. 08/778,256, filed Jan. 8, 1997, Ginter et al.
Office Action dated Mar. 15, 2000, issued in related U.S. Appl. No. 09/328,671, filed Jun. 9, 1999, Ginter et al.
Office Action dated May 9, 2000 in related U.S. Appl. No. 09/389,967, filed Sep. 3, 1999, Ginter et al.
Office Action dated Mar. 24, 2005 issued in related U.S. Appl. No. 10/969,659, filed Oct. 28, 2003, Ginter et al.
Office Action dated Nov. 12, 2009 issued in related U.S. Appl. No. 11/090,982, filed Mar. 24, 2005, Ginter et al.
Office Action dated May 26, 2009, issued in related U.S. Appl. No. 11/231,355, filed Sep. 20, 2005, Ginter et al.
Final Office Action dated Nov. 2, 2009 issued in related U.S. Appl. No. 11/231,355, filed Sep. 20, 2005, Ginter et al.
Office Action dated Sep. 22, 2009 issued in related U.S. Appl. No. 11/807,313, filed May 25, 2007, Ginter et al.
Office Action dated Oct. 9, 2009 issued in related U.S. Appl. No. 11/821,862, filed Jun. 25, 2007, Ginter et al.
Office Action dated Nov. 27, 2009 issued in related U.S. Appl. No. 11/827,997, filed Jul. 13, 2007, Ginter et al.
Office Action dated Dec. 1, 2009 issued in related U.S. Appl. No. 11/879,006, filed Jul. 13, 2007, Ginter et al.
Office Action dated Oct. 19, 2009 issued in related U.S. Appl. No. 11/827,983, filed Jul. 13, 2007, Ginter et al.
Office Action dated Oct. 30, 2009 issued in related U.S. Appl. No. 11/894,329, filed Aug. 20, 2007, Ginter et al.
Office Action dated Jun. 22, 2009 in related U.S. Appl. No. 11/894,538, filed Aug. 20, 2007, Ginter et al.
Notice of Allowance dated Nov. 5, 2009 in related U.S. Appl. No. 11/894,538, filed Aug. 20, 2007, Ginter et al.
Office Action dated Nov. 3, 2009 in related U.S. Appl. No. 11/505,778, filed Aug. 16, 2006, Ginter et al.
Office Action dated Dec. 15, 2009 in related U.S. Appl. No. 11/980,245, filed Oct. 29, 2007, Ginter et al.
Unknown, "Automation of Securities Markets and Regulatory Implications," Financial Market Trends, 50:20-33, Oct. 1991.
Microsoft Press Computer Dictionary, Microsoft Press, 3rd Ed., p. 348, 1997.
Weber, "Metering Technologies for Digital Intellectual Property," A Report to the International Federation of Reproduction Rights Organizations, pp. 1-29, Oct. 1994.
Mori et al., "Superdistribution: The Concept and the Architecture," The Transactions of the IEICE, vol. E79(7):1133-1146, Jul. 1990.
European Search Report completed on Dec. 28, 2004 in European Patent Application No. 96922371.8.
Examination Report dated Jul. 8, 2005 in European Patent Application No. 96922371.8.
Examination Report dated Jun. 21, 2006 in European Patent Application No. 96922371.8.
Summons to Attend Oral Proceedings dated Jun. 5, 2007 in European Patent Application No. 96922371.8.
Result of Consultation dated Jan. 8, 2008 in European Patent Application No. 96922371.8.
Oral Proceedings dated Jan. 10, 2008 in European Patent Application No. 96922371.8.
Notice of Opposition dated Jul. 27, 2009 in European Patent Application No. 96922371.8.
English translation of Notice of Opposition dated Jul. 27, 2009 in European Patent Application No. 96922371.8.
Maxemchuck, "Electronic Document Distribution," AT&T Bell Laboratories, Murray Hill, NJ Sep. 1994.
Dautzenberg, "Watermarking Images," Dept. Microelectronics and EE, Trinity College Dublin, Oct. 1994.
Caronni, "Assuring Ownership Rights for Digital Images," Proceedings of reliable IT systems; VIS '95 H.H. Burggemann and W. Gerhardt-Hackl (Ed.), Viewing Publishing Company, Germany, 1995.
European Search Report completed on Dec. 29, 2004 in European Patent Application No. 04075701.5.
Examination Report dated Jun. 21, 2006 in European Patent Application No. 04075701.5.
Summons to Attend Oral Proceedings dated May 29, 2007 in European Patent Application No. 04075701.5.
Result of Consultation dated Jan. 8, 2008 in European Patent Application No. 04075701.5.
Oral Proceedings dated Jan. 10, 2008 in European Patent Application No. 04075701.5.
Notice of Opposition dated Sep. 29, 2009 in European Patent Application No. 04075701.5.
English translation of Notice of Opposition dated Sep. 29, 2009 in European Patent Application No. 04075701.5.
Vigarié, "A device for real-time modification of access conditions in a D2-MAC/Packet EUROCRYPT signal," Centre Commun d'Etudes Télédiffusion et de Télécommunications, May 1993.
Unknown, "Système d'accès conditionnel pour la famille MAC/paquet: EUROCRYPT," Norme Européenne, Norme Française, Apr. 1993.
European Search Report completed on Sep. 30, 2005 in European Application No. 05075672.5.
Examination Report dated Jun. 21, 2006 in European Application No. 05075672.5.
Examination Report dated Mar. 2, 2009 in European Application No. 05075672.5.
European Search Report completed Jan. 18, 2005 in European Application No. 04078194.0.
Examination Report dated Jun. 21, 2006 in European Application No. 04078194.0.
Examination Report dated Apr. 13, 2007 in European Application No. 04078194.0.
Summons to Attend Oral Proceedings dated Jun. 23, 2008 in European Application No. 04078194.0.
Oral Proceedings dated Nov. 19, 2008 in European Application No. 04078194.0.
Examination Report dated Jun. 21, 2006 in European Application No. 04078195.7.
Examination Report dated Apr. 13, 2007 in European Application No. 04078195.7.
Summons to Attend Oral Proceedings dated Jun. 26, 2008 in European Application No. 04078195.7.
European Search Report completed Jun. 7, 2006 in European Application No. 04078254.2.
Examination Report dated Apr. 13, 2007 in European Application No. 04078254.2.
Summons to Attend Oral Proceedings dated Jul. 2, 2008 in European Application No. 04078254.2.
European Search Report and European Search Opinion completed Nov. 2, 2009 in European Application No. 08105555.0.
Schneier, "Applied Cryptography," XP-002548393, p. 150-151, 1994.
European Search Report and European Search Opinion completed Jun. 7, 2006 in European Application No. 06075503.0.
Examination Report dated Jun. 20, 2008 in European Application No. 06075503.0.
European Search Report and European Search Opinion completed Apr. 5, 2006 in European Application No. 05077923.0.
Examination Report dated Apr. 13, 2007 in European Application No. 05077923.0.
Examination Report dated Mar. 2, 2009 in European Application No. 05077923.0.
European Search Report and European Search Opinion completed May 16, 2008 in European Application No. 08100047.3.
European Search Report and European Search Opinion completed Nov. 2, 2009 in European Application No. 09156840.2.
International Search Report mailed May 14, 1997 in International Application No. PCT/1996/002303.
Siuda, K., "Security Services in Telecommunications Networks," Seminar: Mapping New Applications Onto New Technologies, edited by B. Plattner and P. Gunzburger; Zurich, Mar. 8-10, 1988, pp. 45-52.

Australian Examiner's First Report dated Jul. 16, 1998 in Australian Application No. 63266/96.
Candian Examination Report dated Jan. 11, 2007 in Canadian Application No. 2,212,574.
Candian Examination Report dated Nov. 30, 2007 in Canadian Application No. 2,212,574.
Candian Examination Report dated Nov. 6, 2008 in Canadian Application No. 2,212,574.
Chinese Office Action issued Aug. 30, 2002 in Chinese Application No. 96193245.7.
Chinese Office Action issued Aug. 22, 2003 in Chinese Application No. 96193245.7.
Japanese Office Action mailed Mar. 8, 2005 in Japanese Application No. 8526318.
Japanese Office Action mailed Oct. 18, 2005 in Japanese Application No. 8526318.
Japanese Office Action mailed Aug. 15, 2006 in Japanese Application No. 8526318.
Japanese Office Action mailed Apr. 6, 2007 in Japanese Application No. 8526318.
Chinese Office Action issued Nov. 11, 2005 in Chinese Application No. 03101486.0.
Chinese Office Action issued Apr. 7, 2006 in Chinese Application No. 03101486.0.
Japanese Office Action mailed Jan. 17, 2006 in Japanese Application No. 2003-59518.
Trii et al., "System Architecture for Super Distribution," Technical Report of Institute of Electronics, Inforamtion and Communication Engineers, 94(240):59-66, Sep. 21, 1994.
Japanese Office Action mailed Feb. 13, 2007 in Japanese Application No. 2003-59518.
Search Report on Microcomputer [II] 4 Proposal and Outline Regarding Software Distribution, Japan Electronic Industry Development Association, p. 190-218, Mar. 1988.
Chinese Office Action issued Jun. 3, 2005 in Chinese Application No. 200410043544.2.
Japanese Office Action mailed Mar. 1, 2005 in Japanese Application No. 2003-102185.
Japanese Office Action mailed Nov. 1, 2005 in Japanese Application No. 2003-102185.
Japanese Office Action mailed Aug. 22, 2006 in Japanese Application No. 2003-102185.
Chinese Office Action issued Mar. 28, 2008 in Chinese Application No. 200610073333.2.
Chinese Office Action issued Dec. 26, 2008 in Chinese Application No. 200610073333.2.
Chinese Office Action issued Jul. 31, 2009 in Chinese Application No. 200610073333.2.
Japanese Office Action mailed Nov. 7, 2005 in Japanese Application No. 2003-115260.
Ohtaki et al., "Development Environment on Superdistribution Architecture," Technical Report of Institute of Electronics, Information, and Communication Engineers, 94(240):9-16, Sep. 21, 1994.
Japanese Office Action mailed Mar. 28, 2006 in Japanese Application No. 2003-115260.
Japanese Office Action mailed Nov. 25, 2008 in Japanese Application No. 2003-115260.
Chinese Office Action issued Aug. 21, 2009 in Chinese Application No. 200810082528.2.
Japanese Office Action mailed Mar. 1, 2005 in Japanese Application No. 2003-116576.
Ueki et al., "Account Processing in Right Management Mechanism for Super Distribution," Sutdy Report of Information Processing Societies, 90(1):1-10, Jan. 16, 1990.
Japanese Office Action mailed Apr. 4, 2006 in Japanese Application No. 2003-116576.
Seki et al., "A Proposal of a New Distribution Scheme for Software Products," Study Report of Information Processing Societies, 93(64):19-28, Jul. 20, 1993.
Japanese Office Action mailed Mar. 1, 2005 in Japanese Application No. 2003-117920.
Japanese Office Action mailed Nov. 8, 2005 in Japanese Application No. 2003-117920.
Japanese Office Action mailed Dec. 12, 2006 in Japanese Application No. 2003-117920.
Japanse Office Action mailed Mar. 28, 2006 in Japanese Application No. 2003-121056.
Japanse Office Action mailed Nov. 7, 2005 in Japanese Application No. 2003-121056.
Japanese Office Action mailed Nov. 25, 2008 in Japanese Application No. 2003-121056.
Yoshioka, "The Technical Trend of Super Distribution," Technical Research Report of Institute of Electronics, Information and Communication Engineers, 94(240):67-74, Sep. 21, 1994.
Japanese Office Action mailed Mar. 28, 2006 in Japanese Application No. 2003-126862.
Kaii, "Takeoff of Communicator with Magic Cap," Information Provider Services Being Greatly Changed by Telescript, Nikkei MAC, Japan, Nikkei BP Corp., 19:138-141, Oct. 15, 1994.
Japanese Office Action mailed Nov. 7, 2005 in Japanese Application No. 2003-126862.
Chinese Office Action issued Dec. 28, 2007 in Chinese Application No. 200610101648.3.
Japanese Office Action mailed Mar. 1, 2005 in Japanese Application No. 2003-124706.
Japanese Office Action mailed Sep. 1, 2006 in Japanese Application No. 2003-124706.
Japanese Office Action mailed Jul. 24, 2007 in Japanese Application No. 2003-124706.
Japanese Office Action mailed Sep. 12, 2006 in Japanese Application No. 2005-261182.
Japanese Office Action mailed Jul. 24, 2007 in Japanese Application No. 2005-261182.
Japanese Office Action mailed Aug. 26, 2008 in Japanese Application No. 2005-261182.
Chinese Office Action issued Feb. 16, 2007 in Chinese Application No. 200510082349.5.
Japanese Office Action mailed Jan. 16, 2007 in Japanese Application No. 2005-259768.
Chinese Office Action issued Feb. 22, 2008 in Chinese Application No. 200610100788.9.
Japanese Office Action mailed Jul. 31, 2007 in Japanese Application No. 2005-259801.
Japanese Office Action mailed Sep. 9, 2008 in Japanese Application No. 2005-259801.
Japanese Office Action mailed Feb. 24, 2009 in Japanese Application No. 2005-259801.
Japanese Office Action mailed Jan. 16, 2007 in Japanese Application No. 2005-259831.
Japanese Office Action mailed Nov. 6, 2007 in Japanese Application No. 2005-249688.
Japanese Office Action mailed Aug. 15, 2006 in Japanese Application No. 2005-253052.
Japanese Office Action mailed Jul. 24, 2007 in Japanese Application No. 2005-253052.
Japanese Office Action mailed Jul. 15, 2008 in Japanese Application No. 2005-253052.
Japanese Office Action mailed Jan. 20, 2009 in Japanese Application No. 2005-253052.
Japanese Office Action mailed Jan. 9, 2007 in Japanese Application No. 2005-251627.
Japanese Office Action mailed Jan. 16, 2007 in Japanese Application No. 2006-114446.
Japanese Office Action mailed Jul. 24, 2007 in Japanese Application No. 2006-114446.
Japanese Office Action mailed Jan. 9, 2007 in Japanese Application No. 2006-114431.
Chinese Office Action issued Feb. 22, 2008 in Chinese Application No. 200610101824.3.
Chinese Office Action issued Aug. 15, 2008 in Chinese Application No. 200610101824.3.
Chinese Office Action issued Sep. 5, 2008 in Chinese Application No. 200610101426.1.
Chinese Office Action issued Jul. 3, 2009 in Chinese Application No. 200610101426.1.

Japanese Office Action mailed Jul. 24, 2007 in Japanese Application No. 2007-034586.
Office Action dated Feb. 24, 2010 issued in related U.S. Appl. No. 11/807,342, filed May 25, 2007, Ginter et al.
Notice of Allowance dated Feb. 16, 2010 in related U.S. Appl. No. 11/894,538, filed Aug. 20, 2007, Ginter et al.
Office Action dated Mar. 3, 2010 issued in related U.S. Appl. No. 11/438,953, filed May 23, 2006, Ginter et al.
Office Action dated Jan. 21, 2010 issued in related U.S. Appl. No. 11/980,282, filed Oct. 29, 2007, Ginter et al.
Office Action dated Apr. 1, 2010 issued in related U.S. Appl. No. 11/359,979, filed Feb. 21, 2006, Ginter et al.
Office Action dated Apr. 20, 2010 issued in related U.S. Appl. No. 11/090,982, filed Mar. 24, 2005, Ginter et al.
Office Action dated Apr. 26, 2010 issued in related U.S. Appl. No. 11/505,778, filed Aug. 16, 2006, Ginter et al.
Office Action dated Apr. 28, 2010 issued in related U.S. Appl. No. 11/981,791, filed Oct. 30, 2007, Ginter et al.
Japanese Office Action mailed Dec. 1, 2009 in Japanese Application No. 2007-328464.
Japanese Office Action mailed Dec. 1, 2009 in Japanese Application No. 2008-023508.
Japanese Office Action mailed Dec. 1, 2009 in Japanese Application No. 2008-298738.
Japanese Office Action mailed Feb. 26, 2008 in Japanese Application No. 2005-259831.
Japanese Office Action mailed Dec. 1, 2009 in Japanese Application No. 2005-249767.
Japanese Office Action mailed Dec. 1, 2009 in Japanese Application No. 2005-253059.
Japanese Office Action mailed Dec. 1, 2009 in Japanese Application No. 2006-114698.
Japanese Office Action mailed Dec. 1, 2009 in Japanese Application No. 2006-114521.
Japanese Office Action mailed Dec. 1, 2009 in Japanese Application No. 2007-071450.
Japanese Office Action mailed Dec. 1, 2009 in Japanese Application No. 2008-335902.
Japanese Office Action mailed Dec. 1, 2009 in Japanese Application No. 2009-238649.
Tashiro et al., The implementation of a small-scale prototype for Software Service System (SSS), Trans. IEICE, vol. J70-D, No. 2, pp. 335-345, 1987.
Japanese Office Action mailed Dec. 1, 2009 in Japanese Application No. 2009-214617.
Office Action dated May 14, 2010 issued in related U.S. Appl. No. 11/894,329, filed Aug. 20, 2007.
Office Action dated May 12, 2010 issued in related U.S. Appl. No. 11/981,297, filed Oct. 30, 2007, Ginter et al.
Office Action dated May 13, 2010 issued in related U.S. Appl. No. 11/827,983, filed Jul. 13, 2007, Ginter et al.
Japanese Office Action mailed Dec. 1, 2009 in Japanese Application No. 2008-298739.
Chinese Office Action issued Apr. 14, 2010 in Chinese Application No. 200610073333.2.
Chinese Office Action issued Apr. 13, 2010 in Chinese Application No. 200610101426.1.
Office Action dated May 26, 2010 issued in related U.S. Appl. No. 11/981,465, filed Oct. 30, 2007, Ginter et al.
Office Action dated May 28, 2010 issued in related U.S. Appl. No. 11/821,862, filed Jun. 25, 2007, Ginter et al.
Office Action dated Jun. 3, 2010 issued in related U.S. Appl. No. 11/440,141, filed May 22, 2006, Ginter et al.
Office Action dated Jun. 30, 2010 issued in related U.S. Appl. No. 11/827,997, filed Jul. 13, 2007, Ginter et al.
Notice of Allowance dated Jul. 22, 2010 issued in related U.S. Appl. No. 11/231,355, filed Sep. 20, 2005, Ginter et al.
Office Action dated Jul. 28, 2010 issued in related U.S. Appl. No. 12/780,702, filed May 14, 2001, Ginter et al.
English translation of Notice of Opposition dated Jun. 1, 2010 in European Patent Application No. 04078195.7.
Kaashoek et al., "Dynamic Documents: Mobile Wireless Access to the WWW," Proceedings from the Workshop on Digital Object Identifier: 10.1109/Mcsa, Dec. 8, 1994, 8 pages.
Hickman, "SSL 0.2 Protocol Specification," Jun. 9, 1995 [http://www.mozilla.org/projects/security/pki/nss/ssl/draft02.html].
Office Action dated Aug. 2, 2010 issued in related U.S. Appl. No. 11/981,816, filed Oct. 30, 2007, Ginter et al.
Notice of Allowance dated Aug. 4, 2010 issued in related U.S. Appl. No. 11/879,006, filed Jul. 12, 2007, Ginter et al.
Office Action dated Aug. 4, 2010 issued in related U.S. Appl. No. 11/981,332, filed Oct. 30, 2007, Ginter et al.
Office Action dated Aug. 27, 2010 issued in related U.S. Appl. No. 11/980,282, filed Oct. 29, 2007, Ginter et al.
Office Action dated Oct. 15, 2010 in related U.S. Appl. No. 11/980,245, filed Oct. 29, 2007, Ginter et al.
Office Action dated Nov. 4, 2010 issued in related U.S. Appl. No. 11/807,342, filed May 25, 2007, Ginter et al.
English translation of Decision of Final Rejection mailed Nov. 2, 2010 for Japanese Application No. 2005-249767.
English translation of Decision of Final Rejection mailed Nov. 2, 2010 for Japanese Application No. 2008-298739.
English translation of Decision of Final Rejection mailed Nov. 2, 2010 for Japanese Application No. 2009-238649.
English translation of Decision of Final Rejection mailed Nov. 2, 2010 for Japanese Application No. 2008-335902.
English translation of Decision of Final Rejection mailed Nov. 2, 2010 for Japanese Application No. 2006-114698.
English translation of Decision of Final Rejection mailed Nov. 2, 2010 for Japanese Application No. 2006-114521.
English translation of Decision of Final Rejection mailed Nov. 2, 2010 for Japanese Application No. 2009-214617.
English translation of Decision of Final Rejection mailed Nov. 2, 2010 for Japanese Application No. 2007-328464.
English translation of Decision of Final Rejection mailed Nov. 2, 2010 for Japanese Application No. 2007-071450.
Office Action dated Dec. 8, 2010 issued in related U.S. Appl. No. 11/981,791, filed Oct. 30, 2007, Ginter et al.
Office Action dated Jan. 4, 2011 issued in related U.S. Appl. No. 11/981,297, filed Oct. 30, 2007, Ginter et al.
Office Action dated Jan. 10, 2011 issued in related U.S. Appl. No. 11/981,465, filed Oct. 30, 2007, Ginter et al.
Office Action dated Jan. 13, 2011 issued in related U.S. Appl. No. 12/895,423, filed Sep. 30, 2010, Ginter et al.
Office Action dated Feb. 15, 2011 issued in related U.S. Appl. No. 11/440,141, filed May 23, 2006, Ginter et al.
Summons to Attend Oral Proceedings dated Mar. 9, 2011 in European Application No. 04075701.5.
Notice of Allowance dated Mar. 8, 2011 issued in related U.S. Appl. No. 11/807,313, filed May 25, 2007, Ginter et al.
English translation of Notice of Reexamination issued on Mar. 3, 2011, for related Chinese Application No. 200610073333.2.
Notice of Allowance mailed Apr. 11, 2011 issued in related U.S. Appl. No. 11/980,282, filed Oct. 29, 2007, Ginter et al.
Office Action mailed Apr. 14, 2011 issued in related U.S. Appl. No. 11/981,816, filed Oct. 30, 2007, Ginter et al.
Office Action mailed Apr. 14, 2011 issued in related U.S. Appl. No. 12/780,702, filed May 14, 2010, Ginter et al.
Office Action mailed Apr. 14, 2011 issued in related U.S. Appl. No. 11/981,332, filed Oct. 30, 2007, Ginter et al.
Office Action mailed Apr. 26, 2011 issued in related U.S. Appl. No. 11/359,979, filed Feb. 21, 2006, Ginter et al.
English translation of Second Office Action issued on Apr. 18, 2011 in related Chinese Application No. 200810082528.2.
Office Action mailed May 11, 2011 issued in related U.S. Appl. No. 11/090,982, filed Mar. 24, 2005, Ginter et al.
Office Action mailed Jun. 27, 2011 issued in related U.S. Appl. No. 12/797,535, filed Jun. 9, 2010, Ginter et al.
Office Action mailed Jun. 27, 2011 issued in related U.S. Appl. No. 11/980,245, filed Oct. 29, 2007, Ginter et al.
Office Action mailed Jun. 28, 2011 issued in related U.S. Appl. No. 11/827,997, filed Jul. 13, 2007, Ginter et al.
Oral Proceedings dated Apr. 11, 2011 in European Patent Application No. 96922371.8.

Summons to Attend Oral Proceedings dated Jul. 15, 2011 in European Application No. 04078195.7.
Office Action mailed Jul. 19, 2011 issued in related U.S. Appl. No. 12/858,902, filed Aug. 18, 2010, Ginter et al.
Office Action dated Jul. 29, 2011, issued in related Canadian Patent Application No. 2,683,230.
Office Action mailed Aug. 31, 2011, issued in related U.S. Appl. No. 11/981,791, filed Oct. 30, 2007, Ginter et al.
Office Action mailed Sep. 2, 2011, issued in related U.S. Appl. No. 12/767,505, filed Apr. 26, 2010, Ginter et al.
Office Action mailed Sep. 15, 2011, issued in related U.S. Appl. No. 12/817,889, filed Jun. 17, 2010, Ginter et al.
Notice of Allowance mailed Oct. 5, 2011, issued in related U.S. Appl. No. 12/893,901, filed Sep. 29, 2010, Ginter et al.
Koenen et al., "The Long March to Interoperable Digital Rights Management," Proceedings of the IEEE, 92(6): 883-897 (2004).
Office Action mailed Oct. 11, 2011, issued in related U.S. Appl. No. 13/023,365, filed Feb. 8, 2011, Ginter et al.
Office Action mailed Oct. 17, 2011, issued in related U.S. Appl. No. 13/023,415, filed Feb. 8, 2011, Ginter et al.
Office Action mailed Oct. 18, 2011, issued in related U.S. Appl. No. 11/505,778, filed Aug. 16, 2006, Ginter et al.
Office Action mailed Nov. 3, 2011, issued in related U.S. Appl. No. 11/359,979, filed Feb. 21, 2006, Ginter et al.
English translation of Reexamination Decision (Decision No. 36813) issued on Nov. 11, 2011, for related Chinese Application No. 200610073333.2.
Office Action mailed Dec. 7, 2011, issued in related U.S. Appl. No. 11/440,141, filed May 23, 2006, Ginter et al.
Office Action mailed Dec. 8, 2011, issued in related U.S. Appl. No. 13/028,647, filed Feb. 16, 2011, Ginter et al.
Invitation pursuant to Article 94(3) and Rule 71(1) EPC mailed Dec. 8, 2011, for related European Patent Application No. 08100047.3.
Invitation pursuant to Article 94(3) and Rule 71(1) EPC mailed Dec. 8, 2011, for related European Patent Application No. 06075503.0.
Office Action mailed Dec. 12, 2011, issued in related U.S. Appl. No. 12/767,505, filed Apr. 26, 2010, Ginter et al.
Office Action mailed Dec. 19, 2011, issued in related U.S. Appl. No. 11/981,816, filed Oct. 30, 2007, Ginter et al.
Notice of Allowance mailed Dec. 12, 2011, issued in related U.S. Appl. No. 11/827,983, filed Jul. 13, 2007, Ginter et al.
Notice of Allowance mailed Jan. 3, 2012, issued in related U.S. Appl. No. 11/821,862, filed Jun. 25, 2007, Ginter et al.
Notice of Allowance mailed Dec. 12, 2011, issued in related U.S. Appl. No. 11/894,329, filed Aug. 20, 2007, Ginter et al.
Summons to Attend Oral Proceedings dated Dec. 22, 2011 in European Application No. 09156840.2
Interoculory decision in the Opposition proceedings (Art. 101(3)(a) and 106(2) EPC) dated Dec. 22, 2011 in European Patent No. 1431864.
Provision of a copy of the minutes in accordance with Rule 124(4) EPC dated Dec. 22, 2011 in European Patent No. 1431864.
Office Action mailed Jan. 17, 2012 issued in related U.S. Appl. No. 12/797,535, filed Jun. 9, 2010, Ginter et al.
Denning, "An Intrusion-Detection Model," IEEE Transaction on Software on Engineering, vol. SE-13, No. 2, 1987, pp. 222-232.
Office Action mailed Jan. 31, 2012 issued in related Application No. 12/780,702, filed May 14, 2010, Ginter et al.
Office Action mailed Feb. 14, 2012 issued in related U.S. Appl. No. 12/858,902, filed Aug. 18, 2010, Ginter et al.
Summons to Attend Oral Proceedings dated Dec. 27, 2011 in European Application No. 05077923.0.
English translation of Second Office Action issued Jan. 5, 2012 in Chinese Application No. 200810082243.9
Minutes of Oral Proceedings dated Feb. 14, 2012 in European Application No. 04078195.7-2212.
Interlocutory decision in Oposition Proceedings dated Feb. 14, 2012 in.
Office Action mailed Mar. 28, 2012 issued in related U.S. Appl. No. 11/980,245, filed Oct. 29, 2007, Ginter et al.
English translation of Notice of Reasons for Rejection mailed Apr. 3, 2012 in Japanese Application No. 2011-035736.
Enlgish translation of Notice of Reasons for Rejection mailed Apr. 10, 2012 in Japanese Application No. 2010-126180.
Notice of Allowance mailed Apr. 6, 2012, issued in related U.S. Appl. No. 11/821,862, filed Jun. 25, 2007, Ginter et al.
Notice of Allowance mailed Mar. 29, 2012, issued in related U.S. Appl. No. 11/894,329, filed Aug. 20, 2007, Ginter et al.
Office Action mailed Apr. 12, 2012, issued in related U.S. Appl. No. 12/817,889, filed Jun. 17, 2010, Ginter et al.
English translation of Notice of Reasons for Rejection mailed Apr. 3, 2012 in Japanese Application No. 2010-125834.
English translation of Decision on Rejection issued Mar. 28, 2012 in Chinese Application No. 200810082528.2.
Communication pursuant to Rule 82(2) EPC dated Apr. 13, 2012 in European Patent No. 1431864.
Decision to refuse a European Patent application dated Apr. 26, 2012 in European Patent Application No. 09156840.2.

* cited by examiner

FIG. 14A

| |
|---|
| **DEVICE FIRM WIRE LOW LEVEL SERVICES 582** |
| INITIALIZATION |
| POST |
| DOWNLOAD CHALLENGE/RESPONSE AND AUTHENTICATION |
| RECOVERY |
| EEPROM/FLASH MEMORY MANAGER |
| **KERNEL/DISPATCHER 552** |
| INITIALIZATION |
| TASK MANAGER 576 (SLEEP/AWAKE/CONTEXT SWAP) |
| INTERRUPT HANDLER 584 (TIMER/BIU/POWER FAIL/WATCHDOG TIMER/ENCRYPTION COMPLETED) |
| BIU HANDLER 586 |
| **MEMORY MANAGER 578** |
| INITIALIZATION (SETTING MMU TABLES |
| ALLOCATE |
| DELLOCATE |
| **VIRTUAL MEMORY MANAGER 580** |
| SWAP BLOCK PAGING |
| EXTERNAL MODULE PAGING |
| MEMORY COMPRESS |
| **RPC AND TABLES 550** |
| INITIALIZATION |
| MESSAGING CODE /SERVICES MANAGER |
| SEND/RECEIVE |
| STATUS |
| RPC DISPATCH TABLE |
| RPC SERVICE TABLE |

•
•
•

| |
|---|
| **TIME BASE MANAGER 554** |
| **ENCRYTION/DECRYPTION MANAGER 556** |
| PK |
| BULK |
| **KEY AND TAG MANAGER 558** |
| KEY STORAGE IN EEPROM |
| KEY LOCATOR |
| KEY GENERATOR |
| CONVOLUTION ALGORITHM |
| **SUMMARY SERVICES MANAGER 560** |
| EVENT SUMMARIES |
| BUDGET SUMMARIES |
| DISTRIBUTER SUMMARY SERVICES |
| **CHANNEL SERVICES MANAGER 562** |
| CHANNEL HEADERS |
| CHANNEL DETAILS |
| **LOAD MODULE EXECUTION SERVICES 568** |
| **AUTHENTICATION MANAGER/SECURE COMMUNICATION MANAGER 564** |
| **DATABASE MANAGER 566** |
| MANAGEMENT FILE SUPPORT |
| TRANSACTION AND SEQUENCE NUMBER SUPPORT |
| SRN/ HASH |
| **DTD INTERPRETER 590** |
| **LIBRARY ROUTINES 574** |
| I/O CALLS(STRING SEARCH ETC.) |
| MISC. ITEMS THAT ARE PROBABLY LIBRARY ROUTINES |
| TAG CHECKING,MD5,CRC'S |
| **INTERNAL LM'S 572 FOR BASIC METHODS** |
| METER LOAD MODULE(S) |
| BILLING LOAD MODULE(S) |
| BUDGET LOAD MODULE(S) |
| AUDIT LOAD MODULE(S) |
| READ OBJECT LOAD MODULE(S) |
| WRITE OBJECT LOAD MODULE(S) |
| OPEN OBJECT LOAD MODULE(S) |
| CLOSE OBJECT LOAD MODULE(S) |

Figure 14B:
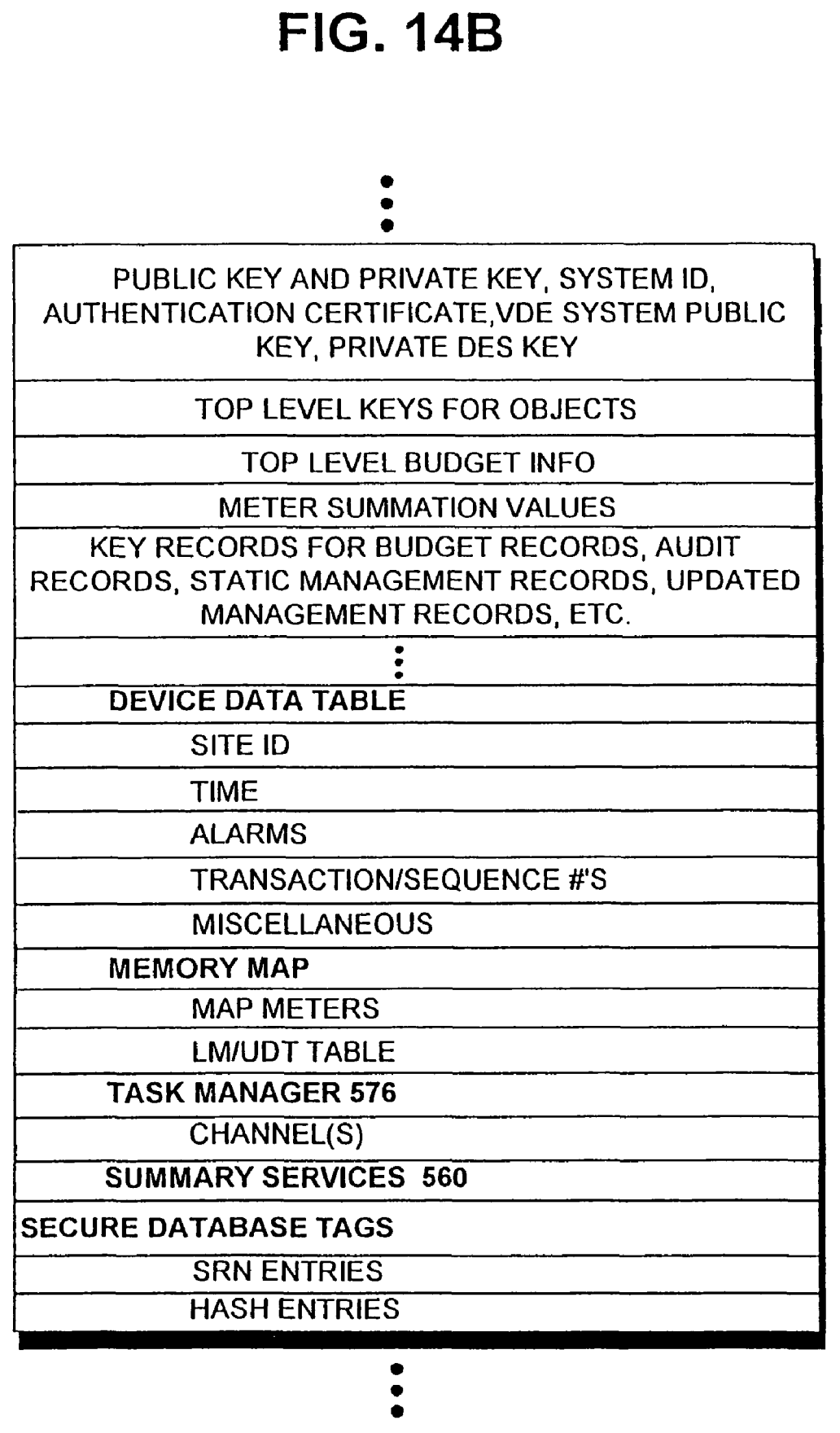

| |
|---|
| PUBLIC KEY AND PRIVATE KEY, SYSTEM ID, AUTHENTICATION CERTIFICATE,VDE SYSTEM PUBLIC KEY, PRIVATE DES KEY |
| TOP LEVEL KEYS FOR OBJECTS |
| TOP LEVEL BUDGET INFO |
| METER SUMMATION VALUES |
| KEY RECORDS FOR BUDGET RECORDS, AUDIT RECORDS, STATIC MANAGEMENT RECORDS, UPDATED MANAGEMENT RECORDS, ETC. |
| ⋮ |
| **DEVICE DATA TABLE** |
| SITE ID |
| TIME |
| ALARMS |
| TRANSACTION/SEQUENCE #'S |
| MISCELLANEOUS |
| **MEMORY MAP** |
| MAP METERS |
| LM/UDT TABLE |
| **TASK MANAGER 576** |
| CHANNEL(S) |
| **SUMMARY SERVICES 560** |
| **SECURE DATABASE TAGS** |
| SRN ENTRIES |
| HASH ENTRIES |

⋮

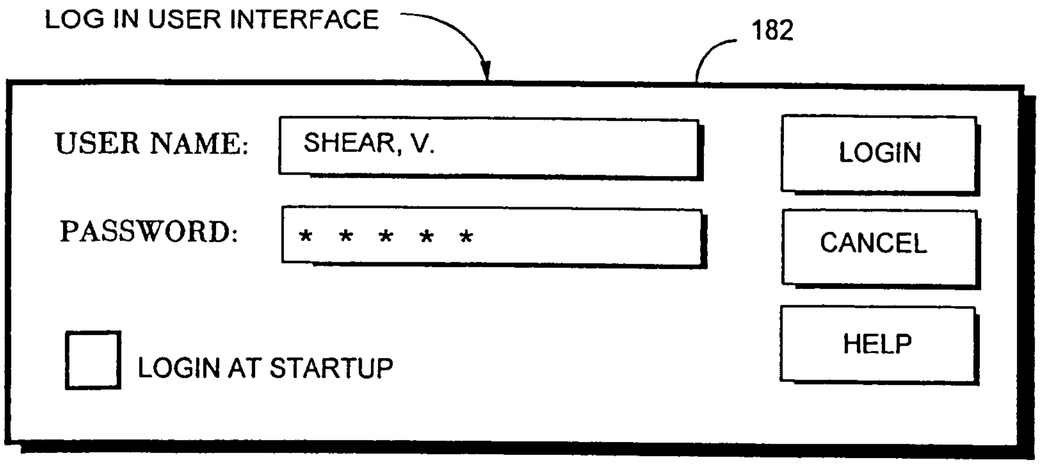
FIG. 72A
FIG. 72B
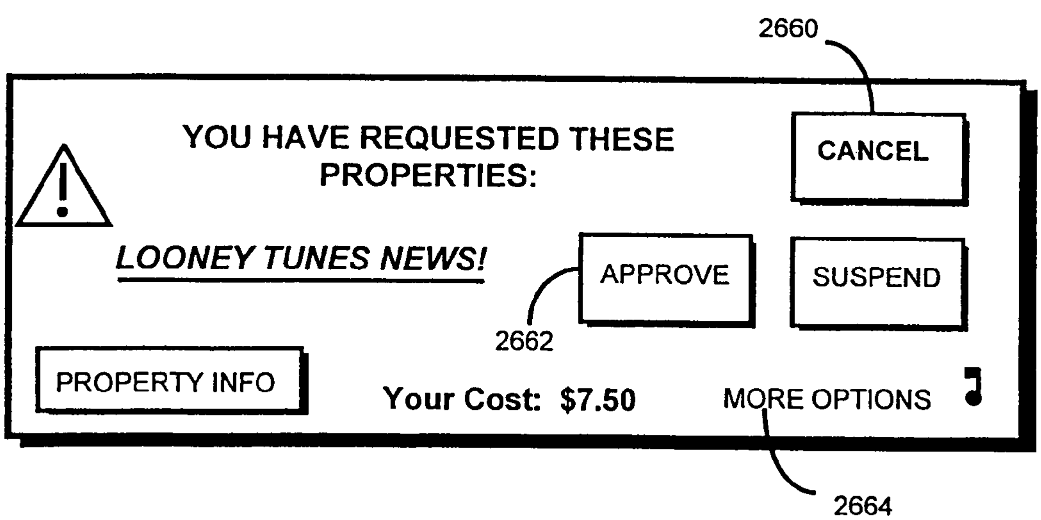

SYSTEMS AND METHODS FOR SECURE TRANSACTION MANAGEMENT AND ELECTRONIC RIGHTS PROTECTION

CROSS-REFERENCE TO RELATED APPLICATIONS

This is continuation of commonly assigned copending application Ser. No. 11/231,355, filed Sep. 20, 2005, which is a continuation of application Ser. No. 09/698,044, filed Oct. 30, 2000, (now U.S. Pat. No. 6,948,070), which is a continuation of application Ser. No. 09/208,017, filed Dec. 9, 1998, (now U.S. Pat. No. 6,253,193), which is a continuation of application Ser. No. 08/964,333, filed Nov. 4, 1997, (now U.S. Pat. No. 5,982,891), which is a continuation of application Ser. No. 08/388,107, filed Feb. 13, 1995, now abandoned, all of which are incorporated herein by reference.

FIELD(S) OF THE INVENTION(S)

This invention generally relates to computer and/or electronic security.

More particularly, this invention relates to systems and techniques for secure transaction management. This invention also relates to computer-based and other electronic appliance-based technologies that help to ensure that information is accessed and/or otherwise used only in authorized ways, and maintains the integrity, availability, and/or confidentiality of such information and processes related to such use.

The invention also relates to systems and methods for protecting rights of various participants in electronic commerce and other electronic or electronically-facilitated transactions.

The invention also relates to secure chains of handling and control for both information content and information employed to regulate the use of such content and consequences of such use. It also relates to systems and techniques that manage, including meter and/or limit and/or otherwise monitor use of electronically stored and/or disseminated information. The invention particularly relates to transactions, conduct and arrangements that make use of, including consequences of use of, such systems and/or techniques.

The invention also relates to distributed and other operating systems, environments and architectures. It also generally relates to secure architectures, including, for example, tamper-resistant hardware-based processors, that can be used to establish security at each node of a distributed system.

BACKGROUND AND SUMMARY OF THE INVENTION(S)

Telecommunications, financial transactions, government processes, business operations, entertainment, and personal business productivity all now depend on electronic appliances. Millions of these electronic appliances have been electronically connected together. These interconnected electronic appliances comprise what is increasingly called the "information highway." Many businesses, academicians, and government leaders are concerned about how to protect the rights of citizens and organizations who use this information (also "electronic" or "digital") highway.

Electronic Content

Today, virtually anything that can be represented by words, numbers, graphics, or system of commands and instructions can be formatted into electronic digital information. Television, cable, satellite transmissions, and on-line services transmitted over telephone lines, compete to distribute digital information and entertainment to homes and businesses. The owners and marketers of this content include software developers, motion picture and recording companies, publishers of books, magazines, and newspapers, and information database providers. The popularization of on-line services has also enabled the individual personal computer user to participate as a content provider. It is estimated that the worldwide market for electronic information in 1992 was approximately $40 billion and is expected to grow to $200 billion by 1997, according to Microsoft Corporation. The present invention can materially enhance the revenue of content providers, lower the distribution costs and the costs for content, better support advertising and usage information gathering, and better satisfy the needs of electronic information users. These improvements can lead to a significant increase in the amount and variety of electronic information and the methods by which such information is distributed.

The inability of conventional products to be shaped to the needs of electronic information providers and users is sharply in contrast to the present invention. Despite the attention devoted by a cross-section of America's largest telecommunications, computer, entertainment and information provider companies to some of the problems addressed by the present invention, only the present invention provides commercially secure, effective solutions for configurable, general purpose electronic commerce transaction/distribution control systems.

Controlling Electronic Content

The present invention provides a new kind of "virtual distribution environment" (called "VDE" in this document) that secures, administers, and audits electronic information use. VDE also features fundamentally important capabilities for managing content that travels "across" the "information highway." These capabilities comprise a rights protection solution that serves all electronic community members. These members include content creators and distributors, financial service providers, end-users, and others. VDE is the first general purpose, configurable, transaction control/rights protection solution for users of computers, other electronic appliances, networks, and the information highway.

A fundamental problem for electronic content providers is extending their ability to control the use of proprietary information. Content providers often need to limit use to authorized activities and amounts. Participants in a business model involving, for example, provision of movies and advertising on optical discs may include actors, directors, script and other writers, musicians, studios, publishers, distributors, retailers, advertisers, credit card services, and content end-users. These participants need the ability to embody their range of agreements and requirements, including use limitations, into an "extended" agreement comprising an overall electronic business model. This extended agreement is represented by electronic content control information that can automatically enforce agreed upon rights and obligations. Under VDE, such an extended agreement may comprise an electronic contract involving all business model participants. Such an agreement may alternatively, or in addition, be made up of electronic agreements between subsets of the business model participants. Through the use of VDE, electronic commerce can function in the same way as traditional commerce—that is commercial relationships regarding products and services can be shaped through the negotiation of one or more agreements between a variety of parties.

Commercial content providers are concerned with ensuring proper compensation for the use of their electronic information. Electronic digital information, for example a CD recording, can today be copied relatively easily and inexpensively. Similarly, unauthorized copying and use of software programs deprives rightful owners of billions of dollars in annual revenue according to the International Intellectual Property Alliance. Content providers and distributors have devised a number of limited function rights protection mechanisms to protect their rights. Authorization passwords and protocols, license servers, "lock/unlock" distribution methods, and non-electronic contractual limitations imposed on users of shrink-wrapped software are a few of the more prevalent content protection schemes. In a commercial context, these efforts are inefficient and limited solutions.

Providers of "electronic currency" have also created protections for their type of content. These systems are not sufficiently adaptable, efficient, nor flexible enough to support the generalized use of electronic currency. Furthermore, they do not provide sophisticated auditing and control configuration capabilities. This means that current electronic currency tools lack the sophistication needed for many real-world financial business models. VDE provides means for anonymous currency and for "conditionally" anonymous currency, wherein currency related activities remain anonymous except under special circumstances.

VDE Control Capabilities

VDE allows the owners and distributors of electronic digital information to reliably bill for, and securely control, audit, and budget the use of, electronic information. It can reliably detect and monitor the use of commercial information products. VDE uses a wide variety of different electronic information delivery means: including, for example, digital networks, digital broadcast, and physical storage media such as optical and magnetic disks. VDE can be used by major network providers, hardware manufacturers, owners of electronic information, providers of such information, and clearinghouses that gather usage information regarding, and bill for the use of, electronic information.

VDE provides comprehensive and configurable transaction management, metering and monitoring technology. It can change how electronic information products are protected, marketed, packaged, and distributed. When used, VDE should result in higher revenues for information providers and greater user satisfaction and value. Use of VDE will normally result in lower usage costs, decreased transaction costs, more efficient access to electronic information, re-usability of rights protection and other transaction management implementations, greatly improved flexibility in the use of secured information, and greater standardization of tools and processes for electronic transaction management. VDE can be used to create an adaptable environment that fulfills the needs of electronic information owners, distributors, and users; financial clearinghouses; and usage information analyzers and resellers.

Rights and Control Information

In general, the present invention can be used to protect the rights of parties who have:

(a) proprietary or confidentiality interests in electronic information. It can, for example, help ensure that information is used only in authorized ways;
(b) financial interests resulting from the use of electronically distributed information. It can help ensure that content providers will be paid for use of distributed information, and
(c) interests in electronic credit and electronic currency storage, communication, and/or use including electronic cash, banking, and purchasing.

Protecting the rights of electronic community members involves a broad range of technologies VDE combines these technologies in a way that creates a "distributed" electronic rights protection "environment." This environment secures and protects transactions and other processes important for rights protection. VDE, for example, provides the ability to prevent, or impede, interference with and/or observation of, important rights related transactions and processes. VDE, in its preferred embodiment, uses special purpose tamper resistant Secure Processing Units (SPUs) to help provide a high level of security for VDE processes and information storage and communication.

The rights protection problems solved by the present invention are electronic versions of basic societal issues. These issues include protecting property rights, protecting privacy rights, properly compensating people and organizations for their work and risk, protecting money and credit, and generally protecting the security of information VDE employs a system that uses a common set of processes to manage rights issues in an efficient, trusted, and cost-effective way.

VDE can be used to protect the rights of parties who create electronic content such as, for example: records, games, movies, newspapers, electronic books and reference materials, personal electronic mail, and confidential records and communications. The invention can also be used to protect the rights of parties who provide electronic products, such as publishers and distributors; the rights of parties who provide electronic credit and currency to pay for use of products, for example, credit clearinghouses and banks; the rights to privacy of parties who use electronic content (such as consumers, business people, governments); and the privacy rights of parties described by electronic information, such as privacy rights related to information contained in a medical record, tax record, or personnel record.

In general, the present invention can protect the rights of parties who have:

(a) commercial interests in electronically distributed information—the present invention can help ensure, for example, that parties, will be paid for use of distributed information in a, manner consistent with their agreement;
(b) proprietary and/or confidentiality interests in electronic information—the present invention can, for example, help ensure that data is used only in authorized ways;
(c) interests in electronic credit and electronic currency storage, communication, and/or use—this can include electronic cash, banking, and purchasing; and
(d) interests in electronic information derived, at least in part, from use of other electronic information.

VDE Functional Properties

VDE is a cost-effective and efficient rights protection solution that provides a unified, consistent system for securing and managing transaction processing. VDE can:

(a) audit and analyze the use of content,
(b) ensure that content is used only in authorized ways; and
(c) allow information regarding content usage to be used only in ways approved by content users.

In addition, VDE:

(a) is very configurable, modifiable, and re-usable;
(b) supports a wide range of useful capabilities that may be combined in different ways to accommodate most potential applications;
(c) operates on a wide variety of electronic appliances ranging from hand-held inexpensive devices to large mainframe computers;
(d) is able to ensure the various rights of a number of different parties, and a number of different rights protection schemes, simultaneously;

(e) is able to preserve the rights of parties through a series of transactions that may occur at different times and different locations;

(f) is able to flexibly accommodate different ways of securely delivering information and reporting usage; and (g) provides for electronic analogues to "real" money and credit, including anonymous electronic cash, to pay for products and services and to support personal (including home) banking and other financial activities.

VDE economically and efficiently fulfills the rights protection needs of electronic community members. Users of VDE will not require additional rights protection systems for different information highway products and rights problems—nor will they be required to install and learn a new system for each new information highway application.

VDE provides a unified solution that allows all content creators, providers, and users to employ the same electronic rights protection solution. Under authorized circumstances, the participants can freely exchange content and associated content control sets. This means that a user of VDE may, if allowed, use the same electronic system to work with different kinds of content having different sets of content control information. The content and control information supplied by one group can be used by people who normally use content and control information supplied by a different group. VDE can allow content to be exchanged "universally" and users of an implementation of the present invention can interact electronically without fear of incompatibilities in content control, violation of rights, or the need to get, install, or learn a new content control system.

The VDE securely administers transactions that specify protection of rights. It can protect electronic rights including, for example:

(a) the property rights of authors of electronic content, (b) the commercial rights of distributors of content, (c) the rights of any parties who facilitated the distribution of content, (d) the privacy rights of users of content, (e) the privacy rights of parties portrayed by stored and/or distributed content, and (f) any other rights regarding enforcement of electronic agreements.

The VDE can enable a very broad variety of electronically enforced commercial and societal agreements. These agreements can include electronically implemented contracts, licenses, laws, regulations, and tax collection.

Contrast with Traditional Solutions

Traditional content control mechanisms often require users to purchase more electronic information than the user needs or desires. For example, infrequent users of shrink-wrapped software are required to purchase a program at the same price as frequent users, even though they may receive much less value from their less frequent use. Traditional systems do not scale cost according to the extent or character of usage and traditional systems can not attract potential customers who find that a fixed price is too high. Systems using traditional mechanisms are also not normally particularly secure. For example, shrink-wrapping does not prevent the constant illegal pirating of software once removed from either its physical or electronic package.

Traditional electronic information rights protection systems are often inflexible and inefficient and may cause a content provider to choose costly distribution channels that increase a product's price. In general these mechanisms restrict product pricing, configuration, and marketing flexibility. These compromises are the result of techniques for controlling information which cannot accommodate both different content models and content models which reflect the many, varied requirements, such as content delivery strategies, of the model participants. This can limit a provider's ability to deliver sufficient overall value to justify a given product's cost in the eyes of many potential users. VDE allows content providers and distributors to create applications and distribution networks that reflect content providers' and users' preferred business models. It offers users a uniquely cost effective and feature rich system that supports the ways providers want to distribute information and the ways users want to use such information. VDE supports content control models that ensure rights and allow content delivery strategies to be shaped for maximum commercial results.

Chain of Handling and Control

VDE can protect a collection of rights belonging to various parties having in rights in, or to, electronic information. This information may be at one location or dispersed across (and/or moving between) multiple locations. The information may pass through a "chain" of distributors and a "chain" of users. Usage information may also be reported through one or more "chains" of parties. In general, VDE enables parties that (a) have rights in electronic information, and/or (b) act as direct or indirect agents for parties who have rights in electronic information, to ensure that the moving, accessing, modifying, or otherwise using of information can be securely controlled by rules regarding how, when, where, and by whom such activities can be performed.

VDE Applications and Software

VDE is a secure system for regulating electronic conduct and commerce. Regulation is ensured by control information put in place by one or more parties. These parties may include content providers, electronic hardware manufacturers, financial service providers, or electronic "infrastructure" companies such as cable or telecommunications companies. The control information implements "Rights Applications." Rights applications "run on" the "base software" of the preferred embodiment. This base software serves as a secure, flexible, general purpose foundation that can accommodate many different rights applications, that is, many different business models and their respective participant requirements.

A rights application under VDE is made up of special purpose pieces, each of which can correspond to one or more basic electronic processes needed for a rights protection environment. These processes can be combined together like building blocks to create electronic agreements that can protect the rights, and may enforce fulfillment of the obligations, of electronic information users and providers. One or more providers of electronic information can easily combine selected building blocks to create a rights application that is unique to a specific content distribution model. A group of these pieces can represent the capabilities needed to fulfill the agreement(s) between users and providers. These, pieces accommodate many requirements of electronic commerce including:

the distribution of permissions to use electronic information;

the persistence of the control information and sets of control information managing these permissions;

configurable control set information that can be selected by users for use with such information, data security and usage auditing of electronic information, and a secure system for currency, compensation and debit management.

For electronic commerce, a rights application, under the preferred embodiment of the present invention, can provide electronic enforcement of the business agreements between all participants. Since different groups of components can be put together for different applications, the present invention can provide electronic control information for a wide variety of different products and markets. This means the present invention can provide a "unified," efficient, secure, and cost-effective system for electronic commerce and data security. This allows VDE to serve as a single standard for electronic rights protection, data security, and electronic currency and banking.

In a VDE, the separation between a rights application and its foundation permits the efficient selection of sets of control information that are appropriate for each of many different types of applications and uses. These control sets can reflect both rights of electronic community members, as well as obligations (such as providing a history of one's use of a product or paying taxes on one's electronic purchases). VDE flexibility allows its users to electronically implement and enforce common social and commercial ethics and practices. By providing a unified control system, the present invention supports a vast range of possible transaction related interests and concerns of individuals, communities, businesses, and governments. Due to its open design, VDE allows (normally under securely controlled circumstances) applications using technology independently created by users to be "added" to the system and used in conjunction with the foundation of the invention. In sum, VDE provides a system that can fairly reflect and enforce agreements among parties. It is a broad ranging and systematic solution that answers the pressing need for a secure, cost-effective, and fair electronic environment.

VDE Implementation

The preferred embodiment of the present invention includes various tools that enable system designers to directly insert VDE capabilities into their products. These tools include an Application Programmer's Interface ("API") and a Rights Permissioning and Management Language ("RPML"). The RPML provides comprehensive and detailed control over the use of the invention's features. VDE also includes certain user interface subsystems for satisfying the needs of content providers, distributors, and users.

Information distributed using VDE may take many forms. It may, for example, be "distributed" for use on an individual's own computer, that is the present invention can he used to provide security for locally stored data. Alternatively, VDE may be used with information that is dispersed by authors and/or publishers to one or more recipients. This information may take many forms including: movies, audio recordings, games, electronic catalog shopping, multimedia, training materials, E-mail and personal documents, object oriented libraries, software programming resources, and reference/record keeping information resources (such as business, medical, legal, scientific, governmental, and consumer databases).

Electronic rights protection provided by the present invention will also provide an important foundation for trusted and efficient home and commercial banking, electronic credit processes, electronic purchasing, true or conditionally anonymous electronic cash, and EDI (Electronic Data Interchange). VDE provides important enhancements for improving data security in organizations by providing "smart" transaction management features that can be far more effective than key and password based "go/no go" technology.

VDE normally employs an integration of cryptographic and other security technologies (e.g. encryption, digital signatures, etc.), with other technologies including: component, distributed, and event driven operating system technology, and related communications, object container, database, smart agent, smart card, and semiconductor design technologies.

I. Overview

A. VDE Solves Important Problems and Fills Critical Needs

The world is moving towards an integration of electronic information appliances. This interconnection of appliances provides a foundation for much greater electronic interaction and the evolution of electronic commerce. A variety of capabilities are required to implement an electronic commerce environment. VDE is the first system that provides many of these capabilities and therefore solves fundamental problems related to electronic dissemination of information Electronic Content VDE allows electronic arrangements to be created involving two or more parties. These agreements can themselves comprise a collection of agreements between participants in a commercial value chain and/or a data security chain model for handling, auditing, reporting, and payment. It can provide efficient, reusable, modifiable, and consistent means for secure electronic content: distribution, usage control, usage payment, usage auditing, and usage reporting. Content may, for example, include:

- financial information such as electronic currency and credit;
- commercially distributed electronic information such as reference databases, movies, games, and advertising and
- electronic properties produced by persons and organizations, such as documents, e-mail, and proprietary database information.

VDE enables an electronic commerce marketplace that supports differing, competitive business partnerships, agreements, and evolving overall business models.

The features of VDE allow it to function as the first trusted electronic information control environment that can conform to, and support, the bulk of conventional electronic commerce and data security requirements. In particular, VDE enables the participants in a business value chain model to create an electronic version of traditional business agreement terms and conditions and further enables these participants to shape and evolve their electronic commerce models as they believe appropriate to their business requirements.

VDE offers an architecture that avoids reflecting specific distribution biases, administrative and control perspectives, and content types. Instead, VDE provides a broad-spectrum, fundamentally configurable and portable, electronic transaction control, distributing, usage, auditing, reporting, and payment operating environment. VDE is not limited to being an application or application specific toolset that covers only a limited subset of electronic interaction activities and participants. Rather, VDE supports systems by which such applications can be created, modified, and/or reused. As a result, the present invention answers pressing, unsolved needs by offering a system that supports a standardized control environment which facilitates interoperability of electronic appliances, interoperability of content containers, and efficient creation of electronic commerce applications and models through the use of a programmable, secure electronic transactions management foundation and reusable and extensible executable components. VDE can support a single electronic "world" within which most forms of electronic transaction activities can be managed.

To answer the developing needs of rights owners and content providers and to provide a system that can accommodate the requirements and agreements of all parties that may be involved in electronic business models (creators, distributors, administrators, users, credit providers, etc.), VDE supplies an efficient, largely transparent, low cost and sufficiently secure system (supporting both hardware/software and software only models). VDE provides the widely varying secure control and administration capabilities required for:

1. Different types of electronic content,
2. Differing electronic content delivery schemes,
3. Differing electronic content usage schemes,
4. Different content usage platforms, and
5. Differing content marketing and model strategies.

VDE may be combined with, or integrated into, many separate computers and/or other electronic appliances. These appliances typically include a secure subsystem that can enable control of content use such as displaying, encrypting, decrypting, printing, copying, saving, extracting, embedding, distributing, auditing usage, etc. The secure subsystem in the preferred embodiment comprises one or more "protected processing environments", one or more secure databases, and secure "component assemblies" and other items and processes that need to be kept secured. VDE can, for example, securely control electronic currency, payments, and/or credit management (including electronic credit and/or currency receipt, disbursement, encumbering, and/or allocation) using such a "secure subsystem."

VDE provides a secure, distributed electronic transaction management system for controlling the distribution and/or other usage of electronically provided and/or stored information. VDE controls auditing and reporting of electronic content and/or appliance usage. Users of VDE may include content creators who apply content usage, usage reporting, and/or usage payment related control information to electronic content and/or appliances for users such as end-user organizations, individuals, and content and/or appliance distributors. VDE also securely supports the payment of money owed (including money owed for content and/or appliance usage) by one or more parties to one or more other parties, in the form of electronic credit and/or currency.

Electronic appliances under control of VDE represent VDE 'nodes' that securely process and control; distributed electronic information and/or appliance usage, control information formulation, and related transactions. VDE can securely manage the integration of control information provided by two or more parties. As a result, VDE can construct an electronic agreement between VDE participants that represent a "negotiation" between, the control requirements of, two or more parties and enacts terms and conditions of a resulting agreement. VDE ensures the rights of each party to an electronic agreement regarding a wide range of electronic activities related to electronic information and/or appliance usage.

Through use of VDE's control system, traditional content providers and users can create electronic relationships that reflect traditional, non-electronic relationships. They can shape and modify commercial relationships to accommodate the evolving needs of, and agreements among, themselves. VDE does not require electronic content providers and users to modify their business practices and personal preferences to conform to a metering and control application program that supports limited, largely fixed functionality. Furthermore, VDE permits participants to develop business models not feasible with non-electronic commerce, for example, involving detailed reporting of content usage information, large numbers of distinct transactions at hitherto infeasibly low price points, "pass-along" control information that is enforced without involvement or advance knowledge of the participants, etc.

The present invention allows content providers and users to formulate their transaction environment to accommodate:

(1) desired content models, content control models, and content usage information pathways,
(2) a complete range of electronic media and distribution means,
(3) a broad range of pricing, payment, and auditing strategies,
(4) very flexible privacy and/or reporting models,
(5) practical and effective security architectures, and
(6) other administrative procedures that together with steps (1) through (5) can enable most "real world" electronic commerce and data security models, including models unique to the electronic world.

VDE's transaction management capabilities can enforce:

(1) privacy rights of users related to information regarding their usage of electronic information and/or appliances,
(2) societal policy such as laws that protect rights of content users or require the collection of taxes derived from electronic transaction revenue, and
(3) the proprietary and/or other rights of parties related to ownership of, distribution of, and/or other commercial rights related to, electronic information.

VDE can support "real" commerce in an electronic form, that is the progressive creation of commercial relationships that form, over time, a network of interrelated agreements representing a value chain business model. This is achieved in part by enabling content control information to develop through the interaction of (negotiation between) securely created and independently submitted sets of content and/or appliance control information. Different sets of content and/or appliance control information can be submitted by different parties in an electronic business value chain enabled by the present invention. These parties create control information sets through the use of their respective VDE installations. Independently, securely deliverable, component based control information allows efficient interaction among control information sets supplied by different parties.

VDE permits multiple, separate electronic arrangements to be formed between subsets of parties in a VDE supported electronic value chain model. These multiple agreements together comprise a VDE value chain "extended" agreement. VDE allows such constituent electronic agreements, and therefore overall VDE extended agreements, to evolve and reshape over time as additional VDE participants become involved in VDE content and/or appliance control information handling. VDE electronic agreements may also be extended as new control information is submitted by existing participants. With VDE, electronic commerce participants are free to structure and restructure their electronic commerce business activities and relationships. As a result, the present invention allows a competitive electronic commerce marketplace to develop since the use of VDE enables different, widely varying business models using the same or shared content.

A significant facet of the present invention's ability to broadly support electronic commerce is its ability to securely manage independently delivered VDE component objects containing control information (normally in the form of VDE objects containing one or more methods, data, or load module VDE components). This independently delivered control information can be integrated with senior and other pre-existing content control information to securely form derived control information using the negotiation mechanisms of the present invention. All requirements specified by this derived control information must be satisfied before VDE controlled content can be accessed or otherwise used. This means that, for example, all load modules and any mediating data which are listed by the derived control information as required must be available and securely perform their required function. In combination with other aspects of the present invention, securely, independently delivered control components allow electronic commerce participants to freely stipulate their business requirements and trade offs. As a result, much as with traditional, non-electronic commerce, the present invention allows electronic commerce (through a progressive stipulation of various control requirements by VDE participants) to evolve into forms of business that are the most efficient, competitive and useful.

VDE provides capabilities that rationalize the support of electronic commerce and electronic transaction management. This rationalization stems from the reusability of control structures and user interfaces for a wide variety of transaction management related activities. As a result, content usage control, data security, information auditing, and electronic financial activities, can be supported with tools that are reusable, convenient, consistent, and familiar. In addition, a rational approach—a transaction/distribution control standard—allows all participants in VDE the same foundation set of hardware control and security, authoring, administration, and management tools to support widely varying types of information, business market model, and/or personal objectives.

Employing VDE as a general purpose electronic transaction/distribution control system allows users to maintain a single transaction management control arrangement on each of their computers, networks, communication nodes, and/or other electronic appliances. Such a general purpose system can serve the needs of many electronic transaction management applications without requiring distinct, different installations for different purposes. As a result, users of VDE can avoid the confusion and expense and other inefficiencies of different, limited purpose transaction control applications for each different content and/or business model. For example, VDE allows content creators to use the same VDE foundation control arrangement for both content authoring and for licensing content from other content creators for inclusion into their products or for other use. Clearinghouses, distributors, content creators, and other VDE users can all interact, both with the applications running on their VDE installations, and with each other, in an entirely consistent manner, using and reusing (largely transparently) the same distributed tools, mechanisms, and consistent user interfaces, regardless of the type of VDE activity.

VDE prevents many forms of unauthorized use of electronic information, by controlling and auditing (and other administration of use) electronically stored and/or disseminated information. This includes, for example, commercially distributed content, electronic currency, electronic credit, business transactions (such as EDI), confidential communications, and the like. VDE can further be used to enable commercially provided electronic content to be made available to users in user defined portions, rather than constraining the user to use portions of content that were "predetermined" by a content creator and/or other provider for billing purposes.

VDE, for example, can employ:

(1) Secure metering means for budgeting and/or auditing electronic content and/or appliance usage;

(2) Secure flexible means for enabling compensation and/or billing rates for content and/or appliance usage, including electronic credit and/or currency mechanisms for payment means;

(3) Secure distributed database means for storing control and usage related information (and employing validated compartmentalization and tagging schemes);

(4) Secure electronic appliance control means;

A distributed, secure, "virtual black box" comprised of nodes located at every user (including VDE content container creators, other content providers, client users, and recipients of secure VDE content usage information) site. The nodes of said virtual black box normally include a secure subsystem having at least one secure hardware element (a semiconductor element or other hardware module for securely executing VDE control processes), said secure subsystems being distributed at nodes along a pathway of information storage, distribution, payment, usage, and/or auditing. In some embodiments, the functions of said hardware element, for certain or all nodes, may be performed by software, for example, in host processing environments of electronic appliances;

(6) Encryption and decryption means;

(7) Secure communications means employing authentication, digital signaturing, and encrypted transmissions. The secure subsystems at said user nodes utilize a protocol that establishes and authenticates each node's and/or participant's identity, and establishes one or more secure host-to-host encryption keys for communications between the secure subsystems; and (8) Secure control means that can allow each VDE installation to perform VDE content authoring (placing content into VDE containers with associated control information), content distribution, and content usage; as well as clearinghouse and other administrative and analysis activities employing content usage information.

VDE may be used to migrate most non-electronic, traditional information delivery models (including entertainment, reference materials, catalog shopping, etc.) into an adequately secure digital distribution and usage management and payment context. The distribution and financial pathways managed by a VDE arrangement may include:

content creator(s),
distributor(s),
redistributor(s),
client administrator(s),
client user(s),
financial and/or other clearinghouse(s),
and/or government agencies.

These distribution and financial pathways may also include:

advertisers,
market survey organizations, and/or
other parties interested in the user usage of information securely delivered and/or stored using VDE.

Normally, participants in a VDE arrangement will employ the same secure VDE foundation. Alternate embodiments support VDE arrangements employing differing VDE foundations. Such alternate embodiments may employ procedures to ensure certain interoperability requirements are met.

Secure VDE hardware (also known as SPUs for Secure Processing Units), or VDE installations that use software to substitute for, or complement, said hardware (provided by Host Processing Environments (HPEs)), operate in conjunction with secure communications, systems integration software, and distributed software control information and support structures, to achieve the electronic contract/rights protection environment of the present invention. Together, these VDE components comprise a secure, virtual, distributed content and/or appliance control, auditing (and other administration), reporting, and payment environment. In some embodiments and where commercially acceptable, certain VDE participants, such as clearinghouses that normally maintain sufficiently physically secure non-VDE processing environments, may be allowed to employ HPEs rather VDE hardware elements and interoperate, for example, with VDE end-users and content providers. VDE components together comprise a configurable, consistent, secure and "trusted" architecture for distributed, asynchronous control of electronic content and/or appliance usage. VDE supports a "universe wide" environment for electronic content delivery, broad dissemination, usage reporting, and usage related payment activities.

VDE provides generalized configurability. This results, in part, from decomposition of generalized requirements for supporting electronic commerce and data security into a broad range of constituent "atomic" and higher level components (such as load modules, data elements, and methods) that may be variously aggregated together to form control methods for electronic commerce applications, commercial electronic agreements, and data security arrangements. VDE provides a secure operating environment employing VDE foundation elements along with secure independently deliverable VDE components that enable electronic commerce models and relationships to develop. VDE specifically supports the unfolding of distribution models in which content providers, over time, can expressly agree to, or allow, subsequent content providers and/or users to participate in shaping the control information for, and consequences of use of electronic content and/or appliances. A very broad range of the functional attributes important for supporting simple to very complex electronic commerce and data security activities are supported by capabilities of the present invention. As a result, VDE supports most types of electronic information and/or appliance: usage control (including distribution), security, usage auditing, reporting, other administration, and payment arrangements.

VDE, in its preferred embodiment, employs object software technology and uses object technology to form "containers" for delivery of information that is (at least in part) encrypted or otherwise secured. These containers may contain electronic content products or other electronic information and some or all of their associated permissions (control) information. These container objects may be distributed along pathways involving content providers and/or content users. They may be securely moved among nodes of a Virtual Distribution Environment (VDE) arrangement, which nodes operate VDE foundation software and execute control methods to enact electronic information usage control and/or administration models. The containers delivered through use of the preferred embodiment of the present invention may be employed both for distributing VDE control instructions (information) and/or to encapsulate and electronically distribute content that has been at least partially secured.

Content providers who employ the present invention may include, for example, software application and game publishers, database publishers, cable, television, and radio broadcasters, electronic shopping vendors, and distributors of information in electronic document, book, periodical, e-mail and/or other forms. Corporations, government agencies, and/or individual "end-users" who act as storers of, and/or distributors of, electronic information, may also be VDE content providers (in a restricted model, a user provides content only to himself and employs VDE to secure his own confidential information against unauthorized use by other parties). Electronic information may include proprietary and/or confidential information for personal or internal organization use, as well as information, such as software applications, documents, entertainment materials, and/or reference information, which may be provided to other parties. Distribution may be by, for example, physical media delivery, broadcast and/or telecommunication means, and in the form of "static" files and/or streams of data. VDE may also be used, for example, for multi-site "real-time" interaction such as teleconferencing, interactive games, or on-line bulletin boards, where restrictions on, and/or auditing of, the use of all or portions of communicated information is enforced.

VDE provides important mechanisms for both enforcing commercial agreements and enabling the protection of privacy rights. VDE can securely deliver information from one party to another concerning the use of commercially distributed electronic content. Even if parties are separated by several "steps" in a chain (pathway) of handling for such content usage information, such information is protected by VDE through encryption and/or other secure processing. Because of that protection, the accuracy of such information is guaranteed by VDE, and the information can be trusted by all parties to whom it is delivered. Furthermore, VDE guarantees that all parties can trust that such information cannot be received by anyone other than the intended, authorized, party(ies) because it is encrypted such that only an authorized party, or her agents, can decrypt it. Such information may also be derived through a secure VDE process at a previous pathway-of-handling location to produce secure VDE reporting information that is then communicated securely to its intended recipient's VDE secure subsystem. Because VDE can deliver such information securely, parties to an electronic agreement need not trust the accuracy of commercial usage and/or other information delivered through means other than those under control of VDE.

VDE participants in a commercial value, chain can be "commercially" confident (that is, sufficiently confident for commercial purposes) that the direct (constituent) and/or "extended" electronic agreements they entered into through the use of VDE can be enforced reliably. These agreements may have both "dynamic" transaction management related, aspects, such as content usage control information enforced through budgeting, metering, and/or reporting of electronic information and/or appliance use, and/or they may include "static" electronic assertions, such as an end-user using the system to assert his or her agreement to pay for services, not to pass to unauthorized parties electronic information derived from usage of content or systems, and/or agreeing to observe copyright laws. Not only can electronically reported transaction related information be trusted under the present invention, but payment may be automated by, the passing of payment tokens through a pathway of payment (which may or may not be the same as a pathway for reporting). Such payment can be contained within a VDE container created automatically by a VDE installation in response to control information (located, in the preferred embodiment, in one or more permissions records) stipulating the "withdrawal" of credit or electronic currency (such as tokens) from an electronic account (for example, an account securely maintained by a user's VDE installation secure subsystem) based upon usage of VDE controlled electronic content and/or appliances (such as governments, financial credit providers, and users).

VDE allows the needs of electronic commerce participants to be served and it can bind such participants together in a universe wide, trusted commercial network that can be secure enough to support very large amounts of commerce. VDE's security and metering secure subsystem core will be present at all physical locations where VDE related content is (a) assigned usage related control information (rules and mediating data), and/or (b) used. This core can perform security and auditing functions (including metering) that operate within a "virtual black box," a collection of distributed, very secure VDE related hardware instances that are interconnected by secured information exchange (for example, telecommunication) processes and distributed database means. VDE further includes highly configurable transaction operating system technology, one or more associated libraries of load modules along with affiliated data, VDE related administration, data preparation, and analysis applications, as well as system software designed to enable VDE integration into host environments and applications. VDE's usage control information, for example, provide for property content and/or appliance related: usage authorization, usage auditing (which may include audit reduction), usage billing, usage payment, privacy filtering, reporting, and security related communication and encryption techniques.

VDE extensively employs methods in the form of software objects to augment configurability, portability, and security of the VDE environment. It also employs a software object architecture for VDE content containers that carries protected content and may also carry both freely available information (e.g, summary, table of contents) and secured content control information which ensures the performance of control information. Content control information governs content usage according to criteria set by holders of rights to an object's contents and/or according to parties who otherwise have rights associated with distributing such content (such as governments, financial credit providers, and users).

In part, security is enhanced by object methods employed by the present invention because the encryption schemes used to protect an object can efficiently be further used to protect the associated content control information (software control information and relevant data) from modification. Said object techniques also enhance portability between various computer and/or other appliance environments because electronic information in the form of content can be inserted along with (for example, in the same object container as) content control information (for said content) to produce a "published" object. As a result, various portions of said control information may be specifically adapted for different environments, such as for diverse computer platforms and operating systems, and said various portions may all be carried by a VDE container.

An objective of VDE is supporting a transaction/distribution control standard. Development of such a standard has many obstacles, given the security requirements and related hardware and communications issues, widely differing environments, information types, types of information usage, business and/or data security goals, varieties of participants, and properties of delivered information. A significant feature of VDE accommodates the many, varying distribution and other transaction variables by, in part, decomposing electronic commerce and data security functions into generalized capability modules executable within a secure hardware SPU and/or corresponding software subsystem and further allowing extensive flexibility in assembling, modifying, and/or replacing, such modules (e.g. load modules and/or methods) in applications run on a VDE installation foundation. This configurability and reconfigurability allows electronic commerce and data security participants to reflect their priorities and requirements through a process of iteratively shaping an evolving extended electronic agreement (electronic control model). This shaping can occur as content control information passes from one VDE participant to another and to the extent allowed by "in place" content control information. This process allows users of VDE to recast existing control information and/or add new control information as necessary (including the elimination of no longer required elements).

VDE supports trusted (sufficiently secure) electronic information distribution and usage control models for both commercial electronic content distribution and data security applications. It can be configured to meet the diverse requirements of a network of interrelated participants that may include content creators, content distributors, client administrators, end users, and/or clearinghouses and/or other content usage information users. These parties may constitute a network of participants involved in simple to complex electronic content dissemination, usage control, usage reporting, and/or usage payment. Disseminated content may include both originally provided and VDE generated information (such as content usage information) and content control information may persist through both chains (one or more pathways) of content and content control information handling, as well as the direct usage of content. The configurability provided by the present invention is particularly critical for supporting electronic commerce, that is enabling businesses to create relationships and evolve strategies that offer, competitive value. Electronic commerce tools that are not inherently configurable and interoperable will ultimately fail to produce products (and services) that meet both basic requirements and evolving needs of most commerce applications.

VDE's fundamental configurability will allow a broad range of competitive electronic commerce business models to flourish. It allows business models to be shaped to maximize revenues sources, end-user product value, and operating efficiencies. VDE can be employed to support multiple, differing models, take advantage of new revenue opportunities, and deliver product configurations most desired by users. Electronic commerce technologies that do not, as the present invention does:

support a broad range of possible, complementary revenue activities, offer a flexible array of content usage features most desired by customers, and exploit opportunities for operating efficiencies, will result in products that are often intrinsically more costly and less appealing and therefore less competitive in the marketplace.

Some of the key factors contributing to the configurability intrinsic to the present invention include:

(a) integration into the fundamental control environment of a broad range of electronic appliances through portable API and programming language tools that efficiently support merging of control and auditing capabilities in nearly any electronic appliance environment while maintaining overall system security;

(b) modular data structures;

(c) generic content model;

(d) general modularity and independence of foundation architectural components;

(e) modular security structures;

(f) variable length and multiple branching chains of control; and (g) independent, modular control structures in the form of executable load modules that can be maintained in one or more libraries, and assembled into control methods and models, and where such model control schemes can "evolve" as control information passes through the VDE installations of participants of a pathway of VDE content control information handling.

Because of the breadth of issues resolved by the present invention, it can provide the emerging "electronic highway" with a single transaction/distribution control system that can, for a very broad range of commercial and data security models, ensure against unauthorized use of confidential and/or proprietary information and commercial electronic transactions. VDE's electronic transaction management mechanisms can enforce the electronic rights and agreements of all parties participating in widely varying business and data security models, and this can be efficiently achieved through a single VDE implementation within each VDE participant's electronic appliance. VDE supports widely varying business and/or data security models that can involve a broad range of participants at various "levels" of VDE content and/or content control information pathways of handling. Different content control and/or auditing models and agreements may be available on the same VDE installation. These models and agreements may control content in relationship to, for example, VDE installations and/or users in general; certain specific users, installations, classes and/or other groupings of installations and/or users; as well as to electronic content generally on a given installation, to specific properties, property portions, classes and/or other groupings of content.

Distribution using VDE may package both the electronic content and control information into the same VDE container, and/or may involve the delivery to an end-user site of different pieces of the same VDE managed property from plural separate remote locations and/or in plural separate VDE content containers and/or employing plural different delivery means. Content control information may be partially or fully delivered separately from its associated content to a user VDE installation in one or more VDE administrative objects. Portions of said control information may be delivered from one or more sources. Control information may also be available for use by access from a users VDE installation secure subsystem to one or more remote VDE secure sub-systems and/or VDE compatible, certified secure remote locations. VDE control processes such as metering, budgeting, decrypting and/or fingerprinting, may as relates to a certain user content usage activity, be performed in a user's local VDE installation secure subsystem, or said processes may be divided amongst plural secure subsystems which may be located in the same user VDE installations and/or in a network server and in the user installation. For example, a local VDE installation may perform decryption and save any, or all of, usage metering information related to content and/or electronic appliance usage at such user installation could be performed at the server employing secure (e.g., encrypted) communications between said secure subsystems. Said server location may also be used for near real time, frequent, or more periodic secure receipt of content usage information from said user installation, with, for example, metered information being maintained only temporarily at a local user installation.

Delivery means for VDE managed content may include electronic data storage means such as optical disks for delivering one portion of said information and broadcasting and/or telecommunicating means for other portions of said information. Electronic data storage means may include magnetic media, optical media, combined magneto-optical systems, flash RAM memory, bubble memory, and/or other memory storage means such as huge capacity optical storage systems employing holographic, frequency, and/or polarity data storage techniques. Data storage means may also employ layered disc techniques, such as the use of generally transparent and/or translucent materials that pass light through layers of data carrying discs which themselves are physically packaged together as one thicker disc. Data carrying locations on such discs may be, at least in part, opaque.

VDE supports a general purpose foundation for secure transaction management, including usage control, auditing, reporting, and/or payment. This general purpose foundation is called "VDE Functions" ("VDEFs"). VDE also supports a collection of "atomic" application elements (e.g., load modules) that can be selectively aggregated together to form various VDEF capabilities called control methods and which serve as VDEF applications and operating system functions. When a host operating environment of an electronic appliance includes VDEF capabilities, it is called a "Rights Operating System" (ROS) VDEF load modules, associated data, and methods form a body of information that for the purposes of the present invention are called "control information." VDEF control information may be specifically associated with one or more pieces of electronic content and/or it may be employed as a general component of the operating system capabilities of a VDE installation.

VDEF transaction control elements reflect and enact content specific and/or more generalized administrative (for example, general operating system) control information. VDEF capabilities which can generally take the form of applications (application models) that have more or less configurability which can be shaped by VDE participants, through the use, for example, of VDE templates, to employ specific capabilities, along, for example, with capability parameter data to reflect the elements of one or more express electronic agreements between VDE participants in regards to the use of electronic content such as commercially distributed products. These control capabilities manage the use of, and/or auditing of use of, electronic content, as well as reporting information based upon content use, and any payment for said use. VDEF capabilities may "evolve" to reflect the requirements of one or more successive parties who receive or otherwise contribute to a given set of control information. Frequently, for a VDE application for a given content model (such as distribution of entertainment on CD-ROM, content delivery from an Internet repository, or electronic catalog shopping and advertising, or some combination of the above) participants would be able to securely select from amongst available, alternative control methods and apply related parameter data, wherein such selection of control method and/or submission of data would constitute their "contribution" of control information. Alternatively, or in addition, certain control methods that have been expressly certified as securely interoperable and compatible with said application may be independently submitted by a participant as part of such a contribution. In the most general example, a generally certified load module (certified for a given VDE arrangement and/or content class) may be used with many or any VDE application that operates in nodes of said arrangement. These parties, to the extent they are allowed, can independently and securely add, delete, and/or otherwise modify the specification of load modules and methods, as well as add, delete or otherwise modify related information.

Normally the party who creates a VDE content container defines the general nature of the VDEF capabilities that will and/or may apply to certain electronic information. A VDE content container is an object that contains both content (for example, commercially distributed electronic information products such as computer software programs, movies, electronic publications or reference materials,. etc.) and certain control information related to the use of the object's content. A creating party may make a VDE container available to other parties. Control information delivered by, and/or otherwise available for use with, VDE content containers comprise (for commercial content distribution purposes) VDEF control capabilities (and any associated parameter data) for electronic content. These capabilities may constitute one or more "proposed" electronic agreements (and/or agreement functions available for selection and/or use with parameter data) that manage the use and/or the consequences of use of such content and which can enact the terms and conditions of agreements involving multiple parties and their various rights and obligations.

A VDE electronic agreement may be explicit, through a user interface acceptance by one or more parties, for example by a "junior" party who has received control information from a "senior" party, or it may be a process amongst equal parties who individually assert their agreement. Agreement may also result from an automated electronic process during which terms and conditions are "evaluated" by certain VDE participant control information that assesses whether certain other electronic terms and conditions attached to content and/or submitted by another party are acceptable (do not violate acceptable control information criteria). Such an evaluation process may be quite simple, for example a comparison to ensure compatibility between a portion of, or all senior, control terms and conditions in a table of terms and conditions and the submitted control information of a subsequent participant in a pathway of content control information handling, or it may be a more elaborate process that evaluates the potential outcome of, and/or implements a negotiation process between, two or more sets of control information submitted by two or more parties. VDE also accommodates a semi-automated process during which one or more VDE participants directly, through user interface means, resolve "disagreements" between control information sets by accepting and/or proposing certain control information that may be acceptable to control information representing one or more other parties interests and/or responds to certain user interface queries for selection of certain alternative choices and/or for certain parameter information, the responses being adopted if acceptable to applicable senior control information.

When another party (other than the first applier of rules), perhaps through a negotiation process, accepts, and/or adds to and/or otherwise modifies, "in place" content control information, a VDE agreement between two or more parties related to the use of such electronic content may be created (so long as any modifications are consistent with senior control information). Acceptance of terms and conditions related to certain electronic content may be direct and express, or it may be implicit as a result of use of content (depending, for example, on legal requirements, previous exposure to such terms and conditions, and requirements of in place control information).

VDEF capabilities may be employed, and a VDE agreement may be entered into, by a plurality of parties without the VDEF capabilities being directly associated with the controlling of certain, specific electronic information. For example, certain one or more VDEF capabilities may be present at a VDE installation, and certain VDE agreements may have been entered into during the registration process for a content distribution application, to be used by such installation for securely controlling VDE content usage, auditing, reporting and/or payment. Similarly, a specific VDE participant may enter into a VDE user agreement with a VDE content or electronic appliance provider when the user and/or her appliance register with such provider as a VDE installation and/or user. In such events, VDEF in place control information available to the user VDE installation may require that certain VDEF methods are employed, for example in a certain sequence, in order to be able to use all and/or certain classes, of electronic content and/or VDE applications.

VDE ensures that certain prerequisites necessary for a given transaction to occur are met. This includes the secure execution of any required load modules and the availability of any required, associated data. For example, required load modules and data (e.g. in the form of a method) might specify that sufficient credit from an authorized source must be confirmed as available. It might further require certain one or more load modules execute as processes at an appropriate time to ensure that such credit will be used in order to pay for user use of the content. A certain content provider might, for example, require metering the number of copies made for distribution to employees of a given software program (a portion of the program might be maintained in encrypted form and require the presence of a VDE installation to run). This would require the execution of a metering method for copying of the property each time a copy was made for another employee. This same provider might also charge fees based on the total number of different properties licensed from them by the user and a metering history of their licensing of properties might be required to maintain this information.

VDE provides organization, community, and/or universe wide secure environments whose integrity is assured by processes securely controlled in VDE participant user installations (nodes). VDE installations, in the preferred embodiment, may include both software and tamper resistant hardware semiconductor elements. Such a semiconductor arrangement comprises, at least in part, special purpose circuitry that has been designed to protect against tampering with, or unauthorized observation of, the information and functions used in performing the VDE's control functions. The special purpose secure circuitry provided by the present invention includes at least one of a dedicated semiconductor arrangement known as a Secure Processing Unit (SPU) and/or a standard microprocessor, microcontroller, and/or other processing logic that accommodates the requirements of the present invention and functions as an SPU. VDE's secure hardware may be found incorporated into, for example, a fax/modem chip or chip pack, I/O controller, video display controller, and/or other available digital processing arrangements. It is anticipated that portions of the present invention's VDE secure hardware capabilities may ultimately be standard design elements of central processing units (CPUs) for computers and various other electronic devices.

Designing VDE capabilities into one or more standard microprocessor, microcontroller and/or other digital processing components may materially reduce VDE related hardware costs by employing the same hardware resources for both the transaction management uses contemplated by the present invention and for other, host electronic appliance functions. This means that a VDE SPU can employ (share) circuitry elements of a "standard" CPU. For example, if a "standard" processor can operate in protected mode and can execute VDE related instructions as a protected activity, then such an embodiment may provide sufficient hardware security for a variety of applications and the expense of a special purpose processor might be avoided. Under one preferred embodiment of the present invention, certain memory (e.g., RAM, ROM, NVRAM) is maintained during VDE related instruction processing in a protected mode (for example, as supported by protected mode microprocessors). This memory is located in the same package as the processing logic (e.g. processor). Desirably, the packaging and memory of such a processor would be designed using security techniques that enhance its resistance to tampering.

The degree of overall security of the VDE system is primarily dependent on the degree of tamper resistance and concealment of VDE control process execution and related data storage activities. Employing special purpose semiconductor packaging techniques can significantly contribute to the degree of security. Concealment and tamper-resistance in semiconductor memory (e.g., RAM, ROM, NVRAM) can be achieved, in part, by employing such memory within an SPU package, by encrypting data before it is sent to external memory (such as an external RAM package) and decrypting encrypted data within the CPU/RAM package before it is executed. This process is used for important VDE related data when such data is stored on unprotected media, for example, standard host storage, such as random access memory, mass storage, etc. In that event, a VDE SPU would encrypt data that results from a secure VDE execution before such data was stored in external memory.

SUMMARY OF SOME IMPORTANT FEATURES PROVIDED BY VDE IN ACCORDANCE WITH THE PRESENT INVENTION

VDE employs a variety of capabilities that serve as a foundation for a general purpose, sufficiently secure distributed electronic commerce solution. VDE enables an electronic commerce marketplace that supports divergent, competitive business partnerships, agreements, and evolving overall business models. For example, VDE includes features that:

"sufficiently" impede unauthorized and/or uncompensated use of electronic information and/or appliances through the use of secure communication, storage, and transaction management technologies. VDE supports a model wide, distributed security implementation which creates a single secure "virtua1" transaction processing and information storage environment. VDE enables distributed VDE installations to securely store and communicate information and remotely control the execution processes and the character of use of electronic information at other VDE installations and in a wide variety of ways;

support low-cost, efficient, and effective security architectures for transaction control, auditing, reporting, and related communications and information storage. VDE may employ tagging related security techniques, the time-ageing of encryption keys, the compartmentalization of both stored control information (including differentially tagging such stored information to ensure against substitution and tampering) and distributed content (to, for many content applications, employ one or more content encryption keys that are unique to the specific VDE installation and/or user), private key techniques such as triple DES to encrypt content, public key techniques such as RSA to protect communications and to provide the benefits of digital signature and authentication to securely bind together the nodes of a VDE arrangement, secure processing of important transaction management executable code, and a combining of a small amount of highly secure, hardware protected storage space with a much larger "exposed" mass media storage space storing secured (normally encrypted and tagged) control and audit information. VDE employs special purpose hardware distributed throughout some or all locations of a VDE implementation: a) said hardware controlling important elements of: content preparation (such as causing such content to be placed in a VDE content container and associating content control information with said content), content and/or electronic appliance usage auditing, content usage analysis, as well as content usage control; and b) said hardware having been designed to securely handle processing load module control activities, wherein said control processing activities may involve a sequence of required control factors;

support dynamic user selection of information subsets of a VDE electronic information product (VDE controlled content). This contrasts with the constraints of having to use a few high level individual, pre-defined content provider information increments such as being required to select a whole information product or product section in order to acquire or otherwise use a portion of such product or section. VDE supports metering and usage control over a variety of increments (including "atomic" increments, and combinations of different increment types) that are selected ad hoc by a user and represent a collection of pre-identified one or more increments (such as one or more blocks of a preidentified nature, e.g., bytes, images, logically related blocks) that form a generally arbitrary, but logical to a user, content "deliverable." VDE control information (including budgeting, pricing and metering) can be configured so that it can specifically apply, as appropriate, to ad hoc selection of different, unanticipated variable user selected aggregations of information increments and pricing levels can be, at least in part, based on quantities and/or nature of mixed increment selections (for example, a certain quantity of certain text could mean associated images might be discounted by 15%; a greater quantity of text in the "mixed" increment selection might mean the images are discounted 20%). Such user selected aggregated information increments can reflect the actual requirements of a user for information and is more flexible than being limited to a single, or a few, high level, (e.g. product, document, database record) predetermined increments. Such high level increments may include, quantities of information not desired by the user and as a result be more costly than the subset of information needed by the user if such a subset was available. In sum, the present invention allows information contained in electronic information products to be supplied according to user specification. Tailoring to user specification allows the present invention to provide the greatest value to users, which in turn will generate the greatest amount of electronic commerce activity. The user, for example, would be able to define an aggregation of content derived from various portions of an available content product, but which, as a deliverable for use by the user, is an entirely unique aggregated increment. The user may, for example, select certain numbers of bytes of information from various portions of an information product, such as a reference work, and copy them to disc in unencrypted form and be billed based on total number of bytes plus a surcharge on the number of "articles" that provided the bytes. A content provider might reasonably charge less for such a user defined information increment since the user does not require all of the content from all of the articles that contained, desired information. This process of defining a user desired information increment may involve artificial intelligence database search tools that contribute to the location of the most relevant portions of information from an information product and cause the automatic display to the user of information describing search criteria bits for user selection or the automatic extraction and delivery of such portions to the user. VDE further supports a wide variety of predefined increment types including:

bytes, images, content over time for audio or video, or any other increment that can be identified by content provider data mapping efforts, such as:

sentences, paragraphs, articles, database records, and byte offsets representing increments of logically related information.

VDE supports as many simultaneous predefined increment types as may be practical for a given type of content and business model.

securely store at a user's site potentially highly detailed information reflective of a user's usage of a variety of different content segment types and employing both inexpensive "exposed" host mass storage for maintaining detailed information in the form of encrypted data and maintaining summary information for security testing in highly secure special purpose VDE installation nonvolatile memory (if available).

support trusted chain of handling capabilities for pathways of distributed electronic information and/or for content usage related information. Such chains may extend, for example, from a content creator, to a distributor, a redistributor, a client user, and then may provide a pathway for securely reporting the same and/or differing usage information to one or more auditors, such as to one or more independent clearinghouses and then back to the content providers, including content creators. The same and/or different pathways employed for certain content handling, and related content control information and reporting information handling, may also be employed as one or more pathways for electronic payment handling (payment is characterized in the present invention as administrative content) for electronic content and/or appliance usage. These pathways are used for conveyance of all or portions of content, and/or content related control information. Content creators and other providers can specify the pathways that, partially or fully, must be used to disseminate commercially distributed property content, content control information, payment administrative content, and/or associated usage reporting information. Control information specified by content providers may also specify which specific parties must or may (including, for example, a group of eligible parties from which a selection may be made) handle conveyed information. It may also specify what transmission means (for example telecommunication carriers or media types) and transmission hubs must or may be used.

support flexible auditing mechanisms, such as employing "bitmap meters," that achieve a high degree of efficiency of operation and throughput and allow, in a practical manner, the retention and ready recall of information related to previous usage activities and related patterns. This flexibility is adaptable to a wide variety of billing and security control strategies such as:

upgrade pricing (e.g. suite purchases), pricing discounts (including quantity discounts), billing related time duration variables such as discounting new purchases based on the timing of past purchases, and security budgets based on quantity of different, logically related units of electronic information used over an interval of time.

Use of bitmap meters (including "regular" and "wide" bitmap meters) to record usage and/or purchase of information, in conjunction with other elements of the preferred embodiment of the present invention, uniquely supports efficient maintenance of usage history for: (a) rental, (b) flat fee licensing or purchase, (c) licensing or purchase discounts based upon historical usage variables, and (d) reporting to users in a manner enabling users to determine whether a certain item was acquired, or acquired within a certain time period (without requiring the use of conventional database mechanisms, which are highly inefficient for these applications). Bitmap meter methods record activities associated with electronic appliances, properties, objects, or portions thereof, and/or administrative activities that are independent of specific properties, objects, etc., performed by a user and/or electronic appliance such that a content and/or appliance provider and/or controller of an administrative activity can determine whether a certain activity has occurred at some point, or during a certain period, in the past (for example, certain use of a commercial electronic content product and/or appliance). Such determinations can then be used as part of pricing and/or control strategies of a content and/or appliance provider, and/or controller of an administrative activity. For example, the content provider may choose to charge only once for access to a portion of a property, regardless of the number of times that portion of the property is accessed by a user.

support "launchable" content, that is content that can be provided by a content provider to an end-user, who can then copy or pass along the content to other end-user parties without requiring the direct participation of a content provider to register and/or otherwise initialize the content for use. This content goes "out of (the traditional distribution) channel" in the form of a "traveling object." Traveling objects are containers that securely carry at least some permissions information and/or methods that are required for their use (such methods need not be carried by traveling objects if the required methods will be available at, or directly available to, a destination VDE installation). Certain travelling objects may be used at some or all VDE installations of a given VDE arrangement since they can make available the content control information necessary for content use without requiring the involvement of a commercial VDE value chain participant or data security administrator (e.g. a control officer or network administrator). As long as traveling object control information requirements are available at the user VDE installation secure subsystem (such as the presence of a sufficient quantity of financial credit from an authorized credit provider), at least some travelling object content may be used by a receiving party without the need to establish a connection with a remote VDE authority (until, for example, budgets are exhausted or a time content usage reporting interval has occurred). Traveling objects can travel "out-of-channel," allowing, for example, a user to give a copy of a traveling object whose content is a software program, a movie or a game, to a neighbor, the neighbor being able to use the traveling object if appropriate credit (e.g. an electronic clearinghouse account from a clearinghouse such as VISA or AT&T) is available. Similarly, electronic information that is generally available on an Internet, or a similar network, repository might be provided in the form of a traveling object that can be downloaded and subsequently copied by the initial downloader and then passed along to other parties who may pass the object on to additional parties.

provide very flexible and extensible user identification according to individuals, installations, by groups such as classes, and by function and hierarchical identification employing a hierarchy of levels of client identification (for example, client organization ID, client department ID, client network ID, client project ID, and client employee ID, or any appropriate subset of the above).

provide a general purpose, secure, component based content control and distribution system that functions as a foundation transaction operating system environment that employs executable code pieces crafted for transaction control and auditing. These code pieces can be reused to optimize efficiency in creation and operation of trusted, distributed transaction management arrangements. VDE supports providing such executable code in the form of "atomic" load modules and associated data. Many such load modules are inherently configurable, aggregatable, portable, and extensible and singularly, or in combination (along with associated data), run as control methods under the VDE transaction operating environment. VDE can satisfy the requirements of widely differing electronic commerce and data security applications by, in part, employing this general purpose transaction management foundation to securely process VDE transaction related control methods. Control methods are created primarily through the use of one or more of said executable, reusable load module code pieces (normally in the form of executable object components) and associated data. The component nature of control methods allows the present invention to efficiently operate as a highly configurable content control system. Under the present invention, content control models can be iteratively and asynchronously shaped, and otherwise updated to accommodate the needs of VDE participants to the extent that such shaping and otherwise updating conforms to constraints applied by a VDE application, if any (e.g., whether new component assemblies are accepted and, if so, what certification requirements exist for such component assemblies or whether any or certain participants may shape any or certain control information by selection amongst optional control information (permissions record) control methods. This iterative (or concurrent) multiple participant process occurs as a result of the submission and use of secure, control information components (executable code such as load modules and/or methods, and/or associated data). These components may be contributed independently by secure communication between each control information influencing VDE participant's VDE installation and may require certification for use with a given application, where such certification was provided by a certification service manager for the VDE arrangement who ensures secure interoperability and/or reliability (e.g., bug control resulting from interaction) between appliances and submitted control methods. The transaction management control functions of a VDE electronic appliance transaction operating environment interact with non-secure transaction management operating system functions to properly direct transaction processes and data related to electronic information security, usage control, auditing, and usage reporting. VDE provides the capability to manages resources related to secure VDE content and/or appliance control information execution and data storage.

facilitate creation of application and/or system functionality under VDE and to facilitate integration into electronic appliance environments of load modules and methods created under the present invention. To achieve this, VDE employs an Application Programmer's Interface (API) and/or a transaction operating system (such as a ROS) programming language with incorporated functions, both of which support the use of capabilities and can be used to efficiently and tightly integrate VDE functionality into commercial and user applications.

support user interaction through: (a) "Pop-Up" applications which, for example, provide messages to users and enable users to take specific actions such as approving a transaction, (b) stand-alone VDE applications that provide administrative environments for user activities such as: end-user preference specifications for limiting the price per transaction, unit of time, and/or session, for accessing history information concerning previous transactions, for reviewing financial information such as budgets, expenditures (e.g. detailed and/or summary) and usage analysis information, and (c) VDE aware applications which, as a result of the use of a VDE API and/or a transaction management (for example, ROS based) programming language embeds VDE "awareness" into commercial or internal software (application programs, games, etc.) so that VDE user control information and services are seamlessly integrated into such software and can be directly accessed by a user since the underlying functionality has been integrated into the commercial software's native design. For example, in a VDE aware word processor application, a user may be able to "print" a document into a VDE content container object, applying specific control information by selecting from amongst a series of different menu templates for different purposes (for example, a confidential memo template for internal organization purposes may restrict the ability to "keep," that is to make an electronic copy of the memo).

employ "templates" to ease the process of configuring capabilities of the present invention as they relate to specific industries or businesses. Templates are applications or application add-ons under the present invention. Templates support the efficient specification and/or manipulation of criteria related to specific content types, distribution approaches, pricing mechanisms, user interactions with content and/or administrative activities, and/or the like. Given the very large range of capabilities and configurations supported by the present invention, reducing the range of configuration opportunities to a manageable subset particularly appropriate for a given business model allows the full configurable power of the present invention to be easily employed by "typical" users who would be otherwise burdened with complex programming and/or configuration design responsibilities template applications can also help ensure that VDE related processes are secure and optimally bug free by reducing the risks associated with the contribution of independently developed load modules, including unpredictable aspects of code interaction between independent modules and applications, as well as security risks associated with possible presence of viruses in such modules. VDE, through the use of templates, reduces typical user configuration responsibilities to an appropriately focused set of activities including selection of method types (e.g. functionality) through menu choices such as multiple choice, icon selection, and/or prompting for method parameter data (such as identification information, prices, budget limits, dates, periods of time, access rights to specific content, etc.) that supply appropriate and/or necessary data for control information purposes. By limiting the typical (non-programming) user to a limited subset of configuration activities whose general configuration environment (template) has been preset to reflect general requirements corresponding to that user, or a content or other business model can very substantially limit difficulties associated with content containerization (including placing initial control information on content), distribution, client administration, electronic agreement implementation, end-user interaction, and clearinghouse activities, including associated interoperability problems (such as conflicts resulting from security, operating system, and/or certification incompatibilities). Use of appropriate VDE templates can assure users that their activities related to content VDE containerization, contribution of other control information, communications, encryption techniques and/or keys, etc. will be in compliance with specifications for their distributed VDE arrangement. VDE templates constitute preset configurations that can normally be reconfigurable to allow for new and/or modified templates that reflect adaptation into new industries as they evolve or to reflect the evolution or other change of an existing industry. For example, the template concept may be used to provide individual, overall frameworks for organizations and individuals that create, modify, market, distribute, consume, and/or otherwise use movies, audio recordings and live performances, magazines, telephony based retail sales, catalogs, computer software, information data bases, multimedia, commercial communications, advertisements, market surveys, infomercials, games, CAD/CAM services for numerically controlled machines, and the like. As the context surrounding these templates changes or evolves, template applications provided under the present invention may be modified to meet these changes for broad use, or for more focused activities. A given VDE participants may have a plurality of templates available for different tasks. A party that places content in its initial VDE container may have a variety of different, configurable templates depending on the type of content and/or business model related to the content. An end-user may have different configurable templates that can be applied to different document types (e-mail, secure internal documents, database records, etc.) and/or subsets of users (applying differing general sets of control information to different bodies of users, for example, selecting a list of users who may, under certain preset criteria, use a certain document). Of course, templates may, under certain circumstances have fixed control information and not provide for user selections or parameter data entry.

support plural, different control models regulating the use and/or auditing of either the same specific copy of electronic information content and/or differently regulating different copies (occurrences) of the same electronic information content. Differing models for billing, auditing, and security can be applied to the same piece of electronic information content and such differing sets of control information may employ, for control purposes, the same, or differing, granularities of electronic information control increments. This includes supporting variable control information for budgeting and auditing usage as applied to a variety of predefined increments of electronic information, including employing a variety of different budgets and/or metering increments for a given electronic information deliverable for: billing units of measure, credit limit, security budget limit and security content metering increments, and/or market surveying and customer profiling content metering increments. For example, a CD-ROM disk with a database of scientific articles might be in part billed according to a formula based on the number of bytes decrypted, number of articles containing said bytes decrypted, while a security budget might limit the use of said database to no more than 5% of the database per month for users on the wide area network it is installed on.

provide mechanisms to persistently maintain trusted content usage and reporting control information through both a sufficiently secure chain of handling of content and content control information and through various forms of usage of such content wherein said persistence of control may survive such use. Persistence of control includes the ability to extract information from a VDE container object by creating a new container whose contents are at least in part secured and that contains both the extracted content and at least a portion of the control information which control information of the original container and/or are at least in part produced by control information of the original container for this purpose and/or VDE installation control information stipulates should persist and/or control usage of content in the newly formed container. Such control information can continue to manage usage of container content if the container is "embedded" into another VDE managed object, such as an object which contains plural embedded VDE containers, each of which contains content derived (extracted) from a different source.

enables users, other value chain participants (such as clearinghouses and government agencies), and/or user organizations, to specify preferences or requirements related to their use of electronic content and/or appliances. Content users, such as end-user customers using commercially distributed content (games, information resources, software programs, etc.), can define, if allowed by senior control information, budgets, and/or other control information, to manage their own internal use of content. Uses include, for example, a user setting a limit on the price for electronic documents that the user is willing to pay without prior express user authorization, and the user establishing the character of metering information he or she is willing to allow to be collected (privacy protection). This includes providing the means for content users to protect the privacy of information derived from their use of a VDE installation and content and/or appliance usage auditing. In particular, VDE can prevent information related to a participant's usage of electronic content from being provided to other parties without the participant's tacit or explicit agreement.

provide mechanisms that allow control information to "evolve" and be modified according, at least in part, to independently, securely delivered further control information. Said control information may include executable code (e.g., load modules) that has been certified as acceptable (e.g., reliable and trusted) for use with a specific VDE application, class of applications, and/or a VDE distributed arrangement. This modification (evolution) of control information can occur upon content control information (load modules and any associated data) circulating to one or more VDE participants in a pathway of handling of control information or it may occur upon control information being received from a VDE participant. Handlers in a pathway of handling of content control information, to the extent each is authorized, can establish, modify, and/or contribute to, permission, auditing, payment, and reporting control information related to controlling, analyzing, paying for, and/or reporting usage of, electronic content and/or appliances (for example, as related to usage of VDE controlled property content). Independently delivered (from an independent source which is independent except in regards to certification), at least in part secure, control information can be employed to securely modify content control information when content control information has flowed from one party to another party in a sequence of VDE content control information handling. This modification employs, for example, one or more VDE component assemblies being securely processed in a VDE secure subsystem. In an alternate embodiment, control information may be modified by a senior party through use of their VDE installation secure sub-system after receiving submitted, at least in part secured, control information from a "junior" party, normally in the form of a VDE administrative object. Control information passing along VDE pathways can represent a mixed control set, in that it may include: control information that persisted through a sequence of control information handlers, other control information that was allowed to be modified, and further control information representing new control information and/or mediating data. Such a control set represents an evolution of control information for disseminated content. In this example the overall content control set for a VDE content container is "evolving" as it securely (e.g. communicated in encrypted form and using authentication and digital signaturing techniques) passes, at least in part, to a new participant's VDE installation where the proposed control information is securely received and handled. The received control information may be integrated (through use of the receiving parties' VDE installation secure sub-system) with in-place control information through a negotiation process involving both control information sets. For example, the modification, within the secure sub-system of a content provider's VDE installation, of content control information for a certain VDE content container may have occurred as a result of the incorporation of required control information provided by a financial credit provider. Said credit provider may have employed their VDE installation to prepare and securely communicate (directly or indirectly) said required control information to said content provider. Incorporating said required control information enables a content provider to allow the credit provider's credit to be employed by a content end-user to compensate for the end-user's use of VDE controlled content and/or appliances, so long as said end-user has a credit account with said financial credit provider and said credit account has sufficient credit available. Similarly, control information requiring the payment of taxes and/or the provision of revenue information resulting from electronic commerce activities may be securely received by a content provider. This control information may be received, for example, from a government agency. Content providers might be required by law to incorporate such control information into the control information for commercially distributed content and/or services related to appliance usage. Proposed control information is used to an extent allowed by senior control information and as determined by any negotiation trade-offs that satisfy priorities stipulated by each set (the received set and the proposed set). VDE also accommodates different control schemes specifically applying to different participants (e.g., individual participants and/or participant classes (types)) in a network of VDE content handling participants.

support multiple simultaneous control models for the same content property and/or property portion. This allows, for example, for concurrent business activities which are dependent on electronic commercial product content distribution, such as acquiring detailed market survey information and/or supporting advertising, both of which can increase revenue and result in lower content costs to users and greater value to content providers. Such control information and/or overall control models may be applied, as determined or allowed by control information, in differing manners to different participants in a pathway of content, reporting, payment, and/or related control information handling. VDE supports applying different content control information to the same and/or different content and/or appliance usage related activities, and/or to different parties in a content and/or appliance usage model, such that different parties (or classes of VDE users, for example) are subject to differing control information managing their use of electronic information content. For example, differing control models based on the category of a user as a distributor of a VDE controlled content object or an end-user of such content may result in different budgets being applied. Alternatively, for example, a one distributor may have the right to distribute a different array of properties than another distributor (from a common content collection provided, for example, on optical disc). An individual, and/or a class or other grouping of end-users, may have different costs (for example, a student, senior citizen, and/or poor citizen user of content who may be provided with the same or differing discounts) than a "typical" content user.

support provider revenue information resulting from customer use of content and/or appliances, and/or provider and/or end-user payment of taxes, through the transfer of credit and/or electronic currency from said end-user and/or provider to a government agency, might occur "automatically" as a result of such received control information causing the generation of a VDE content container whose content includes customer content usage information reflecting secure, trusted revenue summary information and/or detailed user transaction listings (level of detail might depend, for example on type or size of transaction—information regarding a bank interest payment to a customer or a transfer of a large (e.g. over $10,000) might be, by law, automatically reported to the government). Such summary and/or detailed information related to taxable events and/or currency, and/or creditor currency transfer, may be passed along a pathway of reporting and/or payment to the government in a VDE container. Such a container may also be used for other VDE related content usage reporting information.

support the flowing of content control information through different "branches" of content control information handling so as to accommodate, under the present invention's preferred embodiment, diverse controlled distributions of VDE controlled content. This allows different parties to employ the same initial electronic content with differing (perhaps competitive) control strategies. In this instance, a party who first placed control information on content can make certain control assumptions and these assumptions would evolve into more specific and/or extensive control assumptions. These control assumptions can evolve during the branching sequence upon content model participants submitting control information changes, for example, for use in "negotiating" with "in place" content control information. This can result in new or modified content control information and/or it might involve the selection of certain one or more already "in-place" content usage control methods over in-place alternative methods, as well as the submission of relevant control information parameter data. This form of evolution of different control information sets applied to different copies of the same electronic property content and/or appliance results from VDE control information flowing "down" through different branches in an overall pathway of handling and control and being modified differently as it diverges down these different pathway branches. This ability of the present invention to support multiple pathway branches for the flow of both VDE content control information and VDE managed content enables an electronic commerce marketplace which supports diverging, competitive business partnerships, agreements, and evolving overall business models which can employ the same content properties combined, for example, in differing collections of content representing differing at least in part competitive products.

enable a user to securely extract, through the use of the secure subsystem at the user's VDE installation, at least a portion of the content included within a VDE content container to produce a new, secure object (content container), such that the extracted information is maintained in a continually secure manner through the extraction process. Formation of the new VDE container containing such extracted content shall result in control information consistent with, or specified by, the source VDE content container, and/or local VDE installation secure subsystem as appropriate, content control information. Relevant control information, such as security and administrative information, derived, at least in part, from the parent (source) object's control information, will normally be automatically inserted into a new VDE content container object containing extracted VDE content. This process typically occurs under the control framework of a parent object and/or VDE installation control information executing at the user's VDE installation secure subsystem (with, for example, at least a portion of this inserted control information being stored securely in encrypted form in one or more permissions records). In an alternative embodiment, the derived content control information applied to extracted content may be in part or whole derived from, or employ, content control information stored remotely from the VDE installation that performed the secure extraction such as at a remote server location. As with the content control information for most VDE managed content, features of the present invention allows the content's control information to:

(a) "evolve," for example, the extractor of content may add new control methods and/or modify control parameter data, such as VDE application compliant methods, to the extent allowed by the content's in-place control information. Such new control information might specify, for example, who may use at least a portion of the new object, and/or how said at least a portion of said extracted content may be used (e.g. when at least a portion may be used, or what portion or quantity of portions may be used);

(b) allow a user to combine additional content with at least a portion of said extracted content, such as material authored by the extractor and/or content (for example, images, video, audio, and/or text) extracted from one or more other VDE container objects for placement directly into the new container;

(c) allow a user to securely edit at least a portion of said content while maintaining said content in a secure form within said VDE content container;

(d) append extracted content to a pre-existing VDE content container object and attach associated control information—in these cases, user added information may be secured, e.g., encrypted, in part or as a whole, and may be subject to usage and/or auditing control information that differs from the those applied to previously in place object content;

(e) preserve VDE control over one or more portions of extracted content after various forms of usage of said portions, for example, maintain content in securely stored form while allowing "temporary" on screen display of content or allowing a software program to be maintained in secure form but transiently decrypt any encrypted executing portion of said program (all, or only a portion, of said program may be encrypted to secure the program).

Generally, the extraction features of the present invention allow users to aggregate and/or disseminate and/or otherwise use protected electronic content information extracted from content container sources while maintaining secure VDE capabilities thus preserving the rights of providers in said content information after various content usage processes.

support the aggregation of portions of VDE controlled content, such portions being subject to differing VDE content container control information, wherein various of said portions may have been provided by independent, different content providers from one or more different locations remote to the user performing the aggregation. Such aggregation, in the preferred embodiment of the present invention, may involve preserving at least a portion of the control information,(e.g., executable code such as load modules) for each of various of said portions by, for example, embedding some or all of such portions individually as VDE content container objects within an overall VDE content container and/or embedding some or all of such portions directly into a VDE content container. In the latter case, content control information of said content container may apply differing control information sets to various of such portions based upon said portions original control information requirements before aggregation. Each of such embedded VDE content containers may have its own control information in the form of one or more permissions records. Alternatively, a negotiation between control information associated with various aggregated portions of electronic content, may produce a control information set that would govern some or all of the aggregated content portions. The VDE content control information produced by the negotiation may be uniform (such as having the same load modules and/or component assemblies, and/or it may apply differing such content control information to two or more portions that constitute an aggregation of VDE controlled content such as differing metering, budgeting, billing and/or payment models. For example, content usage payment may be automatically made, either through a clearinghouse, or directly, to different content providers for different potions.

enable flexible metering of, or other collection of information related to, use of electronic content and/or electronic appliances. A feature of the present invention enables such flexibility of metering control mechanisms to accommodate a simultaneous, broad array of: (a) different parameters related to electronic information content use; (b) different increment units (bytes, documents, properties, paragraphs, images, etc.) and/or other organizations of such electronic content; and/or (c) different categories of user and/or VDE installation types, such as client organizations, departments, projects, networks, and/or individual users, etc. This feature of the present invention can be employed for content security, usage analysis (for example, market surveying), and/or compensation based upon the use and/or exposure to VDE managed content. Such metering is a flexible basis for ensuring payment for content royalties, licensing, purchasing, and/or advertising. A feature of the present invention provides for payment means supporting flexible electronic currency and credit mechanisms, including the ability to securely maintain audit trails reflecting information related to use of such currency or credit. VDE supports multiple differing hierarchies of client organization control information wherein an organization client administrator distributes control information specifying the usage rights of departments, users, and/or projects. Likewise, a department (division) network manager can function as a distributor (budgets, access rights, etc.) for department networks, projects, and/or users, etc.

provide scalable, integratable, standardized control means for use on electronic appliances ranging from inexpensive consumer (for example, television set-top appliances) and professional devices (and hand-held PDAs) to servers, mainframes, communication switches, etc. The scalable transaction management/auditing technology of the present invention will result in more efficient and reliable interoperability amongst devices functioning in electronic commerce and/or data security environments. As standardized physical containers have become essential to the shipping of physical goods around the world, allowing these physical containers to universally "fit" unloading equipment, efficiently use truck and train space, and accommodate known arrays of objects (for example, boxes) in an efficient manner, so VDE electronic content containers may, as provided by the present invention, be able to efficiently move electronic information content (such as commercially published properties, electronic currency and credit, and content audit information), and associated content control information, around the world. Interoperability is fundamental to efficient electronic commerce. The design of the VDE foundation, VDE load modules, and VDE containers, are important features that enable the VDE node operating environment to be compatible with a very broad range of electronic appliances. The ability, for example, for control methods based on load modules to execute in very "small" and inexpensive secure sub-system environments, such as environments with very little read/write memory, while also being able to execute in large memory sub-systems that may be used in more expensive electronic appliances, supports consistency across many machines. This consistent VDE operating environment, including its control structures and container architecture, enables the use of standardized VDE content containers across a broad range of device types and host operating environments. Since VDE capabilities can be seamlessly integrated as extensions, additions, and/or modifications to fundamental capabilities of electronic appliances and host operating systems, VDE containers, content control information, and the VDE foundation will be able to work with many device types and these device types will be able to consistently and efficiently interpret and enforce VDE control information. Through this integration users can also benefit from a transparent interaction with many of the capabilities of VDE. VDE integration with software operating on a host electronic appliance supports a variety of capabilities that would be unavailable or less secure without such integration. Through integration with one or more device applications and/or device operating environments, many capabilities of the present invention can be presented as inherent capabilities of a given electronic appliance, operating system, or appliance application. For example, features of the present invention include: (a) VDE system software to in part extend and/or modify host operating systems such that they possesses VDE capabilities, such as enabling secure transaction processing and electronic information storage; (b) one or more application programs that in part represent tools associated with VDE operation; and/or (c) code to be integrated into application programs, wherein such code incorporates references into VDE system software to integrate VDE capabilities and makes such applications VDE aware (for example, word processors, database retrieval applications, spreadsheets, multimedia presentation authoring tools, film editing software, music editing software such as MIDI applications and the like, robotics control systems such as those associated with CAD/CAM environments and NCM software and the like, electronic mail systems, teleconferencing software, and other data authoring, creating, handling, and/or usage applications including combinations of the above). These one or more features (which may also be implemented in firmware or hardware) may be employed in conjunction with a VDE node secure hardware processing capability, such as a microcontroller(s), microprocessor(s), other CPU(s) or other digital processing logic.

employ audit reconciliation and usage pattern evaluation processes that assess, through certain, normally network based, transaction processing reconciliation and threshold checking activities, whether certain violations of security of a VDE arrangement have occurred. These processes are performed remote to VDE controlled content end-user VDE locations by assessing, for example, purchases, and/or requests, for electronic properties by a given VDE installation. Applications for such reconciliation activities include assessing whether the quantity of remotely delivered VDE controlled content corresponds to the amount of financial credit and/or electronic currency employed for the use of such content. A trusted organization can acquire information from content providers concerning the cost for content provided to a given VDE installation and/or user and compare this cost for content with the credit and/or electronic currency disbursements for that installation and/or user. Inconsistencies in the amount of content delivered versus the amount of disbursement can prove, and/or indicate, depending on the circumstances, whether the local VDE installation has been, at least to some degree, compromised (for example, certain important system security functions, such as breaking encryption for at least some portion of the secure subsystem and/or VDE controlled content by uncovering one or more keys). Determining whether irregular patterns (e.g. unusually high demand) of content usage, or requests for delivery of certain kinds of VDE controlled information during a certain time period by one or more VDE installations and/or users (including, for example, groups of related users whose aggregate pattern of usage is suspicious) may also be useful in determining whether security at such one or more installations, and/or by such one or more users, has been compromised, particularly when used in combination with an assessment of electronic credit and/or currency provided to one or more VDE users and/or installations, by some or all of their credit and/or currency suppliers, compared with the disbursements made by such users and/or installations.

support security techniques that materially increase the time required to "break" a system's integrity. This includes using a collection of techniques that minimizes the damage resulting from comprising some aspect of the security features of the present inventions.

provide a family of authoring, administrative, reporting, payment, and billing tool user applications that comprise components of the present invention's trusted/secure, universe wide, distributed transaction control and administration system. These components support VDE related: object creation (including placing control information on content), secure object distribution and management (including distribution control information, financial related, and other usage analysis), client internal VDE activities administration and control, security management, user interfaces, payment disbursement, and clearinghouse related functions. These components are designed to support highly secure, uniform, consistent, and standardized: electronic commerce and/or data security pathway(s) of handling, reporting, and/or payment; content control and administration; and human factors (e.g. user interfaces).

support the operation of a plurality of clearinghouses, including, for example, both financial and user clearinghouse activities, such as those performed by a client administrator in a large organization to assist in the organization's use of a VDE arrangement, including usage information analysis, and control of VDE activities by individuals and groups of employees such as specifying budgets and the character of usage rights available under VDE for certain groups of and/or individual, client personnel, subject to control information series to control information submitted by the client administrator. At a clearinghouse, one or more VDE installations may operate together with a trusted distributed database environment (which may include concurrent database processing means). A financial clearinghouse normally receives at its location securely delivered content usage information, and user requests (such as requests for further credit, electronic currency, and/or higher credit limit). Reporting of usage information and user requests can be used for supporting electronic currency, billing, payment and credit related activities, and/or for user profile analysis and/or broader market survey analysis and marketing (consolidated) list generation or other information derived, at least in part, from said usage information this information can be provided to content providers or other parties, through secure, authenticated encrypted communication to the VDE installation secure subsystems. Clearinghouse processing means would normally be connected to specialized I/O means, which may include high speed telecommunication switching means that may be used for secure communications between a clearinghouse and other VDE pathway participants.

securely support electronic currency and credit usage control, storage, and communication at, and between, VDE installations. VDE further supports automated passing of electronic currency and/or credit information, including payment tokens (such as in the form of electronic currency or credit) or other payment information, through a pathway of payment, which said pathway may or may not be the same as a pathway for content usage information reporting. Such payment may be placed into a VDE container created automatically by a VDE installation in response to control information stipulating the "withdrawal" of credit or electronic currency from an electronic credit or currency account based upon an amount owed resulting from usage of VDE controlled electronic content and/or appliances. Payment credit or currency may then be automatically communicated in protected (at least in part encrypted) form through telecommunication of a VDE container to an appropriate party such as a clearinghouse, provider of original property content or appliance, or an agent for such provider (other than a clearinghouse). Payment information may be packaged in said VDE content container with, or without, related content usage information, such as metering information. An aspect of the present invention further enables certain information regarding currency use to be specified as unavailable to certain, some, or all VDE parties ("conditionally" to fully anonymous currency) and/or further can regulate certain content information, such as currency and/or credit use related information (and/or other electronic information usage data) to be available only under certain strict circumstances, such as a court order (which may itself require authorization through the use of a court controlled VDE installation that may be required to securely access "conditionally" anonymous information). Currency and credit information, under the preferred embodiment of the present invention, is treated as administrative content;

support fingerprinting (also known as watermarking) for embedding in content such that when content protected under the present invention is released in clear form from a VDE object (displayed, printed, communicated, extracted, and/or saved), information representing the identification of the user and/or VDE installation responsible for transforming the content into clear form is embedded into the released content. Fingerprinting is useful in providing an ability to identify who extracted information in clear form a VDE container, or who made a copy of a VDE object or a portion of its contents. Since the identity of the user and/or other identifying information may be embedded in an obscure or generally concealed manner, in VDE container content and/or control information, potential copyright violators may be deterred from unauthorized extraction or copying. Fingerprinting normally is embedded into unencrypted electronic content or control information, though it can be embedded into encrypted content and later placed in unencrypted content in a secure VDE installation subsystem as the encrypted content carrying the fingerprinting information is decrypted. Electronic information, such as the content of a VDE container, may be fingerprinted as it leaves a network (such as Internet) location bound for a receiving party. Such repository information may be maintained in unencrypted form prior to communication and be encrypted as it leaves the repository. Fingerprinting would preferably take place as the content leaves the repository, but before the encryption step. Encrypted repository content can be decrypted, for example in a secure VDE sub-system, fingerprint information can be inserted, and then the content can be re-encrypted for transmission. Embedding identification information of the intended recipient user and/or VDE installation into content as it leaves, for example, an Internet repository, would provide important information that would identify or assist in identifying any party that managed to compromise the security of a VDE installation or the delivered content. If a party produces an authorized clear form copy of VDE controlled content, including making unauthorized copies of an authorized clear form copy, fingerprint information would point back to that individual and/or his or her VDE installation. Such hidden information will act as a strong disincentive that should dissuade a substantial portion of potential content "pirates" from stealing other parties electronic information. Fingerprint information identifying a receiving party and/or VDE installation can be embedded into a VDE object before, or during, decryption, replication, or communication of VDE content objects to receivers. Fingerprinting electronic content before it is encrypted for transfer to a customer or other user provides information that can be very useful for identifying who received certain content which may have then been distributed or made available in unencrypted form. This information would be useful in tracking who may have "broken" the security of a VDE installation and was illegally making certain electronic content available to others. Fingerprinting may provide additional, available information such as time and/or date of the release (for example extraction) of said content information. Locations for inserting fingerprints may be specified by VDE installation and/or content container control information. This information may specify that certain areas and/or precise locations within properties should be used for fingerprinting, such as one or more certain fields of information or information types. Fingerprinting information may be incorporated into a property by modifying in a normally undetectable way color frequency and/or the brightness of certain image pixels, by slightly modifying certain audio signals as to frequency, by modifying font character formation, etc. Fingerprint information, itself, should be encrypted so as to make it particularly difficult for tampered fingerprints to be interpreted as valid. Variations in fingerprint locations for different copies of the same property; "false" fingerprint information; and multiple copies of fingerprint information within a specific property or other content which copies employ different fingerprinting techniques such as information distribution patterns, frequency and/or brightness manipulation, and encryption related techniques, are features of the present invention for increasing the difficulty of an unauthorized individual identifying fingerprint locations and erasing and/or modifying fingerprint information.

provide smart object agents that can carry requests, data, and/or methods, including budgets, authorizations, credit or currency, and content. For example, smart objects may travel to and/or from remote information resource locations and fulfill requests for electronic information content. Smart objects can, for example, be transmitted to a remote location to perform a specified database search on behalf of a user or otherwise "intelligently" search remote one or more repositories of information for user desired information. After identifying desired information at one or more remote locations, by for example, performing one or more database searches, a smart object may return via communication to the user in the form of a secure "return object" containing retrieved information. A user may be charged for the remote retrieving of information, the returning of information to the user's VDE installation, and/or the use of such information. In the latter case, a user may be charged only for the information in the return object that the user actually uses. Smart objects may have the means to request use of one or more services and/or resources. Services include locating other services and/or resources such as information resources, language or format translation, processing, credit (or additional credit) authorization, etc. Resources include reference databases, networks, high powered or specialized computing resources (the smart object may carry information to another computer to be efficiently processed and then return the information to the sending VDE installation), remote object repositories, etc. Smart objects can make efficient use of remote resources (e.g. centralized databases, super computers, etc.) while providing a secure means for charging users based on information and/or resources actually used.

support both "translations" of VDE electronic agreements elements into modern language printed agreement elements (such as English language agreements) and translations of electronic rights protection/transaction management modern language agreement elements to electronic VDE agreement elements. This feature requires maintaining a library of textual language that corresponds to VDE load modules and/or methods and/or component assemblies. As VDE methods are proposed and/or employed for VDE agreements, a listing of textual terms and conditions can be produced by a VDE user application which, in a preferred embodiment, provides phrases, sentences and/or paragraphs that have been stored and correspond to said methods and/or assemblies. This feature preferably employs artificial intelligence capabilities to analyze and automatically determine, and/or assist one or more users to determine, the proper order and relationship between the library elements corresponding to the chosen methods and/or assemblies so as to compose some or all portions of a legal or descriptive document. One or more users, and/or preferably an attorney (if the document a legal, binding agreement), would review the generated document material upon completion and employ such additional textual information and/or editing as necessary to describe non electronic transaction elements of the agreement and make any other improvements that may be necessary. These features further support employing modern language tools that allow one or more users to make selections from choices and provide answers to questions and to produce a VDE electronic agreement from such a process. This process can be interactive and the VDE agreement formulation process may employ artificial intelligence expert system technology that learns from responses and, where appropriate and based at least in part on said responses, provides further choices and/or questions which "evolves" the desired VDE electronic agreement.

support the use of multiple VDE secure subsystems in a single VDE installation. Various security and/or performance advantages may be realized by employing a distributed VDE design within a single VDE installation. For example, designing a hardware based VDE secure subsystem into an electronic appliance VDE display device, and designing said subsystem's integration with said display device so that it is as close as possible to the point of display, will increase the security for video materials by making it materially more difficult to "steal" decrypted video information as it moves from outside to inside the video system. Ideally, for example, a VDE secure hardware module would be in the same physical package as the actual display monitor, such as within the packaging of a video monitor or other display device, and such device would be designed, to the extent commercially practical, to be as tamper resistant as reasonable. As another example, embedding a VDE hardware module into an I/O peripheral may have certain advantages from the standpoint of overall system throughput. If multiple VDE instances are employed within the same VDE installation, these instances will ideally share resources to the extent practical, such as VDE instances storing certain control information and content and/or appliance usage information on the same mass storage device and in the same VDE management database.

requiring reporting and payment compliance by employing exhaustion of budgets and time ageing of keys. For example, a VDE commercial arrangement and associated content control information may involve a content provider's content and the use of clearinghouse credit for payment for end-user usage of said content. Control information regarding said arrangement may be delivered to a user's (of said content) VDE installation and/or said financial clearinghouse's VDE installation. Said control information might require said clearinghouse to prepare and telecommunicate to said content provider both content usage based information in a certain form, and content usage payment in the form of electronic credit (such credit might be "owned" by the provider after receipt and used in lieu of the availability or adequacy of electronic currency) and/or electronic currency. This delivery of information and payment may employ trusted VDE installation secure subsystems to securely, and in some embodiments, automatically, provide in the manner specified by said control information, said usage information and payment content. Features of the present invention help ensure that a requirement that a clearinghouse report such usage information and payment content will be observed. For example, if one participant to a VDE electronic agreement fails to observe such information reporting and/or paying obligation, another participant can stop the delinquent party from successfully participating in VDE activities related to such agreement. For example, if required usage information and payment was not reported as specified by content control information, the "injured" party can fail to provide, through failing to securely communicate from his VDE installation secure subsystem, one or more pieces of secure information necessary for the continuance of one or more critical processes. For example, failure to report information and/or payment from a clearinghouse to a content provider (as well as any security failures or other disturbing irregularities) can result in the content provider not providing key and/or budget refresh information to the clearinghouse, which information can be necessary to authorize use of the clearinghouse's credit for usage of the provider's content and which the clearinghouse would communicate to end-user's during a content usage reporting communication between the clearinghouse and end-user. As another example, a distributor that failed to make payments and/or report usage information to a content provider might find that their budget for creating permissions records to distribute the content provider's content to users, and/or a security budget limiting one or more other aspect of their use of the provider's content, are not being refreshed by the content provider, once exhausted or timed-out (for example, at a predetermined date). In these and other cases, the offended party might decide not to refresh time ageing keys that had "aged out." Such a use of time aged keys has a similar impact as failing to refresh budgets or time-aged authorizations.

support smart card implementations of the present invention in the form of portable electronic appliances, including cards that can be employed as secure credit, banking, and/or money cards. A feature of the present invention is the use of portable VDEs as transaction cards at retail and other establishments, wherein such cards can "dock" with an establishment terminal that has a VDE secure sub-system and/or an online connection to a VDE secure and/or otherwise secure and compatible subsystem, such as a "trusted" financial clearinghouse (e.g., VISA, Mastercard). The VDE card and the terminal (and/or online connection) can securely exchange information related to a transaction, with credit and/or electronic currency being transferred to a merchant and/or clearinghouse and transaction information flowing back to the card. Such a card can be used for transaction activities of all sorts. A docking station, such as a PCMCIA connector on an electronic appliance, such as a personal computer, can receive a consumer's VDE card at home. Such a station/card combination can be used for on-line transactions in the same manner as a VDE installation that is permanently installed in such an electronic appliance. The card can be used as an "electronic wallet" and contain electronic currency as well as credit provided by a clearinghouse. The card can act as a convergence point for financial activities of a consumer regarding many, if not all, merchant, banking, and on-line financial transactions, including supporting home banking activities. A consumer can receive his paycheck and/or investment earnings and/or "authentic" VDE content container secured detailed information on such receipts, through on-line connections. A user can send digital currency to another party with a VDE arrangement, including giving away such currency. A VDE card can retain details of transactions in a highly secure and database organized fashion so that financially related information is both consolidated and very easily retrieved and/or analyzed. Because of the VDE security, including use of effective encryption, authentication, digital signaturing, and secure database structures, the records contained within a VDE card arrangement may be accepted as valid transaction records for government and/or corporate recordkeeping requirements. In some embodiments of the present invention a VDE card may employ docking station and/or electronic appliance storage means and/or share other VDE arrangement means local to said appliance and/or available across a network, to augment the information storage capacity of the VDE card, by for example, storing dated, and/or archived, backup information. Taxes relating to some or all of an individual's financial activities may be automatically computed based on "authentic" information securely stored and available to said VDE card. Said information may be stored in said card, in said docking station, in an associated electronic appliance, and/or other device operatively attached thereto, and/or remotely, such as at a remote server site. A card's data, e.g. transaction history, can be backed up to an individual's personal computer or other electronic appliance and such an appliance may have an integrated VDE installation of its own. A current transaction, recent transactions (for redundancy), or all or other selected card data may be backed up to a remote backup repository, such a VDE compatible repository at a financial clearinghouse, during each or periodic docking for a financial transaction and/or information communication such as a user/merchant transaction. Backing up at least the current transaction during a connection with another party's VDE installation (for example a VDE installation that is also on a financial or general purpose electronic network), by posting transaction information to a remote clearinghouse and/or bank, can ensure that sufficient backup is conducted to enable complete reconstruction of VDE card internal information in the event of a card failure or loss.

support certification processes that ensure authorized interoperability between various VDE installations so as to prevent VDE arrangements and/or installations that unacceptably deviate in specification protocols from other VDE arrangements and/or installations from interoperating in a manner that may introduce security (integrity and/or confidentiality of VDE secured information), process control, and/or software compatibility problems. Certification validates the identity of VDE installations and/or their components, as well as VDE users. Certification data can also serve as information that contributes to determining the decommissioning or other change related to VDE sites.

support the separation of fundamental transaction control processes through the use of event (triggered) based method control mechanisms. These event methods trigger one or more other VDE methods (which are available to a secure VDE sub-system) and are used to carry out VDE managed transaction related processing. These triggered methods include independently (separably) and securely processable component billing management methods, budgeting management methods, metering management methods, and related auditing management processes. As a result of this feature of the present invention, independent triggering of metering, auditing, billing, and budgeting methods, the present invention is able to efficiently, concurrently support multiple financial currencies (e.g. dollars, marks, yen) and content related budgets, and/or billing increments as well as very flexible content distribution models.

support, complete, modular separation of the control structures related to (1) content event triggering, (2) auditing, (3) budgeting (including specifying no right of use or unlimited right of use), (4) billing, and (5) user identity (VDE installation, client name, department, network, and/or user, etc.). The independence of these VDE control structures provides a flexible system which allows plural relationships between two or more of these structures, for example, the ability to associate a financial budget with different event trigger structures (that are put in place to enable controlling content based on its logical portions). Without such separation between these basic VDE capabilities, it would be more difficult to efficiently maintain separate metering, budgeting, identification, and/or billing activities which involve the same, differing (including overlapping), or entirely different, portions of content for metering, billing, budgeting, and user identification, for example, paying fees associated with usage of content, performing home banking, managing advertising services, etc. VDE modular separation of these basic capabilities supports the programming of plural, "arbitrary" relationships between one or differing content portions (and/or portion units) and budgeting, auditing, and/or billing control information. For example, under VDE, a budget limit of $200 dollars or 300 German Marks a month may be enforced for decryption of a certain database and 2 U.S. Dollars or 3 German Marks may be charged for each record of said database decrypted (depending on user selected currency). Such usage can be metered while an additional audit for user profile purposes can be prepared recording the identity of each filed displayed. Additionally, further metering can be conducted regarding the number of said database bytes that have been decrypted, and a related security budget may prevent the decrypting of more than 5% of the total bytes of said database per year. The user may also, under VDE (if allowed by senior control information), collect audit information reflecting usage of database fields by different individuals and client organization departments and ensure that differing rights of access and differing budgets limiting database usage can be applied to these client individuals and groups. Enabling content providers and users to practically employ such diverse sets of user identification, metering, budgeting, and billing control information results, in part, from the use of such independent control capabilities. As a result, VDE can support great configurability in creation of plural control models applied to the same electronic property and the same and/or plural control models applied to differing or entirely different content models (for example, home banking versus electronic shopping).

Methods, Other Control Information, and VDE Objects

VDE control information (e.g., methods) that collectively control use of VDE managed properties (database, document, individual commercial product), are either shipped with the content itself (for example, in a content container) and/or one or more portions of such control information is shipped to distributors and/or other users in separably deliverable "administrative objects." A subset of the methods for a property may in part be delivered with each property while one or more other subsets of methods can be delivered separately to a user or otherwise made available for use (such as being available remotely by telecommunication means). Required methods (methods listed as required for property and/or appliance use) must be available as specified if VDE controlled content (such as intellectual property distributed within a VDE content container) is to be used. Methods that control content may apply to a plurality of VDE container objects, such as a class or other grouping of such objects. Methods may also be required by certain users or classes of users and/or VDE installations and/or classes of installations for such parties to use one or more specific, or classes of, objects.

A feature of VDE provided by the present invention is that certain one or more methods can be specified as required in order for a VDE installation and/or user to be able to use certain and/or all content. For example, a distributor of a certain type of content might be allowed by "senior" participants (by content creators, for example) to require a method which prohibits end-users from electronically saving decrypted content, a provider of credit for VDE transactions might require an audit method that records the time of an electronic purchase, and/or a user might require a method that summarizes usage information for reporting to a clearinghouse (e.g. billing information) in a way that does not convey confidential, personal information regarding detailed usage behavior.

A further feature of VDE provided by the present invention is that creators, distributors, and users of content can select from among a set of predefined methods (if available) to control container content usage and distribution functions and/or they may have the right to provide new customized methods to control at least certain usage functions (such "new" methods may be required to be certified for trustedness and interoperability to the VDE installation and/or for of a group of VDE applications). As a result, VDE provides a very high degree of configurability with respect to how the distribution and other usage of each property or object (or one or more portions of objects or properties as desired and/or applicable) will be controlled. Each VDE participant in a VDE pathway of content control information may set methods for some or all of the content in a VDE container, so long as such control information does not conflict with senior control information already in place with respect to:

(1) certain or all VDE managed content,
(2) certain one or more VDE users and/or groupings of users,
(3) certain one or more VDE nodes and/or groupings of nodes, and/or
(4) certain one or more VDE applications and/or arrangements.

For example, a content creator's VDE control information for certain content can take precedence over other submitted VDE participant control information and, for example, if allowed by senior control information, a content distributor's control information may itself take precedence over a client administrator's control information, which may take precedence over an end-user's control information. A path of distribution participant's ability to set such electronic content control information can be limited to certain control information (for example, method mediating data such as pricing and/or sales dates) or it may be limited only to the extent that one or more of the participant's proposed control information conflicts with control information set by senior control information submitted previously by participants in a chain of handling of the property, or managed in said participant's VDE secure subsystem.

VDE control information may, in part or in full, (a) represent control information directly put in place by VDE content control information pathway participants, and/or (b) comprise control information put in place by such a participant on behalf of a party who does not directly handle electronic content (or electronic appliance) permissions records information (for example control information inserted by a participant on behalf of a financial clearinghouse or government agency). Such control information methods (and/or load modules and/or mediating data and/or component assemblies) may also be put in place by either an electronic automated, or a semi-automated and human assisted, control information (control set) negotiating process that assesses whether the use of one or more pieces of submitted control information will be integrated into and/or replace existing control information (and/or chooses between alternative control information based upon interaction with in-place control information) and how such control information may be used.

Control information may be provided by a party who does not directly participate in the handling of electronic content (and/or appliance) and/or control information for such content (and/or appliance). Such control information may be provided in secure form using VDE installation secure subsystem managed communications (including, for example, authenticating the deliverer of at least in part encrypted control information) between such not directly participating one or more parties' VDE installation secure subsystems, and a pathway of VDE content control information participant's VDE installation secure subsystem. This control information may relate to, for example, the right to access credit supplied by a financial services provider, the enforcement of regulations or laws enacted by a government agency, or the requirements of a customer of VDE managed content usage information (reflecting usage of content by one or more parties other than such customer) relating to the creation, handling and/or manner of reporting of usage information received by such customer. Such control information may, for example, enforce societal requirements such as laws related to electronic commerce.

VDE content control information may apply differently to different pathway of content and/or control information handling participants. Furthermore, permissions records rights may be added, altered, and/or removed by a VDE participant if they are allowed to take such action. Rights of VDE participants may be defined in relation to specific parties and/or categories of parties and/or other groups of parties in a chain of handling of content and/or content control information (e.g., permissions records). Modifications to control information that may be made by a given, eligible party or parties, may be limited in the number of modifications, and/or degree of modification, they may make.

At least one secure subsystem in electronic appliances of creators, distributors, auditors, clearinghouses, client administrators, and end-users (understanding that two or more of the above classifications may describe a single user) provides a "sufficiently" secure (for the intended applications) environment for:

1. Decrypting properties and control information;
2. Storing control and metering related information;
3. Managing communications;
4. Processing core control programs, along with associated data, that constitute control information for electronic content and/or appliance rights protection, including the enforcing of preferences and requirements of VDE participants.

Normally, most usage, audit, reporting, payment, and distribution control methods are themselves at least in part encrypted and are executed by the secure subsystem of a VDE installation. Thus, for example, billing and metering records can be securely generated and updated, and encryption and decryption keys are securely utilized, within a secure subsystem. Since VDE also employs secure (e.g. encrypted and authenticated) communications when passing information between the participant location (nodes) secure subsystems of a VDE arrangement, important components of a VDE electronic agreement can be reliably enforced with sufficient security (sufficiently trusted) for the intended commercial purposes. A VDE electronic agreement for a value chain can be composed, at least in part, of one or more subagreements between one or more subsets of the value chain participants. These subagreements are comprised of one or more electronic contract "compliance" elements (methods including associated parameter data) that ensure the protection of the rights of VDE participants.

The degree of trustedness of a VDE arrangement will be primarily based on whether hardware SPUs are employed at participant location secure subsystems and the effectiveness of the SPU hardware security architecture, software security techniques when an SPU is emulated in software, and the encryption algorithm(s) and keys that are employed for securing content, control information, communications, and access to VDE node (VDE installation) secure subsystems. Physical facility and user identity authentication security procedures may be used instead of hardware SPUs at certain nodes, such as at an established financial clearinghouse, where such procedures may provide sufficient security for trusted interoperability with a VDE arrangement employing hardware SPUs at user nodes.

The updating of property management files at each location of a VDE arrangement, to accommodate new or modified control information, is performed in the VDE secure subsystem and under the control of secure management file updating programs executed by the protected subsystem. Since all secure communications are at least in part encrypted and the processing inside the secure subsystem is concealed from outside observation and interference, the present invention ensures that content control information can be enforced. As a result, the creator and/or distributor and/or client administrator and/or other contributor of secure control information for each property (for example, an end-user restricting the kind of audit information he or she will allow to be reported and/or a financial clearinghouse establishing certain criteria for use of its credit for payment for use of distributed content) can be confident that their contributed and accepted control information will be enforced (within the security limitations of a given VDE security implementation design). This control information can determine, for example:

(1) How and/or to whom electronic content can be provided, for example, how an electronic property can be distributed;
(2) How one or more objects and/or properties, or portions of an object or property, can be directly used, such as decrypted, displayed, printed, etc;
(3) How payment for usage of such content and/or content portions may or must be handled; and
(4) How audit information about usage information related to at least a portion of a property should be collected, reported, and/or used.

Seniority of contributed control information, including resolution of conflicts between content control information submitted by multiple parties, is normally established by:

(1) the sequence in which control information is put in place by various parties (in place control information normally takes precedence over subsequently submitted control information),
(2) the specifics of VDE content and/or appliance control information. For example, in-place control information can stipulate which subsequent one or more piece of control from one or more parties or class of parties will take precedence over control information submitted by one or more yet different parties and/or classes of parties, and/or
(3) negotiation between control information sets from plural parties, which negotiation establishes what control information shall constitute the resulting control information set for a given piece of VDE managed content and/or VDE installation.

Electronic Agreements and Rights Protection

An important feature of VDE is that it can be used to assure the administration of, and adequacy of security and rights protection for, electronic agreements implemented through the use of the present invention. Such agreements may involve one or more of:

(1) creators, publishers, and other distributors, of electronic information,
(2) financial service (e.g. credit) providers,
(3) users of (other than financial service providers) information arising from content usage such as content specific demographic information and user specific descriptive information. Such users may include market analysts, marketing list compilers for direct and directed marketing, and government agencies,
(4) end users of content,
(5) infrastructure service and device providers such as telecommunication companies and hardware manufacturers (semiconductor and electronic appliance and/or other computer system manufacturers) who receive compensation based upon the use of their services and/or devices, and
(6) certain parties described by electronic information.

VDE supports commercially secure "extended" value chain electronic agreements. VDE can be configured to support the various underlying agreements between parties that comprise this extended agreement. These agreements can define important electronic commerce considerations including:

(1) security,
(2) content use control, including electronic distribution,
(3) privacy (regarding, for example, information concerning parties described by medical, credit, tax, personal, and/or of other forms of confidential information),
(4) management of financial processes, and
(5) pathways of handling for electronic content, content and/or appliance control information, electronic content and/or appliance usage information and payment and/or credit.

VDE agreements may define the electronic commerce relationship of two or more parties of a value chain, but such agreements may, at times, not directly obligate or otherwise directly involve other VDE value chain participants. For example, an electronic agreement between a content creator and a distributor may establish both the price to the distributor for a creator's content (such as for a property distributed in a VDE container object) and the number of copies of this object that this distributor may distribute to end-users over a given period of time. In a second agreement, a value chain end-user may be involved in a three party agreement in which the end-user agrees to certain requirements for using the distributed product such as accepting distributor charges for content use and agreeing to observe the copyright rights of the creator. A third agreement might exist between the distributor and a financial clearinghouse that allows the distributor to employ the clearinghouse's credit for payment for the product if the end-user has a separate (fourth) agreement directly with the clearinghouse extending credit to the end-user. A fifth, evolving agreement may develop between all value chain participants as content control information passes along its chain of handling. This evolving agreement can establish the rights of all parties to content usage information, including, for example, the nature of information to be received by each party and the pathway of handling of content usage information and related procedures. A sixth agreement in this example, may involve all parties to the agreement and establishes certain general assumptions, such as security techniques and degree of trustedness (for example, commercial integrity of the system may require each VDE installation secure subsystem to electronically warrant that their VDE node meets certain interoperability requirements). In the above example, these six agreements could comprise agreements of an extended agreement for this commercial value chain instance.

VDE agreements support evolving ("living") electronic agreement arrangements that can be modified by current and/or new participants through very simple to sophisticated "negotiations" between newly proposed content control information interacting with control information already in place and/or by negotiation between concurrently proposed content control information submitted by a plurality of parties. A given model may be asynchronously and progressively modified over time in accordance with existing senior rules and such modification may be applied to all, to classes of, and/or to specific content, and/or to classes and/or specific users and/or user nodes. A given piece of content may be subject to different control information at different times or places of handling, depending on the evolution of its content control information (and/or on differing, applicable VDE installation content control information). The evolution of control information can occur during the passing along of one or more VDE control information containing objects, that is control information may be modified at one or more points along a chain of control information handling, so long as such modification is allowed. As a result, VDE managed content may have different control information applied at both different "locations" in a chain of content handling and at similar locations in differing chains of the handling of such content. Such different application of control information may also result from content control information specifying that a certain party or group of parties shall be subject to content control information that differs from another party or group of parties. For example, content control information for a given piece of content may be stipulated as senior information and therefore not changeable, might be put in place by a content creator and might stipulate that national distributors of a given piece of their content may be permitted to make 100,000 copies per calendar quarter, so long as such copies are provided to boni fide end-users, but may pass only a single copy of such content to a local retailers and the control information limits such a retailer to making no more than 1,000 copies per month for retail sales to end-users. In addition, for example, an end-user of such content might be limited by the same content control information to making three copies of such content, one for each of three different computers he or she uses (one desktop computer at work, one for a desktop computer at home, and one for a portable computer).

Electronic agreements supported by the preferred embodiment of the present invention can vary from very simple to very elaborate. They can support widely diverse information management models that provide for electronic information security, usage administration, and communication and may support:

(a) secure electronic distribution of information, for example commercial literary properties,
(b) secure electronic information usage monitoring and reporting,
(c) secure financial transaction capabilities related to both electronic information and/or appliance usage and other electronic credit and/or currency usage and administration capabilities,
(d) privacy protection for usage information a user does not wish to release, and
(e) "living" electronic information content dissemination models that flexibly accommodate:
(1) a breadth of participants,
(2) one or more pathways (chains) for: the handling of content, content and/or appliance control information, reporting of content and/or appliance usage related information, and/or payment,
(3) supporting an evolution of terms and conditions incorporated into content control information, including use of electronic negotiation capabilities,
(4) support the combination of multiple pieces of content to form new content aggregations, and
(5) multiple concurrent models.

Secure Processing Units

An important part of VDE provided by the present invention is the core secure transaction control arrangement, herein called an SPU (or SPUs), that typically must be present in each user's computer, other electronic appliance, or network. SPUs provide a trusted environment for generating decryption keys, encrypting and decrypting information, managing the secure communication of keys and other information between electronic appliances (i.e. between VDE installations and/or between plural VDE instances within a single VDE installation), securely accumulating and managing audit trail, reporting, and budget information in secure and/or non-secure non-volatile memory, maintaining a secure database of control information management instructions, and providing a secure environment for performing certain other control and administrative functions.

A hardware SPU (rather than a software emulation) within a VDE node is necessary if a highly trusted environment for performing certain VDE activities is required. Such a trusted environment may be created through the use of certain control software, one or more tamper resistant hardware modules such as a semiconductor or semiconductor chipset (including, for example, a tamper resistant hardware electronic appliance peripheral device), for use within, and/or operatively connected to, an electronic appliance. With the present invention, the trustedness of a hardware SPU can be enhanced by enclosing some or all of its hardware elements within tamper resistant packaging and/or by employing other tamper resisting techniques (e.g. microfusing and/or thin wire detection techniques). A trusted environment of the present invention implemented, in part, through the use of tamper resistant semiconductor design, contains control logic, such as a microprocessor, that securely executes VDE processes.

A VDE node's hardware SPU is a core component of a VDE secure subsystem and may employ some or all of an electronic appliance's primary control logic, such as a microcontroller, microcomputer or other CPU arrangement. This primary control logic may be otherwise employed for non VDE purposes such as the control of some or all of an electronic appliance's non-VDE functions. When operating in a hardware SPU mode, said primary control logic must be sufficiently secure so as to protect and conceal important VDE processes. For example, a hardware SPU may employ a host electronic appliance microcomputer operating in protected mode while performing VDE related activities, thus allowing portions of VDE processes to execute with a certain degree of security. This alternate embodiment is in contrast to the preferred embodiment wherein a trusted environment is created using a combination of one or more tamper resistant semiconductors that are not part of said primary control logic. In either embodiment, certain control information (software and parameter data) must be securely maintained within the SPU, and further control information can be stored externally and securely (e.g. in encrypted and tagged form) and loaded into said hardware SPU when needed. In many cases, and in particular with microcomputers, the preferred embodiment approach of employing special purpose secure hardware for executing said VDE processes, rather than using said primary control logic, may be more secure and efficient. The level of security and tamper resistance required for trusted SPU hardware processes depends on the commercial requirements of particular markets or market niches, and may vary widely.

BRIEF DESCRIPTION OF THE DRAWINGS

These and other features and advantages provided by the present invention(s) may be better and more completely understood by referring to the following detailed description of presently preferred example embodiments in connection with the drawings, of which:

FIGS. 14A-14C are examples of SPU memory maps provided by the protected processing environment shown in FIG. 13;

FIGS. 72A-72D show examples of "pop-up" displays that may be generated by the user notification and exception interface;

MORE DETAILED DESCRIPTION

FIGS. 1-7 and the discussion below provides an overview of some aspects of features provided by this invention. Following this overview is a more technical "detail description" of example embodiments in accordance with the invention.

Overview

Figure 1:
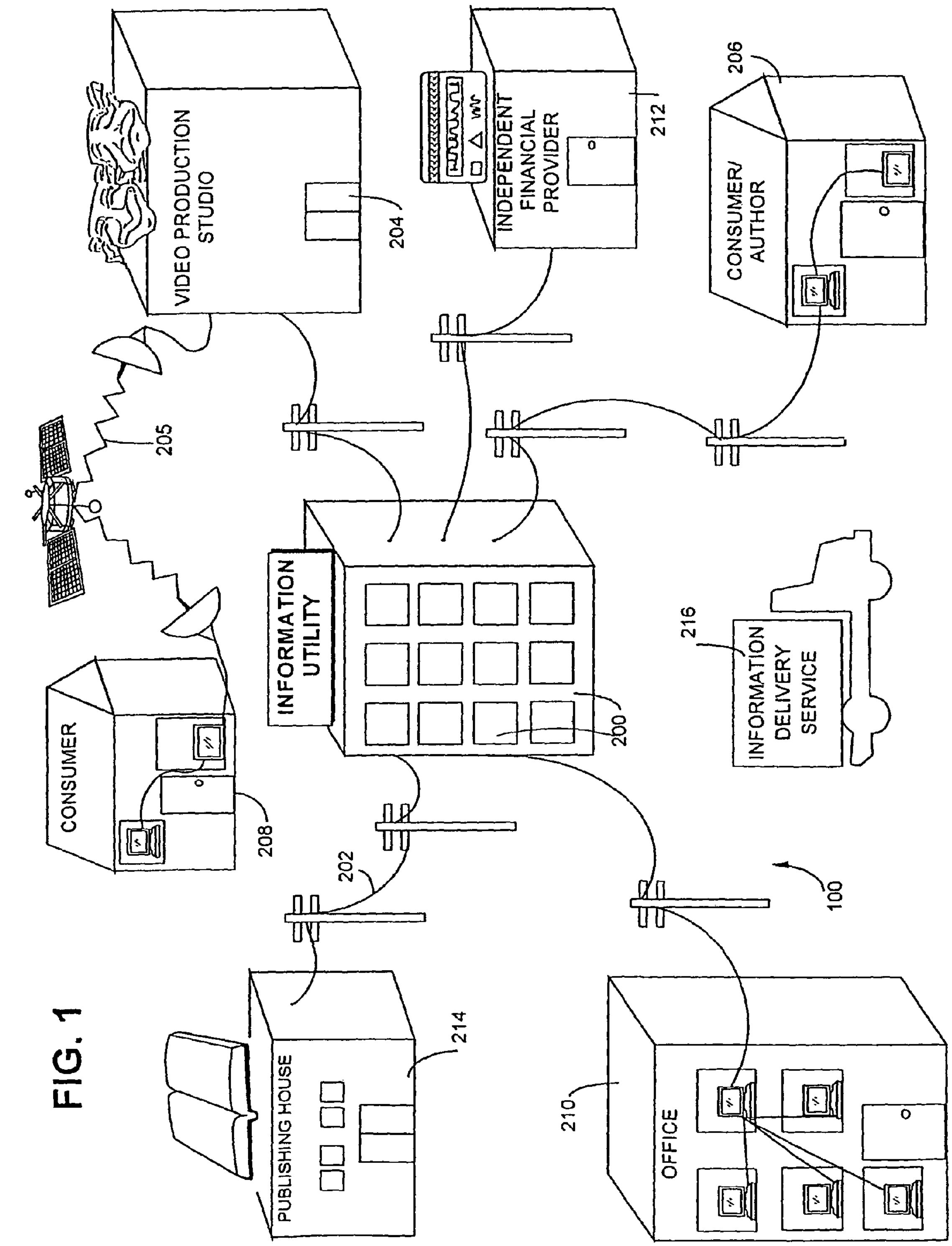
FIG. 1 illustrates an example of a "Virtual Distribution Environment" provided in accordance with a preferred example/embodiment of this invention.

FIG. 1 shows a "Virtual Distribution Environment" ("VDE") 100 that may be provided in accordance with this invention. In FIG. 1, an information utility 200 connects to communications means 202 such as telephone or cable TV lines for example. Telephone or cable TV lines 202 may be part of an "electronic highway" that carries electronic information from place to place. Lines 202 connect information utility 200 to other people such as for example a consumer 208, an office 210, a video production studio 204, and a publishing house 214. Each of the people connected to information utility 200 may be called a "VDE participant" because they can participate in transactions occurring within the virtual distribution environment 100.

Almost any sort of transaction you can think of can be supported by virtual distribution environment 100. A few of many examples of transactions that can be supported by virtual distribution environment 100 include:

home banking and electronic payments;

electronic legal contracts;

distribution of "content" such as electronic printed matter, video, audio, images and computer programs; and secure communication of private information such as medical records and financial information.

Virtual distribution environment 100 is "virtual" because it does not require many of the physical "things" that used to be necessary to protect rights, ensure reliable and predictable distribution, and ensure proper compensation to content creators and distributors. For example, in the past, information was distributed on records or disks that were difficult to copy. In the past, private or secret content was distributed in sealed envelopes or locked briefcases delivered by courier. To ensure appropriate compensation, consumers received goods and services only after they handed cash over to a seller. Although information utility 200 may deliver information by transferring physical "things" such as electronic storage media, the virtual distribution environment 100 facilitates a completely electronic "chain of handling and control."

VDE Flexibility Supports Transactions

Information utility 200 flexibly supports many different kinds of information transactions. Different VDE participants may define and/or participate in different parts of a transaction. Information utility 200 may assist with delivering information about a transaction, or it may be one of the transaction participants.

For example, the video production studio 204 in the upper right-hand corner of FIG. 1 may create video/television programs. Video production studio 204 may send these programs over lines 202, or may use other paths such as satellite link 205 and CD ROM delivery service 216. Video production studio 204 can send the programs directly to consumers 206, 208, 210, or it can send the programs to information utility 200 which may store and later send them to the consumers, for example. Consumers 206, 208, 210 are each capable of receiving and using the programs created by video production studio 204—assuming, that is, that the video production studio or information utility 200 has arranged for these consumers to have appropriate "rules and controls" (control information) that give the consumers rights to use the programs.

Even if a consumer has a copy of a video program, she cannot watch or copy the program unless she has "rules and controls" that authorize use of the program. She can use the program only as permitted by the "rules and controls."

For example, video production studio 204 might release a half-hour exercise video in the hope that as many viewers as possible will view it. The video production studio 204 wishes to receive $2.00 per viewing. Video production studio 204 may, through information utility 200, make the exercise video available in "protected" form to all consumers 206, 208, 210. Video production studio 204 may also provide "rules and controls" for the video. These "rules and controls" may specify for example:

(1) any consumer who has good credit of at least $2.00 based on a credit account with independent financial provider 212 (such as Mastercard or VISA) may watch the video, (2) virtual distribution environment 100 will "meter" each time a consumer watches the video, and report usage to video production studio 204 from time to time, and (3) financial provider 212 may electronically collect payment ($2.00) from the credit account of each consumer who watches the video, and transfer these payments to the video production studio 204.

Information utility 200 allows even a small video production studio to market videos to consumers and receive compensation for its efforts. Moreover, the videos can, with appropriate payment to the video production studio, be made available to other video 10 publishers who may add value and/or act as repackagers or redistributors.

FIG. 1 also shows a publishing house 214. Publishing house 214 may act as a distributor for an author 206. The publishing house 214 may distribute rights to use "content" (such as computer software, electronic newspapers, the video produced, by publishing house 214, audio, or any other data) to consumers such as office 210. The use rights may be defined by "rules and controls" distributed by publishing house 216. Publishing house 216 may distribute these "rules and controls" with the content, but this is not necessary. Because the content can be used only by consumers that have the appropriate "rules and controls," content and its associated "rules and controls" may be distributed at different times, in different ways, by different VDE participants. The ability of VDE to securely distribute and enforce "rules and controls" separately from the content they apply to provides great advantages.

Use rights distributed by publishing house 214 may, for example, permit office 210 to make and distribute copies of the content to its employees. Office 210 may act as a redistributor by extending a "chain of handling and control" to its employees. The office 210 may add or modify "rules and controls" (consistent with the "rules and controls" it receives from publishing house 214) to provide office-internal control information and mechanisms. For example, office 210 may set a maximum usage budget for each individual user and/or group within the office, or it may permit only specified employees and/or groups to access certain information.

FIG. 1 also shows an information delivery service 216 delivering electronic storage media such as "CD ROM" disks to consumers 206. Even though the electronic storage media themselves are not delivered electronically by information utility 200 over lines 202, they are still part of the virtual distribution environment 100. The electronic storage media may be used to distribute content, "rules and controls," or other information.

Example of What's Inside Information Utility 200

Figure 1A:
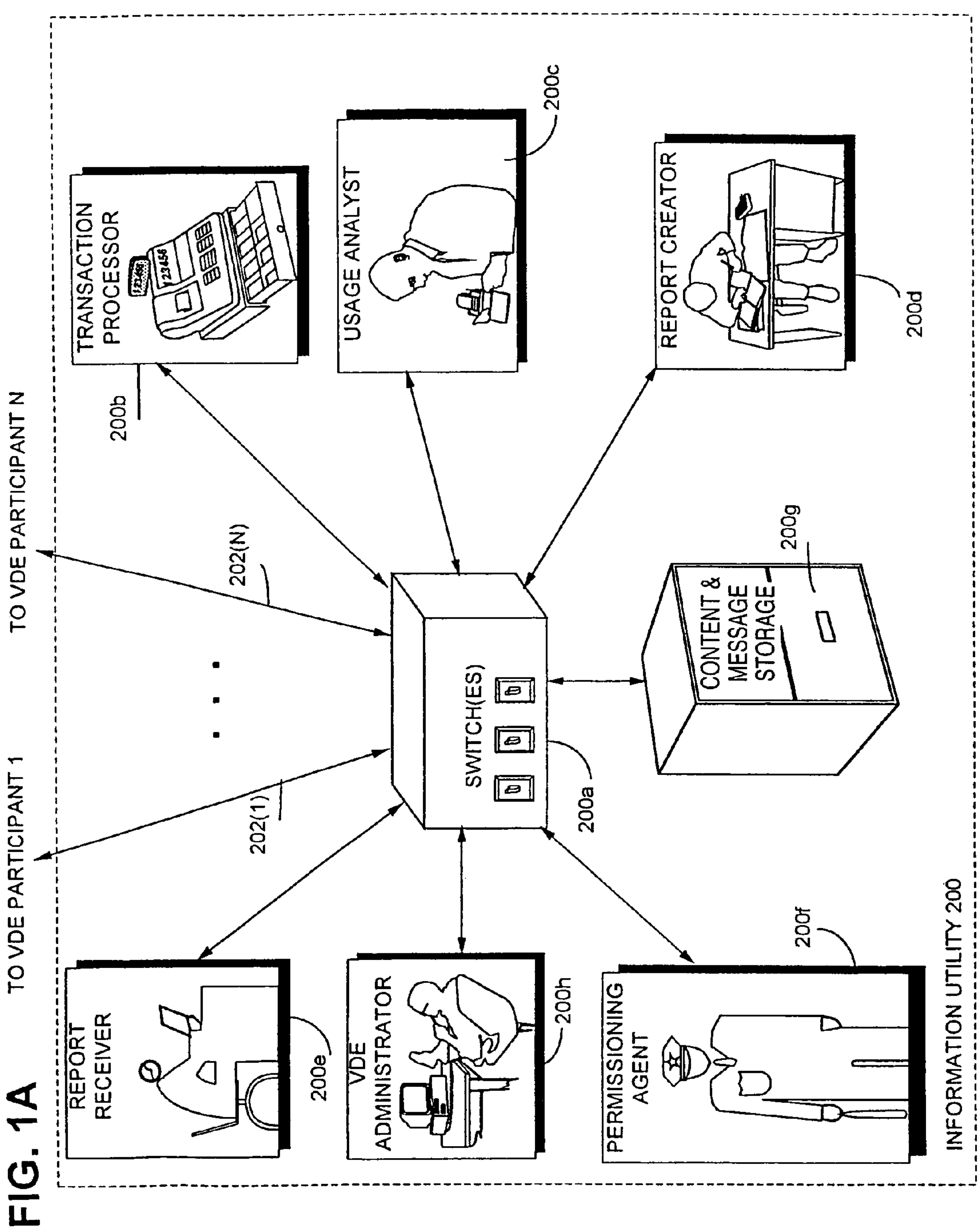
FIG. 1A is a more detailed illustration of an example of the "Information Utility" shown in FIG. 1.

"Information utility" 200 in FIG. 1 can be a collection of participants that may act as distributors, financial clearinghouses, and administrators. FIG. 1A shows an example of what may be inside one example of information utility 200. Information utility participants 200*a*-200*g* could each be an independent organization/business. There can be any number of each of participants 200*a*-200*g*. In this example, electronic "switch" 200*a* connects internal parts of information utility 200 to each other and to outside participants, and may also connect outside participants to one another.

Information utility 200 may include a "transaction processor" 200*b* that processes transactions (to transfer electronic funds, for example) based on requests from participants and/or report receiver 200*e*. It may also include a "usage analyst" 200*c* that analyzes reported usage information. A "report creator" 200*d* may create reports based on usage for example, and may provide these reports to outside participants and/or to participants within information utility 200. A "report receiver" 200*e* may receive reports such as usage reports from content users. A "permissioning agent" 200*f* may distribute "rules and controls" granting usage or distribution permissions based on a profile of a consumer's credit worthiness, for example. An administrator 200*h* may provide information that keeps the virtual distribution environment 100 operating properly. A content and message storage 200*g* may store information for use by participants within or outside of information utility 200.

Example of Distributing "Content" Using a "Chain of Handling and Control"

Figure 2:
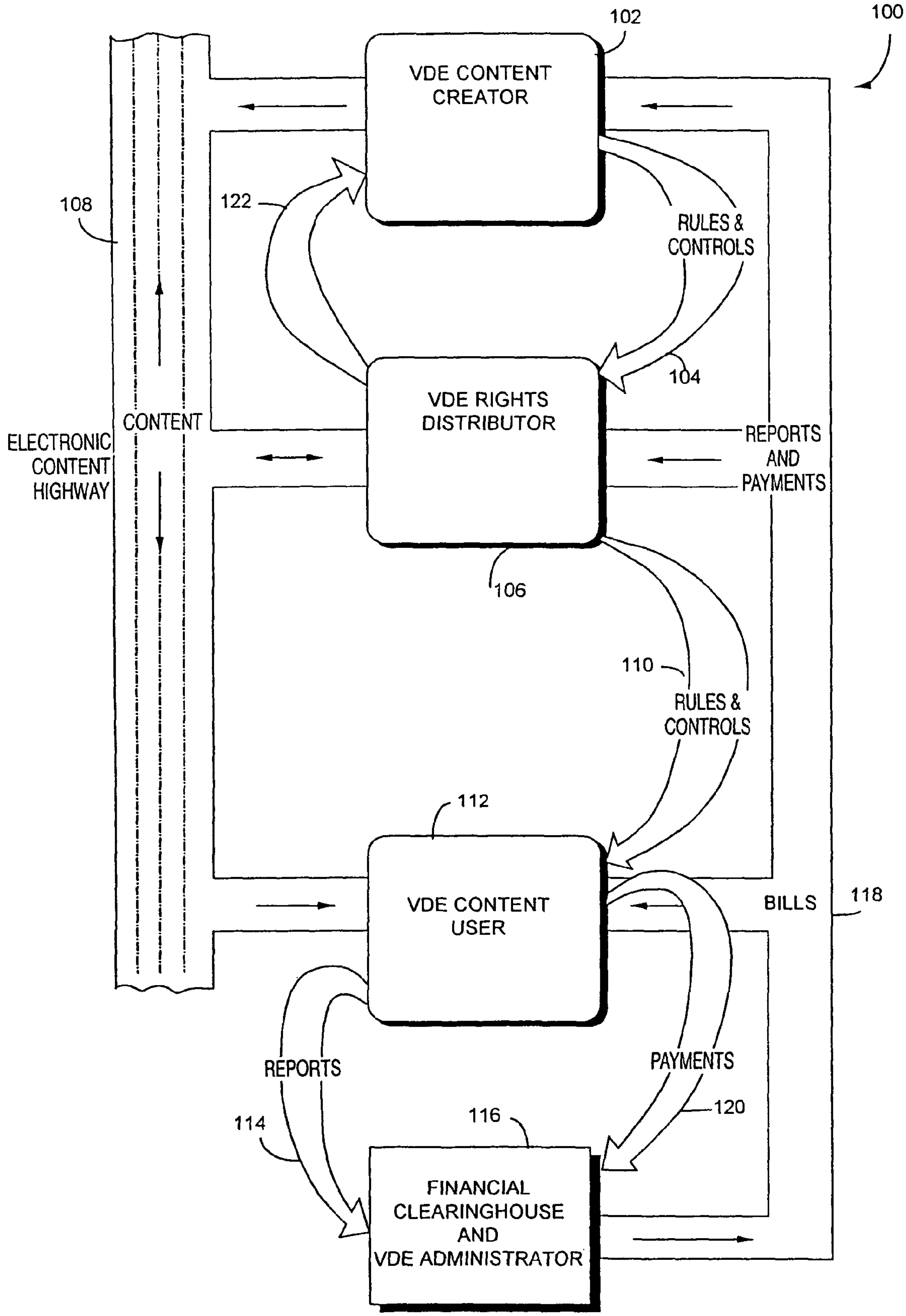
FIG. 2 illustrates an example of a chain of handling and control.

As explained above, virtual distribution environment 100 can be used to manage almost any sort of transaction. One type of important transaction that virtual distribution environment 100 may be used to manage is the distribution or communication of "content" or other important information. FIG. 2 more abstractly shows a "model" of how the FIG. 1 virtual distribution environment 100 may be used to provide a "chain of handling and control" for distributing content. Each of the blocks in FIG. 2 may correspond to one or more of the VDE participants shown in FIG. 1.

In the FIG. 2 example, a VDE content creator 102 creates "content." The content creator 102 may also specify "rules and controls" for distributing the content. These distribution-related "rules and controls" can specify who has permission to distribute the rights to use content, and how many users are allowed to use the content.

Arrow 104 shows the content creator 102 sending the "rules and controls" associated with the content to a VDE rights distributor 106 ("distributor") over an electronic highway 108 (or by some other path such as an optical disk sent by a delivery service such as U.S. mail). The content can be distributed over the same or different path used to send the "rules and controls."

The distributor 106 generates her own "rules and controls" that relate to usage of the content. The usage-related "rules and controls" may, for example, specify what a user can and can't do with the content and how much it costs to use the content. These usage-related "rules and controls" must be consistent with the "rules and controls" specified by content creator 102.

Arrow 110 shows the distributor 106 distributing rights to use the content by sending the content's "rules and controls" to a content user 112 such as a consumer. The content user 112 uses the content in accordance with the usage-related "rules and controls."

In this FIG. 2 example, information relating to content use is, as shown by arrow 114, reported to a financial clearinghouse 116. Based on this "reporting," the financial clearinghouse 116 may generate a bill and send it to the content user 112 over a "reports and Payments" network 118. Arrow 120 shows the content user 112 providing Payments for content usage to the financial clearinghouse 116. Based on the reports and payments it receives, the financial clearinghouse 116 may provide reports and/or payments to the distributor 106. The distributor 106 may, as shown by arrow 122, provide reports and/or payments to the content creator 102. The clearinghouse 116 may provide reports and payments directly to the creator 102. Reporting and/or payments may be done differently. For example, clearinghouse 116 may directly or through an agent, provide reports and/or payments to each of VDE content creators 102, and rights distributor 106, as well as reports to content user 112.

The distributor 106 and the content creator 102 may be the same person, or they may be different people. For example, a musical performing group may act as both content creator 102 and distributor 106 by creating and distributing its own musical recordings. As another example, a publishing house may act as a distributor 106 to distribute rights to use works created by an author content creator 102. Content creators 102 may use a distributor 106 to efficiently manage the financial end of content distribution.

The "financial clearinghouse" 116 shown in FIG. 2 may also be a "VDE administrator." Financial clearinghouse 116 in its VDE administrator role sends "administrative" information to the VDE participants. This administrative information helps to keep the virtual distribution environment 100 operating properly. The "VDE administrator" and financial clearinghouse roles may be performed by different people or companies, and there can be more than one of each.

More About "Rules and Controls"

The virtual distribution environment 100 prevents use of protected information except as permitted by the "rules and controls" (control information). For example, the "rules and controls" shown in FIG. 2 may grant specific individuals or classes of content users 112 "permission" to use certain content. They may specify what kinds of content usage are permitted, and what kinds are not. They may specify how content usage is to be paid for and how much it costs. As another example, "rules and controls" may require content usage information to be reported back to the distributor 106 and/or content creator 102.

Every VDE participant in "chain of handling and control" is normally subject to "rules and controls." "Rules and controls" define the respective rights and obligations of each of the various VDE participants. "Rules and controls" provide information and mechanisms that may establish interdependencies and relationships between the participants. "Rules and controls" are flexible, and permit "virtual distribution environment" 100 to support most "traditional" business transactions. For example:

"Rules and controls" may specify which financial clearinghouse(s) 116 may process payments, "Rules and controls" may specify which participant(s) receive what kind of usage report, and "Rules and controls" may specify that certain information is revealed to certain participants, and that other information is kept secret from them.

"Rules and controls" may self limit if and how they may be changed. Often, "rules and controls" specified by one VDE participant cannot be changed by another VDE participant. For example, a content user 112 generally can't change "rules and controls" specified by a distributor 106 that require the user to pay for content usage at a certain rate. "Rules and controls" may "persist" as they pass through a "chain of handling and control," and may be "inherited" as they are passed down from one VDE participant to the next.

Figure 2A:
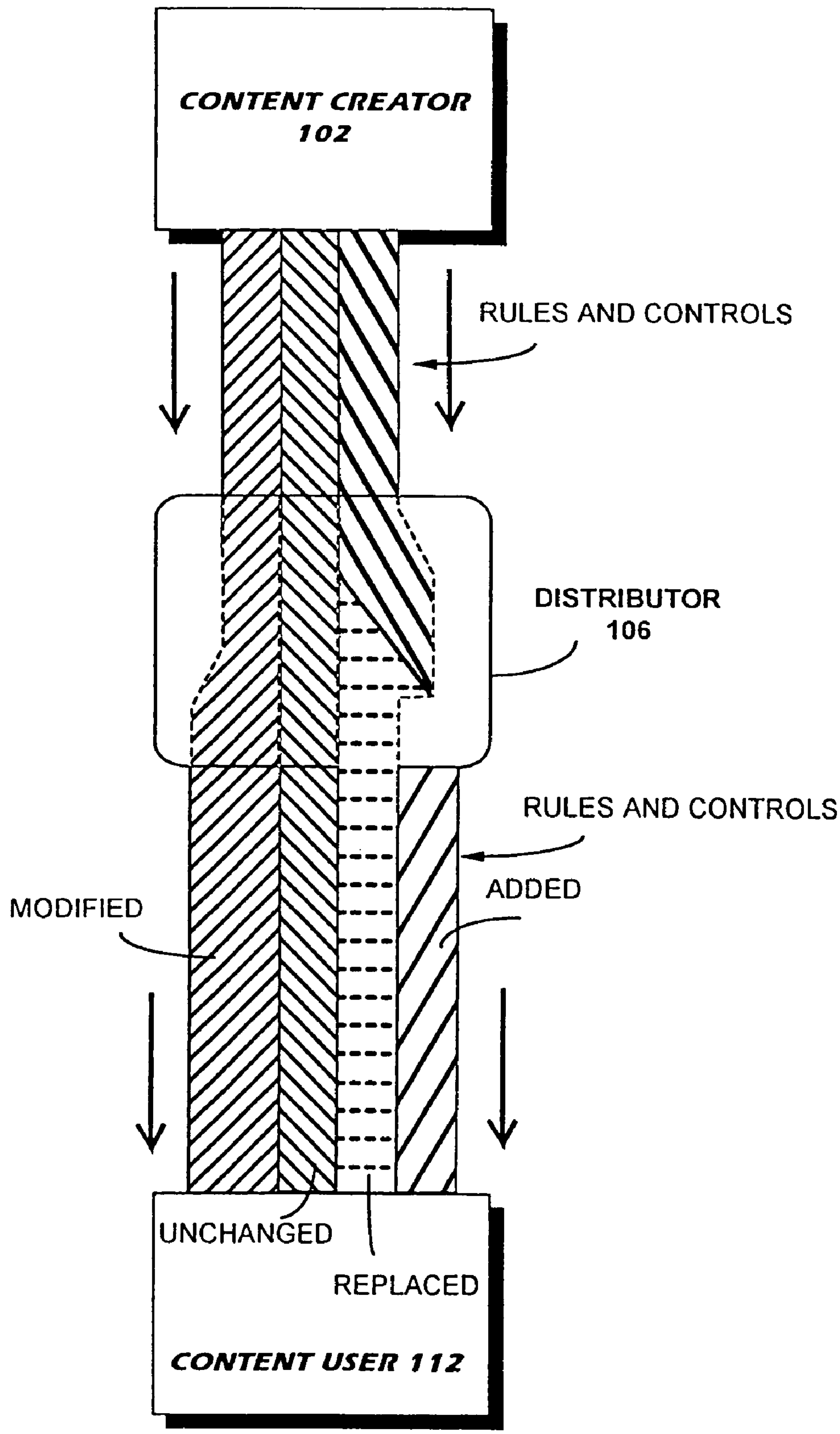
FIG. 2A illustrates one example of how rules and control information may persist from one participant to another in the FIG. 2 chain of handling and control.

Depending upon their needs, VDE participants can specify that their "rules and controls" can be changed under conditions specified by the same or other "rules and controls." For example, "rules and controls" specified by the content creator 102 may permit the distributor 106 to "mark up" the usage price just as retail stores "mark up" the wholesale price of goods. FIG. 2A shows an example in which certain "rules and controls" persist unchanged from content creator 102 to content user 112; other "rules and controls" are modified or deleted by distributor 106; and still other "rules and controls" are added by the distributor.

"Rules and controls" can be used to protect the content user's privacy by limiting the information that is reported to other VDE participants. As one example, "rules and controls" can cause content usage information to be reported anonymously without revealing content user identity, or it can reveal only certain information to certain participants (for example, information derived from usage) with appropriate permission, if required. This ability to securely control what information is revealed and what VDE participant(s) it is revealed to allows the privacy rights of all VDE participants to be protected.

"Rules and Contents" can be Separately Delivered

As mentioned above, virtual distribution environment 100 "associates" content with corresponding "rules and controls," and prevents the content from being used or accessed unless a set of corresponding "rules and controls" is available. The distributor 106 doesn't need to deliver content to control the content's distribution. The preferred embodiment can securely protect content by protecting corresponding, usage enabling "rules and controls" against unauthorized distribution and use.

In some examples, "rules and controls" may travel with the content they apply to. Virtual distribution environment 100 also allows "rules and controls" to be delivered separately from content. Since no one can use or access protected content without "permission" from corresponding "rules and controls," the distributor 106 can control use of content that has already been (or will in the future be), delivered. "Rules and controls" may be delivered over a path different from the one used for content delivery. "Rules and controls" may also be delivered at some other time. The content creator 102 might deliver content to content user 112 over the electronic highway 108, or could make the content available to anyone on the highway. Content may be used at the time it is delivered, or it may be stored for later use or reuse.

The virtual distribution environment 100 also allows payment and reporting means to be delivered separately. For example, the content user 112 may have a virtual "credit card" that extends credit (up to a certain limit) to pay for usage of any content. A "credit transaction" can take place at the user's site without requiring any "online" connection or further authorization. This invention can be used to help securely protect the virtual "credit card" against unauthorized use.

"Rules and Contents" Define Processes

Figure 3:
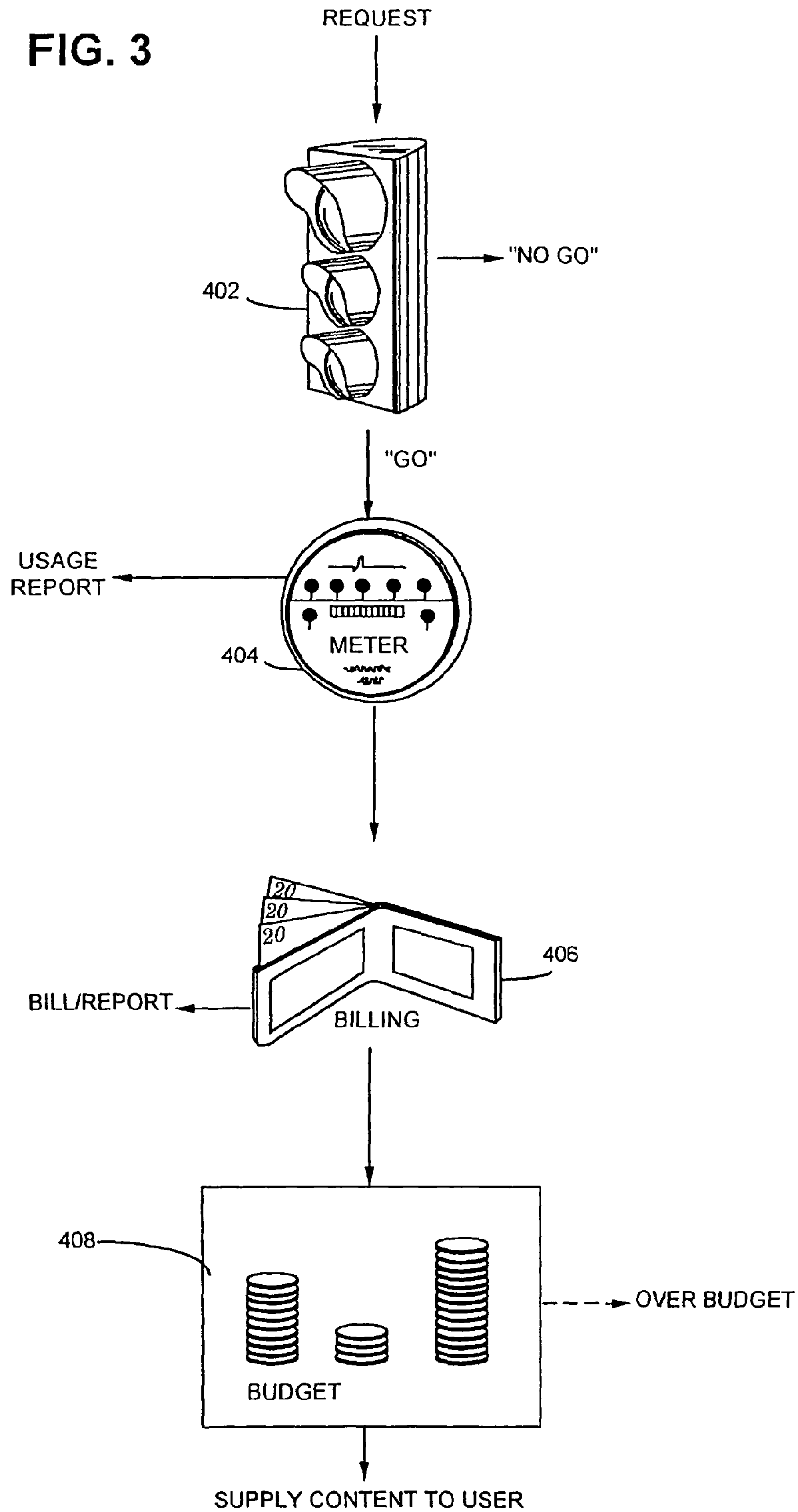
FIG. 3 shows one example of different control information that may be provided.

FIG. 3 shows an example of an overall process based on "rules and controls." It includes an "events" process 402, a meter process 404, a billing process 406, and a budget process 408. Not all of the processes shown in FIG. 3 will be used for every set of "rules and controls."

The "events process" 402 detects things that happen ("events") and determines which of those "events" need action by the other "processes." The "events" may include, for example, a request to use content or generate a usage permission. Some events may need additional processing, and others may not. Whether an "event" needs more processing depends on the "rules and controls" corresponding to the content. For example, a user who lacks permission will not have her request satisfied ("No Go"). As another example, each user request to turn to a new page of an electronic book may be satisfied ("Go"), but it may not be necessary to meter, bill or budget those requests. A user who has purchased a copy of a novel may be permitted to open and read the novel as many times as she wants to without any further metering, billing or budgeting. In this simple example, the "event process" 402 may request metering, billing and/or budgeting processes the first time the user asks to open the protected novel (so the purchase price can be charged to the user), and treat all later requests to open the same novel as "insignificant events." Other content (for example, searching an electronic telephone directory) may require the user to pay a fee for each access.

Figure 4:
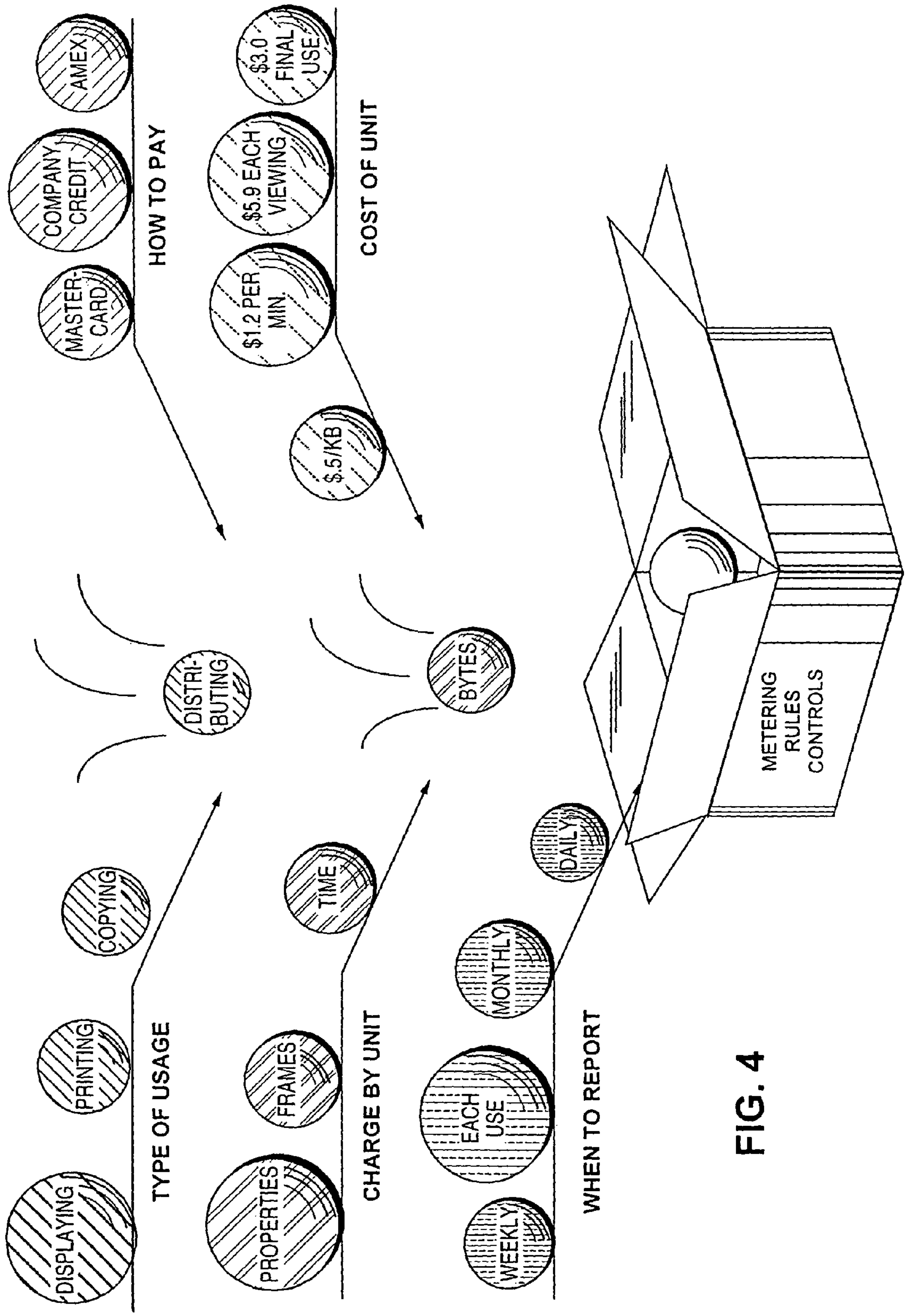
FIG. 4 illustrates examples of some different types of rules and/or control information.

"Meter" process 404 keeps track of events, and may report usage to distributor 106 and/or other appropriate VDE participant(s). FIG. 4 shows that process 404 can be based on a number of different factors such as:

(a) type of usage to charge for, (b) what kind of unit to base charges on, (c) how much to charge per unit, (d) when to report, and (e) how to pay.

These factors may be specified by the "rules and controls" that control the meter process.

Billing process 406 determines how much to charge for events. It records and reports payment information.

Budget process 408 limits how much content usage is permitted. For example, budget process 408 may limit the number of times content may be accessed or copied, or it may limit the number of pages or other amount of content that can be used based on, for example, the number of dollars available in a credit account. Budget process 408 records and reports financial and other transaction information associated with such limits.

Content may be supplied to the user once these processes have been successfully performed.

Containers and "Objects"

Figure 5A:
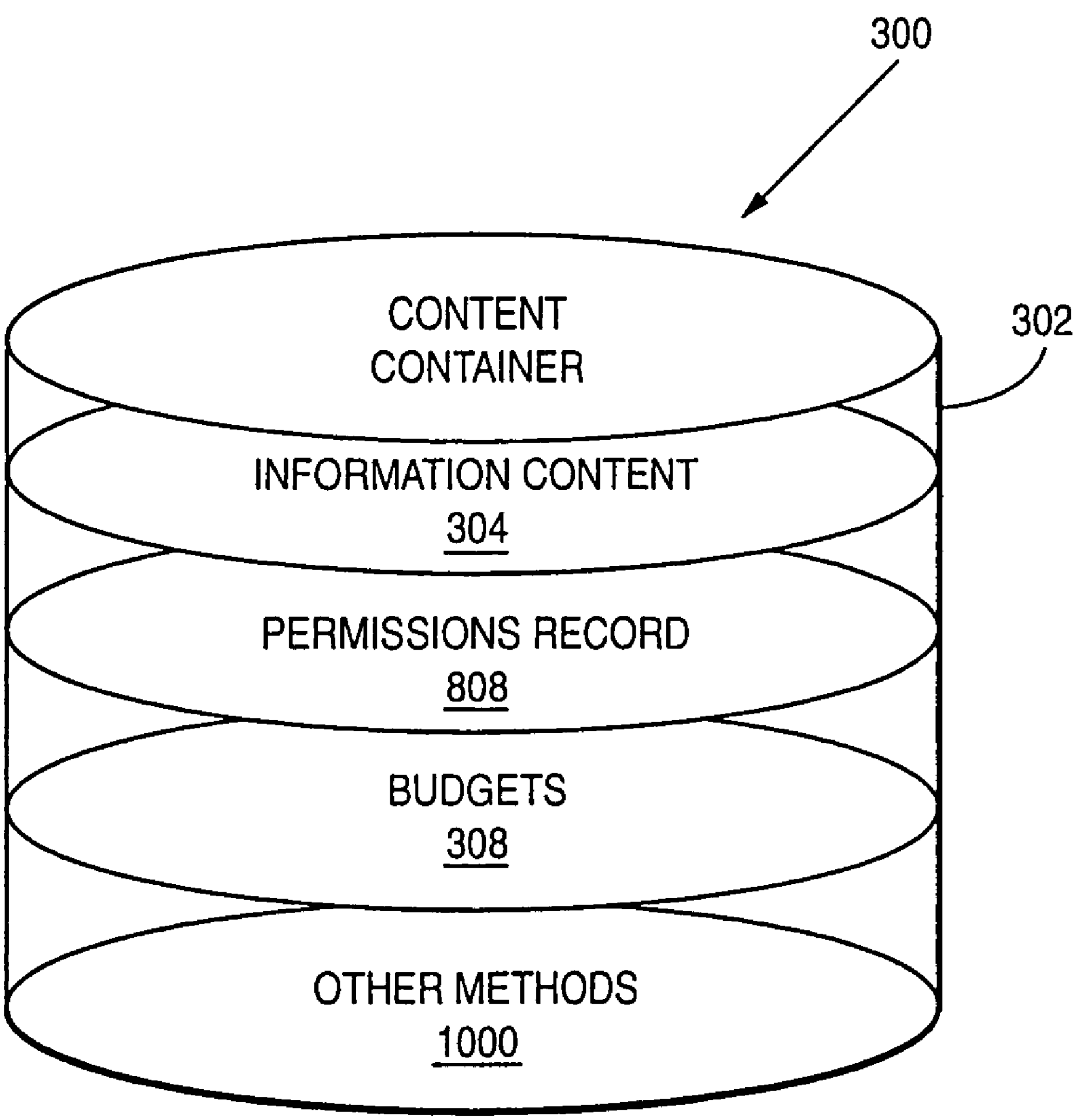
FIGS. 5A and 5B show an example of an "object"

FIG. 5A shows how the virtual distribution environment 100, in a preferred embodiment, may package information elements (content) into a "container" 302 so the information can't be accessed except as provided by its "rules and controls." Normally, the container 302 is electronic rather than physical. Electronic container 302 in one example comprises "digital" information having a well defined structure. Container 302 and its contents can be called an "object 300."

The FIG. 5A example shows items "within" and enclosed by container 302. However, container 302 may "contain" items without those items actually being stored within the container. For example, the container 302 may reference items that are available elsewhere such as in other containers at remote sites. Container 302 may reference items available at different times or only during limited times. Some items may be too large to store within container 302. Items may, for example, be delivered to the user in the form of a "live feed" of video at a certain time. Even then, the container 302 "contains" the live feed (by reference) in this example.

Container 302 may contain information content 304 in electronic (such as "digital") form. Information content 304 could be the text of a novel, a picture, sound such as a musical performance or a reading, a movie or other video, computer software, or just about any other kind of electronic information you can think of. Other types of "objects" 300 (such as "administrative objects") may contain "administrative" or other information instead of or in addition to information content 304.

In the FIG. 5A example, container 302 may also contain "rules and controls" in the form of:

(a) a "permissions record" 808, (b) "budgets" 308; and (c) "other methods" 1000.

Figure 5B:
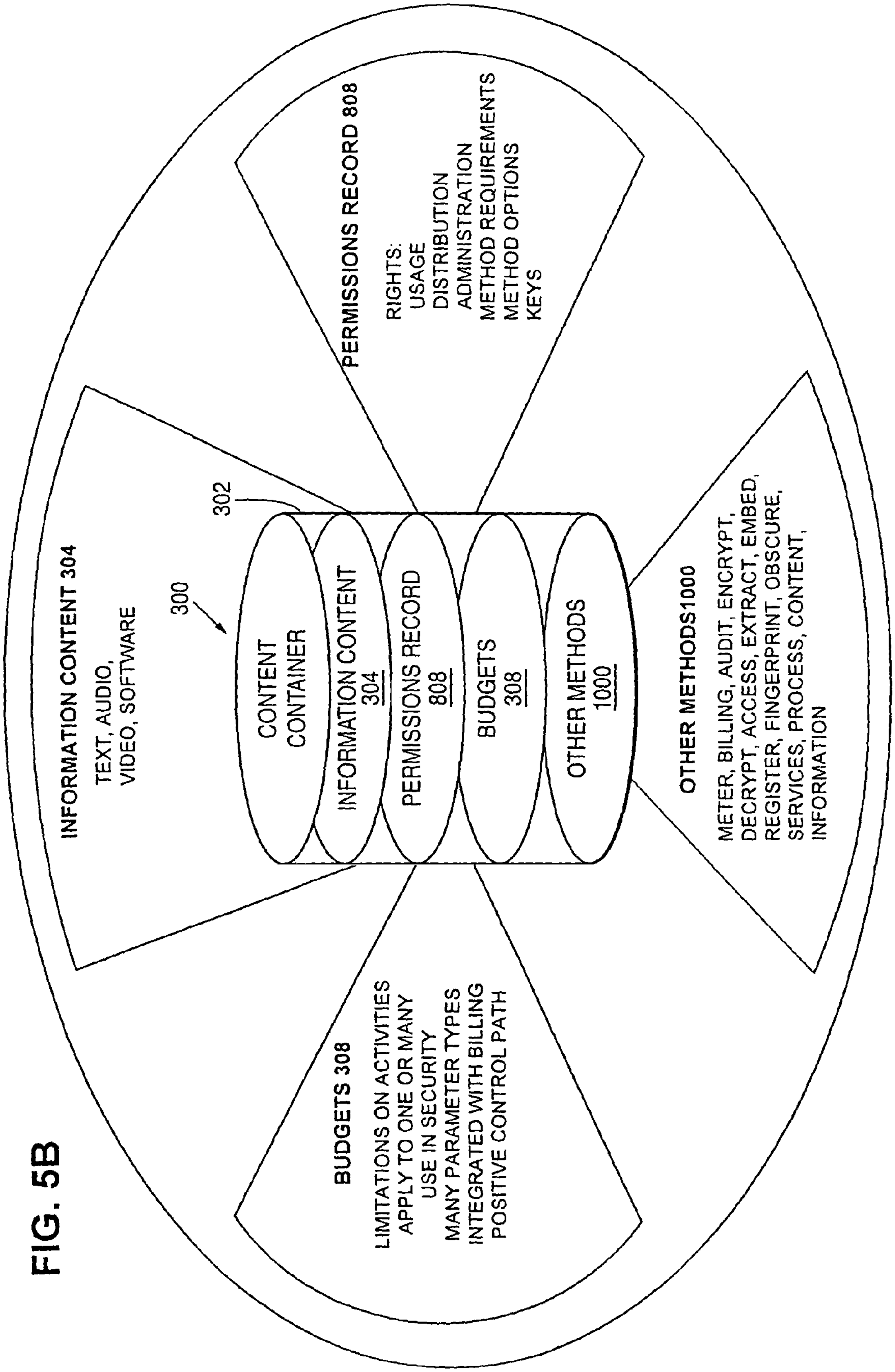

FIG. 5B gives some additional detail about permissions record 808, budgets 308 and other methods 1000. The "permissions record" 808 specifies the rights associated with the object 300 such as, for example, who can open the container 302, who can use the object's contents, who can distribute the object, and what other control mechanisms must be active. For example, permissions record 808 may specify a user's rights to use, distribute and/or administer the container 302 and its content. Permissions record 808 may also specify requirements to be applied by the budgets 308 and "other methods" 1000. Permissions record 808 may also contain security related information such as scrambling and descrambling "keys."

"Budgets" 308 shown in FIG. 5B are a special type of "method" 1000 that may specify, among other things, limitations on usage of information content 304, and how usage will be paid for. Budgets 308 can specify, for example, how much of the total information content 304 can be used and/or copied. The methods 310 may prevent use of more than the amount specified by a specific budget.

"Other methods" 1000 define basic operations used by "rules and controls." Such "methods" 1000 may include, for example, how usage is to be "metered," if and how content 304 and other information is to be scrambled and descrambled, and other processes associated with handling and controlling information content 304. For example, methods 1000 may record the identity of anyone who opens the electronic container 302, and can also control how information content is to be charged based on "metering." Methods 1000 may apply to one or several different information contents 304 and associated containers 302, as well as to all or specific portions of information content 304.

Secure Processing Unit (SPU)

Figure 6:
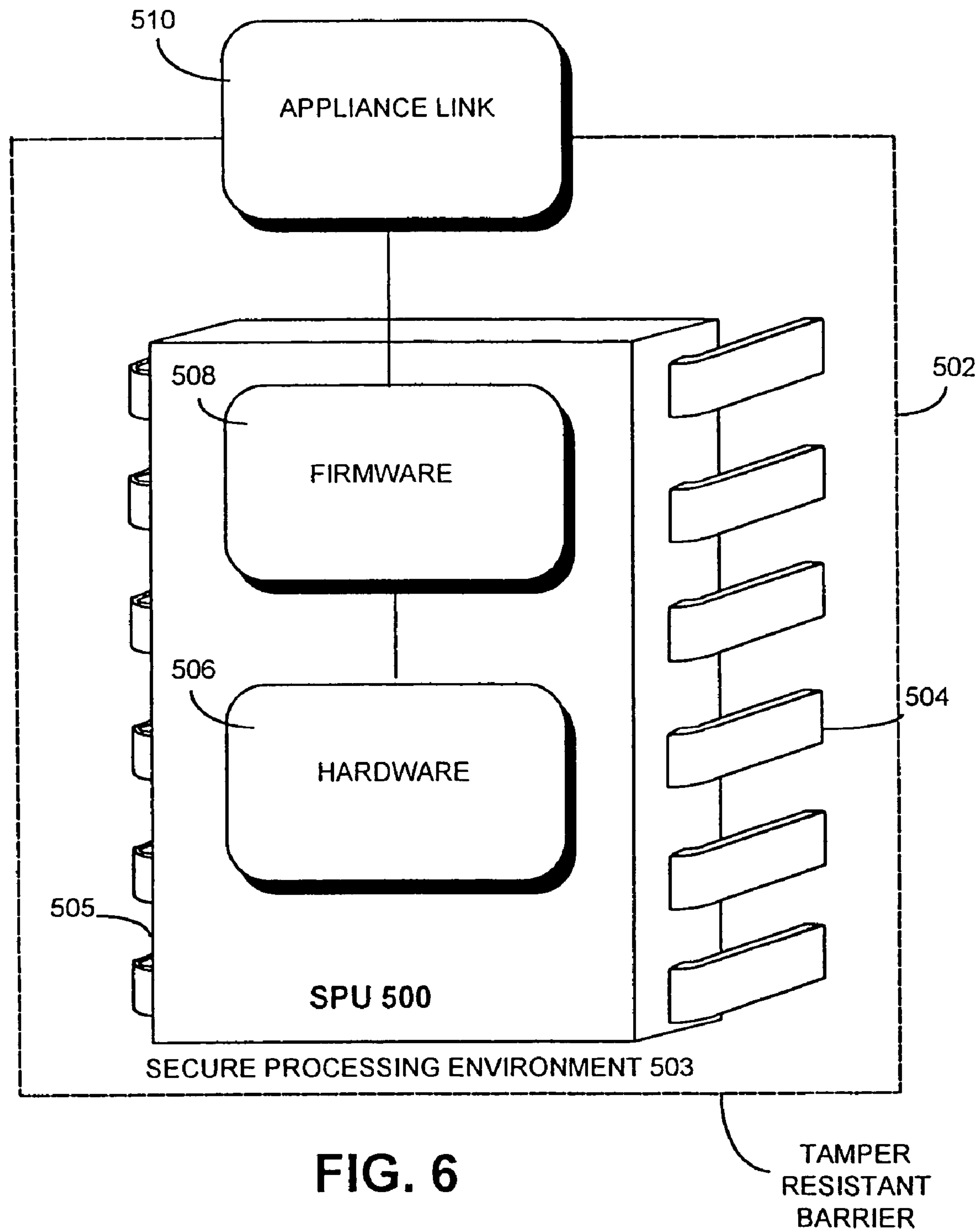
FIG. 6 shows an example of a Secure Processing Unit ("SPU")

The "VDE participants" may each have an "electronic appliance." The appliance may be or contain a computer. The appliances may communicate over the electronic highway 108. FIG. 6 shows a secure processing unit ("SPU") 500 portion of the "electronic appliance" used in this example by each VDE participant. SPU 500 processes information in a secure processing environment 503, and stores important information securely. SPU 500 may be emulated by software operating in a host electronic appliance.

SPU 500 is enclosed within and protected by a "tamper resistant security barrier" 502. Security barrier 502 separates the secure environment 503 from the rest of the world. It prevents information and processes within the secure environment 503 from being observed, interfered with and leaving except under appropriate secure conditions. Barrier 502 also controls external access to secure resources, processes and information within SPU 500. In one example, tamper resistant security barrier 502 is formed by security features such as "encryption," and hardware that detects tampering and/or destroys sensitive information within secure environment 503 when tampering is detected.

SPU 500 in this example is an integrated circuit ("IC") "chip" 504 including "hardware" 506 and "firmware" 508. SPU 500 connects to the rest of the electronic appliance through an "appliance link" 510. SPU "firmware" 508 in this example is "software" such as a "computer program(s)" "embedded" within chip 504. Firmware 508 makes the hardware 506 work. Hardware 506 preferably contains a processor to perform instructions specified by firmware 508. "Hardware" 506 also contains long-term and short-term memories to store information securely so it can't be tampered with. SPU 500 may also have a protected clock/calendar used for timing events. The SPU hardware 506 in this example may include special purpose electronic circuits that are specially designed to perform certain processes (such as "encryption" and "decryption") rapidly and efficiently.

The particular context in which SPU 500 is being used will determine how much processing capabilities SPU 500 should have SPU hardware 506, in this example, provides at least enough processing capabilities to support the secure parts of processes shown in FIG. 3. In some contexts, the functions of SPU 500 may be increased so the SPU can perform all the electronic appliance processing, and can be incorporated into a general purpose processor. In other contexts, SPU 500 may work alongside a general purpose processor, and therefore only needs to have enough processing capabilities to handle secure processes.

VDE Electronic Appliance and "Rights Operating System"

Figure 7:
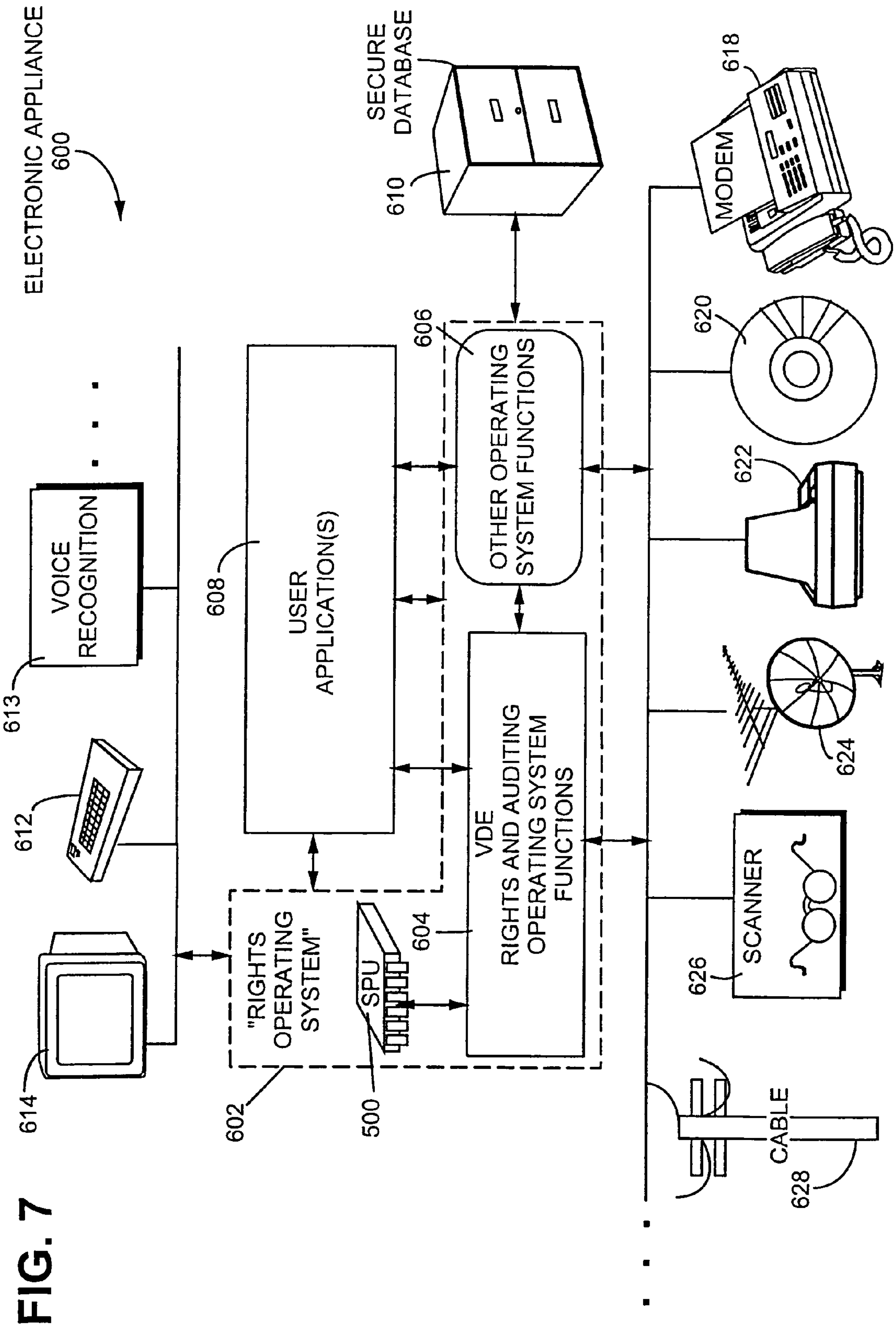
FIG. 7 shows an example of an electronic appliance.

FIG. 7 shows an example of an electronic appliance 600 including SPU 500. Electronic appliance 600 may be practically any kind of electrical or electronic device, such as:

a computer a T.V. "set top" control box a pager a telephone
a sound system
a video reproduction system
a video game player
a "smart" credit card.

Electronic appliance 600 in this example may include a keyboard or keypad 612, a voice recognizer 613, and a display 614. A human user can input commands through keyboard 612 and/or voice recognizer 613, and may view information on display 614. Appliance 600 may communicate with the outside world through any of the connections/devices normally used within an electronic appliance. The connections/devices shown along the bottom of the drawing are examples:

a "modem" 618 or other telecommunications link;
a CD ROM disk 620 or other storage medium or device;
a printer 622;
broadcast reception 624;
a document scanner 626; and
a "cable" 628 connecting the appliance with a "network."

Virtual distribution environment 100 provides a "rights operating system" 602 that manages appliance 600 and SPU 500 by controlling their hardware resources. The operating system 602 may also support at least one "application" 608. Generally, "application" 608 is hardware and/or software specific to the context of appliance 600. For example, if appliance 600 is a personal computer, then "application" 608 could be a program loaded by the user, for instance, a word processor, a communications system or a sound recorder. If appliance 600 is a television controller box, then application 608 might be hardware or software that allows a user to order videos on demand and perform other functions such as fast forward and rewind. In this example, operating system 602 provides a standardized, well defined, generalized "interface" that could support and work with many different "applications" 608.

Operating system 602 in this example provides "rights and, auditing operating system functions" 604 and "other operating system functions" 606. The "rights and auditing operating system functions" 604 securely handle tasks that relate to virtual distribution environment 100. SPU 500 provides or supports many of the security functions of the "rights and auditing operating system functions" 402. The "other operating system functions" 606 handle general appliance functions. Overall operating system 602 may be designed from the beginning to include the "rights and auditing operating system functions" 604 plus the "other operating system functions" 606, or the "rights and auditing operating system functions" may be an add-on to a preexisting operating system providing the "other operating system functions."

"Rights operating system" 602 in this example can work with many different types of appliances 600. For example, it can work with large mainframe computers, "minicomputers" and "microcomputers" such as personal computers and portable computing devices. It can also work in control boxes on the top of television sets, small portable "pagers," desktop radios, stereo sound systems, telephones, telephone switches, or any other electronic appliance. This ability to work on big appliances as well as little appliances is called "scalable." A "scalable" operating system 602 means that there can be a standardized interface across many different appliances performing a wide variety of tasks.

The "rights operating system functions" 604 are "services-based" in this example. For example, "rights operating system functions" 604 handle summary requests from application 608 rather than requiring the application to always make more detailed "subrequests" or otherwise get involved with the underlying complexities involved in satisfying a summary request. For example, application 608 may simply ask to read specified information; "rights operating system functions" 604 can then decide whether the desired information is VDE-protected content and, if it is, perform processes needed to make the information available. This feature is called "transparency." "Transparency" makes tasks easy for the application 608. "Rights operating system functions" 604 can support applications 608 that "know" nothing about virtual distribution environment 100. Applications 608 that are "aware" of virtual distribution environment 100 may be able to make more detailed use of virtual distribution environment 100.

In this example, "rights operating system functions" 604 are "event driven." Rather than repeatedly examining the state of electronic appliance 600 to determine whether a condition has arisen, the "rights operating system functions" 604 may respond directly to "events" or "happenings" within appliance 600.

In this example, some of the services performed by "rights operating system functions" 604 may be extended based on additional "components" delivered to operating system 602. "Rights operating system functions" 604 can collect together and use "components" sent by different participants at different times. The "components" help to make the operating system 602 "scalable." Some components can change how services work on little appliances versus how they work on big appliances (e.g., multi-user). Other components are designed to work with specific applications or classes of applications (e.g., some types of meters and some types of budgets).

Electronic Appliance 600

An electronic appliance 600 provided by the preferred embodiment may, for example, be any electronic apparatus that contains one or more microprocessors and/or microcontrollers and/or other devices which perform logical and/or mathematical calculations. This may include computers; computer terminals; device controllers for use with computers; peripheral devices for use with computers; digital display devices; televisions; video and audio/video projection systems; channel selectors and/or decoders for use with broadcast and/or cable transmissions; remote control devices; video and/or audio recorders; media players including compact disc players, videodisc players and tape players; audio and/or video amplifiers; virtual reality machines; electronic game players; multimedia players; radios; telephones; videophones; facsimile machines; robots; numerically controlled machines including machine tools and the like; and other devices containing one or more microcomputers and/or microcontrollers and/or other CPUs, including those not yet in existence.

Figure 8:
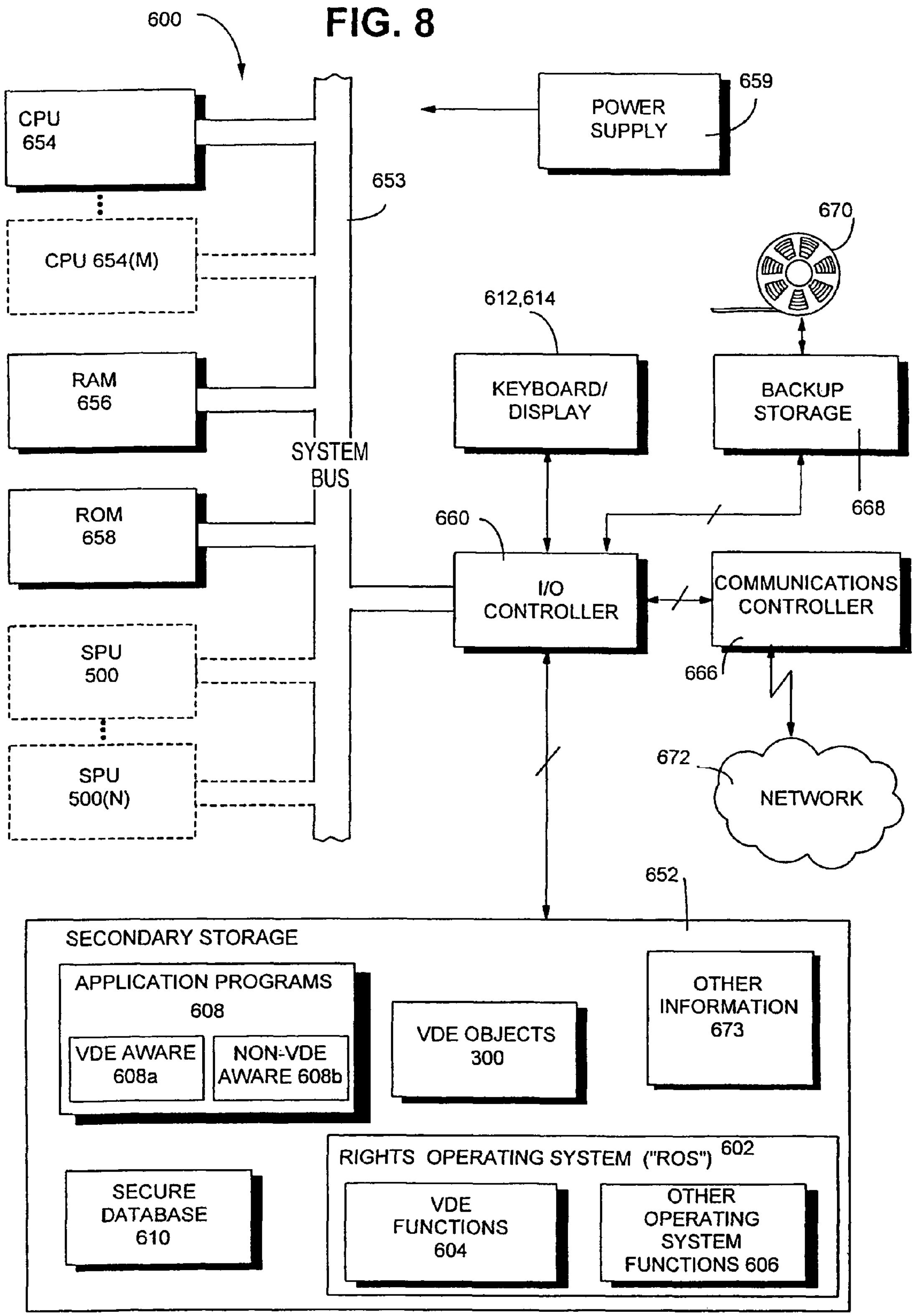
FIG. 8 is a more detailed block diagram of an example of the electronic appliance shown in FIG. 7.

FIG. 8 shows an example of an electronic appliance 600. This example of electronic appliance 600 includes a system bus 653. In this example, one or more conventional general purpose central processing units ("CPUs") 654 are connected to bus 653. Bus 653 connects CPU(s) 654 to RAM 656, ROM 658, and I/O controller 660. One or more SPUs 500 may also be connected to system bus 653. System bus 653 may permit SPU(s) 500 to communicate with CPU(s) 654, and also may allow both the CPU(s) and the SPU(s) to communicate (e.g., over shared address and data lines) with RAM 656, ROM 658 and I/O controller 660. A power supply 659 may provide power to SPU 500, CPU 654 and the other system components shown.

In the example shown, I/O controller 660 is connected to secondary storage device 652, a keyboard/display 612,614, a communications controller 666, and a backup storage device 668. Backup storage device 668 may, for example, store information on mass media such as a tape 670, a floppy disk, a removable memory card, etc. Communications controller 666 may allow electronic appliance 600 to communicate with other electronic appliances via network 672 or other telecommunications links. Different electronic appliances 600 may interoperate even if they use different CPUs and different instances of ROS 602, so long as they typically use compatible communication protocols and/or security methods. In this example, I/O controller 660 permits CPU 654 and SPU 500 to read from and write to secondary storage 662, keyboard/display 612, 614, communications controller 666, and backup storage device 668.

Secondary storage 662 may comprise the same one or more non-secure secondary storage devices (such as a magnetic disk and a CD-ROM drive as one example) that electronic appliance 600 uses for general secondary storage functions. In some implementations, part or all of secondary storage 652 may comprise a secondary storage device(s) that is physically enclosed within a secure enclosure. However, since it may not be practical or cost-effective to physically secure secondary storage 652 in many implementations, secondary storage 652 may be used to store information in a secure manner by encrypting information before storing it in secondary storage 652. If information is encrypted before it is stored, physical access to secondary storage 652 or its contents does not readily reveal or compromise the information.

Secondary storage 652 in this example stores code and data used by CPU 654 and/or SPU 500 to control the overall operation of electronic appliance 600. For example, FIG. 8 shows that "Rights Operating System" ("ROS") 602 (including a portion 604 of ROS that provides VDE functions and a portion 606 that provides other OS functions) shown in FIG. 7 may be stored on secondary storage 652. Secondary storage 652 may also store one or more VDE objects 300. FIG. 8 also shows that the secure files 610 shown in FIG. 7 may be stored on secondary storage 652 in the form of a "secure database" or management file system 610. This secure database 610 may store and organize information used by ROS 602 to perform VDE functions 604. Thus, the code that is executed to perform VDE and other OS functions 604, 606, and secure files 610 (as well as VDE objects 300) associated with those functions may be stored in secondary storage 652. Secondary storage 652 may also store "other information" 673 such as, for example, information used by other operating system functions 606 for task management, non-VDE files, etc. Portions of the elements indicated in secondary storage 652 may also be stored in ROM 658, so long as those elements do not require changes (except when ROM 658 is replaced). Portions of ROS 602 in particular may desirably be included in ROM 658 (e.g., "bootstrap" routines, POST routines, etc. for use in establishing an operating environment for electronic appliance 600 when power is applied).

FIG. 8 shows that secondary storage 652 may also be used to store code ("application programs") providing user application(s) 608 shown in FIG. 7. FIG. 8 shows that there may be two general types of application programs 608 "VDE aware" applications 608*a*, and Non-VDE aware applications 608*b*. VDE aware applications 608*a* may have been at least in part designed specifically with VDE 100 in mind to access and take detailed advantage of VDE functions 604. Because of the "transparency" features of ROS 602, non-VDE aware applications 608*b* (e.g., applications not specifically designed for VDE 100) can also access and take advantage of VDE functions 604.

Secure Processing Unit 500

Each VDE node or other electronic appliance 600 in the preferred embodiment may include one or more SPUs 500. SPUs 500 may be used to perform all secure processing for VDE 100. For example, SPU 500 is used for decrypting (or otherwise unsecuring) VDE protected objects 300. It is also used for managing encrypted and/or otherwise secured communication (such as by employing authentication and/or error-correction validation of information). SPU 500 may also perform secure data management processes including governing usage of, auditing of, and where appropriate, payment for VDE objects 300 (through the use of prepayments, credits, real-time electronic debits from bank accounts and/or VDE node currency token deposit accounts). SPU 500 may perform other transactions related to such VDE objects 300.

SPU Physical Packaging and Security Barrier 502

As shown FIG. 6, in the preferred embodiment, an SPU 500 may be implemented as a single integrated circuit "chip" 505 to provide a secure processing environment in which confidential and/or commercially valuable information can be safely processed, encrypted and/or decrypted. IC chip 505 may, for example, comprise a small semiconductor "die" about the size of a thumbnail. This semiconductor die may include semiconductor and metal conductive pathways. These pathways define the circuitry, and thus the functionality, of SPU 500. Some of these pathways are electrically connected to the external "pins" 504 of the chip 505.

Figure 9:
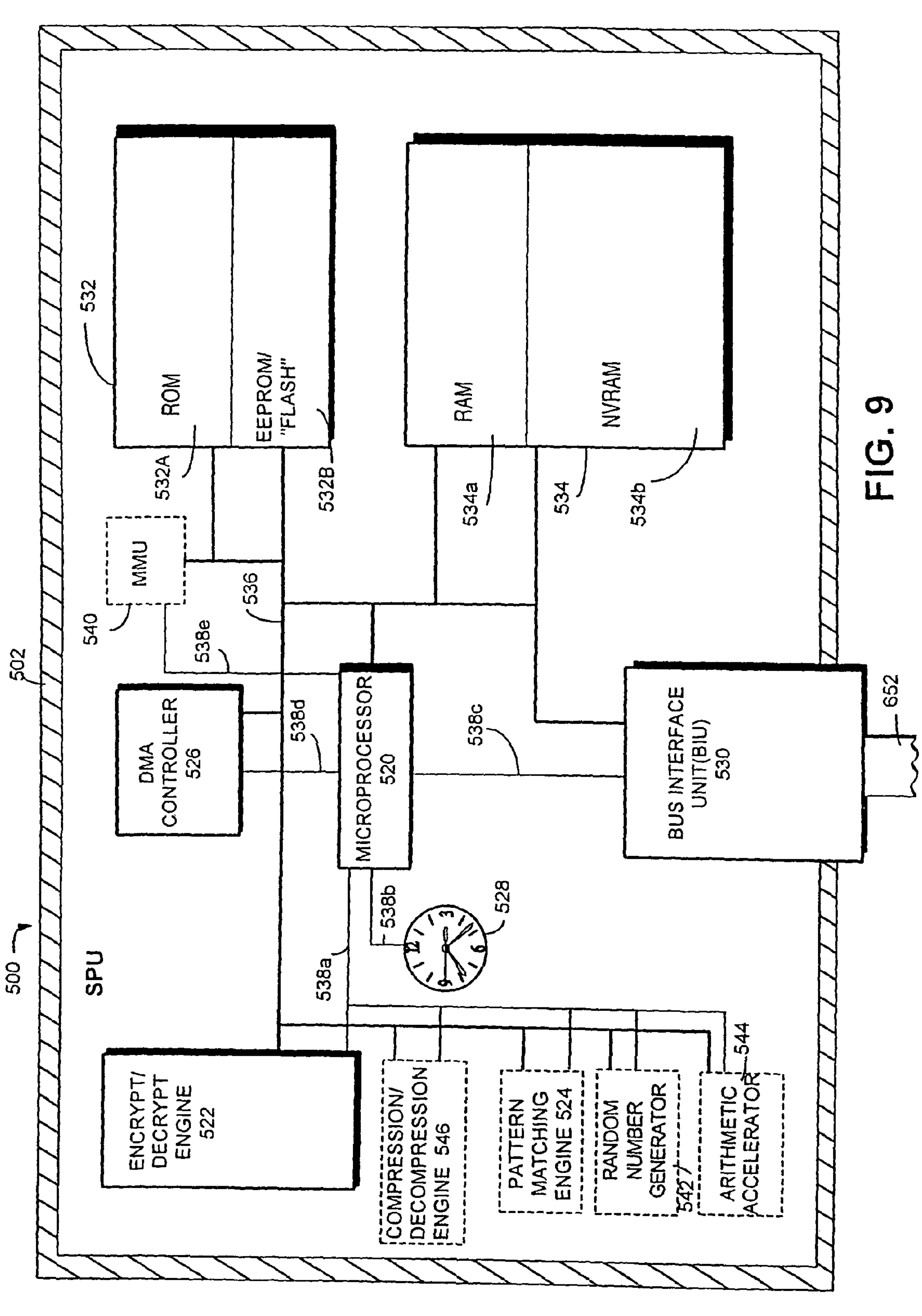
FIG. 9 is a detailed view of an example of the Secure Processing Unit (SPU) shown in FIGS. 6 and 8.

As shown in FIGS. 6 and 9, SPU 500 may be surrounded by a tamper-resistant hardware security barrier 502. Part of this security barrier 502 is formed by a plastic or other package in which an SPU "die" is encased. Because the processing occurring within, and information stored by, SPU 500 are not easily accessible to the outside world, they are relatively secure from unauthorized access and tampering. All signals cross barrier 502 through a secure, controlled path provided by BIU 530 that restricts the outside world's access to the internal components within SPU 500. This secure, controlled path resists attempts from the outside world to access secret information and resources within SPU 500.

It is possible to remove the plastic package of an IC chip and gain access to the "die." It is also possible to analyze and "reverse engineer" the "die" itself (e.g., using various types of logic analyzers and microprobes to collect and analyze signals on the die while the circuitry is operating, using acid etching or other techniques to remove semiconductor layers to expose other layers, viewing and photographing the die using an electron microscope, etc.) Although no system or circuit is absolutely impervious to such attacks, SPU barrier 502 may include additional hardware protections that make successful attacks exceedingly costly and time consuming. For example, ion implantation and/or other fabrication techniques may be used to make it very difficult to visually discern SPU die conductive pathways, and SPU internal circuitry may be fabricated in such a way that it "self-destructs" when exposed to air and/or light. SPU 500 may store secret information in internal memory that loses its contents when power is lost. Circuitry may be incorporated within SPU 500 that detects microprobing or other tampering, and self-destructs (or destroys other parts of the SPU) when tampering is detected. These and other hardware-based physical security techniques contribute to tamper-resistant hardware security barrier 502.

To increase the security of security barrier 502 even further, it is possible to encase or include SPU 500 in one or more further physical enclosures such as, for example: epoxy or other "potting compound"; further module enclosures including additional self-destruct, self-disabling or other features activated when tampering is detected, further modules providing additional security protections such as requiring password or other authentication to operate; and the like. In addition, further layers of metal may be added to the die to complicate acid etching, micro probing, and the like; circuitry designed to "zeroize" memory may be included as an aspect of self-destruct processes; the plastic package itself may be designed to resist chemical as well as physical "attacks"; and memories internal to SPU 500 may have specialized addressing and refresh circuitry that "shuffles" the location of bits to complicate efforts to electrically determine the value of memory locations. These and other techniques may contribute to the security of barrier 502.

In some electronic appliances 600, SPU 500 may be integrated together with the device microcontroller or equivalent or with a device I/O or communications microcontroller into a common chip (or chip set) 505. For example, in one preferred embodiment, SPU 500 may be integrated together with one or more other CPU(s) (e.g., a CPU 654 of an electronic appliance) in a single component or package. The other CPU(s) 654 may be any centrally controlling logic arrangement, such as for example, a microprocessor, other microcontroller, and/or array or other parallel processor. This integrated configuration may result in lower overall cost, smaller overall size, and potentially faster interaction between an SPU 500 and a CPU 654. Integration may also provide wider distribution if an integrated SPU/CPU component is a standard feature of a widely distributed microprocessor line. Merging an SPU 500 into a main CPU 654 of an electronic appliance 600 (or into another appliance or appliance peripheral microcomputer or other microcontroller) may substantially reduce the overhead cost of implementing VDE 100. Integration considerations may include cost of implementation, cost of manufacture, desired degree of security, and value of compactness.

SPU 500 may also be integrated with devices other than CPUs. For example, for video and multimedia applications, some performance and/or security advantages (depending on overall design) could result from integrating an SPU 500 into a video controller chip or chipset. SPU 500 can also be integrated directly into a network communications chip or chipset or the like. Certain performance advantages in high speed communications applications may also result from integrating an SPU 500 with a modem chip or chipset. This may facilitate incorporation of an SPU 500 into communication appliances such as stand-alone fax machines. SPU 500 may also be integrated into other, peripheral devices, such as CD-ROM devices, set-top cable devices, game devices, and a wide variety of other electronic appliances that use, allow access to, perform transactions related to, or consume, distributed information.

SPU 500 Internal Architecture

FIG. 9 is a detailed diagram of the internal structure within an example of SPU 500. SPU 500 in this example includes a single microprocessor 520 and a limited amount of memory configured as ROM 532 and RAM 534. In more detail, this example of SPU 500 includes microprocessor 520, an encrypt/decrypt engine 522, a DMA controller 526, a real-time clock 528, a bus interface unit ("BIU") 530, a read only memory (ROM) 532, a random access memory (RAM) 534, and a memory management unit ("MMU") 540. DMA controller 526 and MMU 540 are optional, but the performance of SPU 500 may suffer if they are not present. SPU 500 may also include an optional pattern matching engine 524, an optional random number generator 542, an optional arithmetic accelerator circuit 544, and optional compression/decompression circuit 546. A shared address/data bus arrangement 536 may transfer information between these various components under control of microprocessor 520 and/or DMA controller 526. Additional or alternate dedicated paths 538 may, connect microprocessor 520 to the other components (e.g., encrypt/decrypt engine 522 via line 538*a*, real-time clock 528 via line 538*b*, bus interface unit 530 via line 538*c*, DMA controller via line 538*d*, and memory management unit (MMU) 540 via line 538*e*).

The following section discusses each of these SPU components in more detail.

Microprocessor 520

Microprocessor 520 is the "brain" of SPU 500. In this example, it executes a sequence of steps specified by code stored (at least temporarily) within ROM 532 and/or RAM 534. Microprocessor 520 in the preferred embodiment comprises a dedicated central processing, arrangement (e.g., a RISC and/or CISC processor unit, a microcontroller, and/or other central processing means or, less desirably in most applications, process specific dedicated control logic) for executing instructions stored in the ROM 532 and/or other memory. Microprocessor 520 may be separate elements of a circuitry layout, or may be separate packages within a secure SPU 500.

In the preferred embodiment, microprocessor 520 normally handles the most security sensitive aspects of the operation of electronic appliance 600. For example, microprocessor 520 may manage VDE decrypting, encrypting, certain content and/or appliance usage control information, keeping track of usage of VDE secured content, and other VDE usage control related functions.

Stored in each SPU 500 and/or electronic appliance secondary memory 652 may be, for example, an instance of ROS 602 software, application programs 608, objects 300 containing VDE controlled property content and related information, and management database 610 that stores both information associated with objects and VDE control information. ROS 602 includes software intended for execution by SPU microprocessor 520 for, in part, controlling usage of VDE related objects 300 by electronic appliance 600. As will be explained, these SPU programs include "load modules" for performing basic control functions. These various programs and associated data are executed and manipulated primarily by microprocessor 520.

Real Time Clock (RTC) 528

In the preferred embodiment, SPU 500 includes a real time clock circuit ("RTC") 528 that serves as a reliable, tamper resistant time base for the SPU. RTC 528 keeps track of time of day and date (e.g., month, day and year) in the preferred embodiment, and thus may comprise a combination calendar and clock. A reliable time base is important for implementing time based usage metering methods, "time aged decryption keys," and other time based SPU functions.

The RTC 528 must receive power in order to operate. Optimally, the RTC 528 power source could comprise a small battery located within SPU 500 or other secure enclosure. However, the RTC 528 may employ a power source such as an externally located battery that is external to the SPU 500. Such an externally located battery may provide relatively uninterrupted power to RTC 528, and may also maintain as non-volatile at least a portion of the otherwise volatile RAM 534 within SPU 500.

In one implementation, electronic appliance power supply 659 is also used to power SPU 500. Using any external power supply as the only power source for RTC 528 may significantly reduce the usefulness of time based security techniques unless, at minimum, SPU 500 recognizes any interruption (or any material interruption) of the supply of external power, records such interruption, and responds as may be appropriate such as disabling the ability of the SPU 500 to perform certain or all VDE processes. Recognizing a power interruption may, for example, be accomplished by employing a circuit which is activated by power failure. The power failure sensing circuit may power another circuit that includes associated logic for recording one or more power fail events. Capacitor discharge circuitry may provide the necessary temporary power to operate this logic. In addition or alternatively, SPU 500 may from time to time compare an output of RTC 528 to a clock output of a host electronic appliance 600, if available. In the event a discrepancy is detected, SPU 500 may respond as appropriate, including recording the discrepancy and/or disabling at least some portion of processes performed by SPU 500 under at least some circumstances.

If a power failure and/or RTC 528 discrepancy and/or other event indicates the possibility of tampering, SPU 500 may automatically destroy, or render inaccessible without privileged intervention, one or more portions of sensitive information it stores, such as execution related information and/or encryption key related information. To provide further SPU operation, such destroyed information would have to be replaced by a VDE clearinghouse, administrator and/or distributor, as may be appropriate. This may be achieved by remotely downloading update and/or replacement data and/or code. In the event of a disabling and/or destruction of processes and/or information as described above, the electronic appliance 600 may require a secure VDE communication with an administrator, clearinghouse, and/or distributor as appropriate in order to reinitialize the RTC 528. Some or all secure SPU 500 processes may not operate until then.

It may be desirable to provide a mechanism for setting and/or synchronizing RTC 528. In the preferred embodiment, when communication occurs between VDE electronic appliance 600 and another VDE appliance, an output of RTC 528 may be compared to a controlled RTC 528 output time under control of the party authorized to be "senior" and controlling. In the event of a discrepancy, appropriate action may be taken, including resetting the RTC 528 of the "junior" controlled participant in the communication.

SPU Encrypt/Decrypt Engine 522

In the preferred embodiment, SPU encrypt/decrypt engine 522 provides special purpose hardware (e.g., a hardware state machine) for rapidly and efficiently encrypting and/or decrypting data. In some implementations, the encrypt/decrypt functions may be performed instead by microprocessor 520 under software control, but providing special purpose encrypt/decrypt hardware engine 522 will, in general, provide increased performance. Microprocessor 520 may, if desired, comprise a combination of processor circuitry and dedicated encryption/decryption logic that may be integrated together in the same circuitry layout so as to, for example, optimally share one or more circuit elements.

Generally, it is preferable that a computationally efficient but highly secure "bulk" encryption/decryption technique should be used to protect most of the data and objects handled by SPU 500. It is preferable that an extremely secure encryption/decryption technique be used as an aspect of authenticating the identity of electronic appliances 600 that are establishing a communication channel and securing any transferred permission, method, and administrative information. In the preferred embodiment, the encrypt/decrypt engine 522 includes both a symmetric key encryption/decryption circuit (e.g., DES, Skipjack/Clipper, IDEA, RC-2, RC-4, etc.) and an antisymmetric (asymmetric) or Public Key ("PK") encryption/decryption circuit. The public/private key encryption/decryption circuit is used principally as an aspect of secure communications between an SPU 500 and VDE administrators, or other electronic appliances 600, that is between VDE secure subsystems. A symmetric encryption/decryption circuit may be used for "bulk" encrypting and decrypting most data stored in secondary storage 662 of electronic appliance 600 in which SPU 500 resides. The symmetric key encryption/decryption circuit may also be used for encrypting and decrypting content stored within VDE objects 300.

DES or public/private key methods may be used for all encryption functions. In alternate embodiments, encryption and decryption methods other than the DES and public/private key methods could be used for the various encryption related functions. For instance, other types of symmetric encryption/decryption techniques in which the same key is used for encryption and decryption could be used in place of DES encryption and decryption. The preferred embodiment can support a plurality of decryption/encryption techniques using multiple dedicated circuits within encrypt/decrypt engine 522 and/or the processing arrangement within SPU 500.

Pattern Matching Engine 524

Optional pattern matching engine 524 may provide special purpose hardware for performing pattern matching functions. One of the functions SPU 500 may perform is to validate/authenticate VDE objects 300 and other items. Validation/authentication often involves comparing long data strings to determine whether they compare in a predetermined way. In addition, certain forms of usage (such as logical and/or physical (contiguous) relatedness of accessed elements) may require searching potentially long strings of data for certain bit patterns or other significant pattern related metrics. Although pattern matching can be performed by SPU microprocessor 520 under software control, providing special purpose hardware pattern matching engine 524 may speed up the pattern matching process.

Compression/Decompression Engine 546

An optional compression/decompression engine 546 may be provided within an SPU 500 to, for example, compress and/or decompress content stored in, or released from, VDE objects 300. Compression/decompression engine 546 may implement one or more compression algorithms using hardware circuitry to improve the performance of compression/decompression operations that would otherwise be performed by software operating on microprocessor 520, or outside SPU 500. Decompression is important in the release of data such as video and audio that is usually compressed before distribution and whose decompression speed is important. In some cases, information that is useful for usage monitoring purposes (such as record separators or other delimiters) is "bidden" under a compression layer that must be removed before this information can be detected and used inside SPU 500.

Random Number Generator 542

Optional random number generator 542 may provide specialized hardware circuitry for generating random values (e.g., from inherently unpredictable physical processes such as quantum noise). Such random values are particularly useful for constructing encryption keys or unique identifiers, and for initializing the generation of pseudo-random sequences. Random number generator 542 may produce values of any convenient length, including as small as a single bit per use. A random number of arbitrary size may be constructed by concatenating values produced by random number generator 542. A cryptographically strong pseudo-random sequence may be generated from a random key and seed generated with random number generator 542 and repeated encryption either with the encrypt/decrypt engine 522 or cryptographic algorithms in SPU 500. Such sequences may be used, for example, in private headers to frustrate efforts to determine an encryption key through cryptoanalysis.

Arithmetic Accelerator 544

An optional arithmetic accelerator 544 may be provided within an SPU 500 in the form of hardware circuitry that can rapidly perform mathematical calculations such as multiplication and exponentiation involving large numbers. These calculations can, for example, be requested by microprocessor 520 or encrypt/decrypt engine 522, to assist in the computations required for certain asymmetric encryption/decryption operations. Such arithmetic accelerators are well-known to those skilled in the art. In some implementations, a separate arithmetic accelerator 544 may be omitted and any necessary calculations may be performed by microprocessor 520 under software control.

DMA Controller 526

DMA controller 526 controls information transfers over address/data bus 536 without requiring microprocessor 520 to process each individual data transfer. Typically, microprocessor 520 may write to DMA controller 526 target and destination addresses and the number of bytes to transfer, and DMA controller 526 may then automatically transfer a block of data between components of SPU 500 (e.g., from ROM 532 to RAM 534, between encrypt/decrypt engine 522 and RAM 534, between bus interface unit 530 and RAM 534, etc.). DMA controller 526 may have multiple channels to handle multiple transfers simultaneously. In some implementations, a separate DMA controller 526 may be omitted, and any necessary data movements may be performed by 20 3475 microprocessor 520 under software control.

Bus Interface Unit (BIU) 530

Bus interface unit (BIU) 530 communicates information between SPU 500 and the outside world across the security barrier 502. BIU 530 shown in FIG. 9 plus appropriate driver software may comprise the "appliance link" 510 shown in FIG. 6. Bus interface unit 530 may be modelled after a USART or PCI bus interface in the preferred embodiment. In this example, BIU 530 connects SPU 500 to electronic appliance system bus 653 shown in FIG. 8. BIU 530 is designed to prevent unauthorized access to internal components within SPU 500 and their contents. It does this by only allowing signals associated with an SPU 500 to be processed by control programs running on microprocessor 520 and not supporting direct access to the internal elements of an SPU 500.

Memory Management Unit 540

Memory Management Unit (MMU) 540, if present, provides hardware support for memory management and virtual memory management functions. It may also provide heightened security by enforcing hardware compartmentalization of the secure execution space (e.g., to prevent a less trusted task from modifying a more trusted task). More details are provided below in connection with a discussion of the architecture of a Secure Processing Environment ("SPE") 503 supported by SPU 500.

MMU 540 may also provide hardware-level support functions related to memory management such as, for example, address mapping.

SPU Memory Architecture

In the preferred embodiment, SPU 500 uses three general kinds of memory:

(1) internal ROM 532;

(2) internal RAM 534; and (3) external memory (typically RAM and/or disk supplied by a host electronic appliance).

The internal ROM 532 and RAM 534 within SPU 500 provide a secure operating environment and execution space. Because of cost limitations, chip fabrication size, complexity and other limitations, it may not be possible to provide sufficient memory within SPU 500 to store all information that an SPU needs to process in a secure manner. Due to the practical limits on the amount of ROM 532 and RAM 534 that may be included within SPU 500, SPU 500 may store information in memory external to it, and move this information into and out of its secure internal memory space on an as needed basis. In these cases, secure processing steps performed by an SPU typically must be segmented into small, securely packaged elements that may be "paged in" and "paged out" of the limited available internal memory space. Memory external to an SPU 500 may not be secure. Since the external memory may not be secure, SPU 500 may encrypt and cryptographically seal code and other information before storing it in external memory. Similarly, SPU 500 must typically decrypt code and other information obtained from external memory in encrypted form before processing (e.g., executing) based on it. In the preferred embodiment, there are two general approaches used to address potential memory limitations in a SPU 500. In the first case, the small, securely packaged elements represent information contained in secure database 610. In the second case, such elements may represent protected (e g, encrypted) virtual memory pages. Although virtual memory pages may correspond to information elements stored in secure database 610, this is not required in this example of a SPU memory architecture.

The following is a more detailed discussion of each of these three SPU memory resources.

SPU Internal ROM

SPU 500 read only memory (ROM) 532 or comparable purpose device provides secure internal non-volatile storage for certain programs and other information. For example, ROM 532 may store "kernel" programs such as SPU control firmware 508 and, if desired, encryption key information and certain fundamental "load modules." The "kernel" programs, load module information, and encryption key information enable the control of certain basic functions of the SPU 500. Those components that are at least in part dependent on device configuration (e.g., POST, memory allocation, and a dispatcher) may be loaded in ROM 532 along with additional load modules that have been determined to be required for specific installations or applications.

In the preferred embodiment, ROM 532 may comprise a combination of a masked ROM 532*a* and an EEPROM and/or equivalent "flash" memory 532*b*. EEPROM or flash memory 532*b* is used to store items that need to be updated and/or initialized, such as for example, certain encryption keys. An additional benefit of providing EEPROM and/or flash memory 532*b* is the ability to optimize any load modules and library functions persistently stored within SPU 500 based on typical usage at a specific site. Although these items could also be stored in NVRAM 534*b*, EEPROM and/or flash memory 532*b* may be more cost effective.

Masked ROM 532*a* may cost less than flash and/or EEPROM 532*b*, and can be used to store permanent portions of SPU software/firmware. Such permanent portions may include, for example, code that interfaces to hardware elements such as the RTC 528, encryption/decryption engine 522, interrupt handlers, key generators, etc. Some of the operating system, library calls, libraries, and many of the core services provided by SPU 500 may also be in masked ROM 532*a*. In addition, some of the more commonly used executables are also good candidates for inclusion in masked ROM 532*a*. Items that need to be updated or that need to disappear when power is removed from SPU 500 should not be stored in masked ROM 532*a*.

Under some circumstances, RAM 534*a* and/or NVRAM 534*b* (NVRAM 534*b* may, for example, be constantly powered conventional RAM) may perform at least part of the role of ROM 532.

SPU Internal RAM

SPU 500 general purpose RAM 534 provides, among other things, secure execution space for secure processes. In the preferred embodiment, RAM 534 is comprised of different types of RAM such as a combination of high-speed RAM 534*a* and an NVRAM ("non-volatile RAM") 534*b*. RAM 534*a* may be volatile, while NVRAM 534*b* is preferably battery backed or otherwise arranged so as to be non-volatile (i.e., it does not lose its contents when power is turned off).

High-speed RAM 534*a* stores active code to be executed and associated data structures.

NVRAM 534*b* preferably contains certain keys and summary values that are preloaded as part of an initialization process in which SPU 500 communicates with a VDE administrator, and may also store changeable or changing information associated with the operation of SPU 500. For security reasons, certain highly sensitive information (e.g., certain load modules and certain encryption key related information such as internally generated private keys) needs to be loaded into or generated internally by SPU 500 from time to time but, once loaded or generated internally, should never leave the SPU. In this preferred embodiment, the SPU 500 non-volatile random access memory (NVRAM) 534*b* may be used for securely storing such highly sensitive information. NVRAM 534*b* is also used by SPU 500 to store data that may change frequently but which preferably should not be lost in a power down or power fail mode.

NVRAM 534*b* is preferably a flash memory array, but may in addition or alternatively be electrically erasable programmable read only memory (EEPROM), static RAM (SRAM), bubble memory, three dimensional holographic or other electro-optical memory, or the like, or any other writable (e.g., randomly accessible) non-volatile memory of sufficient speed and cost-effectiveness.

SPU External Memory

The SPU 500 can store certain information on memory devices external to the SPU. If available, electronic appliance 600 memory can also be used to support any device external portions of SPU 500 software. Certain advantages may be gained by allowing the SPU 500 to use external memory. As one example, memory internal to SPU 500 may be reduced in size by using non-volatile read/write memory in the host electronic appliance 600 such as a non-volatile portion of RAM 656 and/or ROM 658.

Such external memory may be used to store SPU programs, data and/or other information. For example, a VDE control program may be, at least in part, loaded into the memory and communicated to and decrypted within SPU 500 prior to execution. Such control programs may be re-encrypted and communicated back to external memory where they may be stored for later execution by SPU 500. "Kernel" programs and/or some or all of the non-kernel "load modules" may be stored by SPU 500 in memory external to it. Since a secure database 610 may be relatively large, SPU 500 can store some or all of secure database 610 in external memory and call portions into the SPU 500 as needed.

As mentioned above, memory external to SPU 500 may not be secure. Therefore, when security is required, SPU 500 must encrypt secure information before writing it to external memory, and decrypt secure information read from external memory before using it. In as much as the encryption layer relies on secure processes and information (e.g., encryption algorithms and keys) present within SPU 500, the encryption layer effectively "extends" the SPU security barrier 502 to protect information the SPU 500 stores in memory external to it.

SPU 500 can use a wide variety of different types of external memory. For example, external memory may comprise electronic appliance secondary storage 652 such as a disk; external EEPROM or flash memory 658; and/or external RAM 656. External RAM 656 may comprise an external nonvolatile (e.g., constantly powered) RAM and/or cache RAM.

Using external RAM local to SPU 500 can significantly improve access times to information stored externally to an SPU. For example, external RAM may be used:

- to buffer memory image pages and data structures prior to their storage in flash memory or on an external hard disk (assuming transfer to flash or hard disk can occur in significant power or system failure cases);
- provide encryption and decryption buffers for data being released from VDE objects 300.
- to cache "swap blocks" and VDE data structures currently in use as an aspect of providing a secure virtual memory environment for SPU 500.
- to cache other information in order to, for example, reduce frequency of access by an SPU to secondary storage 652 and/or for other reasons.

Dual ported external RAM can be particularly effective in improving SPU 500 performance, since it can decrease the data movement overhead of the SPU bus interface unit 530 and SPU microprocessor 520.

Using external flash memory local to SPU 500 can be used to significantly improve access times to virtually all data structures. Since most available flash storage devices have limited write lifetimes, flash storage needs to take into account the number of writes that will occur during the lifetime of the flash memory. Hence, flash storage of frequently written temporary items is not recommended. If external RAM is non-volatile, then transfer to flash (or hard disk) may not be necessary.

External memory used by SPU 500 may include two categories:

- external memory dedicated to SPU 500, and
- memory shared with electronic appliance 600.

For some VDE implementations, sharing memory (e.g., electronic appliance RAM 656, ROM 658 and/or secondary storage 652) with CPU 654 or other elements of an electronic appliance 600 may be the most cost effective way to store VDE secure database management files 610 and information that needs to be stored external to SPU 500. A host system hard disk secondary memory 652 used for general purpose file storage can, for example, also be used to store VDE management files 610. SPU 500 may be given exclusive access to the external memory (e.g., over a local bus high speed connection provided by BIU 530). Both dedicated and shared external memory may be provided.

The hardware configuration of an example of electronic appliance 600 has been described above. The following section describes an example of the software architecture of electronic appliance 600 provided by the preferred embodiment, including the structure and operation of preferred embodiment "Rights Operating System" ("ROS") 602.

Rights Operating System 602

Rights Operating System ("ROS") 602 in the preferred embodiment is a compact, secure, event-driven, services-based, "component" oriented, distributed multiprocessing operating system environment that integrates VDE information security control information, components and protocols with traditional operating system concepts. Like traditional operating systems, ROS 602 provided by the preferred embodiment is a piece of software that manages hardware resources of a computer system and extends management functions to input and/or output devices, including communications devices. Also like traditional operating systems, preferred embodiment ROS 602 provides a coherent set of basic functions and abstraction layers for hiding the differences between, and many of the detailed complexities of, particular hardware implementations. In addition to these characteristics found in many or most operating systems, ROS 602 provides secure VDE transaction management and other advantageous features not found in other operating systems. The following is a non-exhaustive list of some of the advantageous features provided by ROS 602 in the preferred embodiment:

Standardized interface provides coherent set of basic functions
- simplifies programming
- the same application can run on many different platforms Event driven
- eases functional decomposition
- extendible
- accommodates state transition and/or process oriented events
- simplifies task management
- simplifies inter-process communications Services based
- allows simplified and transparent scalability
- simplifies multiprocessor support
- hides machine dependencies
- eases network management and support Component Based Architecture
- processing based on independently deliverable secure components
- component model of processing control allows different sequential steps that are reconfigurable based on requirements
- components can be added, deleted or modified (subject to permissioning)
- full control information over pre-defined and user-defined application events
- events can be individually controlled with independent executables Secure
- secure communications
- secure control functions
- secure virtual memory management
- information control structures protected from exposure
- data elements are validated, correlated and access controlled
- components are encrypted and validated independently
- components are tightly correlated to prevent unauthorized use of elements
- control structures and secured executables are validated prior to use to protect against tampering
- integrates security considerations at the I/O level
- provides on-the-fly decryption of information at release time
- enables a secure commercial transaction network
- flexible key management features Scalable
- highly scalable across many different platforms
- supports concurrent processing in a multiprocessor environment
- supports multiple cooperating processors
- any number of host or security processors can be supported
- control structures and kernel are easily portable to various host platforms and to different processors within a target platform without recompilation
- supports remote processing
- Remote Procedure Calls may be used for internal OS communications Highly Integratable
- can be highly integrated with host platforms as an additional operating system layer
- permits non-secure storage of secured components and information using an OS layer "on top of" traditional OS platforms
- can be seamlessly integrated with a host operating system to provide a common usage paradigm for transaction management and content access
- integration may take many forms: operating system layers for desktops (e.g., DOS, Windows, Macintosh); device drivers and operating system interfaces for network services (e,g, Unix and Netware); and dedicated component drivers for "low end" set tops are a few of many examples
- can be integrated in traditional and real time operating systems Distributed
- provides distribution of control information and reciprocal control information and mechanisms
- supports conditional execution of controlled processes within any VDE node in a distributed, asynchronous arrangement
- controlled delegation of rights in a distributed environment
- supports chains of handling and control
- management environment for distributed, occasionally connected but otherwise asynchronous networked database
- real time and time independent data management
- supports "agent" processes Transparent
- can be seamlessly integrated into existing operating systems
- can support applications not specifically written to use it Network friendly
- internal OS structures may use RPCs to distribute processing
- subnets may seamlessly operate as a single node or independently General Background Regarding Operating Systems An "operating system" provides a control mechanism for organizing computer system resources that allows programmers to create applications for computer systems more easily. An operating system does this by providing commonly used functions, and by helping to ensure compatibility between different computer hardware and architectures (which may, for example, be manufactured by different vendors). Operating systems also enable computer "peripheral device" manufacturers to far more easily supply compatible equipment to computer manufacturers users.

Computer systems are usually made up of several different hardware components. These hardware components include, for example:
- a central processing unit (CPU) for executing instructions;
- an array of main memory cells (e.g., "RAM" or "ROM") for storing instructions for execution and data acted upon or parameterizing those instructions; and
- one or more secondary storage devices (e.g., hard disk drive, floppy disk drive, CD-ROM drive, tape reader, card reader, or "flash" memory) organized to reflect named elements (a "file system") for storing images of main memory cells.

Most computer systems also include input/output devices such as keyboards, mice, video systems, printers, scanners and communications devices.

To organize the CPU's execution capabilities with available RAM, ROM and secondary storage devices, and to provide commonly used functions for use by programmers, a piece of software called an "operating system" is usually included with the other components. Typically, this piece of software is designed to begin executing after power is applied to the computer system and hardware diagnostics are completed. Thereafter, all use of the CPU, main memory and secondary memory devices is normally managed by this "operating system" software. Most computer operating systems, also typically include a mechanism for extending their management functions to I/O and other peripheral devices, including commonly used functions associated with these devices.

By managing the CPU, memory and peripheral devices through the operating system, a coherent set of basic functions and abstraction layers for hiding hardware details allows programmers to more easily create sophisticated applications. In addition, managing the computer's hardware resources with an operating system allows many differences in design and equipment requirements between different manufacturers to be hidden. Furthermore, applications can be more easily shared with other computer users who have the same operating system, with significantly less work to support different manufacturers' base hardware and peripheral devices.

ROS 602 is an Operating System Providing Significant Advantages

ROS 602 is an "operating system." It manages the resources of electronic appliance 600, and provides a commonly used set of functions for programmers writing applications 608 for the electronic appliance. ROS 602 in the preferred embodiment manages the hardware (e.g., CPU(s), memory(ies), secure RTC(s), and encrypt/decrypt engines) within SPU 500. ROS may also manage the hardware (e.g., CPU(s) and memory(ies)) within one or more general purpose processors within electronic appliance 600. ROS 602 also manages other electronic appliance hardware resources, such as peripheral devices attached to an electronic appliance. For example, referring to FIG. 7, ROS 602 may manage keyboard 612, display 614, modem 618, disk drive 620, printer 622, scanner 624. ROS 602 may also manage secure database 610 and a storage device (e.g., "secondary storage" 652) used to store secure database 610.

ROS 602 supports multiple processors. ROS 602 in the preferred embodiment supports any number of local and/or remote processors. Supported processors may include at least two types: one or more electronic appliance processors 654, and/or one or more SPUs 500. A host processor CPU 654 may provide storage, database, and communications services SPU 500 may provide cryptographic and secured process execution services. Diverse control and execution structures supported by ROS 602 may require that processing of control information occur within a controllable execution space—this controllable execution space may be provided by SPU 500. Additional host and/or SPU processors may increase efficiencies and/or capabilities ROS 602 may access, coordinate and/or manage further processors remote to an electronic appliance 600 (e.g., via network or other communications link) to provide additional processor resources and/or capabilities.

ROS 602 is services based. The ROS services provided using a host processor 654 and/or a secure processor (SPU 500) are linked in the preferred embodiment using a "Remote Procedure Call" ("RPC") internal processing request structure. Cooperating processors may request interprocess services using a RPC mechanism, which is minimally time dependent and can be distributed over cooperating processors on a network of hosts. The multi-processor architecture provided by ROS 602 is easily extensible to support any number of host or security processors. This extensibility supports high levels of scalability. Services also allow functions to be implemented differently on different equipment. For example, a small appliance that typically has low levels of usage by one user may implement a database service using very different techniques than a very large appliance with high levels of usage by many users. This is another aspect of scalability.

ROS 602 provides a distributed processing environment. For example, it permits information and control structures to automatically, securely pass between sites as required to fulfill a user's requests. Communications between VDE nodes under the distributed processing features of ROS 602 may include interprocess service requests as discussed above. ROS 602 supports conditional and/or state dependent execution of controlled processors within any VDE node. The location that the process executes and the control structures used may be locally resident, remotely accessible, or carried along by the process to support execution on a remote system.

ROS 602 provides distribution of control information, including for example the distribution of control structures required to permit "agents" to operate in remote environments. Thus, ROS 602 provides facilities for passing execution and/or information control as part of emerging requirements for "agent" processes.

If desired, ROS 602 may independently distribute control information over very low bandwidth connections that may or may not be "real time" connections. ROS 602 provided by the preferred embodiment is "network friendly," and can be implemented with any level of networking protocol. Some examples include e-mail and direct connection at approximately "Layer 5" of the ISO model.

The ROS 602 distribution process (and the associated auditing of distributed information) is a controlled event that itself uses such control structures. This "reflective" distributed processing mechanism permits ROS 602 to securely distribute rights and permissions in a controlled manner, and effectively restrict the characteristics of use of information content. The controlled delegation of rights in a distributed environment and the secure processing techniques used by ROS 602 to support this approach provide significant advantages.

Certain control mechanisms within ROS 602 are "reciprocal." Reciprocal control mechanisms place one or more control components at one or more locations that interact with one or more components at the same or other locations in a controlled way. For example, a usage control associated with object content at a user's location may have a reciprocal control at a distributor's location that governs distribution of the, usage control, auditing of the usage control, and logic to process user requests associated with the usage control. A usage control at a user's location (in addition to controlling one or more aspects of usage) may prepare audits for a distributor and format requests associated with the usage control for processing by a distributor. Processes at either end of a reciprocal control may be further controlled by other processes (e.g., a distributor may be limited by a budget for the number of usage control mechanisms they may produce).

Reciprocal control mechanisms may extend over many sites and many levels (e.g., a creator to a distributor to a user) and may take any relationship into account (e.g., creator/distributor, distributor/user, user/user, user/creator, user/creator/distributor, etc.) Reciprocal control mechanisms have many uses in VDE 100 in representing relationships and agreements in a distributed environment.

ROS 602 is scalable. Many portions of ROS 602 control structures and kernel(s) are easily portable to various host platforms without recompilation. Any control structure may be distributed (or redistributed) if a granting authority permits this type of activity. The executable references within ROS 602 are portable within a target platform. Different instances of ROS 602 may execute the references using different resources. For example, one instance of ROS 602 may perform a task using an SPU 500, while another instance of ROS 602 might perform the same task using a host processing environment running in protected memory that is emulating an SPU in software. ROS 602 control information is similarly portable; in many cases the event processing structures may be passed between machines and host platforms as easily as between cooperative processors in a single computer. Appliances with different levels of usage and/or resources available for ROS 602 functions may implement those functions in very different ways. Some services may be omitted entirely if insufficient resources exist. As described elsewhere, ROS 602 "knows" what services are available, and how to proceed based on any given event. Not all events may be processable if resources are missing or inadequate.

ROS 602 is component based. Much of the functionality provided by ROS 602 in the preferred embodiment may be based on "components" that can be securely, independently deliverable, replaceable and capable of being modified (e.g., under appropriately secure conditions and authorizations). Moreover, the "components" may themselves be made of independently deliverable elements. ROS 602 may assemble these elements together (using a construct provided by the preferred embodiment called a "channel") at execution time. For example, a "load module" for execution by SPU 500 may reference one or more "method cores," method parameters and other associated data structures that ROS 602 may collect and assemble together to perform a task such as billing or metering. Different users may have different combinations of elements, and some of the elements may be customizable by users with appropriate authorization. This increases flexibility, allows elements to be reused, and has other advantages.

ROS 602 is highly secure. ROS 602 provides mechanisms to protect information control structures from exposure by end users and conduit hosts. ROS 602 can protect information, VDE control structures and control executables using strong encryption and validation mechanisms. These encryption and validation mechanisms are designed to make them highly resistant to undetected tampering. ROS 602 encrypts information stored on secondary storage device(s) 652 to inhibit tampering. ROS 602 also separately encrypts and validates its various components. ROS 602 correlates control and data structure components to prevent unauthorized use of elements. These features permit ROS 602 to independently distribute elements, and also allows integration of VDE functions 604 with non-secure "other" OS functions 606.

ROS 602 provided by the preferred embodiment extends conventional capabilities such as, for example, Access Control List (ACL) structures, to user and process defined events, including state transitions. ROS 602 may provide full control information over pre-defined and user-defined application events. These control mechanisms include "go/no-go" permissions, and also include optional event-specific executables that permit complete flexibility in the processing and/or controlling of events. This structure permits events to be individually controlled so that, for example, metering and budgeting may be provided using independent executables. For example, ROS 602 extends ACL structures to control arbitrary granularity of information. Traditional operating systems provide static "go-no go" control mechanisms at a file or resource level; ROS 602 extends the control concept in a general way from the largest to the smallest sub-element using a flexible control structure. ROS 602 can, for example, control the printing of a single paragraph out of a document file.

ROS 602 provided by the preferred embodiment permits secure modification and update of control information governing each component. The control information may be provided in a template format such as method options to an end-user. An end-user may then customize the actual control information used within guidelines provided by a distributor or content creator. Modification and update of existing control structures is preferably also a controllable event subject to auditing and control information.

ROS 602 provided by the preferred embodiment validates control structures and secured executables prior to use. This validation provides assurance that control structures and executables have not been tampered with by end-users. The validation also permits ROS 602 to securely implement components that include fragments of files and other operating system structures. ROS 602 provided by the preferred embodiment integrates security considerations at the operating system I/O level (which is below the access level), and provides "on-the-fly" decryption of information at release time. These features permit non-secure storage of ROS 602 secured components and information using an OS layer "on top of" traditional operating system platforms.

ROS 602 is highly integratable with host platforms as an additional operating system layer. Thus, ROS 602 may be created by "adding on" to existing operating systems. This involves hooking VDE "add ons" to the host operating system at the device driver and network interface levels. Alternatively, ROS 602 may comprise a wholly new operating system that integrates both VDE functions and other operating system functions.

Indeed, there are at least three general approaches to integrating VDE functions into a new operating system, potentially based on an existing operating system, to create a Rights Operating System 602 including:

(1) Redesign the operating system based on VDE transaction management requirements;

(2) Compile VDE API functions into an existing operating systems; and (3) Integrate a VDE Interpreter into an existing operating system.

The first approach could be most effectively applied when a new operating system is being designed, or if a significant upgrade to an existing operating system is planned. The transaction management and security requirements provided by the VDE functions could be added to the design requirements list for the design of a new operating system that provides, in an optimally efficient manner, an integration of "traditional" operating system capabilities and VDE capabilities. For example, the engineers responsible for the design of the new version or instance of an operating system would include the requirements of VDE metering/transaction management in addition to other requirements (if any) that they use to form their design approach, specifications, and actual implementations. This approach could lead to a "seamless" integration of VDE functions and capabilities by threading metering/transaction management functionality throughout the system design and implementation.

The second approach would involve taking an existing set of API (Application Programmer Interface) functions, and incorporating references in the operating system code to VDE function calls. This is similar to the way that the current Windows operating system is integrated with DOS, wherein DOS serves as both the launch point and as a significant portion of the kernel underpinning of the Windows operating system. This approach would be also provide a high degree of "seamless" integration (although not quite as "seamless" as the first approach). The benefits of this approach include the possibility that the incorporation of metering/transaction management functionality into the new version or instance of an operating system may be accomplished with lower cost (by making use of the existing code embodied in an API, and also using the design' implications of the API functional approach to influence the design of the elements into which the metering/transaction management functionality is incorporated).

The third approach is distinct from the first two in that it does not incorporate VDE functionality associated with metering/transaction management and data security directly into the operating system code, but instead adds a new generalized capability to the operating system for executing metering/transaction management functionality. In this case, an interpreter including metering/transaction management functions would be integrated with other operating system code in a "stand alone" mode. This interpreter might take scripts or other inputs to determine what metering/transaction management functions should be performed, and in what order and under which circumstances or conditions they should be performed.

Instead of (or in addition to) integrating VDE functions into/with an electronic appliance operating system, it would be possible to provide certain VDE functionality available as an application running on a conventional operating system.

ROS Software Architecture

Figure 10:
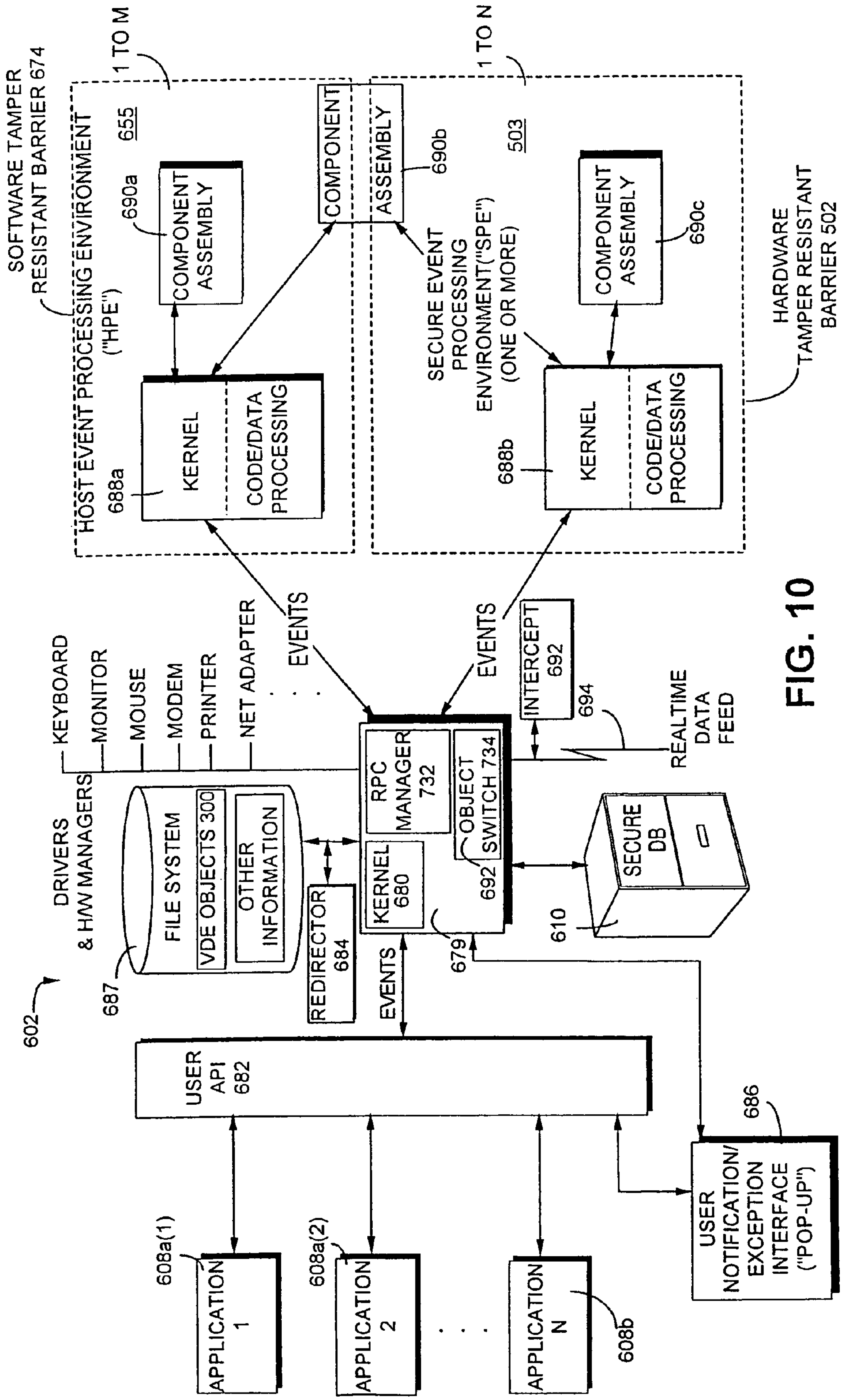
FIG. 10 shows an example of a "Rights Operating System" ("ROS") architecture provided by the Virtual Distribution Environment.

FIG. 10 is a block diagram of one example of a software structure/architecture for Rights Operating System ("ROS") 602 provided by the preferred embodiment. In this example, ROS 602 includes an operating system ("OS") "core" 679, a user Application Program Interface ("API") 682, a "redirector" 684, an "intercept" 692, a User Notification/Exception Interface 686, and a file system 687. ROS 602 in this example also includes one or more Host Event Processing Environments ("HPEs") 655 and/or one or more Secure Event Processing Environments ("SPEs") 503 (these environments may be generically referred to as "Protected Processing Environments" 650).

HPE(s) 655 and SPE(s) 503 are self-contained computing and processing environments that may include their own operating system kernel 688 including code and data processing resources. A given electronic appliance 600 may include any number of SPE(s) 503 and/or any number of HPE(s) 655. HPE(s) 655 and SPE(s) 503 may process information in a secure way, and provide secure processing support for ROS 602. For example, they may each perform secure processing based on one or more VDE component assemblies 690, and they may each offer secure processing services to OS kernel 680.

In the preferred embodiment, SPE 503 is a secure processing environment provided at least in part by an SPU 500. Thus, SPU 500 provides the hardware tamper-resistant barrier 503 surrounding SPE 503. SPE 503 provided by the preferred embodiment is preferably:

small and compact
loadable into resource constrained environments such as for example minimally configured SPUs 500
dynamically updatable
extensible by authorized users
integratable into object or procedural environments
secure.

In the preferred embodiment, HPE 655 is a secure processing environment supported by a processor other than an SPU, such as for example an electronic appliance CPU 654 general-purpose microprocessor or other processing system or device. In the preferred embodiment, HPE 655 may be considered to "emulate" an SPU 500 in the sense that it may use software to provide some or all of the processing resources provided in hardware and/or firmware by an SPU. HPE 655 in one preferred embodiment of the present invention is full-featured and fully compatible with SPE 503—that is, HPE 655 can handle each and every service call SPE 503 can handle such that the SPE and the HPE are "plug compatible" from an outside interface standpoint (with the exception that the HPE may not provide as much security as the SPE).

HPEs 655 may be provided in two types: secure and not secure. For example, it may be desirable to provide non-secure versions of HPE 655 to allow electronic appliance 600 to efficiently run non-sensitive VDE tasks using the full resources of a fast general purpose processor or computer. Such non-secure versions of HPE 655 may run under supervision of an instance of ROS 602 that also includes an SPE 503. In this way, ROS 602 may run all secure processes within SPE 503, and only use HPE 655 for processes that do not require security but that may require (or run more efficiently) under potentially greater resources provided by a general purpose computer or processor supporting HPE 655. Non-secure and secure HPE 655 may operate together with a secure SPE 503.

HPEs 655 may (as shown in FIG. 10) be provided with a software-based tamper resistant barrier 674 that makes them more secure. Such a software-based tamper resistant barrier 674 may be created by software executing on general-purpose CPU 654. Such a "secure" HPE 655 can be used by ROS 602 to execute processes that, while still needing security, may not require the degree of security provided by SPU 500. This can be especially beneficial in architectures providing both an SPE 503, and an HPE 655. The SPU 502 may be used to perform all truly secure processing, whereas one or more HPEs 655 may be used to provide additional secure (albeit possibly less secure than the SPE) processing using host processor or other general purpose resources that may be available within an electronic appliance 600. Any service may be provided by such a secure HPE 655. In the preferred embodiment, certain aspects of "channel processing" appears to be a candidate that could be readily exported from SPE 503 to HPE 655.

The software-based tamper resistant barrier 674 provided by HPE 655 may be provided, for example, by: introducing time checks and/or code modifications to complicate the process of stepping through code comprising a portion of kernel 688*a* and/or a portion of component assemblies 690 using a debugger; using a map of defects on a storage device (e.g., a hard disk, memory card, etc.) to form internal test values to impede moving and/or copying HPE 655 to other electronic appliances 600; using kernel code that contains false branches and other complications in flow of control to disguise internal processes to some degree from disassembly or other efforts to discover details of processes; using "self-generating" code (based on the output of a co-sine transform, for example) such that detailed and/or complete instruction sequences are not stored explicitly on storage devices and/or in active memory but rather are generated as needed; using code that "shuffles" memory locations used for data values based on operational parameters to complicate efforts to manipulate such values; using any software and/or hardware memory management resources of electronic appliance 600 to "protect" the operation of HPE 655 from other processes, functions, etc. Although such a software-based tamper resistant barrier 674 may provide a fair degree of security, it typically will not be as secure as the hardware-based tamper resistant barrier 502 provided (at least in part) by SPU 500. Because security may be better/more effectively enforced with the assistance of hardware security features such as those provided by SPU 500 (and because of other factors such as increased performance provided by special purpose circuitry within SPU 500), at least one SPE 503 is preferred for many or most higher security applications. However, in applications where lesser security can be tolerated and/or the cost of an SPU 500 cannot be tolerated, the SPE 503 may be omitted and all secure processing may instead be performed by one or more secure HPEs 655 executing on general-purpose CPUs 654. Some VDE processes may not be allowed to proceed on reduced-security electronic appliances of this type if insufficient security is provided for the particular process involved.

Only those processes that execute completely within SPEs 503 (and in some cases, HPEs 655) may be considered to be truly secure. Memory and other resources external to SPE 503 and HPEs 655 used to store and/or process code and/or data to be used in secure processes should only receive and handle that information in encrypted form unless SPE 503/HPE 655 can protect secure process code and/or data from non-secure processes.

OS "core" 679 in the preferred embodiment includes a kernel 680, an RPC manager 732, and an "object switch" 734. API 682, HPE 655 and SPE 503 may communicate "event" messages with one another via OS "core" 679. They may also communicate messages directly with one another without messages going through OS "core" 679.

Kernel 680 may manage the hardware of an electronic appliance 600. For example, it may provide appropriate drivers and hardware managers for interacting with input/output and/or peripheral devices such as keyboard 612, display 614, other devices such as a "mouse" pointing device and speech recognizer 613, modem 618, printer 622, and an adapter for network 672. Kernel 680 may also be responsible for initially loading the remainder of ROS 602, and may manage the various ROS tasks (and associated underlying hardware resources) during execution. OS kernel 680 may also manage and access secure database 610 and file system 687. OS kernel 680 also provides execution services for applications 608*a*(1), 608*a*(2), etc. and other applications.

RPC manager 732 performs messaging routing and resource management/integration for ROS 680. It receives and routes "calls" from/to API 682, HPE 655 and SPE 503, for example.

Object switch 734 may manage construction, deconstruction and other manipulation of VDE objects 300.

User Notification/Exception Interface 686 in the preferred embodiment (which may be considered part of API 682 or another application coupled to the API) provides "pop up" windows/displays on display 614. This allows ROS 602 to communicate directly with a user without having to pass information to be communicated through applications 608. For applications that are not "VDE aware," user notification/exception interface 686 may provide communications between ROS 602 and the user.

API 682 in the preferred embodiment provides a standardized, documented software interface to applications 608. In part, API 682 may translate operating system "calls" generated by applications 608 into Remote Procedure Calls ("RPCs") specifying "events." RPC manager 732 may route these RPCs to kernel 680 or elsewhere (e.g., to HPE(s) 655 and/or SPE(s) 503, or to remote electronic appliances 600, processors, or VDE participants) for processing. The API 682 may also service RPC requests by passing them to applications 608 that register to receive and process specific requests.

API 682 provides an "Applications Programming Interface" that is preferably standardized and documented. It provides a concise set of function calls an application program can use to access services provided by ROS 602. In at least one preferred example, API 682 will include two parts: an application program interface to VDE functions 604; and an application program interface to other OS functions 606. These parts may be interwoven into the same software, or they may be provided as two or more discrete pieces of software (for example).

Some applications, such as application 608*a*(1) shown in FIG. 11, may be "VDE aware" and may therefore directly access both of these parts of API 682. FIG. 11A shows an example of this. A "VDE aware" application may, for example, include explicit calls to ROS 602 requesting the creation of new VDE objects 300, metering usage of VDE objects, storing information in VDE-protected form, etc. Thus, a "VDE aware" application can initiate (and, in some examples, enhance and/or extend) VDE functionality provided by ROS 602. In addition, "VDE aware" applications may provide a more direct interface between a user and ROS 602 (e.g., by suppressing or otherwise dispensing with "pop up" displays otherwise provided by user notification/exception interface 686 and instead providing a more "seamless" interface that integrates application and ROS messages).

Figure 11A:
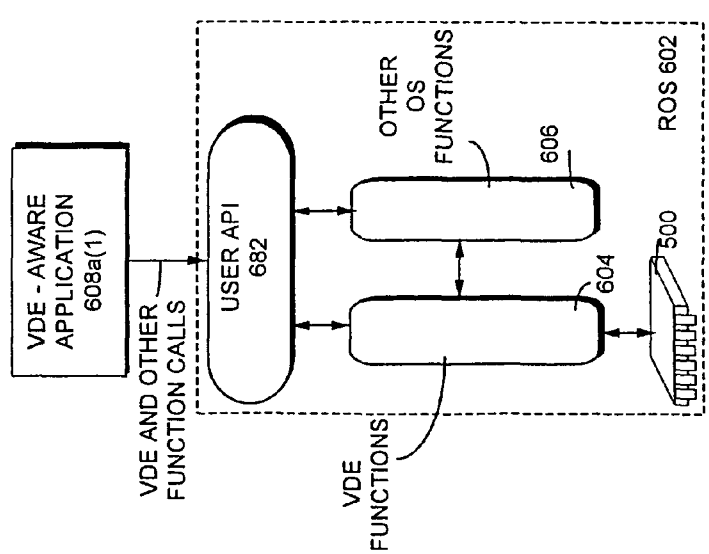
FIGS. 11A-11C show examples of functional relationship(s) between applications and the Rights Operating System.
Figure 11B:
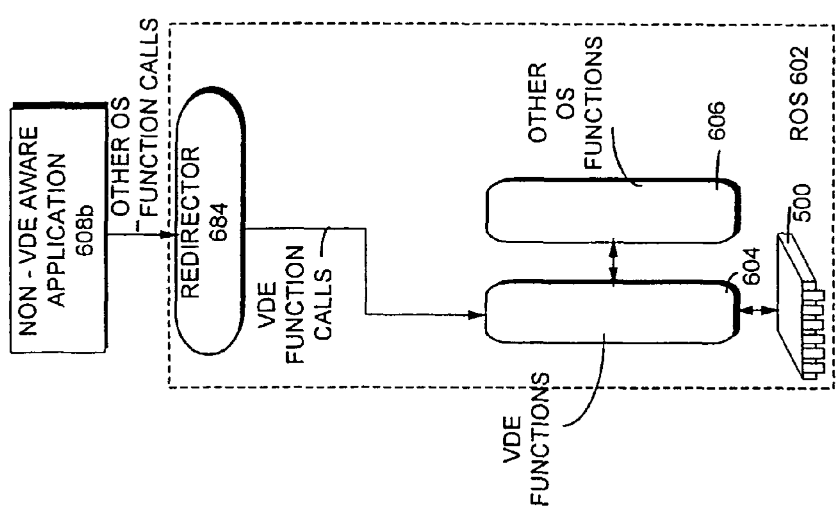

Other applications, such as application 608*b* shown in FIG. 11B, may not be "VDE Aware" and therefore may not "know" how to directly access an interface to VDE functions 604 provided by API 682. To provide for this, ROS 602 may include a "redirector" 684 that allows such "non-VDE aware" applications 608(*b*) to access VDE objects 300 and functions 604. Redirector 684, in the preferred embodiment, translates OS calls directed to the "other OS functions" 606 into calls to the "VDE functions" 604. As one simple example, redirector 684 may intercept a "file open" call from application 608(*b*), determine whether the file to be opened is contained within a VDE container 300, and if it is, generate appropriate VDE function call(s) to file system 687 to open the VDE container (and potentially generate events to HPE 655 and/or SPE 503 to determine the name(s) of file(s) that may be stored in a VDE object 300, establish a control structure associated with a VDE object 300, perform a registration for a VDE object 300, etc.). Without redirector 684 in this example, a non-VDE aware application such as 608*b* could access only the part of API 682 that provides an interface to other OS functions 606, and therefore could not access any VDE functions.

This "translation" feature of redirector 684 provides "transparency." It allows VDE functions to be provided to the application 608(*b*) in a "transparent" way without requiring the application to become involved in the complexity and details associated with generating the one or more calls to VDE functions 604. This aspect of the "transparency" features of ROS 602 has at least two important advantages:

(a) it allows applications not written specifically for VDE functions 604 ("non-VDE aware applications") to nevertheless access critical VDE functions; and (b) it reduces the complexity of the interface between an application and ROS 602.

Figure 11C:
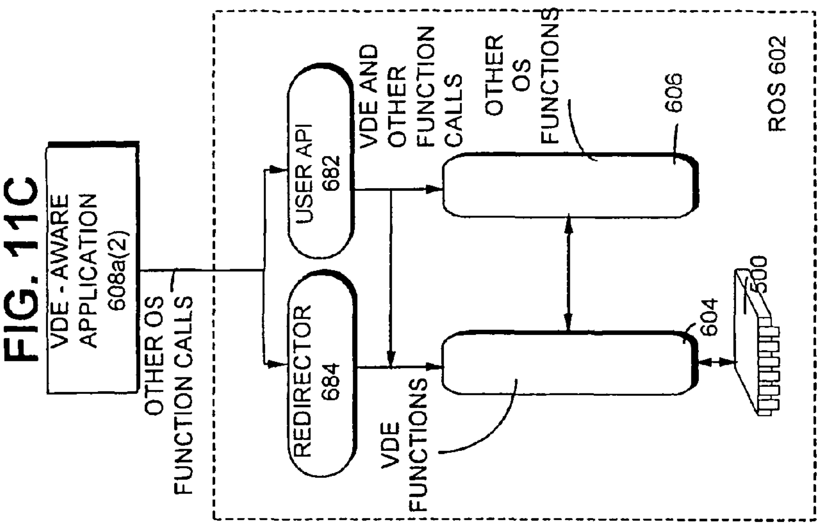
Figure 11D:
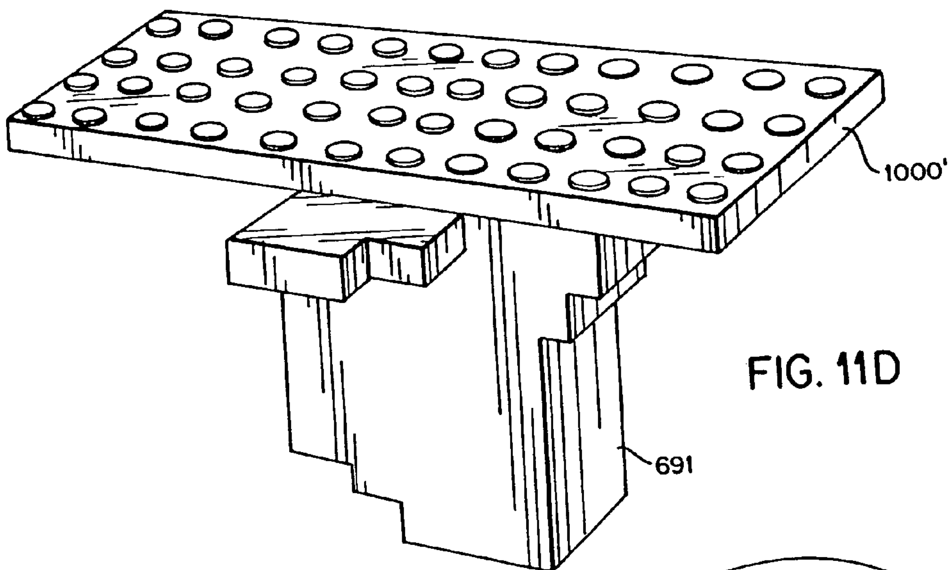
FIGS. 11D-11J show examples of "components" and "component assemblies"

Since the second advantage (reducing complexity) makes it easier for an application creator to produce applications, even"VDE aware" applications 608*a*(2) may be designed so that some calls invoking VDE functions 604 are requested at the level of an "other OS functions" call and then "translated" by redirector 684 into a VDE function call (in this sense, redirector 684 may be considered a part of API 682). FIG. 11C shows an example of this. Other calls invoking VDE functions 604 may be passed directly without translation by redirector 684.

Referring again to FIG. 10, ROS 620 may also include an "interceptor" 692 that transmits and/or receives one or more real time data feeds 694 (this may be provided over cable(s) 628 for example), and routes one or more such data feeds appropriately while providing "translation" functions for real time data sent and/or received by electronic appliance 600 to allow "transparency" for this type of information analogous to the transparency provided by redirector 684 (and/or it may generate one or more real time data feeds).

Secure ROS Components and Component Assemblies

As discussed above, ROS 602 in the preferred embodiment is a component-based architecture. ROS VDE functions 604 may be based on segmented, independently loadable executable "component assemblies" 690. These component assemblies 690 are independently securely deliverable. The component assemblies 690 provided by the preferred embodiment comprise code and data elements that are themselves independently deliverable. Thus, each component assembly 690 provided by the preferred embodiment is comprised of independently securely deliverable elements which may be communicated using VDE secure communication techniques, between VDE secure subsystems.

These component assemblies 690 are the basic functional unit provided by ROS 602. The component assemblies 690 are executed to perform operating system or application tasks. Thus, some component assemblies 690 may be considered to be part of the ROS operating system 602, while other component assemblies may be considered to be "applications" that run under the support of the operating system. As with any system incorporating "applications" and "operating systems," the boundary between these aspects of an overall system can be ambiguous. For example, commonly used "application" functions (such as determining the structure and/or other attributes of a content container) may be incorporated into an operating system. Furthermore, "operating system" functions (such as task management, or memory allocation) may be modified and/or replaced by an application. A common thread in the preferred embodiment's ROS 602 is that component assemblies 690 provide functions needed for a user to fulfill her intended activities, some of which may be "application-like" and some of which may be "operating system-like."

Components 690 are preferably designed to be easily separable and individually loadable. ROS 602 assembles these elements together into an executable component assembly 690 prior to loading and executing the component assembly (e.g., in a secure operating environment such as SPE 503 and/or HPE 655). ROS 602 provides an element identification and referencing mechanism that includes information necessary to automatically assemble elements into a component assembly 690 in a secure manner prior to, and/or during, execution.

ROS 602 application structures and control parameters used to form component assemblies 690 can be provided by different parties. Because the components forming component assemblies 690 are independently securely deliverable, they may be delivered at different times and/or by different parties ("delivery" may take place within a local VDE secure subsystem, that is submission through the use of such a secure subsystem of control information by a chain of content control information handling participant for the preparation of a modified control information set constitutes independent, secure delivery). For example, a content creator can produce a ROS 602 application that defines the circumstances required for licensing content contained within a VDE object 300. This application may reference structures provided by other parties. Such references might, for example, take the form of a control path that uses content creator structures to meter user activities; and structures created/owned by a financial provider to handle financial parts of a content distribution transaction (e.g., defining a credit budget that must be present in a control structure to establish creditworthiness, audit processes which must be performed by the licensee, etc.). As another example, a distributor may give one user more favorable pricing than another user by delivering different data elements defining pricing to different users. This attribute of supporting multiple party securely, independently deliverable control information is fundamental to enabling electronic commerce, that is, defining of a content and/or appliance control information set that represents the requirements of a collection of independent parties such as content creators, other content providers, financial service providers, and/or users.

In the preferred embodiment, ROS 602 assembles securely independently deliverable elements into a component assembly 690 based in part on context parameters (e.g., object, user). Thus, for example, ROS 602 may securely assemble different elements together to form different component assemblies 690 for different users performing the same task on the same VDE object 300. Similarly, ROS 602 may assemble differing element sets which may include, that is reuse, one or more of the same components to form different component assemblies 690 for the same user performing the same task on different VDE objects 300.

The component assembly organization provided by ROS 602 is "recursive" in that a component assembly 690 may comprise one or more component "subassemblies" that are themselves independently loadable and executable component assemblies 690. These component "subassemblies" may, in turn, be made of one or more component "sub-sub-assemblies." In the general case, a component assembly 690 may include N levels of component subassemblies.

Thus, for example, a component assembly 690(k) that may includes a component subassembly 690(k+1). Component subassembly 690(k+1), in turn, may include a component sub-sub-assembly 690(3), . . . and so on to N-level subassembly 690(k+N). The ability of ROS 602 to build component assemblies 690 out of other component assemblies provides great advantages in terms of, for example, code/data reusability, and the ability to allow different parties to manage different parts of an overall component.

Each component assembly 690 in the preferred embodiment is made of distinct components. FIGS. 11D-11H are abstract depictions of various distinct components that may be assembled to form a component assembly 690(k) showing FIG. 11I. These same components can be combined in different ways (e.g., with more or less components) to form different component assemblies 690 providing completely different functional behavior. FIG. 11J is an abstract depiction of the same components being put together in a different way (e.g., with additional components) to form a different component assembly 690(j). The component assemblies 690(k) and 690(j) each include a common feature 691 that interlocks with a "channel" 594 defined by ROS 602. This "channel" 594 assembles component assemblies 690 and interfaces them with the (rest of) ROS 602.

ROS 602 generates component assemblies 690 in a secure manner. As shown graphically in FIGS. 11I and 11J, the different elements comprising a component assembly 690 may be "interlocking" in the sense that they can only go together in ways that are intended by the VDE participants who created the elements and/or specified the component assemblies. ROS 602 includes security protections that can prevent an unauthorized person from modifying elements, and also prevent an unauthorized person from substituting elements. One can picture an unauthorized person making a new element having the same "shape" as the one of the elements shown in FIGS. 11D-11H, and then attempting to substitute the new element in place of the original element. Suppose one of the elements shown in FIG. 11H establishes the price for using content within a VDE object 300. If an unauthorized person could substitute her own "price" element for the price element intended by the VDE content distributor, then the person could establish a price of zero instead of the price the content distributor intended to charge. Similarly, if the element establishes an electronic credit card, then an ability to substitute a different element could have disastrous consequences in terms of allowing a person to charge her usage to someone else's (or a non-existent) credit card. These are merely a few simple examples demonstrating the importance of ROS 602 ensuring that certain component assemblies 690 are formed in a secure manner. ROS 602 provides a wide range of protections against a wide range of "threats" to the secure handling and execution of component assemblies 690.

In the preferred embodiment, ROS 602 assembles component assemblies 690 based on the following types of elements:

- Permissions Records ("PERC"s) 808;
- Method "Cores" 1000;
- Load Modules 1100;
- Data Elements (e.g., User Data Elements ("UDEs") 1200 and Method Data Elements ("MDEs") 1202); and
- Other component assemblies 690.

Briefly, a PERC 808 provided by the preferred embodiment s a record corresponding to a VDE object 300 that identifies to ROS 602, among other things, the elements ROS is to assemble together to form a component assembly 690. Thus PERC 808 in effect contains a "list of assembly instructions" or a "plan" specifying what elements ROS 602 is to assemble together into a component assembly and how the elements are to be connected together. PERC 808 may itself contain data or other elements hat are to become part of the component assembly 690.

The PERC 808 may reference one or more method "cores" 1000'. A method core 1000' may define a basic "method" 1000 (e.g., "control," "billing," "metering," etc.)

In the preferred embodiment, a "method" 1000 is a collection of basic instructions, and information related to basic instructions, that provides context, data, requirements, and/or relationships for use in performing, and/or preparing to perform, basic instructions in relation to the operation of one or more electronic appliances 600. Basic instructions may be comprised of, for example:

- machine code of the type commonly used in the programming of computers; pseudo-code for use by an interpreter or other instruction processing program operating on a computer;
- a sequence of electronically represented logical operations for use with an electronic appliance 600;
- or other electronic representations of instructions, source code, object code, and/or pseudo code as those terms are commonly understood in the arts.

Information relating to said basic instructions may comprise, for example, data associated intrinsically With basic instructions such as for example, an identifier for the combined basic instructions and intrinsic data, addresses, constants, and/or the like. The information may also, for example, include one or more of the following:

- information that identifies associated basic instructions and said intrinsic data for access, correlation and/or validation purposes,
- required and/or optional parameters for use with basic instructions and said intrinsic data;
- information defining relationships to other methods;
- data elements that may comprise data values, fields of information, and/or the like;
- information specifying and/or defining relationships among data elements, basic instructions and/or intrinsic data;
- information specifying relationships to external data elements;
- information specifying relationships between and among internal and external data elements, methods, and/or the like, if any exist; and
- additional information required in the operation of basic instructions and intrinsic data to complete, or attempt to complete, a purpose intended by a user of a method, where required, including additional instructions and/or intrinsic data.

Such information associated with a method may be stored, in part or whole, separately from basic instructions and intrinsic data. When these components are stored separately, a method may nevertheless include and encompass the other information and one or more sets of basic instructions and intrinsic data (the latter being included because of said other information's reference to one or more sets of basic instructions and intrinsic data), whether or not said one or more sets of basic instructions and intrinsic data are accessible at any given point in time.

Method core 1000' may be parameterized by an "event code" to permit it to respond to different events in different ways. For example, a METER method may respond to a "use" event by storing usage information in a meter data structure. The same METER method may respond to an "administrative" event by reporting the meter data structure to a VDE clearinghouse or other VDE participant.

In the preferred embodiment, method core 1000' may "contain," either explicitly or by reference, one or more "load modules" 1100 and one or more data elements (UDEs 1200, MDEs 1202). In the preferred embodiment, a "load module" 1100 is a portion of a method that reflects basic instructions and intrinsic data. Load modules 1100 in the preferred embodiment contain executable code, and may also contain data elements ("DTDs" 1108) associated with the executable code. In the preferred embodiment, load modules 1100 supply the program instructions that are actually "executed" by hardware to perform the process defined by the method. Load modules 1100 may contain or reference other load modules.

Load modules 1100 in the preferred embodiment are modular and "code pure" so that individual load modules may be renterable and reusable. In order for components 690 to be dynamically updatable, they may be individually addressable within a global public name space. In view of these design goals, load modules 1100 are preferably small, code (and code-like) pure modules that are individually named and addressable. A single method may provide different load modules 1100 that perform the same or similar functions on different platforms, thereby making the method scalable and/or portable across a wide range of different electronic appliances.

UDEs 1200 and MDEs 1202 may store data for input to or output from executable component assembly 690 (or data describing such inputs and/or outputs). In the preferred embodiment, UDEs 1200 may be user dependent, whereas MDEs 202 may be user independent.

Figure 11E:
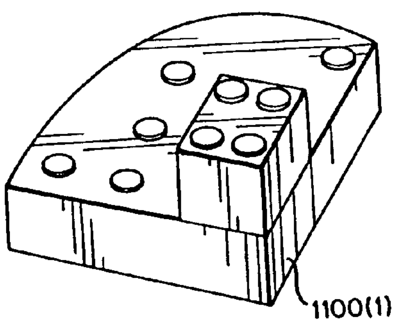
Figure 11F:
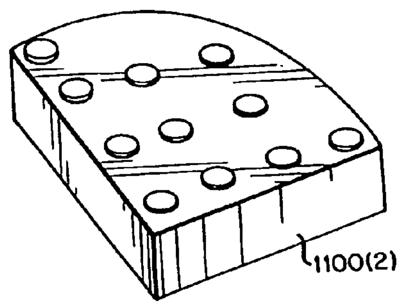
Figure 11G:
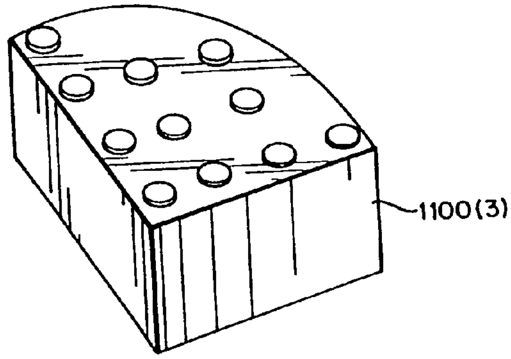
Figure 11H:
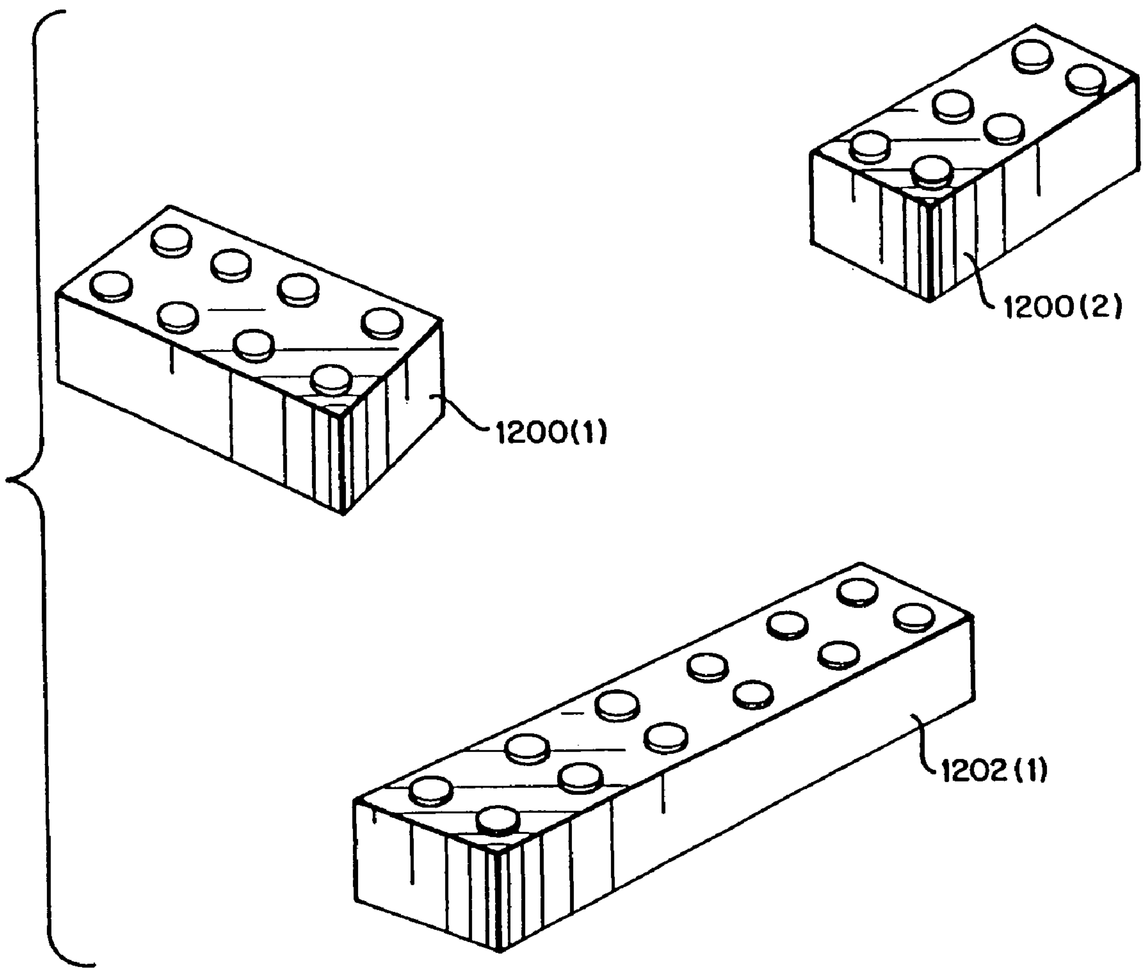
Figure 11I:
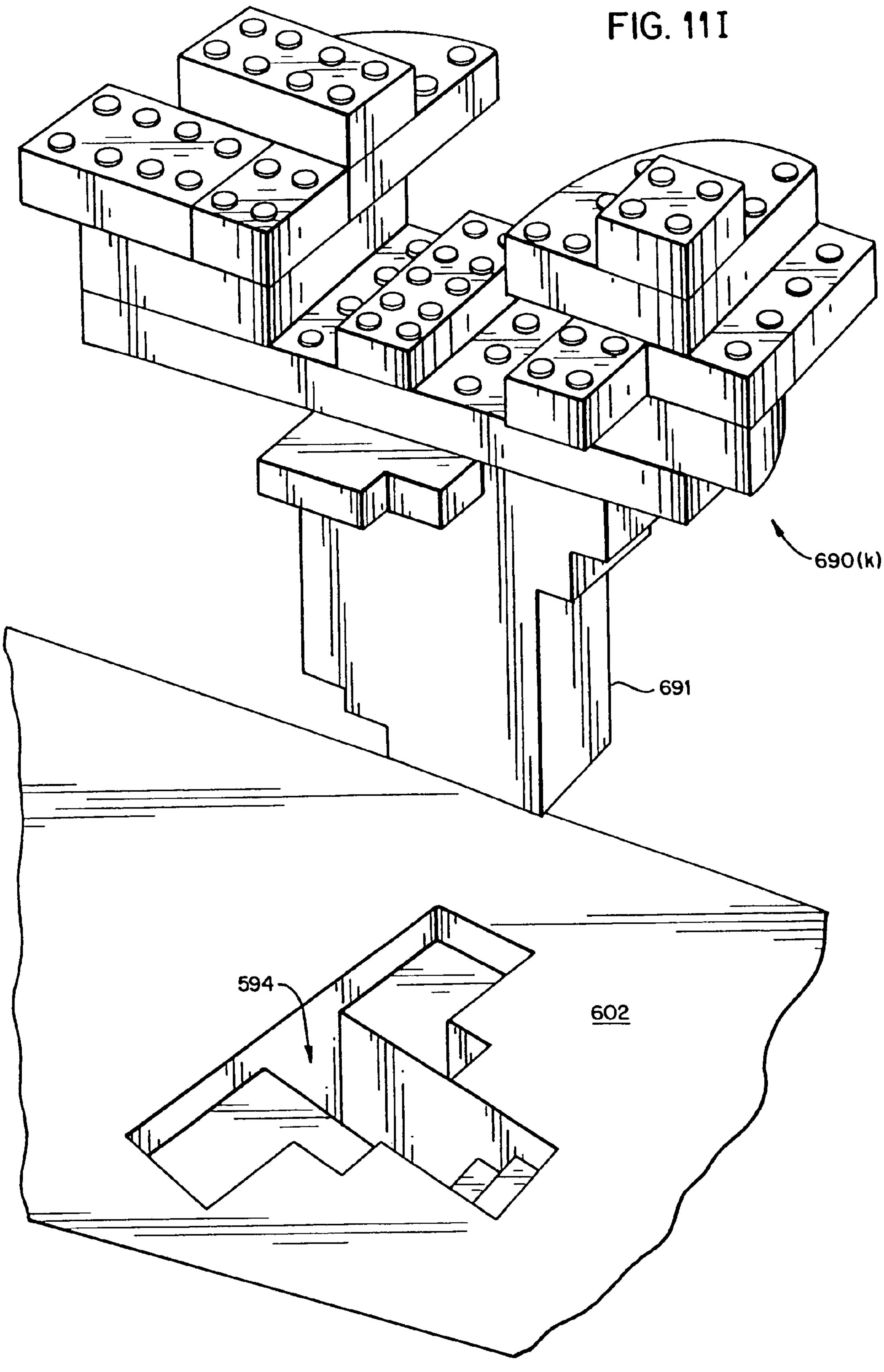
Figure 11J:
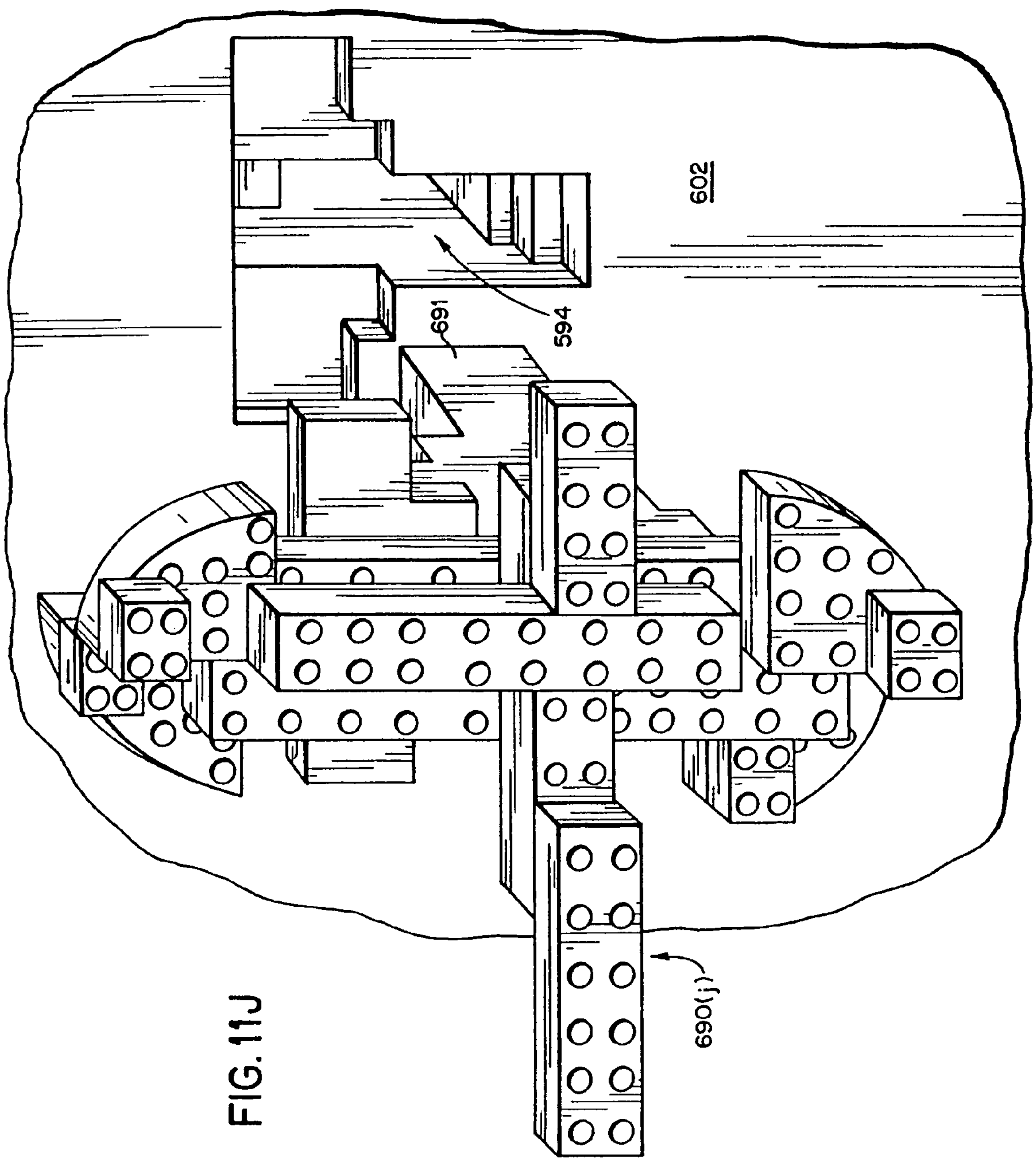

The component assembly example 690(k) shown in FIG. 11E comprises a method core 1000', UDEs 1200*a* & 1200*b*, an MDE 1202, load modules 1100*a*-1100*d*, and a further component assembly 690(k+1). As mentioned above, a PERC 808(k) defines, among other things, the "assembly instructions" for component assembly 690(k), and may contain or reference parts of some or all of the components that are to be assembled to create a component assembly.

One of the load modules 1100*b* shown in this example is itself comprised of plural load modules 1100*c*, 1100*d*. Some of the load modules (e.g., 1100*a*, 1100*d*) in this example include one or more "DTD" data elements 1108 (e g, 1108*a*, 1108*b*) "DTD" data elements 1108 may be used, for example, to inform load module 1100*a* of the data elements included in MDE 1202 and/or UDEs 1200*a*, 1200*b*. Furthermore, DTDs 1108 may be used as an aspect of forming a portion of an application used to inform a user as to the information required and/or manipulated by one or more load modules 1100, or other component elements. Such an application program may also include functions for creating and/or manipulating UDE(s) 1200, MDE(s) 1202, or other component elements, subassemblies, etc.

Components within component assemblies 690 may be "reused" to form different component assemblies. As mentioned above, FIG. 11F is an abstract depiction of one example of the same components used for assembling component assembly 690(k) to be reused (e.g., with some additional components specified by a different set of "assembly instructions" provided in a different PERC 808(1)) to form a different component assembly 690(1). Even though component assembly 690(1) is formed from some of the same components used to form component assembly 690(k), these two component assemblies may perform completely different processes in complete different ways.

As mentioned above, ROS 602 provides several layers of security to ensure the security of component assemblies 690. One important security layer involves ensuring that certain component assemblies 690 are formed, loaded and executed only in secure execution space such as provided within an SPU 500. Components 690 and/or elements comprising them may be stored on external media encrypted using local SPU 500 generated and/or distributor provided keys.

ROS 602 also provides a tagging and sequencing scheme hat may be used within the loadable component assemblies 690 to detect tampering by substitution. Each element comprising a component assembly 690 may be loaded into an SPU 500, decrypted using encrypt/decrypt engine 522, and then tested/compared to ensure that the proper element has been loaded. Several independent comparisons may be used to ensure here has been no unauthorized substitution. For example, the public and private copies of the element ID may be compared to ensure that they are the same, thereby preventing gross substitution of elements. In addition, a validation/correlation tag stored under the encrypted layer of the loadable element may be compared to make sure it matches one or more tags provided by a requesting process. This prevents unauthorized use of information. As a third protection, a device assigned tag (e.g., a sequence number) stored under an encryption layer of a loadable element may be checked to make sure it matches a corresponding tag value expected by SPU 500. This prevents substitution of older elements. Validation/correlation tags are typically passed only in secure wrappers to prevent plaintext exposure of this information outside of SPU 500.

The secure component based architecture of ROS 602 has important advantages. For example, it accommodates limited resource execution environments such as provided by a lower cost SPU 500. It also provides an extremely high level of configurability. In fact, ROS 602 will accommodate an almost unlimited diversity of content types, content provider objectives, transaction types and client requirements. In addition, the ability to dynamically assemble independently deliverable components at execution time based on particular objects and users provides a high degree of flexibility, and facilitates or enables a distributed database, processing, and execution environment.

One aspect of an advantage of the component-based architecture provided by ROS 602 relates to the ability to "stage" functionality and capabilities over time. As designed, implementation of ROS 602 is a finite task. Aspects of its wealth of functionality can remain unexploited until market realities dictate the implementation of corresponding VDE application functionality. As a result, initial product implementation investment and complexity may be limited. The process of "surfacing" the full range of capabilities provided by ROS 602 in terms of authoring, administrative, and artificial intelligence applications may take place over tune Moreover, already-designed functionality of ROS 602 may be changed or enhanced at any time to adapt to changing needs or requirements.

More Detailed Discussion of Rights Operating System 602 Architecture

Figure 12:
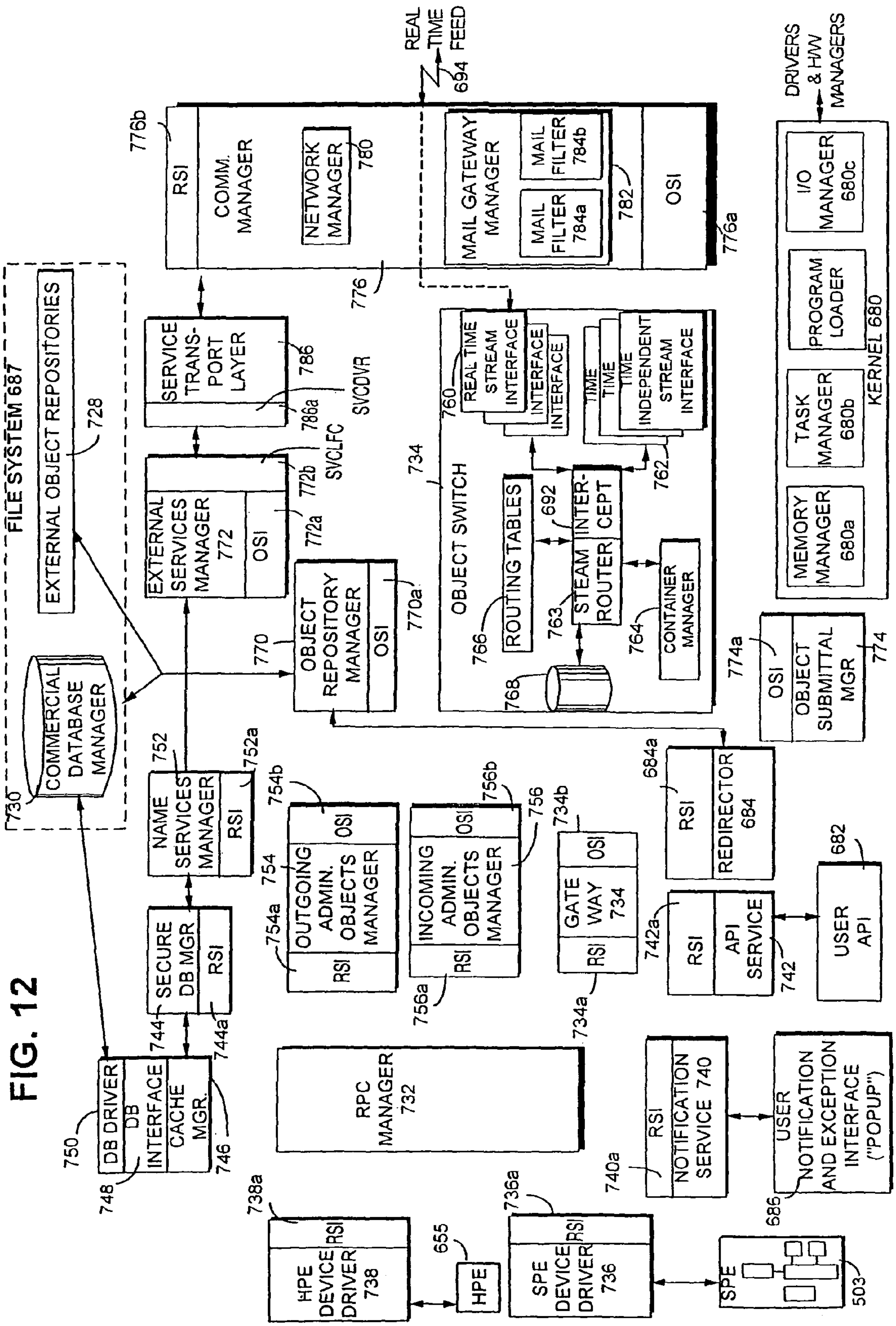
FIG. 12 is a more detailed diagram of an example of the Rights Operating System shown in FIG. 10.

FIG. 12 shows an example of a detailed architecture of ROS 602 shown in FIG. 10. ROS 602 may include a file system 687 that includes a commercial database manager 730 and external object repositories 728. Commercial database manager 730 may maintain secure database 610. Object repository 728 may store, provide access to, and/or maintain VDE objects 300.

FIG. 12 also shows that ROS 602 may provide one or more SPEs 503 and/or one or more HPEs 655. As discussed above, HPE 655 may "emulate" an SPU 500 device, and such HPEs 655 may be integrated in lieu of (or in addition to) physical SPUs 500 for systems that need higher throughput. Some security may be lost since HPEs 655 are typically protected by operating system security and may not provide truly secure processing. Thus, in the preferred embodiment, for high security applications at least, all secure processing should take place within an SPE 503 having an execution space within a physical SPU 500 rather than a HPE 655 using software operating elsewhere in electronic appliance 600.

As mentioned above, three basic components of ROS 602 are a kernel 680, a Remote Procedure Call (RPC) manager 732 and an object switch 734. These components, and the way they interact with other portions of ROS 602, will be discussed below.

Kernel 680

Kernel 680 manages the basic hardware resources of electronic appliance 600, and controls the basic tasking provided by ROS 602. Kernel 680 in the preferred embodiment may include a memory manager 680*a*, a task manager 680*b*, and an 110 manager 680*c*. Task manager 680*b* may initiate and/or manage initiation of executable tasks and schedule them to be executed by a processor on which ROS 602 runs (e.g., CPU 654 shown in FIG. 8). For example, Task manager 680*b* may include or be associated with a "bootstrap loader" that loads other parts of ROS 602. Task manager 680*b* may manage all tasking related to ROS 602, including tasks associated with application program(s) 608 Memory manager 680*a* may manage allocation, deallocation, sharing and/or use of memory (e.g., RAM 656 shown in FIG. 8) of electronic appliance 600, and may for example provide virtual memory capabilities as required by an electronic appliance and/or associated application(s). I/O manager 680*c* may manage all input to and output from ROS 602, and may interact with drivers and other hardware managers that provide communications and interactivity with physical devices.

RPC Manager 782

ROS 602 in a preferred embodiment is designed around a"services based" Remote Procedure Call architecture/interface. All functions performed by ROS 602 may use this common interface to request services and share information. For example, SPE(s) 503 provide processing for one or more RPC based services. In addition to supporting SPUs 500, the RPC interface permits the dynamic integration of external services and provides an array of configuration options using existing operating system components. ROS 602 also communicates with external services through the RPC interface to seamlessly provide distributed and/or remote processing. In smaller scale instances of ROS 602, a simpler message passing IPC protocol may be used to conserve resources. This may limit the configurability of ROS 602 services, but this possible limitation may be acceptable in some electronic appliances.

The RPC structure allows services to be called/requested without the calling process having to know or specify where the service is physically provided, what system or device will service the request, or how the service request will be fulfilled. This feature supports families of services that may be scaled and/or customized for specific applications. Service requests can be forwarded and serviced by different processors and/or different sites as easily as they can be forwarded and serviced by a local service system. Since the same RPC interface is used by ROS 602 in the preferred embodiment to request services within and outside of the operating system, a request for distributed and/or remote processing incurs substantially no additional operating system overhead. Remote processing is easily and simply integrated as part of the same service calls used by ROS 602 for requesting local-based services. In addition, the use of a standard RPC interface ("RSI") allows ROS 602 to be modularized, with the different modules presenting a standardized interface to the remainder of the operating system. Such modularization and standardized interfacing permits different vendors/operating system programmers to create different portions of the operating system independently, and also allows the functionality of ROS 602 to be flexibly updated and/or changed based on different requirements and/or platforms.

RPC manager 732 manages the RPC interface. It receives service requests in the form of one or more "Remote Procedure Calls" (RPCs) from a service requestor, and routes the service requests to a service provider(s) that can service the request. For example, when rights operating system 602 receives a request from a user application via user API 682, RPC manager 732 may route the service request to an appropriate service through the PC service interface" ("RSI"). The RSI is an interface between RPC manager 732, service requestors, and a resource that will accept and service requests.

The RPC interface (RSI) is used for several major. ROS 602 subsystems in the preferred embodiment.

RPC services provided by ROS 602 in the preferred embodiment are divided into subservices, i.e., individual instances a specific service each of which may be tracked individually by RPC manager 732. This mechanism permits multiple instances of a specific service on higher throughput systems while maintaining a common interface across a spectrum of implementations. The subservice concept extends to supporting multiple processors, multiple SPEs 503, multiple HPEs 655, and multiple communications services.

The preferred embodiment ROS 602 provides the following RPC based service providers/requestors (each of which have an RPC interface or "RSI" that communicates with RPC manager 732):

- SPE device driver 736 (this SPE device driver is connected to an SPE 503 in the preferred embodiment);
- HFE Device Driver 738 (this HPE device driver is connected to an HPE 738 in the preferred embodiment);
- Notification Service 740 (this notification service is connected to user notification interface 686 in the preferred embodiment);
- API Service 742 (this API service is connected to user API 682 in the preferred embodiment;
- Redirector 684;
- Secure Database (File) Manager 744 (this secure database or file manager 744 may connect to and interact with commercial database manager 730 and secure files 610 through a cache manager 746, a database interface 748, and a database driver 750);
- Name Services Manager 752;
- Outgoing Administrative Objects Manager 754;
- Incoming Administrative Objects Manager 756;
- a Gateway 734 to object switch 734 (this is a path used to allow direct communication between RPC manager 732 and Object Switch 734); and'
- Communications Manager 676.

The types of services provided by HFE 655, SPE 503, User Notification 686, API 742 and Redirector 684 have already been described above. Here is a brief description of the type(s) of services provided by OS resources 744, 752, 754, 756 and 776:

- Secure Database Manager 744 services requests for access to secure database 610,
- Name Services Manager 752 services requests relating to user, host, or service identification,
- Outgoing Administrative Objects Manager 754 services requests relating to outgoing administrative objects,
- Incoming Administrative Objects Manager 756 services requests relating to incoming administrative objects, and
- Communications Manager 776 services requests relating to communications between electronic appliance 600 and the outside world.

Object Switch 734

Object switch 734 handles, controls and communicates (both locally and remotely) VDE objects 300. In the preferred embodiment, the object switch may include the following elements:

- a stream router 758;
- a real time stream interface(s) 760 (which may be connected to real time data feed(s)694);
- a time dependent stream interface(s) 762,
- a intercept 692;
- a container manager 764;
- one or more routing tables 766; and
- buffering/storage 768.

Stream router 758 routes to/from "real time" and "time independent" data streams handled respectively by real time stream interface(s) 760 and tune dependent stream interface(s) 762. Intercept 692 intercepts 110 requests that involve real-time information streams such as, for example, real time feed 694. The routing performed by stream router 758 may be determined by routing tables 766. Buffering/storage 768 provides temporary store-and-forward, buffering and related services. Container manager 764 may (typically in conjunction with VSPE 503) perform processes on VDE objects 300 such as constructing, deconstructing, and locating portions of objects.

Object switch 734 communicates through an Object Switch Interface ("OSI") with other parts of ROS 602. The Object Switch Interface may resemble, for example, the interface for a Unix socket in the preferred embodiment. Each of the "OSI" interfaces shown in FIG. 12 have the ability to communicate with object switch 734.

ROS 602 includes the following object switch service providers/resources (each of which can communicate with the object switch 734 through an "OSI"):

Outgoing Administrative Objects Manager 754;
Incoming Administrative Objects Manager 756;
Gateway 734 (which may translate RPC calls into object switch calls and vice versa so RPC manager 732 may communicate with object switch 734 or any other element having an OSI to, for example, provide and/or request services);
External Services Manager 772;
Object Submittal Manager 774; and
Communications Manager 776.

Briefly,

Object Repository Manager 770 provides services relating to access to object repository 728;
External Services Manager 772 provides services relating to requesting and receiving services externally, such as from a network resource or another site;
Object Submittal Manager 774 provides services relating to how a user application may interact with object switch 734 (since the object submittal manager provides an interface to an application program 608, it could be considered part of user API 682); and
Communications Manager 776 provides services relating to communicating with the outside world.

In the preferred embodiment, communications manager 776 may include a network manager 780 and a mail gateway (manager) 782. Mail gateway 782 may include one or more mail filters 784 to, for example, automatically route VDE related electronic mail between object switch 734 and the outside world electronic mail services. External Services Manager 772 may interface to communications manager 776 through a Service Transport Layer 786. Service Transport Layer 786*a* may enable External Services Manager 772 to communicate with external computers and systems using various protocols managed using the service transport layer 786.

The characteristics of and interfaces to the various subsystems of ROS 680 shown in FIG. 12 are described in more detail below.

RPC Manager 732 and Its RPC Services Interface

As discussed above, the basic system services provided by ROS 602 are invoked by using an RPC service interface (RSI). This RPC service interface provides a generic, standardized interface for different services systems and subsystems provided by ROS 602.

RPC Manager 732 routes RPCs requesting services to an 'appropriate RPC service interface. In the preferred embodiment, upon receiving an RPC call, RPC manager 732 determines one or more service managers that are to service the request. RPC manager 732 then routes a service request to the appropriate service(s) (via a RSI associated with a service) for action by the appropriate service manager(s).

For example, if a SPE 503 is to service a request, the RPC Manager 732 routes the request to RSI 736*a*, which passes the request on to SPE device driver 736 for forwarding to the SPE. Similarly, if HPE 655 is to service the request, RPC Manager 732 routes the request to RSI 738*a* for forwarding to a HPE. In one preferred embodiment, SPE 503 and HPE 655 may perform essentially the same services so that RSIs 736*a*, 738*a* are different instances of the same RSI. Once a service request has been received by SPE 503 (or HPE 655), the SPE (or HPE) typically dispatches the request internally using its own internal RPC manager (as will be discussed shortly). Processes within SPEs 503 and HPEs 655 can also generate RPC requests. These requests may be processed internally by a SPE/HPE, or if not internally serviceable, passed out of the SPE/HPE for dispatch by RPC Manager 732.

Remote (and local) procedure calls may be dispatched by a RPC Manager 732 using an "RPC Services Table." An RPC Services Table describes where requests for specific services are to be routed for processing Each row of an RPC Services Table in the preferred embodiment contains a services ID, the location of the service, and an address to which control will be passed to service a request. An RPC Services Table may also include control information, that indicates which instance of the RPC dispatcher controls the service. Both RPC Manager 732 and any attached SPEs 503 and HPEs 655 may have symmetric copies of the RPC Services Table. If an RPC service is not found in the RPC services tables, it is either rejected or passed to external services manager 772 for remote servicing.

Assuming RPC manager 732 finds a row corresponding to the request in an RPC Services Table, it may dispatch the request to an appropriate RSI. The receiving RSI accepts a request from the RPC manager 732 (which may have looked up the request in an RPC service table), and processes that request in accordance with internal priorities associated with the specific service.

In the preferred embodiment, RPC Service Interface(s) supported by RPC Manager 732 may be standardized and published to support add-on service modules developed by third party vendors, and to facilitate scalability by making it easier to program ROS 602. The preferred embodiment RSI closely follows the DOS and Unix device driver models for block devices so that common code may be developed for many platforms with minimum effort. An example of one possible set of common entry points are listed below in the table.

| Interface call | Description |
|---|---|
| SVC_LOAD | Load a service manager and return its status. |
| SVC_UNLOAD | Unload a service manager. |
| SVC_MOUNT | Mount (load) a dynamically loaded subservice and return its status. |
| SVC_UNMOUNT | Unmount (unload) a dynamically loaded subservice. |
| SVC_OPEN | Open a mounted subservice. |
| SVC_CLOSE | Close a mounted subservice. |
| SVC_READ | Read a block from an opened subservice. |
| SVC_WRITE | Write a block to an opened subservice. |
| SVC_IOCTL | Control a subservice or a service manager. |

Load

In the preferred embodiment, services (and the associated RSIs they present to RPC manager 732) may be activated during boot by an installation boot process that issues an RPC LOAD. This process reads an RPC Services Table from a configuration file, loads the service module if it is run time loadable (as opposed to being a kernel linked device driver), and then calls the LOAD entry point for the service. A successful return from the LOAD entry point will indicate that the service has properly loaded and is ready to accept requests.

RPC LOAD Call Example: SVC_LOAD (Long Service_id)

This LOAD interface call is called by the RPC manager 732 during rights operating system 602 initialization. It permits a service manager to load any dynamically loadable components and to' initialize any device and memory required by the service. The service number that the service is loaded as is passed in as service_id parameter. In the preferred embodiment, the service returns 0 is the initialization process was completed successfully or an error number if some error occurred.

Mount

Once a service has been loaded, it may not be fully functional for all subservices. Some subservices (e.g., communications based services) may require the establishment of additional connections, or they may require additional modules to be loaded. If the service is defined as "mountable," a RPC manager 732 will call the MOUNT subservice entry point with the requested subservice ID prior to opening an instance of a subservice.

RPC MOUNT Call Example:

SVC_MOUNT (long service_id, long subservice_id, BYTE *buffer)

This MOUNT interface call instructs a service to make a specific subservice ready. This may include services related to networking, communications, other system services, or external resources. The service_id and subservice_id parameters may be specific to the specific service being requested. The buffer parameter is a memory address that references a control structure appropriate to a specific service.

Open

Once a service is loaded and "mounted," specific instances of a service may be "opened" for use. "Opening" an instance of a service may allocate memory to store control and status information. For example, in a BSD socket based network connection, a LOAD call will initialize the software and protocol control tables, a MOUNT call will specify networks and hardware resources, and an OPEN will actually open a socket to a remote installation.

Some services, such as commercial database manager 730 that underlies the secure database service, may not be "mountable." In this case, a LOAD call will make a connection to a database manager 730 and ensure that records are readable; An OPEN call may create instances of internal cache manager 746 for various classes of records.

RPC OPEN Call Example:

SVC_OPEN (long service_id, long subservice_id, BYTE *buffer, int (*receive) (long request_id))

This OPEN interface call instructs a service to open a specific subservice. The service_id and subservice_id parameters are specific to the specific service being requested, and the buffer parameter is a memory address that references a control structure appropriate to a specific service.

The optional receive parameter is the address of a notification callback function that is called by a service whenever a message is ready for the service to retrieve it. One call to this address is made for each incoming message received. If the caller passes a NULL to the interface, the software will not generate a callback for each message.

Close, Unmount and Unload

The converse of the OPEN, MOUNT, and LOAD calls are CLOSE, UNMOUNT, and UNLOAD. These interface calls release any allocated resources back to ROS 602 (e.g., memory manager 680*a*).

RPC CLOSE Call Example: SVC_CLOSE (long svc_handle)

This LOAD interface call closes an open service "handle." A service "handle" describes a service and subservice that a user wants to close. The call returns 0 if the CLOSE request succeeds (and the handle is no longer valid).or an error number.

RPC UNLOAD Call Example: SVC_UNLOAD (Void)

This UNLOAD interface call is called by a RPC manager 732 during shutdown or resource reallocation of rights operating system 602. It permits a service to close any open connections, flush buffers, and to release any operating system resources that it may have allocated. The service returns 0.

RPC UNMOUNT Call Example: SVC_UNMOUNT (long service_id, long subservice_id)

This UNMOUNT interface call instructs a service to deactivate a specific subservice. The service_id and subservice_id parameters are specific to the specific áervice being requested, and must have been previously mounted using the SVC_MOUNT( ) request. The call releases all system resources associated with the subservice before it returns.

Read and Write

The READ and WRITE calls provide a basic mechanism for sending information to and receiving responses from a mounted and opened service. For example, a service has requests written to it in the form of an RPC request, and makes its response available to be read by RPC Manager 732 as they become available.

RPC READ Call Example:

SVC_READ (long svc_handle, long request_id, BYTE *buffer, long size)

This READ call reads a message response from a service. The svc_handle and request_id parameters uniquely identify a request. The results of a request will be stored in the user specified buffer up to size bytes. If the buffer is too small, the first size bytes of the message will be stored in the buffer and an error will be returned.

If a message response was returned to the caller's buffer correctly, the function will return 0. Otherwise, an error message will be returned.

RPC WRITE Call Example:

SVC_write (long service_id, long subservice_id, BYTE *buffer, long size, int (*receive) (long request_id)

This WRITE call writes a message to a service and subservice specified by the service_id/subservice_id parameter pair. The message is stored in buffer (and usually conforms to the VDE RPC message format) and is size bytes long. The function returns the request id for the message (if it was accepted, for sending) or an error number. If a user specifies the receive callback functions, all messages regarding a request will be sent to the request specific callback; routine instead of the generalized message callback.

Input/Output Control

The IOCTL ("Input/Output ConTroL") call provides a mechanism for querying the status of and controlling a loaded service. Each service type will respond to specific general IOCTL requests, all required class IOCTL requests, and service specific IOCTL requests.

RPC IOCTL Call Example: ROLSVC_IOCTL (lông service_id, long subservice_id, int command, BYTE *buffer)

This IOCTL function provides a generalized control interface for a RSI. A user specifies the service_id parameter and an optional subservi ce_id parameter that they wish to control They specify the control command parameter(s), and a buffer into/from which the command parameters may be written/read. An example of a list of commands and the appropriate buffer structures are given below.

| Command | Structure | Description |
|---|---|---|
| GET_iNFO | SVC_INFO | Returns information about a service/subservice. |
| GET_STATS | SVC_STATS | Returns currant statistics about a service/subservice. |
| CLR_STATS | None | Clears the statistics about a service/subservice |

Now that a generic RPC Service Interface provided by the preferred embodiment has been described, the following description relates to particular examples of services provided by ROS 602.

SPE Device Driver 736

SPE device driver 736 provides an interface between ROS 602 and SPE 503. Since SPE 503 in the preferred embodiment runs within the confines of an SPU 500, one aspect of this device driver 736 is to provide low level communications services with the SPU 500 hardware. Another aspect of SPE device driver 736 is to provide an RPC service interface (RSI) **736*a* particular to SPE 503 (this same RSI may be used to communicate with HPE 655 through HPE device driver 738**).

SPE RSI **736*a* and driver 736 isolates calling processes within ROS 602 (or external to the ROS) from the detailed service provided by the SPE 503 by providing a set of basic interface points providing a concise function set. This has several advantages. For example, it permits a full line of scaled SPUs 500 that all provide common functionality to the outside world but which may differ in detailed internal structure and architecture. SPU 500 characteristics such as the amount of memory resident in the device, processor speed, and the number of services supported within SPU 500 may be the decision of the specific SPU manufacturer, and in any event may differ from one SPU configuration to another. To maintain compatibility, SPE device driver 736 and the RSI 736*a* it provides conform to a basic common RPC interface standard that "hides" differences between detailed configurations of SPUs 500 and/or the SPEs 503** they may support.

To provide for such compatibility, SPE RSI **736*a* in the preferred embodiment follows a simple block based standard. In the preferred embodiment, an SPE RSI 736*a* may be modeled after the packet interfaces for network Ethernet cards. This standard closely models the block mode interface characteristics of SPUs 500** in the preferred embodiment.

An SPE RSI **736*a* allows RPC calls from RPC manager 732 to access specific services provided by an SPE 736. To do this, SPE RSI 736*a* provides a set of "service notification address interfaces." These provide interfaces to individual services provided by SPE 503 to the outside world. Any calling process within ROS 602 may access these SPE-provided services by directing an RPC call to SPE RSI 736*a* and specifying a corresponding "service notification address" in an RPC call. The specified service notification "address" causes SPE 503** to internally route an RPC call to a particular service within an SPE. The following is a listing of one example of a SPE service breakdown for which individual service notification addresses may be provided:

Channel Services Manager

Authentication Manager/Secure Communications Manager

Secure Database Manager

The Channel Services Manager is the principal service provider and access point to SPE 503 for the rest of ROS 602. Event processing, as will be discussed later, is primarily managed (from the point of view of processes outside SPE 503) by this service. The Authentication Manager/Secure Communications Manager may provide login/logout services for users of ROS 602, and provide a direct service for managing communications (typically encrypted or otherwise protected) related to component assemblies 690, VDE objects 300, etc. Requests for display of information (e.g., value remaining in a financial budget) may be provided by a direct service request to a Secure Database Manager inside SPE 503 The instances of Authentication Manager/Secure Communications Manager and Secure Database Manager, if available at all, may provide only a subset of the information and/or capabilities available to processes operating inside SPE 503. As stated above, most (potentially all) service requests entering SPE are routed to a Channel Services Manager for processing. As will be discussed in more detail later on, most control structures and event processing logic is associated with component assemblies 690 under the management of a Channel Services Manager.

The SPE 503 must be accessed through its associated SPE driver 736 in this example. Generally, calls to SPE driver 736 are made in response to RPC calls. In this example, SPE driver RSI **736*a* may translate RPC calls directed to control or ascertain information about SPE driver 736 into driver calls SPE driver RSI 736*a* in conjunction with driver 736 may pass RPC calls directed to SPE 503** through to the SPE.

The following table shows one example of SPE device driver 736 calls:

| Entry Point | Description |
|---|---|
| SPE_info( ) | Returns summary information about the SPE driver 736 (and SPE 503) |
| SPE_initialize_interface( ) | Initializes SPE driver 736, and sets the default notification address for received packets. |
| SPE_terminate_interface( ) | Terminates SPE driver 736 and resets SPU 500 and the driver 736. |
| SPE_reset_interface( ) | Resets driver 736 without resetting SPU_500. |
| SPE_get_stats( ) | Return statistics for notification addresses and/or an entire driver 736. |
| SPE_clear_stats( ) | Clears statistics for a specific notification address, and/or an entire driver 736. |
| SPE_set_notify( ) | Sets a notification address for a specific service ID. |
| SPE_get_notify( ) | Returns a notification address for a specific service ID. |
| SPE_tx_pkt( ) | Sends a packet (e.g., containing an RPC call) to SPE 503 for processing. |

The following are more detailed examples of each of the SPE driver calls set forth in the table above.

Example of an "SPE Information" Driver Call: SPE_info (Void)

This function returns a pointer to an SPE_INFO data structure that defines the SPE device driver **736*a*. This data structure may provide certain information about SPE device driver 736, RSI 736*a* and/or SPU 500**. An example of a SPE_INFO structure is described below:

| |
|---|
| Version Number/ID for SPE Device Driver 736 |
| Version Number/ID for SPE Device Driver RSI 736 |
| Pointer to name of SPE Device Driver 736 |
| Pointer to ID name of SPU 500 |
| Functionality Code Describing SPE Capabilities/functionality |

Example of an SPE "Initialize Interface" Driver Call:

SPE_initialize_interface (int (fcn *receiver)(void))

A receiver function passed in by way of a parameter will be called for all packets received from SPE 503 unless their destination service is over-ridden using the set_notify( ) call. A receiver function allows ROS 602 to specify a format for packet communication between RPC manager 732 and SPE 503.

This function returns "0" in the preferred embodiment if the initialization of the interface succeeds and non-zero if it fails. If the function fails, it will return a code that describes the reason for the failure as the value of the function.

Example of an SPE "Terminate Interface" Driver Call:

SPE_terminate_interface (Void)

In the preferred embodiment, this function shuts down SPE Driver 736, clears all notification addresses, and terminates all outstanding requests between an SPE and an ROS RPC manager, 732. It also resets an SPE 503 (e.g., by a warm reboot of SPU 500) after all requests are resolved.

Termination of driver 736 should be performed by ROS 602 when the operating system is starting to shut down. It may also be necessary to issue this call if an SPE 503 and ROS 602 get so far out of synchronization that all processing in an SPE must be reset to a known state.

Example of an SPE "Reset Interface" Driver Call:

SPE_reset_interface (void)

This function resets driver 736, terminates all outstanding requests between SPE 503 and an ROS RPC manager 732, and clears all statistics counts. It does not reset the SPU 500, but simply restores driver 736 to a known stable state.

Example of an SPE "Get Statistics" Driver Call: SPE_get_stats (long service_id)

This function returns statistics for a specific service notification interface or for the SPE driver 736 in general. It returns a pointer to a static buffer that contains these statistics or NULL if statistics are unavailable (either because an interface is not initialized or because a receiver address was not specified). An example of the SPE_STATS structure may have the following definition:

| Service id |
|---|
| # packets rx |
| # packets tx |
| # bytes rx |
| # bytes tx |
| # errors rx |
| # errors tx |
| # requests tx |
| # req tx completed |
| # req tx cancelled |
| # req rx |
| # req rx completed |
| # req rx cancelled |

If a user specifies a service ID, statistics associated with packets sent by that service are returned. If a user specified 0 as the parameter, the total packet statistics for the interface are returned.

Example of an SPE "Clear Statistic" Driver Call: SPE_clear_stats (long service_d)

This function clears statistics associated with the SPE service_id specified. If no service_id is specified (i.e., the caller passes in 0), global statistics will be cleared. The function returns 0 if statistics are successfully cleared or an error number if an error occurs.

Example of an SPE "Set Notification Address" Driver Call: SPE_set_notify (long service_id, int (fcn*receiver) (void))

This function sets a notification address (receiver) for a specified service. If the notification address is set to NULL, SPE device driver 736 will send notifications for packets to the specified service to the default notification address.

Example of a SPE "Get Notification Address" Driver Call: SPE_get_notify (long service_id)

This function returns a notification address associated with the named service or NULL if no specific notification address has been specified.

Example of an "SPE Send Packet" Driver Call:

send_pkt (BYTE *buffer, long size, int (far *receive) (void))

This function sends a packet stored in buffer of "length" size. It returns 0 if the packet is sent successfully, or returns an error code associated with the failure.

Redirector Service Manager 684

The redirector 684 is a piece of systems integration software used principally when ROS 602 is provided by "adding on" to a pre-existing operating system or when "transparent" operation is desired for some VDE functions, as described earlier. In one embodiment the kernel 680, part of communications manager 776, file system 687, and part of API service 742 may be part of a pre-existing operating system such as DOS, Windows, UNIX, Macintosh System, OS9, PSOS, OS/2, or other operating system platform. The remainder of ROS 602 subsystems shown in FIG. 12 may be provided as an "add on" to a preexisting operating system. Once these ROS subsystems have been supplied and "add on," the integrated whole comprises the ROS 602 shown in FIG. 12.

In a scenario of this type of integration, ROS 602 will continue to be supported by a preexisting OS kernel 680, but may supplement (or even substitute) many of its functions by providing additional add-on pieces such as, for example, a virtual memory manager.

Also in this integration scenario, an add-on portion of API service 742 that integrates readily with a preexisting API service is provided to support VDE function calls. A pre-existing API service integrated with an add-on portion supports an enhanced set of operating system calls including both calls to VDE functions 604 and calls to functions 606 other than VDE functions (see FIG. 11A). The add-on portion of API service 742 may translate VDE function calls into RPC calls for routing by RPC manager 732.

ROS 602 may use a standard communications manager 776 provided by the preexisting operating system, or it may provide "add ons" and/or substitutions to it that may be readily integrated into it. Redirector 684 may provide this integration function.

This leaves a requirement for ROS 602 to integrate with a preexisting file system 687. Redirector 684 provides this integration function.

In this integration scenario, file system 687 of the preexisting operating system is used for all accesses to secondary storage. However, VDE objects 300 may be stored on secondary storage in the form of external object repository 728, file system 687, or remotely accessible through communications manager 776. When object switch 734 wants to access external object repository 728, it makes a request to the object repository manager 770 that then routes the request to object repository 728 or to redirector 692 (which in turn accesses the object in file system 687).

Generally, redirector 684 maps VDE object repository 728 content into preexisting calls to file system 687. The redirector 684 provides preexisting OS level information about a VDE object 300, including mapping the object into a preexisting OS's name space. This permits seamless access to VDE protected content using "normal" file system 687 access techniques provided by a preexisting operating system.

In the integration scenarios discussed above, each preexisting target OS file system 687 has different interface requirements by which the redirector mechanism 684 may be "hooked." In general, since all commercially viable operating systems today provide support for network based volumes, file systems, and other devices (e.g., printers, modems, etc.), the redirector 684 may use low level network and file access "hooks" to integrate with a preexisting operating system. "Add ons" for supporting VDE functions 602 may use these existing hooks to integrate with a preexisting operating system.

User Notification Service Manager 740

User Notification Service Manager 740 and associated user notification exception interface ("pop up") 686 provides ROS 602 with an enhanced ability to communicate with a user of electronic appliance 600. Not all applications 608 may be designed to respond to messaging from ROS 602 passed through API 682, and it may in any event be important or desirable to give ROS 602 the ability to communicate with a user no matter what state an application is in. User notification services manager 740 and interface 686 provides ROS 602 with a mechanism to communicate directly with a user, instead of or in addition to passing a return call through API 682 and an application 608. This is similar, for example, to the ability of the Windows operating system to display a user message in a "dialog box" that displays "on top of" a running application irrespective of the state of the application.

The User Notification 686 block in the preferred embodiment may be implemented as application code. The implementation of interface 740*a* is preferably built over notification service manager 740, which may be implemented as part of API service manager 742. Notification services manager 740 in the preferred embodiment provides notification support to dispatch specific notifications to an appropriate user process via the appropriate API return, or by another path. This mechanism permits notifications to be routed to any authorized process—not just back to a process that specified a notification mechanism.

API Service Manager 742

The preferred embodiment API Service Manager 742 is implemented as a service interface to the RPC service manager 732 All user API requests are built on top of this basic interface. The API Service Manager 742 preferably provides a service instance for each running user application 608.

Most RPC calls to ROS functions supported by API Service Manager 742 in the preferred embodiment may map directly to service calls with some additional parameter checking. This mechanism permits developers to create their own extended API libraries with additional or changed functionality.

In the scenario discussed above in which ROS 602 is formed by integrating "add on" with a preexisting operating system, the API service 742 code may be shared (e g, resident in a host environment like a Windows DLL), or it may be directly linked with an applications's code—depending on an application programmer's implementation decision, and/or the type of electronic appliance 600. The Notification Service Manager 740 may be implemented within API 682. These components interface with Notification Service component 686 to provide a transition between system and user space.

Secure Database Service Manager ("SDSM") 744

There are at least two ways that may be used for managing secure database 600:

a commercial database approach, and a site record number approach.

Which way is chosen may be based on the number of records that a VDE site stores in the secure database 610.

The commercial database approach uses a commercial database to store securely wrappered records in a commercial database. This way may be preferred when there are a large number of records that are stored in the secure database 610 This way provides high speed access, efficient updates, and easy integration to host systems at the cost of resource usage (most commercial database managers use many system resources).

The site record number approach uses a "site record number" ("SRN") to locate records in the system This scheme is preferred when the number of records stored in the secure database 610 is small and is not expected to change extensively over time. This way provides efficient resources use with limited update capabilities. SRNs permit further grouping of similar data records to speed access and increase performance.

Since VDE 100 is highly scalable, different electronic appliances 600 may suggest one way more than the other. For example, in limited environments like a set top, PDA, or other low end electronic appliance, the SRN scheme may be preferred because it limits the amount of resources (memory and processor) required. When VDE is deployed on more capable electronic appliances 600 such as desktop computers, servers and at clearinghouses, the commercial database scheme may be more desirable because it provides high performance in environments where resources are not limited.

One difference between the database records in the two approaches is whether the records are specified using a full VDE ID or SRN. To translate between the two schemes, a SRN reference may be replaced with a VDE ID database reference wherever it occurs Similarly, VDE IDs that are used as indices or references to other items may be replaced by the appropriate SRN value.

In the preferred embodiment, a commercially available database manager 730 is used to maintain secure database 610. ROS 602 interacts with commercial database manager 730 through a database driver 750 and a database interface 748. The database interface 748 between ROS 602 and external, third party database vendors' commercial database manager 730 may be an open standard to permit any database vendor to implement a VDE compliant database driver 750 for their products.

ROS 602 may encrypt each secure database 610 record so that a VDE-provided security layer is "on top of" the commercial database structure. In other words, SPE 736 may write secure records in sizes and formats that may be stored within a database record structure supported by commercial database manager 730. Commercial database manager 730 may then be used to organize, store, and retrieve the records In some embodiments, it may be desirable to use a proprietary and/or newly created database manager in place of commercial database manager 730. However, the use of commercial database manager 730 may provide certain advantages such as, for example, an ability to use already existing database management product(s).

The Secure Database Services Manager ("SDSM") 744 makes calls to an underlying commercial database manager 730 to obtain, modify, and store records in secure database 610. In the preferred embodiment, "SDSM" 744 provides a layer "on top of" the structure of commercial database manager 730. For example, all VDE-secure information is sent to commercial database manager 730 in encrypted form. SDSM 744 in conjunction with cache manager 746 and database interface 748 may provide record management, caching (using cache manager 746), and related services (on top of) commercial database systems 730 and/or record managers. Database Interface 748 and cache manager 746 in the preferred embodiment do not present their own RSI, but rather the RPC Manager 732 communicates to them through the Secure Database Manager RSI 744*a.*

Name Services Manager 752

The Name Services Manager 752 supports three subservices: user name services, host name services, and services name services. User name services provides mapping and lookup between user name and user ID numbers, and may also support other aspects of user-based resource and information security. Host name services provides mapping and lookup between the names (and other information, such as for example address, communications connection/routing information, etc) of other processing resources (e g, other host electronic appliances) and VDE node Ids. Services name service provides a mapping and lookup between services names and other pertinent information such as connection information (e g, remotely available service routing and contact information) and service IDs.

Name Services Manager 752 in the preferred embodiment is connected to External Services Manager 772 so that it may provide external service routing information directly to the external services manager. Name services manager 752 is also connected to secure database manager 744 to permit the name services manager 752 to access name services records stored within secure database 610.

External Services Manager 772 & Services Transport Layer 786

The External Services Manager 772 provides protocol support capabilities to interface to external service providers. External services manager 772 may, for example, obtain external service routing information from name services manager 752, and then initiate contact to a particular external service (e.g., another VDE electronic appliance 600, a financial clearinghouse, etc.) through communications manager 776. External services manager 772 uses a service transport layer 786 to supply communications protocols and other information necessary to provide communications.

There are several important examples of the use of External Services Manager 772. Some VDE objects may have some or all of their content stored at an Object Repository 728 on an electronic appliance 600 other than the one operated by a user who has, or wishes to obtain, some usage rights to such VDE objects. In this case, External Services Manager 772 may manage a connection to the electronic appliance 600 where the VDE objects desired (or their content) is stored. In addition, file system 687 may be a network file system (e.g., Netware, LANtastic, NFS, etc.) that allows access to VDE objects using redirecter 684. Object switch 734 also supports this capability.

If External Services Manager 772 is used to access VDE objects, many different techniques are possible. For example, the VDE objects may be formatted for use with the World Wide Web protocols (HTML, HTTP, and TJRL) by including relevant headers, content tags, host ID to URL conversion (e.g., using Name Services Manager 752) and an HTTP-aware instance of Services Transport Layer 786.

In other examples, External Services Manager 772 may be used to locate, connect to, and utilize remote event processing services, smart agent execution services (both to provide these services and locate them), certification services for Public Keys, remote Name Services; and other remote functions either supported by ROS 602 RPCs (e.g., have RSIs), or using protocols supported by Services Transport Layer 786.

Outgoing Administrative Object Manager 754.

Outgoing administrative object manager 754 receives administrative objects from object switch 734, object repository manager 770 or other source for transmission to another VDE electronic appliance. Outgoing administrative object manager 754 takes care of sending the outgoing object to its proper destination. Outgoing administrative object manager 754 may obtain routing information from name services manager 752, and may use communications service 776 to send the object. Outgoing administrative object manager 754 typically maintains records (in concert with SPE 503) in secure database 610 (e.g., shipping table 444) that reflect when objects have been successfully transmitted, when an object should be transmitted, and other information related to transmission of objects.

Incoming Administrative Object Manager 756

Incoming administrative object manager 756 receives administrative objects from other VDE electronic appliances 600 via communications manager 776. It may route the object to object repository manager 770, object switch 734 or other destination. Incoming administrative object manager 756 typically maintains records (in concert with SPE 503) in secure database 610 (e.g., receiving table 446) that record which objects have been received, objects expected for receipt, and other information related to received and/or expected objects.

Object Repository Manager 770

Object repository manager 770 is a form of database or file manager. It manages the storage of VDE objects 300 in object repository 728, in a database, or in the file system 687. Object repository manager 770 may also provide the ability to browse and/or search information related to objects (such as summaries of content, abstracts, reviewers' commentary, schedules, promotional materials, etc.), for example, by using INFORMATION methods associated with VDE objects 300.

Object Submittal Manager 774

Object submittal manager 774 in the preferred embodiment provides an interface between an application 608 and object switch 734, and thus may be considered in some respects part of API 682. For example, it may allow a user application to create new VDE objects 300. It may also allow incoming/outgoing administrative object managers 756, 754 to create VDE objects 300 (administrative objects).

Figure 12A:
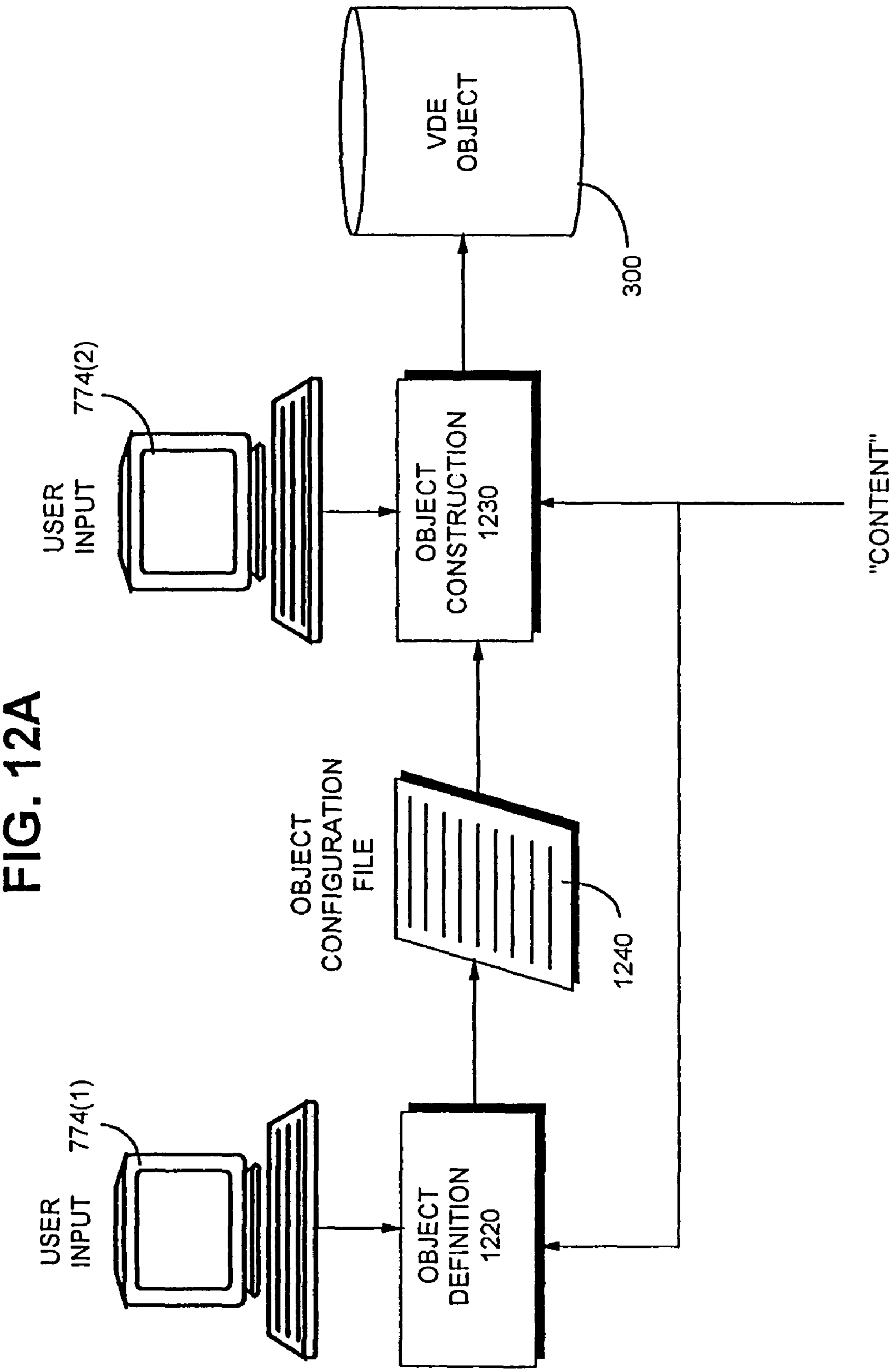
FIG. 12A shows an example of how "objects" can be created.

FIG. 12A shows how object submittal manager 774 may be used to communicate with a user of electronic appliance 600 to help to create a new VDE object 300. FIG. 12A shows that object creation may occur in two stages in the preferred embodiment an object definition stage 1220, and an object creation stage 1230. The role of object submittal manager 174 is indicated by the two different "user input" depictions (774 (1), 774(2)) shown in FIG. 12A.

In one of its roles or instances, object submittal manager 774 provides a user interface 774*a* that allows the user to create an object configuration file 1240 specifying certain characteristics of a VDE object 300 to be created. This user interface 774*a* may, for example, allow the user to specify that she wants to create an object, allow the user to designate the content the object will contain, and allow the user to specify certain other aspects of the information to be contained within the object (e.g., rules and control information, identifying information, etc.).

Part of the object definition task 1220 in the preferred embodiment may be to analyze the content or other information to be placed within an object. Object definition user interface 774*a* may issue calls to object switch 734 to analyze "content" or other information that is to be included within the object to be created in order to define or organize the content into "atomic elements" specified by the user. As explained elsewhere herein, such "atomic element" organizations might, for example, break up the content into paragraphs, pages or other subdivisions specified by the user, and might be explicit (e.g., inserting a control character between each "atomic element") or implicit. Object switch 734 may receive static and dynamic content (e.g., by way of time independent stream interface 762 and real time stream interface 760), and is capable of accessing and retrieving stored content or other information stored within file system 687.

The result of object definition 1240 may be an object configuration file 1240 specifying certain parameters relating to the object to be created. Such parameters may include, for example, map tables, key management specifications, and event method parameters. The object construction stage 1230 may take the object configuration file 1240 and the information or content to be included within the new object as input, construct an object based on these inputs, and store the object within object repository 728.

Object construction stage 1230 may use information in object configuration file 1240 to assemble or modify a container. This process typically involves communicating a series of events to SPE 503 to create one or more PERCs 808, public headers, private headers, and to encrypt content, all for storage in the new object 300 (or within secure database 610 within records associated with the new object).

The object configuration file 1240 may be passed to container manager 764 within object switch 734. Container manager 734 is responsible for constructing an object 300 based on the object configuration file 1240 and further user input. The user may interact with the object construction 1230 through another instance 774(2) of object submittal manager 774. In this further user interaction provided by object submittal manager 774, the user may specify permissions, rules and/or control information to be applied to or associated with the new object 300. To specify permissions, rules and control information, object submittal manager 774 and/or container manager 764 within object switch 734 generally will, as mentioned above, need to issue calls to SPE 503 (e.g., through gateway 734) to cause the SPE to obtain appropriate information from secure database 610, generate appropriate database items, and store the database items into the secure database 610 and/or provide them in encrypted, protected form to the object switch for incorporation into the object. Such information provided by SPE 503 may include, in addition to encrypted content or other information, one or more PERCs 808, one or more method cores 1000', one or more load modules 1100, one or more data structures such as UDEs 1200 and/or MDEs 1202, along with various key blocks, tags, public and private headers, and error correction information.

The container manager 764 may, in cooperation with SPE 503, construct an object container 302 based at least in part on parameters about new object content or other information as specified by object configuration file 1240. Container manager 764 may then insert into the container 302 the content or other information (as encrypted by SPE 503) to be included in the new object. Container manager 764 may also insert appropriate permissions, rules and/or control information into the container 302 (this permissions, rules and/or control information may be defined at least in part by user interaction through object submittal manager 774, and may be processed at least in part by SPE 503 to create secure data control structures). Container manager 764 may then write the new object to object repository 687, and the user or the electronic appliance may "register" the new object by including appropriate information within secure database 610.

Communications Subsystem 776

Communications subsystem 776, as discussed above, may be a conventional communications service that provides a network manager 780 and a mail gateway manager 782. Mail filters 784 may be provided to automatically route objects 300 and other VDE information to/tom the outside world. Communications subsystem 776 may support a real time content feed 684 from a cable, satellite or other telecommunications link.

Secure Processing Environment 503

As discussed above in connection with FIG. 12, each electronic appliance 600 in the preferred embodiment includes one or more SPEs 503 and/or one or more HPEs 655. These secure processing environments each provide a protected execution space for performing tasks in a secure manner. They may fulfill service requests passed to them by ROS 602, and they may themselves generate service requests to be satisfied by other services within ROS 602 or by services provided by another VDE electronic appliance 600 or computer.

In the preferred embodiment, an SPE 503 is supported by the hardware resources of an SPU 500. An HPE 655 may be supported by general purpose processor resources and rely on software techniques for security/protection. HPE 655 thus gives ROS 602 the capability of assembling and executing certain component assemblies 690 on a general purpose CPU such as a microcomputer, minicomputer, mainframe computer or supercomputer processor. In the preferred embodiment, the overall software architecture of an SPE 503 may be the same as the software architecture of an HPE 655. An HPE 655 can "emulate" SPE 503 and associated SPU 500, i.e., each may include services and resources needed to support an identical set of service requests from ROS 602 (although ROS 602 may be restricted from sending to an HPE certain highly secure tasks to be executed only within an SPU 500).

Some electronic appliance 600 configurations might, include both an SPE 503 and an HPE 655. For example, the HPE 655 could perform tasks that need lesser (or no) security protections, and the SPE 503 could perform all tasks that require a high degree of security. This ability to provide serial or concurrent processing using multiple SPE and/or HPE arrangements provides additional flexibility, and may overcome limitations imposed by limited resources that can practically or cost-effectively be provided within an SPU 500. The cooperation of an SPE 503 and an EPE 655 may, in a particular application, lead to a more efficient and cost effective but nevertheless secure overall processing environment for supporting and providing the secure processing required by VDE 100. As one example, an HPE 655 could provide overall processing for allowing a user to manipulate released object 300 'contents,' but use SPE 503 to access the secure object and release the information from the object.

Figure 13:
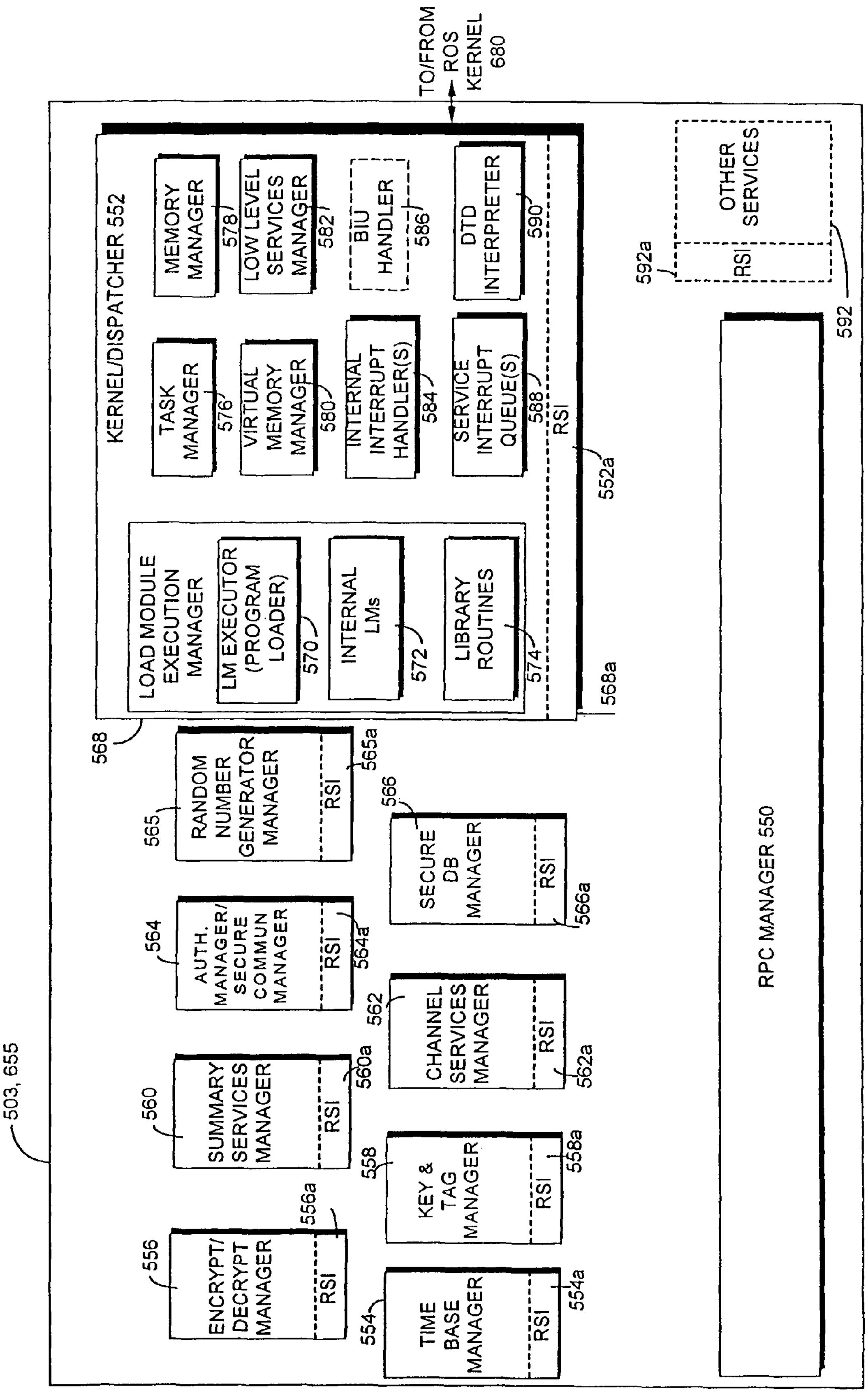
FIG. 13 is a detailed block diagram of an example the software architecture for a "protected processing environment" shown in FIG. 12.

FIG. 13 shows the software architecture of the preferred embodiment Secure Processing Environment (SPE) 503. This architecture may also apply to the, preferred embodiment Host, Processing Environment (IiFE) 655. "Protected Processing Environment" ("PPE") 650 may refer generally to SPE 503 and/or HPE 655. Hereinafter, unless context indicates otherwise, references to any of "PPE 650," "HPE 655" and "SPE 503" may refer to each of them.

As shown in FIG. 13, SPE 503 (PPE 650) includes the following service managers/major functional blocks in the preferred embodiment:

- Kernel/Dispatcher 552
- Channel Services Manager 562
- SPE RPC Manager 550
- Time Base Manager 554
- Encryption/Decryption Manager 556
- Key and Tag Manager 558
- Summary Services Manager 560
- Authentication Manager/Service Communications Manager 564
- Random Value Generator 565
- Secure Database Manager 566
- Other Services 592.

Each of the major functional blocks of PPE 650 is discussed in detail below.

I. SPE Kernel/Dispatcher 552

The Kernel/Dispatcher 552 provides an operating system "kernel" that runs on and manages the hardware resources of SPU 500. This operating system "kernel" 552 provides a self-contained operating system for SPU 500; it is also a part of overall ROS 602 (which may include multiple OS kernels, including one for each SPE and HPE ROS is controlling/managing). Kernel/dispatcher 552 provides SPU task and memory management, supports internal, SPU hardware interrupts, provides certain "low level services," manages "DTD" data structures, and manages the SPU bus interface unit 530. Kernel/dispatcher 552 also includes a load module execution manager 568 that can load programs into secure execution space for execution by SPU 500.

In the preferred embodiment, kernel/dispatcher 552 may include the following software/functional components:

- load module execution manager 568
- task manager 576
- memory manager 578
- virtual memory manager 580
- "low level" services manager 582
- internal interrupt handlers 584
- BIU handler 586 (may not be present in HPE 655)
- Service interrupt queues 588
- DTD Interpreter 590.

At least parts of the kernel/dispatcher 552 are preferably stored in SPU firmware loaded into SPU ROM 532. An example of a memory map of SPU ROM 532 is shown in FIG. 14A. This memory map shows the various components of kernel/dispatcher 552 (as well as the other SPE services shown in FIG. 13) residing in SPU ROM 532*a* and/or EEPROM 532*b*. The FIG. 14B example of an NVRAM 534*b* memory map shows the task manager 576 and other information loaded into NVRAM.

One of the functions performed by kernel/dispatcher 552 is to receive RPC calls from ROS RPC manager 732. As explained above, the ROS Kernel RPC manager 732 can route RPC calls to the SPE 503 (via SPE Device Driver 736 and its associated RSI 736*a*) for action by the SPE. The SPE kernel/dispatcher 552 receives these calls and either handles them or passes them on to SPE RPC manager 550 for routing internally to SPE 503. SPE 503 based processes can also generate RPC requests. Some of these requests can be processed internally by the SPE 503. If they are not internally serviceable, they may be passed out of the SPE 503 through SPE kernel/dispatcher 552 to ROS RPC manager 732 for routing to services external to SPE 503.

A. Kernel/Dispatcher Task Management

Kernel/dispatcher task manager 576 schedules and oversees tasks executing within SPE 503 (PPE 650). SPE 503 supports many types of tasks. A "channel" (a special type of task that controls execution of component assemblies 690 in the preferred' embodiment) is treated by task manager 576 as one type of task. Tasks are submitted to the task manager 576 for execution. Task manager 576 in turn ensures that the SPE 503/SPU 500 resources necessary to execute the tasks are made available, and then arranges for the SPU microprocessor 520 to execute the task.

Any call to kernel/dispatcher 552 gives the kernel an opportunity to take control of SPE 503 and to change the task or tasks that are currently executing. Thus, in the preferred embodiment kernel/dispatcher task manager 576 may (in conjunction with virtual memory manager 580 and/or memory manager 578) "swap out" of the execution space any or all of the tasks that are currently active, and "swap in" additional or different tasks.

SPE tasking managed by task manager 576 may be either "single tasking" (meaning that only one task may be active at a time) or "multi-tasking" (meaning that multiple tasks may be active at once). SPE 503 may support single tasking or multi-tasking in the preferred embodiment. For example, "high end" implementations of SPE 503 (e.g., in server devices) should preferably include multi-tasking with "preemptive scheduling." Desktop applications may be able to use a simpler SPE 503, although they may still require concurrent execution of several tasks. Set top applications may be able to use a relatively simple implementation of SPE 503, supporting execution of only one task at a time. For example, a typical set top implementation of SPU 500 may perform simple metering, budgeting and billing using subsets of VDE methods combined into single "aggregate" load modules to permit the various methods to execute m a single tasking environment. However, an execution environment that supports only single tasking may limit use with more complex control structures. Such single tasking versions of SPE 503 trade flexibility in the number and types of metering and budgeting operations for smaller run time RAM size requirements. Such implementations of SPE 503 may (depending upon memory limitations) also be limited to metering a single object 300 at a time. Of course, variations or combinations are possible to increase capabilities beyond a simple single tasking environment without incurring the additional cost required to support "full multitasking."

Figure 14C:
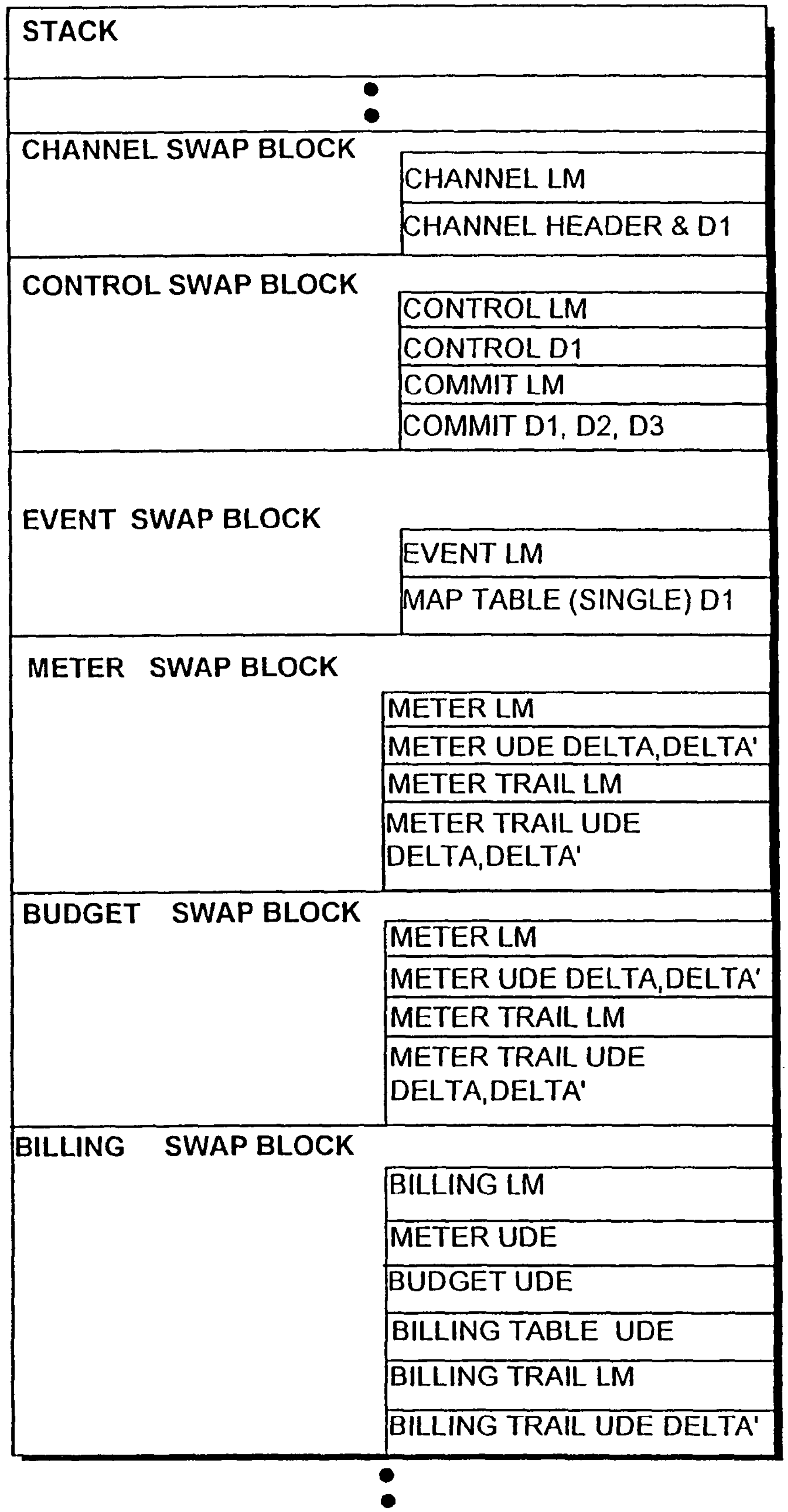

In the preferred embodiment, each task in SPE 503 is represented by a "swap block," which may be considered a "task" in a traditional multitasking architecture A "swap block" in the preferred embodiment is a bookkeeping mechanism, used by task manager 576 to keep track of tasks and subtasks. It corresponds to a chunk of code and associated references that "fits" within the secure execution environment provided by SPU 500. In the preferred embodiment, it contains a list of references to shared data elements (e.g., load modules 1100 and UDEs 1200), private data elements (e.g., method data and local stack), and swapped process "context" information (e.g., the register set for the process when it is not processing). FIG. 14C shows an example of a snapshot of SPU RAM 532 storing several examples of "swap blocks" for a number of different tasks/methods such as a "channel" task, a "control" task, an "event" task, a "meter" task, a "budget" task, and a "billing" task. Depending on the size of SPU RAM 532, "swap blocks" may be swapped out of RAM and stored temporarily on secondary storage 652 until their execution can be continued. Thus, SPE 503 operating in a multi-tasking mode may have one or more tasks "sleeping." In the simplest form, this involves an active task that is currently processing, and another task (e.g., a control task under which the active task may be running) that is "sleeping" and is "swapped out" of active execution space. Kernel/dispatcher 522 may swap out tasks at any time.

Task manager 576 may use Memory Manager 578 to help it perform this swapping operation. Tasks may be swapped out of the secure execution space by reading appropriate information from RAM and other storage internal to SPU 500, for example, and writing a "swap block" to secondary storage 652. Kernel 552 may swap a task back into the secure execution space by reading the swap block from secondary storage 652 and writing the appropriate information back into SPU RAM 532. Because secondary storage 652 is not secure, SPE 503 must encrypt and cryptographically seal (e.g., using a one-way bash function initialized with a secret value known only inside the SPU 500) each swap block before it writes it to secondary storage. The SPE 503 must decrypt and verify the cryptographic seal for each swap block read from secondary storage 652 before the swap block, can be returned to the secure execution space for further execution.

Loading a "swap block" into SPU memory may require one or more "paging operations" to possibly first save, and then flush, any "dirty pages" (i.e., pages changed by SPE 503) associated with the previously loaded swap blocks, and to load all required pages for the new swap block context.

Kernel/dispatcher 522 preferably manages the "swap block" using service interrupt queues 588. These service interrupt queues 588 allow kernel/dispatcher 552 to track tasks (swap blocks) and their status (running, "swapped out," or "asleep"). The kernel/dispatcher 552 in the preferred embodiment may maintain the following service interrupt queues 588 to help it manage the "swap blocks":

RUN queue
SWAP queue
SLEEP queue.

Those tasks that are completely loaded in the execution space and are waiting for and/or using execution cycles from microprocessor 502 are in the RUN queue. Those tasks that are "swapped" out (e.g., because they are waiting for other swappable components to be loaded) are referenced in the SWAP queue. Those tasks that are "asleep" (e.g., because they are "blocked" on some resource other than processor cycles or are not needed at the moment) are referenced in the SLEEP queue. Kernel/dispatcher task manager 576 may, for example, transition tasks between the RUN and SWAP queues based upon a "round-robin" scheduling algorithm that selects the next task waiting for service, swaps in any pieces that need to be paged in, and executes the task. Kernel/dispatcher 552 task manager 576 may transition tasks between the SLEEP queue and the "awake" (i.e., RUN or SWAP) queues as needed;

When two or more tasks try to write to the same data structure in a multi-tasking environment, a situation exists that may result in "deadly embrace" or "task starvation." A "multi-threaded" tasking arrangement may be used to prevent "deadly embrace" or "task starvation" from happening. The preferred embodiment kernel/dispatcher 552 may support "single threaded" or "multi-threaded" tasking.

In single threaded applications, the kernel/dispatcher 552 "locks" individual data structures as they are loaded. Once locked, no other SPE 503 task may load them and will "block" waiting for the data structure to become available. Using a single threaded SPE 503 may, as a practical matter, limit the ability of outside vendors to create load modules 1100 since there can be no assurance that they will not cause a "deadly embrace" with other VDE processes about which outside vendors may know little or nothing. Moreover, the context swapping of a partially updated record might destroy the integrity of the system, permit unmetered use, and/or lead to deadlock. In addition, such "locking" imposes a potentially indeterminate delay into a typically time critical process, may limit SPE 503 throughput, and may increase overhead.

This issue notwithstanding, there are other significant processing issues related to building single-threaded versions of SPE 503 that may limit its usefulness or capabilities under some circumstances. For example, multiple concurrently executing tasks may not be able to process using the same often-needed data structure in a single-threaded SPE 503. This may effectively limit the number of concurrent tasks to one. Additionally, single-threadedness may eliminate the capability of producing accurate summary budgets based on a number of concurrent tasks since multiple concurrent tasks may not be able to effectively share the same summary budget data structure. Single-threadedness may also eliminate the capability to support audit processing concurrently with other processing. For example, real-time feed processing might have to be shut down in order to audit budgets and meters associated with the monitoring process.

One way to provide a more workable "single-threaded" capability is for kernel/dispatcher 552 to use virtual page handling, algorithms to track "dirty pages" as data areas are written to. The "dirty pages" can be swapped in and out with the task swap block as part of local data associated with the, swap block. When a task exits, the "dirty pages" can be merged with the current data structure (possibly updated by another task for SPU 500) using a three-way merge algorithm (i.e., merging the original data structure, the current data structure, and the "dirty pages" to form a new current data structure). During the update process, the data structure can be locked as the pages are compared and swapped. Even though this virtual paging solution might be workable for allowing single threading in some applications, the vendor limitations mentioned above may limit the use of such—single threaded implementations in some cases to dedicated hardware. Any implementation that supports multiple users (e.g., "smart home" set tops, many desk tops and certain PDA applications, etc.) may hit limitations of a single threaded device in certain circumstances.

It is preferable when these limitations are unacceptable to use a full "multi-threaded" data structure write capabilities. For example, a type of "two-phase commit" processing of the type used by database vendors may be used to allow data structure sharing between processes. To implement this "two-phase commit" process, each swap block may contain page addresses for additional memory blocks that will be used to store changed information. A change page is a local copy of a piece of a data element that has been written by an SPE process. The changed page(s) references associated with a specific data structure are stored locally to the swap block in the preferred embodiment.

For example, SPE 503 may support two (change pages) per data structure. This limit is easily alterable by changing the size of the swap block structure and allowing the update algorithm to process all of the changed pages. The "commit" process can be invoked when a swap block that references changed pages is about to be discarded. The commit process takes the original data element that was originally loaded (e.g., $UDE_0$), the current data element (e.g., $UDE_n$) and the changed pages, and merges them to create a new copy of the data element (e.g., $UDE_{n+1}$). Differences can be resolved by the DTD interpreter 590 using a DTD for the data element. The original data element is discarded (e.g., as determined by its DTD use count) if no other swap block references it.

B. Kernel/Dispatcher Memory Management

Memory manager 578 and virtual memory manager 580 in the preferred embodiment manage ROM 532 and RAM 534 memory within SPU 500 in the preferred embodiment Virtual memory manager 580 provides a fully "virtual" memory system to increase the amount of "virtual" RAM available in the SPE secure execution space beyond the amount of physical RAM 534*a* provided by SPU 500. Memory manager 578 manages the memory in the secure execution space, controlling how it is accessed, allocated and deallocated. SPU MMU 540, if present, supports virtual memory manager 580 and memory manager 578 in the preferred embodiment. In some "minimal" configurations of SPT 500 there may be no virtual memory capability and all memory management functions will be handled by memory manager 578 Memory management can also be used to help enforce the security provided by SPE 503. In some classes of SPUs 500, for example, the kernel memory manager 578 may use hardware memory management unit (MMU) 540 to provide page level protection within the SPU 500. Such a hardware-based memory management system provides an effective mechanism for protecting VDE component assemblies 690 from compromise by "rogue" load modules.

In addition, memory management provided by memory manager 578 operating at least in part based on hardware-based MMU 540 may securely implement and enforce a memory architecture providing multiple protection domains. In such an architecture, memory is divided into a plurality of domains that are largely isolated from each other and share only specific memory areas under the control of the memory manager 578. An executing process cannot access memory outside its domain and can only communicate with other processes through services provided by and mediated by privileged kernel/dispatcher software 552 within the SPU 500. Such an architecture is more secure if it is enforced at least in part by hardware within MMU 540 that cannot be modified by any software-based process executing within SPU 500.

In the preferred embodiment, access to services implemented in the ROM 532 and to physical resources such as NVRAM 534*b* and RTC 528 are mediated by the combination of privileged kernel/dispatcher software 552 and hardware within MMU 540. ROM 532 and RTC 528 requests are privileged in order to protect access to critical system component routines (e.g., RTC 528).

Memory manager 578 is responsible for allocating and deallocating memory; supervising sharing of memory resources 'between processes; and enforcing memory access/use restriction. The SPE kernel/dispatcher memory manager 578 typically initially allocates all memory to kernel 552, and may be configured to permit only process-level access to pages as they are loaded by a specific process. In one example SPE operating system configuration, memory manager 578 allocates memory using a simplified allocation mechanism. A list of each memory page accessible in SPE 503 may be represented using a bit map allocation vector, for example. In a memory block, a group of contiguous memory pages may start at a specific page number. The size of the block is measured by the number of memory pages it spans. Memory allocation may be recorded by setting/clearing the appropriate bits in the allocation vector.

To assist in memory management functions, a "dope vector" may be prepended to a memory block. The "dope vector" may contain information allowing memory manager 578 to manage that memory block. In its simplest form, a memory block may be structured as a "dope vector" followed by the actual memory area of the block. This "dope vector" may include the block number, support for dynamic paging of data elements, and a marker to detect memory overwrites. Memory manager 578 may track memory blocks by their block number and convert the block number to an address before use. All accesses to the memory area can be automatically offset by the size of the "dope vector" during conversion from a block memory to a physical address. "Dope vectors" can also be used by virtual memory manager 580 to help manage virtual memory.

The ROM 532 memory management task performed by memory manager 578 is relatively simple in the preferred embodiment. All ROM 532 pages may be flagged as "read only" and as "non-pagable." EEPROM 532B memory management may be slightly more complex since the "burn count" for each EEPROM page may need to be retained. SPU EEPROM 532B may need to be protected from all uncontrolled writes to conserve the limited writable lifetime of certain types of this memory. Furthermore, EEPROM pages may in some cases not be the same size as memory management address pages.

SPU NVRAM 534*b* is preferably battery backed RAM that has a few access restrictions. Memory manager 578 can ensure control structures that must be located in NVRAM 534*b* are not relocated during "garbage collection" processes. As discussed above, memory manager 578 (and MMU 540 if present) may protect NVRAM 534*b* and RAM 534*a* at a page level to prevent tampering by other processes.

Virtual memory manager 580 provides paging for programs and data between SPU external memory and SPU internal RAM 534*a*. It is likely that data structures and executable processes will exceed the limits of any SPU 500 internal memory. For example, PERCs 808 and other fundamental control structures may be fairly large, and "bit map meters" may be, or become, very large. This eventuality may be addressed in two ways:

(1) subdividing load modules 1100; and (2) supporting virtual paging.

Load modules 1100 can be "subdivided" in that in many instances they can be broken up into separate components only a subset of which must be loaded for execution. Load modules 1100 are the smallest pagable executable element in this example. Such load modules 1100 can be broken up into separate components (e.g., executable code and plural data description blocks), only one of which must be loaded for simple load modules to execute. This structure permits a load module 1100 to initially load only the executable code and to load the data description blocks into the other system pages on a demand basis. Many load modules 1100 that have executable sections that are too large to fit into SPU 500 can be restructured into two or more smaller independent load modules. Large load modules may be manually "split" into multiple load modules that are "chained" together using explicit load module references.

Although "demand paging" can be used to relax some of these restrictions, the preferred embodiment uses virtual paging to manage large data structures and executables. Virtual Memory Manager 580 "swaps" information (e.g., executable code and/or data structures) into and out of SPU RAM 534*a*, and provides other related virtual memory management services to allow a full virtual memory management capability. Virtual memory management may be important to allow limited resource SPU 500 configurations to execute large and/or multiple tasks.

C. SPE Load Module Execution Manager 568

The SPE (HPE) load module execution manager ("LMEM") 568 loads executables into the memory managed by memory manager 578 and executes them. LMEM 568 provides mechanisms for tracking load modules that are currently loaded inside the protected execution environment. LMEM 568 also provides access to basic load modules and code fragments stored within, and thus always available to, SPE 503. LMEM 568 may be called, for example, by load modules 1100 that want to execute other load modules.

In the preferred embodiment, the load module execution manager 568 includes a load module executor ("program loader") 570, one or more internal load modules 572, and library routines 574. Load module executor 570 loads executables into memory (e g, after receiving a memory allocation from memory manager 578) for execution. Internal load module library 572 may provide a set of commonly used basic load modules 1100 (stored in ROM 532 or NVRAM 534*b*, for example). Library routines 574 may provide a set of commonly used code fragments/routines (e.g., bootstrap routines) for execution by SPE 503.

Library routines 574 may provide a standard set of library functions in ROM 532. A standard list of such library functions along with their entry points and parameters may be used. Load modules 1100 may call these routines (e.g., using an interrupt reserved for this purpose). Library calls may reduce the size of load modules by moving commonly used code into a central location and permitting a higher degree of code reuse. All load modules 1100 for use by SPE 503 are preferably referenced by a load module execution manager 568 that maintains and scans a list of available load modules and selects the appropriate load module for execution. If the load module is not present within SPE 503, the task is "slept and LMEM 568 may request that the load module 1100 be loaded from secondary storage 562. This request may be in the form of an RPC call to secure database manager 566 to retrieve the load module and associated data structures, and a call to encrypt/decrypt manager 556 to decrypt the load module before storing it in memory allocated by memory manager 578.

In somewhat more detail, the preferred embodiment executes a load module 1100 by passing the load module execution manager 568 the name (e.g., VDE ID) of the desired load module 1100. LMEM 568 first searches the list of "in memory" and "built-in" load modules 572. If it cannot find the desired load module 1100 in the list, it requests a copy from the secure database 610 by issuing an RPC request that may be handled by ROS secure database manager 744 shown in FIG. 12. Load module execution manager 568 may then request memory manager 578 to allocate a memory page to store the load module 1100. The load module execution manager 568 may copy the load module into that memory page, and queue the page for decryption and security checks by encrypt/decrypt manager 556 and key and tag manager 558. Once the page is decrypted and checked, the load module execution manager 568 checks the validation tag and inserts the load module into the list of paged in modules and returns the page address to the caller. The caller may then call the load module 1100 directly or allow the load module execution module 570 to make the call for it.

Figure 15:
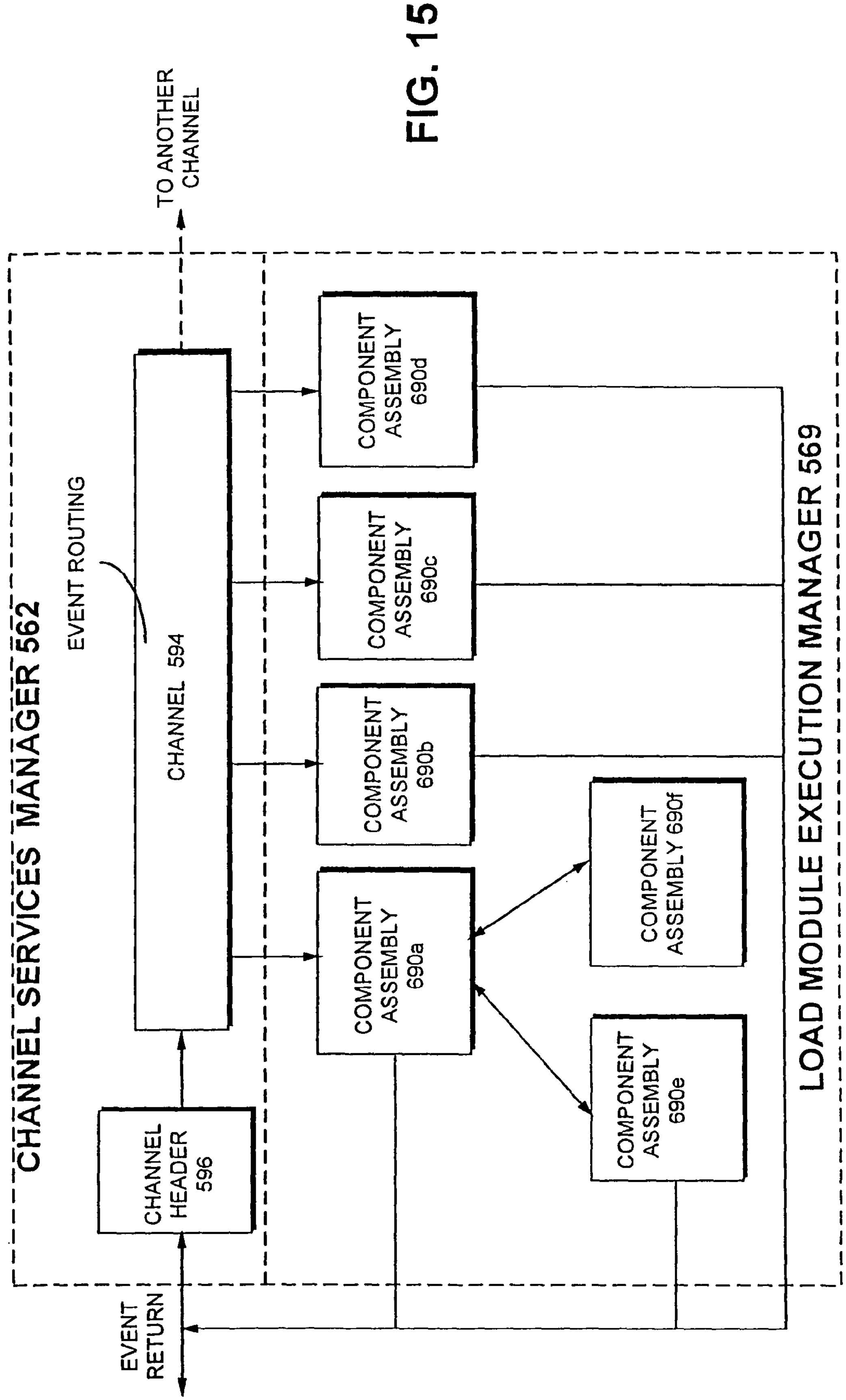
FIG. 15 illustrates an example of how the channel services manager and load module execution manager of FIG. 13 can support a channel.
Figure 15A:
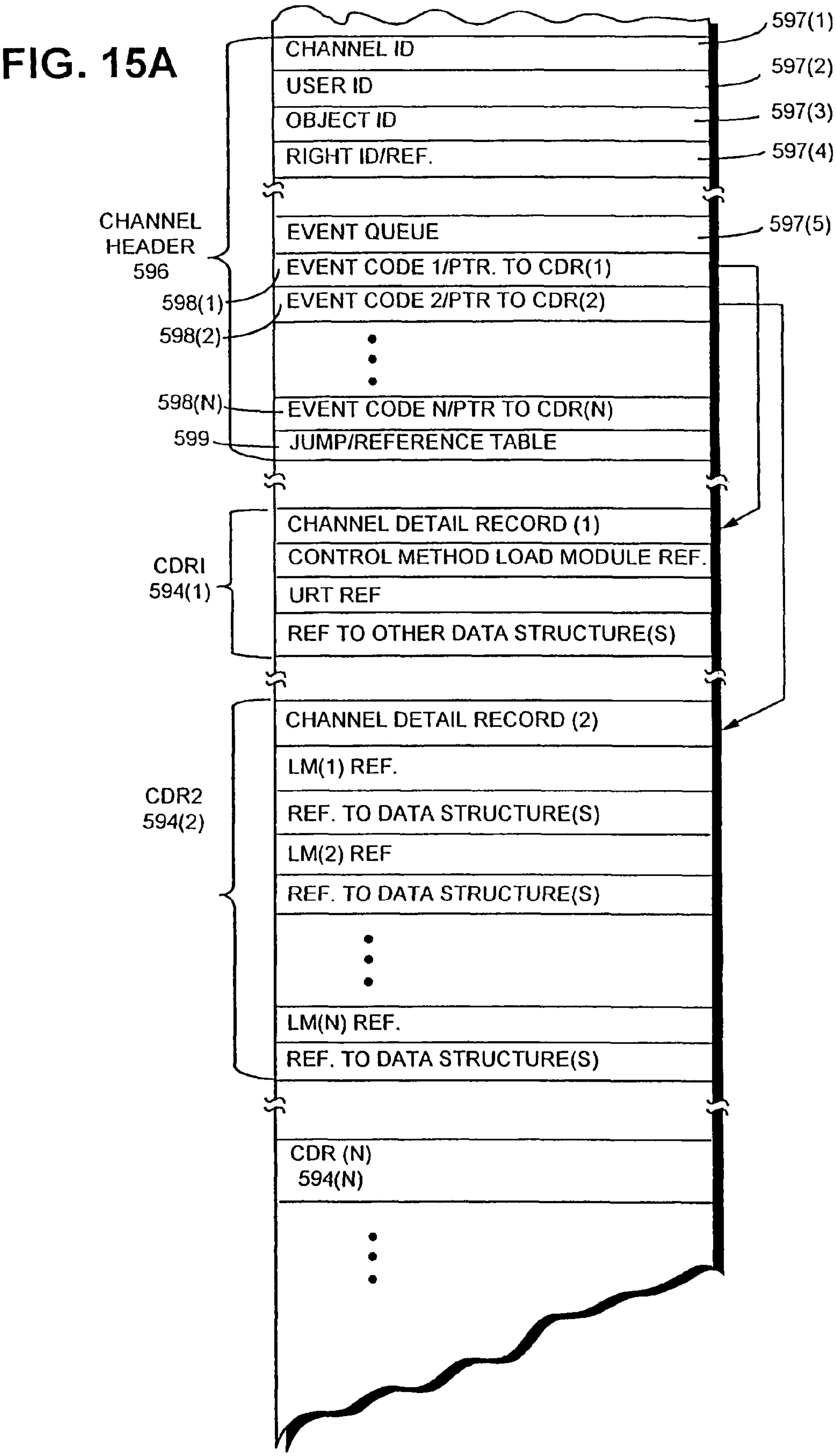
FIG. 15A is an example of a channel header and channel detail records shown in FIG. 15.

FIG. 15*a* shows a detailed example of a possible format for a channel header 596 and a channel 594 containing channel detail records 594(1), 594(2), . . . 594(N). Channel header 596 may include a channel ID field 597(1), a user ID field 597(2), an object ID field 597(3), a field containing a reference or other identification to a "right" (i.e., a collection of events supported by methods referenced in a PERC 808 and/or "user rights table" 464) 597(4), an event queue 597(5), and one or more fields 598 that cross-reference particular event codes with channel detail records ("CDRs"). Channel header 596 may also include a "jump" or reference table 599 that permits addressing of elements within an associated component assembly or assemblies 690. Each CDR 594(1), . . . 594(N) corresponds to a specific event (event code) to which channel 594 may respond. In the preferred embodiment, these CDRs may include explicitly and/or by reference each method core 1000' (or fragment thereof), load module 1100 and data structure(s), (e.g., URT, UDE 1200 and/or MDE 1202) needed to process the corresponding event. In the preferred embodiment, one or more of the CDRS (e.g., 594(1)) may reference a control method and a URT 464 as a data structure.

Figure 15B:
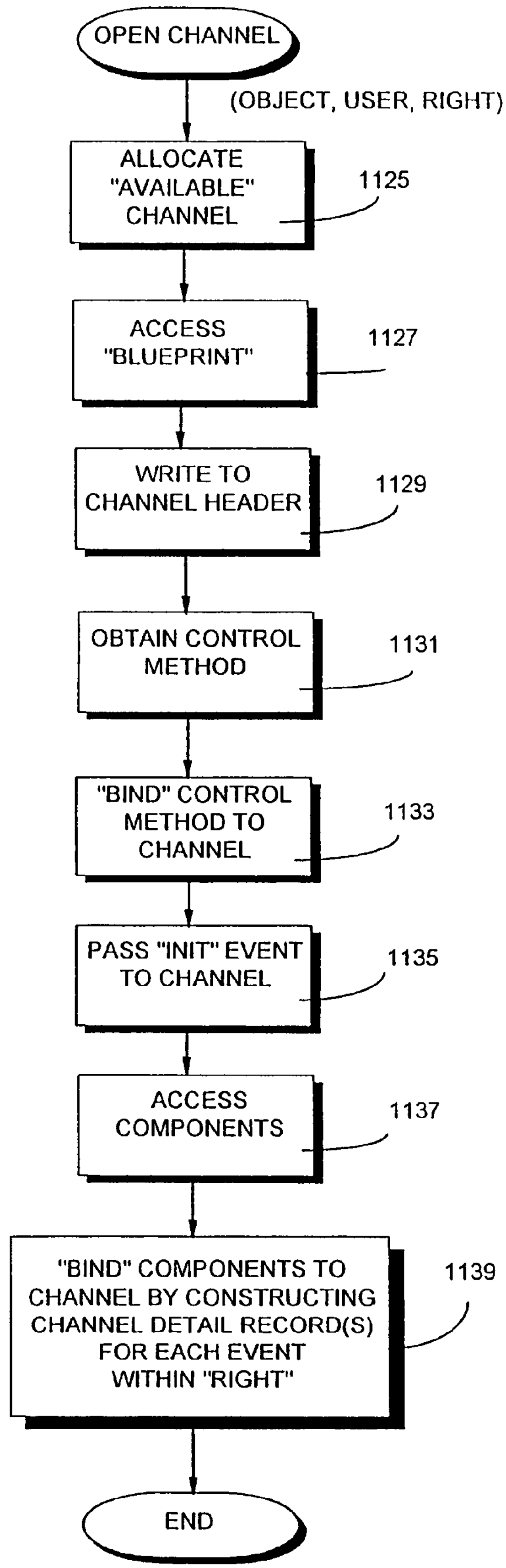
FIG. 15B is a flowchart of an example of program control steps that may be performed by the FIG. 13 protected processing environment to create a channel.

FIG. 15*b* shows an example of program control steps performed by SPE 503 to "open" a channel 594 in the preferred embodiment. In the preferred embodiment, a channel 594 provides event processing for a particular VDE object 300, a particular authorized user, and a particular "right" (i.e., type of event). These three parameters may be passed to SPE 503. Part of SPE kernel/dispatcher 552 executing within a "channel 0" constructed by low level services 582 during a "bootstrap" routine may respond initially to this "open channel" event by allocating an available channel supported by the processing resources of SPE 503 (block 1125). This "channel 0" "open channel" task may then issue a series of requests to secure database manager 566 to obtain the "blueprint" for constructing one or more component assemblies 690 to be associated with channel 594 (block 1127). In the preferred embodiment, this "blueprint" may comprise a PERC 808 and/or URT 464. In may be obtained by using the "Object, User, Right" parameters passed to the "open channel" routine to "chain" together object registration table 460 records, user/object table 462 records, URT 464 records, and PERC 808 records. This "open channel" task may preferably place calls to key and tag manager 558 to validate and correlate the tags associated with these various records to ensure that they are authentic and match. The preferred embodiment process then may write appropriate information to channel header 596 (block 1129). Such information may include, for example, User ID, Object ED, and a reference to the "right" that the channel will process. The preferred embodiment process may next use the "blueprint" to access (e.g., the secure database manager 566 and/or from load module execution manager library(ies) 568) the appropriate "control method" that may be used to, in effect, supervise execution of all of the other methods 1000 within the channel 594 (block 1131). The process may next "bind" this control method to the channel (block 1133), which step may include binding information from a URT 464 into the channel as a data structure for the control method. The process may then pass an "initialization" event into channel 594 (block 1135). This "initialization" event may be created by the channel services manager 562, the process that issued the original call requesting a service being fulfilled by the channel being built, or the control method just bound to the channel could itself possibly generate an initialization event which it would iii effect pass to itself.

In response to this "initialization" event, the control method may construct the channel detail records 594(1), . . . 594(N) used to handle further events other than the "initialization" event. The control method executing "within" the channel may access the various components it needs to construct associated component assemblies 690 based on the "blueprint" accessed at step 1127 (block 1137). Each of these components is bound to the channel 594 (block 1139) by constructing an associated channel detail record specifying the method core(s) 1000', load module(s) 1100, and associated data structure(s) (e g, UDE(s) 1200 and/or MDE(s) 1202) needed to respond to the event. The number of channel detail records will depend on the number of events that can be serviced by the "right," as specified by the "blueprints (i.e., URT 464). During this process, the control method will construct "swap blocks" to, in effect, set up all required tasks and obtain necessary memory allocations from kernel 562. The control method will, as necessary, issue calls to secure database manager 566 to retrieve necessary components from secure database 610, issue calls to encrypt/decrypt manager 556 to decrypt retrieved encrypted information, and issue calls to key and tag manager 558 to ensure that all retrieved components are validated. Each of the various component assemblies 690 so constructed are "bound" to the channel through the channel header event code/pointer records 598 and by constructing appropriate swap blocks referenced by channel detail records 594(1), . . . 594(N). When this process is complete, the channel 594 has been completely constructed and is ready to respond to further events. As a last step, the FIG. 15*b* process may, if desired, deallocate the "initialization" event task in order to free up resources.

Once a channel 594 has been constructed in this fashion, it will respond to events as they arrive. Channel services manager 562 is responsible for dispatching events to channel 594. Each time a new event arrives (e.g., via an RPC call), channel services manager 562 examines the event to determine whether a channel already exists that is capable of processing it. If a channel does exist, then the channel services manager 562 passes the event to that channel. To process the event, it may be necessary for task manager 576 to "swap in" certain "swappable blocks" defined by the channel detail records as active tasks. In this way, executable component assemblies 690 formed during the channel open process shown in FIG. 15*b* are placed into active secure execution space, the particular component assembly that is activated being selected in response to the received event code. The activated task will then perform its desired function in response to the event.

To destroy a channel, the various swap blocks defined by the channel detail records are destroyed, the identification information in the channel header 596 is wiped clean, and the channel is made available for re-allocation by the "channel 0" "open channel" task.

D. SPE Interrupt Handlers 584

As shown in FIG. 13, kernel/dispatcher 552 also provides internal interrupt handler(s) 584. These help to manage the resources of SPU 500. SPU 500 preferably executes in either "interrupt" or "polling" mode for all significant components. In polling mode, kernel/dispatcher 552 may poll each of the sections/circuits within SPU 500 and emulate an interrupt for them. The following interrupts are preferably supported by SPU 500 in the preferred embodiment:

"tick" of RTC 528 interrupt from bus interface 530 power fail interrupt watchdog timer interrupt interrupt from encrypt/decrypt engine 522 memory interrupt (e.g., from MMU 540).

When an interrupt occurs, an interrupt controller within microprocessor 520 may cause the microprocessor to begin executing an appropriate interrupt handler. An interrupt handler is a piece of software/firmware provided by kernel/dispatcher 552 that allows microprocessor 520 to perform particular functions upon the occurrence of an interrupt. The interrupts may be "vectored" so that different interrupt sources may effectively cause different interrupt handlers to be executed.

A "timer tick" interrupt is generated when the real-time RTC 528 "pulses". The timer tick interrupt is processed by a timer tick interrupt handler to calculate internal device date/time and to generate timer events for channel processing.

The bus interface unit 530 may generate a series of interrupts. In the preferred embodiment, bus interface 530, modeled after a USART, generates interrupts for various conditions (e.g., "receive buffer full," "transmitter buffer empty," and "status word change"). Kernel/dispatcher 552 services the transmitter buffer empty interrupt by sending the next character from the transmit queue to the bus interface 530. Kernel/dispatcher interrupt handler 584 may service the received buffer full interrupt by reading a character, appending it to the current buffer, and processing the buffer based on the state of the service engine for the bus interface 530. Kernel/dispatcher 552 preferably processes a status word change interrupt and addresses the appropriate send/receive buffers accordingly.

SPU 500 generates a power fail interrupt when it detects an imminent power fail condition. This may require immediate action to prevent loss of information. For example, in the preferred embodiment, a power fail interrupt moves all recently written information (i.e., "dirty pages") into non-volatile NVRAM 534*b*, marks all swap blocks as "swapped out," and sets the appropriate power fail flag to facilitate recovery processing. Kernel/dispatcher 552 may then periodically poll the "power fail bit" in a status word until the data is cleared or the power is removed completely.

SPU 500 in the example includes a conventional watchdog timer that generates watchdog timer interrupts on a regular basis. A watchdog timer interrupt handler performs internal device checks to ensure that tampering is not occurring. The internal clocks of the watchdog timer and RTC 528 are compared to ensure SPU 500 is not being paused or probed, and other internal checks on the operation of SPU 500 are made to detect tampering.

The encryption/decryption engine 522 generates an interrupt when a block of data has been processed. The kernel interrupt handler 584 adjusts the processing status of the block being encrypted or decrypted, and passes the block to the next stage of processing. The next block scheduled for the encryption service then has its key moved into the encrypt/decrypt engine 522, and the next cryptographic process started.

A memory management unit 540 interrupt is generated when a task attempts to access memory outside 'the areas assigned to it. A memory management interrupt handler traps the request, and takes the necessary action (e.g., by initiating a control transfer to memory manager 578 and/or virtual memory manager 580). Generally, the task will be failed, a page fault exception will be generated, or appropriate virtual memory page(s) will be paged in.

E. Kernel/Dispatcher Low Level Services 582

Low level services 582 in the preferred embodiment provide "low level" functions. These functions in the preferred embodiment may include, for example, power-on initialization, device POST, and failure recovery routines. Low level services 582 may also in the preferred embodiment provide (either by themselves or in combination with authentication manager/service communications manager 564) download response-challenge and authentication communication protocols, and may provide for certain low level management of SPU 500 memory devices such as EEPROM and FLASH memory (either alone or in combination, with memory manager 578 and/or virtual memory manager 580).

F. Kernel/Dispatcher BIU handler 586

BIU handler 586 in the preferred embodiment manages the bus interface unit 530 (if present). It may, for' example, maintain read and write buffers for the BIU 530, provide BIU startup initialization, etc.

G. Kernel/Dispatcher DTD Interpreter 690

DTD interpreter 590 in the preferred embodiment handles data formatting issues. For example, the DTD interpreter 590 may automatically open data structures such as UDEs 1200 based on formatting instructions contained within DTDs.

The SPE kernel/dispatcher 552 discussed above supports all of the other services provided by SPE 503. Those other services are, discussed below.

II. SPU Channel Services Manager 562

"Channels" are the basic task processing mechanism of SPE 503 (HPE 655) in the preferred embodiment. ROS 602 provides an event-driven interface for "methods." A "channel" allows component assemblies 690 to service events. A "channel" is a conduit for passing "events" from services supported by SPE 503 (HPE 655) to the various methods and load modules that have been specified to process these events, and also supports the assembly of component assemblies 690 and interaction between component assemblies. In more detail, "channel" 594 is a data structure maintained by channel manager 593 that "binds" together one or more load modules 1100 and data structures (e.g., UDEs 1200 and/or MDEs 1202) into a component assembly 690. Channel services manager 562 causes load module execution manager 569 to load the component assembly 690 for execution, and may also be responsible for passing events into the channel 594 for response by a component assembly 690. In the preferred embodiment, event processing is handled as a message to the channel service manager 562.

FIG. 15 is a diagram showing how the preferred embodiment channel services manager 562 constructs a "channel" 594, and also shows the relationship between the channel and component assemblies 690. Briefly, the SPE channel manager 562 establishes a "channel" 594 and an associated "channel header" 596. The channel 594 and its header 596 comprise a data structure that "binds" or references elements of one or more component assemblies 690. Thus, the channel 594 is the mechanism in the preferred embodiment that collects together or assembles the elements shown in FIG. 11E into a component assembly 690 that may be used for event processing.

The channel 594 is set up by the channel services manager 562 in response to the occurrence of an event. Once the channel is created, the channel services manager 562 may issue function calls to load module execution manager 568 based on the channel 594. The load module execution manager 568 loads the load modules 1100 referenced by a channel 594, and requests execution services by the kernel/dispatcher task manager 576. The kernel/dispatcher 552 treats the event processing request as a task, and executes it by executing the code within the load modules 1100 referenced by the channel.

The channel services manager 562 may be passed an identification of the event (e.g., the "event code"). The channel services manager 562 parses one or more method cores' 1000' that are part of the component assembly(ies) 690 the channel services manager is to assemble. It performs this parsing to determine which method(s) and data structure(s) are invoked by the type of event. Channel manager 562 then issues calls (e.g., to secure database manager 566) to obtain the methods and 'data structure(s) needed to build the component assembly 690. These called-for method(s) and data structure(s) (e.g., load modules 1100, 'UDEs 1200 and/or MDEs '1202) are each decrypted using encrypt/decrypt manager 556 (if necessary), and are then each validated using key and tag manager 558. Channel manager 562 constructs any necessary "jump table" references to, in effect, "link" or "bind" the elements into a single cohesive executable so the load module(s) can reference data structures and any other load module(s) in the component assembly. Channel manager 562 may then issue calls to LMEM 568 to load the executable as an active task.

FIG. 15 shows that a channel 594 may reference another channel. An arbitrary number of channels 594 may be created by channel manager 594 to interact with one another.

"Channel header" 596 in the preferred embodiment is (or references) the data structure(s) and associated control program(s) that queues events from channel, event sources, processes these events, and releases the appropriate tasks specified in the "channel detail record" for processing. A "channel detail record" in the preferred embodiment links an event to a "swap block" (i.e., task) associated with that event. The "swap block" may reference one or more load modules 1100, UDEs 1200 and private data areas required to properly process the event. One swap block and a corresponding channel detail item is created for each different event the channel can respond to.

In the preferred embodiment, Channel Services Manager 562 may support the following (internal) calls to support the creation and maintenance 'of channels 562:

| Call Name | Source | Description |
|---|---|---|
| "Write Event" | Write | Writes an event to the channel for response by the channel. The Write Event call thus permit the caller to insert an event into the event queue associated with the channel. The event will be processed in turn by the channel 594. |
| "Bind Item" | Ioctl | Binds an item to a channel with the Item" appropriate processing algorithm. The Bind Item call permits the caller to bind a VDE' item ID to a channel (e.g., to create one or more swap blocks associated with a channel). This call may manipulate the contents of individual swap blocks. |
| "Unbind Item" | Ioctl | Unbinds an item from a channel with the appropriate processing algorithm. The Unbind Item call permits the caller to break the binding of an item to a swap block. This call may manipulate the contents of individual swap blocks. |

SPE RPC Manager 550

As described in connection with FIG. 12, the architecture of ROS 602 is based on remote procedure calls in the preferred embodiment. ROS 602 includes an RPC Manager 732 that passes RPC calls between services each of which present an RPC service interface ("RSI") to the RPC manager. In the preferred embodiment, SPE 503 (HPE 655) is also built around the same RPC concept. The SPE 503 (HPE 655) may include a number of internal modular service providers each presenting an RSI to an RPC manager 550 internal to the SPE (HPE). These internal service providers may communicate with each other and/or with ROS RPC manager 732 (and thus, with any other service provided by ROS 602 and with external services), using RPC service requests.

RPC manager 550 within SPE 503 (HPE 655) is not the same as RPC manager 732 shown in FIG. 12, but it performs a similar function within the SPE (HPE): it receives RPC requests and passes them to the RSI presented by the service that is to fulfill the request. In the preferred embodiment, requests are passed between ROS RPC manager 732 and the outside world (i.e., SPE device driver 736') via the SPE (HPE) Kernel/Dispatcher 552. Kernel/Dispatcher 552 may be able to service certain RPC requests itself, but in general it passes received requests to RPC manager 550 for routing to the appropriate service internal to the SPE (HPE). In an alternate embodiment, requests may be passed directly between the HPE, SPE, API, Notification interface, and other external services instead of routing them through the ROS RPC manager 732. The decision on which embodiment to use is part of the scalability of the system; some embodiments are more efficient than others under various traffic loads and system configurations. Responses by the services (and additional service requests they may themselves generate) are provided to RPC Manager 550 for routing to other service(s) internal or external to SPE 503 (HPE 655).

SPE RPC Manager 550 and its integrated service manager uses two tables to dispatch remote procedure calls: an RPC services table, and an optional RPC dispatch table. The RPC services table describes where requests for specific services are to be routed for processing. In the preferred embodiment, this table is constructed in SPU RAM 534*a* or NVRAM 534*b*, and lists each RPC service "registered" within SPU 500. Each row of the RPC services table contains a service ID, its location and address, and a control byte. In simple implementations, the control byte indicates only that the service is provided internally or externally. In more complex implementations, the control byte can indicate an instance of the service (e.g., each service may have multiple "instances" in a multi-tasking environment). ROS RPC manager 732 and SPE 503 may have symmetric copies of the RPC services table in the preferred embodiment. If an RPC service is not found in the RPC services table, SPE 503 may either reject it or pass it to ROS RPC manager 732 for service.

The SPE RPC manager 550 accepts the request from the RPC service table and processes that request in accordance with the internal priorities associated with the specific service. In SPE 503, the RPC service table is extended by an RPC dispatch table. The preferred embodiment RPC dispatch table is organized as a list of Load Module references for each RPC service supported internally by SPE-503. Each row in the table contains a load module ID that services the call, a control byte that indicates whether the call can be made from an external caller, and whether the load module needed to service the call is permanently resident in SPU 500. The RPC dispatch table may be constructed in SPU ROM 532 (or EEPROM) when SPU firmware 508 is loaded into the SPU 500. If the RPC dispatch table is in EEPROM, it flexibly allows for updates to the services without load module location and version control issues.

In the preferred embodiment, SPE RPC manager 550 first references a service request against the RPC service table to determine the location of the service manager that may service the request. The RPC manager 550 then routes the service request to the appropriate service manager for action. Service requests are handled by the service manager within the SPE 503 using the RPC dispatch table to dispatch the request. Once the RPC manager 550 locates the service reference in the RPC dispatch table, the load module that services the request is called and loaded using the load module execution manager 568. The load module execution manager 568 passes control to the requested load module after performing all required context configuration, or if necessary may first issue a request to load it from the external management files 610.

SPU Time Base Manager 554

The time base manager 554 supports calls that relate to the real time clock ("RTC") 528. In the preferred embodiment, the time base manager 554 is always loaded and ready to respond to time based requests.

The table below lists examples of basic calls that may be supported by the time base manager 554:

| Call Name | Description |
| --- | --- |
| Independent requests | |
| Get Time | Returns the time (local, GMT, or ticks). |
| Set time | Sets the time in the RTC 528. Access to this command may be restricted to a VDE administrator. |
| Adjust time | Changes the time in the RTC 528. Access to this command may be restricted to a VDE administrator. |
| Set Time | Set GMT/local time conversion and the Parameter current and allowable magnitude of user adjustments to RTC 528 time. |
| Channel Services Manager Requests | |
| Bind Time | Bind timer services to a channel as an event source. |
| Unbind Time | Unbind timer services from a channel as an event source. |
| Set Alarm | Sets an alarm notification for a specific time. The user will be notified by an alarm event at the time of the alarm. Parameters to this request determine the event, frequency, and requested processing for the alarm. |
| Clear Alarm | Cancels a requested alarm notification. |

SPU Encryption/Decryption Manager 556

The Encryption/Decryption Manager 556 supports call's to the various encryption/decryption techniques supported by SPE 503/HPE 655. It may be supported 'by a hardware-based encryption/decryption engine 522 within SPU 500. Those encryption/decryption technologies not supported by SPU encrypt/decrypt engine 522 may be provided by encrypt/decrypt manager 556 in software. The primary bulk encryption/decryption load modules preferably are loaded at all times, and 'the' load modules necessary for other algorithms are preferably paged in as needed. Thus, if the primary bulk encryption/decryption algorithm is DES, only the DES load modules need be permanently resident in the RAM 534*a* of SPE 503/HPE 655.

The following are examples of RPC calls supported by Encrypt/Decrypt Manager 556 in the preferred embodiment

| Call Name | Description |
| --- | --- |
| PK Encrypt | Encrypt a block using a PK (public key) algorithm. |
| PK Decrypt | Decrypt a block using a PK algorithm. |
| DES Encrypt | Encrypt a block using DES. |
| DES Decrypt | Decrypt a block using DES. |
| RC-4 Encrypt | Encrypt a block using the RC-4 (or other bulk encryption) algorithm. |
| RC-4 Decrypt | Decrypt a block using the RC-4 (or other bulk encryption) algorithm. |
| Initialize DES Instance | Initialize DES instance to be used. |
| Initialize RC-4 Instance | Initialize RC-4 instance to be used. |
| Initialize MD5 Instance | Initialize MD5 instance to be used. |
| Process MD5 Block | Process MD5 block. |

The call parameters passed may include the key to be used; mode (encryption or decryption); any needed Initialization Vectors; the desired cryptographic operating (e g, type of feedback), the identification of the cryptographic instance to be used, and the start address, destination address, and length of the block to be encrypted or decrypted.

SPU Key and Tag Manager 558

The SPU Key and Tag Manager 558 supports calls for key storage, key and management file tag look up, key convolution, and the generation of random keys, tags, and transaction numbers.

The following table shows an example of a list of SPE/HPE key and tag manager service 558 calls:

| Call Name | Description |
|---|---|
| Key Requests | |
| Get Key | Retrieve the requested key |
| Set Key | Set (store) the specified key |
| Generate Key | Generate a key (pair) for a specified algorithm |
| Generate Convoluted Key | Generate a key using a specified convolution algorithm and algorithm parameter block. |
| Get Convolution Algorithm | Return the currently set (default) convolution parameters for a specific convolution algorithm. |
| Set Convolution Algorithm | Sets the convolution parameters for a specific convolution algorithm (calling routine must provide a tag to read returned contents). |
| Tag Requests | |
| Get Tag | Get the validation (or other) tag for a specific VDE Item ID. |
| Set Tag | Set the validation (or other) tag for a specific VDE Item ID to a known value. |
| Calculate Hash Block Number | Calculate the "hash block number' for a specific VDE Item ID. |
| Set Hash Parameters | Set the hash parameters and hash algorithm. Forces a resynchronization of the hash table. |
| Get Hash Parameters | Retrieve the current hash parameters/algorithm. |
| Synchronize Management Files | Synchronize the management files and rebuild the hash block tables based on information found in the tables. Reserved for VDE administrator. |

Keys and tags may be securely generated within SPE 503 (HPE 655) in the preferred embodiment. The key generation algorithm is typically specific to each type of encryption supported. The generated keys may be checked for cryptographic weakness before they are used. A request for Key and Tag Manager 558 to generate a key, tag and/or transaction number preferably takes a length as its input parameter. It generates a random number (or other appropriate key value) of the requested length as its output.

The key and tag manager 558 may support calls to retrieve specific keys from the key storage areas in SPU 500 and any keys stored external to the SPU. The basic format of the calls is to request keys by key type and key number. Many of the keys are periodically updated through contact with the VDE administrator, and are kept within SPU 500 in NVRAM 534*b* or EEPROM because these memories are secure, updatable and non-volatile.

SPE 503/HPE 655 may support both Public Key type keys and Bulk Encryption type keys. The public key (PK) encryption type keys stored by SPU 500 and managed by key and tag manager 558 may include, for example, a device public key, a device private key, a PK certificate, and a public key for the certificate. Generally, public keys and certificates can be stored externally in non-secured memory if desired, but the device private key and the public key for the certificate should only be stored internally in an SPU 500 EEPROM or NVRAM 534*b*. Some of the types of bulk encryption keys used by the SPU 500 may include, for example, general-purpose bulk encryption keys, administrative object private header keys, stationary object private header keys, traveling object private header keys, download/initialization keys, backup keys, trail keys, and management file keys.

As discussed above, preferred embodiment Key and Tag Manager 558 supports requests to adjust or convolute keys to make new keys that are produced in a deterministic way dependent on site and/or time, for example. Key convolution is an algorithmic process that acts on a key and some set of input parameter(s) to yield a new key. It can be used, for example, to increase the number of keys available for use without incurring additional key storage space. It may also be used, for example, as a process to "age" keys by incorporating the value of real-time RTC 528 as parameters. It can be used to make keys site specific by incorporating aspects of the site ID as parameters.

Key and Tag Manager 558 also provides services relating to tag generation and management. In the preferred embodiment, transaction and access tags are preferably stored by SPE 503 (HPE 655) in protected memory (e g., within the NVRAM 534*b* of SPU 500). These tags may be generated by key and tag manager 558. They are used to, for example, check access rights to, validate and correlate data elements. For example, they may be used to ensure components of the secured data structures are not tampered with outside of the SPU 500 Key and tag manager 558 may also support a trail transaction tag and a communications transaction tag.

SPU Summary Services Manager 560

SPE 503 maintains an audit trail in reprogrammable non-volatile memory within the SPU 500 and/or in secure database 610. This audit trail may consist of an audit summary of budget activity for financial purposes, and a security summary of SPU use. When a request is made to the SPU, it logs the request as having occurred and then notes whether the request succeeded or failed. All successful requests may be summed and stored by type in the SPU 500. Failure information, including the elements listed below, may be saved along with details of the failure:

| Control Information Retained in an SPE on Access Failures |
|---|
| Object ID |
| User ID |
| Type of failure |
| Time of failure |

This information may be analyzed to detect cracking attempts or to determine patterns of usage outside expected (and budgeted) norms. The audit trail histories in the SPU 500 may be retained until the audit is reported to the appropriate parties. This will allow both legitimate failure analysis and attempts to cryptoanalyze the SPU to be noted.

Summary services manager 560 may store and maintain this internal summary audit information. This audit information can be used to check for security breaches or other aspects of the operation of SPE 503. The event summaries may be maintained, analyzed and used by SPE 503 (HPE 655) or a VDE administrator to determine and potentially limit abuse of electronic appliance 600. In the preferred embodiment, such parameters may be stored in secure memory (e.g., within the NVRAM 534*b* of SPU 500).

There are two basic structures for which summary services are used in the preferred embodiment. One (the "event summary data structure") is VDE administrator specific and keeps track of events. The event summary structure may be maintained and audited during periodic contact with VDE administrators. The other is used by VDE administrators and/or distributors for overall budget. A VDE administrator may register for event-summaries and an overall budget summary at the time an electronic appliance 600 is initialized. The overall budget summary may be reported to and used by a VDE administrator in determining distribution of consumed budget (for example) in the case of corruption of secure management files 610. Participants that receive appropriate permissions can register their processes (e.g., specific budgets) with summary services manager 560, which may then reserve protected memory space (e.g., within NVRAM 534*b*) and keep desired use and/or access parameters. Access to and modification of each summary can be controlled by its own access tag.

The following table shows an example of a list of PPE summary service manager 560 service calls:

| Call Name | Description |
|---|---|
| Create summary info | Create a summary service if the user has a "ticket" that permits her to request this service. |
| Get value | Return the current value of the summary service. The caller must present an appropriate tag (and/or "ticket") to use this request. |
| Set value | Set the value of a summary service. |
| Increment | Increment the specified summary service(e.g., a scalar meter summary data area). The caller must present an appropriate tag (and/or "ticket") to use this request. |
| Destroy | Destroy the specified summary service if the user has a tag and/or "ticket" that permits them to request this service. |

In the preferred embodiment, the event summary data structure uses a fixed event number to index into a look up table. The look up table contains a value that can be configured as a counter or a counter plus limit. Counter mode may be used by VDE administrators to determine device usage. The limit mode may be used to limit tampering and attempts to misuse the electronic appliance 600. Exceeding a limit will result in SPE 503 (HPE 655) refusing to service user requests until it is reset by a VDE administrator. Calls to the system wide event summary process may preferably be built into all load modules that process the events that are of interest.

The following table shows examples of events that may be separately metered by the preferred embodiment event summary data structure:

| Event Type | |
|---|---|
| Successful Events | Initialization completed successfully.<br>User authentication accepted.<br>Communications established.<br>Channel loads set for specified values.<br>Decryption completed.<br>Key Information updated.<br>New budget created or existing budget updated.<br>New billing information generated or existing billing updated.<br>New meter set up or existing meter updated.<br>New PERC created or existing PERC updated.<br>New objects registered.<br>Administrative objects successfully processed.<br>Audit processed successfully.<br>All other events. |

-continued

| Event Type | |
|---|---|
| Failed Events | Initialization failed.<br>Authentication failed.<br>Communication attempt failed.<br>Request to load a channel failed.<br>Validation attempt unsuccessful.<br>Link to subsidiary item failed correlation tag match.<br>Authorization attempt failed.<br>Decryption attempt failed.<br>Available budget insufficient to complete requested procedure.<br>Audit did not occur.<br>Administrative object did not process correctly.<br>Other failed events. |

Another, "overall currency budget" summary data structure maintained by the preferred embodiment summary services manager 560 allows registration of VDE electronic appliance 600. The first entry is used for an overall currency budget consumed value, and is registered by the VDE administrator that first initializes SPE 503 (HPE 655). Certain currency consuming load modules and audit load modules that complete the auditing process for consumed currency budget may call the summary services manager 560 to update the currency consumed value. Special authorized load modules may have access to the overall currency summary, while additional summaries can be registered for by individual providers.

SPE Authentication Manager/Service Communications Manager 564

The Authentication Manager/Service Communications Manager 564 supports calls for user password validation and "ticket" generation and validation. It may also support secure communications between SPE 503 and an external node or device (e g., a VDE administrator or distributor). It may support the following examples of authentication-related service requests in the preferred embodiment:

| Call Name | Description |
|---|---|
| | User Services |
| Create User | Creates a new user and stores Name Services Records (NSRs) for use by the Name Services Manager 752. |
| Authenticate User | Authenticates a user for use of the system. This request lets the caller authenticate as a specific user ID. Group membership is also authenticated by this request. The authentication returns a "ticket" for the user. |
| Delete User | Deletes a user's NSR and related records. |
| | Ticket Services |
| Generate Ticket | Generates a "ticket" for use of one or more services. |
| Authenticate Ticket | Authenticates a "ticket." |

Not included in the table above are calls to the secure communications service. The secure communications service provided by manager 564 may provide (e.g., in conjunction with low-level services manager 582 if desired) secure communications based on a public key (or others) challenge-response protocol. This protocol is discussed in further detail elsewhere in this document. Tickets identify users with respect to the electronic appliance 600 in the case where the appliance may be used by multiple users. Tickets may be requested by and returned to VDE software applications through a ticket-granting protocol (e.g., Kerberos). VDE components may require tickets to be presented in order to authorize particular services.

SPE Secure Database Manager 566

Secure database manager 566 retrieves, maintains and stores secure database records within secure database 610 on memory external to SPE 503. Many of these secure database files 610 are in encrypted form. All secure information retrieved by secure database manager 566 therefore must be decrypted by encrypt/decrypt manager 556 before use. Secure information (e.g., records of use) produced by SPE 503 (HPE 655) which must be stored external to the secure execution environment are also encrypted by encrypt/decrypt manager 556 before they are stored via secure database manager 566 in a secure database file 610.

For each VDE item loaded into SPE 503, Secure Database manager 566 in the preferred embodiment may search a master list for the VDE item ID, and then check the corresponding transaction tag against the one in the item to ensure that the item provided is the current item. Secure Database Manager 566 may maintain list of VDE item ID and transaction tags in a "hash structure" that can be paged into SPE 503 to quickly locate the appropriate VDE item ID. In smaller systems, a look up table approach may be used. In either case, the list should be structured as a pagable structure that allows VDE item ID to be located quickly.

The "hash based" approach may be used to sort the list into "hash buckets" that may then be accessed to provide more rapid and efficient location of items in the list. In the "hash based" approach, the VDE item IDs are "hashed" through a subset of the full item ID and organized as pages of the "hashed" table. Each "hashed" page may contain the rest of the VDE item ID and current transaction tag for each item associated with that page. The "hash" table page number may be derived from the components of the VDE item ID, such as distribution ID, item ID, site ID, user ID, transaction tag, creator ID, type and/or version. The hashing algorithm (both the algorithm itself and the parameters to be hashed) may be configurable by a VDE administrator on a site by site basis to provide optimum hash page use. An example of a hash page structure appears below:

| Field |
|---|
| Hash Page Header |
| Distributor ID |
| Item ID |
| Site ID |
| User ID |
| Transaction Tag |
| Hash Page Entry |
| Creator ID |
| Item ID |
| Type |
| Version |
| Transaction Tag |

In this example, each hash page may contain all of the VDE item IDs and transaction tags for items that have identical distributor ID, item ID, and user ID fields (site ID will be fixed for a given electronic appliance 600). These four pieces of information may thus be used as hash algorithm parameters.

The "hash" pages may themselves be frequently updated, and should carry transaction tags that are checked each time a "hash" page is loaded. The transaction tag may also be updated each time a "hash" page is written out.

As an alternative to the hash-based approach, if the number of updatable items is kept small (such as in a dedicated consumer electronic appliance 600), then assigning each updatable item a unique sequential site record number as part of its VDE item ID may allow a look up table approach to be used. Only a small number of bytes of transaction tag are needed per item, and a table transaction tag for all frequently updatable items can be kept in protected memory such as SPU NVRAM 534*b*.

Random Value Generator Manager 565

Random Value Generator Manager 565 may generate random values. If a hardware-based SPU random value generator 542 is present, the Random Value Generator Manager 565 may use it to assist in generating random values.

Other SPE RPC Services 592

Other authorized RPC services may be included in SPU 500 by having them "register" themselves in the RPC Services Table and adding their entries to the RPC Dispatch Table. For example, one or more component assemblies 690 may be used to provide additional services as an integral part of SPE 503 and its associated operating system. Requests to services not registered in these tables will be passed out of SPE 503 (HPE 655) for external servicing.

SPE 503 Performance Considerations

Performance of SPE 503 (HPE 655) is a function of:

complexity of the component assemblies used number of simultaneous component assembly operations amount of internal SPU memory available speed of algorithm for block encryption/decryption The complexity of component assembly processes along with the number of simultaneous component assembly processes is perhaps the primary factor in determining performance. These factors combine to determine the amount of code and data and must be resident in SPU 500 at any one time (the minimum device size) and thus the number of device size "chunks" the processes must be broken down into. Segmentation inherently increases run time size over simpler models. Of course, feature limited versions of SPU 500 may be implemented using significantly smaller amounts of RAM 534. "Aggregate" load modules as described above may remove flexibility in configuring VDE structures and also further limit the ability of participants to individually update otherwise separated elements, but may result in a smaller minimum device size. A very simple metering version of SPU 500 can be constructed to operate with minimal device resources.

The amount of RAM 534 internal to SPU 500 has more impact on the performance of the SPE 503 than perhaps any other aspect of the SPU. The flexible nature of VDE processes allows use of a large number of load modules, methods and user data elements. It is impractical to store more than a small number of these items in ROM 532 within SPU 500. Most of the code and data structures needed to support a specific VDE process will need to be dynamically loaded into the SPU 500 for the specific VDE process when the process is invoked. The operating system within SPU 500 then may page in the necessary VDE items to perform the process. The amount of RAM 534 within SPU 500 will directly determine how large any single VDE load module plus its required data can be, as well as the number of page swaps that will be necessary to run a VDE process. The SPU I/O speed, encryption/decryption speed, and the amount of internal memory 532, 534 will directly affect the number of page swaps required in the device. Insecure external memory may reduce the wait time for swapped pages to be loaded into SPU 500, but will still incur substantial encryption/decryption penalty for each page.

In order to maintain security, SPE 503 must encrypt and cryptographically seal each block being swapped out to a storage device external to a supporting SPU 500, and must similarly decrypt, verify the cryptographic seal for, and validate each block as it is swapped into SPU 500. Thus, the data movement and encryption/decryption overhead for each swap block has a very large impact on SPE performance.

The performance of an SPU microprocessor 520 may not significantly impact the performance of the SPE 503 it supports if the processor is not responsible for moving data through the encrypt/decrypt engine 522.

VDE Secure Database 610

VDE 100 stores separately deliverable VDE elements in a secure (e.g., encrypted) database 610 distributed to each VDE electronic appliance 610. The database 610 in the preferred embodiment may store and/or manage three basic classes of VDE items:

VDE objects,

VDE process elements, and

VDE data structures.

The following table lists examples of some of the VDE items stored in or managed by information stored in secure database 610:

| | Class | Brief-Description |
|---|---|---|
| Objects | Content Objects | Provide a container for content. |
| | Administrative Objects | Provide a container for information used to keep VDE 100 operating. |
| | Traveling Objects | Provide a container for content and control information. |
| | Smart Objects | Provide a container for (user-specified) processes and data. |
| Process Elements | Method Cores | Provide a mechanism to relate events to control mechanisms and permissions. |
| | Load Modules ("LMs") | Secure (tamper-resistant) executable code. |
| | Method Data Elements ("MDEs") | Independently deliverable data structures used to control/customize methods. |
| Data Structures | Permissions Records ("PERCs") | Permissions to use objects; "blueprints" to build component assemblies. |
| | User Data Elements ("UDEs") | Basic data structure for storing information used in conjunction with load modules. |
| | Administrative Data Structures | Used by VDE node to maintain administrative information. |

Figure 16:
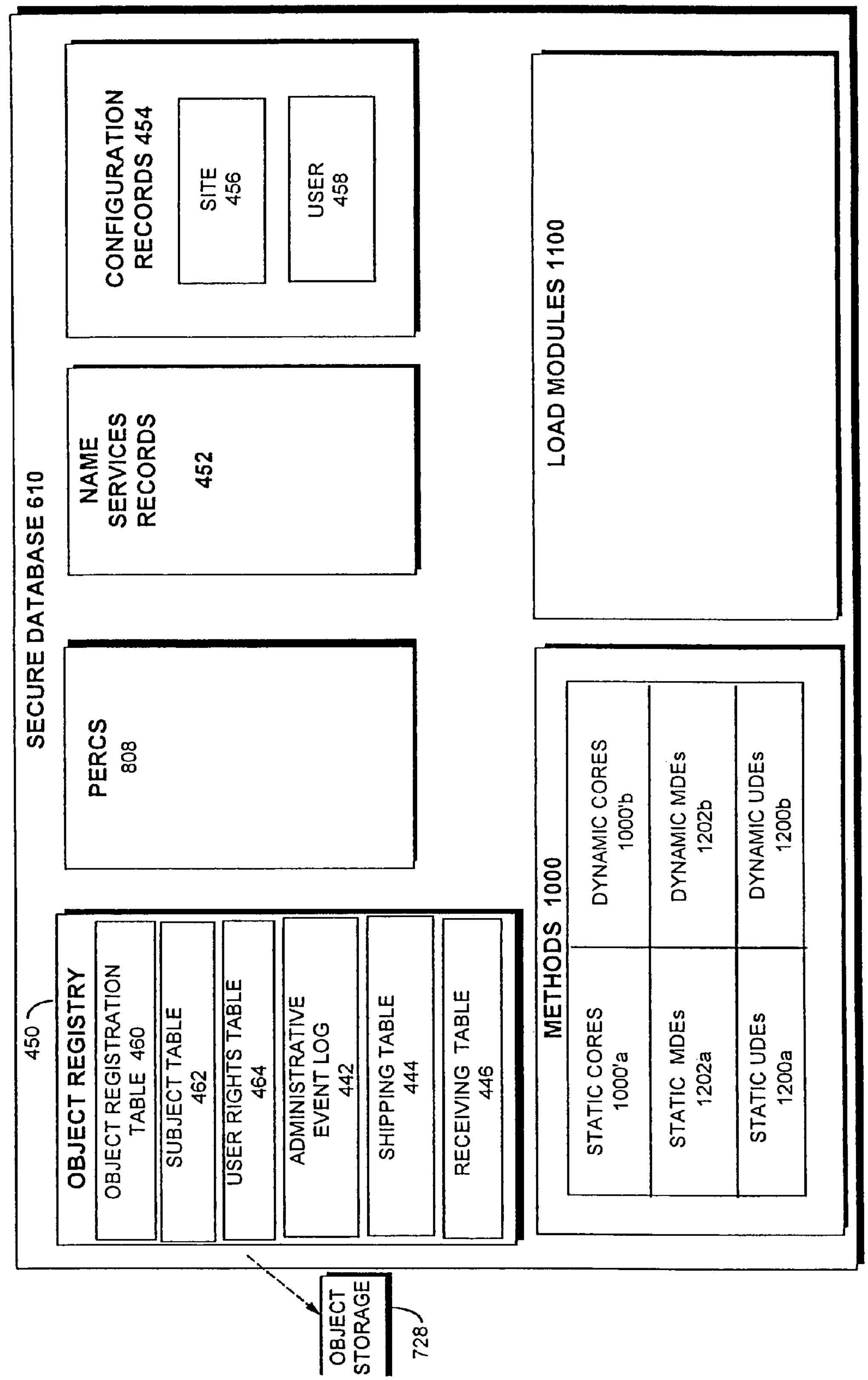
FIG. 16 is a block diagram of an example of a secure data base structure.

Each electronic appliance 600 may have an instance of a secure database 610 that securely maintains the VDE items. FIG. 16 shows one example of a secure database 610. The secure database 610 shown in this example includes the following VDE-protected items:

one or more PERCs 808;

methods 1000 (including static and dynamic method "cores" 1000, and MDEs 1202);

Static UDEs 1200*a* and Dynamic UDEs 1200*b*; and load modules 1100.

Secure database 610 may also include the following additional data structures used and maintained for administrative purposes:

an "object registry" 450 that references an object storage 728 containing one or more VDE objects;

name service records 452; and configuration records 454 (including site configuration records 456 and user configuration records 458).

Secure database 610 in the preferred embodiment does not include VDE objects 300, but rather references VDE objects stored, for example, on file system 687 and/or in a separate object repository 728. Nevertheless, an appropriate "starting point" for understanding VDE-protected information may be a discussion of VDE objects 300.

VDE Objects 300

Figure 17:
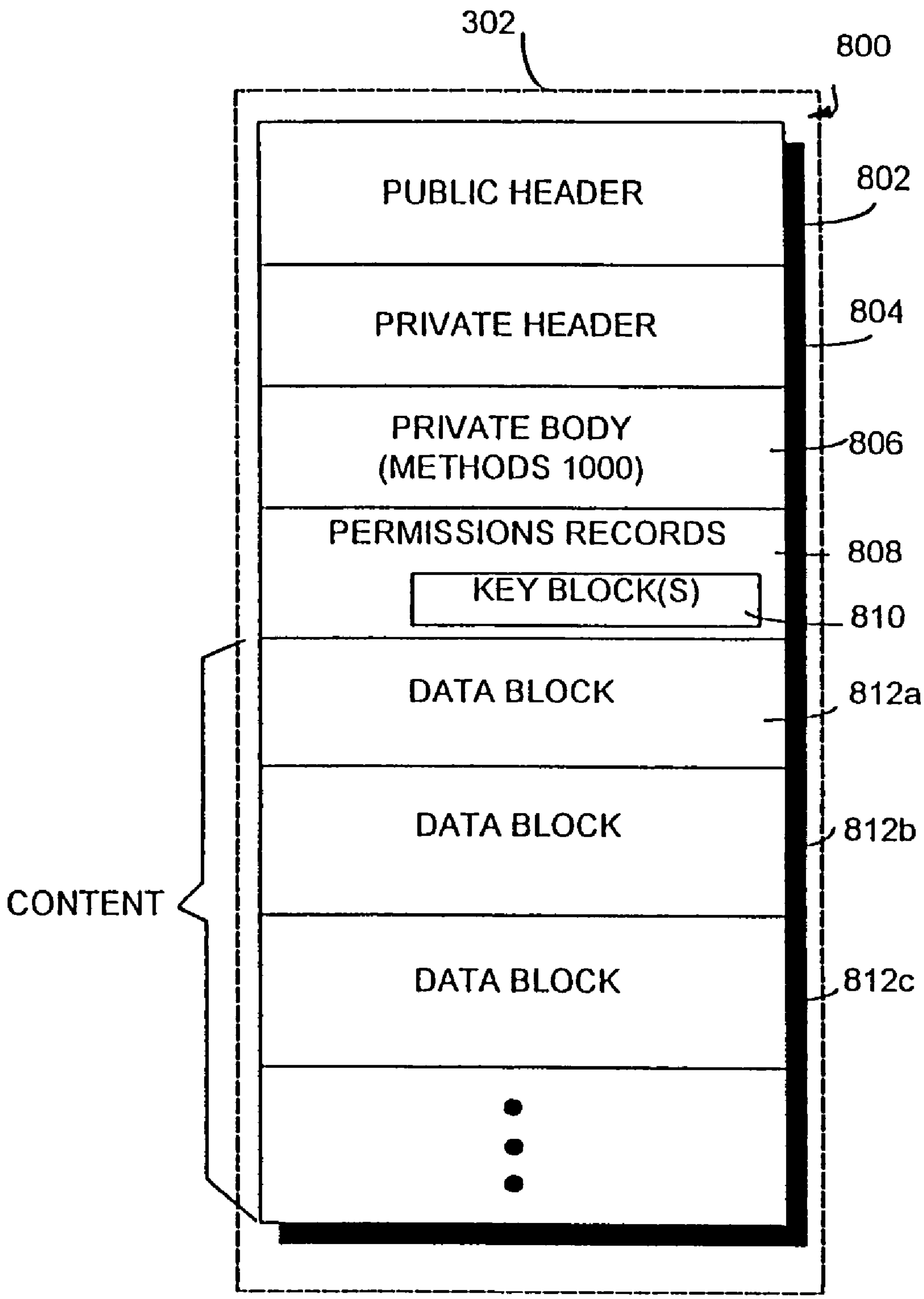
FIG. 17 is an illustration of an example of a logical object structure.

VDE 100 provides a media independent container model for encapsulating content. FIG. 17 shows an example of a "logical" structure or format 800 for an object 300 provided by the preferred embodiment.

The generalized "logical object" structure 800 shown in FIG. 17 used by the preferred embodiment supports digital content delivery over any currently used media. "Logical object" in the preferred embodiment may refer collectively to: content; computer software and/or methods used to manipulate, record, and/or otherwise control use of said content; and permissions, limitations, administrative control information and/or requirements applicable to said content, and/or said computer software and/or methods. Logical objects may or may not be stored, and may or may not be present in, or accessible to, any given electronic appliance 600. The content portion of a logical object may be organized as information contained in, not contained in, or partially contained in one or more objects.

Briefly, the FIG. 17 "logical object" structure 800 in the preferred embodiment includes a public header 802, private header 804, a "private body" 806 containing one or more methods 1000, permissions record(s) (PERC) 808 (which may include one or more key blocks 810), and one or more data blocks or areas 812. These elements may be "packaged" within a "container" 302. This generalized, logical object structure 800 is used in the preferred embodiment for different types of VDE objects 300 categorized by the type and location of their content.

The "container" concept is a convenient metaphor used to give a name to the collection of elements required to make use of content or to perform an administrative-type activity. Container 302 typically includes identifying information, control structures and content (e.g., a property or administrative data). The term "container" is often (e.g., Bento/OpenDoc and OLE) used to describe a collection of information stored on a computer system's secondary storage system(s) or accessible to a computer system over a communications network on a "server's" secondary storage system. The "container" 302 provided by the preferred embodiment is not so limited or restricted. In VDE 100, there is no requirement that this information is stored together, received at the same time, updated at the same time, used for only a single object, or be owned by the same entity. Rather, in VDE 100 the container concept is extended and generalized to include real-time content and/or online interactive content passed to an electronic appliance over a cable, by broadcast, or communicated by other electronic communication means.

Thus, the "complete" VDE container 302 or logical object structure 800 may not exist at the user's location (or any other location, for that matter) at any one time. The "logical object" may exist over a particular period of time (or periods of time), rather than all at once. This concept includes the notion of a "virtual container" where important container elements may exist either as a plurality of locations and/or over a sequence of time periods (which may or may not overlap). Of course, VDE 100 containers can also be stored with all required control structures and content together. This represents a continuum: from all content and control structures present in a single container, to no locally accessible content or container specific control structures.

Although at least some of the data representing the object is typically encrypted and thus its structure is not discernible, within a PPE 650 the object may be viewed logically as a "container" 302, because its structure and components are automatically and transparently decrypted.

A container model merges well with the event-driven processes and ROS 602 provided by the preferred embodiment. Under this model, content is easily subdivided into small, easily manageable pieces, but is stored so that it maintains the structural richness inherent in unencrypted content. An object oriented container model (such as Bento/OpenDoc or OLE) also provides many of the necessary "hooks" for inserting the necessary operating system integration components, and for defining the various content specific methods.

In more detail, the logical object structure 800 provided by the preferred embodiment includes a public (or unencrypted) header 802 that identifies the object and may also identify one or more owners of rights in the object and/or one or more distributors of the object. Private (or encrypted) header 804 may include a part or all of the information in the public header and further, in the preferred embodiment, will include additional data for validating and identifying the object 300 when a user attempts to register as a user of the object with a service clearinghouse, VDE administrator, or an SPU 500. Alternatively, information identifying one or more rights owners and/or distributors of the object may be located in encrypted form within encrypted header 804, along with any of said additional validating and identifying data.

Each logical object structure 800 may also include a "private body" 806 containing or referencing a set of methods 1000 (i.e., programs or procedures) that control use and distribution of the object 300. The ability to optionally incorporate different methods 1000 with each object is important to making VDE 100 highly configurable. Methods 1000 perform the basic function of defining what users (including, where appropriate, distributors, client administrators, etc.), can and cannot do with an object 300. Thus, one object 300 may come with relatively simple methods, such as allowing unlimited viewing within a fixed period of time for a fixed fee (such as the newsstand price of a newspaper for viewing the newspaper for a period of one week after the paper's publication), while other objects may be controlled by much more complicated (e.g., billing and usage limitation) methods.

Logical object structure 800 shown in FIG. 17 may also include one or more PERCs 808. PERCs 808 govern the use of an object 300, specifying methods or combinations of methods that must be used to access or otherwise use the object or its contents. The permission records 808 for an object may include key block(s) 810, which may store decryption keys for accessing the content of the encrypted content stored within the object 300.

The content portion of the object is typically divided into portions called data blocks 812. Data blocks 812 may contain any sort of electronic information, such as, "content," including computer programs, images, sound, VDE administrative information, etc. The size and number of data blocks 812 may be selected by the creator of the property. Data blocks 812 need not all be the same size (size may be influenced by content usage, database format, operating system, security and/or other considerations). Security will be enhanced by using at least one key block 810 for each data block 812 in the object, although this is not required. Key blocks 810 may also span portions of a plurality of data blocks 812 in a consistent or pseudo-random manner. The spanning may provide additional security by applying one or more keys to fragmented or seemingly random pieces of content contained in an object 300, database, or other information entity.

Many objects 300 that are distributed by physical media and/or by "out of channel" means (e.g., redistributed after receipt by a customer to another customer) might not include key blocks 810 in the same object 300 that is used to transport the content protected by the key blocks. This is because VDE objects may contain data that can be electronically copied outside the confines of a VDE node. If the content is encrypted, the copies will also be encrypted and the copier cannot gain access to the content unless she has the appropriate decryption key(s). For objects in which maintaining security is particularly important, the permission records 808 and key blocks 810 will frequently be distributed electronically, using secure communications techniques (discussed below) that are controlled by the VDE nodes of the sender and receiver. As a result, permission records 808 and key blocks 810 will frequently, in the preferred embodiment, be stored only on electronic appliances 600 of registered users (and may themselves be delivered to the user as part of a registration/initialization process). In this instance, permission records 808 and key blocks 810 for each property can be encrypted with a private DES key that is stored only in the secure memory of an SPU 500, making the key blocks unusable on any other user's VDE node. Alternately, the key blocks 810 can be encrypted with the end user's public key, making those key blocks usable only to the SPU 500 that stores the corresponding private key (or other, acceptably secure, encryption/security techniques can be employed).

In the preferred embodiment, the one or more keys used to encrypt each permission record 808 or other management information record will be changed every time the record is updated (or after a certain one or more events). In this event, the updated record is re-encrypted with new one or more keys. Alternately, one or more of the keys used to encrypt and decrypt management information may be "time aged" keys that automatically become invalid after a period of time. Combinations of time aged and other event triggered keys may also be desirable; for example keys may change after a certain number of accesses, and/or after a certain duration of time or absolute point in time. The techniques may also be used together for any given key or combination of keys. The preferred embodiment procedure for constructing time aged keys is a one-way convolution algorithm with input parameters including user and site information as well as a specified portion of the real time value provided by the SPU RTC 528. Other techniques for time aging may also be used, including for example techniques that use only user or site information, absolute points in time, and/or duration of time related to a subset of activities related to using or decrypting VDE secured content or the use of the VDE system.

VDE 100 supports many different types of "objects" 300 having the logical object structure 800 shown in FIG. 17. Objects may be classified in one sense based on whether the protection information is bound together with the protected information. For example, a container that is bound by its control(s) to a specific VDE node is called a "stationary object" (see FIG. 18). A container that is not bound by its control information to a specific VDE node but rather carries sufficient control and permissions to permit its use, in whole or in part, at any of several sites is called a "Traveling Object" (see FIG. 19).

Objects may be classified in another sense based on the nature of the information they contain. A container with information content is called a "Content Object" (see FIG. 20). A container that contains transaction information, audit trails, VDE structures, and/or other VDE control/administrative information is called an "Administrative Object" (see FIG. 21). Some containers that contain executable code operating under VDE control (as opposed to being VDE control information) are called "Smart Objects." Smart Objects support user agents and provide control for their execution at remote sites. There are other categories of objects based upon the location, type and access mechanism associated with their content, that can include combinations of the types mentioned above. Some of these objects supported by VDE 100 are described below. Some or all of the data blocks 812 shown in FIG. 17 may include "embedded" content, administrative, stationary, traveling and/or other objects.

1. Stationary Objects

Figure 18:
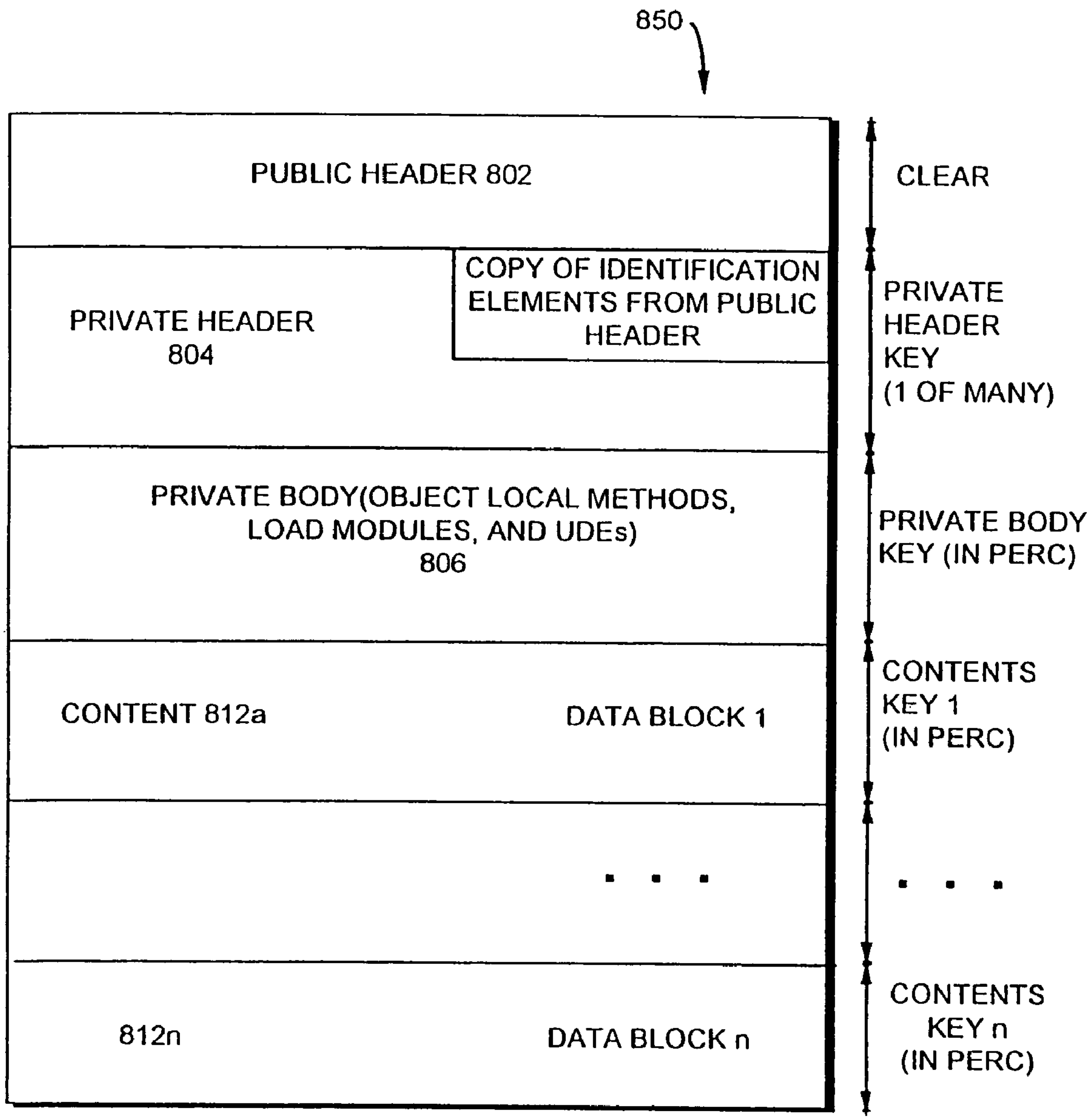
FIG. 18 shows an example of a stationary object structure.

FIG. 18 shows an example of a "Stationary Object" structure 850 provided by the preferred embodiment. "Stationary Object" structure 850 is intended to be used only at specific VDE electronic appliance/installations that have received explicit permissions to use one or more portions of the stationary object. Therefore, stationary object structure 850 does not contain a permissions record (PERC) 808; rather, this permissions record is supplied and/or delivered separately (e.g., at a different time, over a different path, and/or by a different party) to the appliance/installation 600. A common PERC 808 may be used with many different stationary objects.

As shown in FIG. 18, public header 802 is preferably "plaintext" (i.e., unencrypted). Private header 804 is preferably encrypted using at least one of many "private header keys." Private header 804 preferably also includes a copy of identification elements from public header 802, so that if the identification information in the plaintext public header is tampered with, the system can determine precisely what the tamperer attempted to alter. Methods 1000 may be contained in a section called the "private body" 806 in the form of object local methods, load modules, and/or user data elements. This private body (method) section 806 is preferably encrypted using one or more private body keys contained in the separate permissions record 808. The data blocks 812 contain content (information or administrative) that may be encrypted using one or more content keys also provided in permissions record 808.

2. Traveling Objects

Figure 19:
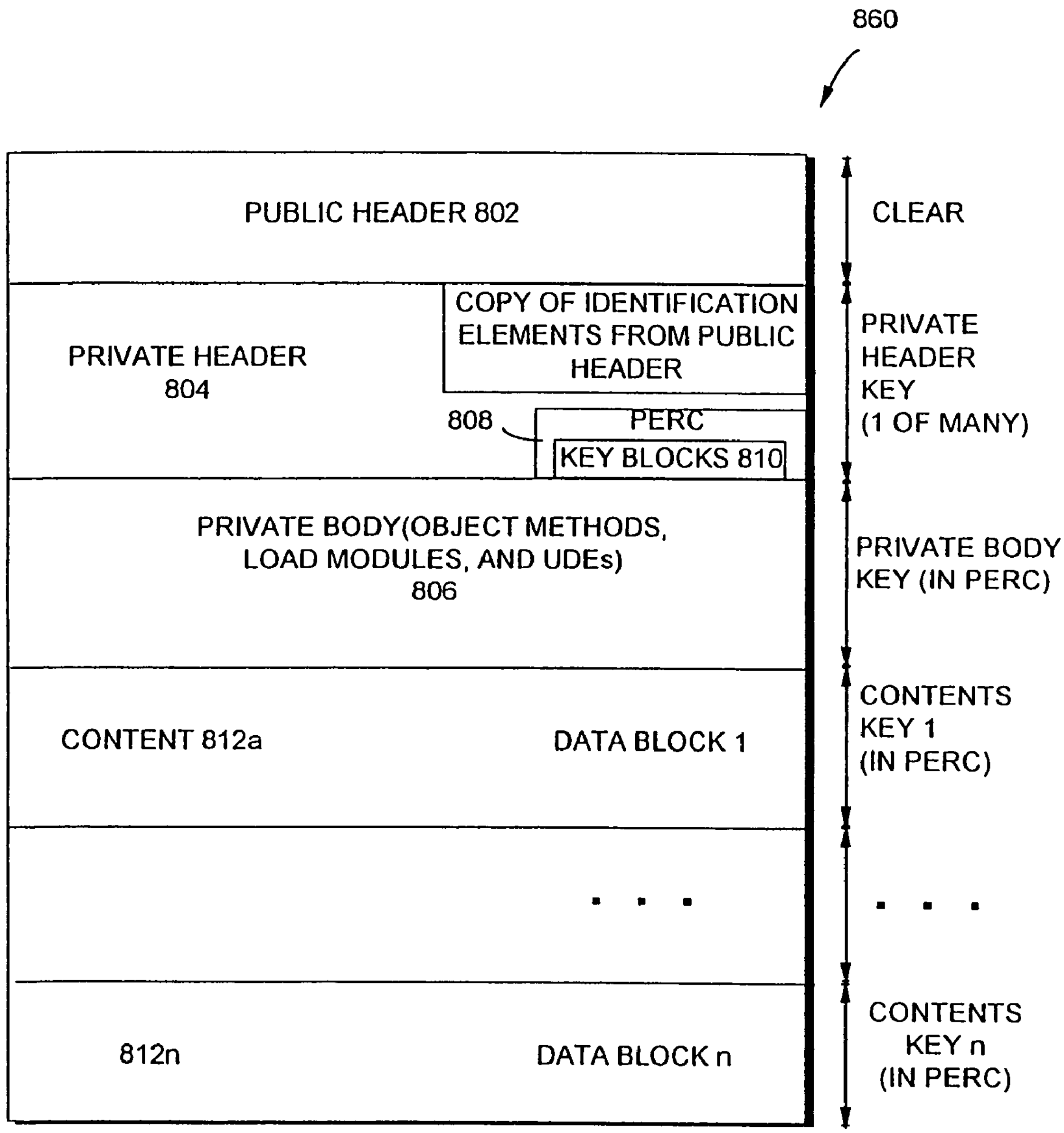
FIG. 19 shows an example of a traveling object structure.

FIG. 19 shows an example of a "traveling object" structure 860 provided by the preferred embodiment. Traveling objects are objects that carry with them sufficient information to enable at least some use of at least a portion of their content when they arrive at a VDE node.

Traveling object structure 860 may be the same as stationary object structure 850 shown in FIG. 18 except that the traveling object structure includes a permissions record (PERC) 808 within private header 804. The inclusion of PERC 808 within traveling object structure 860 permits the traveling object to be used at any VDE electronic appliance/participant 600 (in accordance with the methods 1000 and the contained PERC 808).

"Traveling" objects are a class of VDE objects 300 that can specifically support "out of channel" distribution. Therefore, they include key block(s) 810 and are transportable from one electronic appliance 600 to another. Traveling objects may come with a quite limited usage related budget so that a user may use, in whole or part, content (such as a computer program, game, or database) and evaluate whether to acquire a license or further license or purchase object content. Alternatively, traveling object PERCs 808 may contain or reference budget records with, for example:

(a) budget(s) reflecting previously purchased rights or credit for future licensing or purchasing and enabling at least one or more types of object content usage, and/or (b) budget(s) that employ (and may debit) available credit(s) stored on and managed by the local VDE node in order to enable object content use, and/or (c) budget(s) reflecting one or more maximum usage criteria before a report to a local VDE node (and, optionally, also a report to a clearinghouse) is required and which may be followed by a reset allowing further usage, and/or modification of one or more of the original one or more budget(s).

As with standard VDE objects 300, a user may be required to contact a clearinghouse service to acquire additional budgets if the user wishes to continue to use the traveling object after the exhaustion of an available budget(s) or if the traveling object (or a copy thereof) is moved to a different electronic appliance and the new appliance does not have a available credit budget(s) that corresponds to the requirements stipulated by permissions record 808.

For example, a traveling object PERC 808 may include a reference to a required budget VDE 1200 or budget options that may be found and/or are expected to be available. For example, the budget VDE may reference a consumer's VISA, MC, AMEX, or other "generic" budget that may be object independent and may be applied towards the use of a certain or classes of traveling object content (for example any movie object from a class of traveling objects that might be Blockbuster Video rentals). The budget VDE itself may stipulate one or more classes of objects it may be used with, while an object may specifically reference a certain one or more generic budgets. Under such circumstances, VDE providers will typically make information available in such a manner as to allow correct referencing and to enable billing handling and, resulting payments.

Traveling objects can be used at a receiving VDE node electronic appliance 600 so long as either the appliance carries the correct budget or budget type (e.g. sufficient credit available from a clearinghouse such as a VISA budget) either in general or for specific one or more users or user classes, or so long as the traveling object itself carries with it sufficient budget allowance or an appropriate authorization (e.g., a stipulation that the traveling object may be used on certain one or more installations or installation classes or users or user classes where classes correspond to a specific subset of installations or users who are represented by a predefined class identifiers stored in a secure database 610). After receiving a traveling object, if the user (and/or installation) doesn't have the appropriate budget(s) and/or authorizations, then the user could be informed by the electronic appliance 600 (using information stored in the traveling object) as to which one or more parties the user could contact. The party or parties might constitute a list of alternative clearinghouse providers for the traveling object from which the user selects his desired contact).

As mentioned above, traveling objects enable objects 300 to be distributed "Out-Of-Channel;" that is, the object may be distributed by an unauthorized or not explicitly authorized individual to another individual. "Out of channel" includes paths of distribution that allow, for example, a user to directly redistribute an object to another individual. For example, an object provider might allow users to redistribute copies of an object to their friends and associates (for example by physical delivery of storage media or by delivery over a computer network) such that if a friend or associate satisfies any certain criteria required for use of said object, he may do so.

For example, if a software program was distributed as a traveling object, a user of the program who wished to supply it or a usable copy of it to a friend would normally be free to do so. Traveling Objects have great potential commercial significance, since useful content could be primarily distributed by users and through bulletin boards, which would require little or no distribution overhead apart from registration with the "original" content provider and/or clearinghouse.

The "out of channel" distribution may also allow the provider to receive payment for usage and/or elsewise maintain at least a degree of control over the redistributed object. Such certain criteria might involve, for example, the registered presence at a user's VDE node of an authorized third party financial relationship, such as a credit card, along with sufficient available credit for said usage.

Thus, if the user had a VDE node, the user might be able to use the traveling object if he had an appropriate, available budget available on his VDE node (and if necessary, allocated to him), and/or if he or his VDE node belonged to a specially authorized group of users or installations and/or if the traveling object carried its own budget(s).

Since the content of the traveling object is encrypted, it can be used only under authorized circumstances unless the traveling object private header key used with the object is broken—a potentially easier task with a traveling object as compared to, for example, permissions and/or budget information since many objects may share the same key, giving a cryptoanalyst both more information in cyphertext to analyze and a greater incentive to perform cryptoanalysis.

In the case of a "traveling object," content owners may distribute information with some or all of the key blocks 810 included in the object 300 in which the content is encapsulated. Putting keys in distributed objects 300 increases the exposure to attempts to defeat security mechanisms by breaking or cryptoanalyzing the encryption algorithm with which the private header is protected (e.g., by determining the key for the header's encryption). This breaking of security would normally require considerable skill and time, but if broken, the algorithm and key could be published so as to allow large numbers of individuals who possess objects that are protected with the same key(s) and algorithm(s) to illegally use protected information. As a result, placing keys in distributed objects 300 may be limited to content that is either "time sensitive" (has reduced value after the passage of a certain period of time), or which is somewhat limited in value, or where the commercial value of placing keys in objects (for example convenience to end-users, lower cost of eliminating the telecommunication or other means for delivering keys and/or permissions information and/or the ability to supporting objects going "out-of-channel") exceeds the cost of vulnerability to sophisticated hackers. As mentioned elsewhere, the security of keys may be improved by employing convolution techniques to avoid storing "true" keys in a traveling object, although in most cases using a shared secret provided to most or all VDE nodes by a VDE administrator as an input rather than site ID and/or time in order to allow objects to remain independent of these values.

As shown in FIG. 19 and discussed above, a traveling object contains a permissions record 808 that preferably provides at least some budget (one, the other, or both, in a general case). Permission records 808 can, as discussed above, contain a key block(s) 810 storing important key information. PERC 808 may also contain or refer to budgets containing potentially valuable quantities/values. Such budgets may be stored within a traveling object itself, or they may be delivered separately and protected by highly secure communications keys and administrative object keys and management database techniques.

The methods 1000 contained by a traveling object will typically include an installation procedure for "self registering" the object using the permission records 808 in the object (e.g., a REGISTER method). This may be especially useful for objects that have time limited value, objects (or properties) for which the end user is either not charged or is charged only a nominal fee (e.g., objects for which advertisers and/or information publishers are charged based on the number of end users who actually access published information), and objects that require widely available budgets and may particularly benefit from out-of-channel distribution (e.g., credit card derived budgets for objects containing properties such as movies, software programs, games, etc.). Such traveling objects may be supplied with or without contained budget UDEs.

One use of traveling objects is the publishing of software, where the contained permission record(s) may allow potential customers to use the software in a demonstration mode, and possibly to use the full program features for a limited time before having to pay a license fee, or before having to pay more than an initial trial fee. For example, using a time based billing method and budget records with a small pre-installed time budget to allow full use of the program for a short period of time. Various control methods may be used to avoid misuse of object contents. For example, by setting the minimum registration interval for the traveling object to an appropriately large period of time (e.g., a month, or six months or a year), users are prevented from re-using the budget records in the same traveling object.

Another method for controlling the use of traveling objects is to include time-aged keys in the permission records that are incorporated in the traveling object. This is useful generally for traveling objects to ensure that they will not be used beyond a certain date without re-registration, and is particularly useful for traveling objects that are electronically distributed by broadcast, network, or telecommunications (including both one and two way cable), since the date and time of delivery of such traveling objects aging keys can be set to accurately correspond to the time the user came into possession of the object.

Traveling objects can also be used to facilitate "moving" an object from one electronic appliance 600 to another. A user could move a traveling object, with its incorporated one or more permission records 808 from a desktop computer, for example, to his notebook computer. A traveling object might register its user within itself and thereafter only be usable by that one user. A traveling object might maintain separate budget information, one for the basic distribution budget record, and another for the "active" distribution budget record of the registered user. In this way, the object could be copied and passed to another potential user, and then could be a portable object for that user.

Traveling objects can come in a container which contains other objects. For example, a traveling object container can include one or more content objects and one or more administrative objects for registering the content object(s) in an end user's object registry and/or for providing mechanisms for enforcing permissions and/or other security functions. Contained administrative object(s) may be used to install necessary permission records and/or budget information in the end user's electronic appliance.

Content Objects

Figure 20:
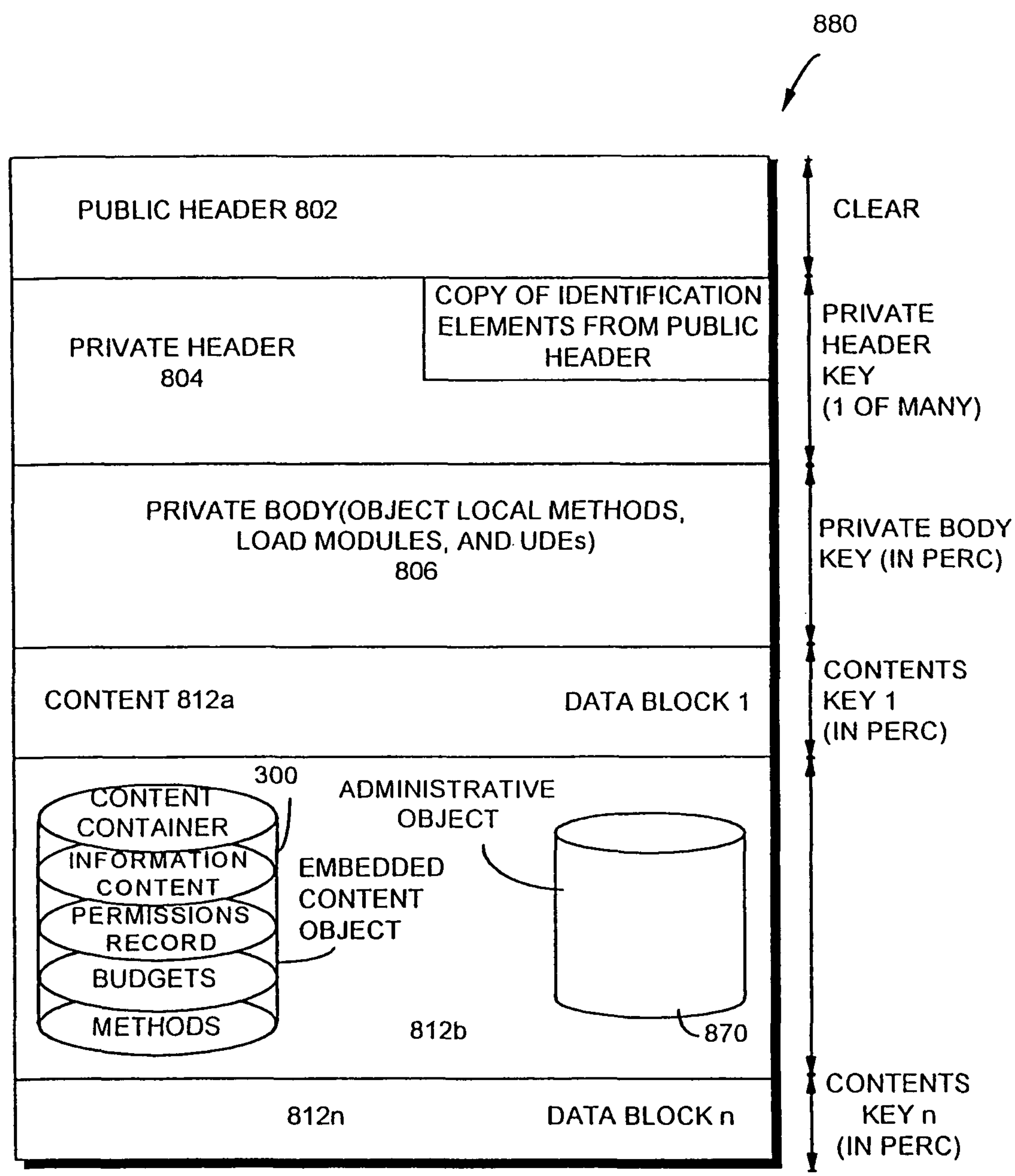
FIG. 20 shows an example of a content object structure.

FIG. 20 shows an example of a VDE content object structure 880. Generally, content objects 880 include or provide information content. This "content" may be any sort of electronic information. For example, content may include: computer software, movies, books, music, information databases, multimedia information, virtual reality information, machine instructions, computer data files, communications messages and/or signals, and other information, at least a portion of which is used and/or manipulated by one or more electronic appliances. VDE 100 can also be configured for authenticating, controlling, and/or auditing electronic commercial transactions and communications such as inter-bank transactions, electronic purchasing communications, and the transmission of, auditing of, and secure commercial archiving of, electronically signed contracts and other legal documents; the information used for these transactions may also be termed "content." As mentioned above, the content need not be physically stored within the object container but may instead be provided separately at a different time (e.g., a real time feed over a cable).

Content object structure 880 in the particular example shown in FIG. 20 is a type of stationary object because it does not include a PERC 808. In this example, content object structure 880 includes, as at least part of its content 812, at least one embedded content object 882 as shown in FIG. 5A. Content object structure 880 may also include an administrative object 870. Thus, objects provided by the preferred embodiment may include one or more "embedded" objects.

Administrative Objects

Figure 21:
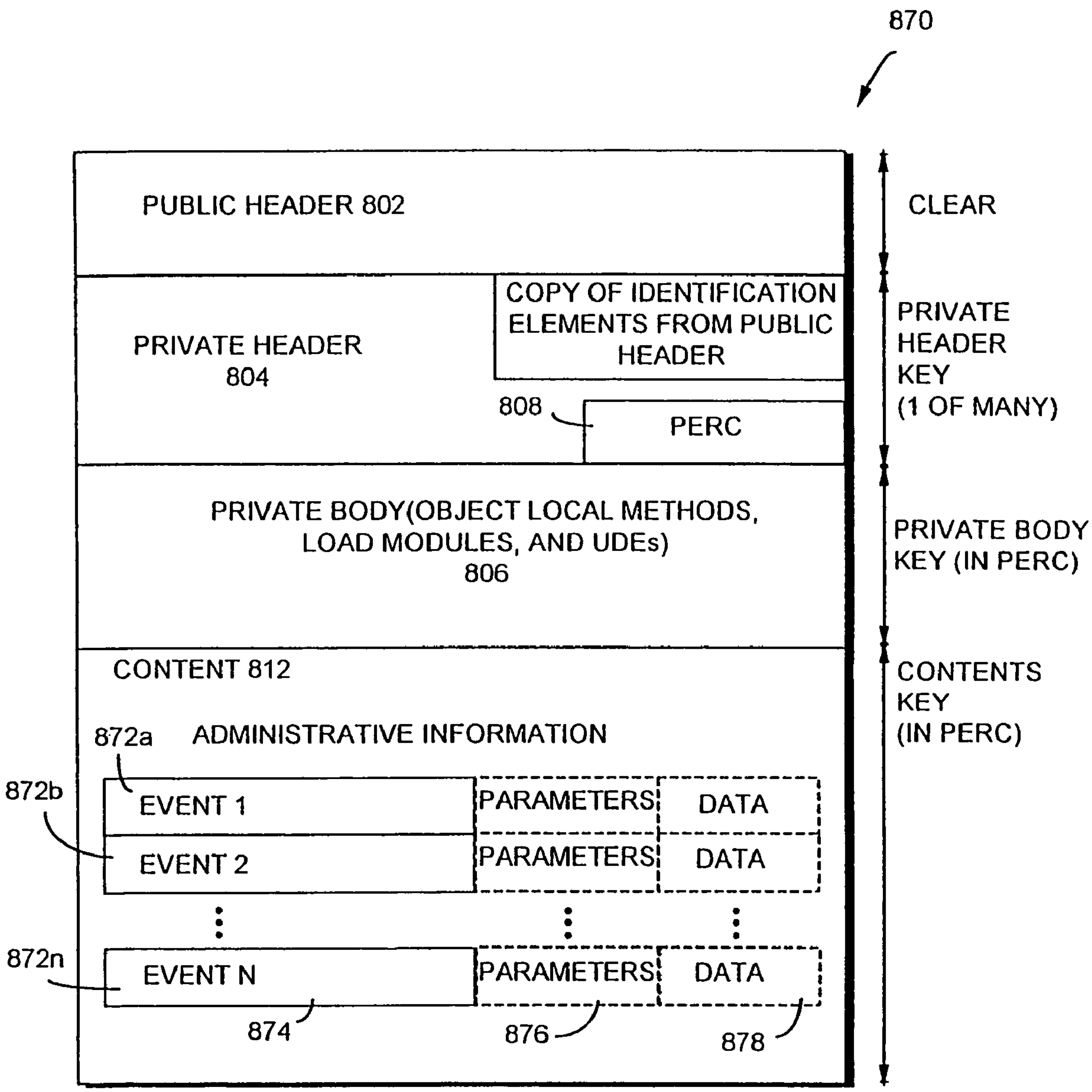
FIG. 21 shows an example of an administrative object structure.

FIG. 21 shows an example of an administrative object structure 870 provided by the preferred embodiment. An "administrative object" generally contains permissions, administrative control information, computer software and/or methods associated with the operation of VDE 100. Administrative objects may also or alternatively contain records of use, and/or other information used in, or related to, the operation of VDE 100. An administrative object may be distinguished from a content object by the absence of VDE protected "content" for release to an end user for example. Since objects may contain other objects, it is possible for a single object to contain one or more content containing objects and one or more administrative objects. Administrative objects may be used to transmit information between electronic appliances for update, usage reporting, billing and/or control purposes. They contain information that helps to administer VDE 100 and keep it operating properly. Administrative objects generally are sent between two VDE nodes, for example, a VDE clearinghouse service, distributor, or client administrator and an end user's electronic appliance 600.

Administrative object structure 870 in this example includes a public header 802, private header 804 (including a "PERC" 808) and a "private body" 806 containing methods 1000. Administrative object structure 870 in this particular example shown in FIG. 20 is a type of traveling object because it contains a PERC 808, but the administrative object could exclude the PERC 808 and be a stationary object. Rather than storing information content, administrative object structure 870 stores "administrative information content" 872. Administrative information content 872 may, for example, comprise a number of records 872*a*, 872*b*, . . . 872*n* each corresponding to a different "event." Each record 872*a*, 872*b*, . . . 872*n* may include an "event" field 874, and may optionally include a parameter field 876 and/or a data field 878. These administrative content records 872 may be used by VDE 100 to define events that may be processed during the course of transactions, e.g., an event designed to add a record to a secure database might include parameters 896 indicating how and where the record should be stored and data field 878 containing the record to be added. In another example, a collection of events may describe a financial transaction between the creator(s) of an administrative object and the recipient(s), such as a purchase, a purchase order, or an invoice. Each event record 872 may be a set of instructions to be executed by the end user's electronic appliance 600 to make an addition or modification to the end user's secure database 610, for example. Events can perform many basic management functions, for example: add an object to the object registry, including providing the associated user/group record(s), rights records, permission record and/or method records; delete audit records (by "rolling up" the audit trail information into, for example, a more condensed, e.g. summary form, or by actual deletion); add or update permissions records 808 for previously registered objects; add or update budget records; add or update user rights records; and add or update load modules.

In the preferred embodiment, an administrative object may be sent, for example, by a distributor, client administrator, or, perhaps, a clearinghouse or other financial service provider, to an end user, or, alternatively, for example, by an object creator to a distributor or service clearinghouse. Administrative objects, for example, may increase or otherwise adjust budgets and/or permissions of the receiving VDE node to which the administrative object is being sent. Similarly, administrative objects containing audit information in the data area 878 of an event record 872 can be sent from end users to distributors, and/or clearinghouses and/or client administrators, who might themselves further transmit to object creators or to other participants in the object's chain of handling.

Methods

Methods 1000 in the preferred embodiment support many of the operations that a user encounters in using objects and communicating with a distributor. They may also specify what method fields are displayable to a user (e.g., use events, user request events, user response-events, and user display events). Additionally, if distribution capabilities are supported in the method, then the method may support distribution activities, distributor communications with a user about a method, method modification, what method fields are displayable to a distributor, and any distribution database checks and record keeping (e.g., distribution events, distributor request events, and distributor response events).

Given the generality of the existing method structure, and the diverse array of possibilities for assembling methods, a generalized structure may be used for establishing relationships between methods. Since methods 1000 may be independent of an object that requires them during any given session, it is not possible to define the relationships within the methods themselves. "Control methods" are used in the preferred embodiment to define relationships between methods. Control methods may be object specific, and may accommodate an individual object's requirements during each session.

A control method of an object establishes relationships between other methods. These relationships are parameterized with explicit method identifiers when a record set reflecting desired method options for each required method is constructed during a registration process.

An "aggregate method" in the preferred embodiment represents a collection of methods that may be treated as a single unit. A collection of methods that are related to a specific property, for example, may be stored in an aggregate method. This type of aggregation is useful from an implementation point of view because it may reduce bookkeeping overhead and may improve overall database efficiency. In other cases, methods may be aggregated because they are logically coupled. For example, two budgets may be linked together because one of the budgets represents an overall limitation, and a second budget represents the current limitation available for use. This would arise if, for example, a large budget is released in small amounts over time.

For example, an aggregate method that includes meter, billing and budget processes can be used instead of three separate methods. Such an aggregate method may reference a single "load module" 1100 that performs all of the functions of the three separate load modules and use only one user data element that contains meter, billing and budget data. Using an aggregate method instead of three separate methods may minimize overall memory requirements, database searches, decryptions, and the number of user data element writes back to a secure database 610. The disadvantage of using an aggregate method instead of three separate methods can be a loss of some flexibility on the part of a provider and user in that various functions may no longer be independently replaceable.

FIG. 16 shows methods 1000 as being part of secure database 610.

A "method" 1000 provided by the preferred embodiment is a collection of basic instructions and information related to the basic instructions, that provides context, data, requirements and/or relationships for use in performing, and/or preparing to perform, the basic instructions in relation to the operation of one or more electronic appliances 600. As shown in FIG. 16, methods 1000 in the preferred embodiment are represented in secure database 610 by:

method "cores" 1000';

Method Data Elements (MDEs) 1202;

User Data Elements (UDEs) 1200; and

Data Description Elements (DTDs).

Method "core" 1000' in the preferred embodiment may contain or reference one or more data elements such as MDEs 1202 and UDEs 1200. In the preferred embodiment, MDEs 1202 and UDEs 1200 may have the same general characteristics, the main difference between these two types of data elements being that a UDE is preferably tied to a particular method as well as a particular user or group of users, whereas an MDE may be tied to a particular method but may be user independent. These MDE and UDE data structures 1200, 1202 are used in the preferred embodiment to provide input data to methods 1000, to receive data outputted by methods, or both. MDEs 1202 and UDEs 1200 may be delivered independently of method cores 1000' that reference them, or the data structures may be delivered as part of the method cores. For example, the method core 1000' in the preferred embodiment may contain one or more MDEs 1202 and/or UDEs 1200 (or portions thereof). Method core 1000' may, alternately or in addition, reference one or more MDE and/or UDE data structures that are delivered independently of method core(s) that reference them.

Method cores 1000' in the preferred embodiment also reference one or more "load modules" 1100. Load modules 1100 in the preferred embodiment comprise executable code, and may also include or reference one or more data structures called "data descriptor" ("DTD") information. This "data descriptor" information may, for example, provide data input information to the DTD interpreter 590. DTDs may enable load modules 1100 to access (e.g., read from and/or write to) the MDE and/or UDE data elements 1202, 1200.

Method cores 1000' may also reference one or more DTD and/or MDE data structures that contain a textual description of their operations suitable for inclusion as part of an electronic contract. The references to the DTD and MDE data structures may occur in the private header of the method core 1000', or may be specified as part of the event table, described below.

Figure 22:
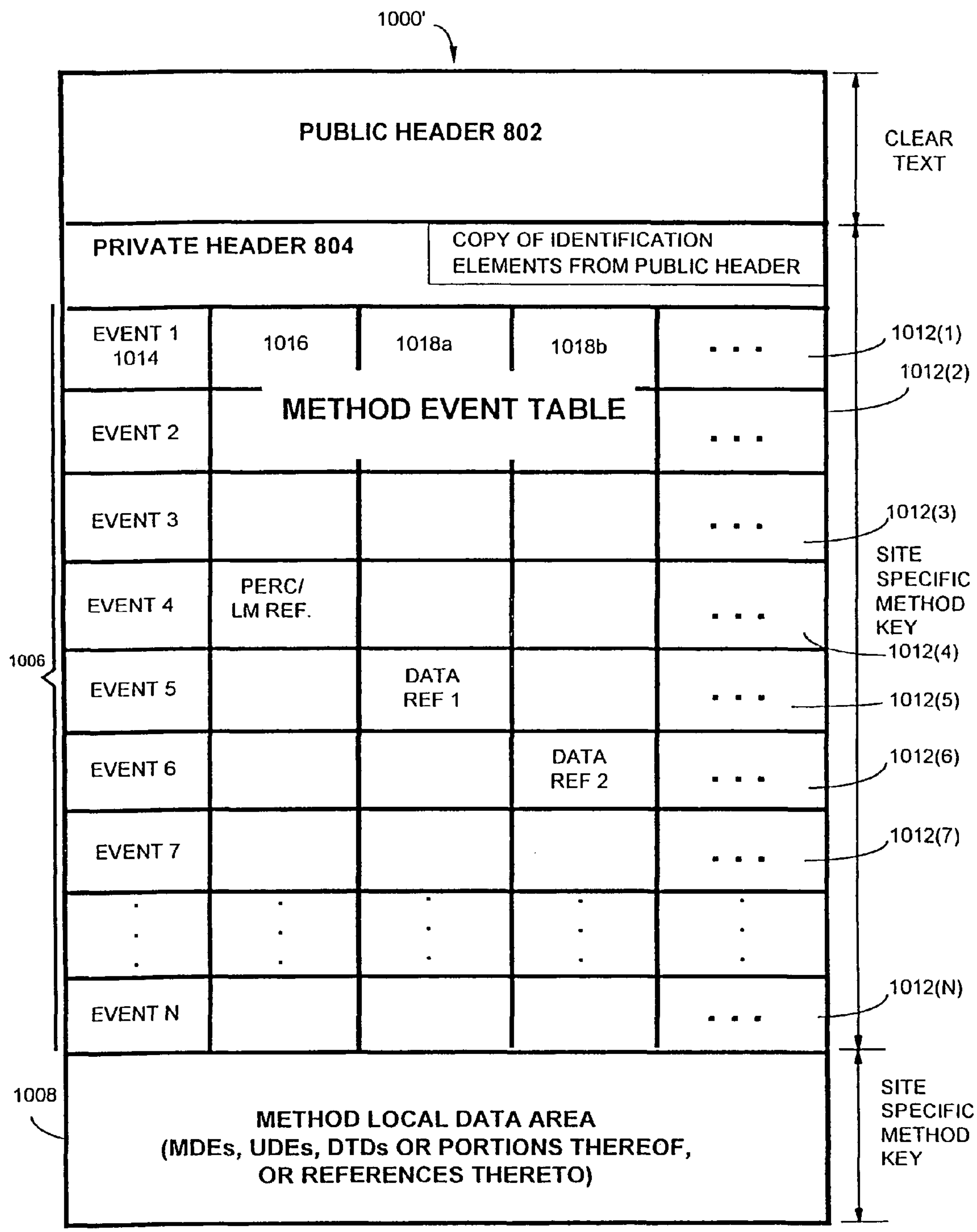
FIG. 22 shows an example of a method core structure.

FIG. 22 shows an example of a format for a method core 1000' provided by the preferred embodiment. A method core 1000' in the preferred embodiment contains a method event table 1006 and a method local data area 1008. Method event table 1006 lists "events." These "events" each reference "load modules" 1100 and/or PERCs 808 that control processing of an event. Associated with each event in the list is any static data necessary to parameterize the load module 1000 or permissions record 808, and reference(s) into method user data area 1008 that are needed to support that event. The data that parameterizes the load module 1100 can be thought of, in part, as a specific function call to the load module, and the data elements corresponding to it may be thought of as the input and/or output data for that specific function call.

Method cores 1000' can be specific to a single user, or they may be shared across a number of users (e.g., depending upon the uniqueness of the method core and/or the specific user data element). Specifically, each user/group may have its own UDE 1200 and use a shared method core 1000'. This structure allows for lower database overhead than when associating an entire method core 1000' with a user/group. To enable a user to use a method, the user may be sent a method core 1000' specifying a UDE 1200. If that method core 1000' already exists in the site's secure database 610, only the UDE 1200 may need to be added. Alternately, the method may create any required UDE 1200 at registration time.

The FIG. 22 example of a format for a method core 1000' provided by the preferred embodiment includes a public (unencrypted) header 802, a private (encrypted) header 804, method event table 1006, and a method local data area 1008.

An example of a possible field layout for method core 1000' public header 802 is shown in the following table:

| Field Type | | Description |
|---|---|---|
| Method ID | Creator ID | Site ID of creator of this method. |
| | Distributor ID | Distributor of this method (e.g., last change). |
| | Type ID | Constant, indicates method "type." |
| | Method ID | Unique sequence number for this method. |
| | Version ID | Version number of this method. |
| Other classification information | Class ID | ID to support different method "classes." |
| | Type ID | ID to support method type compatible searching. |
| Descriptive Information | Description(s) | Textual description(s) of the method. |
| | Event Summary | Summary of event classes (e.g., USE) that this method supports. |

An example of a possible field layout for private header 804 is shown below:

| Field Type | | Description |
|---|---|---|
| Copy of Public Header 802 Method ID and "Other Classification Information" | | Method ID from Public Header |
| Descriptive Information | # of Events | # of events supported in this method. |
| Access and Reference Tags | Access tag<br>Validation tag<br>Correlation tag | Tags used to determine if this method is the correct method under management by the SPU; ensure that the method core 1000' is used only under appropriate circumstances. |
| Data Structure Reference | | Optional Reference to DTD(s) and/or MDE(s) |
| Check Value | | Check value for Private Header and method event table. |
| Check Value for Public Header | | Check Value for Public Header |

Referring once again to FIG. 22, method event table 1006 may in the preferred embodiment include from 1 to N method event records 1012. Each of these method event records 1012 corresponds to a different event the method 1000 represented by method core 1000' may respond to. Methods 1000 in the preferred embodiment may have completely different behavior depending upon the event they respond to. For example, an AUDIT method may store information in an audit trail UDE

1200 in response to an event corresponding to a user's use of an object or other resource. This same AUDIT method may report the stored audit trail to a VDE administrator or other participant in response to an administrative event such as, for example, a timer expiring within a VDE node or a request from another VDE participant to report the audit trail. In the preferred embodiment, each of these different events may be represented by an "event code." This "event code" may be passed as a parameter to a method when the method is called, and used to "look up" the appropriate method event record 1012 within method event table 1006. The selected method event record 1012, in turn, specifies the appropriate information (e.g., load module(s) 1100, data element UDE(s) and MDE(s) 1200, 1202, and/or PERC(s) 808) used to construct a component assembly 690 for execution in response to the event that has occurred.

Thus, in the preferred embodiment, each method event record 1012 may include an event field 1014, a LM/PERC reference field 1016, and any number of data reference fields 1018. Event fields 1014 in the preferred embodiment may contain a "event code" or other information identifying the corresponding event. The LM/PERC reference field 1016 may provide a reference into the secure database 610 (or other "pointer" information) identifying a load module 1100 and/or a PERC 808 providing (or referencing) executable code to be loaded and executed to perform the method in response to the event. Data reference fields 1018 may include information referencing a UDE 1200 or a MDE 1202. These data structures may be contained in the method local data area 1008 of the method core 1000', or they may be stored within the secure database 610 as independent deliverables.

The following table is an example of a possible more detailed field layout for a method event record 1012:

| Field Type | | Description |
|---|---|---|
| Event Field 1014 | | Identifies corresponding event. |
| Access tag | | Secret tag to grant access to this row of the method event record. |
| LM/PERC Reference Field 1016 | DB ID or offset/size | Database reference (or local pointer). |
| | Correlation tag | Correlation tag to assert when referencing this element. |
| # of Data Element Reference Fields | | Count of data reference fields in the method event record. |
| Data Reference Field 1 | UDE ID or offset/size | Database 610 reference (or local pointer). |
| | Correlation tag | Correlation tag to assert when referencing this element. |
| | | ! . . . |
| Data Reference Field n | UDE ID or offset/size | Database 610 reference (or local pointer). |
| | Correlation tag | Correlation tag to assert when referencing this element. |

Load Modules

Figure 23:
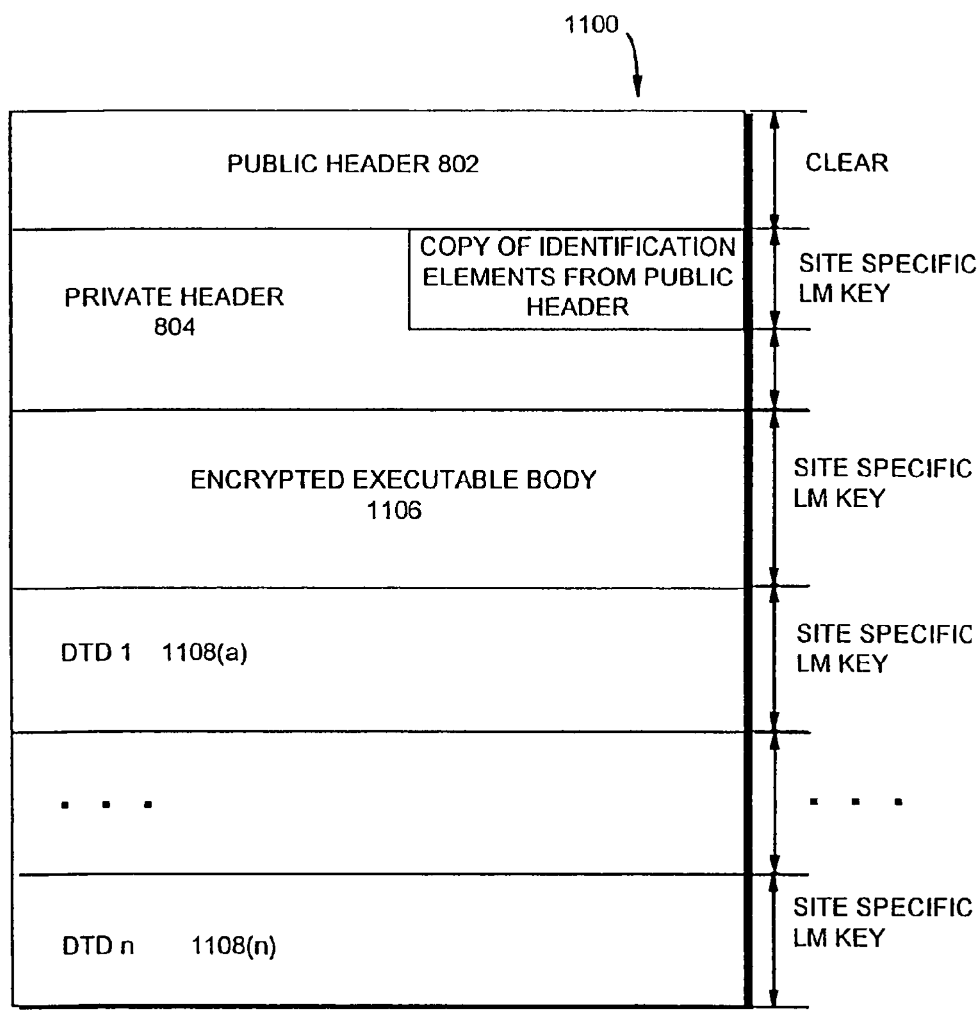
FIG. 23 shows an example of a load module structure.

FIG. 23 is an example of a load module 1100 provided by the preferred embodiment. In general, load modules 1100 represent a collection of basic functions that are used for control operations.

Load module 1100 contains code and static data (that is functionally the equivalent of code), and is used to perform the basic operations of VDE 100. Load modules 1100 will generally be shared by all the control structures for all objects in the system, though proprietary load modules are also permitted. Load modules 1100 may be passed between VDE participants in administrative object structures 870, and are usually stored in secure database 610. They are always encrypted and authenticated in both of these cases. When a method core 1000' references a load module 1100, a load module is loaded into the SPE 503, decrypted, and then either passed to the electronic appliance microprocessor for executing in an HPE 655 (if that is where it executes), or kept in the SPE (if that is where it executes). If no SPE 503 is present, the load module may be decrypted by the HPE 655 prior to its execution.

Load module creation by parties is preferably controlled by a certification process or a ring based SPU architecture. Thus, the process of creating new load modules 1100 is itself a controlled process, as is the process of replacing, updating or deleting load modules already stored in a secured database 610.

A load module 1100 is able to perform its function only when executed in the protected environment of an SPE 503 or an HPE 655 because only then can it gain access to the protected elements (e.g., UDEs 1200, other load modules 1100) on which it operates. Initiation of load module execution in this environment is strictly controlled by a combination of access tags, validation tags, encryption keys, digital signatures and/or correlation tags. Thus, a load module 1100 may only be referenced if the caller knows its ID and asserts the shared secret correlation tag specific to that load module. The decrypting SPU may match the identification token and local access tag of a load module after decryption. These techniques make the physical replacement of any load module 1100 detectable at the next physical access of the load module. Furthermore, load modules 1100 may be made "read only" in the preferred embodiment. The read-only nature of load modules 1100 prevents the write-back of load modules that have been tampered with in non-secure space.

Load modules are not necessarily directly governed by PERCs 808 that control them, nor must they contain any time/date information or expiration dates The only control consideration in the preferred embodiment is that one or more methods 1000 reference them using a correlation tag (the value of a protected object created by the load module's owner, distributed (to authorized parties for inclusion in their methods, and to which access and use is controlled by one or more PERCs 808). If a method core 1000' references a load module 1100 and asserts the proper correlation tag (and the load module satisfies the internal tamper checks for the SPE 503), then that load module can be loaded and executed, or it can be acquired from, shipped to, updated, or deleted by, other systems.

As shown in FIG. 23, load modules 1100 in the preferred embodiment may be constructed of a public (unencrypted) header 802, a private (encrypted) header 804, a private body 1106 containing the encrypted executable code, and one or more data description elements ("DTDs") 1108. The DTDs 1108 may be stored within load module 1100, or they may be references to static data elements stored in secure database 610.

The following is an example of a possible field layout for load module public header 802:

| Field Type | | Description |
|---|---|---|
| LM ID | | VDE ID of Load Module. |
| | Creator ID | Site ID of creator of this load module. |
| | Type ID | Constant indicates load module type. |
| | LM ID | Unique sequence number for this load module, which uniquely identifies the load module in a sequence of load modules created by an authorized VDE participant. |
| | Version ID | Version number of this load module. |

-continued

| Field Type | | Description |
|---|---|---|
| Other classification information | Class ID | ID to support different load module classes. |
| | Type ID | ID to support method type compatible searching. |
| Descriptive Information | Description | Textual description of the load module. |
| | Execution space code | Value that describes what execution space (e.g., SPE or HPE) this load module. |

Many load modules 1100 contain code that executes in an SPE 503. Some load modules 1100 contain code that executes in an HPE 655. This allows methods 1000 to execute in whichever environment is appropriate. For example, an INFORMATION method 1000 can be built to execute only in SPE 503 secure space for government classes of security, or in an HPE 655 for commercial applications. As described above, the load module public header 802 may contain an "execution space code" field that indicates where the load module 1100 needs to execute. This functionality also allows for different SPE instruction set as well as different user platforms, and allows methods to be constructed without dependencies on the underlying load module instruction set.

Load modules 1100 operate on three major data areas: the stack, load module parameters, and data structures. The stack and execution memory size required to execute the load module 1100 are preferably described in private header 804, as are the data descriptions from the stack image on load module call, return, and any return data areas. The stack and dynamic areas are described using the same DTD mechanism. The following is an example of a possible layout for a load module private header 1104:

| Field Type | | Description |
|---|---|---|
| Copy of some or all of information from public header 802 | | Object ID from Public Header. |
| Other classification information | Check Value | Check Value for Public Header. |
| Descriptive Information | LM Size | Size of executable code block. |
| | LM Exec Size | Executable code size for the load module. |
| | LM Exec Stack | Stack size required for the load module. |
| | Execution space code | Code that describes the execution space for this load module. |
| Access and reference tags | Access tag | Tags used to determine if the load module is the correct LM requested by the SPE. |
| | Validation tag | |
| | Correlation tag | Tag used to determine if the caller of the LM has the right to execute this LM. |
| | Digital Signature | Used to determine if the LM executable content is intact and was created by a trusted source (one with a correct certificate for creating LMs). |
| Data record descriptor information | DTD count | Number of DTDs that follow the code block. |
| | DTD 1 reference | If locally defined, the physical size and offset in bytes of the first DTD defined for this LM. If publicly referenced DTD, this is the DTD ID and the correlation tag to permit access to the record. |
| | | *** |
| | DTD N reference | If locally defined, the physical size and offset in bytes of the Nth DTD defined for this LM. If publicly referenced DTD, this is the DTD ID and the correlation tag to permit access to the record. |
| Check Value | | Check Value for entire LM. |

Each load module 1100 also may use DTD 1108 information to provide the information necessary to support building methods from a load module. This DTD information contains the definition expressed in a language such as SGML for the names and data types of all, of the method data fields that the load module supports, and the acceptable ranges of values that can be placed in the fields. Other DTDs may describe the function of the load module 1100 in English for inclusion in an electronic contract, for example.

The next section of load module 1100 is an encrypted executable body 1106 that contains one or more blocks of encrypted code. Load modules 1100 are preferably coded in the "native" instruction set of their execution environment for efficiency and compactness. SPU 500 and platform providers may provide versions of the standard load modules 1100 in order to make their products cooperate with the content in distribution mechanisms contemplated by VDE 100. The preferred embodiment creates and uses native mode load modules 1100 in lieu of an interpreted or "p-code" solution to optimize the performance of a limited resource SPU. However, when sufficient SPE (or HPE) resources exist and/or platforms have sufficient resources, these other implementation approaches may improve the cross platform utility of load module code.

The following is an example of a field layout for a load module DTD 1108:

| Field Type | | Description |
|---|---|---|
| DTD ID | | Uses Object ID from Private Header. |
| | Creator ID | Site ID of creator of this DTD. |
| | Type ID | Constant. |
| | DTD ID | Unique sequence number for this DTD. |
| | Version ID | Version number of this DTD. |
| Descriptive Information | DTD Size | Size of DTD block. |
| Access and reference tags | Access tag | Tags used to determine if the DTD is the correct DTD requested by the SPE. |
| | Validation tag | |
| | Correlation tag | Tag used to determine if the caller of this DTD has the right to use the DTD. |
| DTD Body | | DTD Data Definition 1 |
| | | DTD Data Definition 2 |
| | | ! |
| | | DTD Data Definition N |
| | Check Value | Check Value for entire DTD record. |

Some examples of how load modules 1100 may use DTDs 1108 include:

Increment data element (defined by name in DTD3) value in data area DTD4 by value in DTD1.

Set data element (defined by name in DTD3) value in data area DTD4 to value in DTD3

Compute atomic element from event in DTD1 from table in DTD3 and return in DTD2

Compute atomic element from event in DTD1 from equation in DTD3 and return in DTD2

Create load module from load module creation template referenced in DTD3

Modify load module in DTD3 using content in DTD4

Destroy load module named in DTD3

Commonly used load modules 1100 may be built into a SPU 500 as space permits. VDE processes that use built-in load modules 1100 will have significantly better performance than processes that have to find, load and decrypt external load modules. The most useful load modules 1100 to build into a SPU might include scaler meters, fixed price billing, budgets and load modules for aggregate methods that perform these three processes.

User Data Elements (UDEs) 1200 and Method Data Elements (MDEs) 1202

User Data Elements (UDEs) 1200 and Method Data Elements (MDEs) 1202 in the preferred embodiment store data. There are many types of UDEs 1200 and MDEs 1202 provided by the preferred embodiment. In the preferred embodiment, each of these different types of data structures shares a common overall format including a common header definition and naming scheme. Other UDEs 1200 that share this common structure include "local name services records" (to be explained shortly) and account information for connecting to other VDE participants. These elements are not necessarily associated with an individual user, and may therefore be considered MDEs 1202. All UDEs 1200 and all MDEs 1202 provided by the preferred embodiment may, if desired, (as shown in FIG. 16) be stored in a common physical table within secure database 610, and database access processes may commonly be used to access all of these different types of data structures.

In the preferred embodiment, PERCs 808 and user rights table records are types of UDE 1200. There are many other types of UDEs 1200/MDEs 1202, including for example, meters, meter trails, budgets, budget trails, and audit trails. Different formats for these different types of UDEs/M])Es are defined, as described above, by SGML definitions contained within DTDs 1108. Methods 1000 use these DTDs to appropriately access UDEs/MDEs 1200, 1202.

Secure database 610 stores two types of items: static and dynamic. Static data structures and other items are used for information that is essentially static information. This includes load modules 1100; PERCs 808, and many components of methods. These items are not updated frequently and contain expiration dates that can be used to prevent "old" copies of the information from being substituted for newly received items. These items may be encrypted with a site specific secure database file key when they are stored in the secure database 610, and then decrypted using that key-when they are loaded into the SPE.

Dynamic items are used to support secure items that must be updated frequently. The UDEs 1200 of many methods must be updated and written out of the SPE 503 after each use. Meters and budgets are common examples of this. Expiration dates cannot be used effectively to prevent substitution of the previous copy of a budget UDE 1200. To secure these frequently updated items, a transaction tag is generated and included in the encrypted item each time that item is updated. A list of all VDE item IDs and the current transaction tag for each item is maintained as part of the secure database 610.

Figure 24:
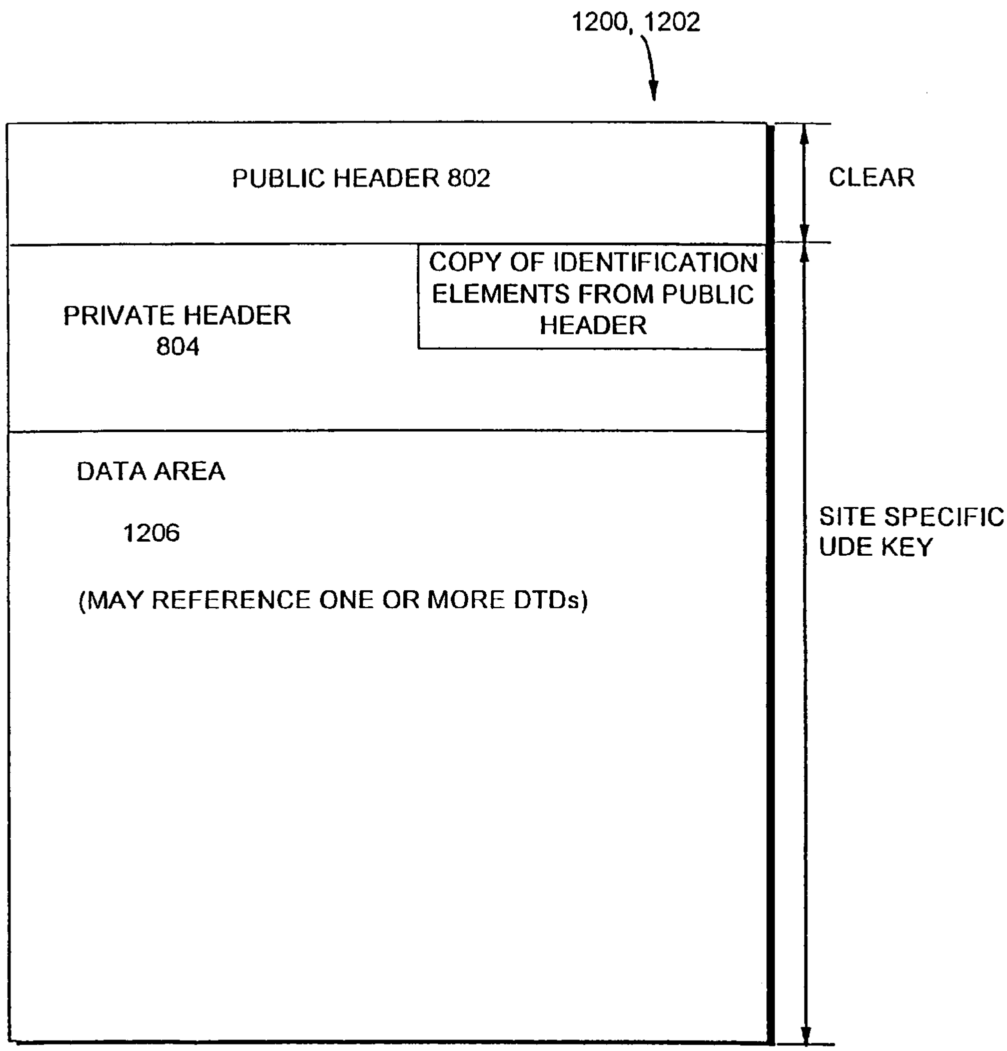
FIG. 24 shows an example of a User Data Element (UDE) and/or Method Data Element (MDE) structure.

FIG. 24 shows an example of a user data element ("UDE") 1200 provided by the preferred embodiment. As shown in FIG. 24, UDE 1200 in the preferred embodiment includes a public header 802, a private header 804, and a data area 1206. The layout for each of these user data elements 1200 is generally defined by an SGML data definition contained within a DTD 1108 associated with one or more load modules 1100 that operate on the UDE 1200.

UDEs 1200 are preferably encrypted using a site specific key once they are loaded into a site. This site-specific key masks a validation tag that may be derived from a cryptographically strong pseudo-random sequence by the SPE 503 and updated each time the record is written back to the secure database 610. This technique provides reasonable assurance that the UDE 1200 has not been tampered with nor substituted when it is requested by the system for the next use.

Meters and budgets are perhaps among the most common data structures in VDE 100. They are used to count and record events, and also to limit events. The data structures for each meter and budget are determined by the content provider or a distributor/redistributor authorized to change the information. Meters and budgets, however, generally have common information stored in a common header format (e.g., user ID, site ID and related identification information).

The content provider or distributor/redistributor may specify data structures for each meter and budget UDE. Although these data structures vary depending upon the particular application, some are more common than others. The following table lists some of the more commonly occurring data structures for METER and BUDGET methods:

| Field type | Format | Typical Use | Description or Use |
|---|---|---|---|
| Ascending Use Counter | byte, short, long, or unsigned versions of the same widths | Meter/Budget | Ascending count of uses. |
| Descending Use Counter | byte, short, long, or unsigned versions of the same widths | Budget | Descending count of permitted use; eg., remaining budget. |
| Counter/Limit | 2, 4 or 8 byte integer split into two related bytes or words | Meter/Budget | usage limits since a specific time; generally used in compound meter data structures. |
| Bitmap | Array bytes | Meter/Budget | Bit indicator of use or ownership. |
| Wide bitmap | Array of bytes | Meter/Budget | Indicator of use or ownership that may age was time. |
| Last Use Date | time_t | Meter/Budget | Date of last use. |
| Start Date | time_t | Budget | Date of first allowable use. |
| Expiration Date | time_t | Meter/Budget | Expiration Date. |
| Last Audit Date | time_t | Meter/Budget | Date of last audit. |
| Next Audit Date | time_t | Meter/Budget | Date of next required. |
| Auditor | VDE ID | Meter/Budget | VDE ID of authorized auditor. |

The information in the table above is not complete or comprehensive, but rather is intended to show some examples of types of information that may be stored in meter and budget related data structures. The actual structure of particular meters and budgets is determined by one or more DTDs 1108 associated with the load modules 1100 that create and manipulate the data structure. A list of data types permitted by the DTD interpreter 590 in VDE 100 is extensible by properly authorized parties.

Figure 25A:
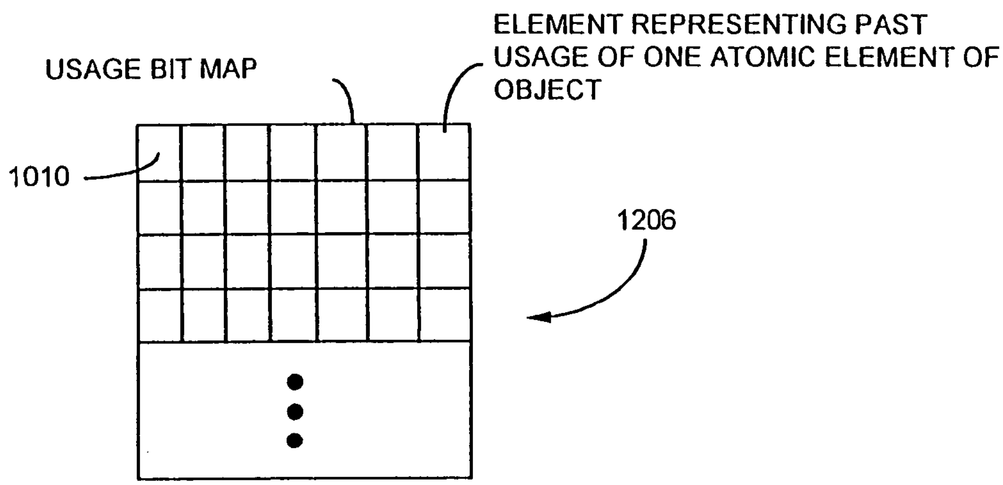
FIGS. 25A-25C show examples of "map meters"

FIG. 25 shows an example of one particularly advantageous kind of UDE 1200 data area 1206. This data area 1206 defines a "map" that may be used to record usage information. For example, a meter method 1000 may maintain one or more "usage map" data areas 1206. The usage map may be a "usage bit map" in the sense that it stores one or more bits of information (i.e., a single or multi-dimensional bit image) corresponding to each of several types or categories of usage. Usage maps are an efficient means for referencing prior usage. For example, a usage map data area may be used by a meter method 1000 to record all applicable portions of information content that the user has paid to use, thus supporting a very efficient and flexible means for allowing subsequent user usage of the same portions of the information content. This may enable certain VDE related security functions such as "contiguousness," "logical relatedness," randomization of usage, and other usage types. Usage maps may be analyzed for other usage patterns (e.g., quantity discounting, or for enabling a user to reaccess information content for which the user previously paid for unlimited usage).

The "usage map" concept provided by the preferred embodiment may be tied to the concept of "atomic elements." In the preferred embodiment, usage of an object 300 may be metered in terms of "atomic elements." In the preferred embodiment, an "atomic element" in the metering context defines a unit of usage that is "sufficiently significant" to be recorded in a meter. The definition of what constitutes an "atomic element" is determined by the creator of an object 300. For instance, a "byte" of information content contained in an object 300 could be defined as an "atomic element," or a record of a database could be defined as an "atomic element," or each chapter of an electronically published book could be defined as an "atomic element."

An object 300 can have multiple sets of overlapping atomic elements. For example, an access to any database m a plurality of databases may be defined as an "atomic element." Simultaneously, an access to any record, field of records, sectors of informations, and/or bytes contained in any of the plurality of databases might also be defined as an "atomic element." In an electronically published newspaper, each hundred words of an article could be defined as an "atomic element," while articles of more than a certain length could be defined as another set of "atomic elements." Some portions of a newspaper (e.g., advertisements, the classified section, etc.) might not be mapped into an atomic element.

The preferred embodiment provides an essentially unbounded ability for the object creator to define atomic element types. Such atomic element definitions may be very flexible to accommodate a wide variety of different content usage. Some examples of atomic element types supported by the preferred embodiment include bytes, records, files, sectors, objects, a quantity of bytes, contiguous or relatively contiguous bytes (or other predefined unit types), logically related bytes containing content that has some logical relationship by topic, location or other user specifiable logic of relationship, etc. Content creators preferably may flexibly define other types of atomic elements.

The preferred embodiment of the present invention provides EVENT methods to provide a mapping between usage events and atomic elements. Generally, there may be an EVENT method for each different set of atomic elements defined for an object 300. In many cases, an object 300 will have at least one type of atomic element for metering relating to billing, and at least one other atomic element type for non-billing related metering (e.g., used to, for example; detect fraud, bill advertisers, and/or collect data on end user usage activities).

In the preferred embodiment, each EVENT method in a usage related context performs two functions: (1) it maps an accessed event into a set of zero or more atomic elements, and (2) it provides information to one or more METER methods for metering object usage. The definition used to define this mapping between access events and atomic elements may be in the form of a mathematical definition, a table, a load module, etc. When an EVENT method maps an access request into "zero" atomic elements, a user accessed event is not mapped into any atomic element based on the particular atomic element definition that applies. This can be, for example, the object owner is not interested in metering usage based on such accesses (e.g., because the object owner deems such accesses to be insignificant from a metering standpoint).

A "usage map" may employ a "bit map image" for storage of usage history information in a highly efficient manner. Individual storage elements in a usage map may correspond to atomic elements. Different elements within a usage map may correspond to different atomic elements (e.g., one map element may correspond to number of bytes read, another map element may correspond to whether or not a particular chapter was opened, and yet another map element may correspond to some other usage event.)

One of the characteristics of a usage map provided by the preferred embodiment of the present invention is that the significance of a map element is specified, at least in part, by the position of the element within the usage map. Thus, in a usage map provided by the preferred embodiment, the information indicated or encoded by a map element is a function of its position (either physically or logically) within the map structure. As one simple example, a usage map for a twelve-chapter novel could consist of twelve elements, one for each chapter of the novel. When the user opens the first chapter, one or more bits within the element corresponding to the first chapter could be changed in value (e.g., set to "one"). In this simple example where the owner of the content object containing the novel was interested only in metering which chapters had been opened by the user, the usage map element corresponding to a chapter could be set to "one" the first time the user opened that corresponding chapter, and could remain "one" no matter how many additional times the user opened the chapter. The object owner or other interested VDE participant would be able to rapidly and efficiently tell which chapter(s) had been opened by the user simply by examining the compact usage map to determine which elements were set to "one."

Suppose that the content object owner wanted to know how many times the user had opened each chapter of the novel. In this case, the usage map might comprise, for a twelve-chapter novel, twelve elements each of which has a one-to-one correspondence with a different one of the twelve chapters of the novel. Each time a user opens a particular chapter, the corresponding METER method might increment the value contained in the corresponding usage map element. In this way, an account could be readily maintained for each of the chapters of the novel.

Figure 25B:
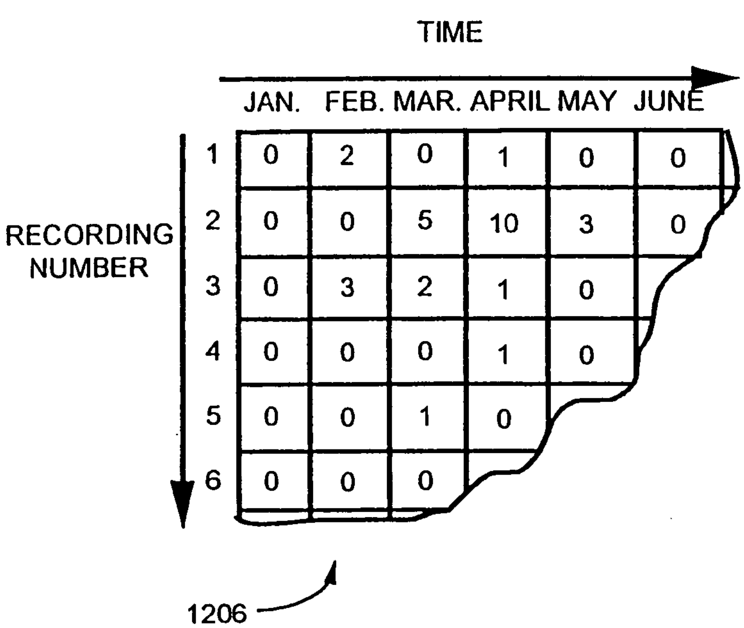

The position of elements within a usage map may encode a multi-variable function. For example, the elements within a usage map may be arranged in a two-dimensional array as shown in FIG. 25B. Different array coordinates could correspond to independent variables such as, for example, atomic elements and time. Suppose, as an example, that a content object owner distributes an object containing a collection of audio recordings. Assume further that the content object owner wants to track the number of times the user listens to each recording within the collection, and also wants to track usage based on month of the year. Thus, assume that the content object owner wishes to know how many times the user during the month of January listened to each of the recordings on a recording-by-recording basis, similarly wants to know this same information for the month of February, March, etc. In this case, the usage map (see FIG. 25B) might be defined as a two-dimensional array of elements. One dimension of the array might encode audio recording number. The other dimension of the array might encode month of the year. During the month of January, the corresponding METER method would increment elements in the array in the "January" column of the array, selecting which element to increment as a function of recording number. When January comes to an end, the METER method might cease writing into the array elements in the January column, and instead write values into a further set of. February array elements—once again selecting the particular array element in this column as a function of recording number. This concept may be extended to N dimensions encoding N different variables.

Usage map meters are thus an efficient means for referencing prior usage. They may be used to enable certain VDE related security functions such as testing for contiguousness (including relative contiguousness), logical relatedness (including relative logical relatedness), usage randomization, and other usage patterns. For example, the degree or character of the "randomness" of content usage by a user might serve as a potential indicator of attempts to circumvent VDE content budget limitations. A user or groups of users might employ multiple sessions to extract content in a manner which does not violate contiguousness, logical relatedness or quantity limitations, but which nevertheless enables reconstruction of a material portion or all of a given, valuable unit of content. Usage maps can be analyzed to determine other patterns of usage for pricing such as, for example, quantity discounting after usage of a certain quantity of any or certain atomic units, or for enabling a user to reaccess an object for which the user previously paid for unlimited accesses (or unlimited accesses over a certain time duration). Other useful analyses might include discounting for a given atomic unit for a plurality of uses.

A further example of a map meter includes storing a record of all applicable atomic elements that the user has paid to use (or alternatively, has been metered as having used, though payment may not yet have been required or made). Such a usage map would support a very efficient and flexible way to allow subsequent user usage of the same atomic elements.

A further usage map could be maintained to detect fraudulent usage of the same object. For example, the object might be stored in such a way that sequential access of long blocks should never occur. A METER method could then record all applicable atomic elements accesses during, for example, my specified increment of time, such as ten minutes, an hour, a day, a month, a year, or other time duration). The usage map could be analyzed at the end of the specified time increment to check for an excessively long contiguous set of accessed blocks, and/or could be analyzed at the initiation of each access to applicable atomic elements. After each time duration based analysis, if no fraudulent use is detected, the usage map could be cleared (or partially cleared) and the mapping process could begin in whole or in part anew. If a fraudulent use pattern is suspected or detected, that information might be recorded and the use of the object could be halted. For example, the user might be required to contact a content provider who might then further analyze the usage information to determine whether or not further access should be permitted.

Figure 25C:
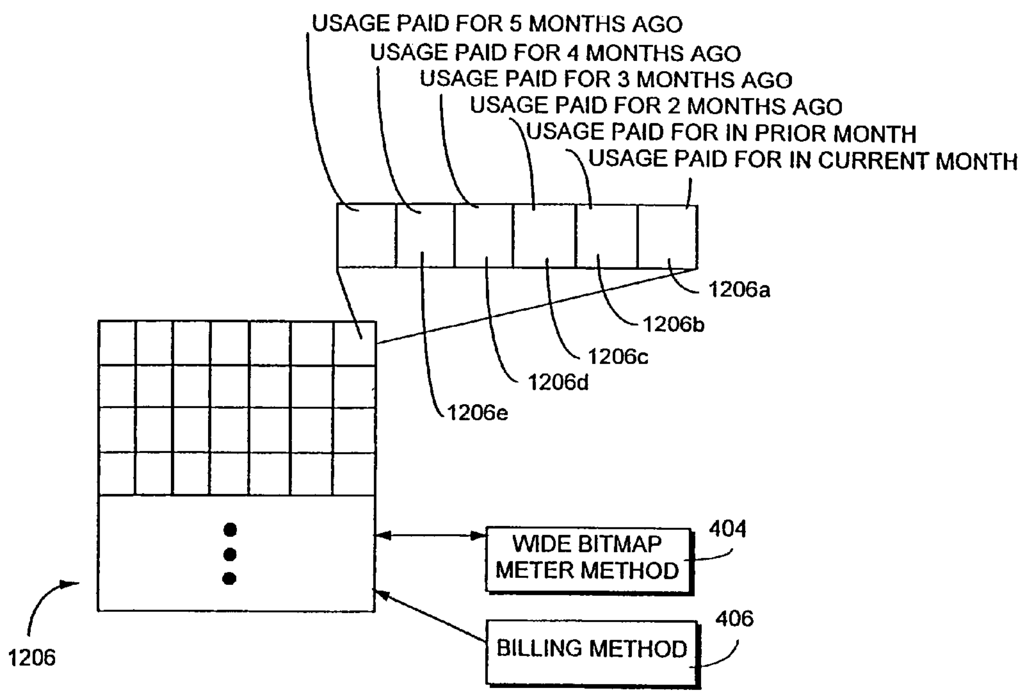

FIG. 25*c* shows a particular type of "wide bit map" usage record 1206 wherein each entry in the usage record corresponds to usage during a particular time period (e.g., current month usage, last month's usage, usage in the month before last, etc.). The usage record shown thus comprises an array of "flags" or fields 1206, each element in the array being used to indicate usage in a different time period in this particular example. When a time period ends, all elements 1206 in the array may be shifted one position, and thus usage information (or the purchase of user access rights) over a series of time periods can be reflected by a series of successive array elements. In the specific example shown in FIG. 25*c*, the entire wide array 1206 is shifted by one array position each month, with the oldest array element being deleted and the new array element being "turned" in a new array map corresponding to the current time period. In this example, record 1302 tracks usage access rights and/or other usage related activities during the present calendar month as well for the five immediately prior calendar months. Corresponding billing and/or billing method 406 may inspect the map, determine usage as related to billing and/or security monitoring for current usage based on a formula that employs the usage data stored in the record, and updates the wide record to indicate the applicable array elements for which usage occurred or the like. A wide bit map may also be used for many other purposes such as maintaining an element by element count of usage, or the contiguousness, relatedness, etc. function described above, or some combination of functionality.

Audit trail maps may be generated at any frequency determined by control, meter, budget and billing methods and load modules associated with those methods. Audit trails have a similar structure to meters and budgets and they may contain user specific information in addition to information about the usage event that caused them to be created. Like meters and budgets, audit trails have a dynamic format that is defined by the content provider or their authorized designee, and share the basic element types for meters and budgets shown in the table above. In addition to these types, the following table lists some examples of other significant data fields that may be found in audit trails.

| Field type | Format | Typical Use | Description of Use |
|---|---|---|---|
| Use Event ID | unsigned long | Meter/Budget/Billing | Event ID that started a processing sequence. |
| Internal Sequence Number | unsigned long | Meter/Budget/Billing | Transaction number to help detect audits that have been tampered with. |
| Atomic Element(s) & Object ID | Unsigned integer(s) of appropriate width | Meter/Billing | Atomic element(s) and ID of object that was used. |
| Personal User Information | Character or other information | Budget/Billing | Personal information about user. |
| Use Date/Time | time_t | Meter/Budget/Billing | Date/time of use. |
| Site ID/User ID | VDE ID | Meter/Budget/Billing | VDE ID of user. |

Audit trail records may be automatically combined into single records to conserve header space. The combination process may, for example, occur under control of a load module that creates individual audit trail records.

Permissions Record Overview

FIG. 16 also shows that PERCs 808 may be stored as part of secure database 610. Permissions records ("PERCs") 808 are at the highest level of the data driven control hierarchy provided by the preferred embodiment of VDE 100. Basically, there is at least one PERC 808 that corresponds to each information and/or transactional content distributed by VDE 100. Thus, at least one PERC 808 exists for each VDE object 300 in the preferred embodiment. Some objects may have multiple corresponding PERCs 808. PERC 808 controls how access and/or manipulation permissions are distributed and/or how content and/or other information may otherwise be used. PERC 808 also specifies the "rights" of each VDE participant in and to the content and/or other information.

In the preferred embodiment, no end user may use or access a VDE object unless a permissions record 808 has been delivered to the end user. As discussed above, a PERC 808 may be delivered as part of a traveling object 860 or it may be delivered separately (for example, within an administrative object). An electronic appliance 600 may not access an object unless a corresponding PERC 808 is present, and may only use the object and related information as permitted by the control structures contained within the PERC.

Briefly, the PERC 808 stores information concerning the methods, method options, decryption keys and rights with respect to a corresponding VDE object 300.

PERC 808 includes control structures that define high level categories or classifications of operations. These high level categories are referred to as "rights." The "right" control structures, in turn, provide internal control structures that reference "methods" 1000. The internal structure of preferred embodiment PERC 808 organizes the "methods" that are required to perform each allowable operation on an object or associated control structure (including operations performed on the PERC itself). For example, PERC 808 contains decryption keys or the object, and usage of the keys is controlled by the methods that are required by the PERC for performing operations associated with the exercise of a "right."

PERC 808 for an object is typically created when the object is created, and future substantive modifications of a PERC, if allowed, are controlled by methods associated with operations using the distribution right(s) defined by the same (or different) PERC.

FIG. 22 shows the internal structures present in an example of a PERC 808 provided by the preferred embodiment. All of the structures shown represent (or reference) collections of methods required to process a corresponding object in some specific way. PERCs 808 are organized as a hierarchical structure, and the basic elements of the hierarchy are as follows:

"rights" records 906
  "control sets" 914
    "required method" records 920 and
      "required method options" 924.

There are other elements that may be included in a PERC 808 hierarchy that describe rules and the rule options to support the negotiation of rule sets and control information for smart objects and for the protection of a user's personal information by a privacy filter. These alternate elements may include:

optional rights records
optional control sets
optional method records
permitted rights records
permitted rights control sets
permitted method records
required DTD descriptions
optional DTD descriptions
permitted DTD descriptions These alternate fields can control other processes that may, in part, base negotiations or decisions regarding their operation on the contents of these fields. Rights negotiation, smart object control information, and related processes can use these fields for more precise control of their operation.

Figure 26:
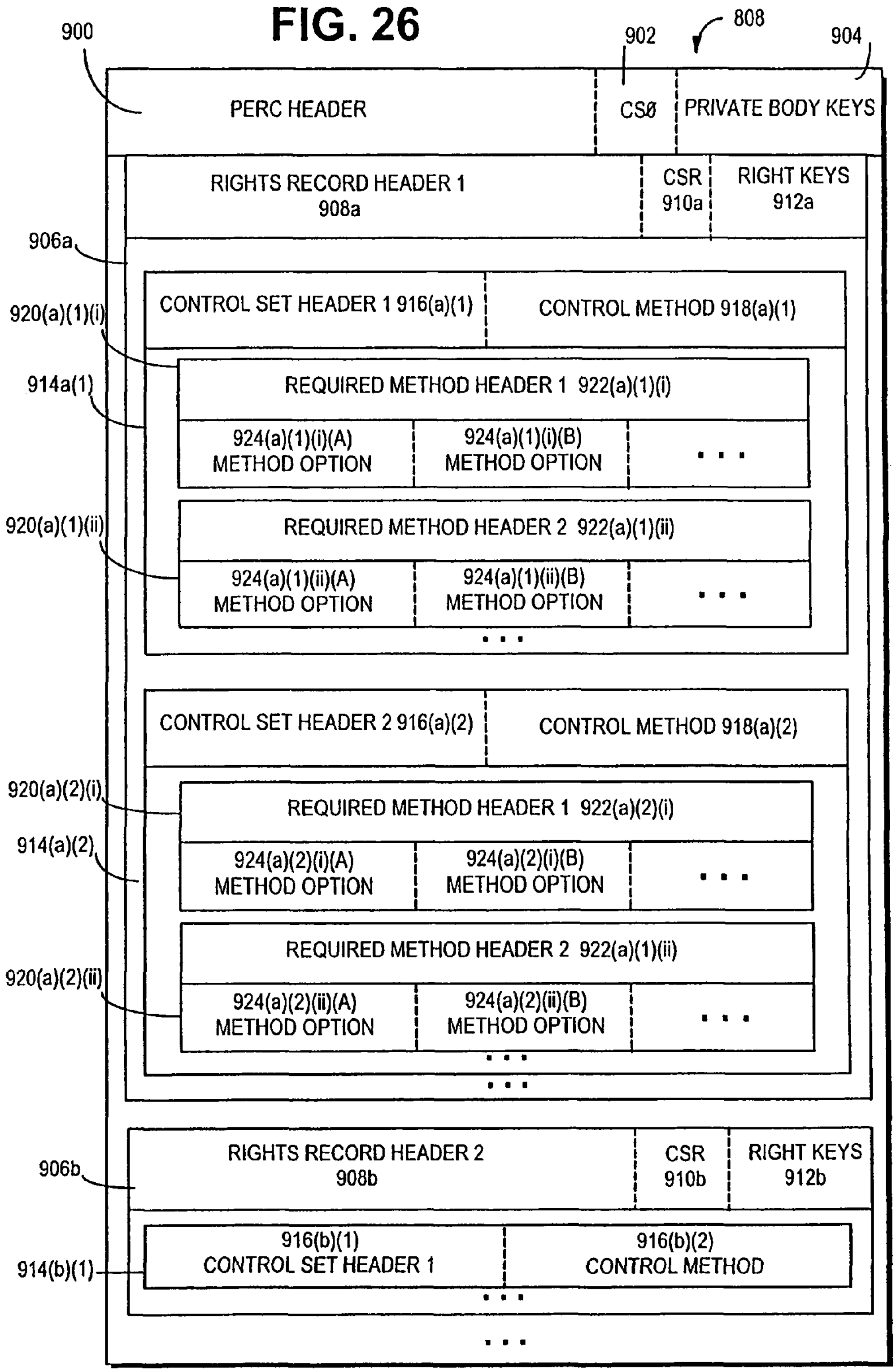
FIG. 26 shows an example of a permissions record (PERC) structure.

The PERC 808 shown in FIG. 26 includes a PERC header 900, a CSO ("control set 0") 902, private body keys 904, and one or more rights sub-records 906. Control set 0 902 in the preferred embodiment contains information that is common to one or more "rights" associated with an object 300. For example, a particular "event" method or methods might be the same for usage rights, extraction rights, and/or other rights. In that case, "control set 0" 902 may reference this event that is common across multiple "rights." The provision of "control set 0" 902 is actually an optimization, since it would be possible to store different instances of a commonly-used event within each of plural "rights" records' 906 of a PERC 808.

Each rights record 906 defines a different "right" corresponding to an object. A "right" record 906 is the highest level of organization present in PERC 808. There can be several different rights in a PERC 808. A "right" represents a major functional partitioning desired by a participant of the basic architecture of VDE 100. For example, the right to use an object and the right to distribute rights to use an object are major functional groupings within VDE 100. Some examples of possible rights include access to content, permission to distribute rights to access content, the ability to read and process audit trails related to content and/or control structures, the right to perform transactions that may or may not be related to content and/or related control structures (such as banking transactions, catalog purchases, the collection of taxes, EDI transactions, and such), and the ability to change some or all of the internal structure of PERCs created for distribution to other users. PERC 808 contains a rights record 906 for each type of right to object access/use the PERC grants.

Normally, for VDE end users, the most frequently granted right is a usage right. Other types of rights include the "extraction right," the "audit right" for accessing audit trail information, of end users, and a "distribution right" to distribute an object. Each of these different types of rights may be embodied in a different rights record 906 (or alternatively, different PERCs 808 corresponding to an object may be used to grant different rights).

Each rights record 906 includes a rights record header 908, a CSR ("control set for right") 910, one or more "right 'keys" 912, and one or more "control sets" 914. Each "rights" record 906 contains one or more control sets 914 that are either required or selectable options to control an object in the exercise of that "right." Thus, at the next level, inside of a "right" 906, are control sets 914. Control sets 914, in turn, each includes a control set header 916, a control method 918, and one or more required methods records 920. Required methods records 920, in turn, each includes a required method header 922 and one or more required method options 924.

Control sets 914 exist in two types in VDE 100: common required control sets which are given designations "control set 0" or "control set for right," and a set of control set options. "Control set 0" 902 contains a list of required methods that are common to all control set options, so that the common required methods do not have to be duplicated in each control set option. A "control set for right" ("CSR") 910 contains a similar list for control sets within a given right. "Control set 0" and any "control sets for rights" are thus, as mentioned above, optimizations; the same functionality for the control sets can be accomplished by listing all the common required methods in each control set option and omitting "control set 0" and any "control sets for rights."

One of the control set options, "control set 0" and the appropriate "control set for right" together form a complete control set necessary to exercise a right.

Each control set option contains a list of required methods 1000 and represents a different way the right may be exercised. Only one of the possible complete control sets 914 is used at any one time to exercise a right in the preferred embodiment.

Each control set 914 contains as many required methods records 920 as necessary to satisfy all of the requirements of the creators and/or distributors for the exercise of a right. Multiple ways a right may be exercised, or multiple control sets that govern how a given right is exercised, are both supported. As an example, a single control set 914 might require multiple meter and budget methods for reading the object's content, and also require different meter and budget methods for printing an object's content. Both reading and printing an object's content can be controlled in a single control set 914.

Alternatively, two different control set options could support reading an object's content by using one control set option to support metering and budgeting the number of bytes read, and the other control set option to support metering and budgeting the number of paragraphs read. One or the other of these options would be active at a time.

Typically, each control set 914 will reference a set of related methods, and thus different control sets can offer a different set of method options. For example, one control set 914 may represent one distinct kind of metering methodology, and another control set may represent another, entirely different distinct metering methodology.

At the next level inside a control set 914 are the required methods records 920. Methods records 920 contain or reference methods 1000 in the preferred embodiment. Methods 1000 are a collection of "events," references to load modules associated with these events, static data, and references to a secure database 610 for automatic retrieval of any other separately deliverable data elements that may be required for processing events (e.g., UDEs). A control set 914 contains a list of required methods that must be used to exercise a specific right (i.e., process events associated with a right). A required method record 920 listed in a control set 914 indicates that a method must exist to exercise the right that the control set supports. The required methods may reference "load modules" 1100 to be discussed below. Briefly, load modules 1100 are pieces of executable code that may be used to carry out required methods.

Each control set 914 may have a control method record 918 as one of its required methods. The referenced control method may define the relationships between some or all of the various methods 1000 defined by a control set 906. For example, a control method may indicate which required methods are functionally grouped together to process particular events, and the order for processing the required methods. Thus, a control method may specify that required method referenced by record 920(*a*)(1)(*i*) is the first to be called and then its output is to go to required method referenced by record 920 (*a*)(I)(ii) and so on. In this way, a meter method may be tied to one or more billing methods and then the billing methods may be individually tied to different budget methods, etc.

Required method records 920 specify one or more required method options 924. Required method options are the lowest level of control structure in a preferred embodiment PERC 808. By parameterizing the required methods and specifying the required method options 924 independently of the required methods, it becomes possible to reuse required methods in many different circumstances.

For example, a required method record 920 may indicate that an actual budget method ID must be chosen from the list of budget method IDs in the required method option list for that required method. Required method record 920 in this case does not contain any method IDs for information about the type of method required, it only indicates that a method is required. Required method option 924 contains the method ID of the method to be used if this required method option is selected. As a further optimization, an actual method ID may be stored if only one option exists for a specific required method. This allows the size of this data structure to be decreased.

PERC 808 also contains the fundamental decryption keys for an object 300, and any other keys used with "rights" (for encoding and/or decoding audit trails, for example). It may contain the keys for the object content or keys to decrypt portions of the object that contain other keys that then can be used to decrypt the content of the object. Usage of the keys is controlled by the control sets 914 in the same "right" 906 within PERC 808.

In more detail, FIG. 26 shows PERC 808 as including private body keys 904, and right keys 912. Private body keys 904 are used to decrypt information contained within a private body 806 of a corresponding VDE object 300. Such information may include, for example, methods 1000, load modules 1100 and/or UDEs 1200, for example. Right keys 912 are keys used to exercise a right in the preferred embodiment. Such right keys 912 may include, for example, decryption keys that enable a method specified by PERC 808 to decrypt content for release by a VDE node to an end user. These right keys 912 are, in the preferred embodiment, unique to an object 300. Their usage is preferably controlled by budgets in the preferred embodiment.

Detailed Example of a PERC 808

Figure 26A:
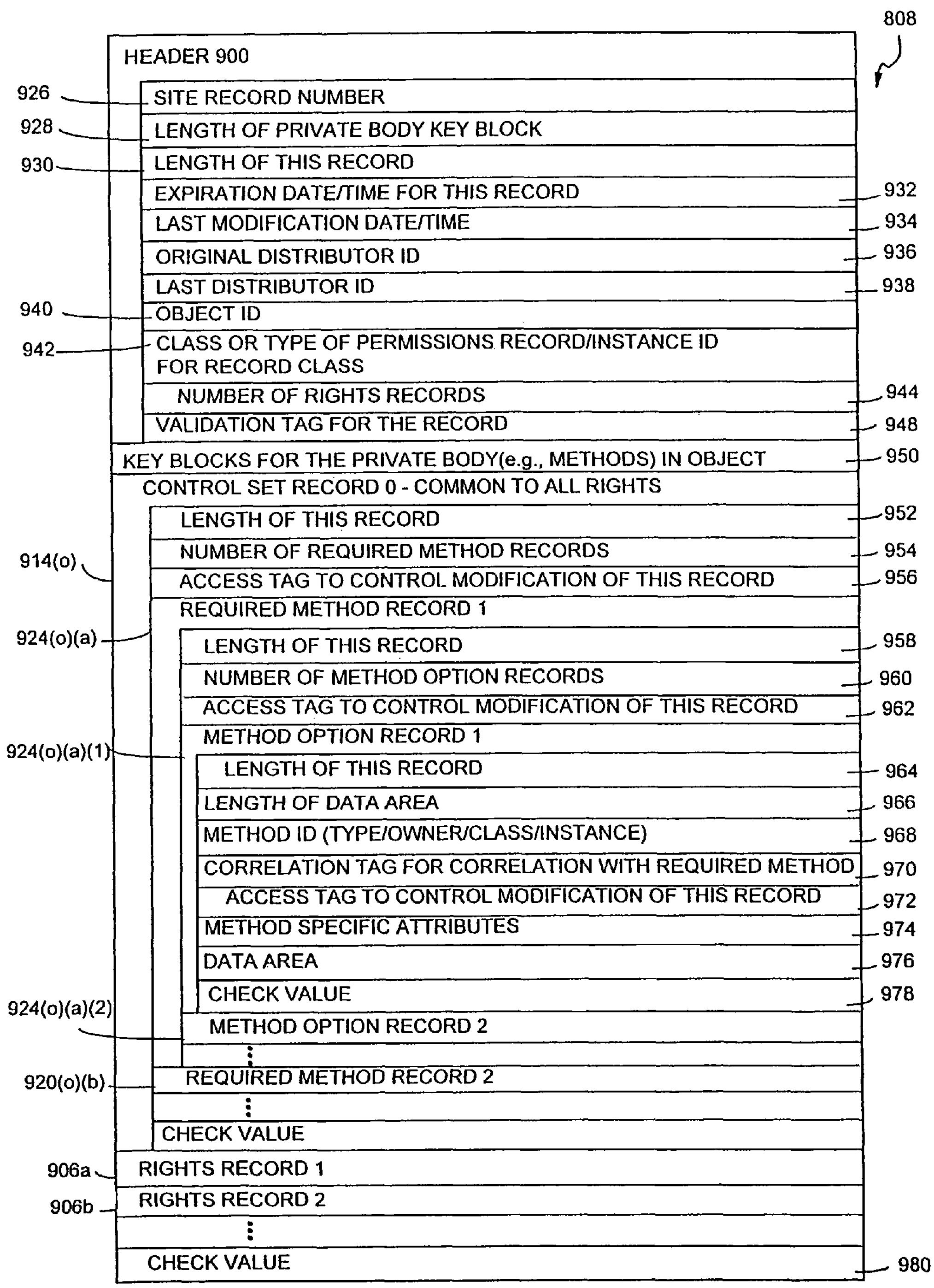
FIGS. 26A and 26B together show a more detailed example of a permissions record structure.
Figure 26B:
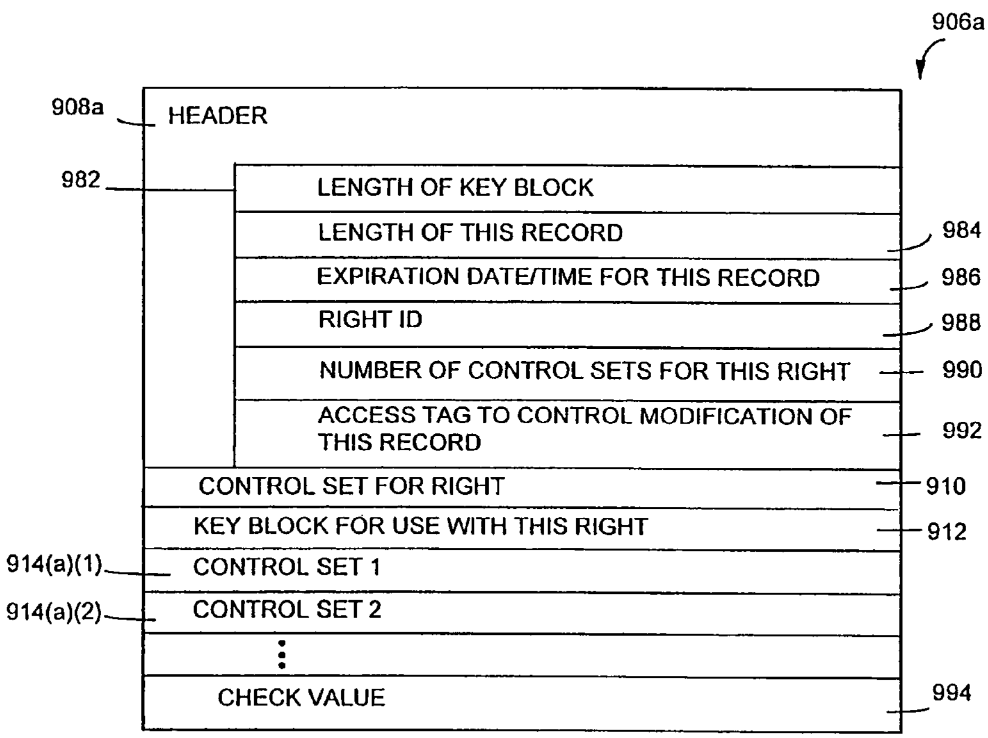

FIGS. 26A and 26B show one example of a preferred embodiment PERC 808. In this example, PERC header 900 includes:

- a site record number 926,
- a field 928 specifying the length of the private body key block,
- a field 930 specifying the length of the PERC,
- an expiration date/time field 932 specifying the expiration date and/or time for the PERC,
- a last modification date/time field 934 specifying the last date and/or time the PERC 808 was modified,
- the original distributor ID field 936 that specifies who originally distributed the PERC and/or corresponding object,
- a last distributor field 938 that specifies who was the last distributor of the PERC and/or the object,
- an object ID field 940 identifying the corresponding VDE object 300,
- a field 942 that specifies the class and/or type of PERC and/or the instance ID for the record class to differentiate the PERCs of the same type that may differ in their particulars,
- a field 944 specifying the number of "rights" sub-records 906 within the PERC, and
- a validation tag 948.

The PERC 808 shown in FIGS. 26*a*, 26*b* also has private both keys stored in a private body key block 950.

This PERC 808 includes a control set 0 sub-record 914 (0) that may be used commonly by all of rights 906 within the PERC. This control set 0 record 914(0) may include the following fields:

- a length field 952 specifying the length of the control set 0 record
- a field 954 specifying the number of required method records 920 within the control set
- an access tag field 956 specifying an access tag to control modification of the record and
- one or more required method records 920.

Each required method record 920, in turn may include:

- a length field 958 specifying the length of the required method record
- a field 960 specifying the number of method option records within the required method record 920
- an access tag field 962 specifying an access tag to control modification of the record and
- one or more method option records 924.

Each method option sub-record 924 may include:

- a length field 964 specifying the length of the method option record
- a length field 966 specifying the length of the data area (if any) corresponding to the method option record
- a method ID field 968 specifying a method ID (e.g., type/owner/class/instance)
- a correlation tag field 970 specifying a correlation tag for correlating with the method specified in field 968
- an access tag field 972 specifying an access tag to control modification of this record
- a method specific attributes field 974
- a data area 976 and
- a check value field 978 for validation purposes In this example of PERC 808 also includes one or more rights records 906, and an overall check value field 980. FIG. 23*b* is an example of one of right records 906 shown in FIG. 16*a*. In this particular example, rights record 906*a* includes a rights record header 908 comprising:

- a length field 982 specifying the length of the rights key block 912
- a length field 984 specifying the length of the rights record 908
- an expiration date/time field 986 specifying the expiration date and/or time for the rights record
- a right ID field 988 identifying a right
- a number field 990 specifying the number of control sets 914 within the rights record 906, and
- an access tag field 992 specifying an access tag to control modification of the right record.

This example of rights record 906 includes:

- a control set for this right (CSR) 910
- a rights key block 912
- one or more control sets 914, and
- a check value field 994.

Object Registry

Referring once again to FIG. 16, secure database 610 provides data structures that support a "lookup" mechanism for "registered" objects. This "lookup" mechanism permits electronic appliance 600 to associate, in a secure way, VDE objects 300 with PERCs 808, methods 1000 and load modules 1100. In the preferred embodiment, this lookup mechanism is based in part on data structures contained within object registry 450.

In one embodiment, object registry 450 includes the following tables:

- an object registration table 460;
- a subject table 462;
- a User Rights Table ("URT") 464;
- an Administrative Event Log 442;
- a shipping table 444; and
- a receiving table 446.

Object registry 460 in the example embodiment is a database of information concerning registered VDE objects 300 and the rights of users and user groups with regard to those objects. When electronic appliance 600 receives an object 300 containing a new budget or load module 1100, the electronic appliance usually needs to add the information contained by the object to secure database 610. Moreover, when any new VDE object 300 arrives at an electronic appliance 600, the electronic appliance must "register" the object within object registry 450 so that it can be accessed. The lists and records for a new object 300 are built in the preferred embodiment when the object is "registered" by the electronic appliance 600. The information for the object may be obtained from the object's encrypted private header, object body, and encrypted name services record. This information may be extracted or derived from the object 300 by SPE 503, and, then stored within secure database 610 as encrypted records.

In one embodiment, object registration table 460 includes information identifying objects within object storage (repository) 728. These VDE objects 300 stored within object storage 728 are not, in the example embodiment, necessarily part of secure database 610 since the objects typically incorporate their own security (as necessary and required) and are maintained using different mechanisms than the ones used to maintain the secure database. Even though VDE objects 300 may not strictly be part of secure database 610, object registry 450 (and in particular, object registration table 460) refers to the objects and thus "incorporates them by reference" into the secure database. In the preferred embodiment, an electronic appliance 600 may be disabled from using any VDE object 300 that has not been appropriately registered with a corresponding registration record stored within object registration table 460.

Subject table 462 in the example embodiment establishes correspondence between objects referred to by object registration table 460 and users (or groups of users) of electronic appliance 600. Subject table 462 provides many of the attributes of an access control list ("ACL"), as will be explained, below.

User rights table 464 in the example embodiment provides permissioning and other information specific to particular users or groups of users and object combinations set forth in subject table 462. In the example embodiment, permissions records 808 (also shown in FIG. 16 and being stored within secure database 610) may provide a universe of permissioning for a particular object-user combination. Records within user rights table 464 may specify a sub-set of this permissioning universe based on, for example, choices made by users during interaction at time of object registration.

Administrative event log 442, shipping table 444, and receiving table 446 provide information about receipts and deliveries of VDE objects 300. These data structures keep track of administrative objects sent or received by electronic appliance 600 including, for example, the purpose and actions of the administrative objects in summary and detailed form. Briefly, shipping table 444 includes a shipping record for each administrative object sent (or scheduled to be sent) by electronic appliance, 600 to another VDE participant. Receiving table 446 in the preferred embodiment includes a receiving record for each administrative object received (or scheduled to be received) by electronic appliance 600. Administrative event log 442 includes an event log record for each shipped and each received administrative object, and may include details concerning each distinct event specified by received administrative objects.

Administrative Object Shipping and Receiving

Figure 27:
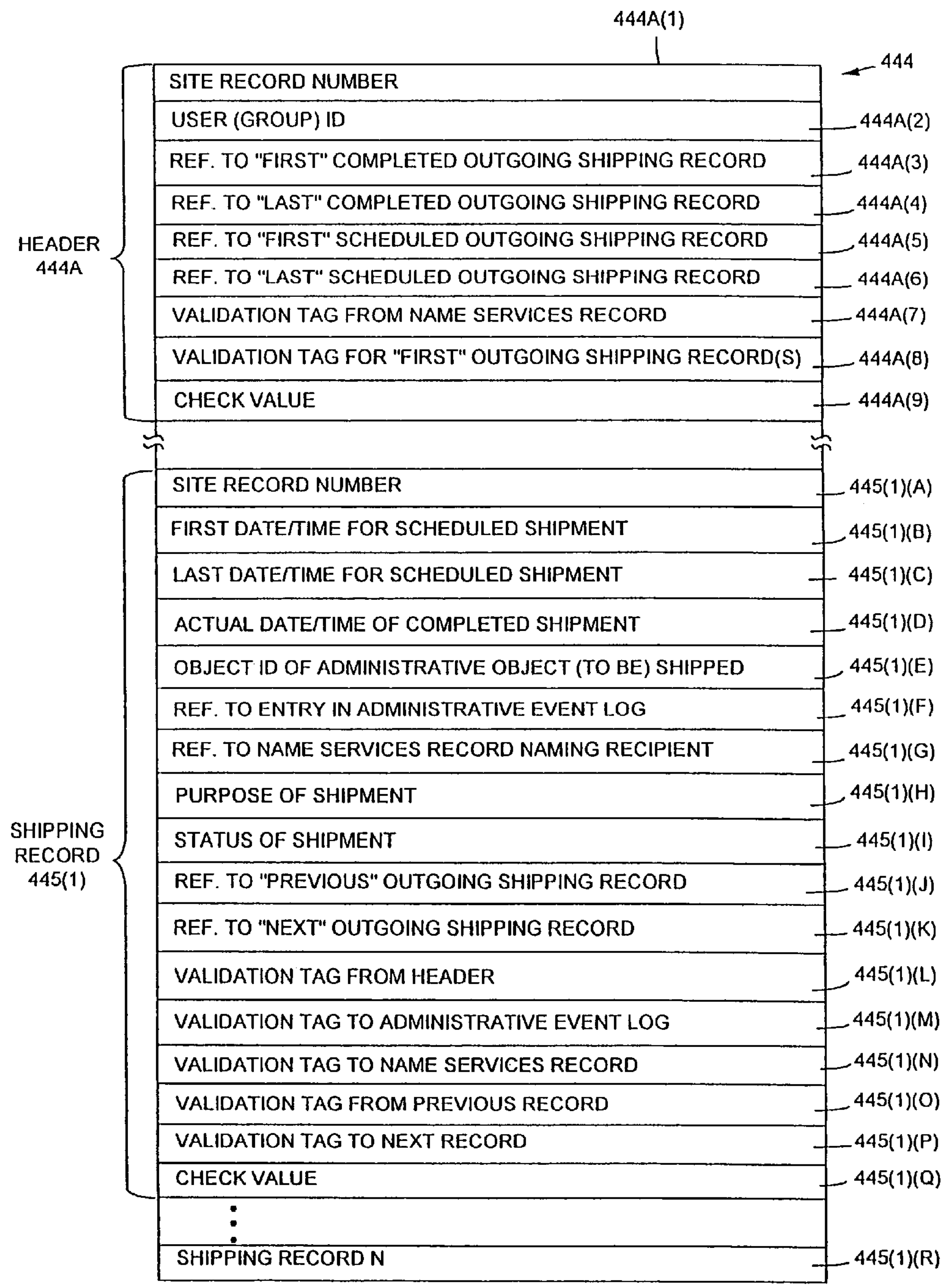
FIG. 27 shows an example of a shipping table structure.

FIG. 27 is an example of a detailed format for a shipping table 444. In the preferred embodiment shipping table 444 includes a header 444A and any number of shipping records 445. Header 444A includes information used to maintain shipping table 444. Each shipping record 445 within shipping table 444 provides details concerning a shipping event (i.e., either a completed shipment of an administrative object to another VDE participant, or a scheduled shipment of an administrative object).

In the example embodiment of the secure database 610, shipping table header 444A may include a site record number 444A(1), a user (or group) ID 444A(2), a series of reference fields 444A(3)-444A(6), validation tags 444A(7)-444A(8), and a check value field 444A(9). The fields 444A(3)-444A(6) reference certain recent IDs that designate lists of shipping records 445 within shipping table 444. For example, field 444A(3) may reference to a "first" shipping record representing a completed outgoing shipment of an administrative object, and field 444A(4) may reference to a "last" shipping record representing a completed outgoing shipment of an administrative object. In this example, "first" and "last" may, if desired, refer to time or order of shipment as one example. Similarly, fields 444A(5) and 444A(6) may reference to "first" and "last" shipping records for scheduled outgoing shipments. Validation tag 444A(7) may provide validation from a name services record within name services record table 452 associated with the user (group) ID in the header. This permits access from the shipping record back to the name services record that describes the sender of the object described by the shipping records. Validation tag 444A(8) provides validation for a "first" outgoing shipping record referenced by one or more of pointers 444A(3)-444A(6). Other validation tags may be provided for validation of scheduled shipping record(s).

Shipping record 444(1) shown includes a site record number 445(1)(A). It also includes first and last scheduled shipment date/times 445(1)(B), 445(1)(C) providing a window of time used for scheduling administrative object shipments. Field 445(1)(D) may specify an actual date/time of a completed shipment of an administrative object. Field 445(1)(E) provides an ID of an administrative object shipped or to be shipped, and thus identifies which administrative object within object storage 728 pertains to this particular shipping record. A reference field 445(1)(G) references a name services record within name services record table 452 specifying the actual or intended recipient of the administrative object shipped or to be shipped; This information within name services record table 452 may, for example, provide routing information sufficient to permit outgoing administrative objects manager 754 shown in FIG. 12 to inform object switch 734 to ship the administrative object to the intended recipient. A field 445(1)(H) may specify (e.g., using a series of bit flags) the purpose of the administrative object shipment, and a field 445(1)(I) may specify the status of the shipment. Reference fields 445(1)(J), 445(1)(K) may reference "previous" and "next" shipping records 445 in a linked list (in the preferred embodiment, there may be two linked lists, one for completed shipping records and the other for scheduled shipping records). Fields 445(1)(L)-445(1)(P) may provide validation tags respectively from header 444A, to a record within administrative event log 442 pointed to by pointer 445(1)(F); to the name services record referenced by field 445(1)(G); from the previous record referenced by 445(1)(J); and to the next record referenced by field 445(1)(K). A check value field 445(1)(Q) may be used for validating shipping record 445.

Figure 28:
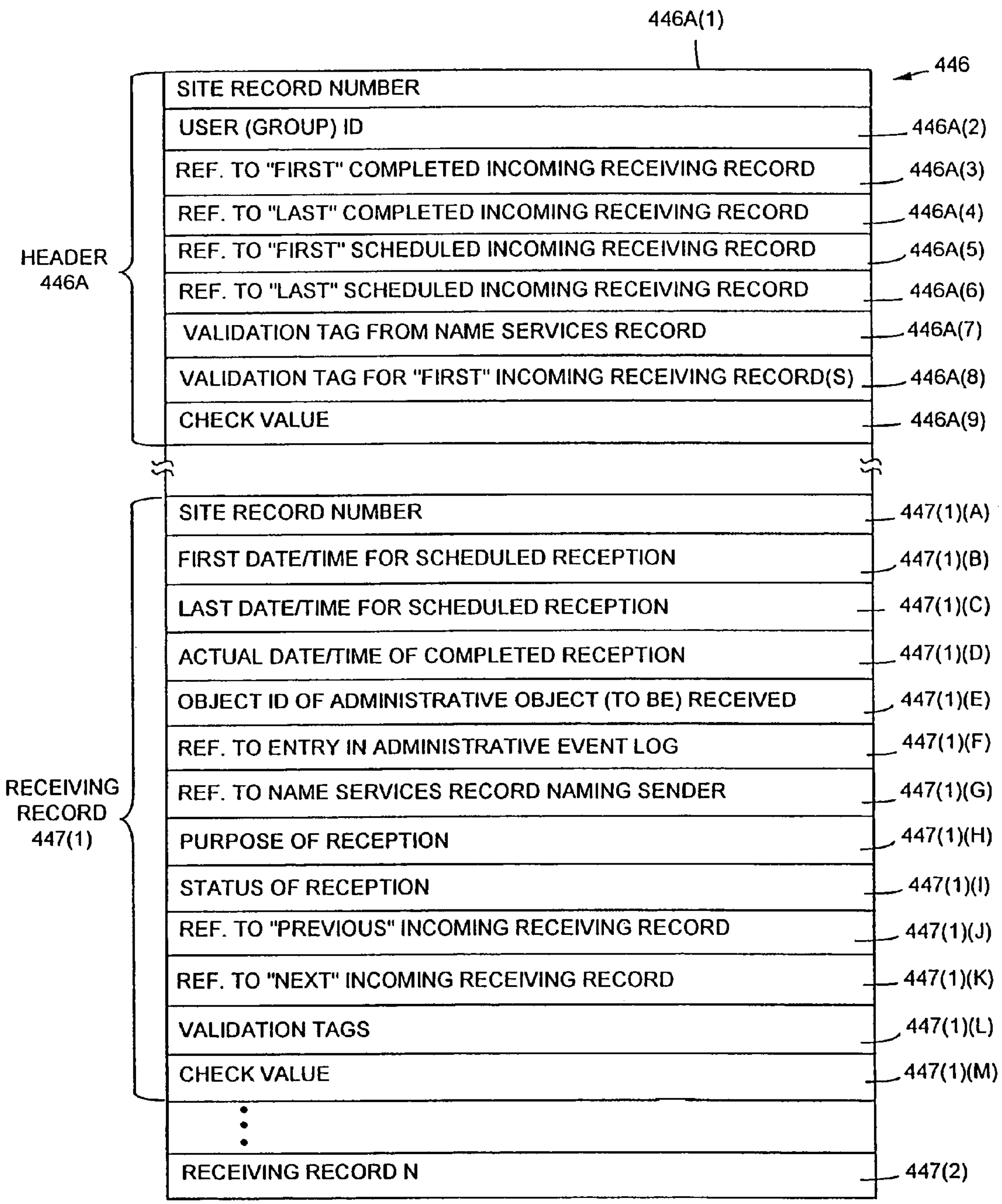
FIG. 28 shows an example of a receiving table structure.

FIG. 28 shows an example of one possible detailed format for a receiving table 446. In one embodiment, receiving table 446 has a structure that is similar to the structure of the shipping table 444 shown in FIG. 27. Thus, for example, receiving table 446 may include a header 446*a* and a plurality of receiving records 447, each receiving record including details about a particular reception or scheduled reception of an administrative object. Receiving table 446 may include two linked lists, one for completed receptions and another for schedule receptions. Receiving table records 447 may each reference an entry within name services record table 452 specifying an administrative object sender, and may each point to an entry within administrative event log 442. Receiving records 447 may also include additional details about scheduled and/or completed reception (e.g., scheduled or actual date/time of reception, purpose of reception and status of reception), and they may each include validation tags for validating references to other secure database records.

Figure 29:
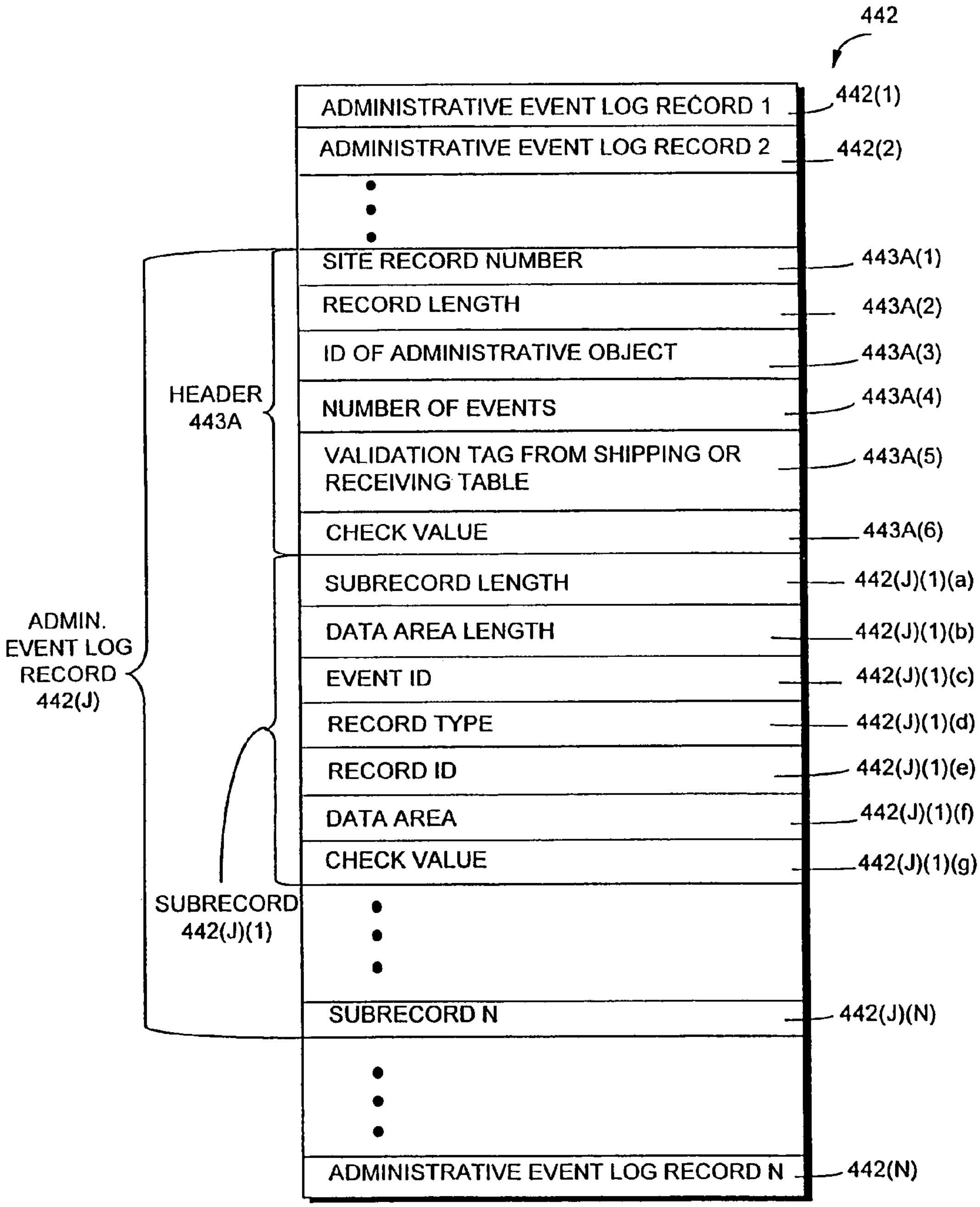
FIG. 29 shows an example of an administrative event log structure.

FIG. 29 shows an example of a detailed format for an administrative event log 442. In the preferred embodiment, administrative event log 442 includes an event log record 442(1) . . . 442(N) for each shipped administrative object and for each received administrative object. Each administrative event log record may include a header 443*a* and from 1 to N sub-records 442(J)(1) . . . 442(J)(N). In the preferred embodiment, header 443*a* may include a site record number field 443A(1), a record length field 443A(2), an administrative object ID field 443A(3), a field 443A(4) specifying a number of events, a validation tag 443A(5) from shipping table 444 or receiving table 446, and a check sum field 443A(6). The number of events specified in field 443A(4) corresponds to the number of sub-records 442(J)(1) . . . 442(J)(N) within the administrative event log record 442(J). Each of these sub-records specifies information about a particular "event" affected or corresponding to the administrative object specified within field 443(A)(3). Administrative events are retained in the administrative event log 442 to permit the reconstruction (and preparation for construction or processing) of the administrative objects that have been sent from or received by the system. This permits lost administrative objects to be reconstructed at a later time.

Each sub-record may include a sub-record length field 442(J)(1)(*a*), a data area length field 442(J)(1)(*b*), an event ID field 442(J)(1)(*c*), a record type field 442(J)(1)(*d*), a record ID field 442(J)(1)(*e*), a data area field 442(J)(1)(*f*), and a check value field 442(J)(1)(*g*). The data area 442(J)(1)(*f*) may be used to indicate which information within secure database 610 is affected by the event specified in the event ID field 442(J)(1)(*c*), or what new secure database item(s) were added, and may also specify the outcome of the event.

The object registration table 460 in the preferred embodiment includes a record corresponding to each VDE object 300 within object storage (repository) 728. When a new object arrives or is detected (e.g., by redirector 684), a preferred embodiment electronic appliance 600 "registers" the object by creating an appropriate object registration record and storing it in the object registration table 460. In the preferred embodiment, the object registration table stores information that is user independent, and depends only on the objects that are registered at a given VDE electronic appliance 600. Registration activities are typically managed by a REGISTER method associated with an object.

In the example, subject table 462 associates users (or groups of users) with registered objects. The example subject table 462 performs the function of an access control list by specifying which users are authorized to access which registered VDE objects 300.

As described above, secure database 610 stores at least one PERC 808 corresponding to each registered VDE object 300. PERCS 808 specify a set of rights that may be exercised to use or access the corresponding VDE object 300. The preferred embodiment allows user to "customize" their access rights by selecting a subset of rights authorized by a corresponding PERC 808 and/or by specifying parameters or choices that correspond to some or all of the rights granted by PERC 808. These user choices are set forth in a user rights table 464 in the preferred embodiment. User rights table (URT) 464 includes URT records, each of which corresponds to a user (or group of users). Each of these URT records specifies user choices for a corresponding VDE object 300. These user choices may, either independently or in combination with a PERC 808, reference one or more methods 1000 for exercising the rights granted to the user by the PERC 808 in a way specified by the choices contained within the URT record.

Figure 30:
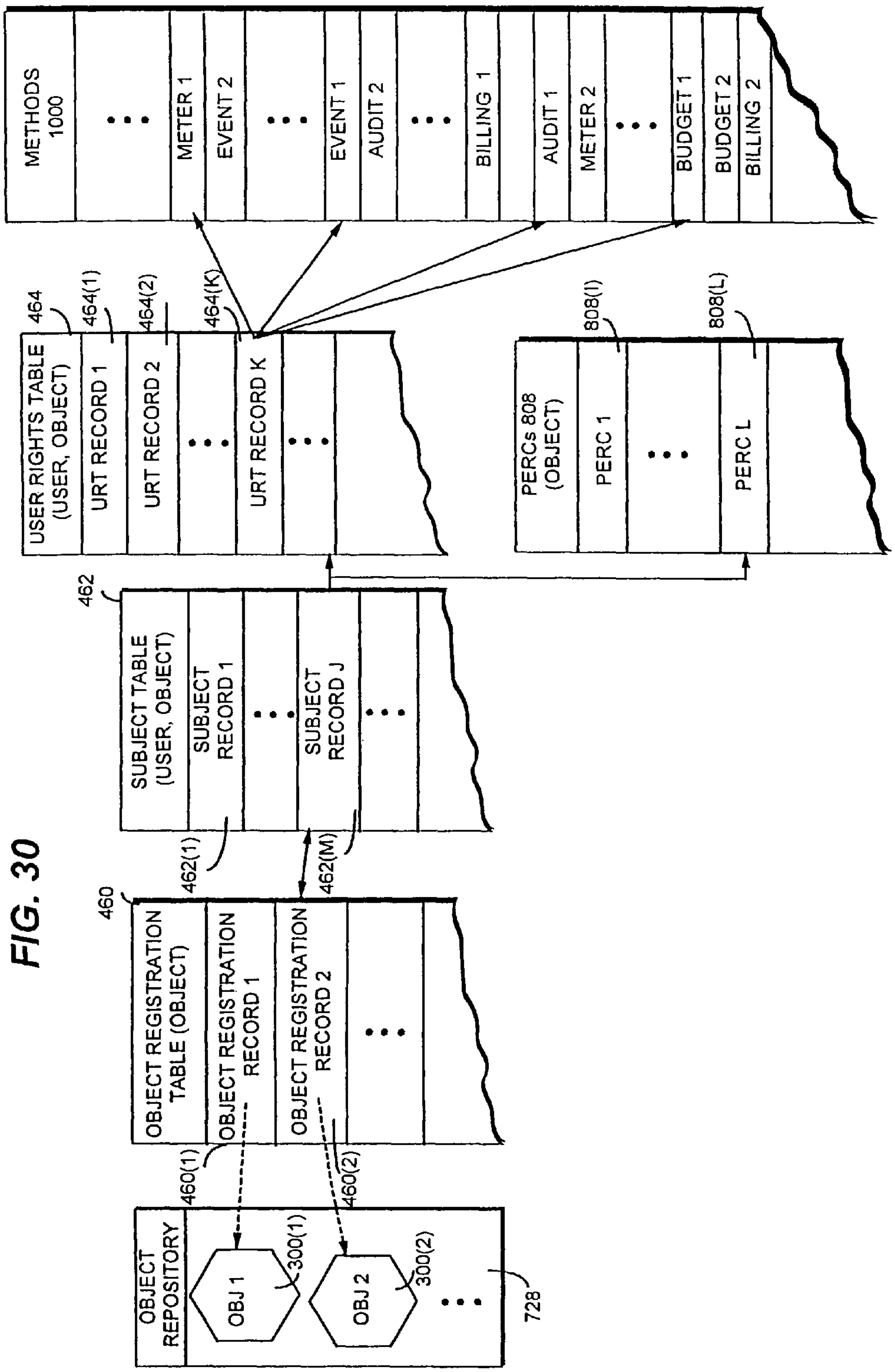
FIG. 30 shows an example inter-relationship between and use of the object registration table, subject table and user rights table shown in the FIG. 16 secure database.
Figure 31:
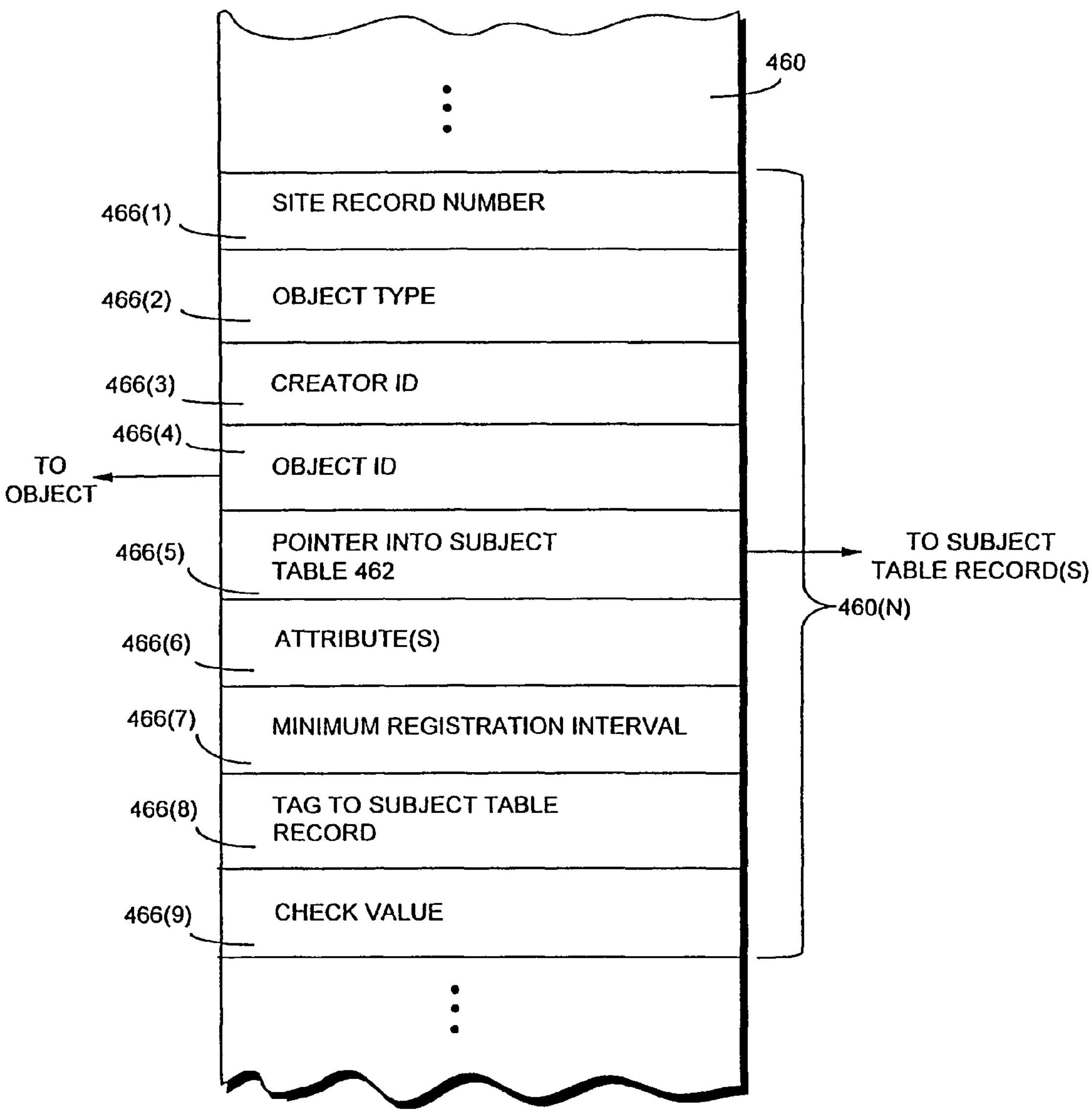
FIG. 31 is a more detailed example of an object registration table shown in FIG. 16.

FIG. 30 shows an example of how these various tables may interact with one another to provide a secure database lookup mechanism. FIG. 30 shows object registration table 460 as having a plurality of object registration records 460(1), 460 (2), . . . These records correspond to VDE objects 300(1), 300(2), . . . stored within object repository 728. FIG. 31 shows an example format for an object registration record 460 provided by the preferred embodiment. Object registration record 460(N) may include the following fields:

- site record number field 466(1)
- object type field 466(2)
- creator ID field 466(3)
- object ID field 466(4)
- a reference field 466(5) that references subject table 462
- an attribute field 466(6)
- a minimum registration interval field 466(7)
- a tag 466(8) to a subject table record, and
- a check value field 466(9).

The site record number field 466(1) specifies the site record number for this object registration record 460(N). In one embodiment of secure database 610, each record stored within the secure database is identified by a site record number. This site record number may be used as part of a database lookup process in order to keep track of all of the cords with in the secure database 610.

Object type field 466(2) may specify the type of registered VDE object 300 (e.g., a content object, an administrative object, etc.).

Creator ID field 466(3) in the example may identify the creator of the corresponding VDE object 300.

Object ID field 466(4) in the example uniquely identifies the registered VDE object 300.

Reference field 466(5) in the preferred embodiment identifies a record within the subject table 462. Through use of this reference, electronic appliance 600 may determine all users (or user groups) listed in subject table 462 authorized to access the corresponding VDE object 300. Tag 466(8) is used to validate that the subject table records accessed using field 466(5) is the proper record to be used with the object registration record 460(N).

Attribute field 466(6) may store one or more attributes or attribute flags corresponding to VDE object 300.

Minimum registration interval field 466(7) may specify how often the end user may re-register as a user of the VDE object 300 with a clearinghouse service, VDE administrator, or VDE provider. One reason to prevent frequent re-registration is to foreclose users from reusing budget quantities in traveling objects until a specified amount of time has elapsed. The minimum registration interval field 466(7) maybe left unused when the object owner does not wish to restrict re-registration.

Check value field 466(9) contains validation information used for detecting corruption or modification of record 460 (N) to ensure security and integrity of the record. In the preferred embodiment, many or all of the fields within record 460(N) (as with other records within the secure database 610) may be fully or partially encrypted and/or contain fields that are stored redundantly in each record (once in unencrypted form and once in encrypted form). Encrypted and unencrypted versions of the same fields may be cross checked at various times to detect corruption or modification of the records.

Figure 32:
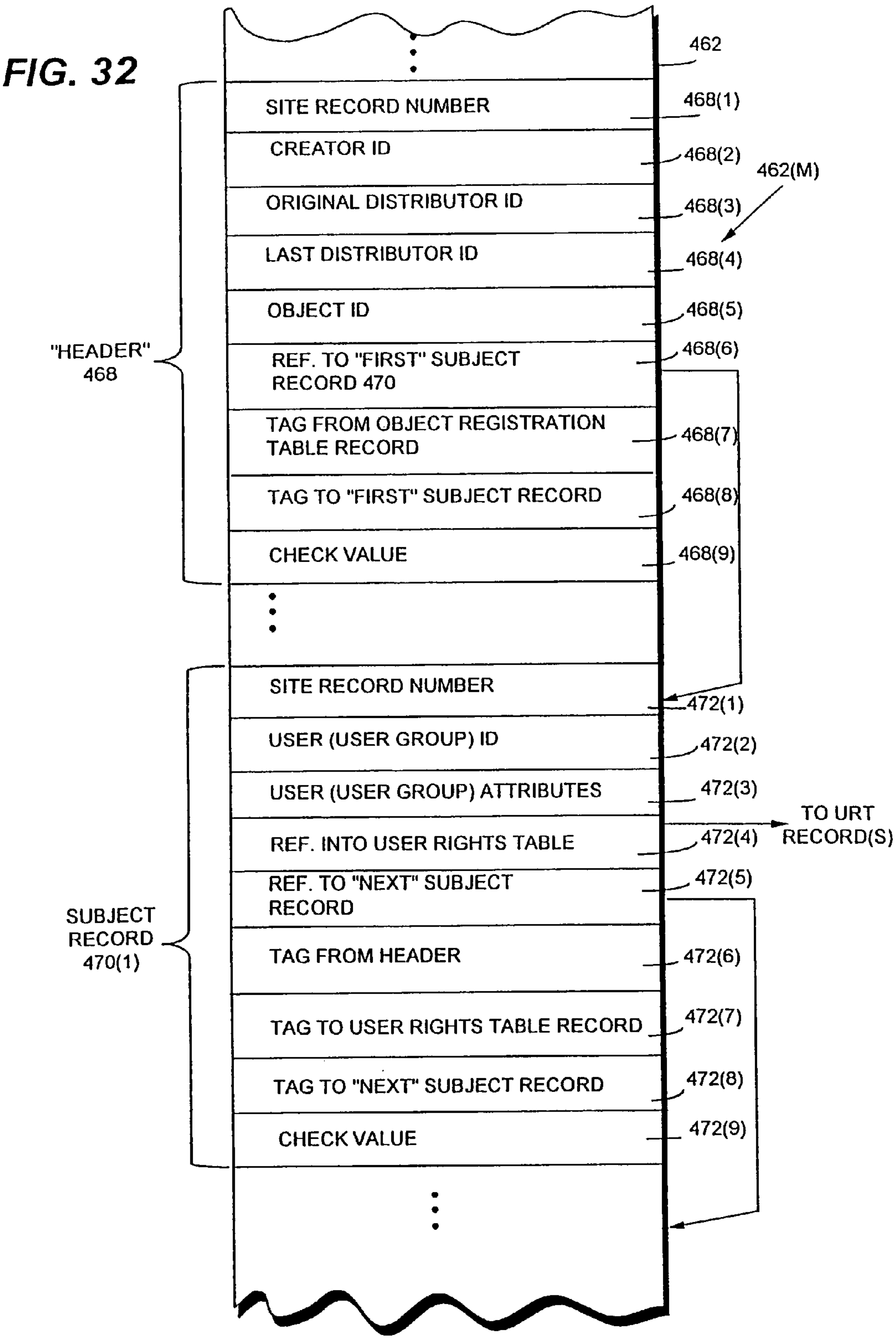
FIG. 32 is a more detailed example of subject table shown in FIG. 16.

As mentioned above, reference field 466(5) references subject table 462, and in particular, references one or more user/object records 460(M) within the subject table. FIG. 32 shows an example of a format for a user/object record 462(M) provided by the example. Record 462(M) may include a header 468 and a subject record portion 470. Header 468 may include a field 468(6) referencing a "first" subject record 470 contained within the subject registration table 462. This "first" subject record 470(1) may, in turn, include a reference field 470(5) that references a "next" subject record 470(2) within the subject registration table 462, and so on. This "linked list" structure permits a single object registration record 460(N) to reference to from one to N subject records 470.

Subject registration table header 468 in the example includes a site record number field 468(1) that may uniquely identify the header as a record within secure database 610. Header 468 may also include a creator ID field 468(2) that may be a copy of the content of the object registration table creator ID field 466(3). Similarly, subject registration table header 468 may include an object ID field 468(5) that may be a copy of object ID field 466(4) within object registration table 460. These fields 468(2), 468(5) make user/object registration records explicitly correspond to particular VDE objects 300.

Header 468 may also include a tag 468(7) that permits validation. In one example arrangement, the tag 468(7) within the user/object registration header 468 may be the same as the tag 466(8) within the object registration record 460(N) that points to the user/object registration header. Correspondence between these tags 468(7) and 466(8) permits validation that the object registration record and user/object registration header match up.

User/object header 468 also includes an original distributor ID field 468(3) indicating the original distributor of the corresponding VDE object 300, and the last distributor ID field 468(4) that indicates the last distributor within the chain of handling of the object prior to its receipt by electronic appliance 600.

Header 468 also includes a tag 468(8) allowing validation between the header and the "first" subject record 470(1) which field 468(6) references.

Subject record 470(1) includes a site record number 472 (1), a user (or user group) ID field 472(2), a user (or user group) attributes field 472(3), a field 472(4) referencing user rights table 464, a field 472(5) that references to the "next" subject record 470(2) (if there is one), a tag 472(6) used to validate with the header tag 468(8), a tag 472(7) used to validate with a corresponding tag in the user rights table record referenced by field 472(4), a tag 472(9) used to validate with a tag in the "next" subject record referenced to by field 472(5) and a check value field 472(9).

User or user group ID 472(2) identifies a user or a user group authorized to use the object identified in field 468(5).

Thus, the fields 468(5) and 472(2) together form the heart of the access control list provided by subject table 462. User attributes field 472(3) may specify attributes pertaining to use/access to object 300 by the user or user group specified in fields 472(2). Any number of different users or user groups may be added to the access control list (each with a different set of attributes 472(3)) by providing additional subject records 470 in the "linked list" structure.

Figure 33:
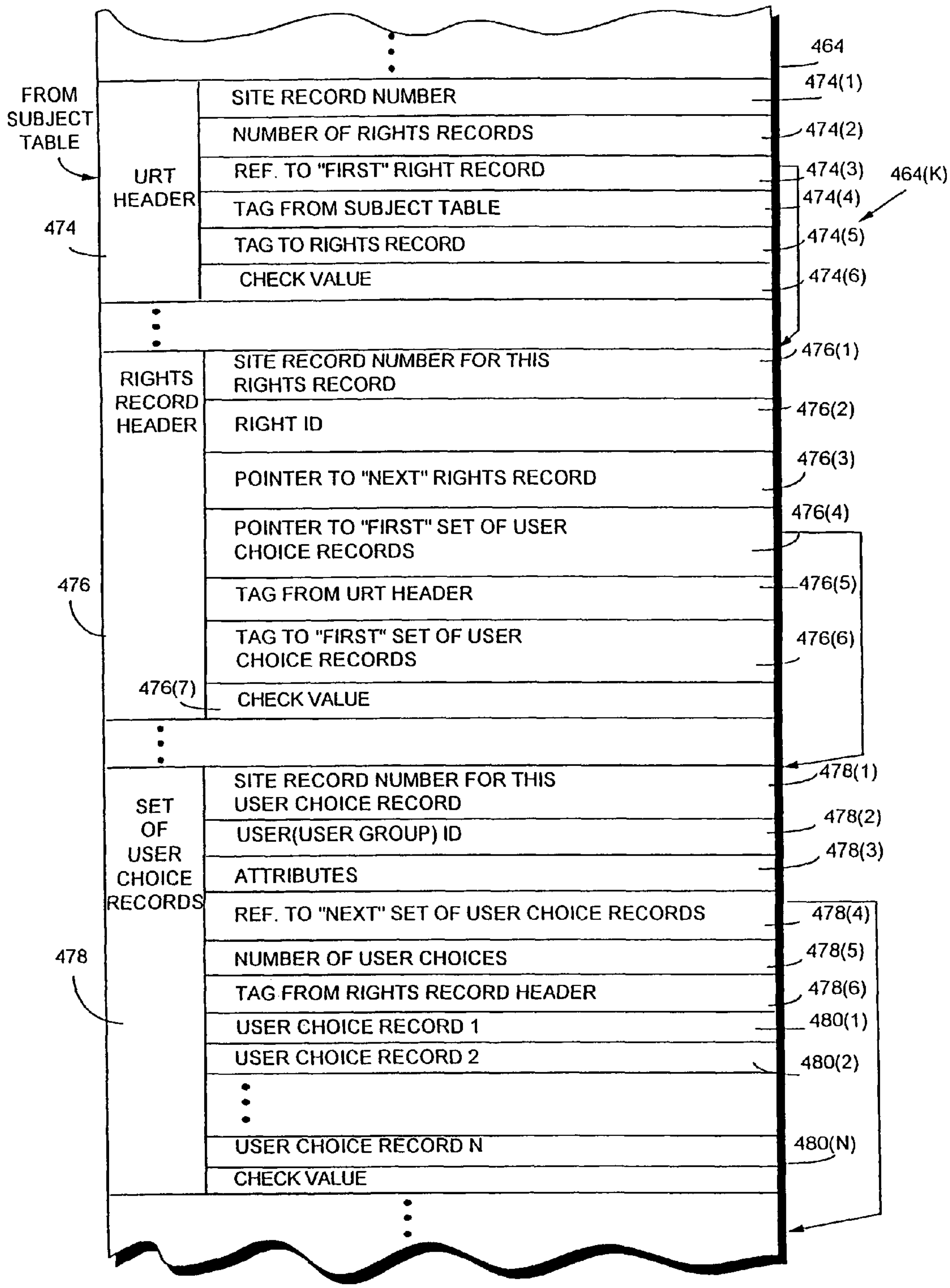
FIG. 33 is a more detailed example of a user rights table shown in FIG. 16.

Subject record reference field 472(4) references one or more records within user rights table 464. FIG. 33 shows an example of a preferred format for a user rights table record 464(*k*). User rights record 464(*k*) may include a URT header 474, a record rights header 476, and a set of user choice records 478. URT header 474 may include a site record number field, a field 474(2) specifying the number of rights records within the URT record 464(*k*), a field 474(3) referencing a "first" rights record (i.e., to rights record header 476), a tag 474(4) used to validate the lookup from the subject table 462, a tag 474(5) used to validate the lookup to the rights record header 476, and a check value field 474(6).

Rights record header 476 in the preferred embodiment may include site record number field 476(1), a right ID field 476 (2), a field 476(3) referencing the "next" rights record 476(2), a field 476(4) referencing a first set of user choice records 478(1), a tag 476(5) to allow validation with URT header tag 474(5), a tag 476(6) to allow validation with a user choice record tag 478(6), and a check value field 476(7). Right ID field 476(2) may, for example, specify the type of right conveyed by the rights record 476(e.g., right to use, right to distribute, right to read, right to audit, etc.).

The one or more user choice records 478 referenced by rights record header 476 sets forth the user choices corresponding to access and/or use of the corresponding VDE object 300. There will typically be a rights record 476 for each right authorized to the corresponding user or user group. These rights govern use of the VDE object 300 by that user or user group. For instance, the user may have an "access" right, and an "extraction" right, but not a "copy" right. Other rights controlled by rights record 476 (which is derived from PERC 808 using a REGISTER method in the preferred embodiment) include distribution rights, audit rights, and pricing rights. When an object 300 is registered with the electronic appliance 600 and is registered with a particular user or user group, the user may be permitted to select among various usage methods set forth in PERC 808. For instance, a VDE object 300 might have two required meter methodologies: one for billing purposes, and one for accumulating data concerning the promotional materials used by the user. The user might be given the choice of a variety of meter/billing methods, such as: payment by VISA or MasterCard; choosing between billing based upon the quantity of material retrieved from an information database, based on the time of use, and/or both. The user might be offered a discount on time and/or quantity billing if he is willing to allow certain details concerning his retrieval of content to be provided to third parties (e.g., for demographic purposes). At the time of registration of an object and/or user for the object, the user would be asked to select a particular meter methodology as the "active metering method" for the first acquired meter. A VDE distributor might narrow the universe of available choices for the user to a subset of the original selection array stipulated by PERC 808. These user selection and configuration settings are stored within user choice records 480(1), 480(2), 480(N). The user choice records need not be explicitly set forth within user rights table 464; instead, it is possible for user choice records 480 to refer (e.g., by site reference number) to particular VDE methods and/or information parameterizing those methods. Such reference by user choice records 480 to method 1000 should be validated by validation tags contained within the user choice records. Thus, user choice records 480 in the preferred embodiment may select one or more methods 1000 for use with the corresponding VDE object 300 (as is shown in FIG. 27). These user choice records 480 may themselves fully define the methods 1000 and other information used to build appropriate components assemblies 690 for implementing the methods. Alternatively, the user/object record 462 used to reference the user rights record 464 may also reference the PERC 808 corresponding to VDE object 300 to provide additional information needed to build the component assembly 690 and/or otherwise access the VDE object 300. For example, PERC 808 may be accessed to obtain MDEs 1202 pertaining to the selected methods, private body and/or rights keys for decrypting and/or encrypting object contents, and may also be used to provide a checking capability ensuring that the user rights record conveys only those rights authorized by a current authorization embodied within a PERC.

In one embodiment provided by the present invention, a conventional database engine may be used to store and organize secure database 610, and the encryption layers discussed above may be "on top of" the conventional database structure. However, if such a conventional database engine is unable to organize the records in secure database 610 and support the security considerations outlined above, then electronic appliance 600 may maintain separate indexing structures in encrypted form. These separate indexing structures can be maintained by SPE 503. This embodiment would require SPE 503 to decrypt the index and search decrypted index blocks to find appropriate "site record IDs" or other pointers. SPE 503 might then request the indicated record from the conventional database engine. If the record ID cannot be checked against a record list, SPE 503 might be required to ask for the data file itself so it can retrieve the desired record SPE 503 would then perform appropriate authentication to ensure that the file has not been tampered with and that the proper block is returned. SPE 503 should not simply pass the index to the conventional database engine (unless the database engine is itself secure) since this would allow an incorrect record to be swapped for the requested one.

Figure 34:
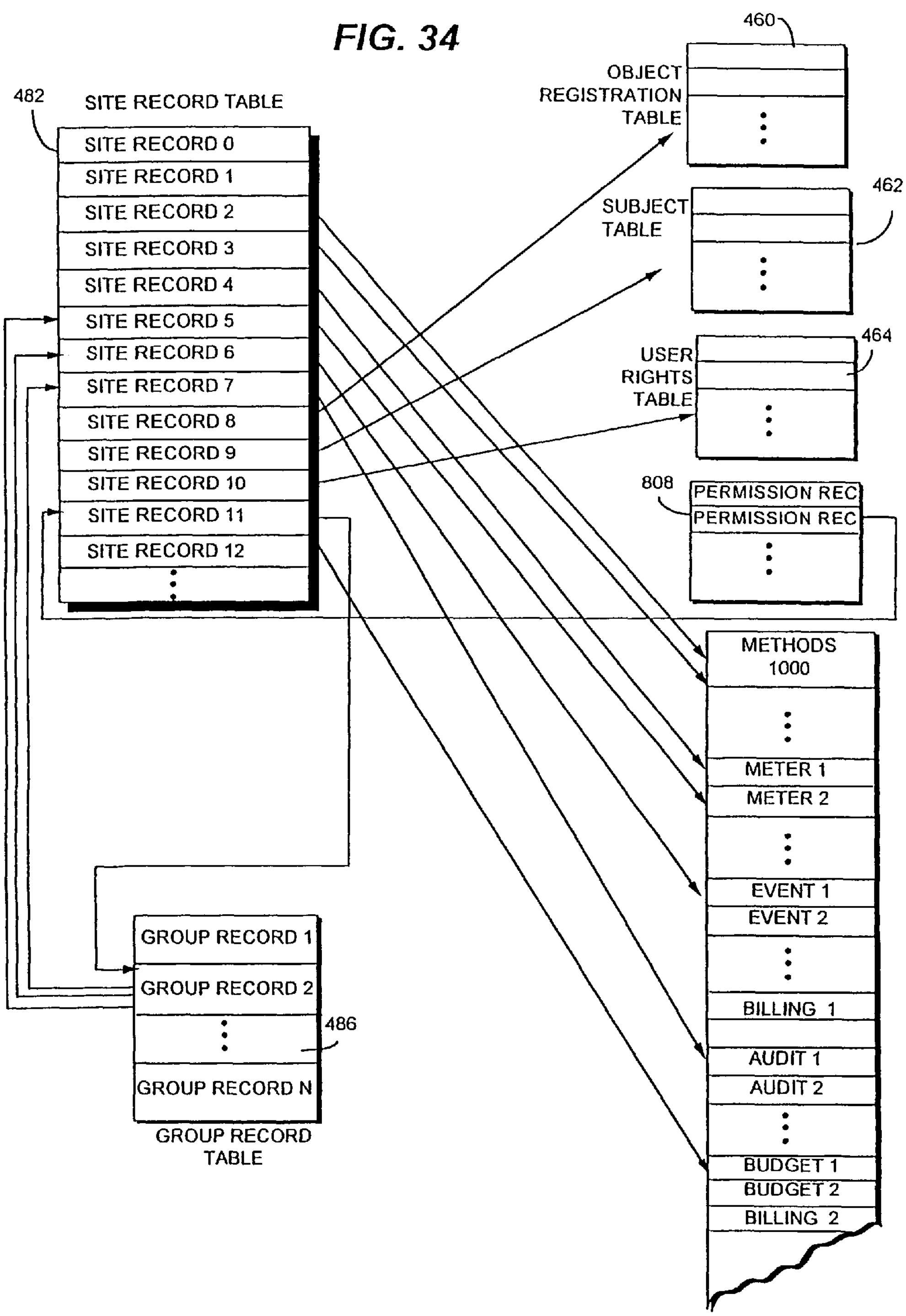
FIG. 34 shows a specific example of how a site record table and group record table may track portions of the secure database shown in FIG. 16.

FIG. 34 is an example of how the site record numbers described above may be used to access the various data structures within secure database 610. In this example, secure database 610 further includes a site record table 482 that stores a plurality of site record numbers. Site record table 482 may store what is in effect a "master list" of all records within secure database 610. These site record numbers stored by site record table 482 permit any record within secure database 610 to be accessed. Thus, some of the site records within site record table 482 may index records with an object registration table 460, other site record numbers within the site record table may index records within the user/object table 462, still other site record numbers within the site record table may access records within URT 464, and still other site record numbers within the site record table may access PERCs 808. In addition, each of method cores 1000' may also include a site record number so they may be accessed by site record table 482.

Figure 34A:
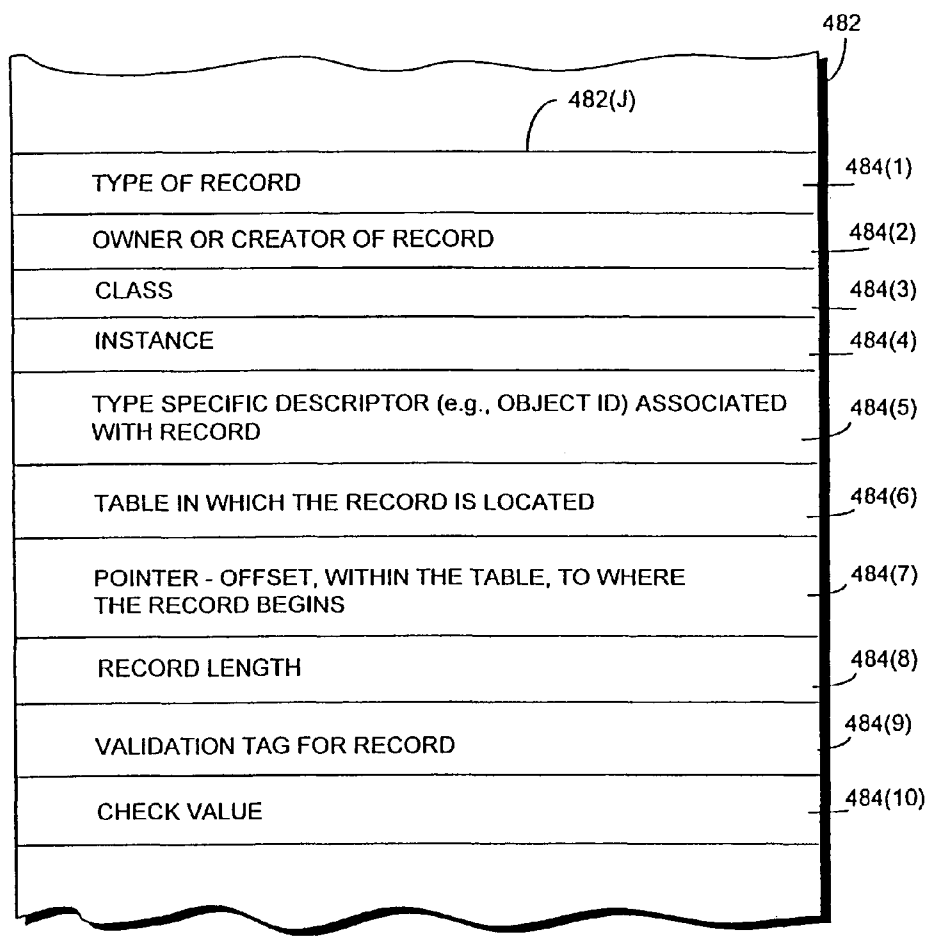
FIG. 34A is an example of a FIG. 34 site record table structure.
Figure 34B:
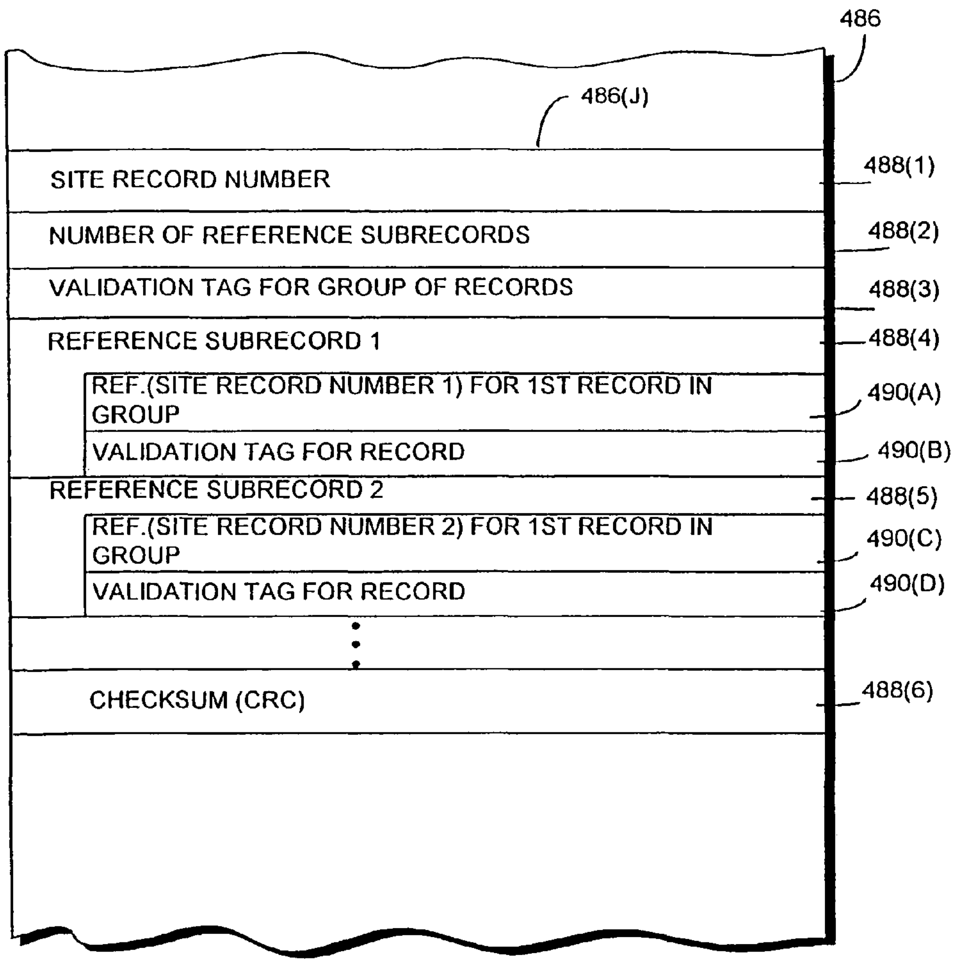
FIG. 34B is an example of a FIG. 34 group record table structure.

FIG. 34A shows an example of a site record 482(*j*) within site record table 482. Site record 482(*j*) may include a field 484(1) indicating the type of record, a field 484(2) indicating the owner or creator of the record, a "class" field 484(3) and an "instance" field 484(4) providing additional information about the record to which the site record 482(*j*) points; a specific descriptor field 484(5) indicating some specific descriptor (e.g., object ID) associated with the record; an identification 484(6) of the table or other data structure which the site record references; a reference and/or offset within that data structure indicating where the record begins; a validation tag 484(8) for validating the record being looked up, and a check value field 484(9). Fields 484(6) and 484(7) together may provide the mechanism by which the record referenced to by the site record 484(*j*) is actually physically located within the secure database 610.

Updating Secure Database 610

Figure 35:
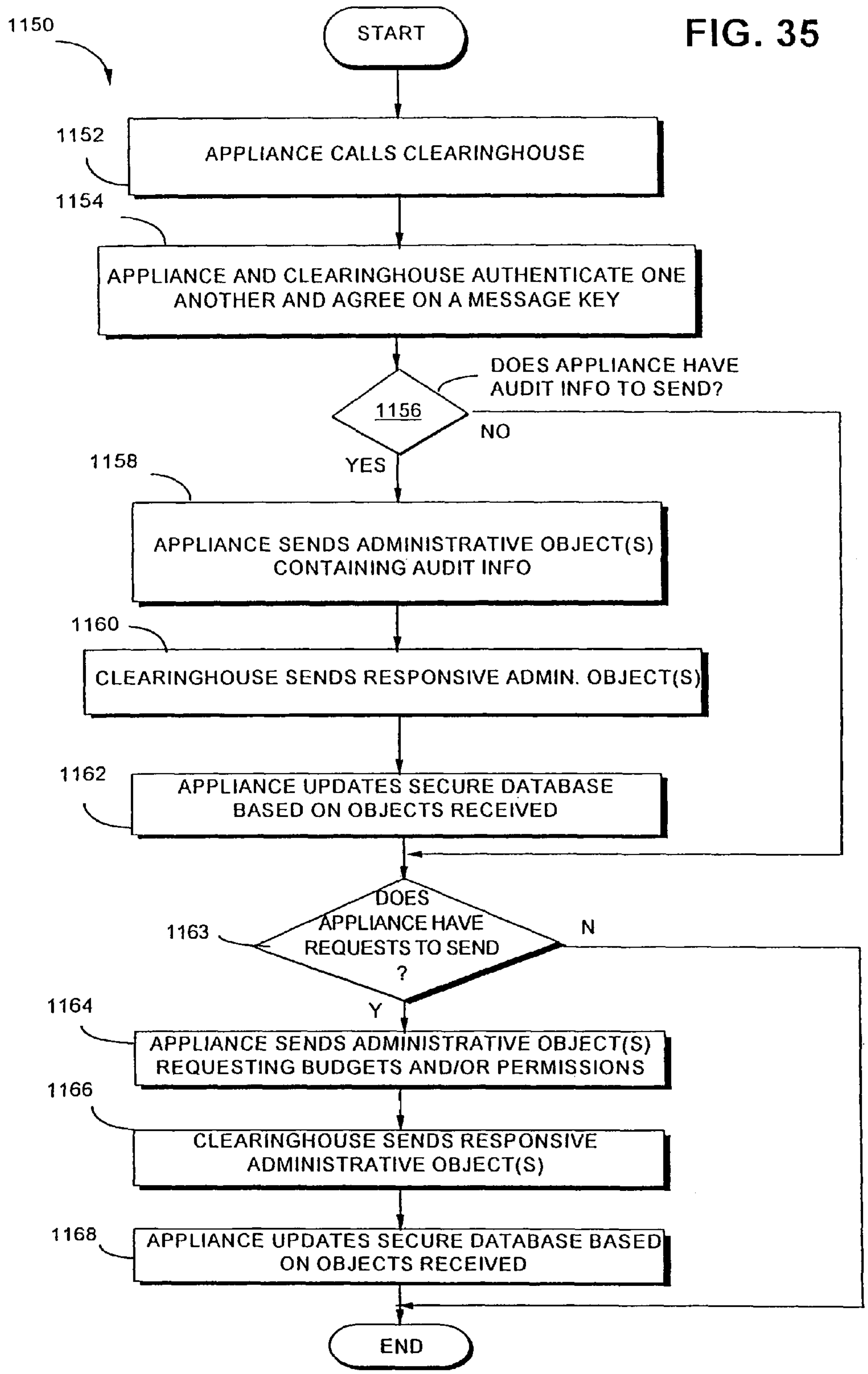
FIG. 35 shows an example of a process for updating the secure database.

FIG. 35 show an example of a process 1150 which can be used by a clearinghouse, VDE administrator or other VDE participant to update the secure database 610 maintained by an end user's electronic appliance 600. For example, the process 1500 shown in FIG. 35 might be used to collect "audit trail" records within secure database 610 and/or provide new budgets and permissions (e.g, PERCs 808) in response to an end user's request.

Typically, the end user's electronic appliance 600 may initiate communications with a clearinghouse (Block 1152). This contact may, for example, be established automatically or in response to a user command. It may be initiated across the electronic highway 108, or across other communications networks such as a LAN, WAN, two-way cable or using portable media exchange between electronic appliances. The process of exchanging administrative information need not occur in a single "on line" session, but could instead occur over time based on a number of different one-way and/or two-way communications over the same or different communications means. However, the process 1150 shown in FIG. 35 is a specific example where the end user's electronic appliance 600 and the other VDE participant (e.g., a clearinghouse) establish a two-way real-time interactive communications exchange across a telephone line, network, electronic highway 108, etc.

The end user's electronic appliance 600 generally contacts a particular VDE administrator or clearinghouse. The identity of the particular clearinghouse is based on the VDE object 300 the user wishes to access or has already accessed. For example, suppose the user has already accessed a particular VDE object 300 and has run out of budget for further access. The user could issue a request which will cause her electronic appliance 600 to automatically contact the VDE administrator, distributor and/or financial clearinghouse that has responsibility for that particular object. The identity of the appropriate VDE participants to contact is provided in the example by information within UDEs 1200, MDEs 1202, the Object Registration Table 460 and/or Subject Table 462, for example. Electronic appliance 600 may have to contact multiple VDE participants (e.g., to distribute audit records to one participant, obtain additional budgets or other permissions from another participant, etc.). The contact 1152 may in one example be scheduled in accordance with the FIG. 27 Shipping, Table 444 and the FIG. 29 Administrative Event Log 442.

Once contact is established, the end user's electronic appliance and the clearinghouse typically authenticate one another and agree on a session key to use for the real-time information exchange (Block 1154). Once a secure connection is established, the end user's electronic appliance may determine (e.g., based on Shipping Table 444) whether it has any administrative object(s) containing audit information that it is supposed to send to the clearinghouse (decision Block 1156). Audit information pertaining to several VDE objects 300 may be placed within the same administrative object for transmission, or different administrative objects may contain audit information about different objects. Assuming the end user's electronic appliance has at least one such administrative object to send to this particular clearinghouse ("yes" exit to decision Block 1156), the electronic appliance sends that administrative object to the clearinghouse via the now established secure real-time communications (Block 1158). In one specific example, a single administrative object may be sent an administrative object containing audit information pertaining to multiple VDE objects, with the audit information for each different object compromising a separate "event" within the administrative object.

The clearinghouse may receive the administrative object and process its contents to determine whether the contents are "valid" and "legitimate." For example, the clearinghouse may analyze the contained audit information to determine whether it indicates misuse of the applicable VDE object 300. The clearinghouse may, as a result of this analysis, may generate one or more responsive administrative objects that it then sends to the end user's electronic appliance 600 (Block 1160). The end user's electronic appliance 600 may process events that update its secure database 610 and/or SPU 500 contents based on the administrative object received (Block 1162). For example, if the audit information received by the clearinghouse is legitimate, then the clearinghouse may send an administrative object to the end user's electronic appliance 600 requesting the electronic appliance to delete and/or compress the audit information that has been transferred. Alternatively or in addition, the clearinghouse may request additional information from the end-user electronic appliance 600 at this stage (e.g., retransmission of certain information that was corrupted during the initial transmission, transmission of additional information not earlier transmitted, etc.). If the clearinghouse detects misuse based on the received audit information, it may transmit an administrative object that revokes or otherwise modifies the end user's right to further access the associated VDE objects 300.

The clearinghouse may, in addition or alternatively, send an administrative object to the end user's electronic appliance 600 that instructs the electronic appliance to display one or more messages to the user. These messages may inform the user about certain conditions and/or they may request additional information from the user. For example, the message may instruct the end user to contact the clearinghouse directly by telephone or otherwise to resolve an indicated problem, enter a PIN, or it may instruct the user to contact a new service company to re-register the associated VDE object. Alternatively, the message may tell the end user that she needs to acquire new usage permissions for the object, and may inform the user of cost, status and other associated information.

During the same or different communications exchange, the same or different clearinghouse may handle the end user's request for additional budget and/or permission pertaining to VDE object 300. For example, the end user's electronic appliance 600 may (e.g., in response to a user input request to access a particular VDE object 300) send an administrative object to the clearinghouse requesting budgets and/or other permissions allowing access (Block 1164). As mentioned above, such requests may be transmitted in the form of one or more administrative objects, such as, for example, a single administrative object having multiple "events" associated with multiple requested budgets, and/or other permissions for the same or different VDE objects 300. The clearinghouse may upon receipt of such a request, check the end user's credit, financial records, business agreements and/or audit histories to determine whether the requested budgets and/or permissions should be given. The clearinghouse may, based on this analysis, send one or more responsive administrative objects which cause the end user's electronic appliance 600 to update its secure database in response (Block 1166, 1168). This updating might, for example, comprise replacing an expired PERC 808 with a fresh one, modifying a PERC to provide additional (or lesser) rights, etc. Steps 1164-1168 may be repeated multiple times in the same or different communications session to provide further updates to the end user's secure database 610.

Figure 36:
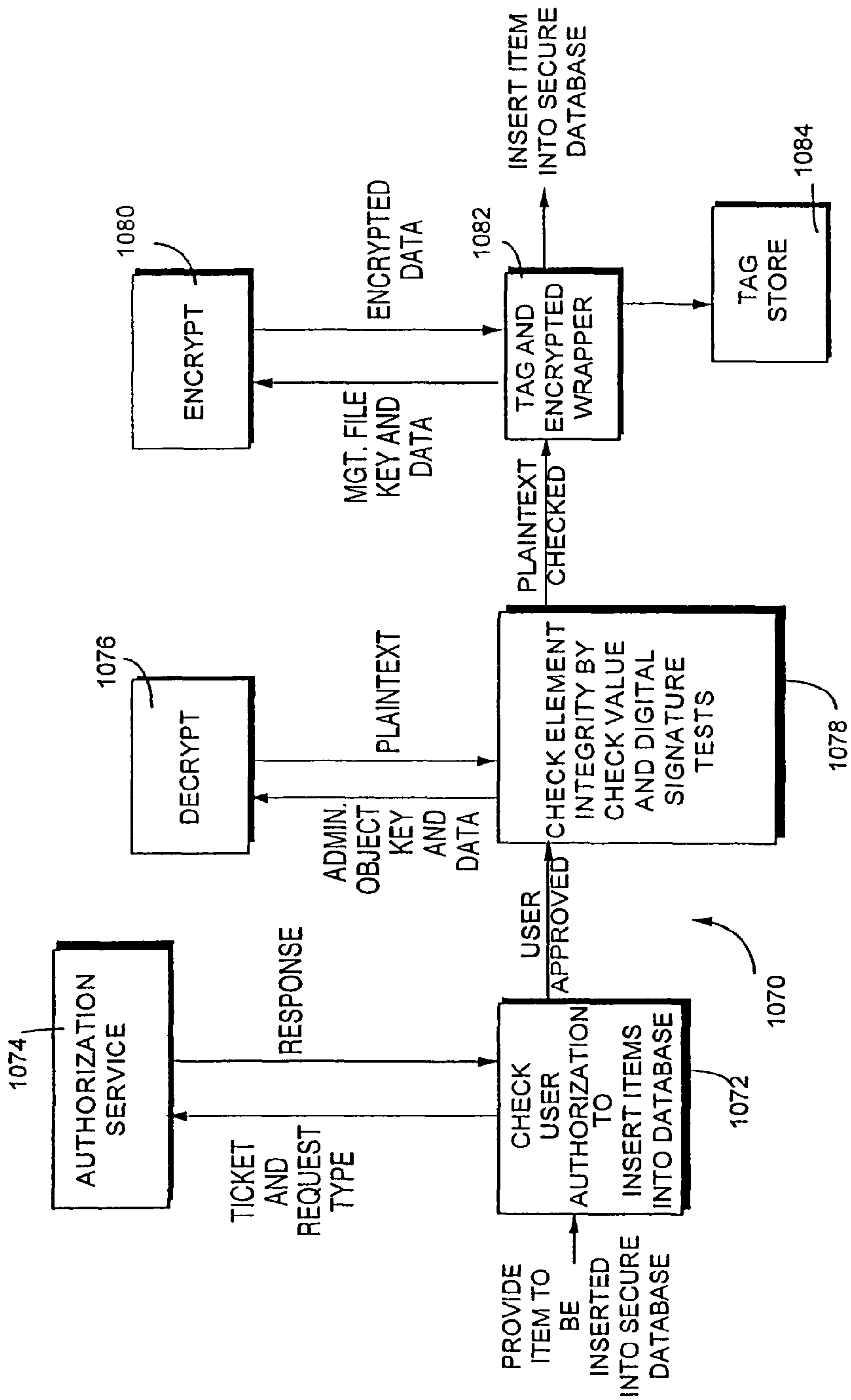
FIG. 36 shows an example of how new elements may be inserted into the FIG. 16 secure data base.

FIG. 36 shows an example of how a new record or element may be inserted into secure database 610. The load process 1070 shown in FIG. 35 checks each data element or item as it is loaded to ensure that it has not been tampered with, replaced or substituted. In the process 1070 shown in FIG. 35, the first step that is performed is to check to see if the current user of electronic appliance 600 is authorized to insert the item into secure database 610 (block 1072). This test may involve, in the preferred embodiment, loading (or using already loaded) appropriate methods 1000 and other data structures such as UDEs 1200 into an SPE 503, which then authenticates user authorization to make the change to secure database 610 (block 1074). If the user is approved as being authorized to make the change to secure database 610, then SPE 503 may check the integrity of the element to be added to the secure database by decrypting it (block 1076) and determining whether it has become damaged or corrupted (block 1078). The element is checked to ensure that it decrypts properly using a predetermined management file key, and the check value may be validated. In addition, the public and private header ID tags (if present) may be compared to ensure that the proper element has been provided and had not been substituted, and the unique element tag ID compared against the predetermined element tag. If any of these tests fail, the element may be automatically rejected, error corrected, etc. Assuming the element is found to have integrity, SPE 503 may re-encrypt the information (block 1080) using a new key for example (see FIG. 37 discussion below) In the same process step an appropriate tag is preferably provided so that the information becomes encrypted within a security wrapper having appropriate tags contained therein (block 1082). SPE 503 may retain appropriate tag information so that it can later validate or otherwise authenticate the item when it is again read from secure database 610 (block 1084). The now-secure element within its security wrapper may then be stored within secure database 610.

Figure 37:
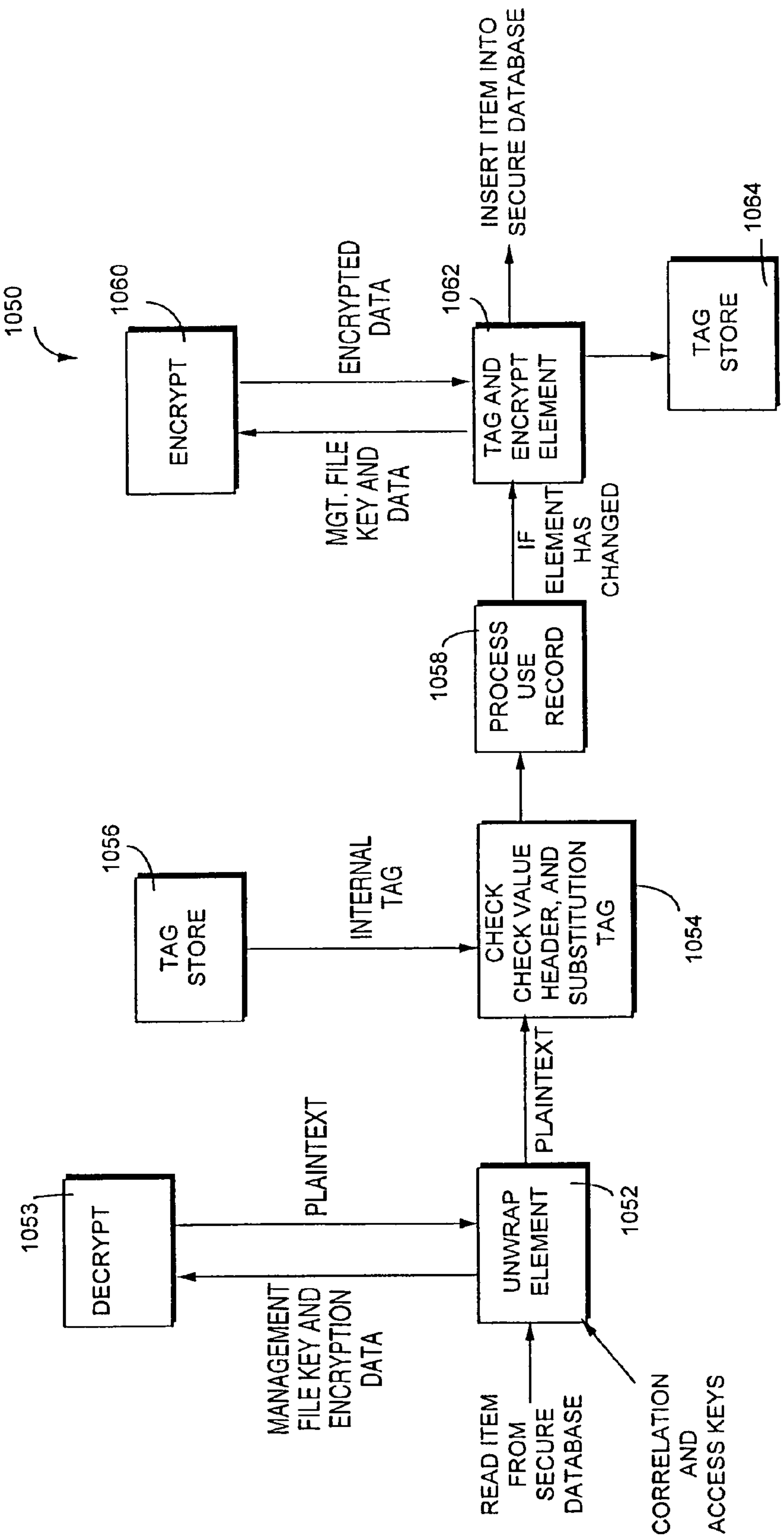
FIG. 37 shows an example of how an element of the secure database may be accessed.

FIG. 37 shows an example of a process 1050 used in the preferred embodiment database to securely access an item stored in secure database 610. In the preferred embodiment, SPE 503 first accesses and reads in the item from secure database 610 records. SPE 503 reads this information from secure database 610 in encrypted form, and may "unwrap" it (block 1052) by decrypting it (block 1053) based on access keys internally stored within the protected memory of an SPU 500. In the preferred embodiment, this "unwrap" process 1052 involves sending blocks of information to encrypt/decrypt engine 522 along with a management file key and other necessary information needed to decrypt. Decrypt engine 522 may return "plaintext" information that SPE 503 then checks to ensure that the security of the object has not been breached and that the object is the proper object to be used (block 1054). SPE 503 may then check all correlation and access tags to ensure that the read-in element has not been substituted and to guard against other security threats (block 1054). Part of this "checking" process involves checking the tags obtained from the secure database 610 with tags contained within the secure memory or an SPU 500 (block 1056). These tags stored within SPU 500 may be accessed from SPU protected memory (block 1056) and used to check further the now-unwrapped object; Assuming this "checking" process 1054 does not reveal any improprieties (and block 1052 also indicates that the object has not become corrupted or otherwise damaged), SPE 503 may then access or otherwise use the item (block 1058). Once use of the item is completed, SPE 503 may need to store the item back into secure database 610 if it has changed. If the item has changed, SPE 503 will send the item in its changed form to encrypt/decrypt engine 522 for encryption (block 1060), providing the appropriate necessary information to the encrypt/decrypt engine (e.g., the appropriate same or different management file key and data) so that the object is appropriately encrypted. A unique, new tag and/or encryption key may be used at this stage to uniquely tag and/or encrypt the item security wrapper (block 1062, see also detailed FIG. 37 discussion below). SPE 503 may retain a copy of the key and/or tag within a protected memory of SPU 500 (block 1064) so that the SPE can decrypt and validate the object when it is again read from secure database 610.

The keys to decrypt secure database 610 records are, in the preferred embodiment, maintained solely within the protected memory of an SPU 500. Each index or record update that leaves the SPU 500 may be time stamped, and then encrypted with a unique key that is determined by the SPE 503. For example, a key identification number may be placed "in plain view" at the front of the records of secure database 610 so the SPE 503 can determine which key to use the next time the record is retrieved SPE 503 can maintain the site ID of the record or index, the key identification number associated with it, and the actual keys in the list internal to the SPE. At some point, this internal list may fill up. At this point, SPE 503 may call a maintenance routine that re-encrypts items within secure database 610 containing changed information. Some or all of the items within the data structure containing changed information may be read in, decrypted, and then re-encrypted with the same key. These items may then be issued the same key identification number. The items may then be written out of SPE 503 back into secure database 610. SPE 503 may then clear the internal list of item IDs and corresponding key identification numbers. It may then begin again the process of assigning a different key and a new key identification number to each new or changed item. By using this process, SPE 503 can protect the data structures (including the indexes) of secure database 610 against substitution of old items and against substitution of indexes for current items. This process also allows SPE 503 to validate retrieved item IDs against the encrypted list of expected IDs.

Figure 38:
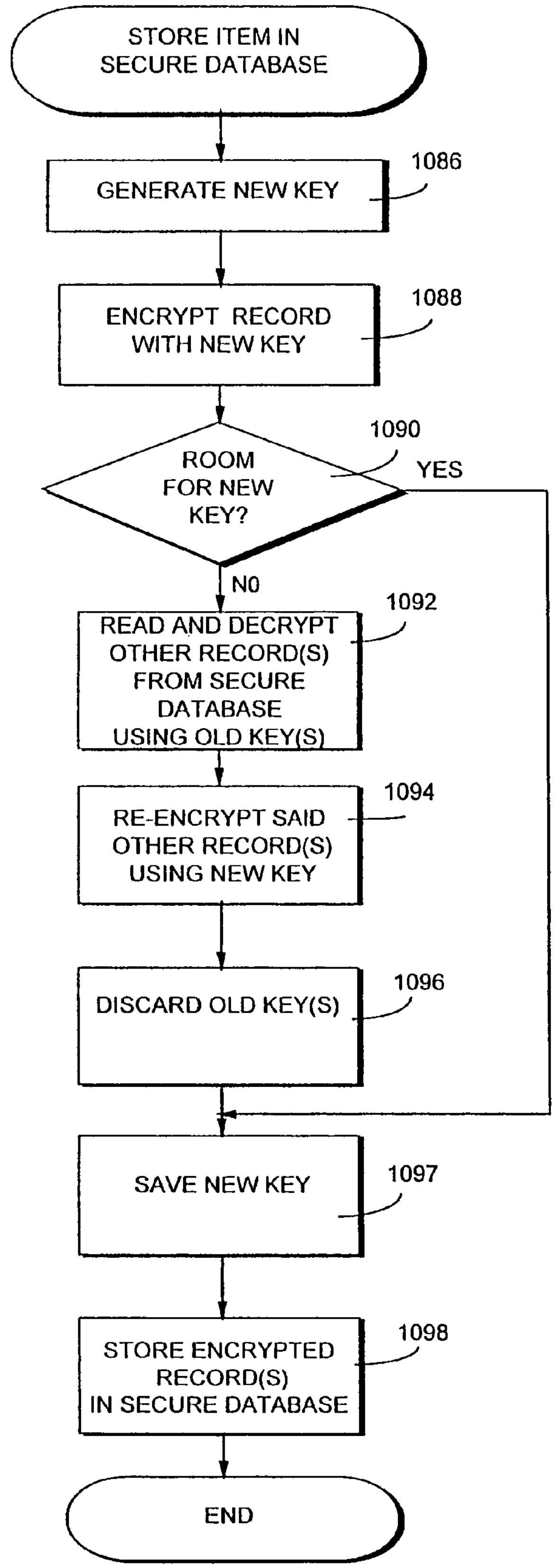
FIG. 38 is a flowchart example of how to protect a secure database element.

FIG. 38 is a flowchart showing this process in more detail. Whenever a secure database 610 item is updated or modified, a new encryption key can be generated for the updated item. Encryption using a new key is performed to add security and to prevent misuse of backup of secure database 610 records. The new encryption key for each updated secure database 610 record may be stored in SPU 500 secure memory with an indication of the secure database record or record(s) to which it applies.

SPE 503 may generate a new encryption/decryption key for each new item it is going to store within secure database 610 (block 1086). SPE 503 may use this new key to encrypt the record prior to storing it in the secure database (block 1088). SPE 503 make sure that it retains the key so that it can later read and decrypt the record. Such decryption keys are, in the preferred embodiment, maintained within protected non-volatile memory (e.g., NVRAM 534_b_) within SPU 500. Since this protected memory has a limited size, there may not be enough room within the protected memory to store a new key. This condition is tested for by decision block 1090 in the preferred embodiment. If there is not enough room in memory for the new key (or some other event such as the number of keys stored in the memory exceeding a predetermined number, a timer has expired, etc), then the preferred embodiment handles the situation by re-encrypting other records with secure database 610 with the same new key in order to reduce the number of (or change) encryption/decryption keys in use. Thus, one or more secure database 610 items may be read from the secure database (block 1092), and decrypted using the old key(s) used to encrypt them the last time they were stored. In the preferred embodiment, one or more "old keys" are selected, and all secure database items encrypted using the old key(s) are read and decrypted. These records may now be re-encrypted using the new key that was generated at block 1086 for the new record (block 1094). The old key(s) used to decrypt the other record(s) may now be removed from the SPU protected memory (block 1096), and the new key stored in its place (block 1097). The old key(s) cannot be removed from secure memory by block 1096 unless SPE 503 is assured that all records within the secure database 610 that were encrypted using the old key(s) have been read by block 1092 and re-encrypted by block 1904 using the new key. All records encrypted (or re-encrypted) using the new key may now be stored in secure database 610 (block 1098). If decision block 1090 determines there is room within the SPU 500 protected memory to store the new key, then the operations of blocks 1092, 1094, 1096 are not needed and SPE 503 may instead simply store the new key within the protected memory (block 1097) and store the new encrypted records into secure database 610 (block 1098).

The security of secure database 610 files may be further improved by segmenting the records into "compartments." Different encryption/decryption keys may be used to protect different "compartments." This strategy can be used to limit the amount of information within secure database 610 that is encrypted with a single key. Another technique for increasing security of secure database 610 may be to encrypt different portions of the same records with different keys so that more than one key may be needed to decrypt those records.

Backup of Secure Database 610

Secure database 610 in the preferred embodiment is backed up at periodic or other time intervals to protect the information the secure database contains. This secure database information may be of substantial value to many VDE participants. Back ups of secure database 610 should occur without significant inconvenience to the user, and should not breach any security.

The need to back up secure database 610 may be checked at power on of electronic appliance 600, when SPE 503 is initially invoked, at periodic time intervals, and if "audit roll up" value or other summary services information maintained by SPE 503 exceeds a user set or other threshold, or triggered by criteria established by one or more content publishers and/or distributors and/or clearinghouse service providers and/or users. The user may be prompted to backup if she has failed to do so by or at some certain point in time or after a certain duration of time or quantity of usage, or the backup may proceed automatically without user intervention.

Referring to FIG. 8, backup storage 668 and storage media 670 (e.g., magnetic tape) may be used to store backed up information. Of course, any non-volatile media (e.g., one or more floppy diskettes, a writable optical diskette, a hard drive, or the like) may be used for backup storage 668.

There are at least two scenarios to backing up secure database 610. The first scenario is "site specific," and uses the security of SPU 500 to support restoration of the backed up information. This first method is used in case of damage to secure database 610 due for example to failure of secondary storage device 652, inadvertent user damage to the files, or other occurrences that may damage or corrupt some or all of secure database 610. This first, site specific scenario of back up assumes that an SPU 500 still functions properly and is available to restore backed up information.

The second back up scenario assumes that the user's SPU 500 is no longer operational and needs to be, or has been, replaced. This second approach permits an authorized VDE administrator or other authorized VDE participant to access the stored back up information in order to prevent loss of critical data and/or assist the user in recovering from the error.

Figure 39:
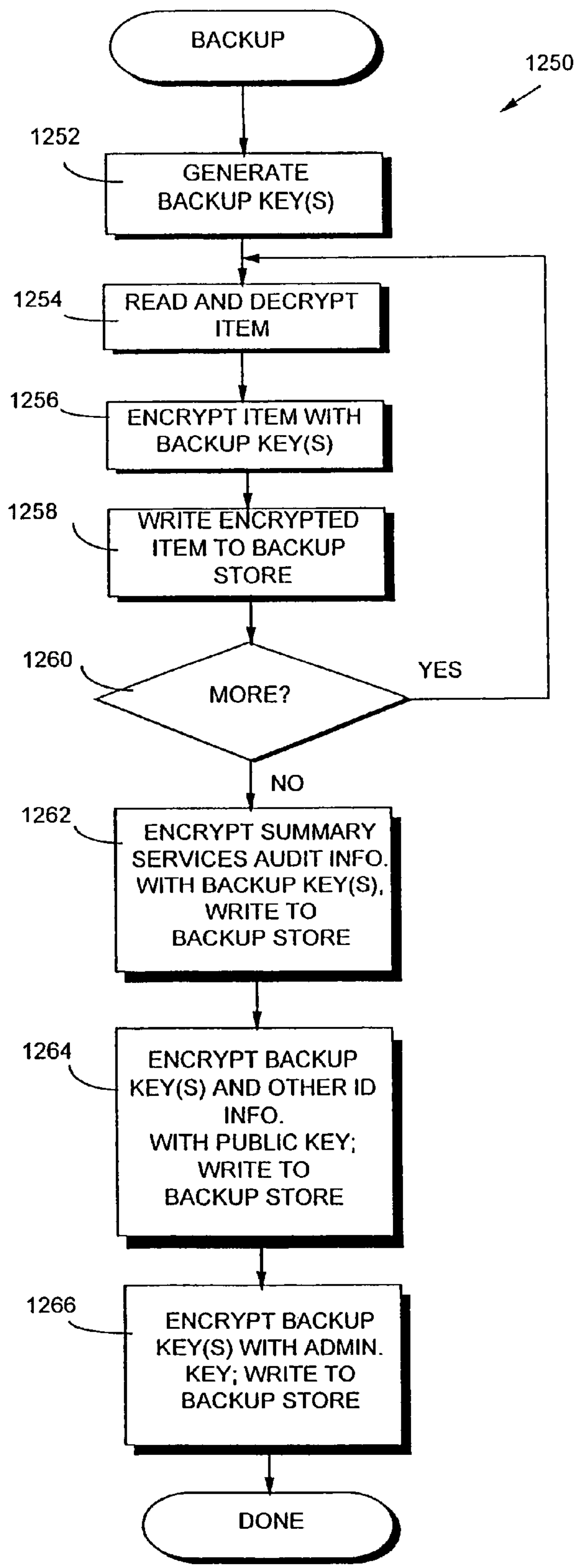
FIG. 39 is a flowchart example of how to back up a secure database.

Both of these scenarios are provided by the example of program control steps performed by ROS 602 shown in FIG. 39. FIG. 39 shows an example back up routine 1250 performed by an electronic appliance 600 to back up secure database 610 (and other information) onto back up storage 668. Once a back up has been initiated, as discussed above, back up routine 1250 generates one or more back up keys (block 1252). Back up routine 1250 then reads all secure database items, decrypts each item using the original key used to encrypt them before they were stored in secure database 610 (block 1254). Since SPU 500 is typically the only place where the keys for decrypting this information within an instance of secure database 610 are stored, and since one of the scenarios provided by back up routine 1250 is that SPU 500 completely failed or is destroyed, back up routine 1250 performs this reading and decrypting step 1254 so that recovery from a backup is not dependent on knowledge of these keys within the SPU. Instead, back up routine 1250 encrypts each secure database 610 item with a newly generated back up key(s) (block 1256) and writes the encrypted item to back up store 668 (block 1258). This process continues until all items within secure database 610 have been read, decrypted, encrypted with a newly generated back up key(s), and written to the back up store (as tested for by decision block 1260).

The preferred embodiment also reads the summary services audit information stored within the protected memory of SPU 500 by SPE summary services manager 560, encrypts this information with the newly generated back up key(s), and writes this summary services information to back up store 668 (block 1262).

Finally, back up routine 1250 saves the back up key(s) generated block 1252 and used to encrypt in blocks 1256, 1262 onto back up store 668. It does this in two secure ways in order to cover both of the restoration scenarios discussed above. Back up routine 1250 may encrypt the back up key(s) (along with other information such as the time of back up and other appropriate information to identify the back up) with a further key or keys such that only SPU 500 can decrypt (block 1264). This encrypted information is then written to back up store 668 (block 1264). For example, this step may include multiple encryptions using one or more public keys with corresponding private keys known only to SPU 500. Alternatively, a second back up key generated by the SPU 500 and kept only in the SPU may be used for the final encryption in place of a public key. Block 1264 preferably includes multiple encryption in order to make it more difficult to attack the security of the back up by "cracking" the encryption used to protect the back up keys. Although block 1262 includes encrypted summary services information on the back up, it preferably does not include SF15 device private keys, shared keys, SF15 code and other internal security information to prevent this information from ever becoming available to users even in encrypted form.

The information stored by block 1264 is sufficient to allow the same SPU 500 that performed (or at least in part performed) back up routine 1250 to recover the backed up information. However, this information is useless to any device other than that same SPU because only that SPU knows the particular keys used to protect the back up keys. To cover the other possible scenario wherein the SPU 500 fails in a non-recoverable way, back up routine 1250 provides an additional step (block 1266) of saving the back up key(s) under protection of one or more further set of keys that may be read by an authorized VDE administrator. For example, block 1266 may encrypt the back up keys with an "download authorization key" received during initialization of SPU 500 from a VDE administrator. This encrypted version of back up keys is also written to back up store 668 (block 1266). It can be used to support restoration of the back up files in the event of an SPU 500 failure. More specifically, a VDE administrator that knows the download authorization (or other) keys(s) used by block 1266 may be able to recover the back up key(s) in the back up store 668 and proceed to restore the backed up secure database 610 to the same or different electronic appliance 600.

In the preferred embodiment, the information saved by routine 1250 in back up files can be restored only after receiving a back up authorization from an authorized VDE administrator. In most cases, the restoration process will simply be a restoration of secure database 610 with some adjustments to account for any usage since the back up occurred. This may require the user to contact additional providers to transmit audit and billing data and receive new budgets to reflect activity since the last back up. Current summary services information maintained within SPU 500 may be compared to the summary services information stored on the back up to determine or estimate most recent usage activity.

In case of an SPU 500 failure, an authorized VDE administrator must be contacted to both initialize the replacement SPU 500 and to decrypt the back up files. These processes allow for both SPU failures and upgrades to new SPUs. In the case of restoration, the back up files are used to restore the necessary information to the user's system. In the case of upgrades, the back up files may be used to validate the upgrade process.

The back up files may in some instances be used to transfer management information between electronic appliances 600. However, the preferred embodiment may restrict some or all information from being transportable between electronic appliances with appropriate authorizations. Some or all of the back up files may be packaged within an administrative object and transmitted for analysis, transportation, or other uses.

As a more detailed example of a need for restoration from back up files, suppose an electronic appliance 600 suffers a hard disk failure or other accident that wipes out or corrupts part or all of the secure database 610, but assume that the SPU 500 is still functional SPU 500 may include all of the information (e.g., secret keys and the like) it needs to restore the secure database 610. However, ROS 602 may prevent secure database restoration until a restoration authorization is received from a VDE administrator. A restoration authorization may comprise, for example, a "secret value" that must match a value expected by SPE 503. A VDE administrator may, if desired, only provide this restoration authorization after, for example, summary services information stored within SPU 500 is transmitted to the administrator in an administrative object for analysis. In some circumstances, a VDE administrator may require that a copy (partial or complete) of the back up files be transmitted to it within an administrative object to check for indications of fraudulent activities by the user. The restoration process, once authorized, may require adjustment of restored budget records and the like to reflect activity since the last back up, as mentioned above.

Figure 40:
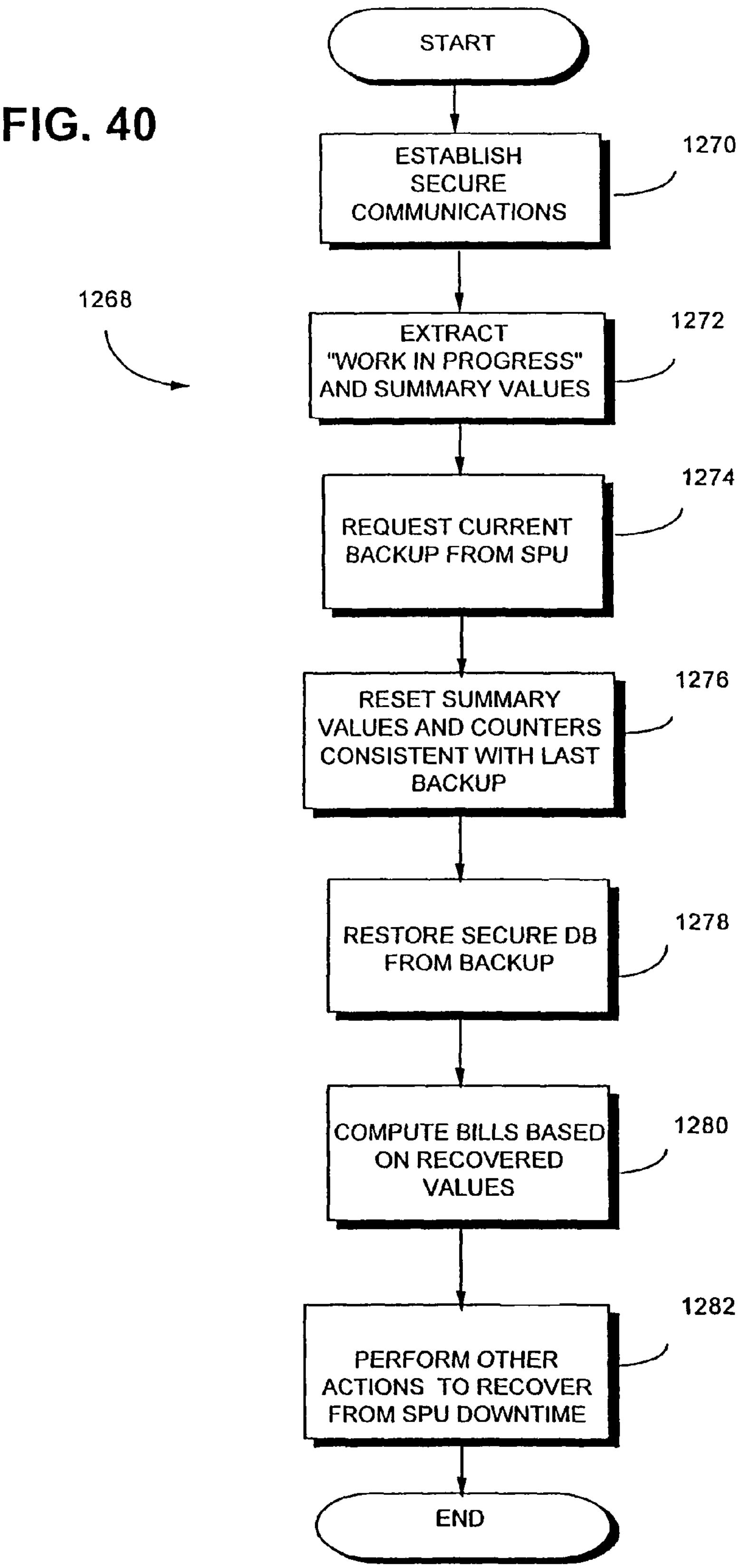
FIG. 40 is a flowchart example of how to recover a secure database from a backup.

FIG. 40 is an example of program controlled "restore" routine 1268 performed by electronic appliance 600 to restore secure database 610 based on the back up provided by the routine shown in FIG. 38. This restore may be used, for example, in the event that an electronic appliance 600 has failed but can be recovered or "reinitialized" through contact with a VDE administrator for example. Since the preferred embodiment does not permit an SPU 500 to restore from backup unless and until authorized by a VDE administrator, restore routine 1268 begins by establishing a secure communication with a VDE administrator that can authorize the restore, to occur (block 1270). Once SPU 500 and the VDE administrator authenticate one another (part of block 1270), the VDE administrator may extract "work in progress" and summary values from the SPU 500's internal non-volatile memory (block 1272). The VDE administrator may use, this extracted information to help determine, for example, whether there has been security violation, and also permits a failed SPU 500 to effectively "dump" its contents to the VDE administrator to permit the VDE administrator to handle the contents. The SPU 500 may encrypt this information and provide it to the VDE administrator packaged in one or more administrative objects. The VDE administrator may then request a copy of some or all of the current backup of secure database 610 from the SPU 500 (block 1274). This information may be packaged by SPU 500 into one or more administrative objects, for example, and sent to the VDE administrator. Upon receiving the information, the VDE administrator may read the summary services audit information from the backup volume (i.e., information stored by FIG. 38 block 1262) to determine the summary values and other information stored at time of backup. The VDE administrator may also determine the time and date the backup was made by reading the information stored by FIG. 38 block 1264.

The VDE administrator may at this point restore the summary values and other information within SPU 500 based on the information obtained by block 1272 and from the backup (block 1276). For example, the VDE administrator may reset SPU internal summary values and counters so that they are consistent with the last backup. These values may be adjusted by the VDE administrator based on the "work in progress" recovered by block 1272, the amount of time that has passed since the backup, etc. The goal may typically be to attempt to provide internal SPU values that are equal to what they would have been had the failure not occurred.

The VDE administrator may then authorize SPU 500 to recover its secure database 610 from the backup files (block 1278). This restoration process replaces all secure database 610 records with the records from the backup. The VDE administrator may adjust these records as needed by passing commands to SPU 500 during or after the restoration process.

The VDE administrator may then compute bills based on the recovered values (block 1280), and perform other actions to recover from SPU downtime (block 1282). Typically, the goal is to bill the user and adjust other VDE 100 values pertaining to the failed electronic appliance 600 for usage that occurred subsequent to the last backup but prior to the failure. This process may involve the VDE administrator obtaining, from other VDE participants, reports and other information pertaining to usage by the electronic appliance prior to its failure and comparing it to the secure database backup to determine which usage and other events are not yet accounted for.

In one alternate embodiment, SPU 500 may have sufficient internal, non-volatile memory to allow it to store, some or all of secure database 610. In this embodiment, the additional memory may be provided by additional one or more integrated circuits that can be contained within a secure enclosure, such as a tamper resistant metal container or some form of a chip pack containing multiple integrated circuit components, and which impedes and/or evidences tampering attempts, and/or disables a portion or all of SPU 500 or associated critical key and/or other control information in the event of tampering. The same back up routine 1250 shown in FIG. 38 may be used to back up this type of information, the only difference being that block 1254 may read the secure database item from the SPU internal memory and may not need to decrypt it before encrypting it with the back up key(s).

Event-Driven VDE Processes.

As discussed above, processes provided by/under the preferred embodiment rights operating system (ROS) 602 may be "event driven." This "event driven" capability facilitates integration and extendibility.

An "event" is a happening at a point in time. Some examples of "events" are a user striking a key of a keyboard, arrival of a message or an object 300, expiration of a timer, or a request from another process.

In the preferred embodiment, ROS 602 responds to an "event" by performing a process in response to the event ROS 602 dynamically creates active processes and tasks in response to the occurrence of an event. For example, ROS 602 may create and begin executing one or more component assemblies 690 for performing a process or processes in response to occurrence of an event. The active processes and tasks may terminate once ROS 602 has responded to the event. This ability to dynamically create (and end) tasks in response to events provides great flexibility, and also permits limited execution resources such as those provided by an SPU 500 to perform a virtually unlimited variety of different processes in different contexts.

Since an "event" may be any type of happening, there are an unlimited number of different events. Thus, any attempt to categorize events into different types will necessarily be a generalization. Keeping this in mind, it is possible to categorize events provided/supported by the preferred embodiment into two broad categories:

user-initiated events, and system-initiated events.

Generally, "user-initiated" events are happenings attributable to a user (or a user application). A common "user-initiated" event is a user's request (e.g., by pushing a keyboard button, or transparently using redirector 684) to access an object 300 or other VDE-protected information.

"System-initiated" events are generally happenings, not attributable to a user. Examples of system initiated events include the expiration of a timer indicating that information should be backed to non-volatile memory, receipt of a message from another electronic appliance 600, and a service call generated by another process (which may have been started to respond to a system-initiated event and/or a user-initiated event).

ROS 602 provided by the preferred embodiment responds to an event by specifying and beginning processes to process the event. These processes are, in the preferred embodiment, based on methods 1000. Since there are an unlimited number of different types of events, the preferred embodiment supports an unlimited number of different processes to process events. This flexibility is supported by the dynamic creation of component assemblies 690 from independently deliverable modules such as method cores 1000', load modules 1100, and data structures such as UDEs 1200. Even though any categorization of the unlimited potential types of processes supported/provided by the preferred embodiment will be a generalization, it is possible to generally classify processes as falling within two categories:

processes relating to use of VDE protected information; and processes relating to VDE administration.

"Use" and "Administrative" Processes

"Use" processes relate in some way to use of VDE-protected information. Methods 1000 provided by the preferred embodiment may provide processes for creating and maintaining a chain of control for use of VDE-protected information. One specific example of a "use" type process is processing to permit a user to open a VDE object 300 and access its contents. A method 1000 may provide detailed use-related processes such as, for example, releasing content to, the user as requested (if permitted), and updating meters, budgets, audit trails, etc. Use-related processes are often user-initiated, but some use processes may be system-initiated. Events that trigger a VDE use-related process may be called "use events."

An "administrative" process helps to keep VDE 100 working. It provides processing that helps support the transaction management "infrastructure" that keeps VDE 100 running securely and efficiently. Administrative processes may, for example, provide processing relating to some aspect of creating, modifying and/or destroying VDE-protected data structures that establish and maintain VDE's chain of handling and control. For example, "administrative" processes may store, update, modify or destroy information contained within a VDE electronic appliance 600 secure database 610. Administrative processes also may provide communications services that establish, maintain and support secure communications between different VDE electronic appliances 600. Events that trigger administrative processes may be called "administrative events."

Reciprocal Methods

Some VDE processes are paired based on the way they interact together. One VDE process may "request" processing services from another VDE process. The process that requests processing services may be called a "request process." The "request" constitutes an "event" because it triggers processing by the other VDE process in the pair. The VDE process that responds to the "request event" may be called a "response process." The "request process" and "response process" may be called "reciprocal processes."

The "request event" may comprise, for example, a message issued by one VDE node electronic appliance 600 or process for certain information. A corresponding "response process" may respond to the "request event" by, for example, sending the information requested in the message. This response may itself constitute a "request event" if it triggers a further VDE "response process." For example, receipt of a message in response to an earlier-generated request may trigger a "reply process." This, "reply process" is a special type of "response process" that is triggered in response to a "reply" from another "response process." There may be any number of "request" and "response" process pairs within a given VDE transaction.

A "request process" and its paired "response process" may be performed on the same VDE electronic appliance 600, or the two processes may be performed on different VDE electronic appliances. Communication between the two processes in the pair may be by way of a secure (VDE-protected) communication, an "out of channel" communication, or a combination of the two.

FIGS. 41*a*-41*d* are a set of examples that show how the chain of handling and control is enabled using "reciprocal methods." A chain of handling and control is constructed, in part, using one or more pairs of "reciprocal events" that cooperate in request-response manner. Pairs of reciprocal events may be managed in the preferred embodiment in one or more "reciprocal methods." As mentioned above, a "reciprocal method" is a method 1000 that can respond to one or more "reciprocal events." Reciprocal methods contain the two halves of a cooperative process that may be securely executed at physically and/or temporally distant VDE nodes. The reciprocal processes may have a flexibly defined information passing protocols and information content structure. The reciprocal methods may, in fact, be based on the same or different method core 1000' operating in the same or different VDE nodes 600. VDE nodes 600A and 600B shown in FIG. 41*a* may be the same physical electronic appliance 600 or may be separate electronic appliances.

Figure 41A:
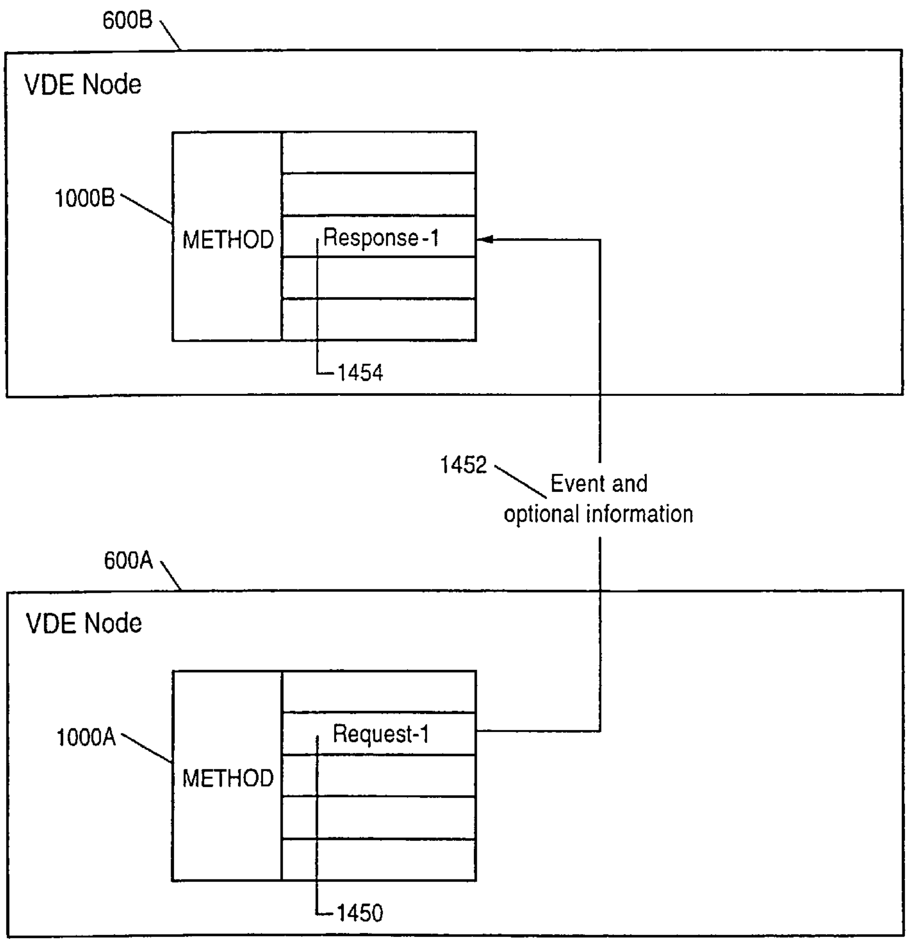
FIGS. 41A-41D are a set of examples showing how a "chain of handling and control" may be enabled using "reciprocal methods"

FIG. 41*a* is an example of the operation of a single pair of reciprocal events. In VDE node 600A, method 1000*a* is processing an event that has a request that needs to be processed at VDE node 600B. The method 1000*a* (e.g., based on a component assembly 690 including its associated load modules 1100 and data) that responds to this "request" event is shown in FIG. 41*a* as 1450. The process 1450 creates, a request (1452) and, optionally, some information or data that will be sent to the other VDE node 1000*b* for processing by a process associated with the reciprocal event. The request and other information may be transmitted by any of the transport mechanisms described elsewhere in this disclosure.

Receipt of the request by VDE node 600*b* comprises a response event at that node. Upon receipt of the request, the VDE node 600*b* may perform a "reciprocal" process 1454 defined by the same or different method 1000*b* to respond to the response event. The reciprocal process 1454 may be based on a component assembly 690 (e.g., one or more load modules 1100, data, and optionally other methods present in the VDE node 600B).

Figure 41B:
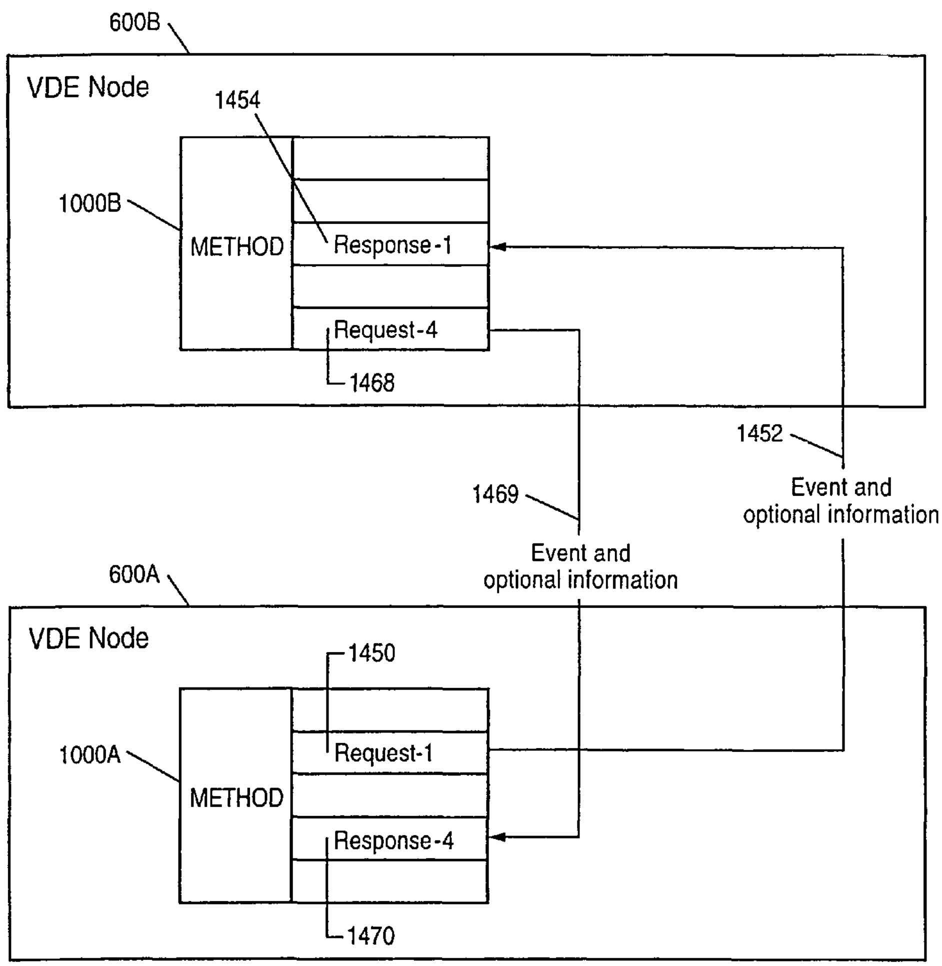

FIG. 41*b* extends the concepts presented in FIG. 41*a* to include a response from VDE node 600B back to VDE node 600A. The process starts as described for FIG. 41*a* through the receipt and processing of the request event and information 1452 by the response process 1454 in VDE node 600B. The response process 1454 may, as part of its processing, cooperate with another request, process (1468) to send a response 1469 back to the initiating VDE node 600A. A corresponding reciprocal process 1470 provided by method 1000A may respond to and process this request event 1469. In this manner, two or more VDE nodes 600A, 600B may cooperate and pass configurable information and requests between methods 10004, 1000B executing in the nodes. The first and second request-response sequences [(1450, 1452, 1454) and (1468, 1469, 1470)] may be separated by temporal and spatial distances. For efficiency, the request (1468) and response (1454) processes may be based on the same method 1000 or they may be implemented as two methods in the same or different method core, 1000. A method 1000 may be parameterized by an "event code" so it may provide different behaviors/results for different events, or different methods may be provided for different events.

Figure 41C:
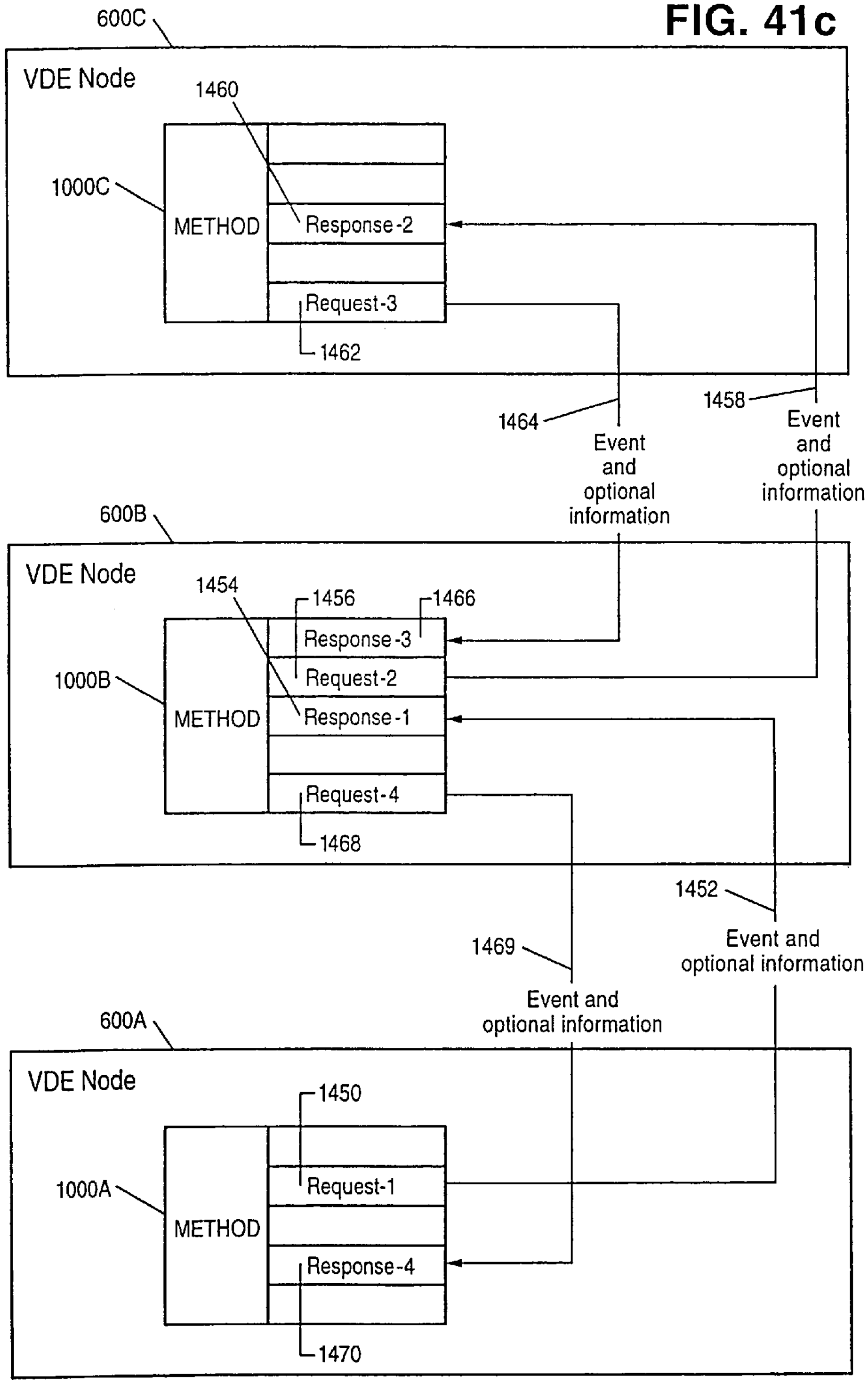

FIG. 41*c* shows the extension the control mechanism described in FIGS. 41*a*-41*b* to three nodes (600A, 600B, 600C). Each request-response pair operates in the manner as described for FIG. 41*b*, with several, pairs linked together to form a chain of control and handling between several VDE nodes 600A, 600B, 600C. This mechanism may be used to extend the chain of handling and control to an arbitrary number of VDE nodes using any configuration of nodes. For example, VDE node 600C might communicate directly to VDE node 600A and communicate directly to VDE 600B, which in turn communicates with VDE node 600A. Alternately, VDE node 600C might communicate directly with VDE node 600A, VDE node 600A may communicate with VDE node 600B, and VDE node 600B may communicate with VDE node 600C.

Figure 41D:
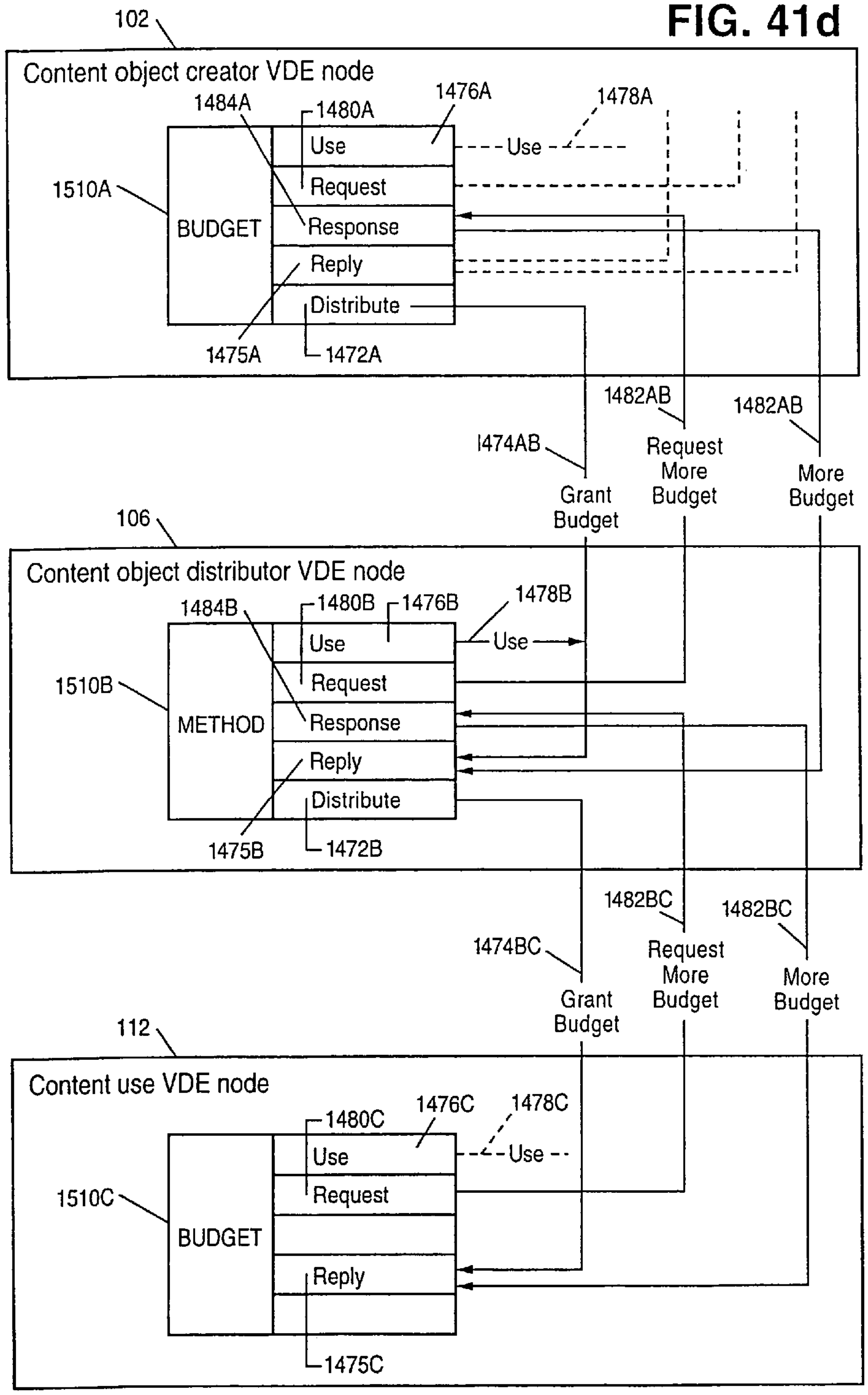

A method 1000 may be parameterized with sets of events that specify related or cooperative functions. Events may be logically grouped by function (e.g., use, distribute), or a set of reciprocal events that specify processes that may operate in conjunction with each other. FIG. 41*d* illustrates a set of "reciprocal events" that support cooperative processing between several VDE nodes 102, 106, 112 in a content distribution model to support the distribution of budget. The chain of handling and control, in this example, is enabled by using a set of "reciprocal events" specified within a BUDGET method. FIG. 41*d* is an example of how the reciprocal event behavior within an example BUDGET method (1510) work in cooperation to establish a chain of handling and control between several VDE nodes. The example BUDGET method 1510 responds to a "use" event 1478 by performing a "use" process 1476 that defines the mechanism by which processes are budgeted. The BUDGET method 1510 might, for example, specify a use process 1476 that compares a meter count to a budget value and fail the operation if the meter count exceeds the budget value. It might also write an audit trail that describes the results of said BUDGET decisions. Budget method 1510 may respond to a "distribute" event by performing a distribute process 1472 that defines the process and/or control information for further distribution of the budget. It may respond to a "request" event 1480 by performing a request process 1480 that specifies how the user might request use and/or distribution rights from a distributor. It may respond to a "response" event 1482 by performing a response process 1484 that specifies the manner in which a distributor would respond to requests from other users to whom they have distributed some (or all) of their budget to. It may respond to a "reply" event 1474 by performing a reply process 1475 that might specify how the user should respond to message regranting or denying (more) budget.

Control of event processing, reciprocal events, and their associated methods and method components is provided by PERCs 808 in the preferred embodiment. These PERCs (808) might, reference administrative methods that govern the creation, modification, and distribution of the data structures and administrative methods that permit access, modification, and, further distribution of these items. In this way, each link in the chain of handling and control might, for example, be able to customize audit information, alter the budget requirements for using the content, and/or control further distribution of these rights in a manner specified by prior members along the distribution chain.

In the example shown in FIG. 41*d*, a distributor at a VDE distributor node (106) might request budget from a content creator at another node (102). This request may be made in the context of a secure VDE communication or it may be passed in an "out-of-channel" communication (e.g. a telephone call or letter). The creator 102 may decide to grant budget to the distributor 106 and processes a distribute event (1452 in BUDGET method 1510 at VDE node 102). A result of processing the distribute event within the BUDGET method might be a secure communication (1454) between VDE nodes 102 and 106 by which a budget granting use and redistribute rights to the distributor 106 may be transferred from the creator 102 to the distributor. The distributor's VDE node 106 may respond to the receipt of the budget information by processing the communication using the reply process 1475B of the BUDGET method 1510. The reply event processing 1415B might, for example, install a budget and PERC 808 within the distributor's VDE 106 node to permit the distributor to access content or processes for which access is control at least in part by the budget and/or PERC. At some point, the distributor 106 may also desire to use the content to which she has been granted rights to access.

After registering to use the content object, the user 112 would be required to utilize an array of "use" processes 1476C to, for example, open, read, write, and/or close the content object as part of the use process.

Once the distributor 106 has used some or all of her budget, she may desire to obtain additional budget. The distributor 106 might then initiate a process using the BUDGET method request process (1480B). Request process 1480B might initiate a communication (1482AB) with the content creator VDE node 102 requesting more budget and perhaps providing details of the use activity to date (e.g., audit trails). The content creator 102 processes the 'get more budget' request event 1482AB using the response process (1484A) within the creator's BUDGET method 1510A. Response process 1484A might, for example, make a determination if the use information indicates proper use of the content, and/or if the distributor is credit worthy for more budget. The BUDGET method response process 1484A might also initiate a financial transaction to transfer funds from the distributor to pay for said use, or use the distribute process 1472A to distribute budget to the distributor 106. A response to the distributor 106 granting more budget (or denying more budget) might be sent immediately as a response to the request communication 1482AB or it might be sent at a later time as part of a separate, communication. The response communication, upon being received at the distributor's VDE node 106, might be processed using the reply process 1475B within the distributor's copy of the BUDGET method 1510B The reply process 1475B might then process the additional budget in the same manner as described above.

The chain of handling and control may, in addition to posting budget information, also pass control information that governs the manner in which said budget maybe utilized. For example, the control information specified in the above example may also contain control information describing the process and limits that apply to the distributor's redistribution of the right to use the creator's content object. Thus, when the distributor responds to a budget request from a user (a communication between a user at VDE node 112 to the distributor at VDE node 106 similar in nature to the one described above between VDE nodes 106 and 102) using the distribute process 1472B within the distributor's copy of the BUDGET method 1510B, a distribution and request/response/reply process similar to the one described above might be initiated.

Thus, in this example, a single method can provide multiple dynamic behaviors based on different "triggering" events. For example, single BUDGET method 1510 might support any or all of the events listed below:

Examples of Reciprocal Method Processes

| Event Type | Event | Process Description |
|---|---|---|
| "Use" Events | use budget | Use budget. |
| Request Events Processed by User | request more budget | Request more money for budget. |

-continued

Examples of Reciprocal Method Processes

| Event Type | Event | Process Description |
|---|---|---|
| Node Request Process 1480c | request audit by auditor #1 | Request that auditor #1 audit the budget use. |
| | request budget deletion | Request that budget be deleted from system. |
| | request method updated | Update method used for auditing |
| | request to change auditors | Change from auditor 1 to auditor 2, or vice versa. |
| | request different audit interval | Change time interval between audits |
| | request ability to provide budget copies | Request ability to provide copies of a budget. |
| | request ability to distribute budget | Request ability to distribute a budget to other users. |
| | request account status | Request information on current status of an account. |
| | Request New Method | Request new method. |
| | Request Method Update | Request update of method. |
| | Request Method Deletion | Request deletion of method. |
| Response Events Processed by User | receive more budget | Allocate more money to budget. |
| Node Request Process 1480C | receive method update | Update method. |
| | receive auditor change | Change from one auditor to another. |
| | receive change to audit interval | Change interval between audits. |
| | receive budget deletion | Delete budget. |
| | provide audit to auditor #1 | Forward audit information to auditor #1. |
| | provide audit to auditor #2 | Forward audit information to auditor #2. |
| | receive account status | Provide account status. |
| | Receive New | Receive new budget. |
| | Receive Method Update | Receive updated information. |
| | Receive More | Receive more for budget. |
| | Sent Audit | Send audit information. |
| | Perform Deletion | Delete information. |
| "Distribute" Events | Create New | Create new budget |
| | Provide More | Provide more for budget. |
| | Audit | Perform audit. |
| | Delete | Delete information. |
| | Reconcile | Reconcile budget and auditing. |
| | Copy | Copy budget. |
| | Distribute | Distribute budget. |
| | Method Modification | Modify method. |
| | Display Method | Display requested method. |
| "Request" Events | Delete | Delete information. |
| Processed by | Get New | Get new budget |
| Distributor Node | Get More | Get more for budget. |
| Request Process | Get Updated | Get updated information. |
| 1484B | Get Audited | Get audit information. |
| "Response Events" | Provide New to user. | Provide new budget to user. |
| Processed by | Provide More to user | Provide more budget to user. |
| Distributor Node | Provide Update to user | Provide updated budget to user. |
| Request Process 1484B | Audit user | Audit a specified user. |
| | Delete user's method | Delete method belonging to user. |

A. Budget

Figure 42A:
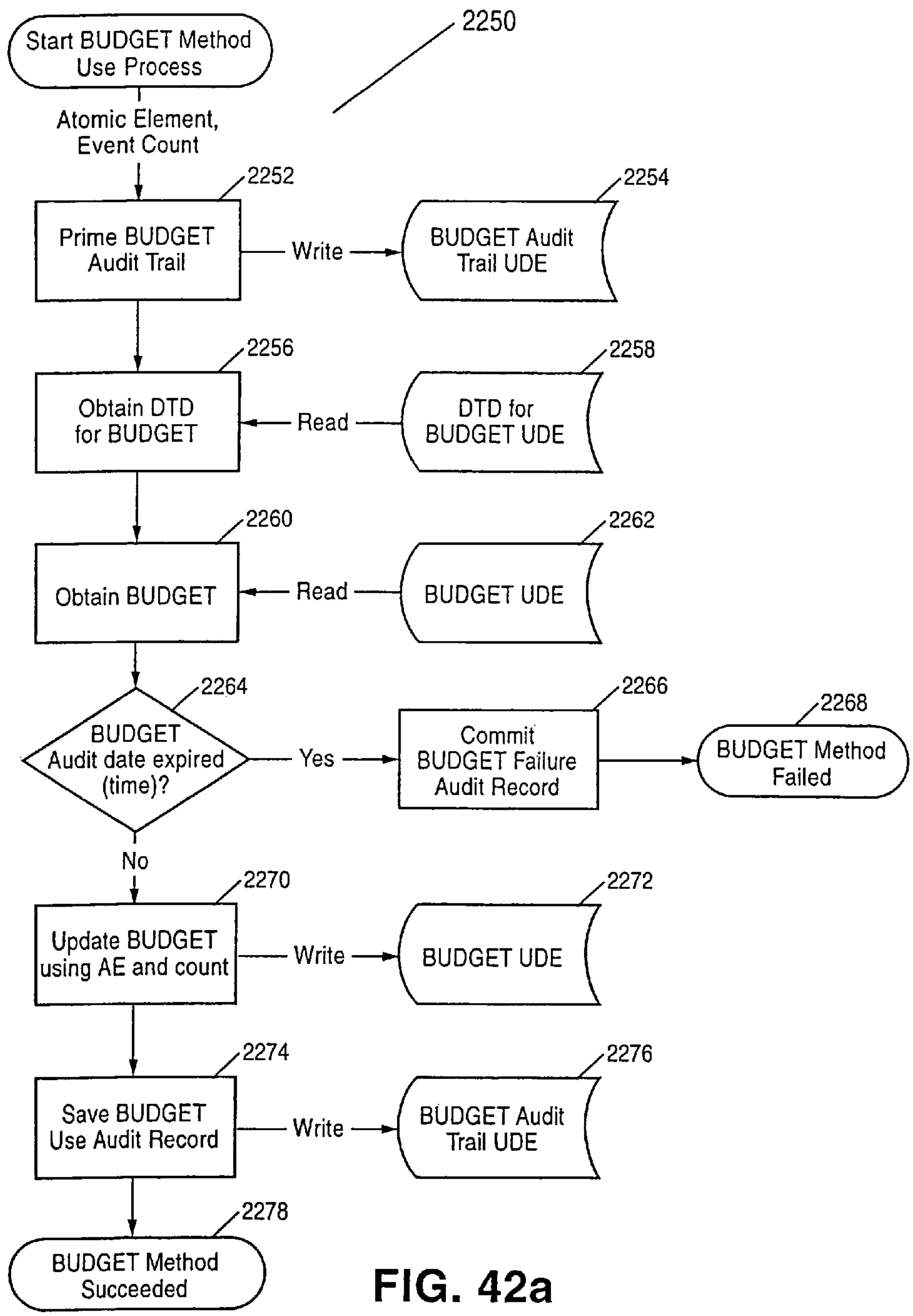
FIGS. 42A-42D show an example of a "reciprocal" BUDGET method.
Figure 42B:
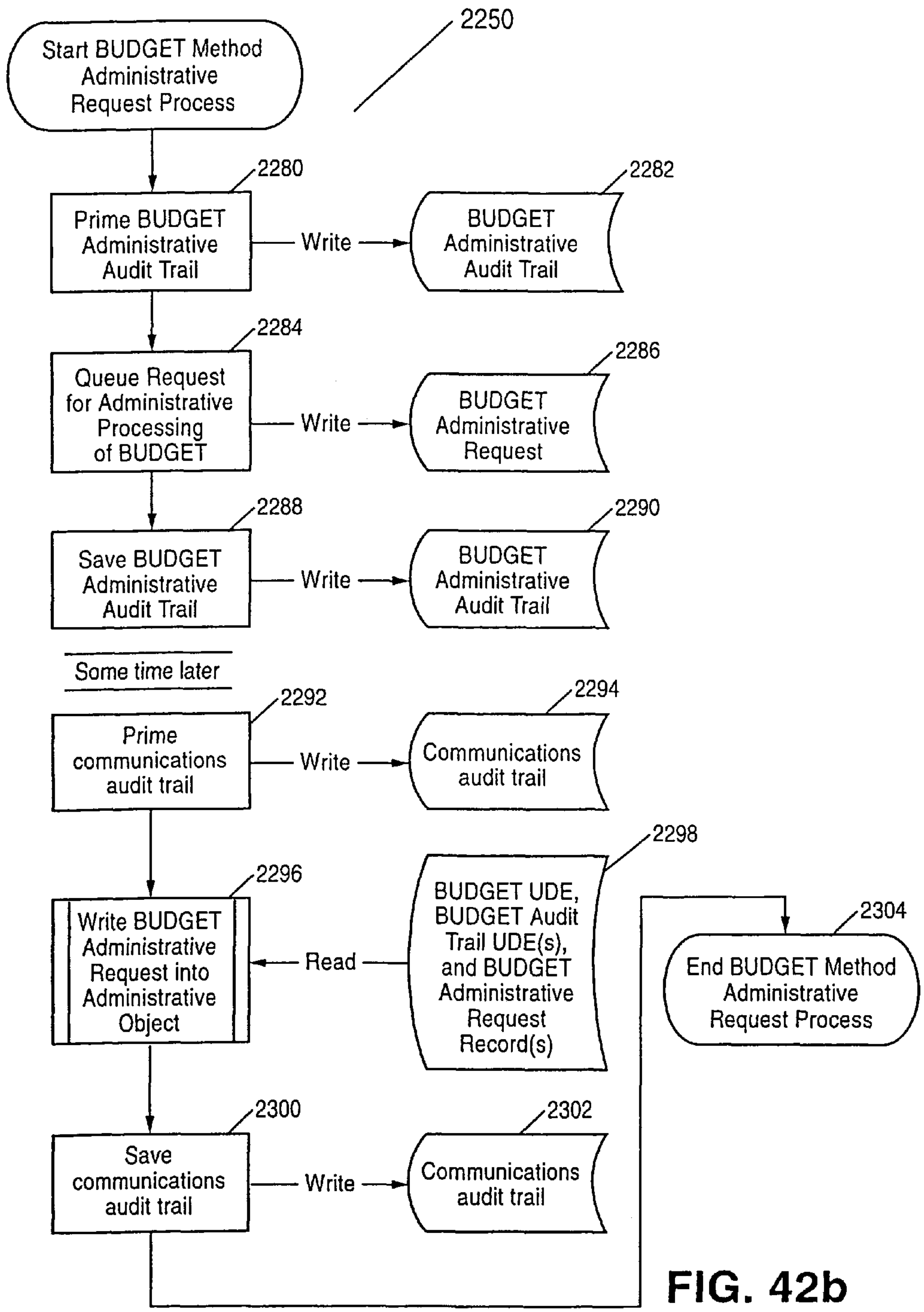
Figure 42C:
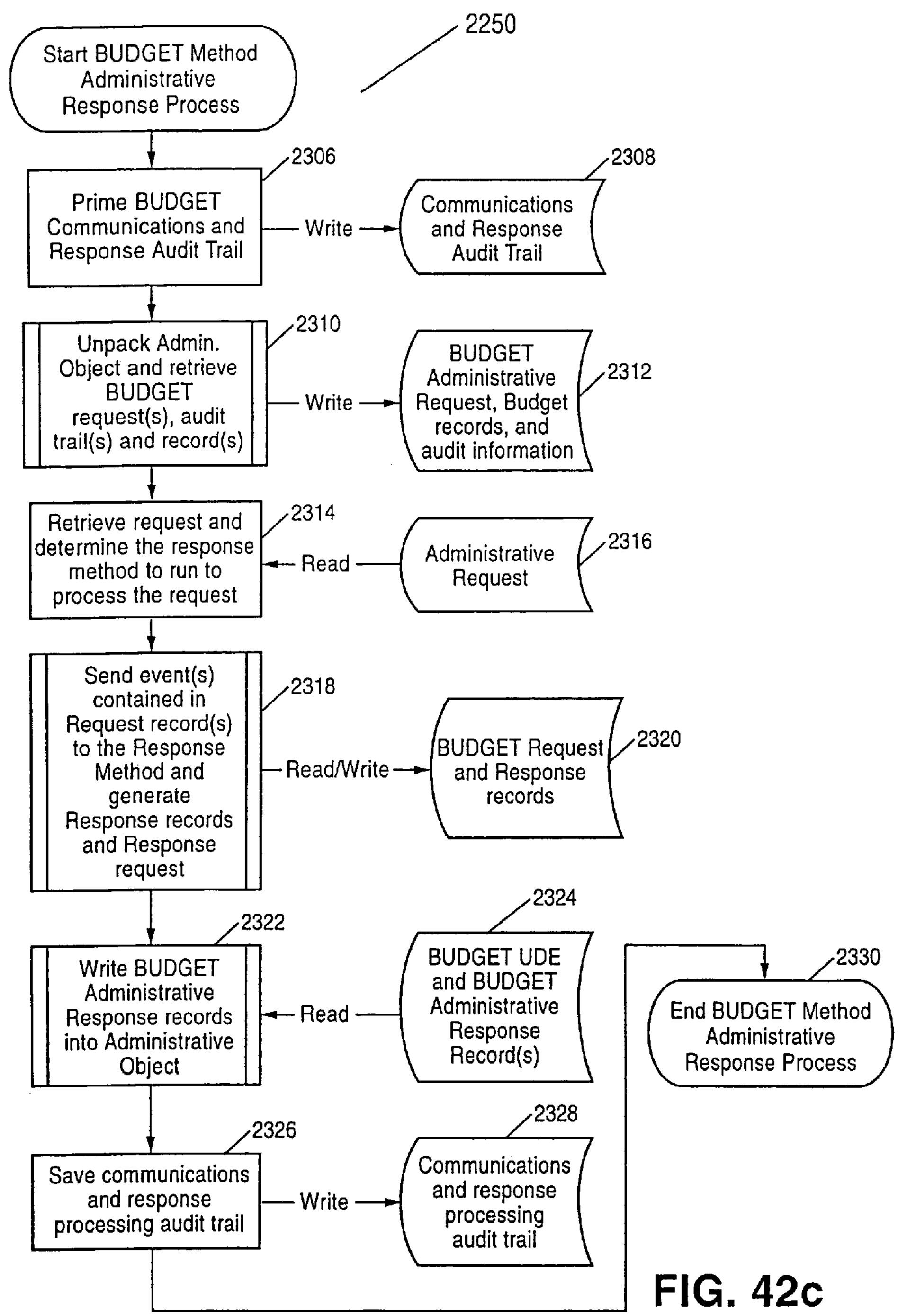
Figure 42D:
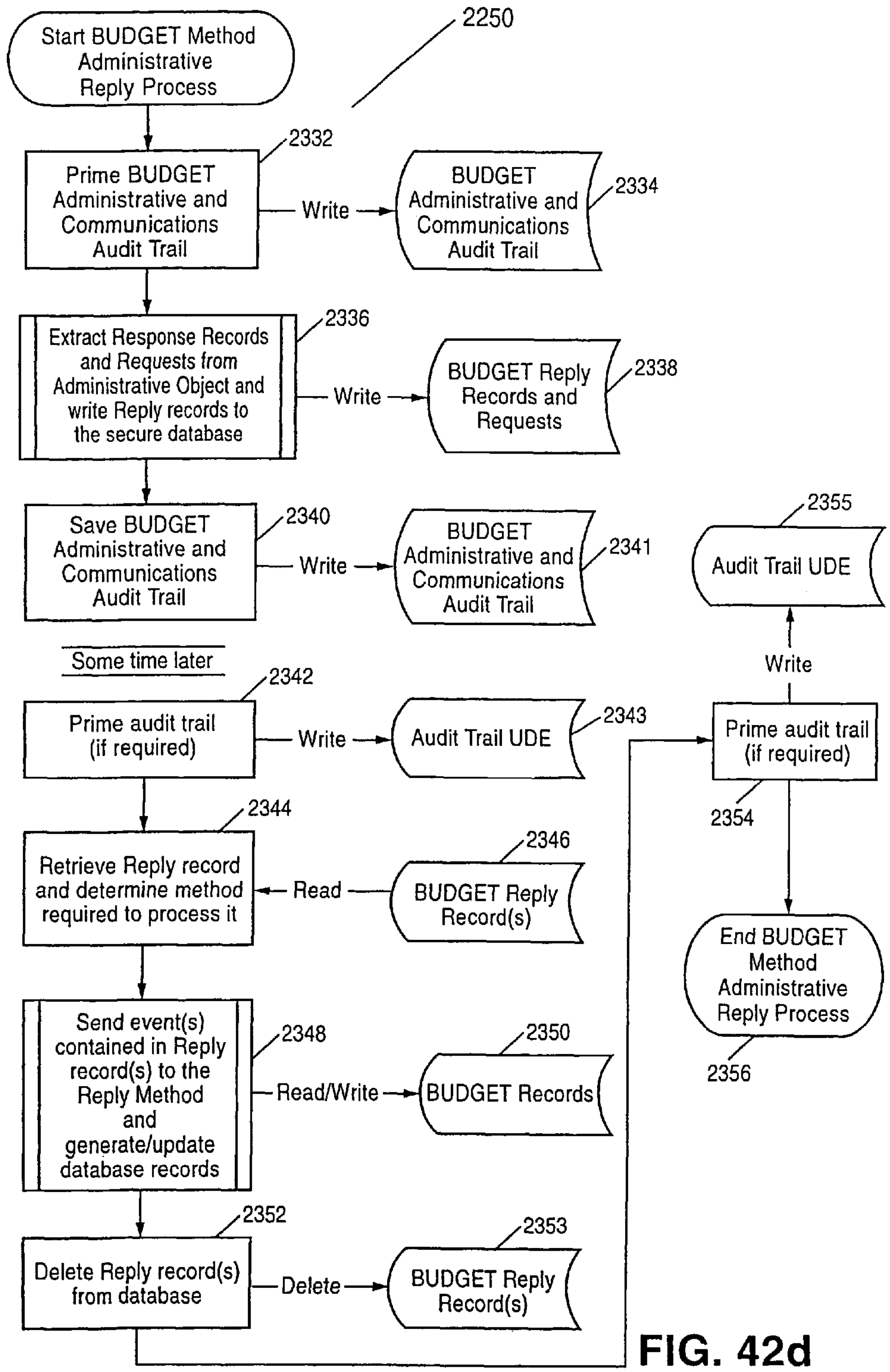

FIGS. 42*a*, 42*b*, 42*c* and 42*d*, respectively, are flowcharts of example process control steps performed by a representative example of BUDGET method 2250 provided by the preferred embodiment. In the preferred embodiment, BUDGET method 2250 may operate in any of four different modes:

use (see FIG. 42*a*)

administrative request (see FIG. 42*b*)

administrative response (see FIG. 42*c*)

administrative reply (see FIG. 42*d*).

In general, the "use" mode of BUDGET method 2250 is invoked in response to an event relating to the use of an object or its content. The "administrative request" mode of BUDGET method 2250 is invoked by or on behalf of the user in response to some user action that requires contact with a VDE financial provider, and basically its task is to send an administrative request to the VDE financial provider. The "administrative response" mode of BUDGET method 2250 is performed at the VDE financial provider in response to receipt of an administrative request sent from a VDE node to the VDE financial provider by the "administrative request" invocation of BUDGET method 2250 shown in FIG. 42*b*. The "administrative response" invocation of BUDGET method 2250 results in the transmission of an administrative object from VDE financial provider to the VDE user node. Finally, the "administrative reply" invocation of BUDGET method 2250 shown in FIG. 42*d* is performed at the user VDE node upon receipt of the administrative object sent by the "administrative response" invocation of the method shown in FIG. 42*c*.

In the preferred embodiment, the same BUDGET method 2250 performs each of the four different step sequences shown in FIGS. 42*a*-42*d*. In the preferred embodiment, different event codes may be passed to the BUDGET in method 2250 to invoke these various different modes. Of course, it would be possible to use four separate BUDGET methods instead of a single BUDGET method with four different "dynamic personalities," but the preferred embodiment obtains certain advantages by using the same BUDGET method for each of these four types of invocations.

Looking at FIG. 42*a*, the "use" invocation of BUDGET method 2250 first primes the Budget Audit Trail (blocks 2252, 2254). It then obtains the DTD for the Budget UDE, which it uses to obtain and read the Budget UDE blocks 2256-2262). BUDGET method 2250 in this "use" invocation may then determine whether a Budget Audit date has expired, and terminate if it has ("yes" exit to decision block 2264; blocks 2266, 2268). So long as the Budget Audit date has not expired, the method may then update the Budget using the atomic element and event counts (and possibly other information) (blocks 2270, 2272), and may then save a Budget User Audit record in a Budget Audit Trail UDE (blocks 2274, 2276) before terminating (at terminate point 2278).

Looking at FIG. 42*b*, the first six steps (blocks 2280-2290) may be performed by the user VDE node in response to some user action (e.g., request to access new information, request for a new budget, etc.). This "administrative request" invocation of BUDGET method 2250 may prime an audit trail (blocks 2280, 2282). The method may then place a request for administrative processing of an appropriate Budget onto a request queue (blocks 2284, 2286). Finally, the method may save appropriate audit trail information (blocks 2288, 2290). Sometime later, the user VDE node may prime a communications audit trail (blocks 2292, 2294), and may then write a Budget Administrative Request into an administrative object (block 2296). This step may obtain information from the secure database as needed from such sources such as, for example, Budget UDE, Budget Audit Trail UDE(s); and Budget Administrative Request Record(s) (block 2298).

Block 2296 may then communicate the administrative object to a VDE financial provider, or alternatively, block 2296 may pass administrative object to a separate communications process or method that arranges for such communications to occur. If desired, method 2250 may then save a communications audit trail (blocks 2300, 2302) before terminating (at termination point 2304).

FIG. 42*c* is a flowchart of an example of process control steps performed by the example of BUDGET method 2250 provided by the preferred embodiment operating in an "administrative response" mode. Steps shown in FIG. 42*c* would, for example, be performed by a VDE financial provider who has received an administrative object containing a Budget administrative request as created (and communicated to a VDE administrator for example) by FIG. 42*b* (block 2296).

Upon receiving the administrative object, BUDGET method 250 at the VDE financial provider site may prime a budget communications and response audit trail (blocks 2306, 2308), and may then unpack the administrative object and retrieve the budget request(s), audit trail(s) and record(s) it contains (block 2310). This information retrieved from the administrative object may be written by the VDE financial provider into its secure database (block 2312). The VDE financial provider may then retrieve the budget request(s) and determine the response method it needs to execute to process the request (blocks 2314, 2316). BUDGET method 2250 may send the event(s) contained in the request record(s) to the appropriate response method and may generate response records and response requests based on the RESPONSE method (block 2318). The process performed by block 2318 may satisfy the budget request by writing appropriate new response records into the VDE financial provider's secure database (block 2320). BUDGET method 2250 may then write these Budget administrative response records into an administrative object (blocks 2322, 2324), which it may then communicate back to the user node that initiated the budget request. BUDGET method 2250 may then save communications and response processing audit trail information into appropriate audit trail UDE(s) (blocks 2326, 2328) before terminating (at termination point 2330).

FIG. 42*d* is a flowchart of an example of program control steps performed by a representative example of BUDGET method 2250 operating in an "administrative reply" mode. Steps shown in FIG. 42*d* might be performed, for example, by a VDE user node upon receipt of an administrative object containing budget-related information. BUDGET method 2250 may first prime a Budget administrative and communications audit trail (blocks 2332, 2334). BUDGET method 2250 may then extract records and requests from a received administrative object and write the reply record to the VDE secure database (blocks 2336, 2338). The VDE user node may then save budget administrative and communications audit trail information in an appropriate audit trail UDE(s) (blocks 2340, 2341).

Sometime later, the VDE user node may retrieve the reply record from the secure database and determine what method is required to process it (blocks 2344,2346). The VDE user node may, optionally, prime an audit trail (blocks 2342, 2343) to record the results of the processing of the reply event. The BUDGET method 2250 may then send event(s) contained in the reply record(s) to the REPLY method, and may generate/update the secure database records as necessary to, for example, insert new budget records, delete old budget records and/or apply changes to budget records (blocks 2348, 2350).

BUDGET method 2250 may then delete the reply record from the secure data base (blocks 2352, 2353) before writing the audit trail (if required) (blocks-2354*m* 2355) terminating (at terminate point 2356).

B. Register

FIGS. 43*a*-43*d* are flowcharts of an example of program control steps performed by a representative example of a REGISTER method 2400 provided by the preferred embodiment. In this example, the REGISTER method 2400 performs the example steps shown in FIG. 43*a* when operating in a "use" mode, performs the example steps shown in FIG. 43*b* when operating in an "administrative request" mode, performs the steps shown in FIG. 43*c* when operating in an "administrative response" mode, and performs the steps shown in FIG. 43*d* when operating in an "administrative reply" mode.

Figure 43A:
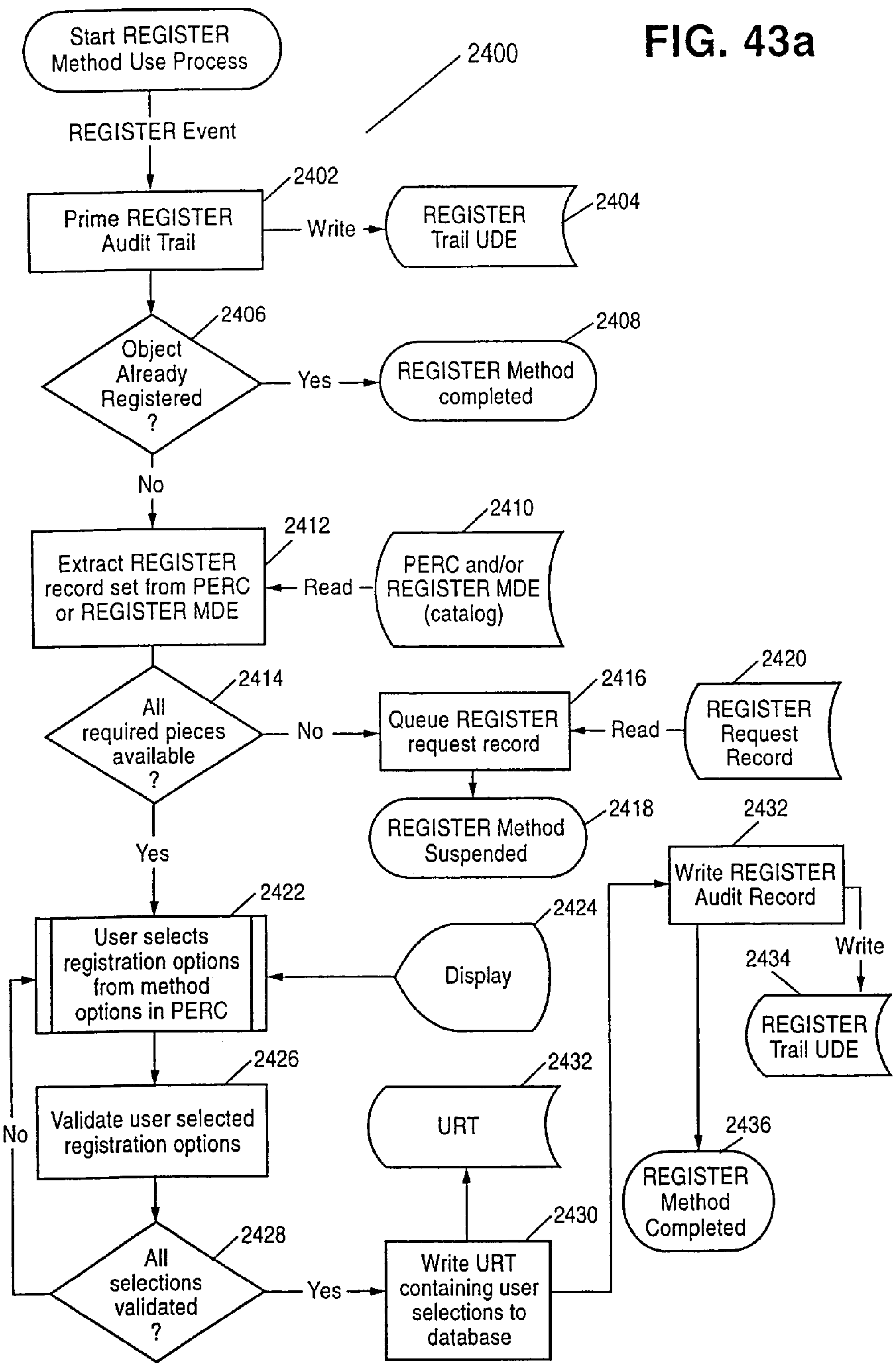
FIGS. 43A-43D show an example of a "reciprocal" REGISTER method.

The steps shown in FIG. 43*a* may be, for example, performed at a user VDE node in response to some action by or on behalf of the user. For example the user may ask to access an object that has not yet been (or is not now) properly registered to her. In response to such a user request, the REGISTER method 2400 may prime a Register Audit Trail UDE (blocks 2402, 2404) before determining whether the object being requested has already been registered (decision block 2406). If the object has already been registered ("yes" exit to decision block 2406), the REGISTER method may terminate (at termination point 2408). If the object is not already registered ("no" exit to decision block 2406), then REGISTER method 2400 may access the VDE node secure database PERC 808 and/or Register MDE (block 2410). REGISTER method 2400 may extract an appropriate Register Record Set from this PERC 808 and/or Register MDE (block 2412), and determine whether all of the required elements are present that are needed to register the object (decision block 2414). If some piece(s) is missing ("no" exit to decision block 2414), REGISTER method 2400 may queue a Register request record to a communication manager and then suspend the REGISTER method until the queued request is satisfied (blocks 2416, 2418). Block 2416 may have the effect of communicating a register request to a VDE distributor, for example. When the request is satisfied and the register request record has been received (block 2420), then the test of decision block 2414 is satisfied ("yes" exit to decision block 2414), and REGISTER method 2400 may proceed. At this stage, the REGISTER method 2400 may allow the user to select Register options from the set of method options allowed by PERC 808 accessed at block 2410 (block 2422). As one simple example, the PERC 808 may permit the user to pay by VISA or MasterCard but not by American Express; block 2422 may display a prompt asking the user to select between paying using her VISA card and paying using her MasterCard (block 2424). The REGISTER method 2400 preferably validates the user selected registration options and requires the user to select different options if the initial user options were invalid (block 2426, "no" exit to decision block 2428). Once the user has made all required registration option selections and those selections have been validated ("yes" exit to decision block 2428), the REGISTER method 2400 may write an User Registration Table (URT) corresponding to this object and this user which embodies the user registration selections made by the user along with other registration information required by PERC 808 and/or the Register MDE (blocks 2430, 2432). REGISTER method 2400 may then write a Register audit record into the secure database (blocks 2432, 2434) before terminating (at terminate point 2436).

Figure 43B:
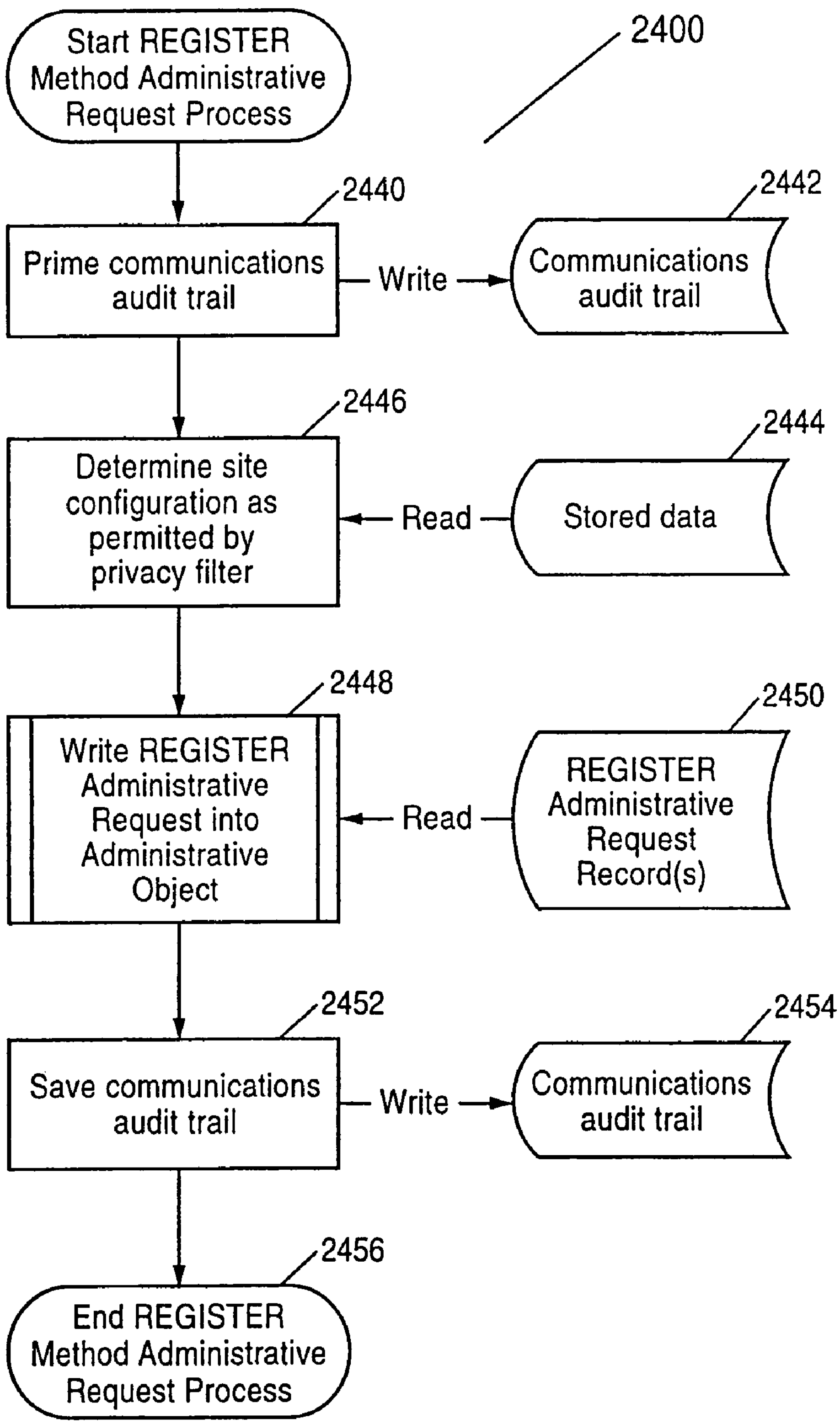

FIG. 43*b* shows an example of an "administrative request" mode of REGISTER method 2400. This Administrative Request Mode may occur on a VDE user system to generate an appropriate administrative object for communication to a VDE distributor or other appropriate VDE participant requesting registration information. Thus, for example, the steps shown in FIG. 43*b* may be performed as part of the "queue register request record" block 2416 shown in FIG. 43*a*. To make a Register administrative request, REGISTER method 2400 may first prime a communications audit trail (blocks 2440, 2442), and then access the secure database to obtain data about registration (block 2444). This secure database access may, for example, allow the owner and/or publisher of the object being registered to find out demographic, user or other information about the user. As a specific example, suppose that the object being registered is a spreadsheet software program. The distributor of the object may want to know what other software the user has registered. For example, the distributor may be willing to give preferential pricing if the user registers a "suite" of multiple software products distributed by the same distributor. Thus, the sort of information solicited by a "user registration" card enclosed with most standard software packages may be solicited and automatically obtained by the preferred embodiment at registration time. In order to protect the privacy rights of the user, REGISTER method 2400 may pass such user-specific data through a privacy filter that may be at least in part customized by the user so the user can prevent certain information from being revealed to the outside world (block 2446). The REGISTER method 2400 may write the resulting information along with appropriate Register Request information identifying the object and other appropriate parameters into an administrative object (blocks 2448, 2450). REGISTER method 2400 may then pass this administrative object to a communications handler REGISTER method 2400 may then save a communications audit trail (blocks 2452, 2454) before terminating (at terminate point 2456).

Figure 43C:
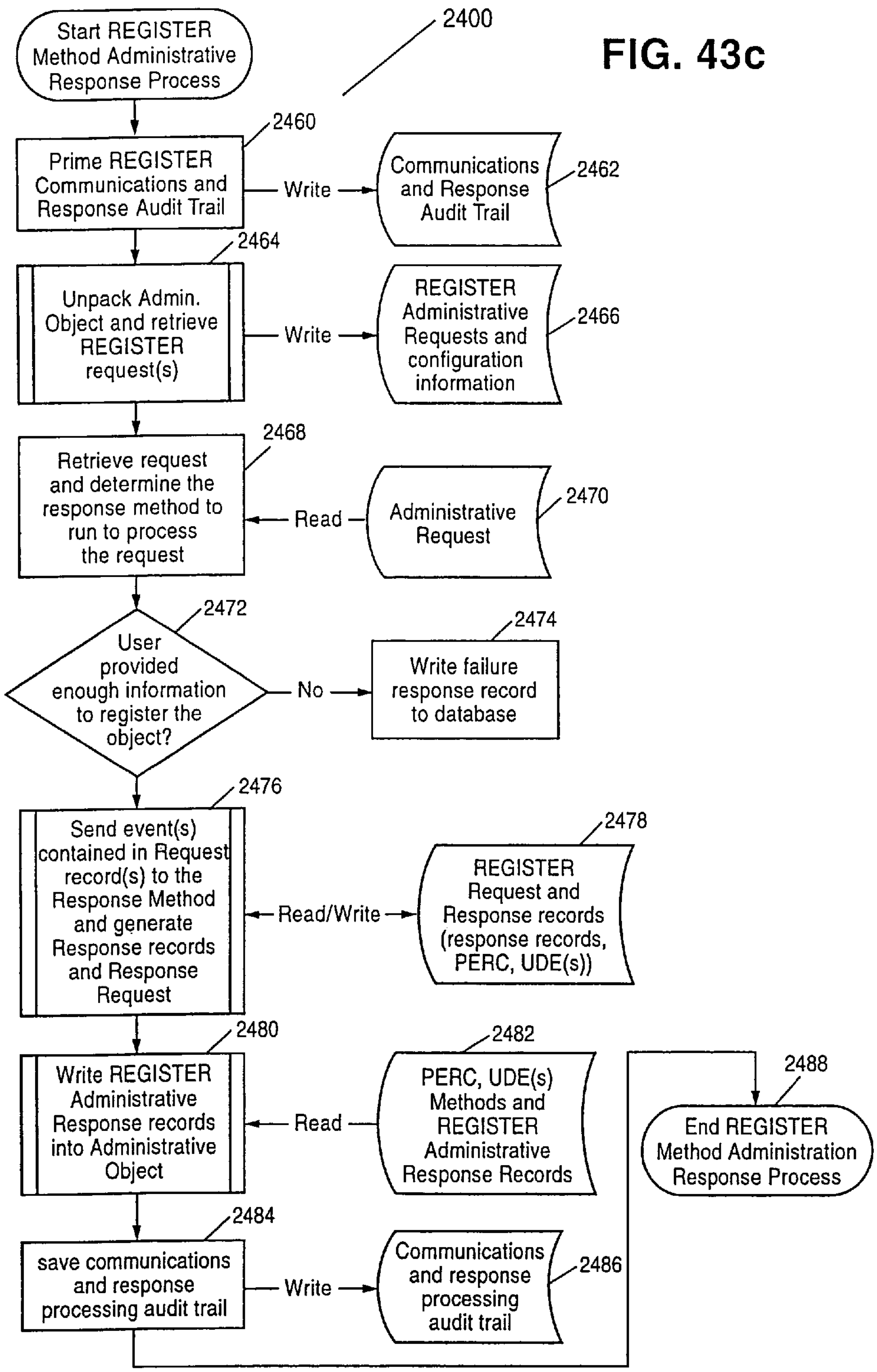

FIG. 43*c* includes REGISTER method 2400 steps that may be performed by a VDE distributor node upon receipt of Register Administrative object sent by block 2448, FIG. 43*b*. REGISTER method 2400 in this "administrative response" mode may prime appropriate audit trails (blocks 2460, 2462), and then may unpack the received administrative object and write the associated register request(s) configuration information into the secure database (blocks 2464, 2466). REGISTER method 2400 may then retrieve the administrative request from the secure database and determine which response method to run to process the request (blocks 2468, 2470). If the user fails to provide sufficient information to register the object, REGISTER method 2400 may fail (blocks 2472, 2474). Otherwise, REGISTER method 2400 may send event(s) contained in the appropriate request record(s) to the appropriate response method, and generate and write response records and response requests (e.g., PERC(s) and/or UDEs) to the secure database (blocks 2476, 2478). REGISTER method 2400 may then write the appropriate Register administrative response record into an administrative object (blocks 2480, 2482). Such information may include, for example, one or more replacement PERC(s) 808, methods, UDE(s), etc. (block 2482). This enables, for example, a distributor to distribute limited right permissions giving users only enough information to register an object, and then later, upon registration, replacing the limited right permissions with wider permissioning scope granting the user more complete access to the objects. REGISTER method 2400 may then save the communications and response processing audit trail (blocks 2484, 2486), before terminating (at terminate point 2488).

Figure 43D:
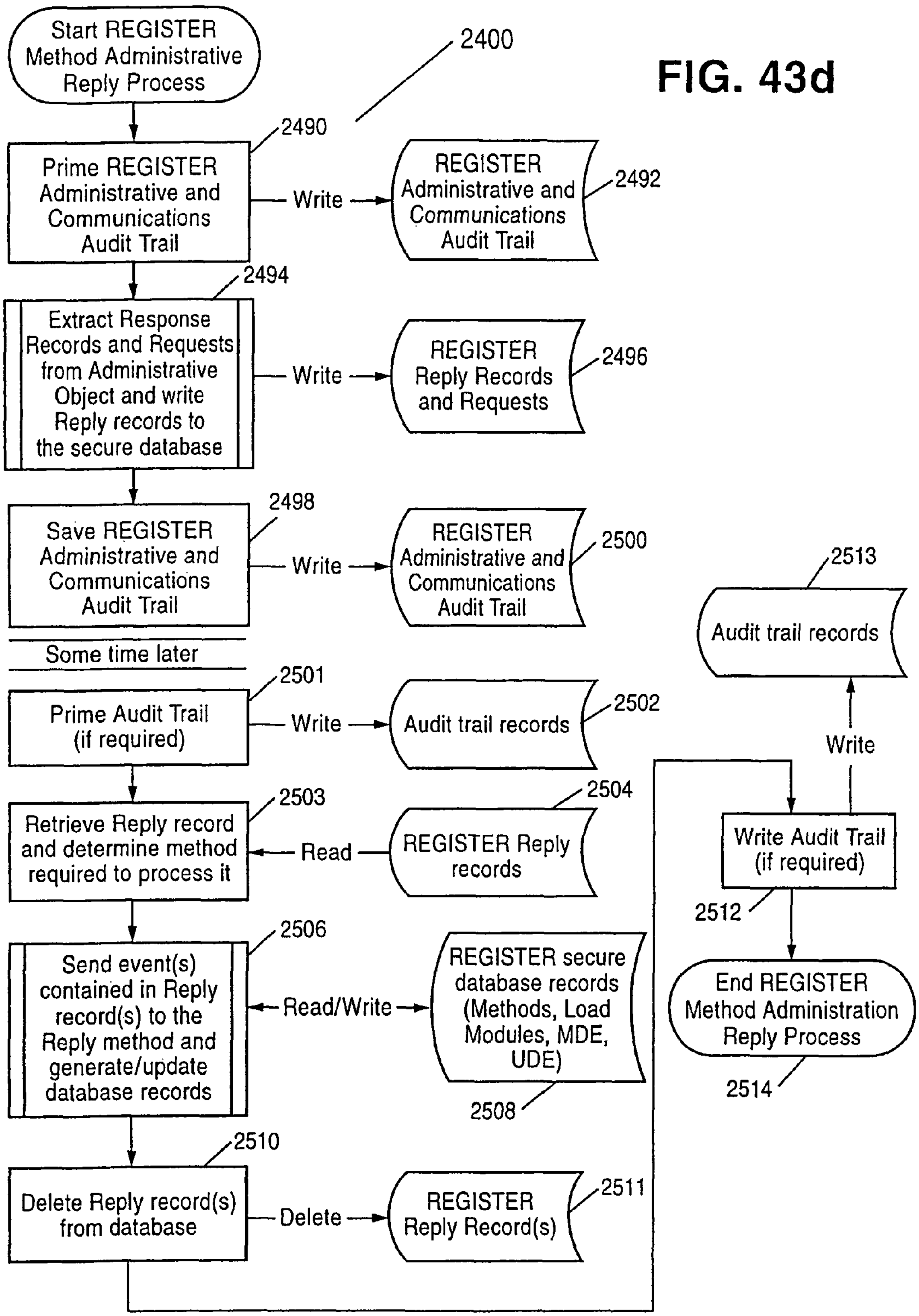

FIG. 43*d* shows steps that may be performed by the VDE user node upon receipt of the administrative object generated/transmitted by FIG. 43*c* block 2480. The steps shown in FIG. 43*d* are very similar to those shown in FIG. 42*d* for the BUDGET method administrative reply process.

C. Audit

Figure 44A:
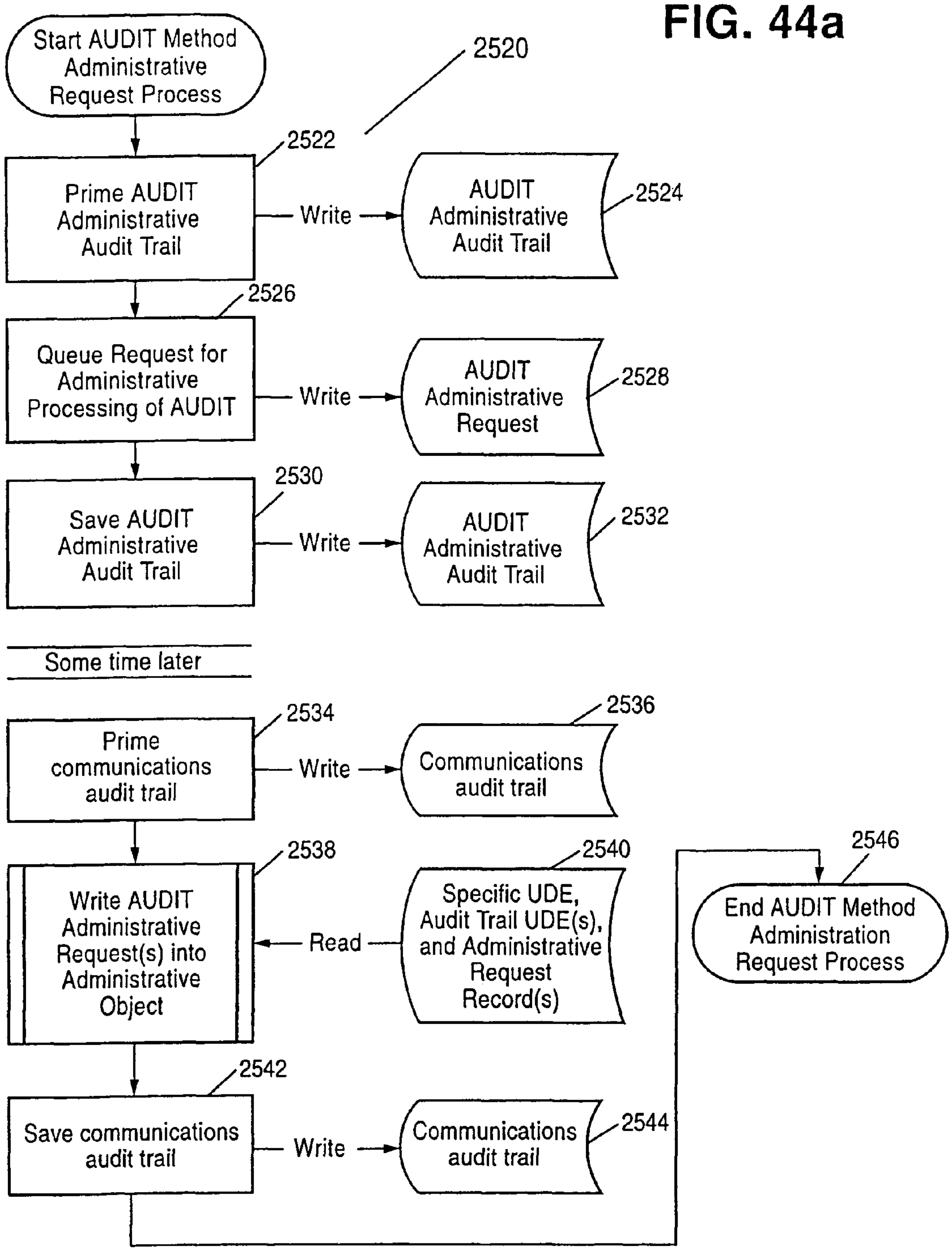
FIGS. 44A-44C show an example of a "reciprocal" AUDIT method.
Figure 44B:
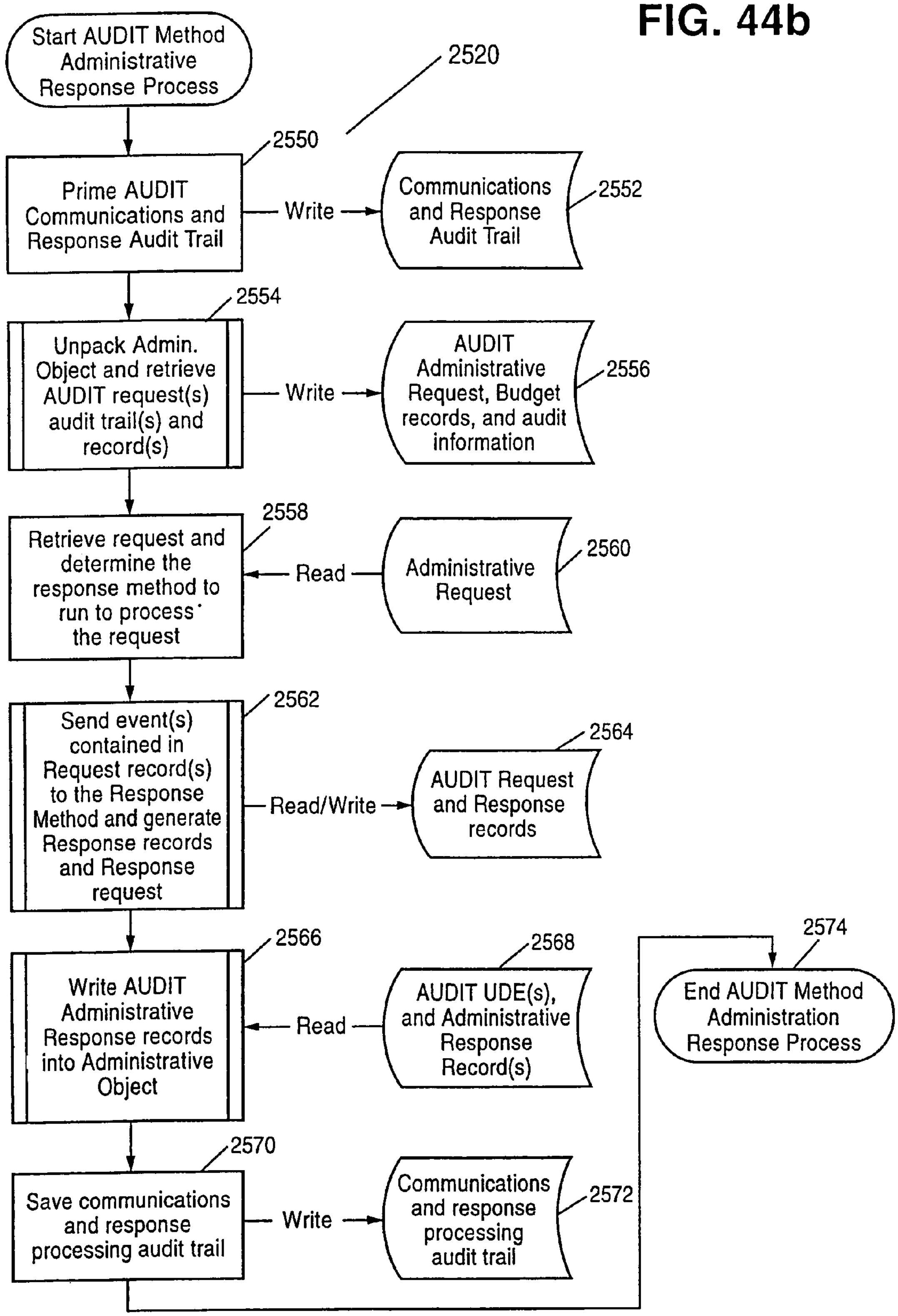
Figure 44C:
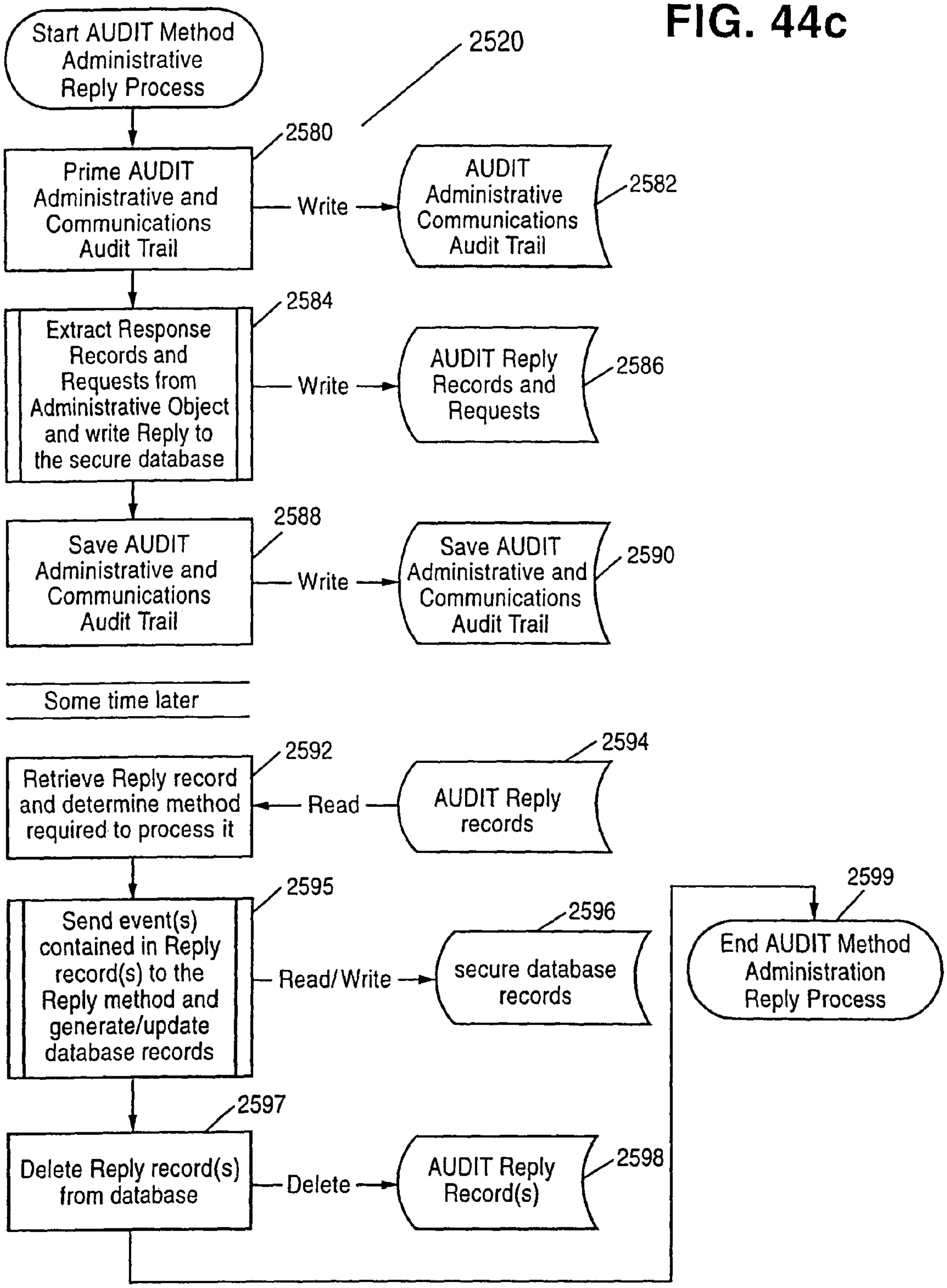

FIGS. 44*a*-44*c* are flowcharts of examples of program control steps performed by a representative example of an AUDIT method 2520 provided by the preferred embodiment. As in the examples above, the AUDIT method 2520 provides three different operational modes in this preferred embodiment example: FIG. 44*a* shows the steps performed by the AUDIT method in an "administrative request" mode; FIG. 44*b* shows steps performed by the method in the "administrative response" mode; and FIG. 44*c* shows the steps performed by the method in an "administrative reply" mode.

The AUDIT method 2520 operating in the "administrative request" mode as shown in FIG. 44*a* is typically performed, for example, at a VDE user node based upon some request by or on behalf of the user. For example, the user may have requested an audit, or a timer may have expired that initiates communication of audit information to a VDE content provider or other VDE participant. In the preferred embodiment, different audits of the same overall process may be performed by different VDE participants. A particular "audit" method 2520 invocation may be initiated for any one (or all) of the involved VDE participants. Upon invocation of AUDIT method 2520, the method may prime an audit administrative audit trail (thus, in the preferred embodiment, the audit processing may itself be audited) (blocks 2522, 2524). The AUDIT method 2520 may then queue a request for administrative processing (blocks 2526, 2528), and then may save the audit administrative audit trail in the secure database (blocks 2530, 2532). Sometime later, AUDIT method 2520 may prime a communications audit trail (blocks 2534, 2536), and may then write Audit Administrative Request(s) into one or more administrative object(s) based on specific UDE, audit trail UDE(s), and/or administrative record(s) stored in the secure database (blocks 2538, 2540). The AUDIT method 2520 may then save appropriate information into the communications audit trail (blocks 2542, 2544) before terminating (at terminate point 2546).

FIG. 44*b* shows example steps performed by a VDE content provider, financial provider or other auditing VDE node upon receipt of the administrative object generated and communicated by FIG. 44*a* block 2538. The AUDIT method 2520 in this "administrative response" mode may first prime an Audit communications and response audit trail (blocks 2550, 2552), and may then unpack the received administrative object and retrieve its contained Audit request(s) audit trail(s) and audit record(s) for storage into the secured database (blocks 2554, 2556). AUDIT method 2520 may then retrieve the audit request(s) from the secure database and determine the response method to run to process the request (blocks 2558, 2560). AUDIT method 2520 may at this stage send event(s) contained in the request record(s) to the appropriate response method, and generate response record(s) and requests based on this method (blocks 2562, 2564). The processing block 2562 may involve a communication to the outside world.

For example, AUDIT method 2520 at this point could call an external process to perform, for example, an electronic funds transfer against the user's bank account or some other bank account. The AUDIT administrative response can, if desired, call an external process that interfaces VDE to one or more existing computer systems. The external process could be passed the user's account number, PIN, dollar amount, or any other information configured in, or associated with, the VDE audit trail being processed. The external process can communicate with non-VDE hosts and use the information passed to it as part of these communications. For example, the external process could generate automated clearinghouse (ACH) records in a file for submittal to a bank. This mechanism would provide the ability to automatically credit or debit a bank account in any financial institution. The same mechanism could be used to communicate with the existing credit card (e.g. VISA) network by submitting VDE based charges against the charge account.

Once the appropriate Audit response record(s) have been generated, AUDIT method 2520 may write an Audit administrative record(s) into an administrative object for communication back to the VDE user node that generated the Audit request (blocks 2566, 2568). The AUDIT method 2520 may then save communications and response processing audit information in appropriate audit trail(s) (blocks 2570, 2572) before terminating (at terminate point 2574).

FIG. 44*c* shows an example of steps that may be performed by the AUDIT method 2520 back at the VDE user node upon receipt of the administrative object generated and sent by FIG. 44*b*, block 2566. The steps 2580-2599 shown in FIG. 44*c* are similar to the steps shown in FIG. 43*d* for the REGISTER method 2400 in the "administrative reply" mode. Briefly, these steps involve receiving and extracting appropriate response records from the administrative object (block 2584), and then processing the received information appropriately to update secure database records and perform any other necessary actions (blocks 2595, 2596).

Examples of Event-Driven Content-Based Methods

VDE methods 1000 are designed to provide a very flexible and highly modular approach to secure processing. A complete VDE process to service a "use event" may typically be constructed as a combination of methods 1000. As one example, the typical process for reading content or other information from an object 300 may involve the following methods:

an EVENT method
a METER method
a BILLING method
a BUDGET method.

Figure 45:
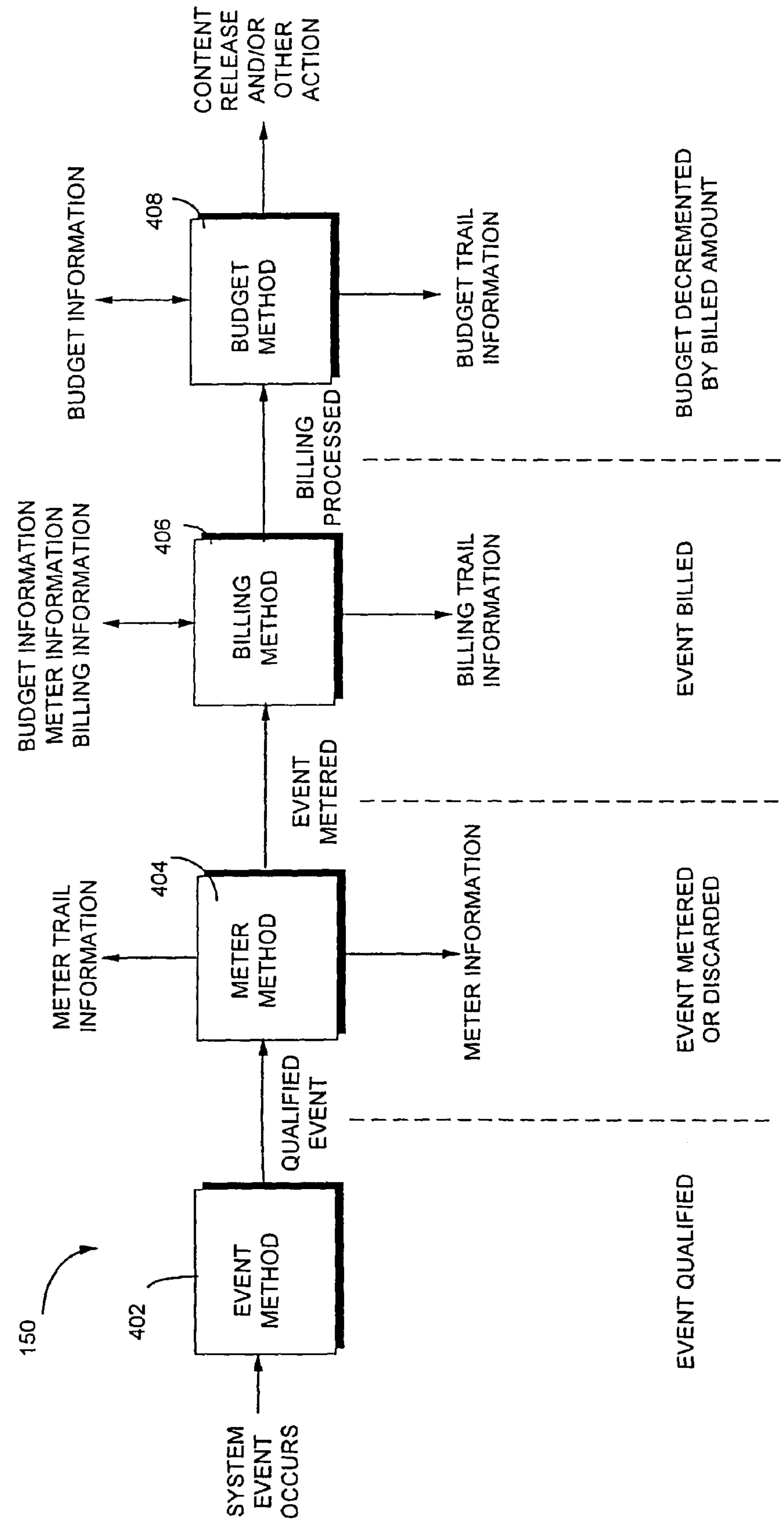
FIGS. 45-48 show examples of several methods being used together to control release of content or other information.

FIG. 45 is an example of a sequential series of methods performed by VDE 100 in response to an event. In this example, when an event occurs, an EVENT method 402 may "qualify" the event to determine whether it is significant or not. Not all events are significant. For example, if the EVENT method 1000 in a control process dictates that usage is to be metered based upon number of pages read, then user request "events" for reading less than a page of information may be ignored. In another example, if a system event represents a request to read a certain number of bytes, and the EVENT method 1000 is part of a control process designed to meter paragraphs, then the EVENT method may evaluate the read request to determine how many paragraphs are represented in the bytes requested. This process may involve mapping to "atomic elements" to be discussed in more detail below.

EVENT method 402 filters out events that are not significant with regard to the specific control method involved. EVENT method 402 may pass on qualified events to a METER process 1404, which meters or discards the event based on its own particular criteria.

In addition, the preferred embodiment provides an optimization called "precheck." EVENT method/process 402 may perform this "precheck" based on metering, billing and budget information to determine whether processing based on an event will be allowed. Suppose, for example, that the user has already exceeded her budget with respect to accessing certain information content so that no further access is permitted. Although BUDGET method 408 could make this determination, records and processes performed by BUDGET method 404 and/or BILLING method 406 might have to be "undone" to, for example, prevent the user from being charged for an access that was actually denied. It may be more efficient to perform a "precheck" within EVENT method 402 so that fewer transactions have to be "undone."

METER method 404 may store an audit record in a meter "trail" UDE 1200, for example, and may also record information related to the event in a meter UDE 1200. For example, METER method 404 may increment or decrement a "meter" value within a meter UDE 1200 each time content is accessed. The two different data structures (meter UDE and meter trail UDE) may be maintained to permit record keeping for reporting purposes to be maintained separately from record keeping for internal operation purposes, for example.

Once the event is metered by METER method 404, the metered event may be processed by a BILLING method 406. BILLING method 406 determines how much budget is consumed by the event, and keeps records that are useful for reconciliation of meters and budgets. Thus, for example, BILLING method 406 may read budget information from a budget UDE, record billing information in a billing UDE, and write one or more audit records in a billing trail UDE. While some billing trail information may duplicate meter and/or budget trail information, the billing trail information is useful, for example, to allow a content creator 102 to expect a payment of a certain size, and serve as a reconciliation check to reconcile meter trail information sent to creator 102 with budget trail information sent to, for example, an independent budget provider.

BILLING method 406 may then pass the event on to a BUDGET method 408. BUDGET method 408 sets limits and records transactional information associated with those limits. For example, BUDGET method 408 may store budget information in a budget UDE, and may store an audit record in a budget trail UDE. BUDGET method 408 may result in a "budget remaining" field in a budget UDE being decremented by an amount specified by BILLING method 406.

The information content may be released, or other action taken, once the various methods 402, 404, 406, 408 have processed the event.

Figure 46:
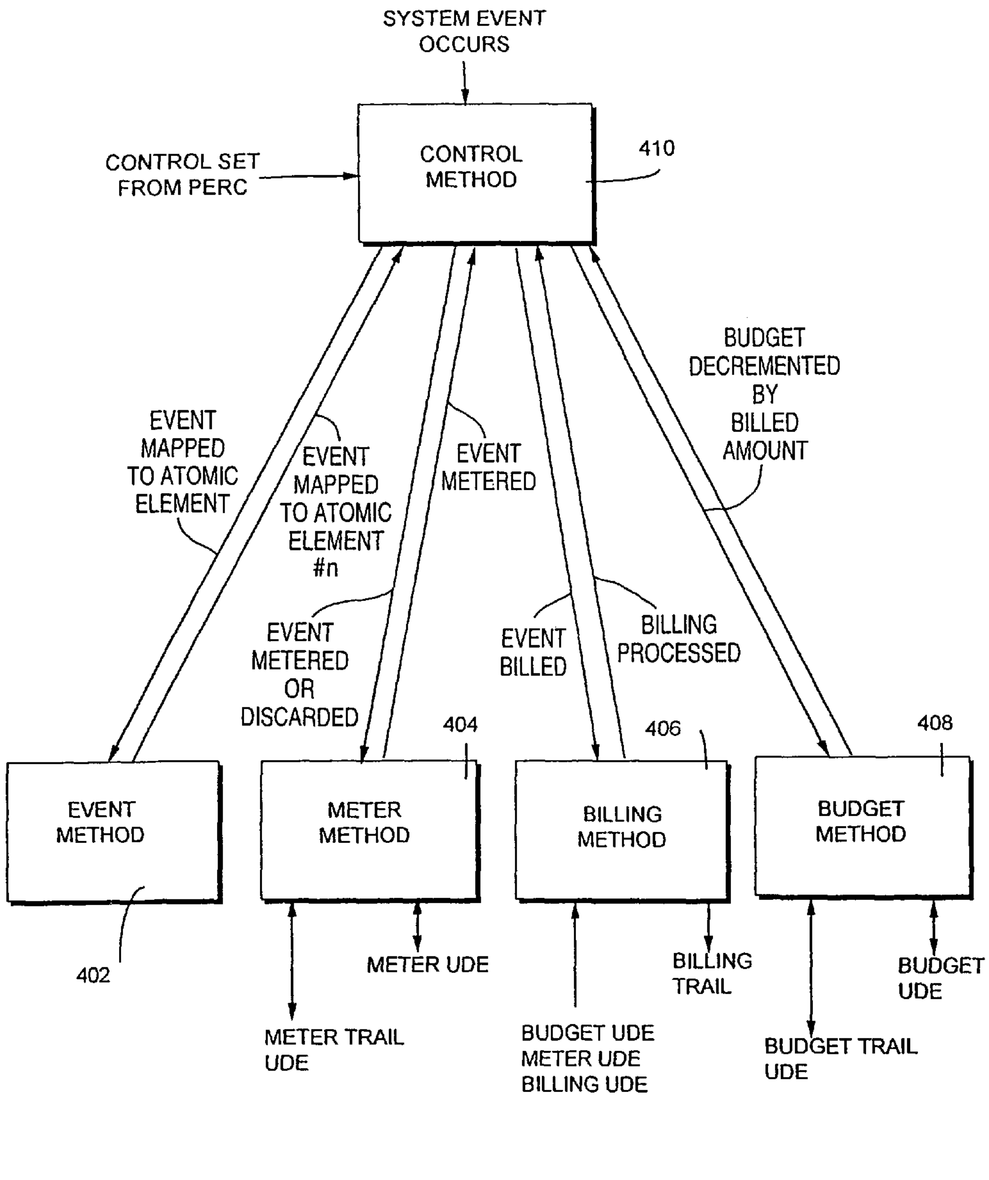

As mentioned above, PERCs 808 in the preferred embodiment may be provided with "control methods" that in effect "oversee" performance of the other required methods in a control process. FIG. 46 shows how the required methods/processes 402, 404, 406, and 408 of FIG. 45 can be organized and controlled by a control method 410. Control method 410 may call, dispatch events, or otherwise invoke the other methods 402, 404, 406, 408 and otherwise supervise the processing performed in response to an "event".

Control methods operate at the level of control sets 906 within PERCs 808. They provide structure, logic, and flow of control between disparate acquired methods 1000. This mechanism permits the content provider to create any desired chain of processing, and also allows the specific chain of processing to be modified (within permitted limits) by downstream/redistributors. This control structure concept provides great flexibility.

Figure 47:
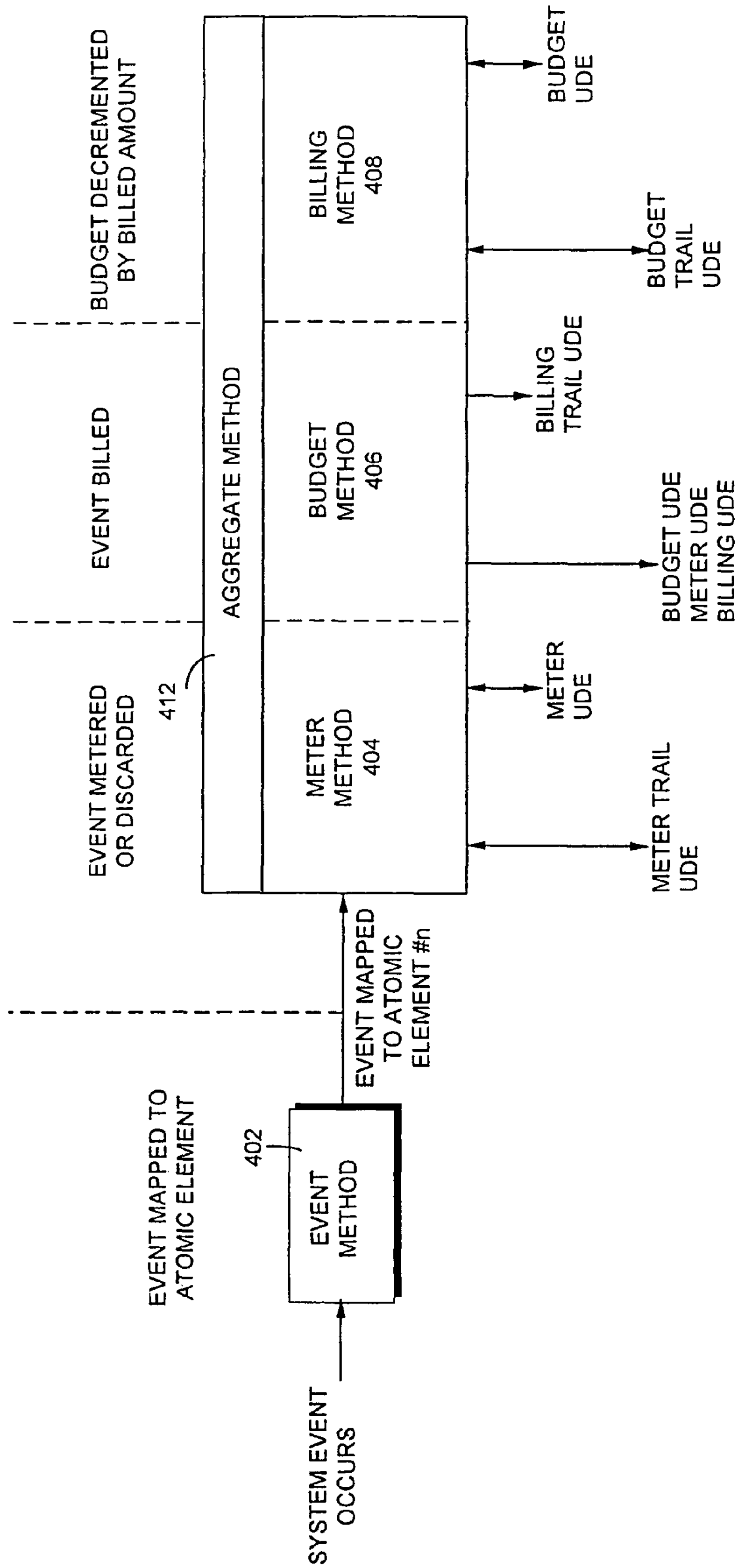

FIG. 47 shows an example of an "aggregate" method 412 which collects METER method 404, BUDGET method 406 and BILLING method 408 into an "aggregate" processing flow. Aggregate method 412 may, for example, combine various elements of metering, budgeting and billing into a single method 1000. Aggregate method 412 may provide increased efficiency as a result of processing METER method 404, BUDGET method 406 and BILLING method 408 aggregately, but may decrease flexibility because of decreased modularity.

Figure 48:
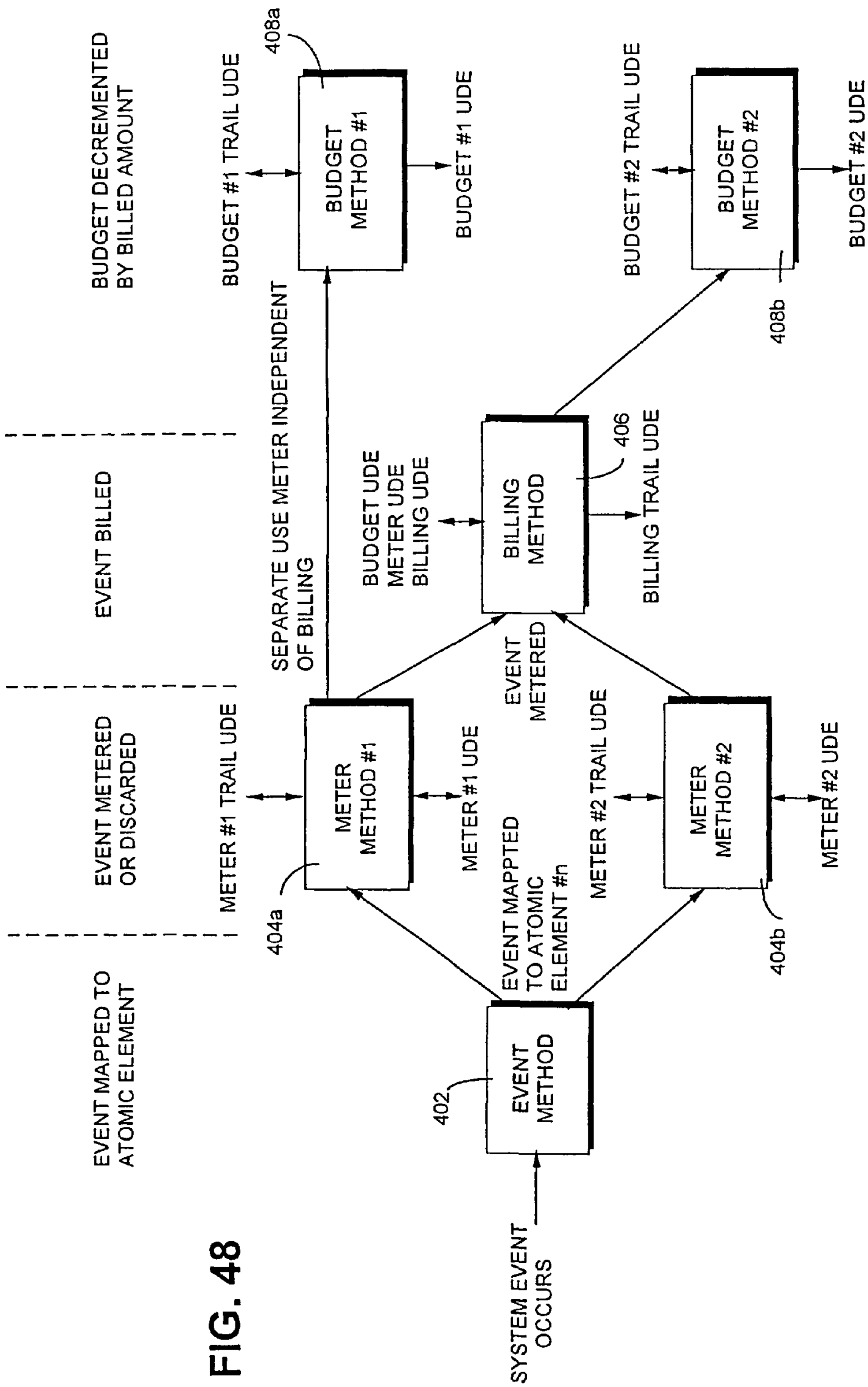

Many different methods can be in effect simultaneously. FIG. 48 shows an example of preferred embodiment event processing using multiple METER methods 404 and multiple BUDGET methods 1408. Some events may be subject to many different required methods operating independently or cumulatively. For example, in the example shown in FIG. 48, meter method **404*a* may maintain meter trail and meter information records that are independent from the meter trail and meter information records maintained by METER method 404*b*. Similarly, BUDGET method 408*a* may maintain records independently of those records maintained by BUDGET method 408*b*. Some events may bypass BILLING method 408 while nevertheless being processed by meter method 404*a* and BUDGET method 408*a***. A variety of different variations are possible.

Representative Examples of VDE Methods

Although methods 1000 can have virtually unlimited variety and some may even be user-defined, certain basic "use" type methods are preferably used in the preferred embodiment to control most of the more fundamental object manipulation and other functions provided by VDE 100. For example, the following high level methods would typically be provided for object manipulation:

OPEN method
READ method
WRITE method
CLOSE method

An OPEN method is used to control opening a container so its contents may be accessed. A READ method is used to control the access to contents in a container. A WRITE method is used to control the insertion of contents into a container. A CLOSE method is used to close a container that has been opened.

Subsidiary methods are provided to perform some of the steps required by the OPEN, READ, WRITE and/or CLOSE methods. Such subsidiary methods may include the following ACCESS method
PANIC method
ERROR method
DECRYPT method
ENCRYPT method
DESTROY content method
INFORMATION method
OBSCURE method
FINGERPRINT method
EVENT method
CONTENT method
EXTRACT method
EMBED method
METER method
BUDGET method
REGISTER method
BILLING method
AUDIT method An ACCESS method may be used to physically access content associated with an opened container (the content can be anywhere). A PANIC method may be used to disable at least a portion of the VDE node if a security violation is detected. An ERROR method may be used to handle error conditions A DECRYPT method is used to decrypt encrypted information. An ENCRYPT method is used to encrypt information. A DESTROY content method is used to destroy the ability to access specific content within a container. An INFORMATION method is used to provide public information about the contents of a container. An OBSCURE method is used to devalue content read from an opened container (e.g., to write the word "SAMPLE" over a displayed image). A FINGERPRINT method is used to mark content to show who has released it from the secure container. An event method is used to convert events into different events for response by other methods.

Open

Figure 49:
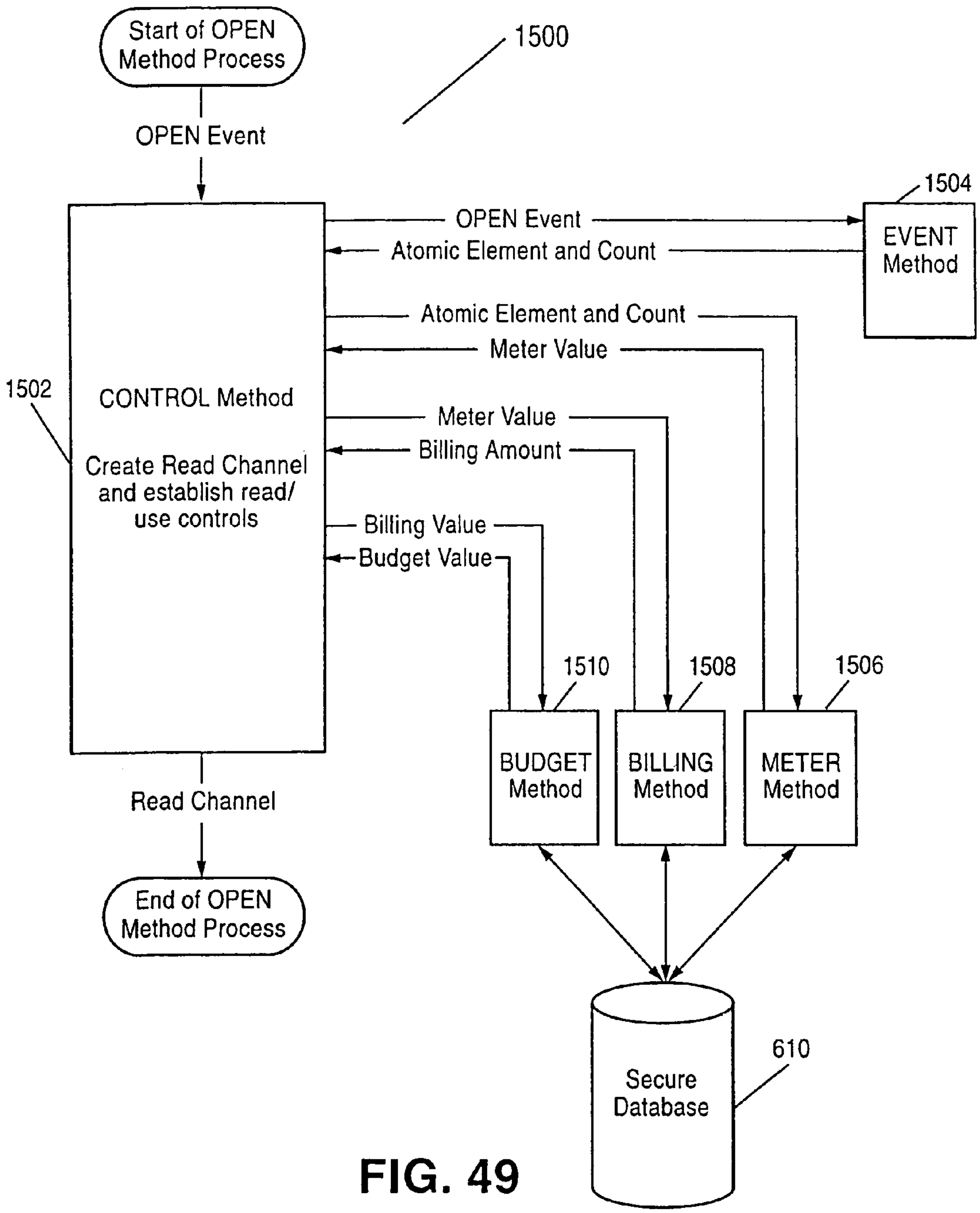
FIGS. 49, 49A-49F show an example OPEN method.

FIG. 49 is a flowchart of an example of preferred embodiment process control steps for an example of an OPEN method 1500. Different OPEN methods provide different detailed steps. However, the OPEN method shown in FIG. 49 is a representative example of a relatively full-featured "open" method provided by the preferred embodiment. FIG. 49 shows a macroscopic view of the OPEN method. FIGS. 49*a*-49*f* are together an example of detailed program controlled steps performed to implement the method shown in FIG. 49.

The OPEN method process starts with an "open event." This open event may be generated by a user application, an operating system intercept or various other mechanisms for capturing or intercepting control. For example, a user application may issue a request for access to a particular content stored within the VDE container. As another example, another method may issue a command.

In the example shown, the open event is processed by a control method 1502. Control method 1502 may call other methods to process the event. For example, control method 1502 may call an EVENT method 1504, a METER method 1506, a BILLING method 1508, and a BUDGET method 1510. Not all OPEN control methods necessarily call of these additional methods, but the OPEN method 1500 shown in FIG. 49 is a representative example.

Control method 1502 passes a description of the open event to EVENT method 1504. EVENT method 1504 may determine, for example, whether the open event is permitted and whether the open event is significant in the sense that it needs to be processed by METER method 1506, BILLING method 1508, and/or BUDGET method 1510. EVENT method 1504 may maintain audit trail information within an audit trail UDE, and may determine permissions and significance of the event by using an Event Method Data Element (MDE). EVENT method 1504 may also map the open event into an "atomic element" and count that may be processed by METER method 1506, BILLING method 1508, and/or BUDGET method 1510.

In OPEN method 1500, once EVENT method 1504 has been called and returns successfully, control method 1502 then may call METER method 1506 and pass the METER method, the atomic element and count returned by EVENT method 1504. METER method 1506 may maintain audit trail information in a METER method Audit Trail UDE, and may also maintain meter information in a METER method UDE. In the preferred embodiment, METER method 1506 returns a meter value to control method 1502 assuming successful completion.

In the preferred embodiment, control method 1502 upon receiving an indication that METER method 1506 has completed successfully, then calls BILLING method 1508. Control method 1502 may pass to BILLING method 1508 the meter value provided by METER method 1506. BILLING method 1508 may read and update billing information maintained in a BILLING method map MDE, and may also maintain and update audit trail in a BILLING method Audit Trail UDE. BILLING method 1508 may return a billing amount and a completion code to control method 1502.

Assuming BILLING method 1508 completes successfully, control method 1502 may pass the billing value provided by BILLING method 1508 to BUDGET method 1510. BUDGET method 1510 may read and update budget information within a BUDGET method UDE, and may also maintain audit trail information in a BUDGET method Audit Trail UDE. BUDGET method 1510 may return a budget value to control method 1502, and may also return a completion code indicating whether the open event exceeds the user's budget (for this type of event).

Upon completion of BUDGET method 1510, control method 1502 may create a channel and establish read/use control information in preparation for subsequent calls to the READ method.

Figure 49A:
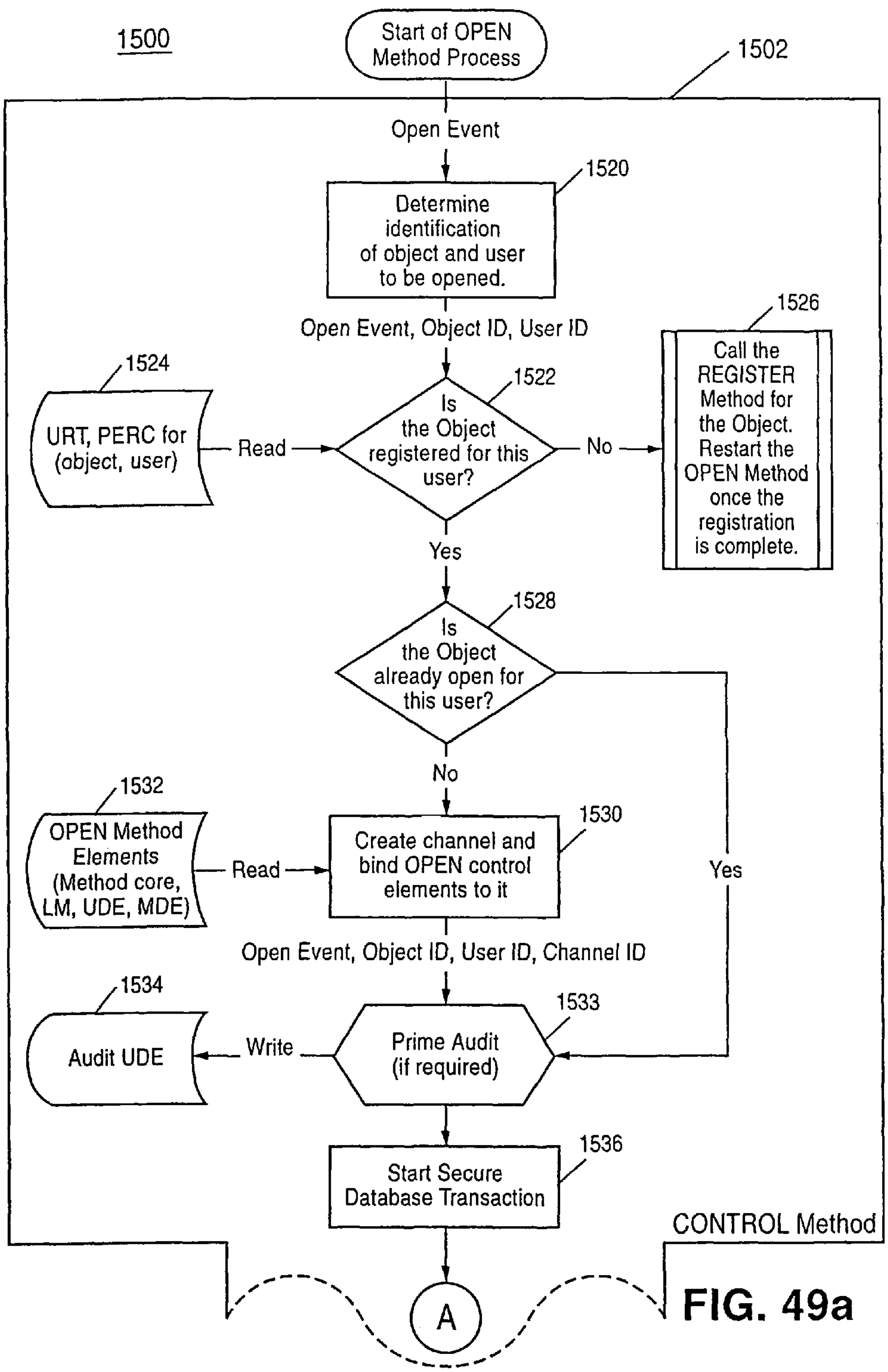

FIGS. 49*a*-49*f* are a more detailed description of the OPEN method 1500 example shown in FIG. 49. Referring to FIG. 49*a*, in response to an open event, control method 1502 first may determine the identification of the object to be opened and the identification of the user that has requested the object to be opened (block 1520). Control method 1502 then determines whether the object to be opened is registered for this user (decision block 1522). It makes this determination at least in part in the preferred embodiment by reading the PERC 808 and the User Rights Table (URT) element associated with the particular object and particular user determined by block 1520 (block 1524). If the user is not registered for this particular object ("no" exit to decision block 1522), then control method 1502 may call the REGISTER method for the object and restart the OPEN method 1500 once registration is complete (block 1526). The REGISTER method block 1526 may be an independent process and may be time independent. It may, for example, take a relatively long time to complete the REGISTER method (say if the VDE distributor or other participant responsible for providing registration wants to perform a credit check on the user before registering the user for this particular object).

Assuming the proper URT for this user and object is present such that the object is registered for this user ("yes" exit to decision block 1522), control method 1502 may determine whether the object is already open for this user (decision block 1528). This test may avoid creating a redundant channel for opening an object that is already open. Assuming the object is not already open ("no" exit to decision block 1528), control method 1502 creates a channel and binds appropriate open control elements to it (block 1530). It reads the appropriate open control elements from the secure database (or the container, such as, for example, in the case of a travelling object), and "binds" or "links" these particular appropriate control elements together in order to control opening of the object for this user. Thus, block 1530 associates an event with one or more appropriate method core(s), appropriate load modules, appropriate User Data Elements, and appropriate Method Data Elements read from the secure database (or the container) (block 1532). At this point, control method 1502 specifies the open event (which started the OPEN method to begin with), the object ID and user ID (determined by block 1520), and the channel ID of the channel created by block 1530 to subsequent EVENT method 1504, METER method 1506, BILLING method 1508 and BUDGET method 1510 to provide a secure database "transaction" (block 1536). Before doing so, control method 1502 may prime an audit process (block 1533) and write audit information into an audit UDE (block 1534) so a record of the transaction exists even if the transaction fails or is interfered with.

Figure 49B:
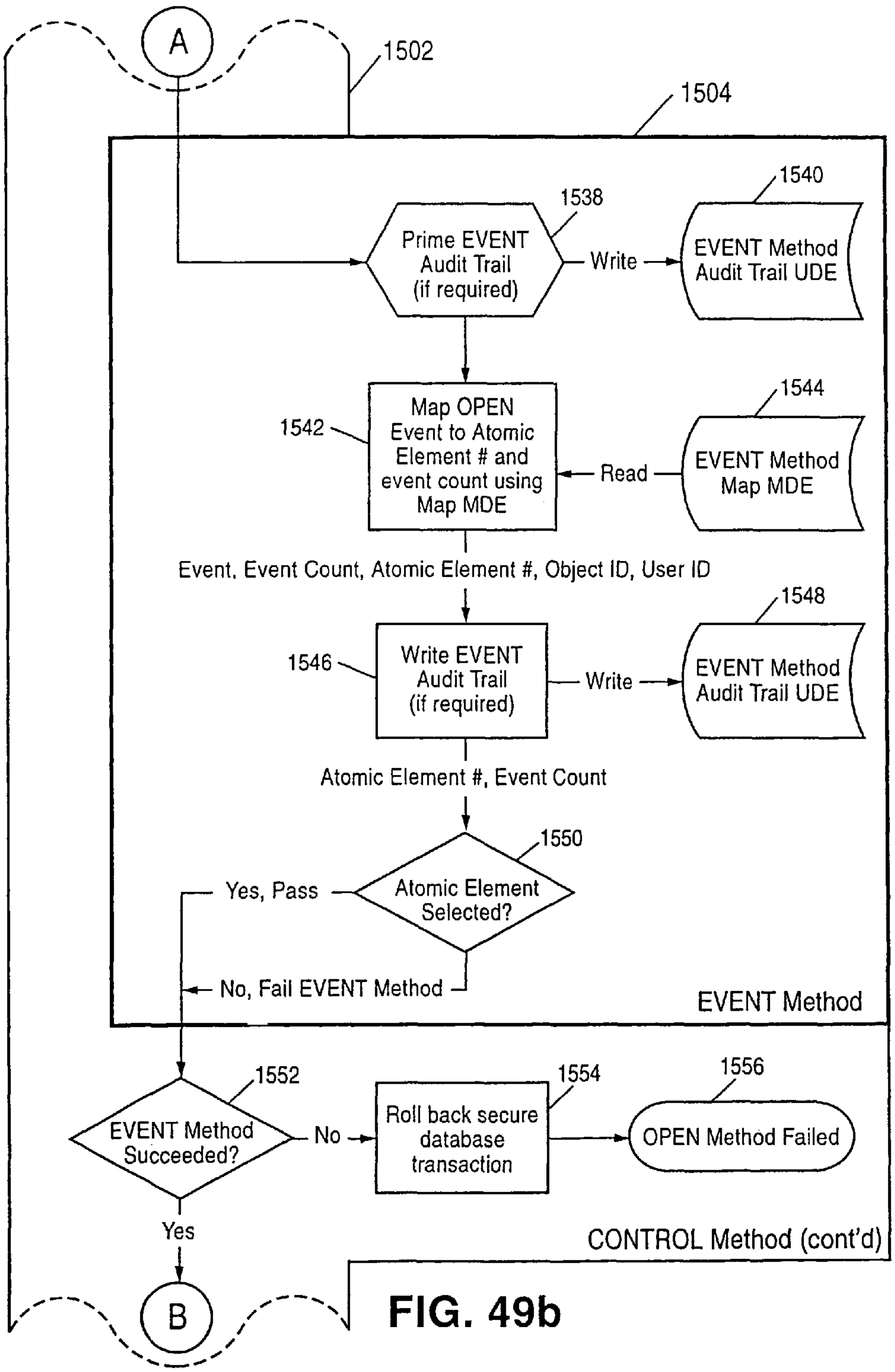

The detail steps performed by EVENT method 1504 are set forth on FIG. 49*b*. EVENT method 1504 may first prime an event audit trail if required (block 1538) which may write to an EVENT Method Audit Trail UDE (block 1540). EVENT method 1504 may then perform the step of mapping the open event to an atomic element number and event count using a map MDE (block 1542). The EVENT method map MDE may be read from the secure database (block 1544). This mapping process performed by block 1542 may, for example, determine whether or not the open event is meterable, billable, or budgetable, and may transform the open event into some discrete atomic element for metering, billing and/or budgeting. As one example, block 1542 might perform a one-to-one mapping between open events and "open" atomic elements, or it may only provide an open atomic element for every fifth time that the object is opened. The map block 1542 preferably returns the open event, the event count, the atomic element number, the object ID, and the user ID. This information may be written to the EVENT method Audit Trail UDE (block 1546, 1548). In the preferred embodiment, a test (decision block 1550) is then performed to determine whether the EVENT method failed. Specifically, decision block 1550 may determine whether an atomic element number was generated. If no atomic element number was generated (e.g., meaning that the open event is not significant for processing by METER method 1506, BILLING method 1508 and/or BUDGET method 1510), then EVENT method 1504 may return a "fail" completion code to control method 1502 ("no" exit to decision block 1550).

Control method 1502 tests the completion code returned by EVENT method 1504 to determine whether it failed or was successful (decision block 1552). If the EVENT method failed ("no" exit to decision block 1552), control method 1502 may "roll back" the secure database transaction (block 1554) and return itself with an indication that the OPEN method failed (block 1556). In this context, "rolling back" the secure database transaction means, for example, "undoing" the changes made to audit trail UDE by blocks 1540, 1548. However, this "roll back" performed by block 1554 in the preferred embodiment does not "undo" the changes made to the control method audit UDE by blocks 1532, 1534.

Figure 49C:
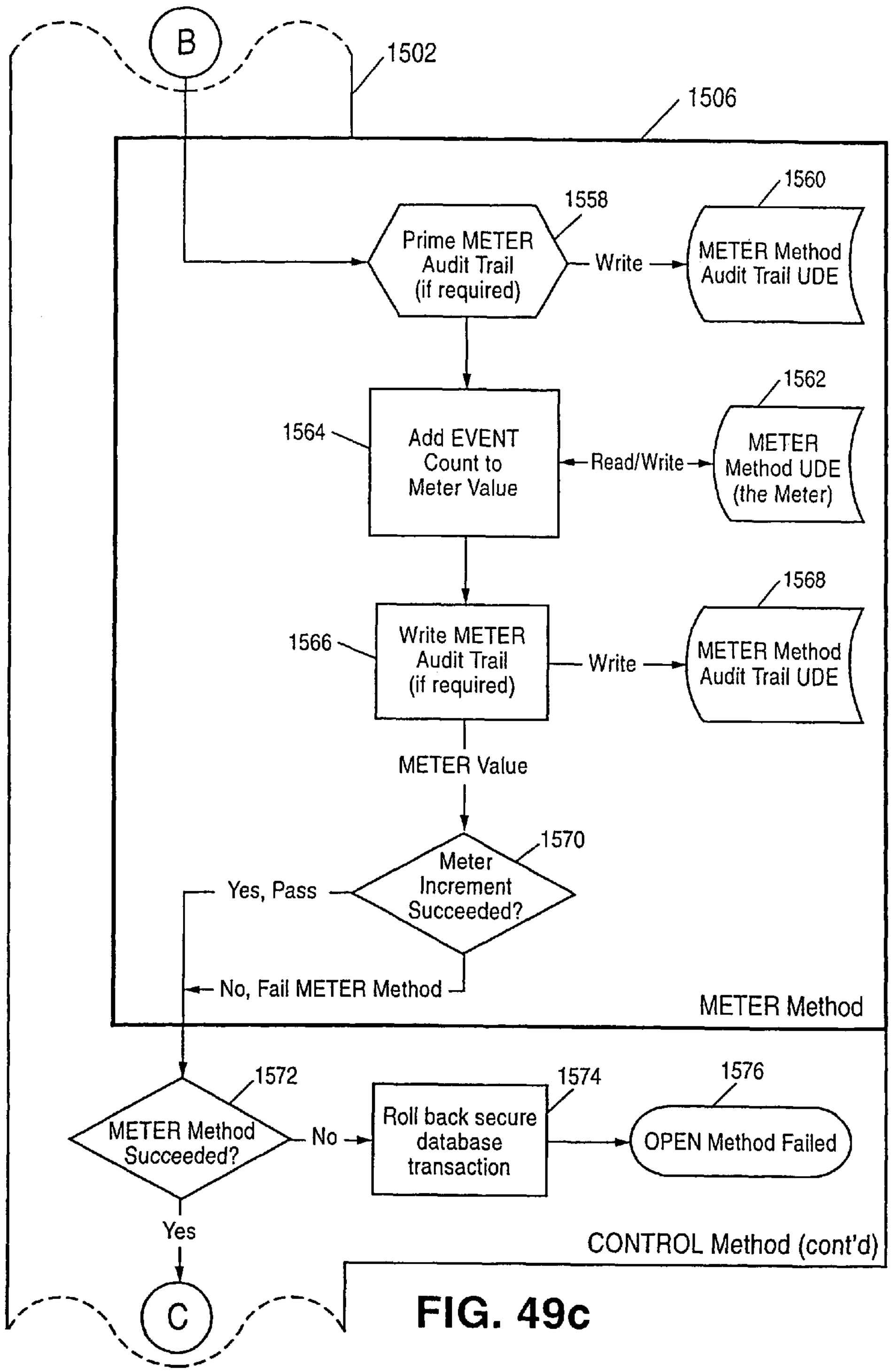

Assuming the EVENT method 1504 completed successfully, control method 1502 then calls the METER method 1506 shown on FIG. 49*c*. In the preferred embodiment, METER method 1506 primes the meter audit trail if required (block 1558), which typically involves writing to a METER method audit trail UDE (block 1560). METER method 1506 may then read a METER method UDE from the secure database (block 1562), modify the meter UDE by adding an appropriate event count to the meter value contained in the meter UDE (block 1564), and then writing the modified meter UDE back to the secure database (block 1562). In other words, block 1564 may read the meter UDE, increment the meter count it contains, and write the changed meter UDE back to the secure database. In the preferred embodiment, METER method 1506 may then write meter audit trail information to the METER method audit trail UDE if required (blocks 1566, 1568). METER method 1506 preferably next performs a test to determine whether the meter increment succeeded (decision block 1570). METER method 1506 returns to control method 1502 with a completion code (e.g., succeed or fail) and a meter value determined by block 1564.

Control method 1502 tests whether the METER method succeeded by examining the completion code, for example (decision block 1572). If the METER method failed ("no" exit to decision block 1572), then control method 1502 "rolls back" a secure database transaction (block 1574), and returns with an indication that the OPEN method failed (block 1576). Assuming the METER method succeeded ("yes" exit to decision block 1572), control method 1502 calls the BILLING method 1508 and passes it the meter value provided by METER method 1506.

Figure 49D:
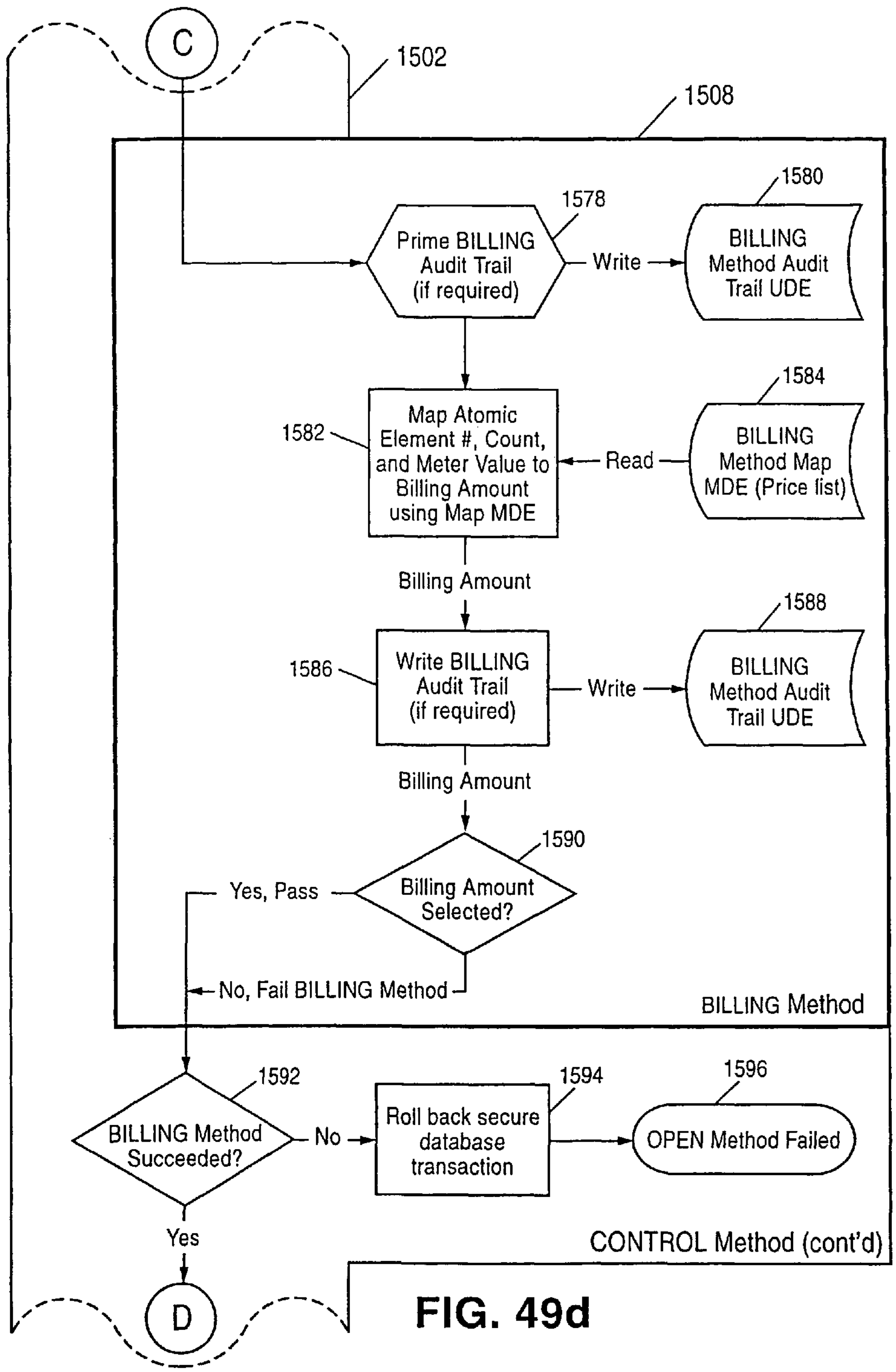

An example of steps performed by BILLING method 1508 is set forth in FIG. 49*d*. BILLING method 1508 may prime a billing audit trail if required (block 1578) by writing to a BILLING method Audit Trail UDE within the secure database (block 1580). BILLING method 1508 may then map the atomic element number, count and meter value to a billing amount using a BILLING method map MDE read from the secure database (blocks 1582, 1584). Providing an independent BILLING method map MDE containing, for example, price list information, allows separately deliverable pricing for the billing process. The resulting billing amount generated by block 1582 may be written to the BILLING method Audit Trail UDE (blocks 1586, 1588), and may also be returned to control method 1502. In addition, BILLING method 1508 may determine whether a billing amount was properly selected by block 1582 (decision block 1590). In this example, the test performed by block 1590 generally requires more than mere examination of the returned billing amount, since the billing amount may be changed in unpredictable ways as specified by BILLING method map MDE. Control then returns to control method 1502, which tests the completion code provided by BILLING method 1508 to determine whether the BILLING method succeeded or failed (block 1592). If the BILLING method failed ("no" exit to decision block 1592), control method 1502 may "roll back" the secure database transaction (block 1594), and return an indication that the OPEN method failed (block 1596). Assuming the test performed by decision block 1592 indicates that the BILLING method succeeded ("yes" exit to decision block 1592), then control method 1502 may call BUDGET method 1510.

Other BILLING methods may use site, user and/or usage information to establish, for example, pricing information. For example, information concerning the presence or absence of an object may be used in establishing "suite" purchases, competitive discounts, etc. Usage levels may be factored into a BILLING method to establish price breaks for different levels of usage. A currency translation feature of a BILLING method may allow purchases and/or pricing in many different currencies. Many other possibilities exist for determining an amount of budget consumed by an event that may be incorporated into BILLING methods.

Figure 49E:
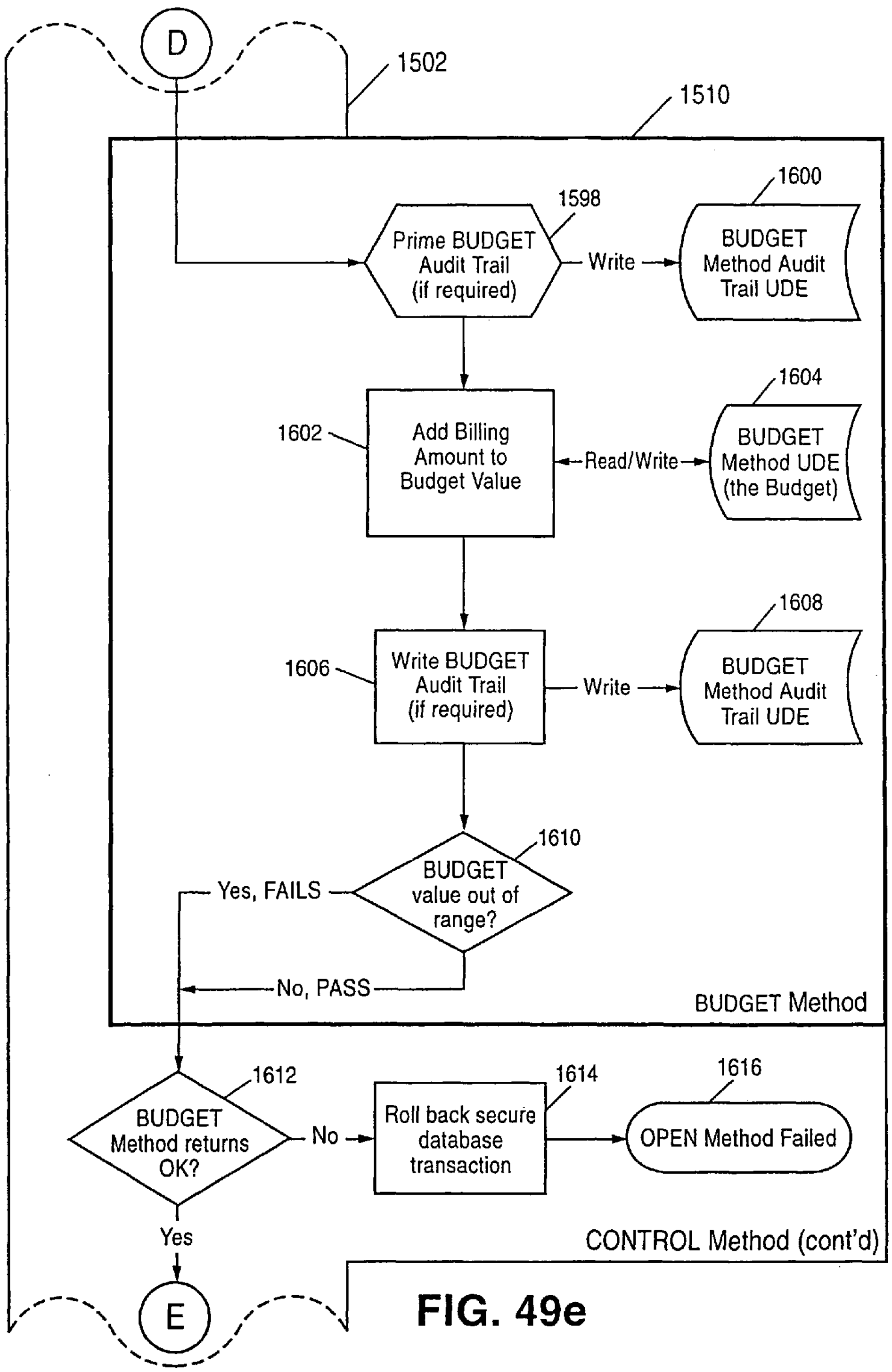
Figure 49F:
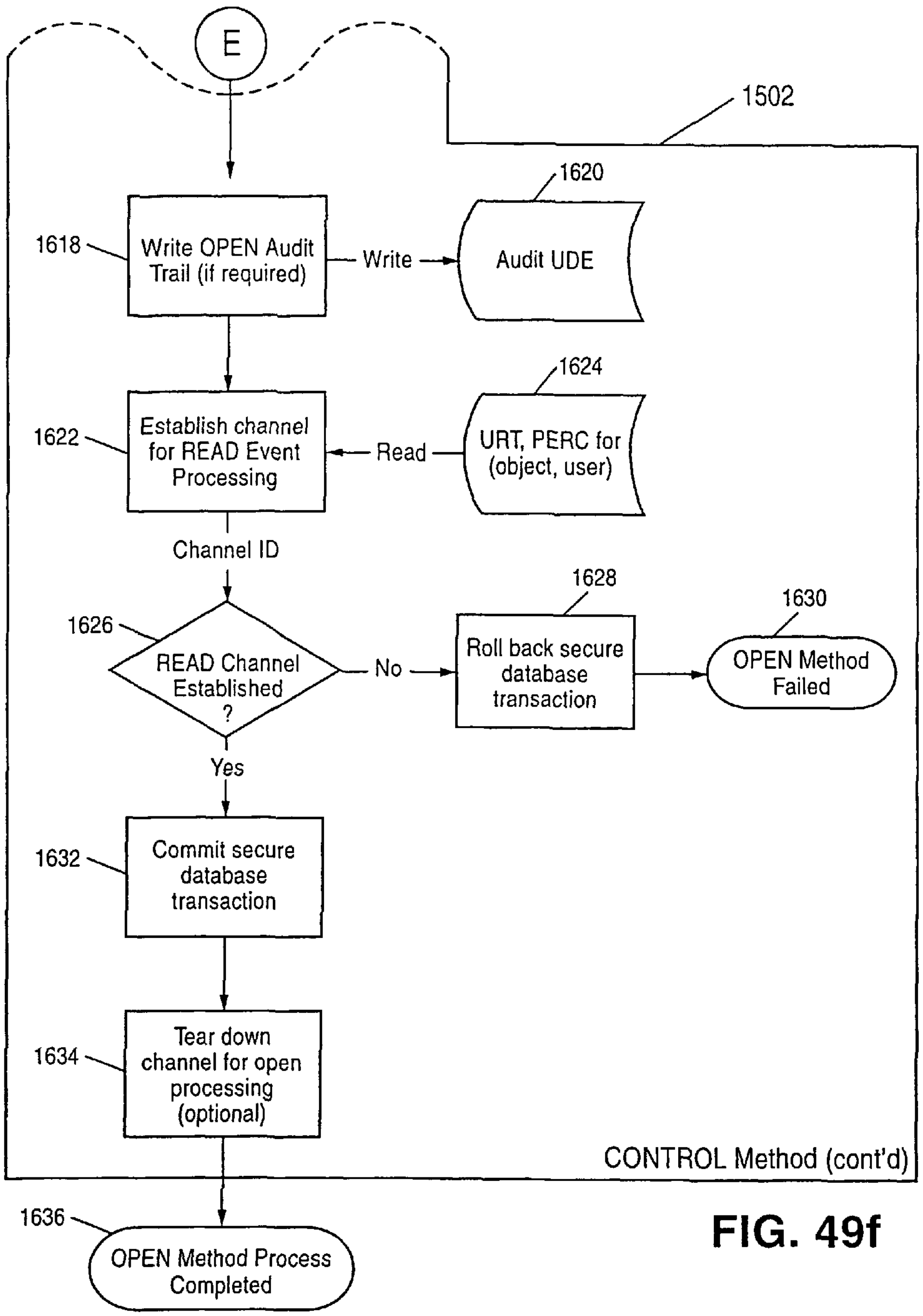

An example of detailed control steps performed by BUDGET method 1510 is set forth in FIG. 49*e*. BUDGET method 1510 may prime a budget audit trail if required by writing to a budget trail UDE (blocks 1598, 1600). BUDGET method 1510 may next perform a billing operation by adding a billing amount to a budget value (block 1602). This operation may be performed, for example, by reading a BUDGET method UDE from the secure database, modifying it, and writing it back to the secure database (block 1604). BUDGET method 1510 may then write the budget audit trail information to the BUDGET method Audit Trail UDE (blocks 1606, 1608). BUDGET method 1510 may finally, in this example, determine whether the user has run out of budget by determining whether the budget value calculated by block 1602 is out of range (decision block 1610). If the user has run out of budget ("yes" exit to decision block 1610), the BUDGET method 1510 may return a "fail completion" code to control method 1502. BUDGET method 1510 then returns to control method 1502, which tests whether the BUDGET method completion code was successful (decision block 1612). If the BUDGET method failed ("no" exit to decision block 1612), control method 1502 may "roll back" the secure database transaction and itself return with an indication that the OPEN method failed (blocks 1614, 1616). Assuming control method 1502 determines that the BUDGET method was successful, the control method may perform the additional steps shown on FIG. 49*f*. For example, control method 1502 may write an open audit trail if required by writing audit information to the audit UDE that was primed at block 1532 (blocks 1618, 1620). Control method 1502 may then establish a read event processing (block 1622), using the User Right Table and the PERC associated with the object and user to establish the channel (block 1624). This channel may optionally be shared between users of the VDE node 600, or may be used only by a specified user.

Control method 1502 then, in the preferred embodiment, tests whether the read channel was established successfully (decision block 1626). If the read channel was not successfully established ("no" exit to decision block 1626), control method 1502 "rolls back" the secured database transaction and provides an indication that the OPEN method failed (blocks 1628, 1630). Assuming the read channel was successfully established ("yes" exit to decision block 1626), control method 1502 may "commit" the secure database transaction (block 1632). This step of "committing" the secure database transaction in the preferred embodiment involves, for example, deleting intermediate values associated with the secure transaction that has just been performed and, in one example, writing changed UDEs and MDEs to the secure database. It is generally not possible to "roll back" a secure transaction once it has been committed by block 1632. Then, control method 1502 may "tear down" the channel for open processing (block 1634) before terminating (block 1636). In some arrangements, such as multi-tasking VDE node environments, the open channel may be constantly maintained and available for use by any OPEN method that starts. In other implementations, the channel for open processing may be rebuilt and restarted each time an OPEN method starts.

Read

FIG. 50, 50*a*-50*f* show examples of process control steps for performing a representative example of a READ method 1650. Comparing FIG. 50 with FIG. 49 reveals that the same overall high level processing may typically be performed for READ method 1650 as was described in connection with OPEN method 1500. Thus, READ method 1650 may call a control method 1652 in response to a read event, the control method in turn invoking an EVENT method 1654, a METER method 1656, a BILLING method 1658 and a BUDGET method 1660. In the preferred embodiment, READ control method 1652 may request methods to fingerprint and/or obscure content before releasing the decrypted content.

FIGS. 50*a*-50*e* are similar to FIGS. 49*a*-49*e*. Of course, even though the same user data elements may be used for both the OPEN method 1500 and the READ method 1650, the method data elements for the READ method may be completely different, and in addition, the user data elements may provide different auditing, metering, billing and/or budgeting criteria for read as opposed to open processing.

Figure 50:
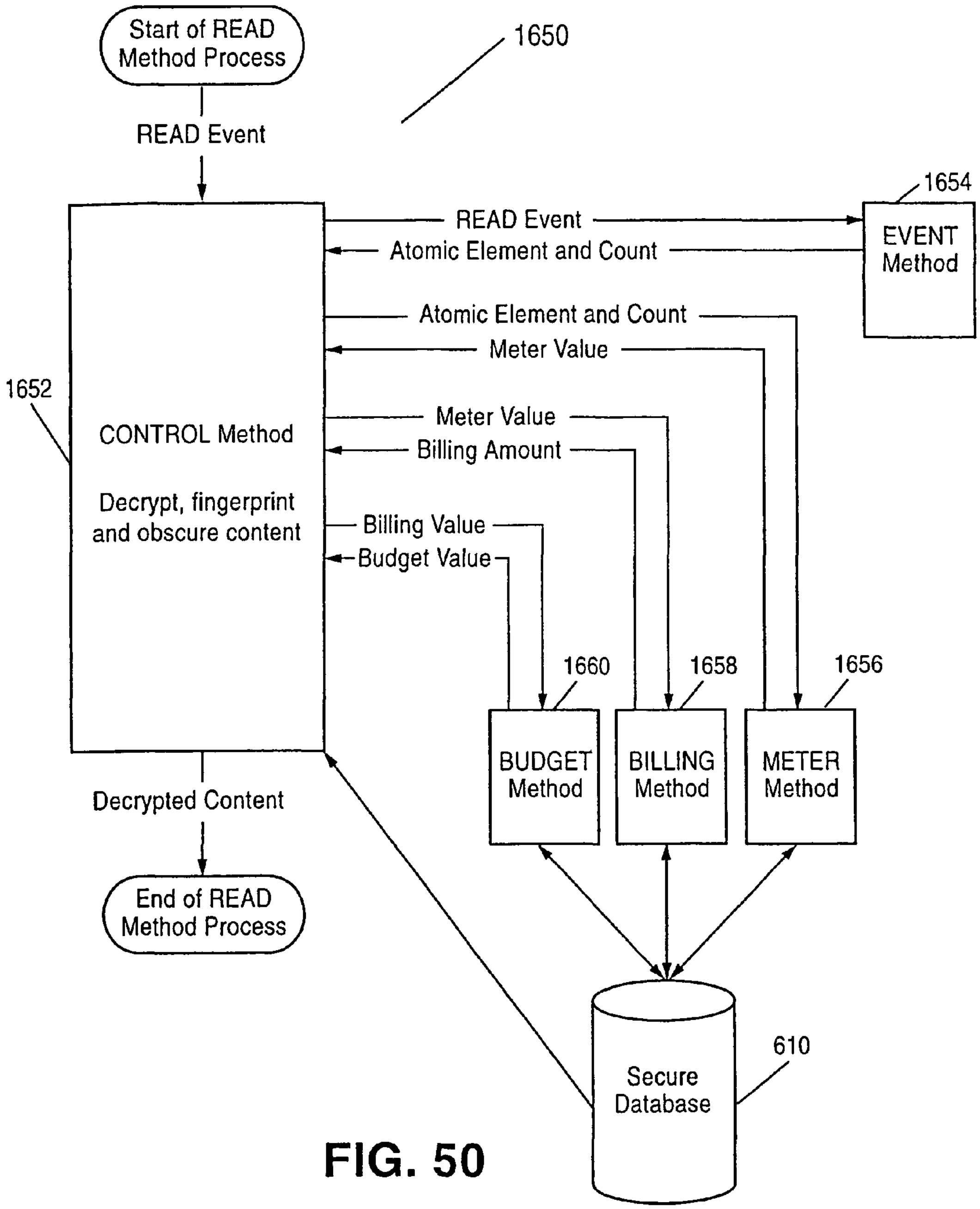
FIGS. 50, 50A-50F show an example of a READ method.
Figure 50A:
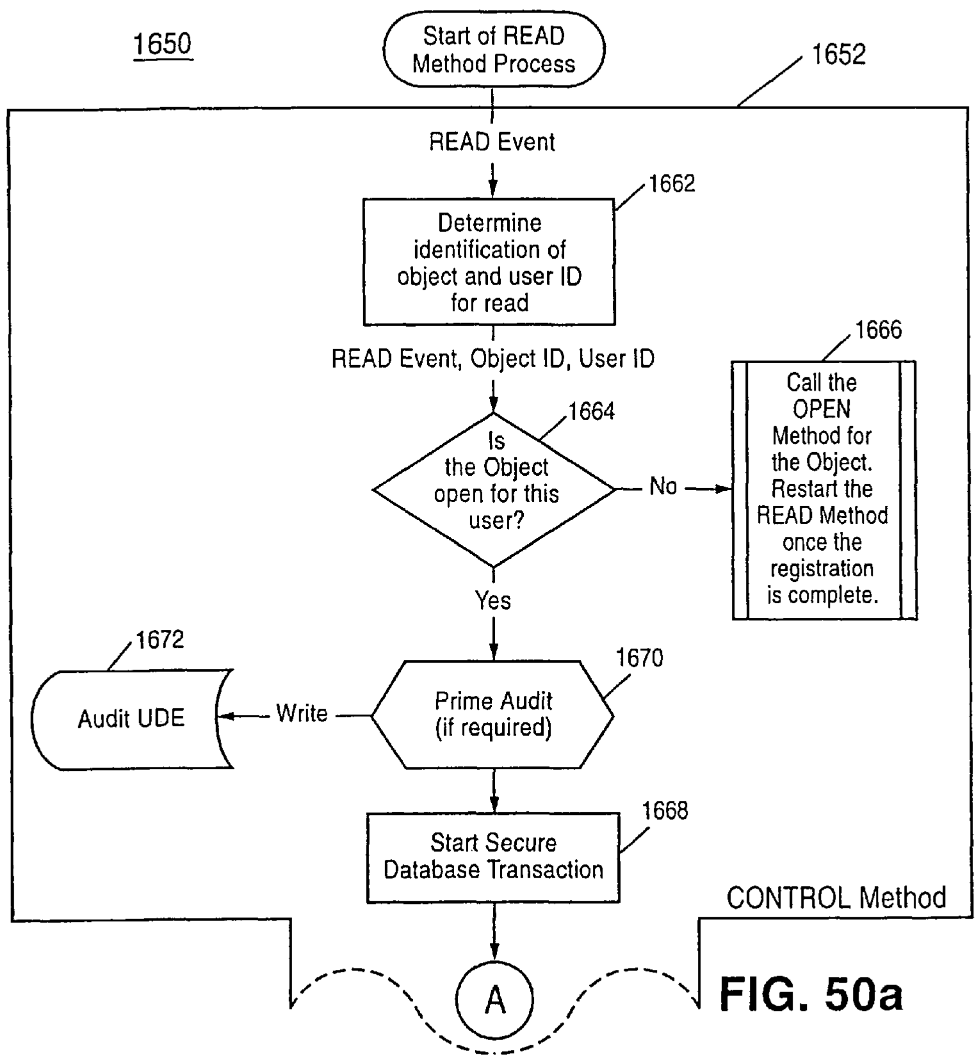
Figure 50B:
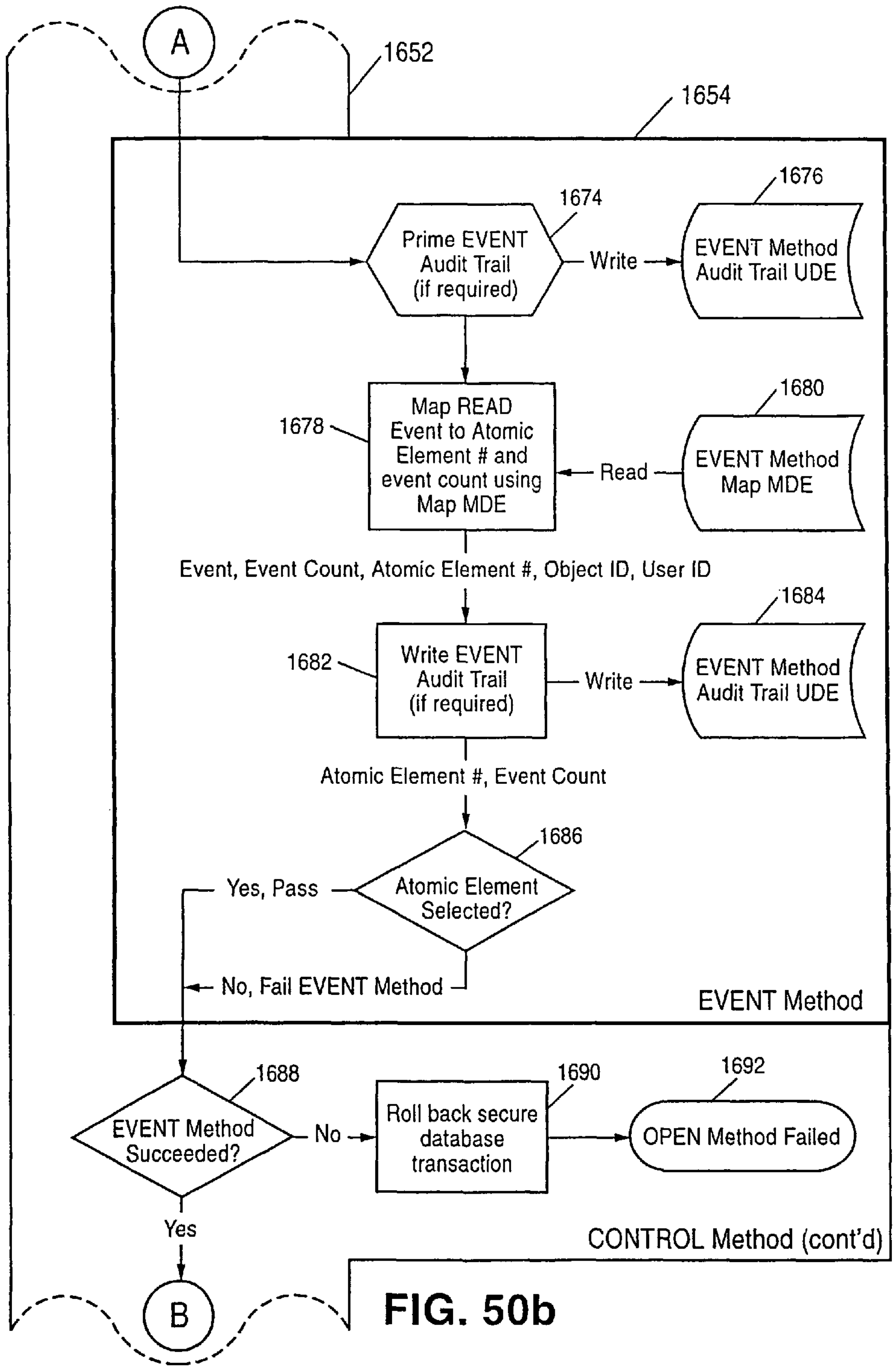
Figure 50C:
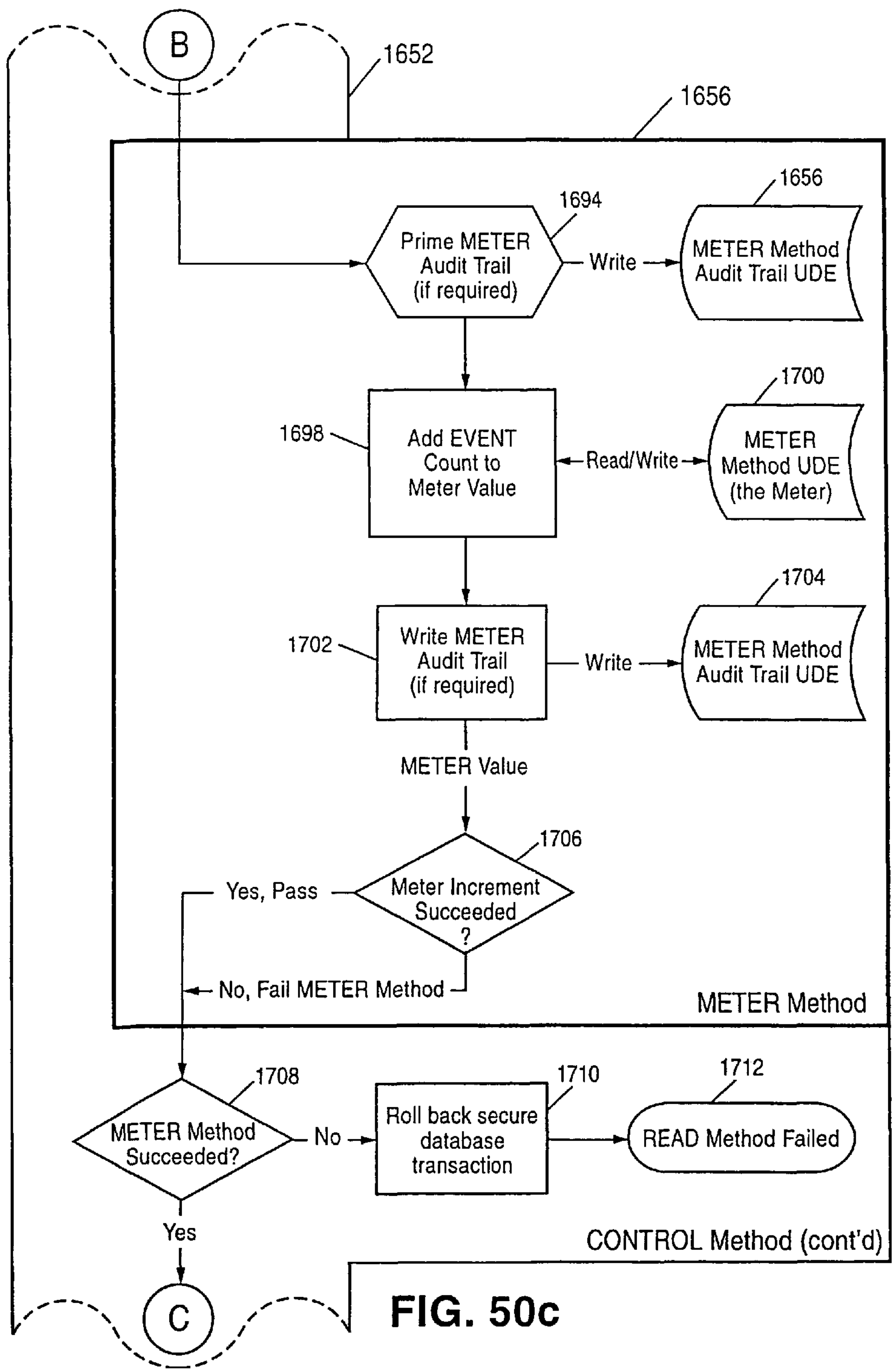
Figure 50D:
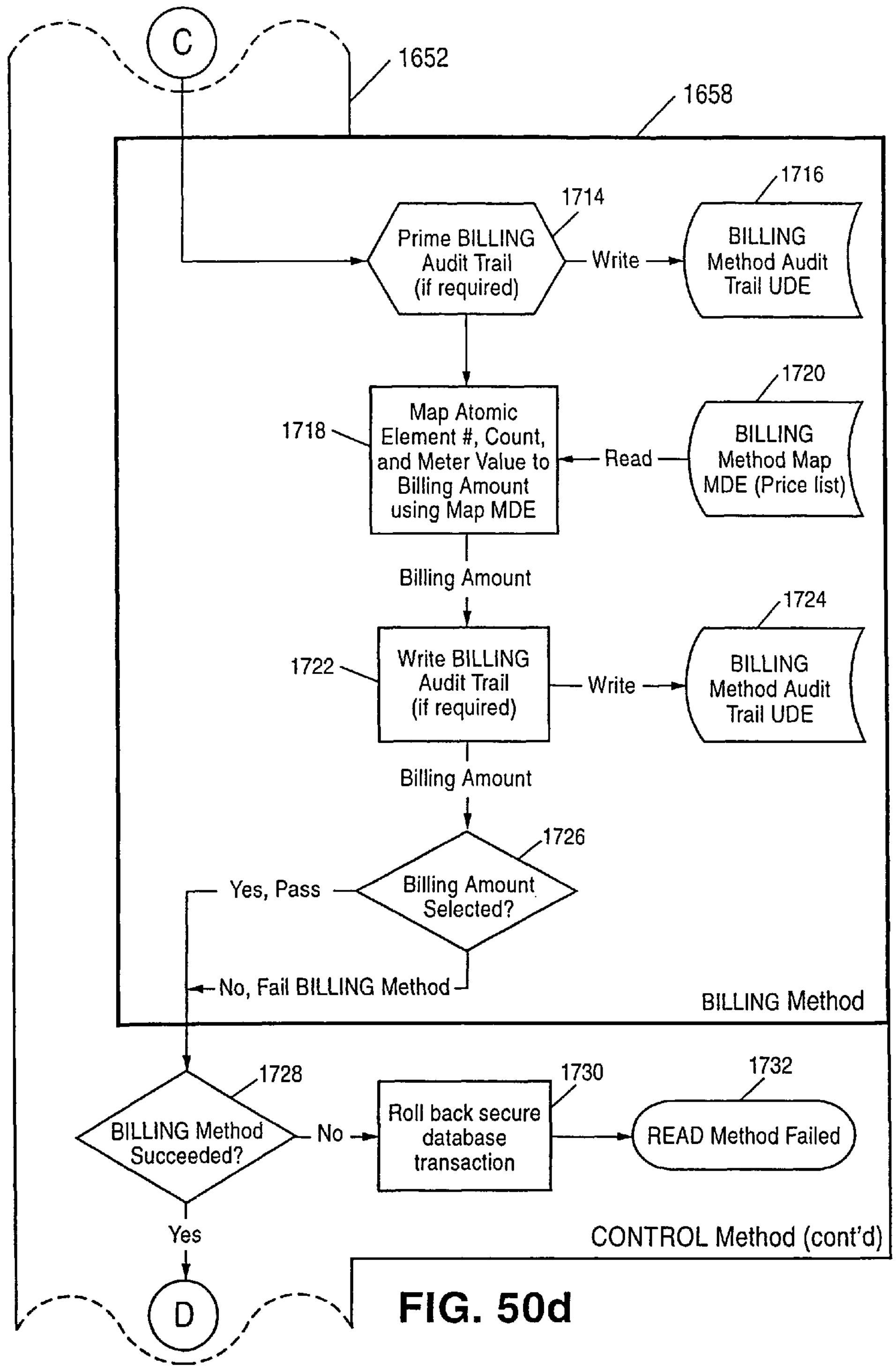
Figure 50E:
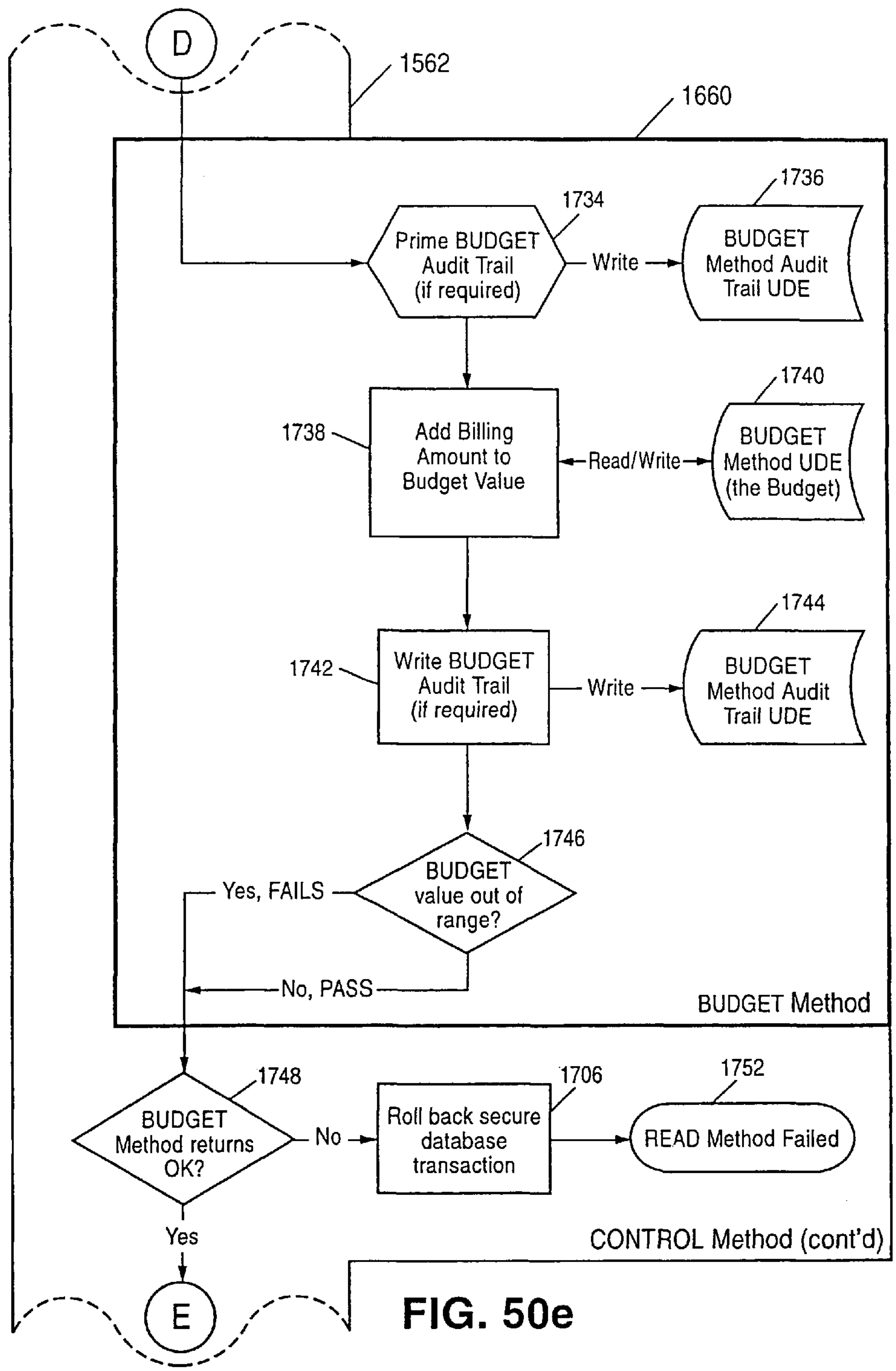
Figure 50F:
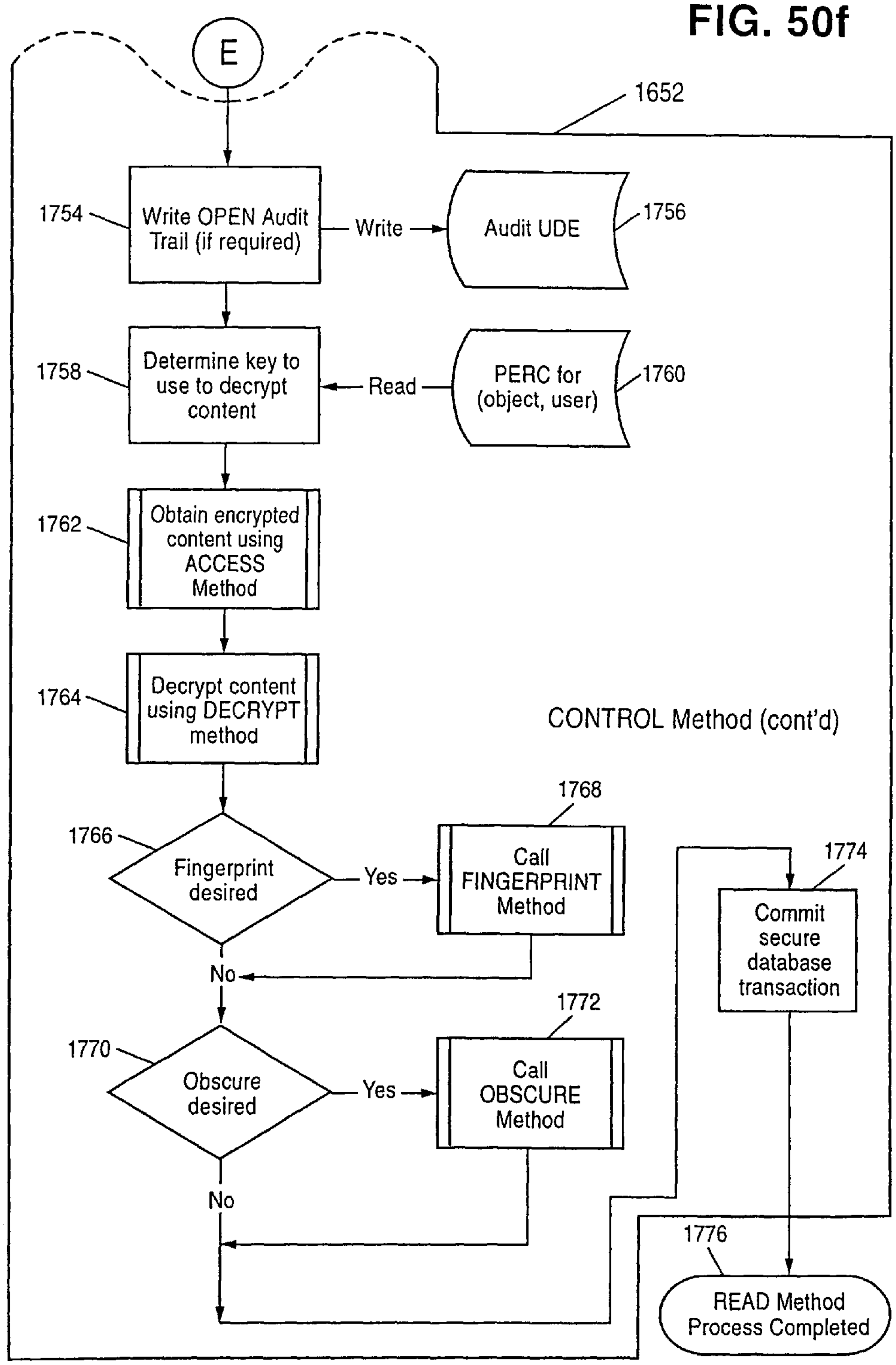

Referring to FIG. 50*f*, the READ control method 1652 must determine which key to use to decrypt content if it is going to release decrypted content to the user (block 1758) READ control method 1652 may make this key determination based, in part, upon the PERC 808 for the object (block 1760). READ control method 1652 may then call an ACCESS method to actually obtain the encrypted content to be decrypted (block 1762). The content is then decrypted using the key determined by block 1758 (block 1764). READ control method 1652 may then determine whether a "fingerprint" is desired (decision block 1766). If fingerprinting of the content is desired ("yes" exit of decision block 1766), READ control method 1652 may call the FINGERPRINT method (block 1768). Otherwise, READ control method 1652 may determine whether it is desired to obscure the decrypted content (decision block 1770). If so, READ control method 1652 may call an OBSCURE method to perform this function (block 1772). Finally, READ control method 1652 may commit the secure database transaction (block 1774), optionally tear down the read channel (not shown), and terminate (block 1776).

Write

Figure 51:
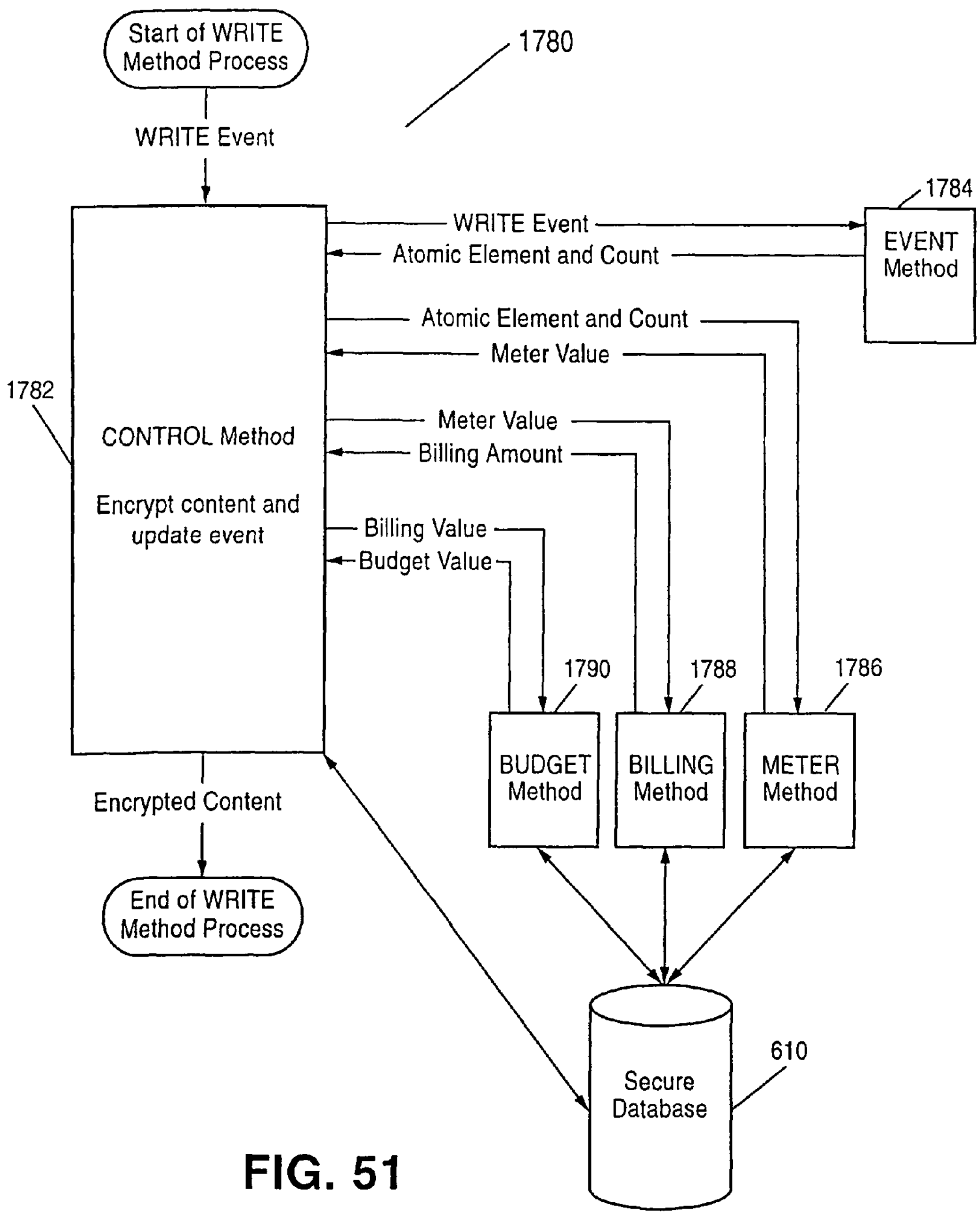
FIGS. 51, 51A-51F show an example of a WRITE method.

FIGS. 51, 51*a*-51*f* are flowcharts of examples of process control steps used to perform a representative example of a WRITE method 1780 in the preferred embodiment. WRITE method 1780 uses a control method 1782 to call an EVENT method 1784, METER method 1786, BILLING method 1788, and BUDGET method 1790 in this example. Thus, writing information into a container (either by overwriting information already stored in the container or adding new information to the container) in the preferred embodiment may be metered, billed and/or budgeted in a manner similar to the way opening a container and reading from a container can be metered, billed and budgeted. As shown in FIG. 51, the end result of WRITE method 1780 is typically to encrypt content, update the container table of contents and related information to reflect the new content, and write the content to the object.

Figure 51A:
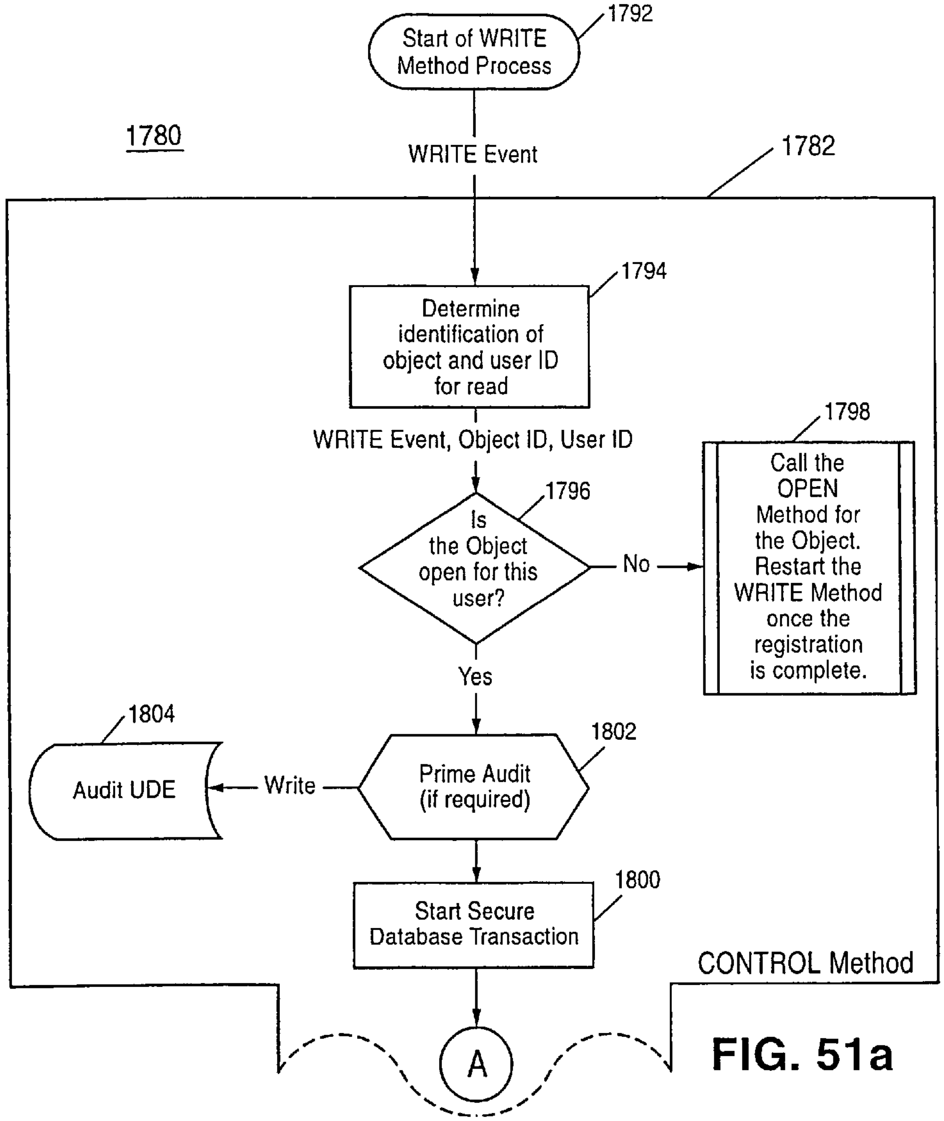
Figure 51B:
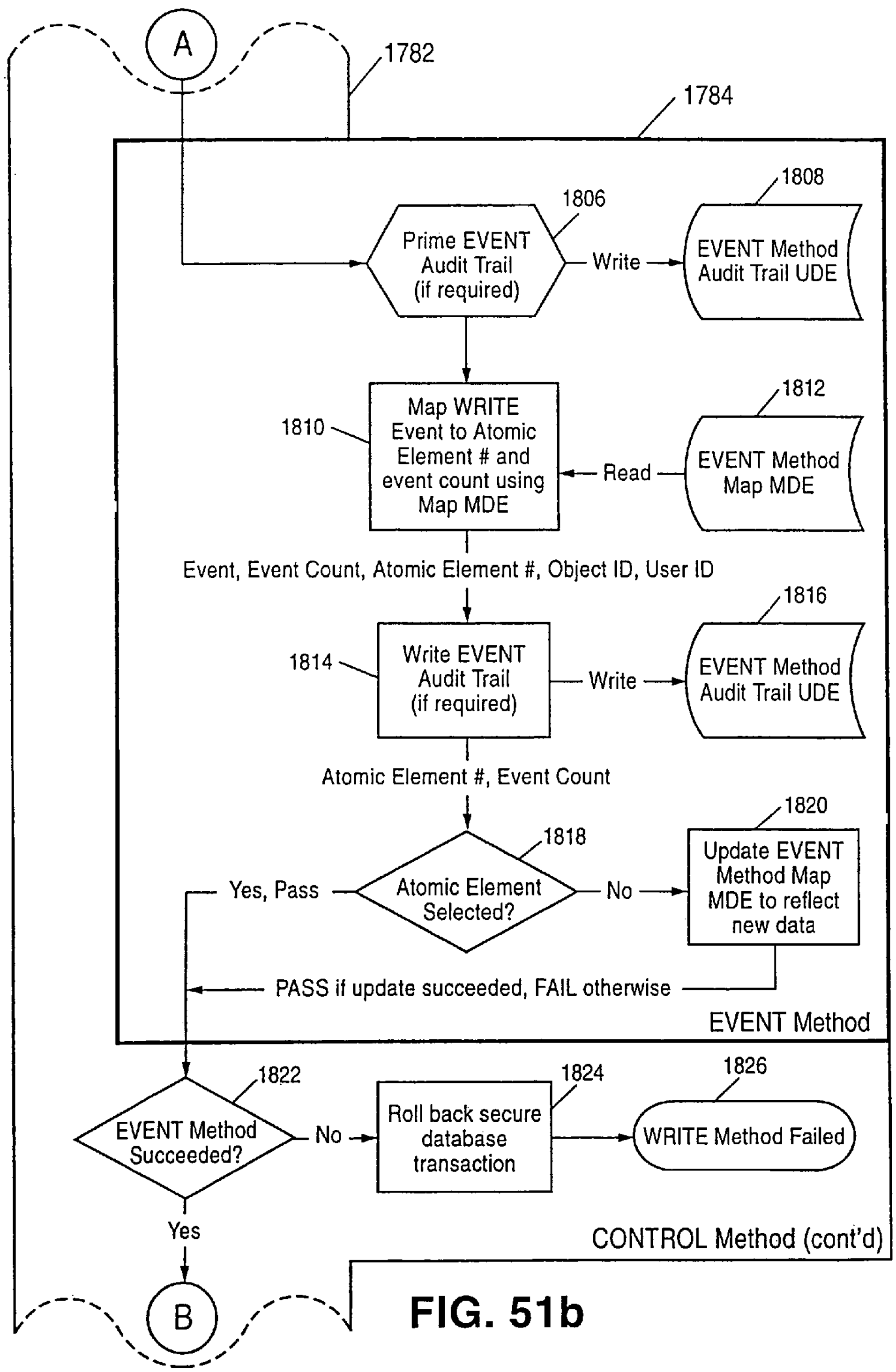
Figure 51C:
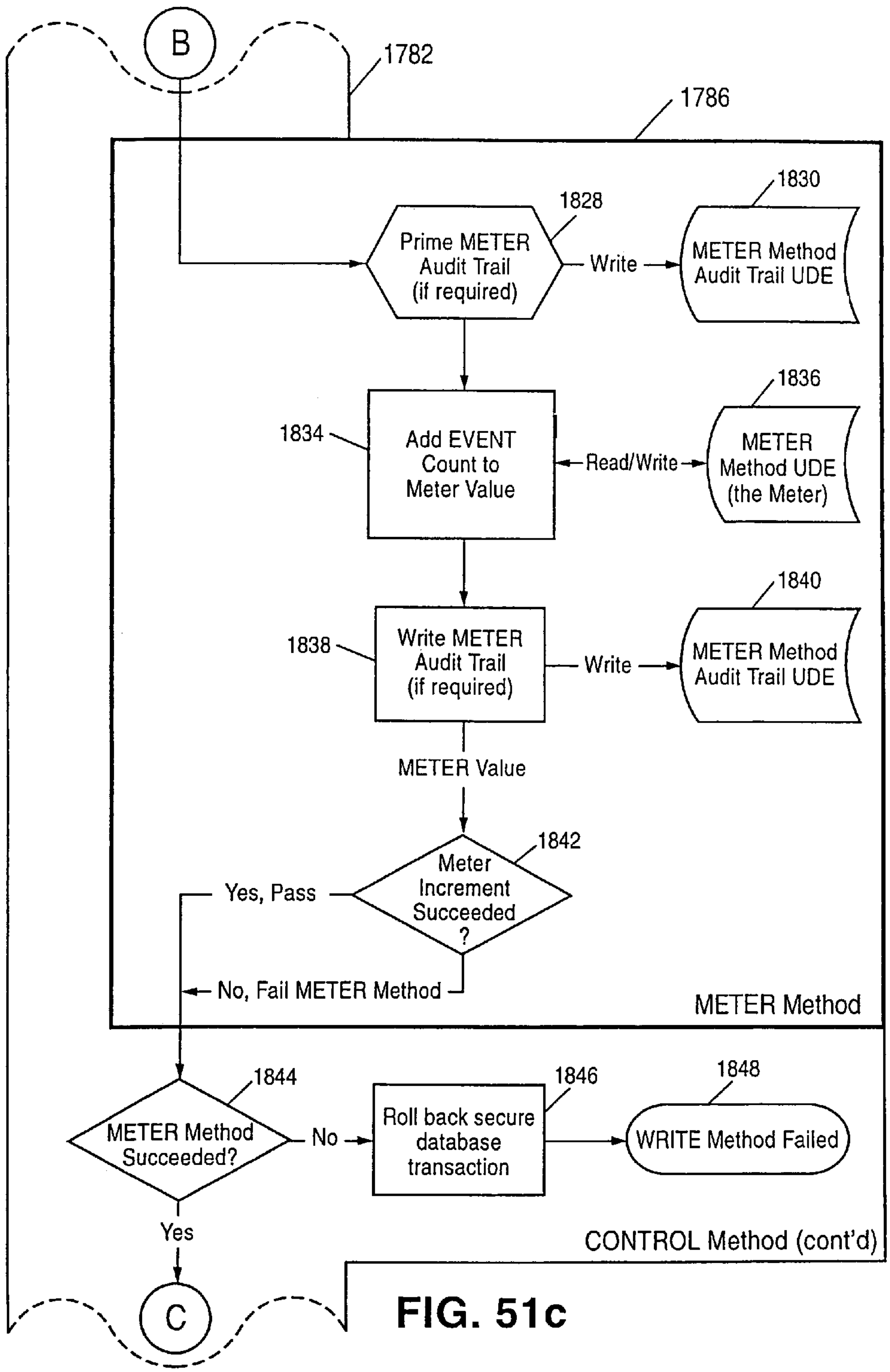
Figure 51D:
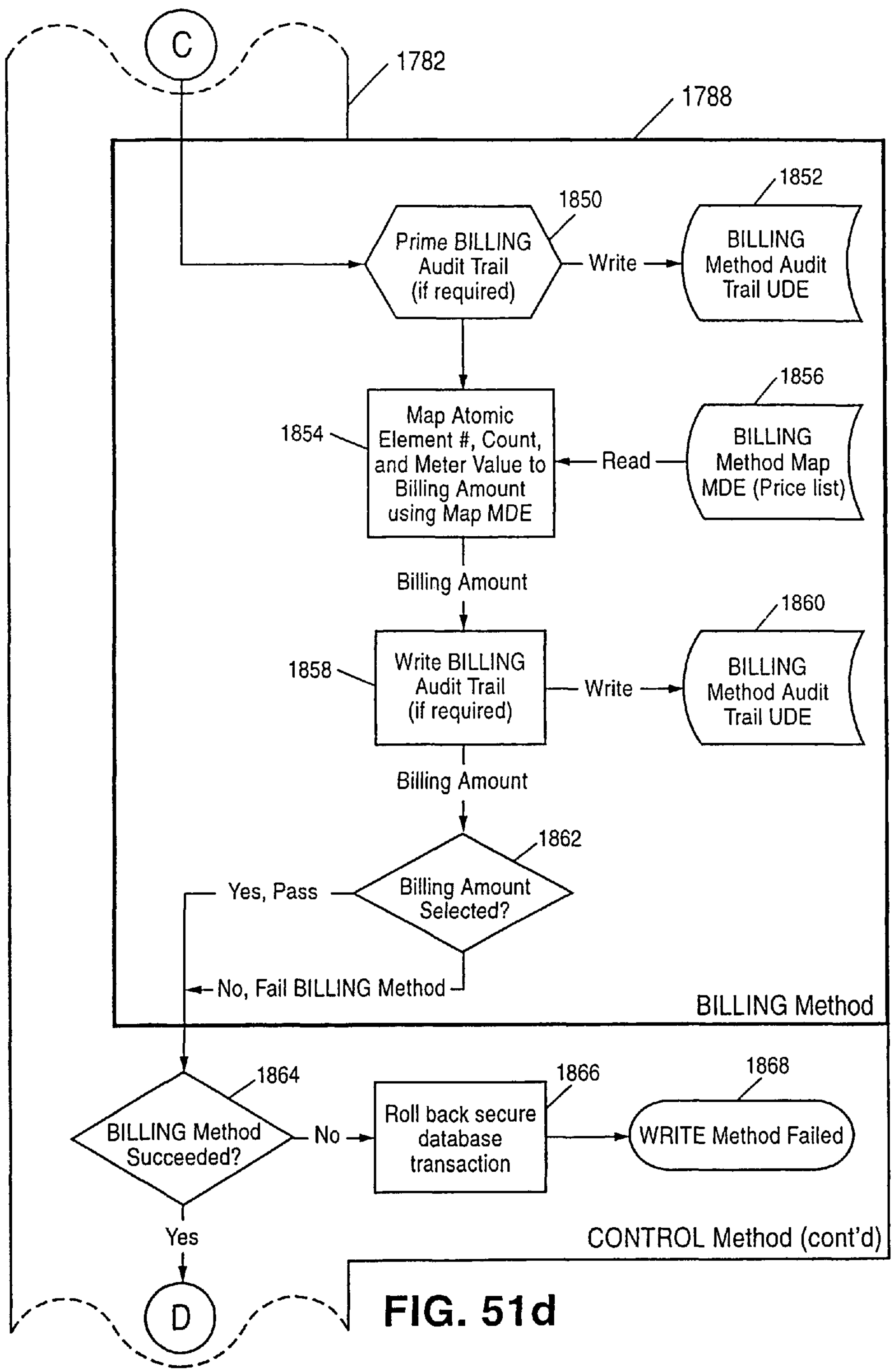
Figure 51E:
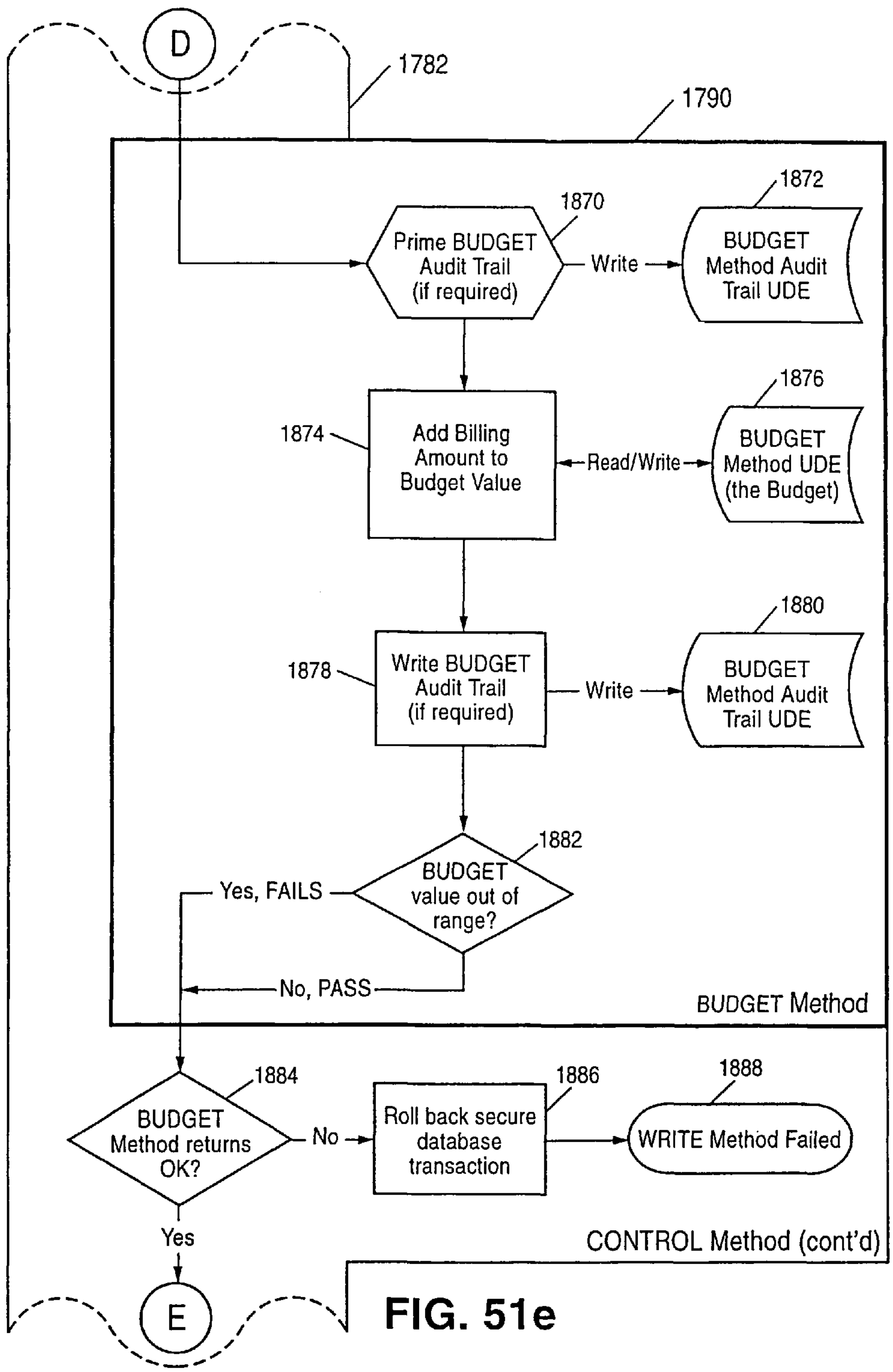

FIG. 51*a* for the WRITE control method 1782 is similar to FIG. 49*a* and FIG. 50*a* for the OPEN control method and the READ control method, respectively. However, FIG. 51*b* is slightly different from its open and read counterparts. In particular, block 1820 is performed if the WRITE EVENT method 1784 fails. This block 1820 updates the EVENT method map MDE to reflect new data. This is necessary to allow information written by block 1810 to be-read by FIG. 51*b* READ method block 1678 based on the same (but now updated) EVENT method map MDE.

Figure 51F:
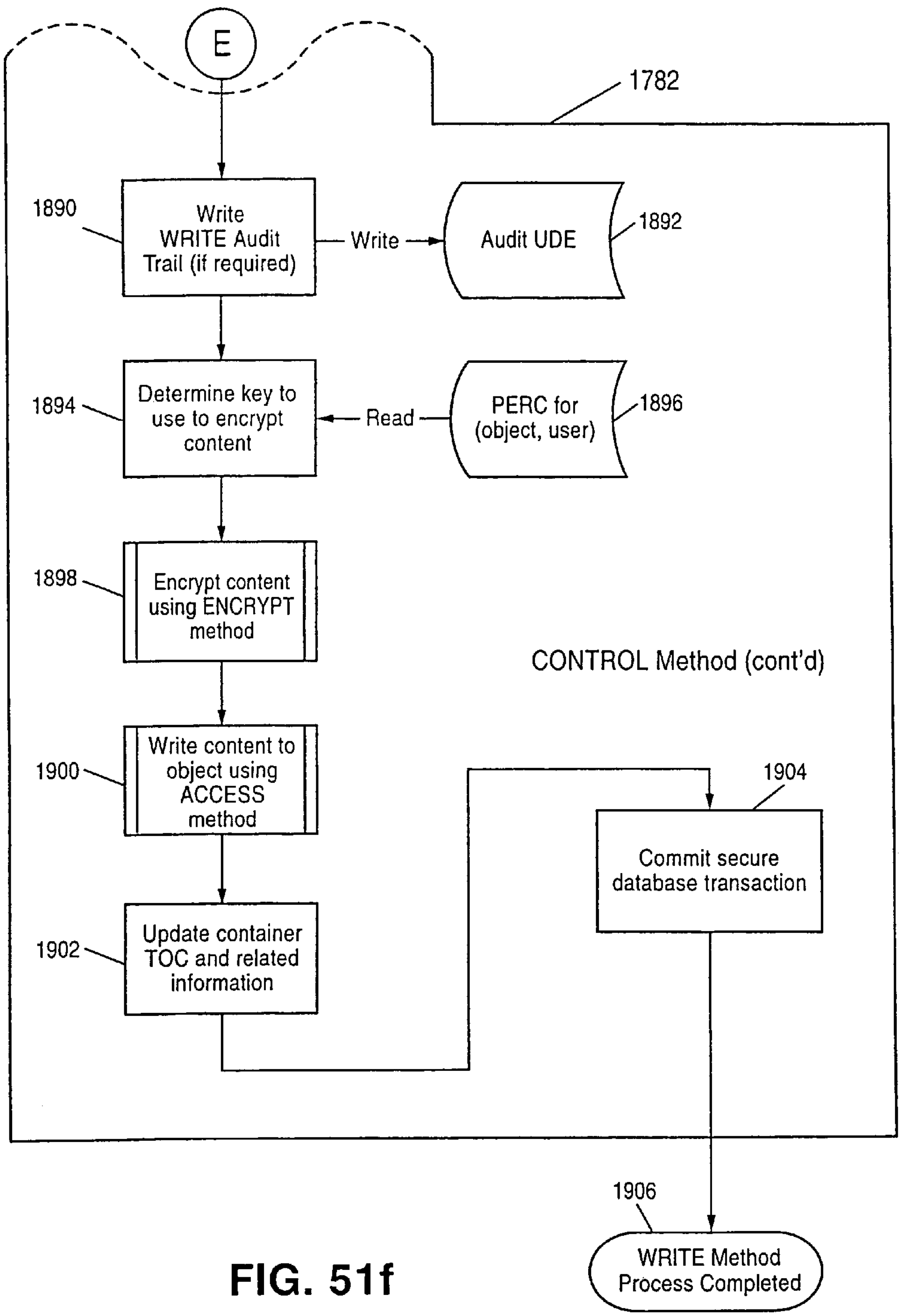

Looking at FIG. 51*f*, once the EVENT, METER, BILLING and BUDGET methods have returned successfully to WRITE control method 1782, the WRITE control method writes audit information to Audit UDE (blocks 1890, 1892), and then determines (based on the PERC for the object and user and an optional algorithm) which key should be used to encrypt the content before it is written to the container (blocks 1894, 1896). CONTROL method 1782 then encrypts the content (block 1898) possibly by calling an ENCRYPT method, and writes the encrypted content to the object (block 1900). CONTROL method 1782 may then update the table of contents (and related information) for the container to reflect the newly written information (block 1902), commit the secure database transaction (block 1904), and return (block 1906).

Close

Figure 52:
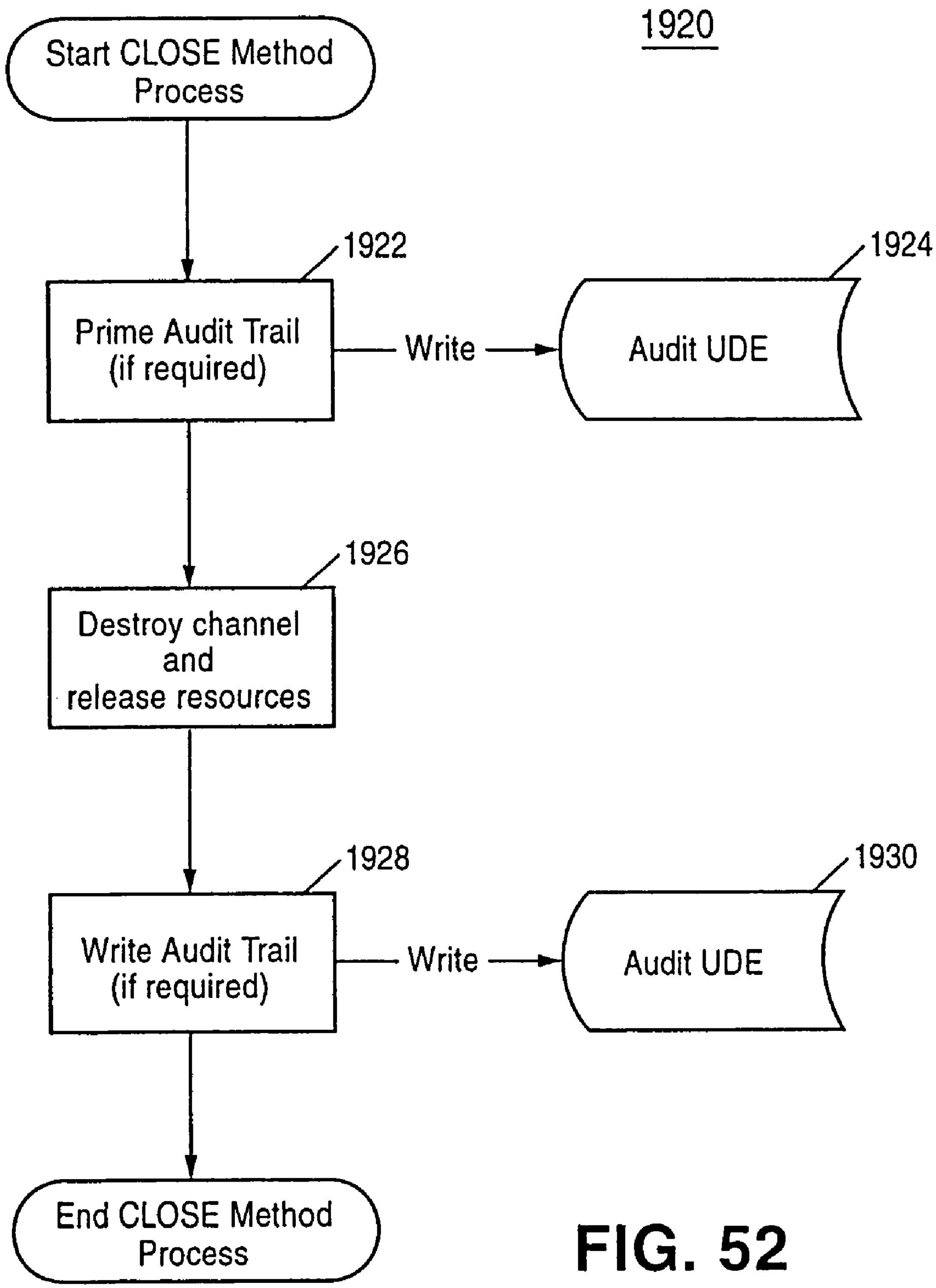
FIG. 52 shows an example of a CLOSE method.

FIG. 52 is a flowchart of an example of process control steps to perform a representative example of a CLOSE method 1920 in the preferred embodiment. CLOSE method 1920 is used to close an open object. In the preferred embodiment, CLOSE method 1920 primes an audit trail and writes audit information to an Audit UDE (blocks 1922, 1924). CLOSE method 1920 then may destroy the current channel(s) being used to support and/or process one or more open objects (block 1926). As discussed above, in some (e g, multi-user or multi-tasking) installations, the step of destroying a channel is not needed because the channel may be left operating for processing additional objects for the same or different users. CLOSE method 1920 also releases appropriate records and resources associated with the object at this time (block 1926). The CLOSE method 1920 may then write an audit trail (if required) into an Audit UDE (blocks 1928, 1930) before completing.

Event

Figure 53A:
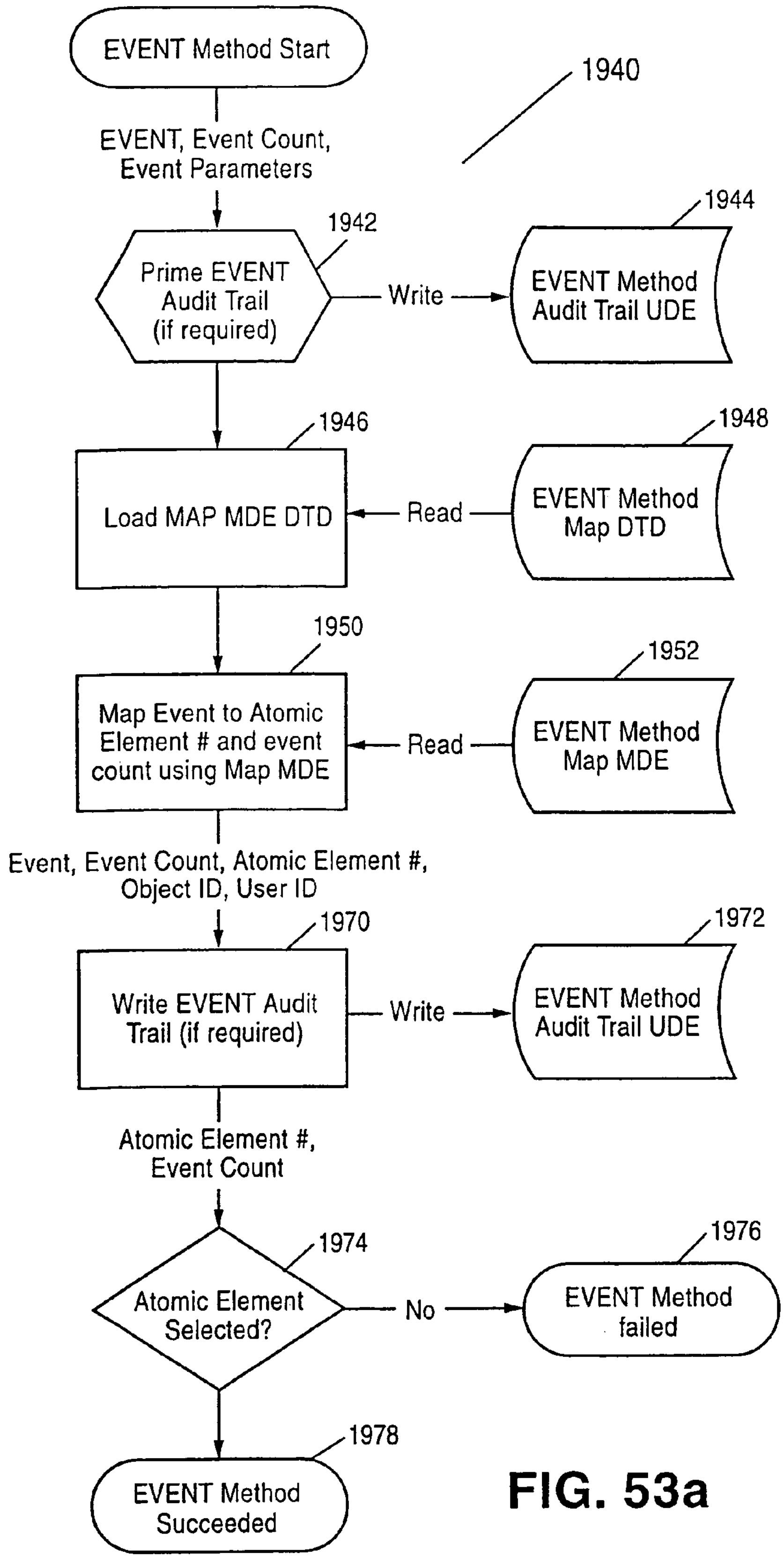
FIGS. 53A-53B show an example of an EVENT method.

FIG. 53*a* is a flowchart of example process control steps provided by a more general example of an EVENT method 1940 provided by the preferred embodiment. Examples of EVENT methods are set forth in FIGS. 49*b*, 50*b* and 51*b* and are described above. EVENT method 1940 shown in FIG. 53*a* is somewhat more generalized than the examples above. Like the EVENT method examples above, EVENT method 1940 receives an identification of the event along with an event count and event parameters. EVENT method 1940 may first prime an EVENT audit trail (if required) by writing appropriate information to an EVENT method Audit Trail UDE (blocks 1942, 1944). EVENT method 1940 may then obtain and load an EVENT method map DTD from the secure database (blocks 1946, 1948). This EVENT method map DTD describes, in this example, the format of the EVENT method map MDE to be read and accessed immediately subsequently (by blocks 1950, 1952). In the preferred embodiment, MDEs and UDEs may have any of various different formats, and their formats may be flexibly specified or changed dynamically depending upon the installation, user, etc. The DTD, in effect, describes to the EVENT method 1940 how to read from the EVENT method map MDE. DTDs are also used to specify how methods should write to MDEs and UDEs, and thus may be used to implement privacy filters by, for example, preventing certain confidential user information from being written to data structures that will be reported to third parties.

Block 1950 ("map event to atomic element # and event count using a Map MDE") is in some sense the "heart" of EVENT method 1940. This step "maps" the event into an "atomic element number" to be responded to by subsequently called methods. An example of process control steps performed by a somewhat representative example of this "mapping" step 1950 is shown in FIG. 53*b*.

Figure 53B:
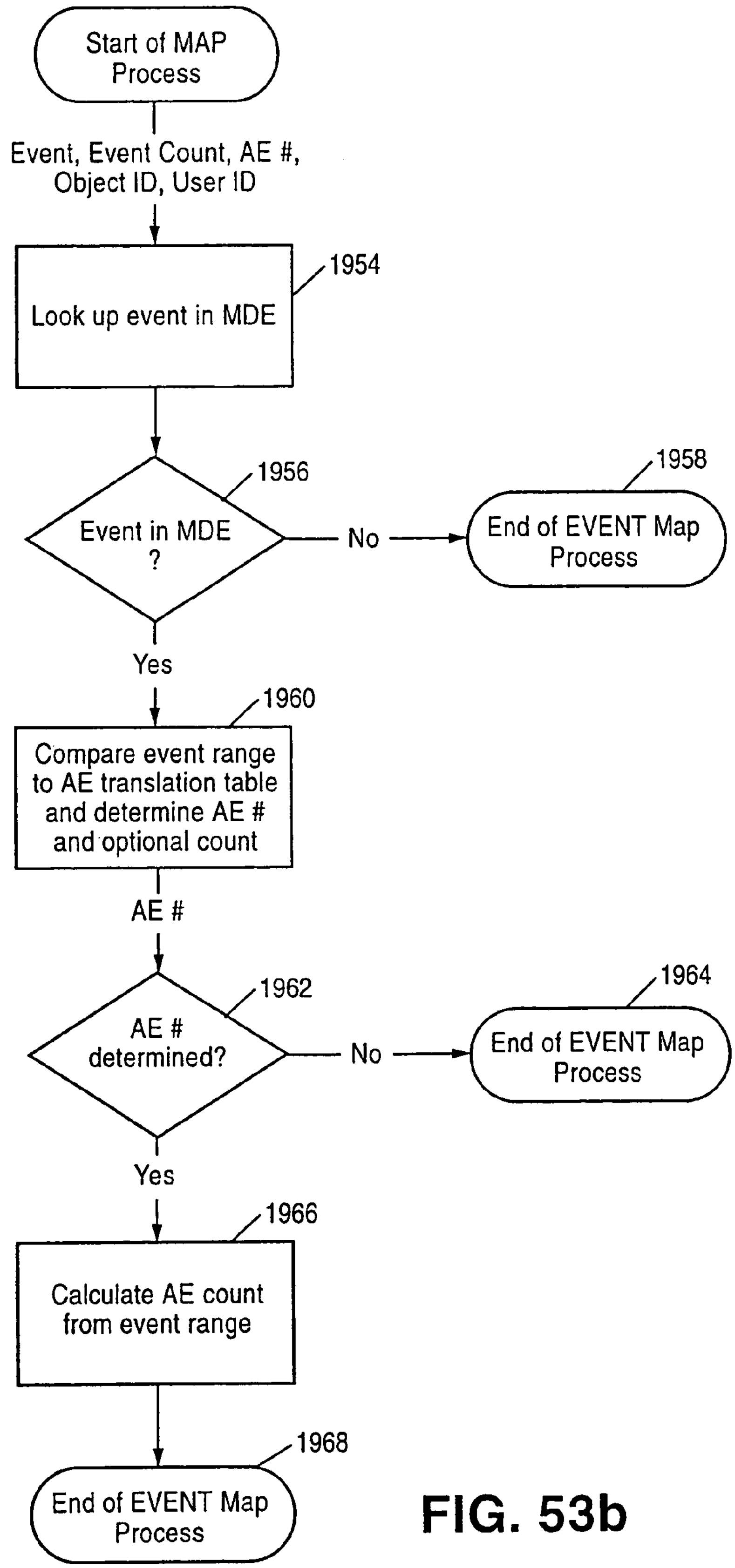

The FIG. 53*b* example shows the process of converting a READ event that is associated with requesting byte range 1001-1500 from a specific piece of content into an appropriate atomic element. The example EVENT method mapping process (block 1950 in FIG. 53*a*) can be detailed as the representative process shown in FIG. 53*b*.

EVENT method mapping process 1950 may first look up the event code (READ) in the EVENT method MDE (1952) using the EVENT method map DTD (1948) to determine the structure and contents of the MDE. A test might then be performed to determine if the event code was found in the MDE (1956), and if not ("No" branch), the EVENT method mapping process may the terminate (1958) without mapping the event to an atomic element number and count. If the event was found in the MDE ("Yes" branch), the EVENT method mapping process may then compare the event range (e.g., bytes 1001-1500) against the atomic element to event range mapping table stored in the MDE (block 1960). The comparison might yield one or more atomic element numbers or the event range might not be found in the mapping table. The result of the comparison might then be tested (block 1962) to determine if any atomic element numbers were found in the table. If not ("No" branch), the EVENT method mapping process may terminate without selecting any atomic element numbers or counts (1964). If the atomic element numbers were found, the process might then calculate the atomic element count from the event range (1966). In this example, the process might calculate the number of bytes requested by subtracting the upper byte range from the lower byte range (e.g., 1500−1001+1=500). The example EVENT method mapping process might then terminate (block 1968) and return the atomic element number(s) and counts.

EVENT method 1940 may then write an EVENT audit trail if required to an EVENT method Audit Trail UDE (block 1970, 1972). EVENT method 1940 may then prepare to pass the atomic element number and event count to the calling CONTROL method (or other control process) (at exit point 1978). Before that, however, EVENT method 1940 may test whether an atomic element was selected (decision block 1974). If no atomic element was selected, then the EVENT method may be failed (block 1974). This may occur for a number of reasons. For example, the EVENT method may fail to map an event into an atomic element if the user is not authorized to access the specific areas of content that the EVENT method MDE does not describe. This mechanism could be used, for example, to distribute customized versions of a piece of content and control access to the various versions in the content object by altering the EVENT method MDE delivered to the user. A specific use of this technology might be to control the distribution of different language (e.g., English, French, Spanish) versions of a piece of content.

Billing

Figure 53C:
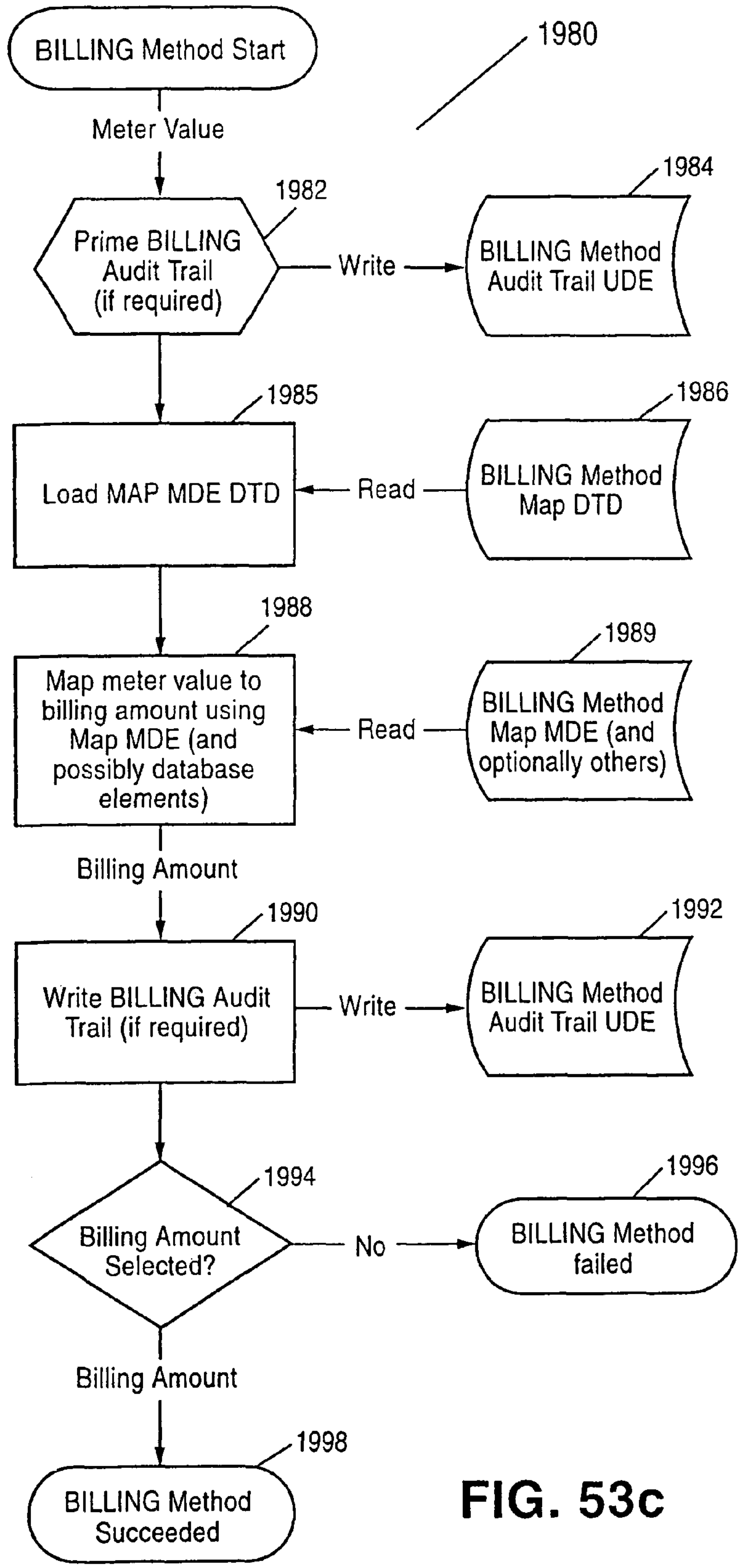
FIG. 53C shows an example of a BILLING method.

FIG. 53*c* is a flowchart of an example of process control steps performed by a BILLING method 1980. Examples of BILLING methods are set forth in FIGS. 49*d*, 50*d*, and 51*d* and are described above. BILLING method 1980 shown in FIG. 53*c* is somewhat more generalized than the examples above. Like the BILLING method examples above, BILLING method 1980 receives a meter value to determine the amount to bill. BILLING method 1980 may first prime a BILLING audit trail (if required) by writing appropriate information to the BILLING method Audit. Trail UDE (blocks 1982, 1984). BILLING method 1980 may then obtain and load a BILLING method map DTD from the secure database (blocks 1985, 1986), which describes the BILLING method map MDE (e.g., a price list, table, or parameters to the billing amount calculation algorithm) that should be used by this BILLING method. The BILLING method map MDE may be delivered either as part of the content object or as a separately deliverable component that is combined with the control information at registration.

The BILLING method map MDE in this example may describe the pricing algorithm that should be used in this BILLING method (e.g., bill $0.001 per byte of content released). Block 1988 ("Map meter value to billing amount") functions in the same manner as block 1950 of the EVENT method; it maps the meter value to a billing value. Process step 1988 may also interrogate the secure database (as limited by the privacy filter) to determine if other objects or information (e.g., user information) are present as part of the BILLING method algorithm.

BILLING method 1980 may then write a BILLING audit trail if required to a BILLING method Audit Trail UDE (block 1990, 1992), and may prepare to return the billing amount to the calling CONTROL method (or other control process). Before that, however, BILLING method 1980 may test whether a billing amount was determined (decision block 1994). If no billing amount was determined, then the BILLING method may be failed (block 1996). This may occur if the user is not authorized to access the specific areas of the pricing table that the BILLING method MDE describes (e.g., you may purchase not more than $100.00 of information from this content object).

Access

Figure 54:
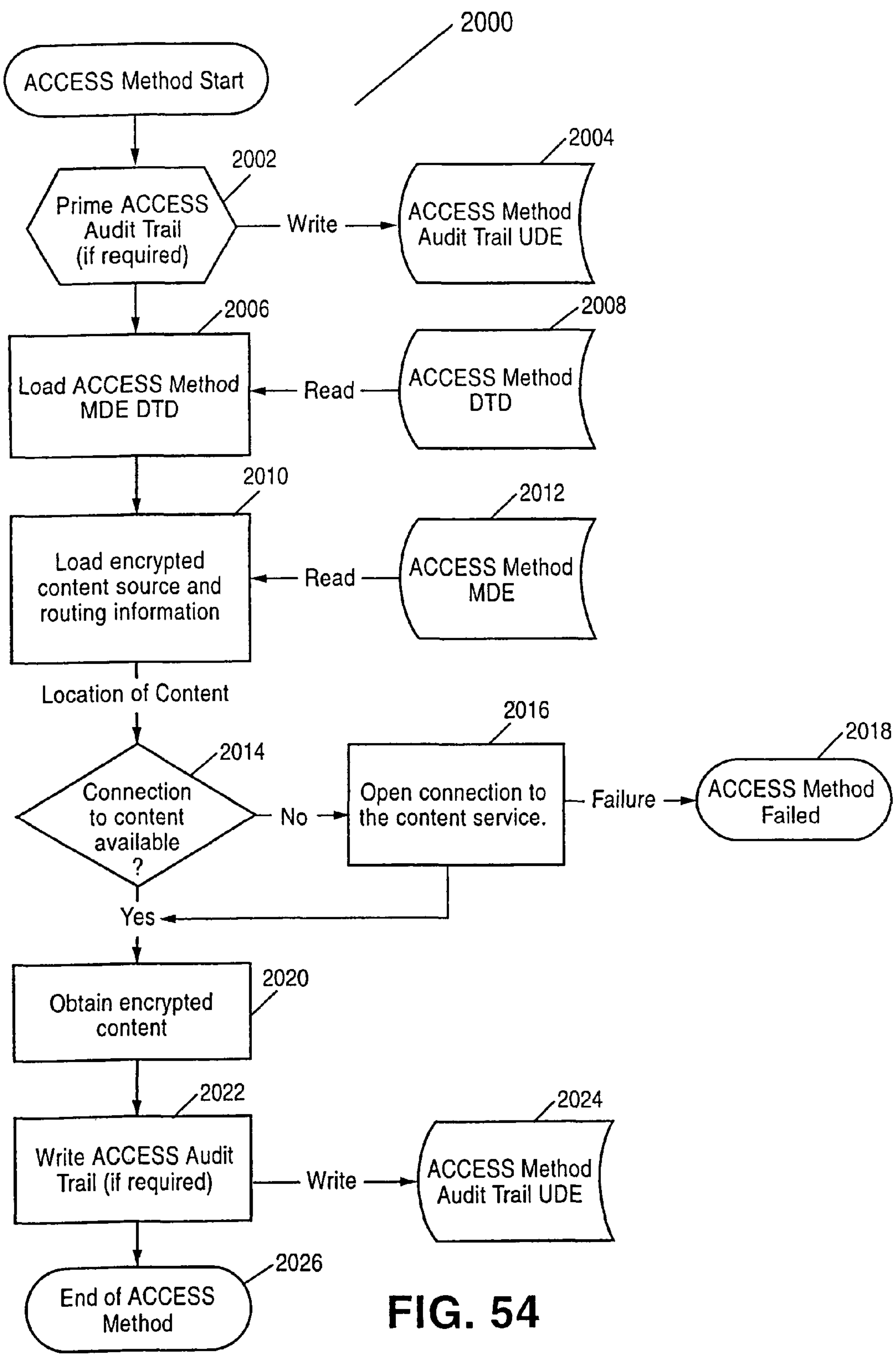
FIG. 54 shows an example of an ACCESS method.

FIG. 54 is a flowchart of an example of program control steps performed by an ACCESS method 2000. As described above, an ACCESS method may be used to access content embedded in an object 300 so it can be written to, read from, or otherwise manipulated or processed. In many cases, the ACCESS method may be relatively trivial since the object may, for example, be stored in a local storage that is easily accessible. However, in the general case, an ACCESS method 2000 must go through a more complicated procedure in order to obtain the object. For example, some objects (or parts of objects) may only be available at remote sites or may be provided in the form of a real-time download or feed (e.g, in the case of broadcast transmissions). Even if the object is stored locally to the VDE node, it may be stored as a secure or protected object so that it is not directly accessible to a calling process. ACCESS method 2000 establishes the connections, routings, and security requisites needed to access the object. These steps may be performed transparently to the calling process so that the calling process only needs to issue an access request and the particular ACCESS method corresponding to the object or class of objects handles all of the details and logistics involved in actually accessing the object.

ACCESS method 2000 may first prime an ACCESS audit trail (if required) by writing to an ACCESS Audit Trail UDE (blocks 2002, 2004). ACCESS method 2000 may then read and load an ACCESS method DTD in order to determine the format of an ACCESS MDE (blocks 2006, 2008). The ACCESS method MDE specifies the source and routing information for the particular object to be accessed in the preferred embodiment. Using the ACCESS method DTD, ACCESS method 2000 may load the correction parameters (e.g., by telephone number, account ID, password and/or a request script in the remote resource dependent language).

ACCESS method 2000 reads the ACCESS method MDE from the secure database, reads it in accordance with the ACCESS method DTD, and loads encrypted content source and routing information based on the MDE (blocks 2010, 2012). This source and routing information specifies the location of the encrypted content. ACCESS method 2000 then determines whether a connection to the content is available (decision block 2014). This "connection" could be, for example, an on-line connection to a remote site, a real-time information feed, or a path to a secure/protected resource, for example. If the connection to the content is not currently available ("No" exit of decision block 2014), then ACCESS method 2000 takes steps to open the connection (block 2016). If the connection fails (e.g., because the user is not authorized to access a protected secure resource), then the ACCESS method 2000 returns with a failure indication (termination point 2018). If the open connection succeeds, on the other hand, then ACCESS method 2000 obtains the encrypted content (block 2020). ACCESS method 2000 then writes an ACCESS audit trail if required to the secure database ACCESS method Audit Trail UDE (blocks 2022, 2024), and then terminates (terminate point 2026).

Decrypt and Encrypt

Figure 55A:
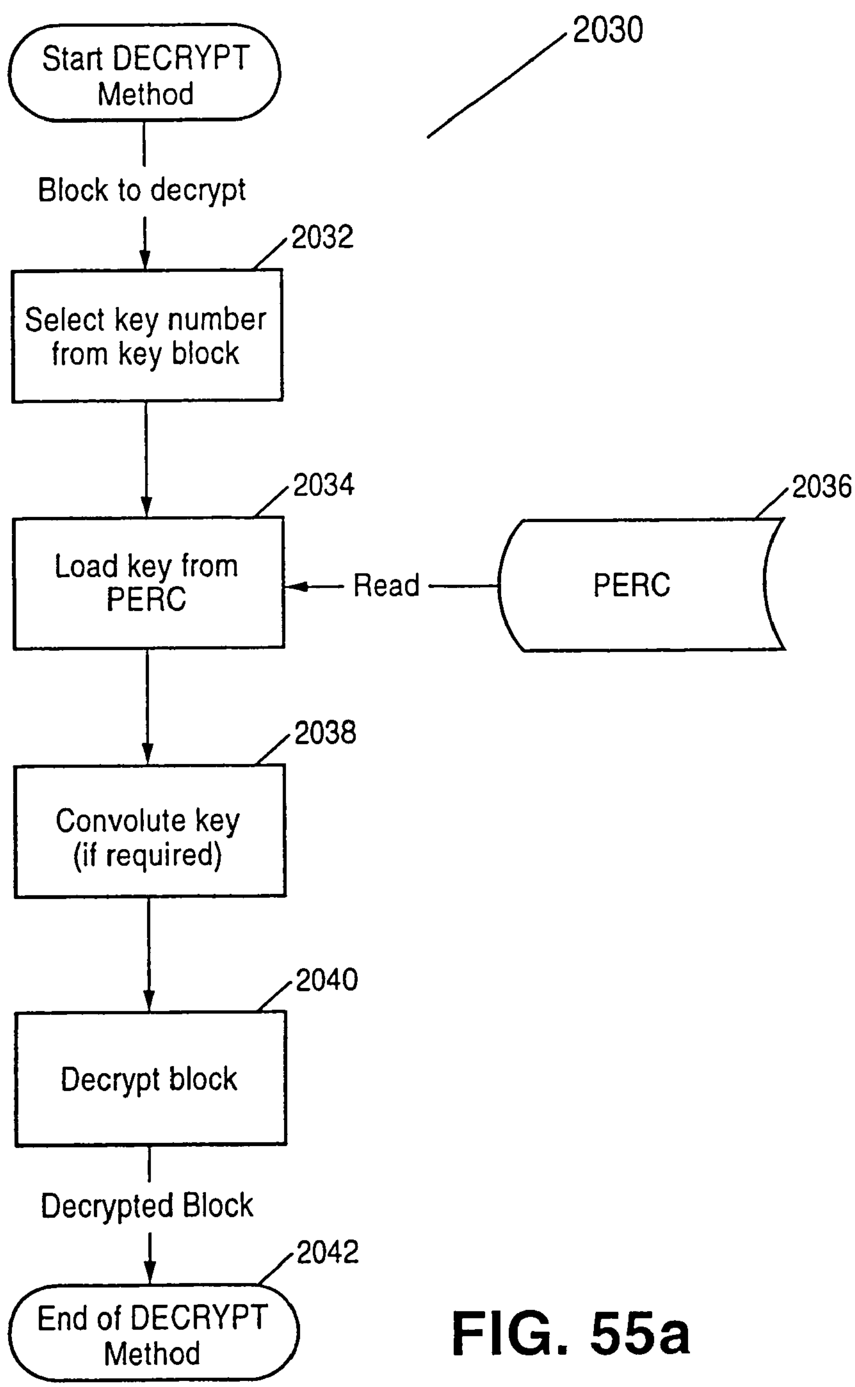
FIGS. 55A-55B show examples of DECRYPT and ENCRYPT methods.

FIG. 55*a* is a flowchart of an example of process control steps performed by a representative example of a DECRYPT method 2030 provided by the preferred embodiment. DECRYPT method 2030 in the preferred embodiment obtains or derives a decryption key from an appropriate PERC 808, and uses it to decrypt a block of encrypted content. DECRYPT method 2030 is passed a block of encrypted content or a pointer to where the encrypted block is stored. DECRYPT 2030 selects a key number from a key block (block 2032). For security purposes, a content object may be encrypted with more than one key. For example, a movie may have the first 10 minutes encrypted using a first key, the second 10 minutes encrypted with a second key, and so on. These keys are stored in a PERC 808 in a structure called a "key block." The selection process involves determining the correct key to use from the key block in order to decrypt the content. The process for this selection is similar to the process used by EVENT methods to map events into atomic element numbers. DECRYPT method 2030 may then access an appropriate PERC 808 from the secure database 610 and loads a key (or "seed") from a PERC (blocks 2034, 2036). This key information may be the actual decryption key to be used to decrypt the content, or it may be information from which the decryption key may be at least in part derived or calculated. If necessary, DECRYPT method 2030 computes the decryption key based on the information read from PERC 808 at block 2034 (block 2038). DECRYPT method 2030 then uses the obtained and/or calculated decryption key to actually decrypt the block of encrypted information (block 2040). DECRYPT method 2030 outputs the decrypted block (or the pointer indicating where it may be found), and terminates (termination point 2042).

Figure 55B:
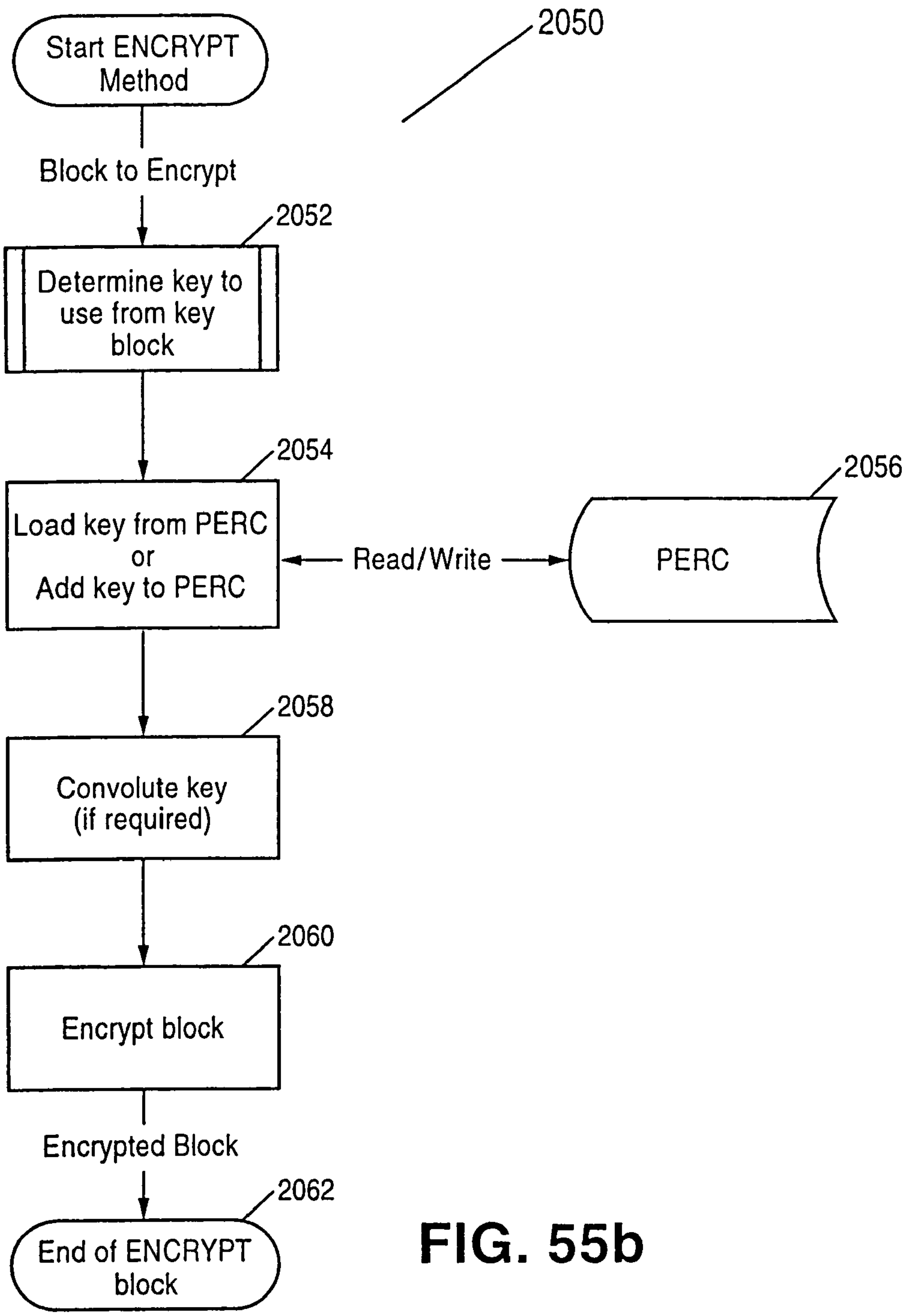

FIG. 55*b* is a flowchart of an example of process control steps performed by a representative example of an ENCRYPT method 2050. ENCRYPT method 2050 is passed as an input, a block of information to encrypt (or a pointer indicating where it may be found). ENCRYPT method 2050 then may determine an encryption key to use from a key block (block 2052). The encryption key selection makes a determination if a key for a specific block of content to be written already exists in a key block stored in PERC 808. If the key already exists in the key block then the appropriate key number is selected. If no such key exists in the key block, a new key is calculated using an algorithm appropriate to the encryption algorithm. This key is then stored in the key block of PERC 808 so that DECRYPT method 2030 may access the key in order to decrypt the content stored in the content object ENCRYPT method 2050 then accesses the appropriate PERC to obtain, derive and/or compute an encryption key to be used to encrypt the information block (blocks 2054, 2056, 2058, which are similar to FIG. 55*a* blocks 2034, 2036, 2038). ENCRYPT method 2050 then actually encrypts the information block using the obtained and/or derived encryption key (block 2060) and outputs the encrypted information block or a pointer where it can be found before terminating (termination point 2062).

Content

Figure 56:
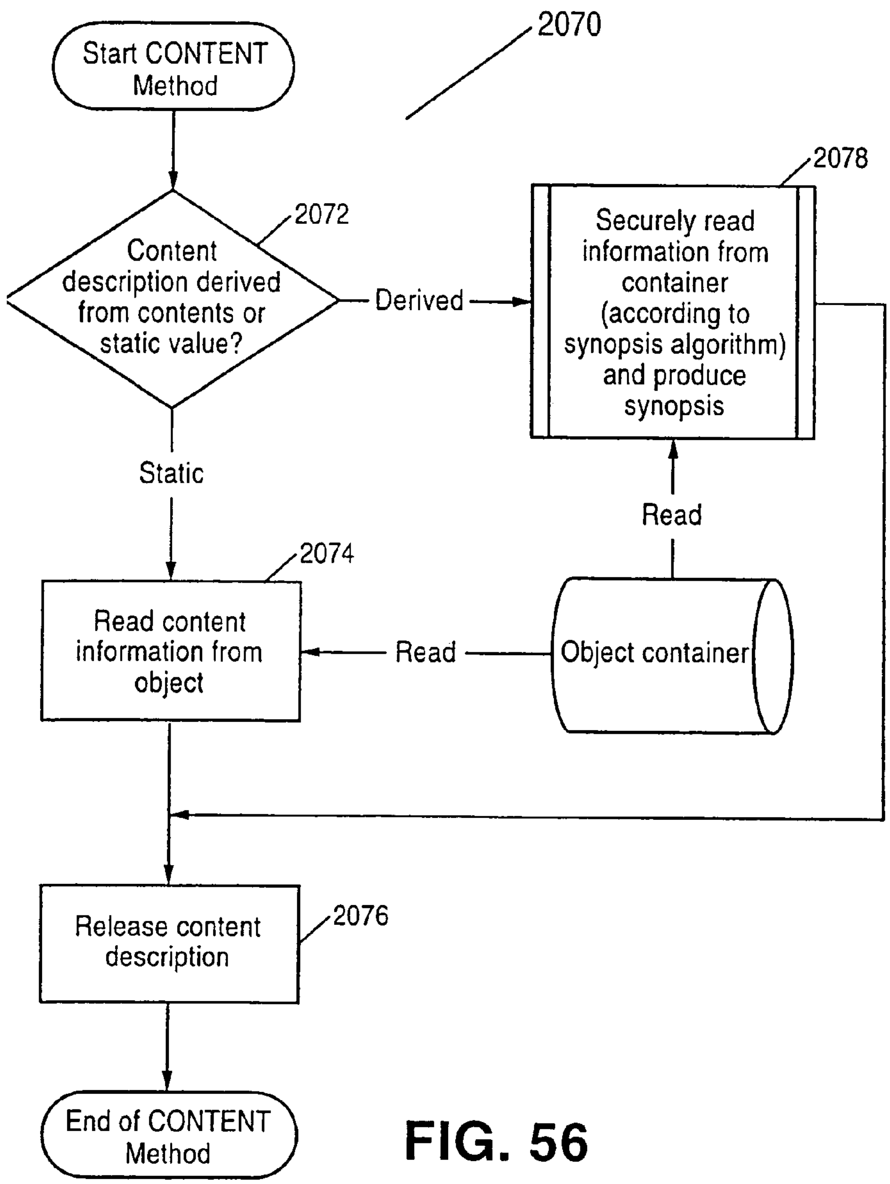
FIG. 56 shows an example of a CONTENT method.

FIG. 56 is a flowchart of an example of process control steps performed by a representative of a CONTENT method 2070 provided by the preferred embodiment. CONTENT method 2070 in the preferred embodiment builds a "synopsis" of protected content using a secure process. For example, CONTENT method 2070 may be used to derive unsecure ("public") information from secure content. Such derived public information might include, for example, an abstract, an index, a table of contents, a directory of files, a schedule when content may be available, or excerpts such as for example, a movie "trailer."

CONTENT method 2070 begins by determining whether the derived content to be provided must be derived from secure contents, or whether it is already available in the object in the form of static values (decision block 2070). Some objects may, for example, contain prestored abstracts, indexes, tables of contents, etc., provided expressly for the purpose of being extracted by the CONTENT method 2070. If the object contains such static values ("static" exit to decision block 2072), then CONTENT method 2070 may simply read this static value content information from the object (block 2074), optionally decrypt, and release this content description (block 2076). If, on the other hand, CONTENT method 2070 must derive the synopsis/content description from the secure object ("derived" exit to decision block 2072), then the CONTENT method may then securely read information from the container according to a synopsis algorithm to produce the synopsis (block 2078).

Extract and Embed

Figure 57A:
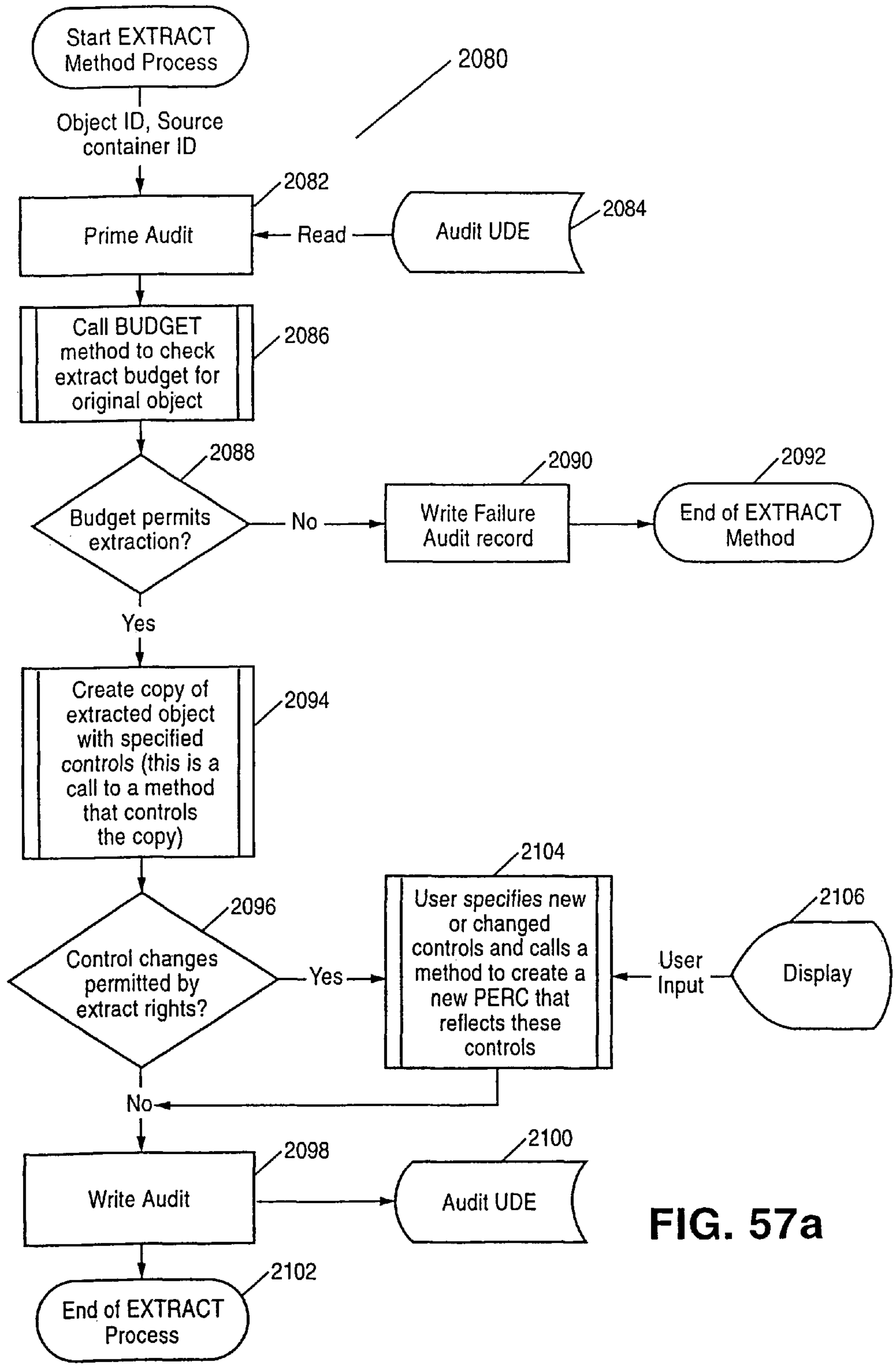
FIGS. 57A and 57B show examples of EXTRACT and EMBED methods.

FIG. 57*a* is a flowchart of an example of process control steps performed by a representative example of an EXTRACT method 2080 provided by the preferred embodiment. EXTRACT method 2080 is used to copy or remove content from an object and place it into a new object. In the preferred embodiment, the EXTRACT method 2080 does not involve any release of content, but rather simply takes content from one container and places it into another container, both of which may be secure. Extraction of content differs from release in that the content is never exposed outside a secure container. Extraction and Embedding are complementary functions; extract takes content from a container and creates a new container containing the extracted content and any specified control information associated with that content. Embedding takes content that is already in a container and stores it (or the complete object) in another container directly and/or by reference, integrating the control information associated with existing content with those of the new content.

EXTRACT method 2080 begins by priming an Audit UDE (blocks 2082, 2084). EXTRACT method then calls a BUDGET method to make sure that the user has enough budget for (and is authorized to) extract content from the original object (block 2086). If the user's budget does not permit the extraction ("no" exit to decision block 2088), then EXTRACT method 2080 may write a failure audit record (block 2090), and terminate (termination point 2092). If the user's budget permits the extraction ("yes" exit to decision block 2088), then the EXTRACT method 2080 creates a copy of the extracted object with specified rules and control information (block 2094). In the preferred embodiment, this step involves calling a method that actually controls the copy. This step may or may not involve decryption and encryption, depending on the particular the PERC 808 associated with the original object, for example. EXTRACT method 2080 then checks whether any control changes are permitted by the rights authorizing the extract to begin with (decision block 2096). In some cases, the extract rights require an exact copy of the PERC 808 associated with the original object (or a PERC included for this purpose) to be placed in the new (destination) container ("no" exit to decision block 2096). If no control changes are permitted then extract method 2080 may simply write audit information to the Audit UDE (blocks 2098, 2100) before terminating (terminate point 2102). If, on the other hand, the extract rights permit the user to make control changes ("yes" to decision block 2096), then EXTRACT method 2080 may call a method or load module that solicits new or changed control information (e.g., from the user, the distributor who created/granted extract rights, or from some other source) from the user (blocks 2104, 2106). EXTRACT method 2080 may then call a method or load module to create a new PERC that reflects these user-specified-control information (block 2104). This new PERC is then placed in the new (destination) object, the auditing steps are performed, and the process terminates.

Figure 57B:
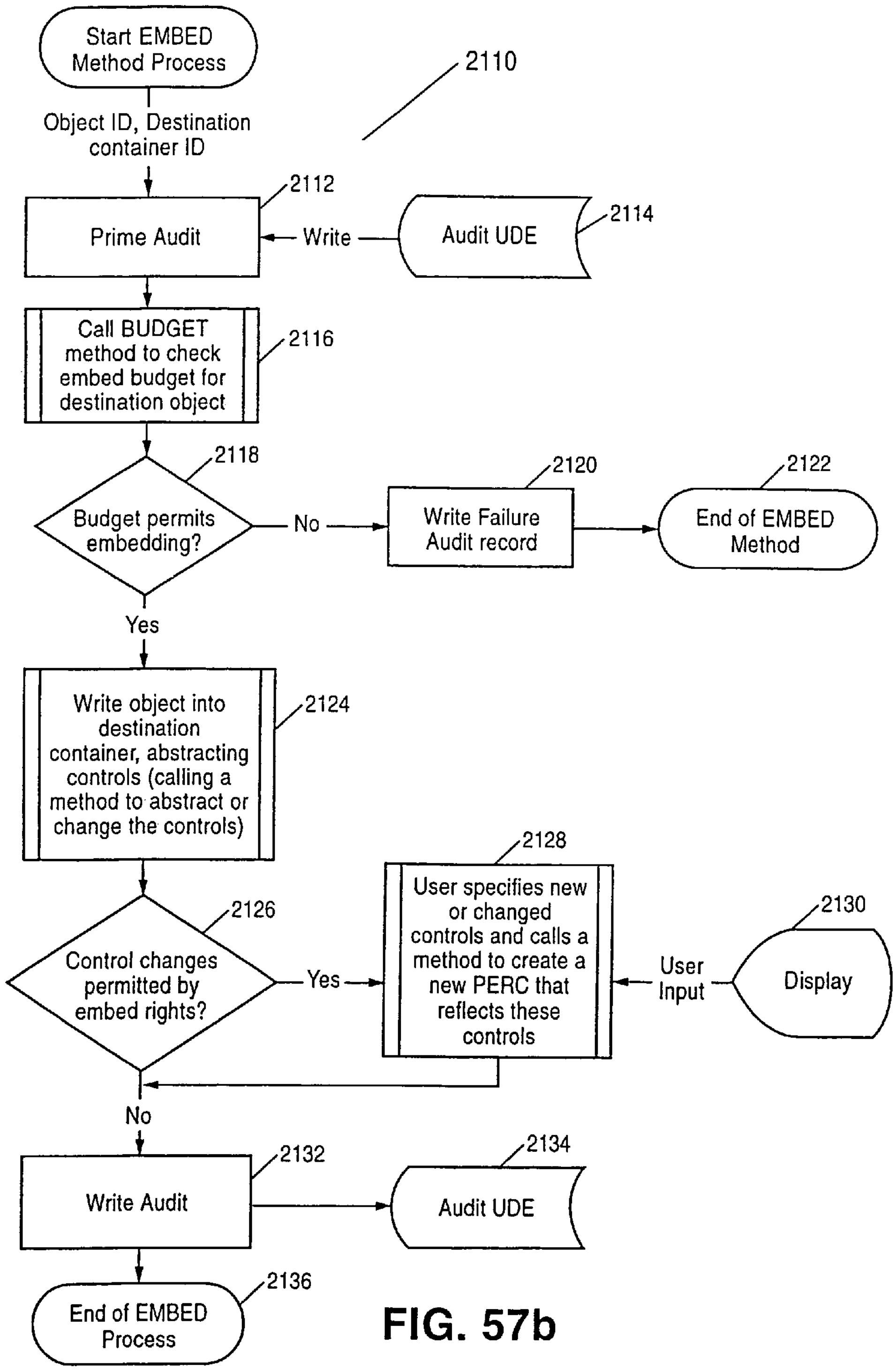

FIG. 57*b* is an example of process control steps performed by a representative example of an EMBED method 2110 provided by the preferred embodiment. EMBED method 2110 is similar to EXTRACT method 2080 shown in FIG. 57*a*. However, the EMBED method 2110 performs a slightly different function—it writes an object (or reference) into a destination container. Blocks 2112-2122 shown in FIG. 57*b* are similar to blocks 2082-2092 shown in FIG. 57*a*. At block 2124, EMBED method 2110 writes the source object into the destination container, and may at the same time extract or change the control information of the destination container. One alternative is to simply leave the control information of the destination container alone, and include the full set of control information associated with the object being embedded in addition to the original container control information. As an optimization, however, the preferred embodiment provides a technique whereby the control information associated with the object being embedded are "abstracted" and incorporated into the control information of the destination container. Block 2124 may call a method to abstract or change this control information. EMBED method 2110 then performs steps 2126-2130 which are similar to steps 2096, 2104, 2106 shown in FIG. 57*a* to allow the user, if authorized, to change and/or specify control information associated with the embedded object and/or destination container. EMBED method 2110 then writes audit information into an Audit UDE (blocks 2132, 2134), before terminating (at termination point 2136).

Obscure

Figure 58A:
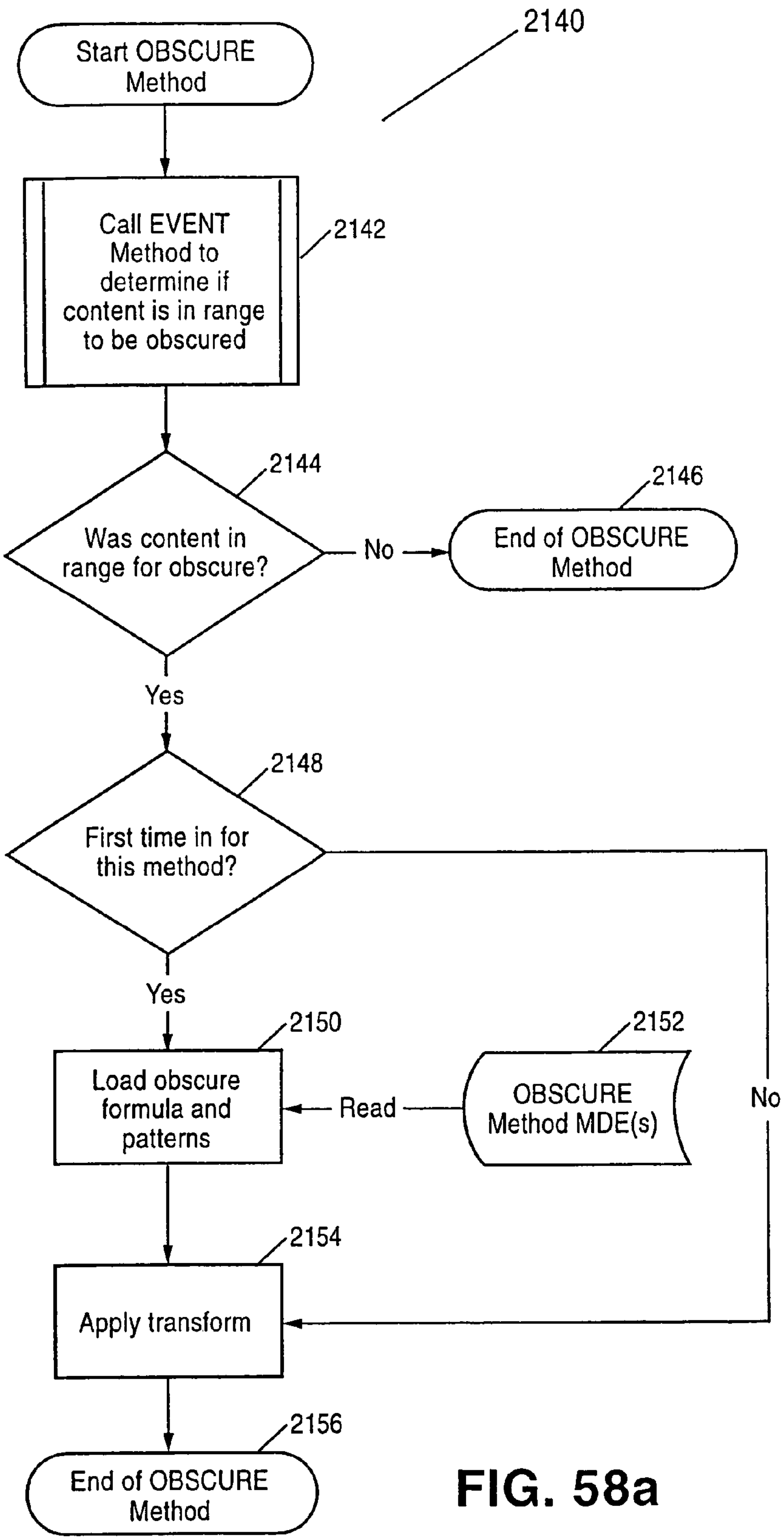
FIG. 58A shows an example of an OBSCURE method.

FIG. 58*a* is a flowchart of an example of process control steps performed by a representative example of an OBSCURE method 2140 provided by the preferred embodiment. OBSCURE method 2140 is typically used to release secure content in devalued form. For example, OBSCURE method 2140 may release a high resolution image in a lower resolution so that a viewer can appreciate the image but not enjoy its full value. As another example, the OBSCURE method 2140 may place an obscuring legend (e.g., "COPY," "PROOF," etc.) across an image to devalue it. OBSCURE method 2140 may "obscure" text, images, audio information, or any other type of content.

OBSCURE method 2140 first calls an EVENT method to determine if the content is appropriate and in the range to be obscured (block 2142). If the content is not appropriate for obscuring, the OBSCURE method terminates (decision block 2144 "no" exit, terminate point 2146). Assuming that the content is to be obscured ("yes" exit to decision block 2144), then OBSCURE method 2140 determines whether it has previously been called to obscure this content (decision block 2148). Assuming the OBSCURE 2140 has not previously called for this object/content. ("yes" exit to decision block 2148), the OBSCURE method 2140 reads an appropriate OBSCURE method MDE from the secure database and loads an obscure formula and/or pattern from the MDE (blocks 2150, 2152). The OBSCURE method 2140 may then apply the appropriate obscure transform based on the patters and/or formulas loaded by block 2150 (block 2154). The OBSCURE method then may terminate (terminate block 2156).

Fingerprint

Figure 58B:
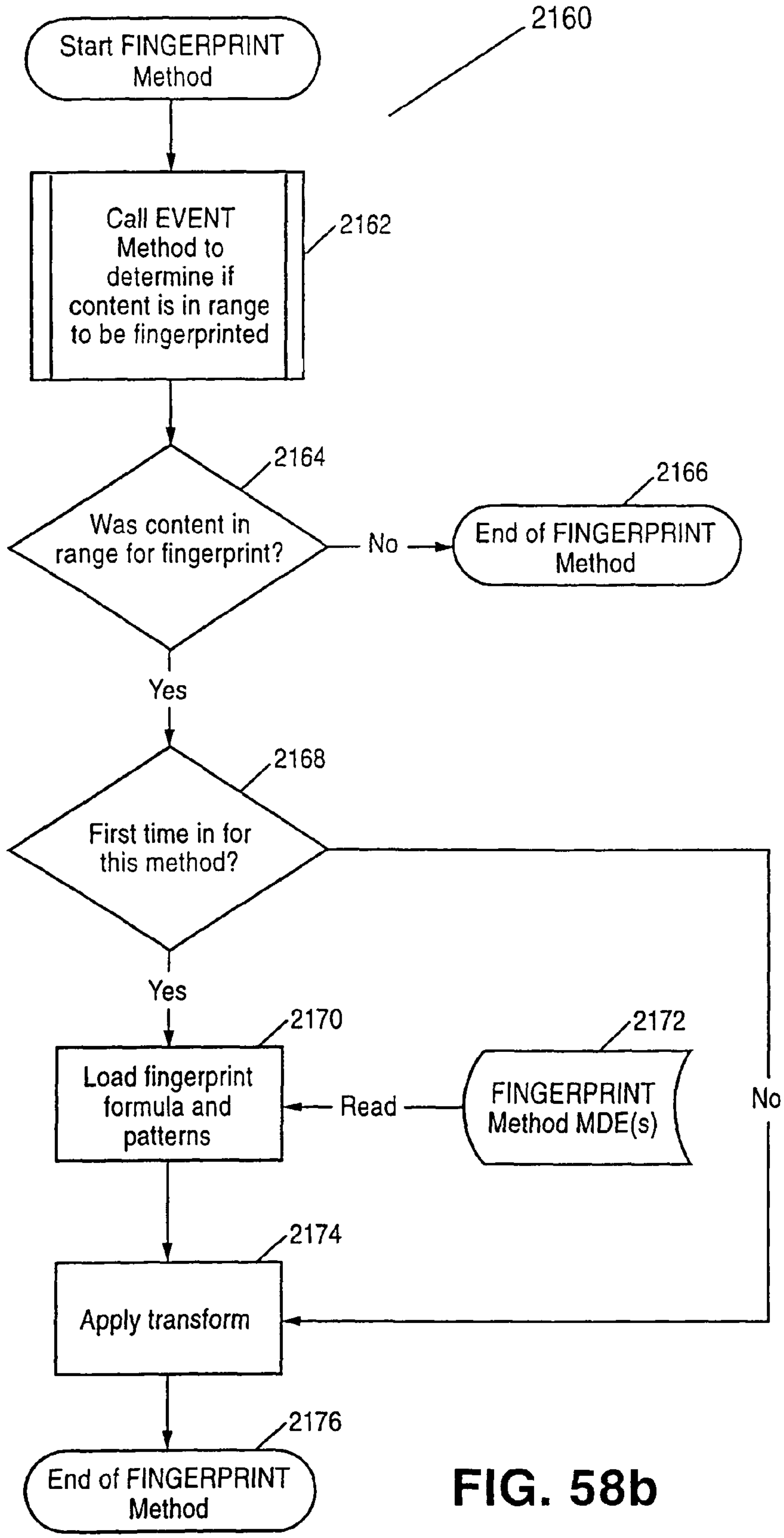
FIGS. 58B, 58C show examples of a FINGERPRINT method.

FIG. 58*b* is a flowchart of an example of process control steps performed by a representative example of a FINGERPRINT method 2160 provided by the preferred embodiment. FINGERPRINT method 2160 in the preferred embodiment operates to "mark" released content with a "fingerprint" identification of who released the content and/or check for such marks. This allows one to later determine who released unsecured content by examining the content. FINGERPRINT method 2160 may, for example, insert a user ID within a datastream representing audio, video, or binary format information. FINGERPRINT method 2160 is quite similar to OBSCURE method 2140 shown in FIG. 58*a* except that the transform applied by FINGERPRINT method block 2174 "fingerprints" the released content rather than obscuring it.

Figure 58C:
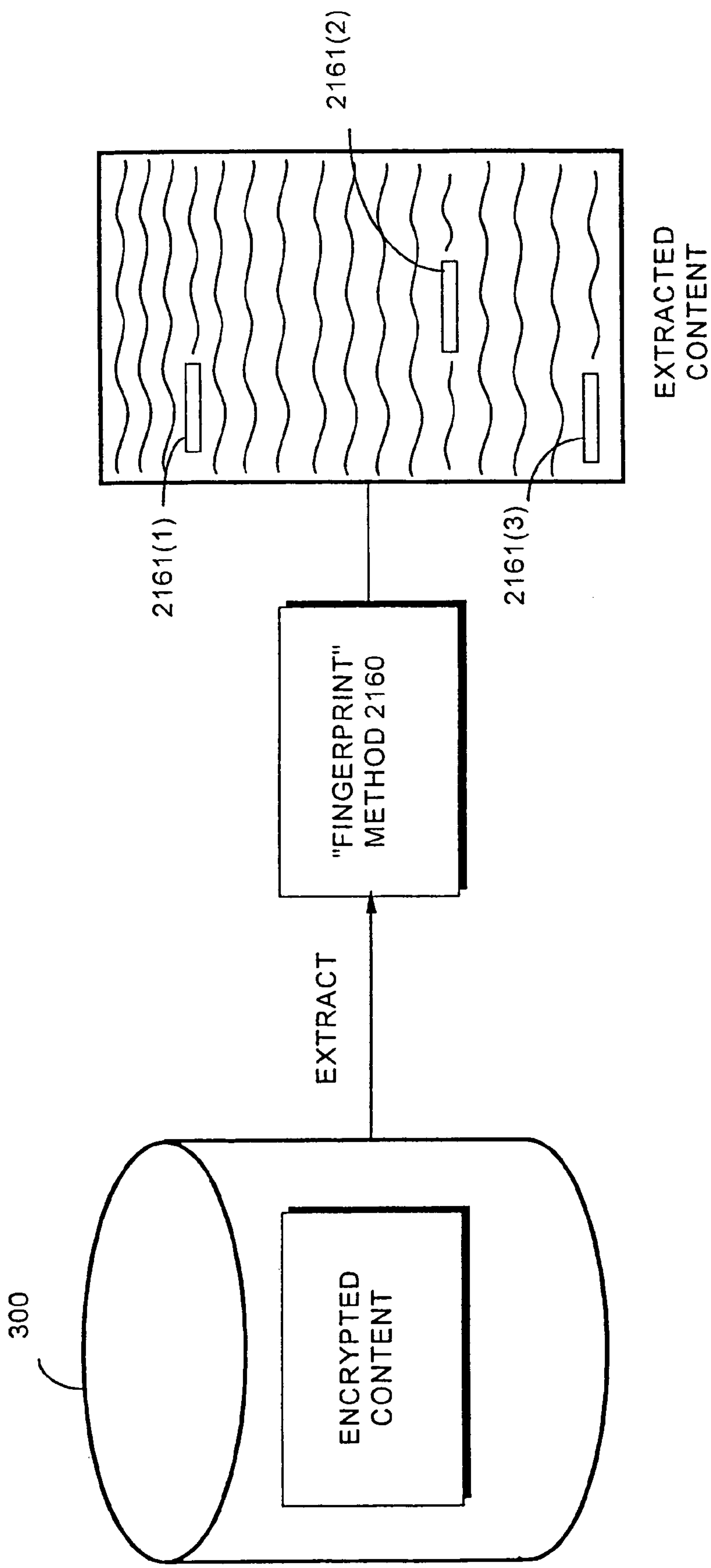

FIG. 58*c* shows an example of a "fingerprinting" procedure 2160 that inserts into released content "fingerprints" 2161 that identify the object and/or property and/or the user that requested the released content and/or the date and time of the release and/or other identification criteria of the released content.

Such fingerprints 2161 can be "buried"—that is inserted in a manner that hides the fingerprints from typical users, sophisticated "hackers," and/or from all users, depending on the file format, the sophistication and/or variety of the insertion algorithms, and on the availability of original, non-fingerprinted content (for comparison for reverse engineering of algorithm(s)). Inserted or embedded fingerprints 2161, in a preferred embodiment, may be at least in part encrypted to make them more secure. Such encrypted fingerprints 2161 may be embedded within released content provided in "clear" (plaintext) form.

Fingerprints 2161 can be used for a variety of purposes including, for example, the often related purposes of proving misuse of released materials and proving the source of released content. Software piracy is a particularly good example where fingerprinting can be very useful. Fingerprinting can also help to enforce content providers' rights for most types of electronically delivered information including movies, audio recordings, multimedia, information databases, and traditional "literary" materials. Fingerprinting is a desirable alternative or addition to copy protection.

Most piracy of software applications, for example, occurs not with the making of an illicit copy by an individual for use on another of the individual's own computers, but rather in giving a copy to another party. This often starts a chain (or more accurately a pyramid) of illegal copies, as copies are handed from individual to individual. The fear of identification resulting from the embedding of a fingerprint 2161 will likely dissuade most individuals from participating, as many currently do, in widespread, "casual" piracy. In some cases, content may be checked for the presence of a fingerprint by a fingerprint method to help enforce content providers' rights.

Different fingerprints 2161 can have different levels of security (e.g., one fingerprint 2161(1) could be readable/identifiable by commercial concerns, while another fingerprint 2161(2) could be readable only by a more trusted agency. The methods for generating the more secure fingerprint 2161 might employ more complex encryption techniques (e.g., digital signatures) and/or obscuring of location methodologies. Two or more fingerprints 2161 can be embedded in different locations and/or using different techniques to help protect fingerprinted information against hackers. The more secure fingerprints might only be employed periodically rather than each time content release occurs, if the technique used to provide a more secure fingerprint involves an undesired amount of additional overhead. This may nevertheless be effective since a principal objective of fingerprinting is deterrence—that is the fear on the part of the creator of an illicit copy that the copying will be found out.

For example, one might embed a copy of a fingerprint 2161 which might be readily identified by an authorized party—for example a distributor, service personal, client administrator, or clearinghouse using a VDE electronic appliance 600. One might embed one or more additional copies or variants of a fingerprint 2161 (e.g., fingerprints carrying information describing some or all relevant identifying information) and this additional one or more fingerprints 2161 might be maintained in a more secure manner.

Fingerprinting can also protect privacy concerns. For example, the algorithm and/or mechanisms needed to identify the fingerprint 2161 might be available only through a particularly trusted agent.

Fingerprinting 2161 can take many forms. For example, in an image, the color of every N pixels (spread across an image, or spread across a subset of the image) might be subtly shifted in a visually unnoticeable manner (at least according to the normal, unaided observer). These shifts could be interpreted by analysis of the image (with or without access to the original image), with each occurrence or lack of occurrence of a shift in color (or greyscale) being one or more binary "on or off" bits for digital information storage. The N pixels might be either consistent, or alternatively, pseudo-random in order (but interpretable, at least in part, by a object creator, object provider, client administrator, and/or VDE administrator).

Other modifications of an image (or moving image, audio etc.) which provide a similar benefit (that is, storing information in a form that is not normally noticeable as a result of a certain modification of the source information) may be appropriate depending on the application. For example, certain subtle modifications in the frequency of stored audio information can be modified so as to be normally unnoticeable to the listener while still being readable with the proper tools. Certain properties of the storage of information might be modified to provide such slight but interpretable variations in polarity of certain information which is optically stored to achieve similar results. Other variations employing other electronic, magnetic, and/or optical characteristic may be employed.

Content stored in files that employ graphical formats, such as Microsoft Windows word processing files, provide significant opportunities for "burying" a fingerprint 2161. Content that includes images and/or audio provides the opportunity to embed fingerprints 2161 that may be difficult for unauthorized individuals to identify since, in the absence of an "unfingerprinted" original for purposes of comparison, minor subtle variations at one or more time instances in audio frequencies, or in one or more video images, or the like, will be in themselves undiscernible given the normally unknown nature of the original and the large amounts of data employed in both image and sound data (and which is not particularly sensitive to minor variations). With formatted text documents, particularly those created with graphical word processors (such as Microsoft Windows or Apple Macintosh word processors and their DOS and Unix equivalents), fingerprints 216 can normally be inserted unobtrusively into portions of the document data representation that are not normally visible to the end user (such as in a header or other non-displayed data field).

Yet another form of fingerprinting, which may be particularly suitable for certain textual documents, would employ and control the formation of characters for a given font. Individual characters may have a slightly different visual formation which connotes certain "fingerprint" information. This alteration of a given character's form would be generally undiscernible, in part because so many slight variations exist in versions of the same font available from different suppliers, and in part because of the smallness of the variation. For example, in a preferred embodiment, a program such as Adobe Type Align could be used which, in its off-the-shelf versions, supports the ability of a user to modify font characters in a variety of ways. The mathematical definition of the font character is modified according to the user's instructions to produce a specific set of modifications to be applied to a character or font. Information content could be used in an analogous manner (as an alternative to user selections) to modify certain or all characters too subtly for user recognition under normal circumstances but which nevertheless provide appropriate encoding for the fingerprint 2161. Various subtly different versions of a given character might be used within a single document so as to increase the ability to carry transaction related font fingerprinted information.

Some other examples of applications for fingerprinting might include:

1. In software programs, selecting certain interchangeable code fragments in such a way as to produce more or less identical operation, but on analysis, differences that detail fingerprint information.
2. With databases, selecting to format certain fields, such as dates, to appear in different way.
3. In games, adjusting backgrounds, or changing order of certain events, including noticeable or very subtle changes in timing and/or ordering of appearance of game elements, or slight changes in the look of elements of the game.

Fingerprinting method 2160 is typically performed (if at all) at the point at which content is released from a content object 300. However, it could also be performed upon distribution of an object to "mark" the content while still in encrypted form. For example, a network-based object repository could embed fingerprints 2161 into the content of an object before transmitting the object to the requester, the fingerprint information could identify a content requester/end user. This could help detect "spoof" electronic appliances 600 used to release content without authorization.

Destroy

Figure 59:
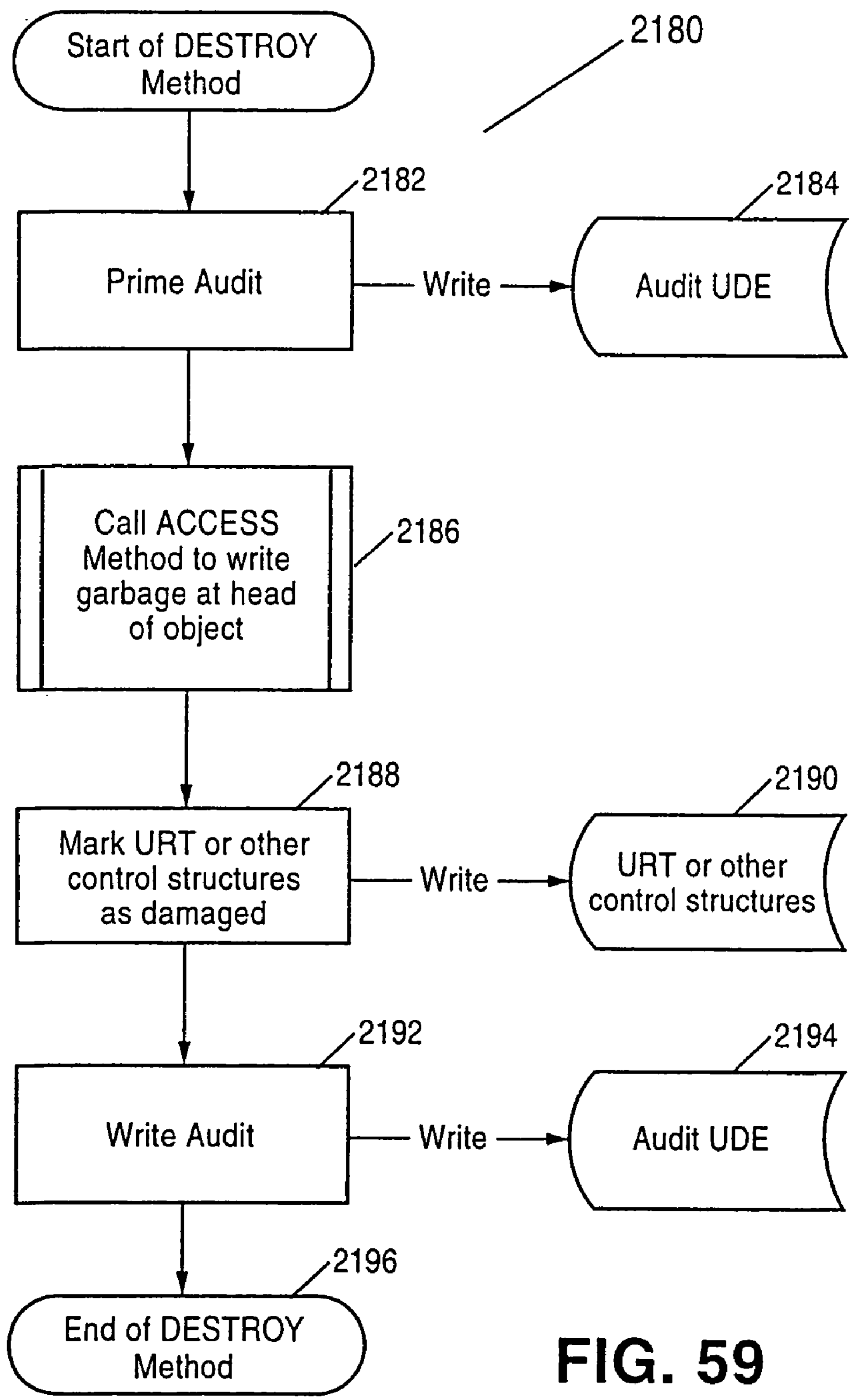
FIG. 59 shows an example of a DESTROY method.

FIG. 59 is a flowchart of an example of process control steps performed by a representative performed by a DESTROY method 2180 provided by the preferred embodiment DESTROY method 2180 removes the ability of a user to use an object by destroying the URT the user requires to access the object. In the preferred embodiment, a DESTROY method 2180 may first write audit information to an Audit UDE (blocks 2182, 2184). DESTROY method 2180 may than call a WRITE and/or ACCESS method to write information which will corrupt (and thus destroy) the header and/or other important parts of the object (block 2186). DESTROY method 2180 may then mark one or more of the control structures (e.g., the URT) as damaged by writing appropriate information to the control structure (blocks 2188, 2190). DESTROY method 2180, finally, may write additional audit information to Audit UDE (blocks 2192, 2194) before terminating (terminate point 2196).

Panic

Figure 60:
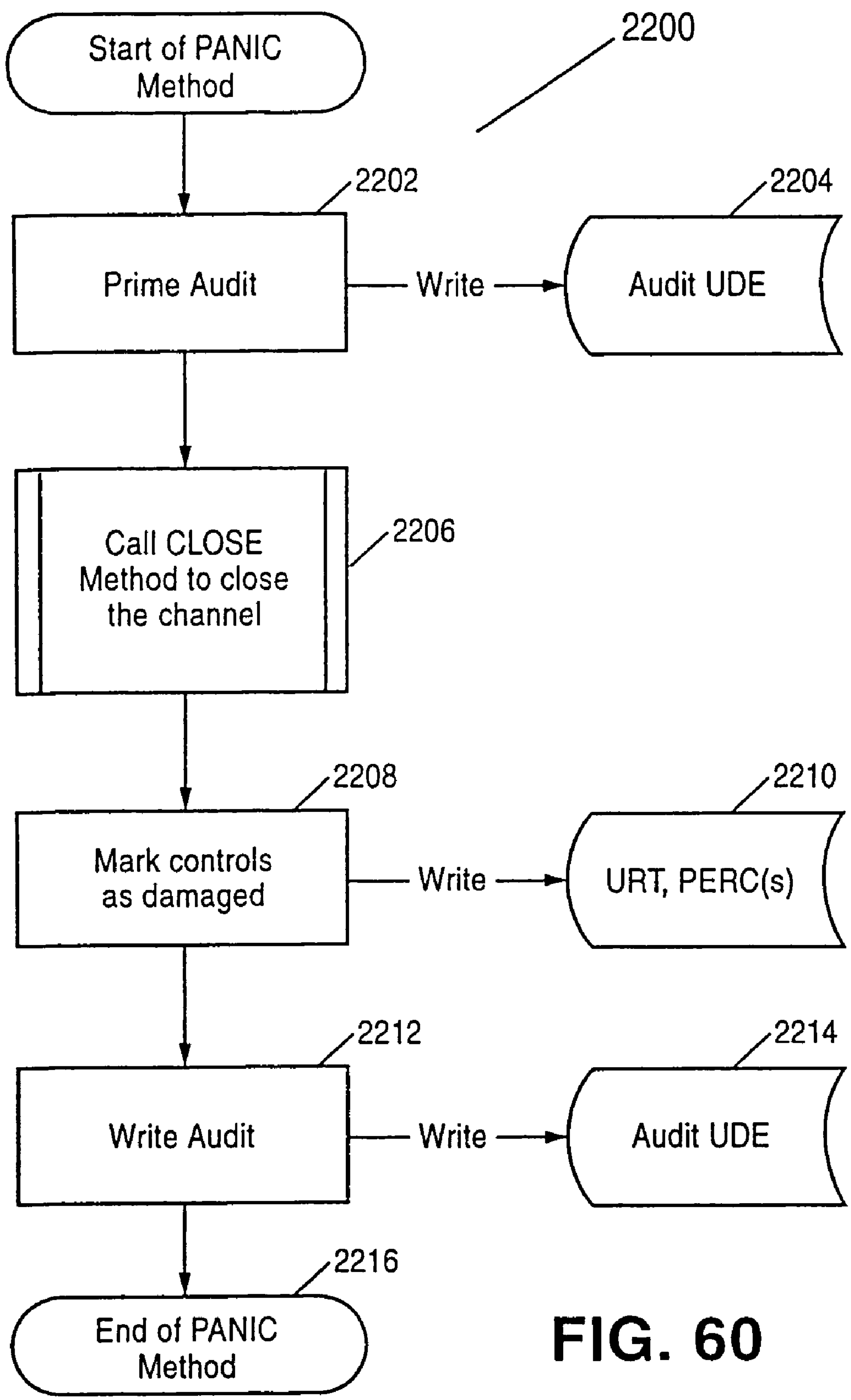
FIG. 60 shows an example of a PANIC method.

FIG. 60 is a flowchart of an example of process control steps performed by a representative example of a PANIC method 2200 provided by the preferred embodiment. PANIC method 2200 may be called when a security violation is detected. PANIC method 2200 may prevent the user from further accessing the object currently being accessed by, for example, destroying the channel being used to access the object and marking one or more of the control structures (e.g., the URT) associated with the user and object as damaged (blocks 2206, and 2208-2210, respectively). Because the control structure is damaged, the VDE node will need to contact an administrator to obtain a valid control structure(s) before the user may access the same object again. When the VDE node contacts the administrator, the administrator may request information sufficient to satisfy itself that no security violation occurred, or if a security violation did occur, take appropriate steps to ensure that the security violation is not repeated.

Meter

Figure 61:
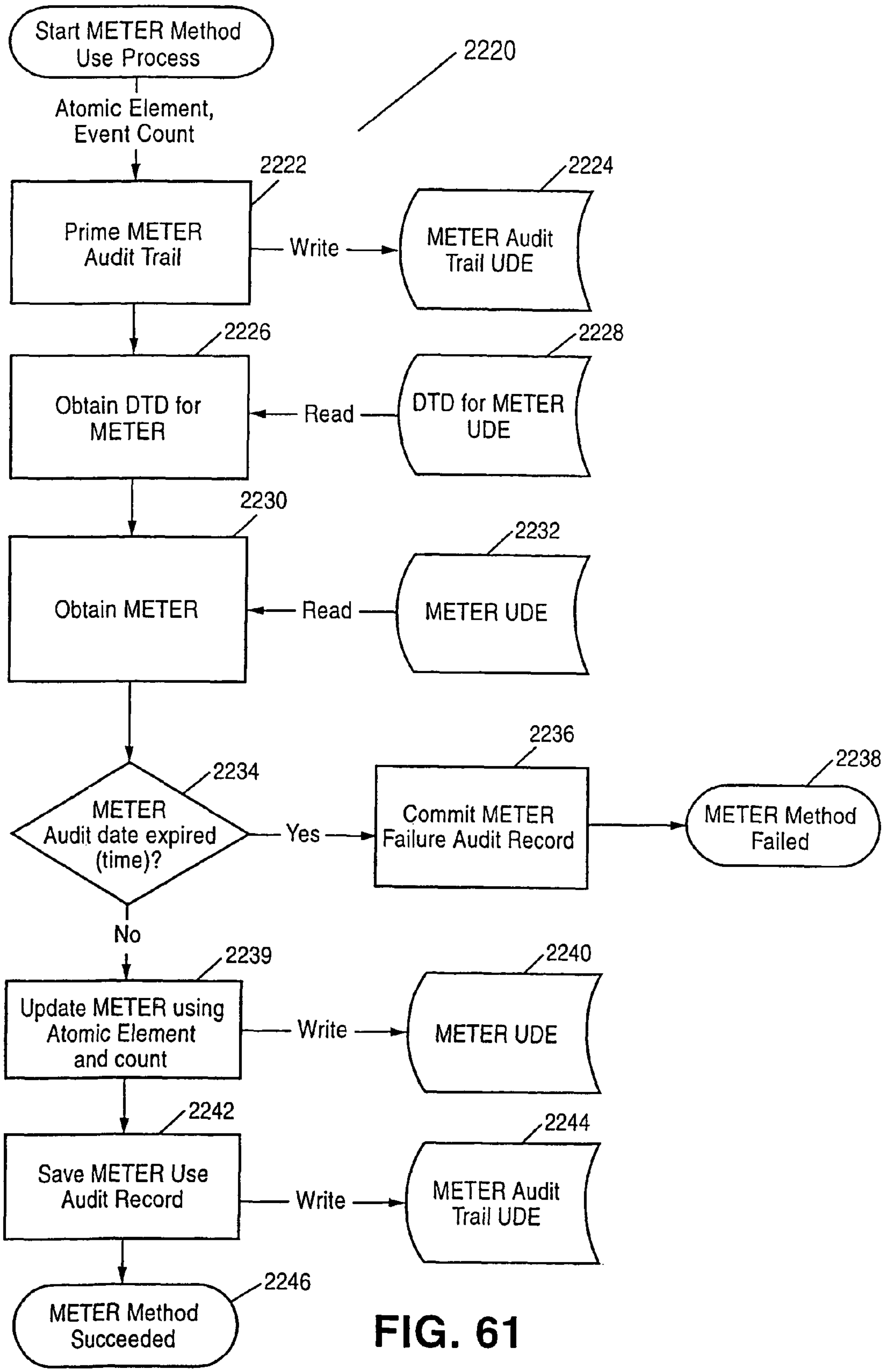
FIG. 61 shows an example of a METER method.

FIG. 61 is a flowchart of an example of process control steps performed by a representative example of a METER method provided by the preferred embodiment. Although METER methods were described above in connection with FIGS. 49, 50 and 51, the METER method 2220 shown in FIG. 61 is possibly a somewhat more representative example. In the preferred embodiment, METER method 2220 first primes an Audit Trail by accessing a METER Audit Trail UDE (blocks 2222, 2224). METER method 2220 may then read the DTD for the Meter UDE from the secure database (blocks 2226, 2228). METER method 2220 may then read the Meter UDE from the secure database (blocks 2230, 2232). METER method 2220 next may test the obtained Meter UDE to determine whether it has expired (decision block 2234). In the preferred embodiment, each Meter UDE may be marked with an expiration date. If the current date/time is later than the expiration date of the Meter UDE ("yes" exit to decision block 2234), then the METER method 2220 may record a failure in the Audit Record and terminate with a failure condition (block 2236, 2238).

Assuming the Meter UDE is not yet expired, the meter method 2220 may update it using the atomic element and event count passed to the METER method from, for example, an EVENT method (blocks 2239, 2240). The METER method 2220 may then save the Meter Use Audit Record in the Meter Audit Trail UDE (blocks 2242, 2244), before terminating (at terminate point 2246).

Additional Security Features Provided by the Preferred Embodiment

VDE 100 provided by the preferred embodiment has sufficient security to help ensure that it cannot be compromised short of a successful "brute force attack," and so that the time and cost to succeed in such a "brute force attack" substantially exceeds any value to be derived. In addition, the security provided by VDE 100 compartmentalizes the internal workings of VDE so that a successful "brute force attack" would compromise only a strictly bounded subset of protected information, not the entire system.

The following are among security aspects and features provided by the preferred embodiment:

- security of PPE 650 and the processes it performs
- security of secure database 610
- security of encryption/decryption performed by PPE 650
- key management; security of encryption/decryption keys and shared secrets
- security of authentication/external communications
- security of secure database backup
- secure transportability of VDE internal information between electronic appliances 600
- security of permissions to access VDE secure information
- security of VDE objects 300
- integrity of VDE security.

Some of these security aspects and considerations are discussed above. The following provides an expanded discussion of preferred embodiment security features not fully addressed elsewhere.

Management of Keys and Shared Secrets

VDE 100 uses keys and shared secrets to provide security. The following key usage features are provided by the preferred embodiment:

- different cryptosystem/key types
- secure key length
- key generation
- key "convolution" and key "aging."

Each of these types are discussed below.

A. Public-Key and Symmetric Key Cryptosystems

The process of disguising or transforming information to hide its substance is called encryption. Encryption produces "ciphertext." Reversing the encryption process to recover the substance from the ciphertext is called "decryption." A cryptographic algorithm is the mathematical function used for encryption and decryption.

Most modern cryptographic algorithms use a "key." The "key" specifies one of a family of transformations to be provided. Keys allow a standard, published and tested cryptographic algorithm to be used while ensuring that specific transformations performed using the algorithm are kept secret. The secrecy of the particular transformations thus depends on the secrecy of the key, not on the secrecy of the algorithm.

There are two general forms of key-based algorithms, either or both of which may be used by the preferred embodiment PPE 650:

symmetric; and public-key ("PK").

Symmetric algorithms are algorithms where the encryption key can be calculated from the decryption key and vice versa. In many such systems, the encryption and decryption keys are the same. The algorithms, also called "secret-key", "single key" or "shared secret" algorithms, require a sender and receiver to agree on a key before ciphertext produced by a sender can be decrypted by a receiver. This key must be kept secret. The security of a symmetric algorithm rests in the key: divulging the key means that anybody could encrypt and decrypt information in such a cryptosystem. See Schneier, *Applied Cryptography* at Page 3. Some examples of symmetric key algorithms that the preferred embodiment may use include DES, Skipjack/Clipper, IDEA, RC2, and RC4.

In public-key cryptosystems, the key used for encryption is different from the key used for decryption. Furthermore, it is computationally infeasible to derive one key from the other. The algorithms used in these cryptosystems are called "public key" because one of the two keys can be made public without endangering the security of the other key. They are also sometimes called "asymmetric" cryptosystems because they use different keys for encryption and decryption. Examples of public key algorithms include RSA, El Gamal and LUC.

The preferred embodiment PPE 650 may operate based on only symmetric key cryptosystems, based on public-key cryptosystems, or based on both symmetric key cryptosystems and public key cryptosystems. VDE 100 does not require any specific encryption algorithms; the architecture provided by the preferred embodiment may support numerous algorithms including PK and/or secret key (non PK) algorithms. In some cases, the choice of encryption/decryption algorithm will be dependent on a number of business decisions such as cost, market demands, compatibility with other commercially available systems, export laws, etc.

Although the preferred embodiment is not dependent on any particular type of cryptosystem or encryption/decryption algorithm(s), the preferred example uses PK cryptosystems for secure communications between PPEs 650, and uses secret key cryptosystems for "bulk" encryption/decryption of VDE objects 300. Using secret key cryptosystems (e.g., DES implementations using multiple keys and multiple passes, Skipjack, RC2, or RC4) for "bulk" encryption/decryption provides efficiencies in encrypting and decrypting large quantities of information, and also permits PPEs 650 without PK-capability to deal with VDE objects 300 in a variety of applications. Using PK cryptosystems for communications may provide advantages such as eliminating reliance on secret shared external communication keys to establish communications, allowing for a challenge/response that doesn't rely on shared internal secrets to authenticate PPEs 650, and allowing for a publicly available "certification" process without reliance on shared secret keys.

Some content providers may wish to restrict use of their content to PK implementations This desire can be supported by making the availability of PK capabilities, and the specific nature or type of PK capabilities, in PPEs 650 a factor in the registration of VDE objects 300, for example, by including a requirement in a REGISTER method for such objects in the form of a load module that examines a PPE 650 for specific or general PK capabilities before allowing registration to continue.

Although VDE 100 does not require any specific algorithm, it is highly desirable that all PPEs 650 are capable of using the same algorithm for bulk encryption/decryption. If the bulk encryption/decryption algorithm used for encrypting VDE objects 300 is not standardized, then it is possible that not all VDE electronic appliances 600 will be capable of handling all VDE objects 300. Performance differences will exist between different PPEs 650 and associated electronic appliances 600 if standardized bulk encryption/decryption algorithms are not implemented in whole or in part by hardware-based encrypt/decrypt engine 522, and instead are implemented in software. In order to support algorithms that are not implemented in whole or in part by encrypt/decrypt engine 522, a component assembly that implements such an algorithm must be available to a PPE 650.

B. Key Length

Increased key length may increase security. A "brute-force" attack of a cryptosystem involves trying every possible key. The longer the key, the more possible keys there are to try. At some key length, available computation resources will require an impractically large amount of time for a "brute force" attacker to try every possible key.

VDE 100 provided by the preferred embodiment accommodates and can use many different key lengths. The length of keys used by VDE 100 in the preferred embodiment is determined by the algorithm(s) used for encryption/decryption, the level of security desired, and, throughput requirements. Longer keys generally require additional processing power to ensure fast encryption/decryption response times. Therefore, there is a tradeoff between (a) security, and (b) processing time and/or resources. Since a hardware-based PPE encrypt/decrypt engine 522 may provide faster processing than software-based encryption/decryption, the hardware-based approach may, in general, allow use of longer keys.

The preferred embodiment may use a 1024 bit modulus (key) RSA cryptosystem implementation for PK encryption/decryption, and may use 56-bit DES for "bulk" encryption/decryption. Since the 56-bit key provided by standard DES may not be long enough to provide sufficient security for at least the most sensitive VDE information, multiple DES encryptions using multiple passes and multiple DES keys may be used to provide additional security. DES can be made significantly more secure if operated in a manner that uses multiple passes with different keys. For example, three passes with 2 or 3 separate keys is much more secure because it effectively increases the length of the key. RC2 and RC4 (alternatives to DES) can be exported for up to 40-bit key sizes, but the key size probably needs to be much greater to provide even DES level security. The 80-bit key length provided by NSA's Skipjack may be adequate for most VDE security needs.

The capability of downloading code and other information dynamically into PPE 650 allows key length to be adjusted and changed dynamically even after a significant number of VDE electronic appliances 600 are in use. The ability of a VDE administrator to communicate with each PPE 650 efficiently makes such after-the-fact dynamic changes both possible and cost-effective. New or modified cryptosystems can be downloaded into existing PPEs 650 to replace or add to the cryptosystem repertoire available within the PPE, allowing older PPEs to maintain compatibility with newer PPEs and/or newly released VDE objects 300 and other VDE-protected information. For example, software encryption/decryption algorithms may be downloaded into PPE 650 at any time to supplement the hardware-based functionality of encrypt/decrypt engine 522 by providing different key length capabilities. To provide increased flexibility, PPE encrypt/decrypt engine 522 may be configured to anticipate multiple passes and/or variable and/or longer key lengths. In addition, it may be desirable to provide PPEs 650 with the capability to internally generate longer PK keys.

C. Key Generation

Key generation techniques provided by the preferred embodiment permit PPE 650 to generate keys and other information that are "known" only to it.

The security of encrypted information rests in the security of the key used to encrypt it. If a cryptographically weak process is used to generate keys, the entire security is weak. Good keys are random bit strings so that every possible key in the key space is equally likely. Therefore, keys should in general be derived from a reliably random source, for example, by a cryptographically secure pseudo-random number generator seeded from such a source. Examples of such key generators are described in Schneier, *Applied Cryptography* (John Wiley and Sans, 1994), chapter 15. If keys are generated outside a given PPE 650 (e.g, by another PPE 650), they must be verified to ensure they come from a trusted source before they can be used. "Certification" may be used to verify keys.

The preferred embodiment PPE 650 provides for the automatic generation of keys. For example, the preferred embodiment PPE 650 may generate its own public/private key pair for use in protecting PK-based external communications and for other reasons. A PPE 650 may also generate its own symmetric keys for various purposes during and after initialization. Because a PPE 650 provides a secure environment, most key generation in the preferred embodiment may occur within the PPE (with the possible exception of initial PPE keys used at manufacturing or installation time to allow a PPE to authenticate initial download messages to it).

Good key generation relies on randomness. The preferred embodiment PPE 650 may, as mentioned above in connection with FIG. 9, includes a hardware-based random number generator 542 with the characteristics required to generate reliable random numbers. These random numbers may be used to "seed" a cryptographically strong pseudo-random number generator (e.g., DES operated in Output Feedback Mode) for generation of additional key values derived from the random seed. In the preferred embodiment, random number generator 542 may consist of a "noise diode" or other physically-based source of random values (e.g., radioactive decay).

If no random number generator 542 is available sin the PPE 650, the SPE 503 may employ a cryptographic algorithm (e.g., DES in Output Feedback Mode) to generate a sequence of pseudo-random values derived from a secret value protected within the SPE. Although these numbers are pseudo-random rather than truly random, they are cryptographically derived from a value unknown outside the SPE 503 and therefore may be satisfactory in some applications.

In an embodiment incorporating an HPE 655 without an SPE 503, the random value generator 565 software may derive reliably random numbers from unpredictable external physical events (e.g., high-resolution timing of disk I/O completions or of user keystrokes at an attached keyboard 612).

Conventional techniques for generating PK and non-PK keys based upon such "seeds" may be used. Thus, if performance and manufacturing costs permit, PPE 650 in the preferred embodiment will generate its own public/private key pair based on such random or pseudo-random "seed" values. This key pair may then be used for external communications between the PPE 650 that generated the key pair and other PPEs that wish to communicate with it. For example, the generating PPE 650 may reveal the public key of the key pair to other PPEs. This allows other PPEs 650 using the public key to encrypt messages that may be decrypted only by the generating PPE (the generating PPE is the only PPE that "knows" the corresponding "private key"). Similarly, the generating PPE 650 may encrypt messages using its private key that, when decrypted successfully by other PPEs with the generating PPE's public key, permit the other PPEs to authenticate that the generating PPE sent the message.

Before one PPE 650 uses a public key generated by another PPE, a public key certification process should be used to provide authenticity certificates for the public key. A public-key certificate is someone's public key "signed" by a trustworthy entity such as an authentic PPE 650 or a VDE administrator. Certificates are used to thwart attempts to convince a PPE 650 that it is communicating with an authentic PPE when it is not (e.g., it is actually communicating with a person attempting to break the security of PPE 650). One or more VDE administrators in the preferred embodiment may constitute a certifying authority. By "signing" both the public key generated by a PPE 650 and information about the PPE and/or the corresponding VDE electronic appliance 600 (e.g., site ID, user ID, expiration date, name, address, etc), the VDE administrator certifying authority can certify that information about the PPE and/or the VDE electronic appliance is correct and that the public key belongs to that particular VDE mode.

Certificates play an important role in the trustedness of digital signatures, and also are important in the public-key authentication communications protocol (to be discussed below). In the preferred embodiment, these certificates may include information about the trustedness/level of security of a particular VDE electronic appliance 600 (e.g., whether or not it has a hardware-based SPE 503 or is instead a less trusted software emulation type HPE 655) that can be used to avoid transmitting certain highly/secure information to less trusted/secure VDE installations.

Certificates can also play an important role in decommissioning rogue users and/or sites. By including a site and/or user ID in a certificate, a PPE can evaluate this information as an aspect of authentication. For example, if a VDE administrator or clearinghouse encounters a certificate bearing and ID (or other information) that meets certain criteria (e.g., is present on a list of decommissioned and/or otherwise suspicious users and/or sites), they may choose to take actions based on those criteria such as refusing to communicate, communicating disabling information, notifying the user of the condition, etc. Certificates also typically include an expiration date to ensure that certificates must be replied periodically, for example, to ensure that sites and/or users must stay in contact with a VDE administrator and/or to allow certification keys to be changed periodically. More than one certificate based on different keys may be issued for sites and/or users so-that if a given certification key is compromised, one or more "backup" certificates may be used. If a certification key is compromised, A VDE administrator may refuse to authenticate based on certificates generated with such a key, and send a signal after authenticating with a "backup" certificate that invalidates all use of the compromised key and all certificates associated with it in further interactions with VDE participants. A new one or more "backup" certificates and keys may be created and sent to the authenticated site/user after such a compromise.

If multiple certificates are available, some of the certificates may be reserved as backups. Alternatively or in addition, one certificate from a group of certificates may be selected (e.g., by using RNG 542) in a given authentication, thereby reducing the likelihood that a certificate associated with a compromised certification key will be used. Still alternatively, more than one certificate may be used in a given authentication.

To guard against the possibility of compromise of the certification algorithm (e.g., by an unpredictable advance in the mathematical foundations on which the algorithm is based), distinct algorithms may used for different certificates that are based on different mathematical foundations.

Another technique that may be employed to decrease the probability of compromise is to keep secret (in protected storage in the PPE 650) the "public" values on which the certificates are based, thereby denying an attacker access to values that may aid in the attack. Although these values are nominally "public," they need be known only to those components which actually validate certificates (i.e., the PPE 650)

In the preferred embodiment, PPE 650 may generate its own certificate, or the certificate may be obtained externally, such as from a certifying authority VDE administrator. Irrespective of where the digital certificate is generated, the certificate is eventually registered by the VDE administrator certifying authority so that other VDE electronic appliances 600 may have access to (and trust) the public key. For example, PPE 650 may communicate its public key and other information to a certifying authority which may then encrypt the public key and other information using the certifying authority's private key. Other installations 600 may trust the "certificate" because it can be authenticated by using the certifying authority's public key to decrypt it. As another example, the certifying authority may encrypt the public key it receives from the generating PPE 650 arid use it to encrypt the certifying authority's private, key. The certifying authority may then send this encrypted information back to the generating PPE 650. The generating PPE 650 may then use the certifying authority's private key to internally create a digital certificate, after which it may destroy its copy of the certifying authority's private key. The generating PPE 650 may then send out its digital certificate to be stored in a certification repository at the VDE administrator (or elsewhere) if desired. The certificate process can also be implemented with an external key pair generator and certificate generator, but might be somewhat less secure depending on the nature of the secure facility. In such a case, a manufacturing key should be used in PPE 650 to limit exposure to the other keys involved.

A PPE 650 may need more than one certificate. For example, a certificate may be needed to assure other users that a PPE is authentic, and to identify the PPE. Further certificates may be needed for individual users of a PPE 650. These certificates may incorporate both user and site information or may only include user information. Generally, a certifying authority will require a valid site certificate to be presented prior to creating a certificate for a given user. Users may each require their own public key/private key pair in order to obtain certificates. VDE administrators, clearinghouses, and other participants may normally require authentication of both the site (PPE 650) and of the user in a communication or other interaction. The processes described above for key generation and certification for PPEs 650 may also be used to form site/user certificates or user certificates.

Certificates as described above may also be used to certify the origin of load modules 1100 and/or the authenticity of administrative operations. The security and assurance techniques described above may be employed to decrease the probability of compromise for any such certificate (including certificates other than the certificate for a VDE electronic appliance 600's identity).

D. Key Aging and Convolution

PPE 650 also has the ability in the preferred embodiment to generate secret keys and other information that is shared between multiple PPEs 650. In the preferred embodiment, such secret keys and other information may be shared between multiple VDE electronic appliances 600 without requiring the shared secret information to ever be communicated explicitly between the electronic appliances. More specifically, PPE 650 uses a technique called "key convolution" to derive keys based on a deterministic process in response to seed information shared between multiple VDE electronic appliances 600. Since the multiple electronic appliances 600 "know" what the "seed" information is and also "know" the deterministic process used to generate keys based on this information, each of the electronic appliances may independently generate the "true key." This permits multiple VDE electronic appliances 600 to share a common secret keys without potentially compromising its security by communicating it over an insecure channel.

No encryption key should be used for an indefinite period. The longer a key is used, the greater the chance that it may be compromised and the greater the potential loss if the key is compromised but still in use to protect new information. The longer a key is used, the more information it may protect and therefore the greater the potential rewards for someone to spend the effort necessary to break it. Further, if a key is used for a long time, there may be more ciphertext available to an attacker attempting to break the key using a ciphertext based attack. See Schneier at 150-151. Key convolution in the preferred embodiment provides a way to efficiently change keys stored in secure database 610 on a routine periodic or other basis while ~simplifying key management issues surrounding the change of keys. In addition, key convolution may be used to provide "time aged keys" (discussed below) to provide "expiration dates" for key usage and/or validity.

Figure 62:
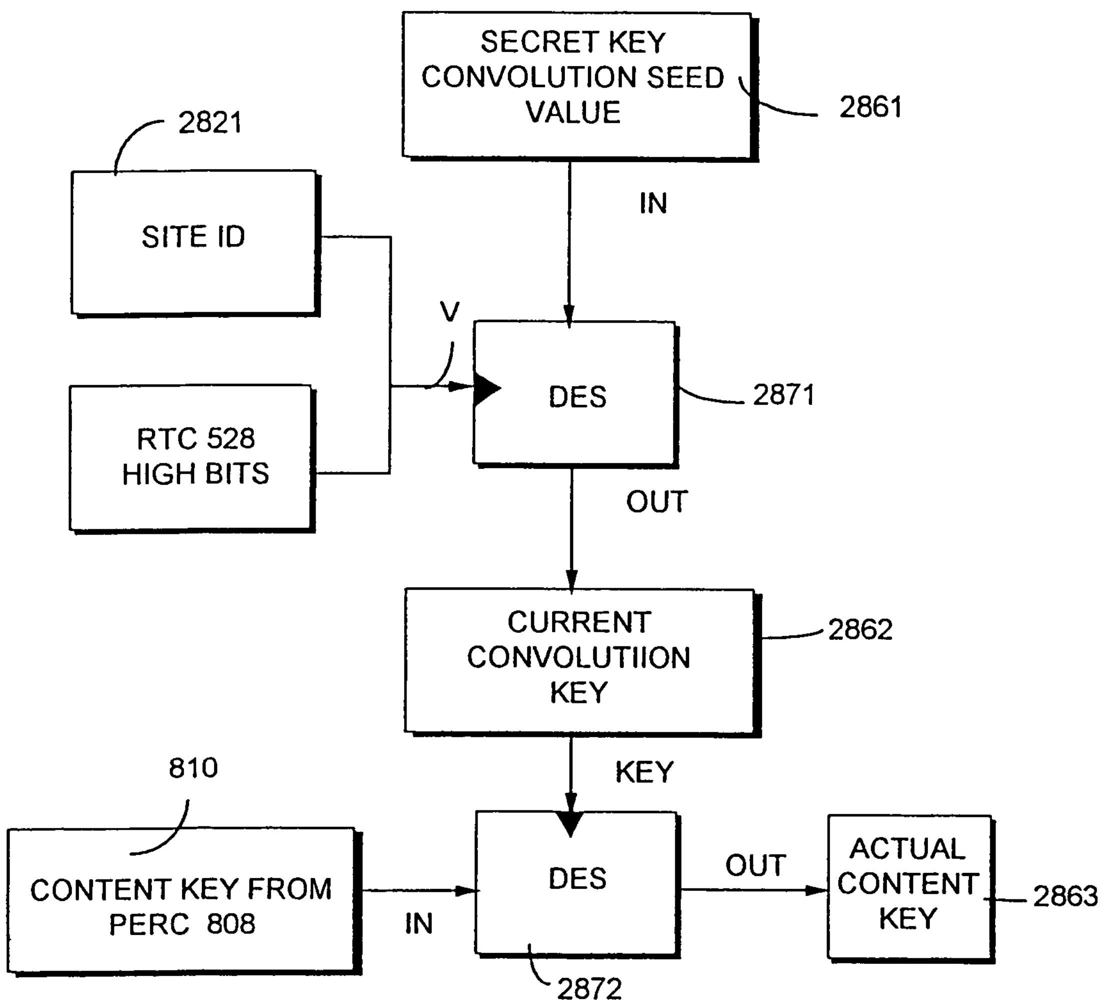
FIG. 62 shows an example of a key "convolution" process.

FIG. 62 shows an example implementation of key convolution in the preferred embodiment. Key convolution may be performed using a combination of a site ID 2821 and the high-order bits of the RTC 528 to yield a site-unique value "V" that is time dependent on a large scale (e.g., hours or days). This value "V" may be used as the key for an encryption process 2871 that transforms a convolution seed value 2861 into a "current convolution key" 2862. The seed value 2861 may be a universe-wide or group-wide shared secret value, and may be stored in secure key storage (e.g., protected memory within PPE 650). The seed value 2861 is installed during the manufacturing process and may be updated occasionally by a VDE administrator. There may be a plurality of seed values 2861 corresponding to different sets of objects 300

The current convolution key 2862 represents an encoding of the site ID 2821 and current time. This transformed value 2862 may be used as a key for another encryption process 2872 to transform the stored key 810 in the object's PERC 808 into the true private body key 2863 for the object's contents.

The "convolution function" performed by blocks 2861, 2871 may, for example, be a one-way function that can be performed independently at both the content creator's site and at the content user's site. If the content user does not use precisely the same convolution function and precisely the same input values (e.g., time and/or site and/or other information) as used by the content creator, then the result of the convolution function performed by the content user will be different from the content creator's result. If the result is used as a symmetrical key for encryption by the content creator, the content user will not be able to decrypt unless the content user's result is the same as the result of the content creator.

The time component for input to the key convolution function may be derived from RTC 528 (care being taken to ensure that slight differences in RTC synchronization between VDE electronic appliances will not cause different electronic appliances to use different time components). Different portions of the RTC 528 output may be used to provide keys with different valid durations, or some tolerance can be built into the process to try several different key values. For example, a "time granularity" parameter can be adjusted to provide time tolerance in terms of days, weeks, or any other time period. As one example, if the "time granularity" is set to 2 days, and the tolerance is ±2 days, then three real-time input values can be tried as input to the convolution algorithm. Each of the resulting key values may be tried to determine which of the possible keys is actually used. In this example, the keys will have only a 4 day life span.

Figure 63:
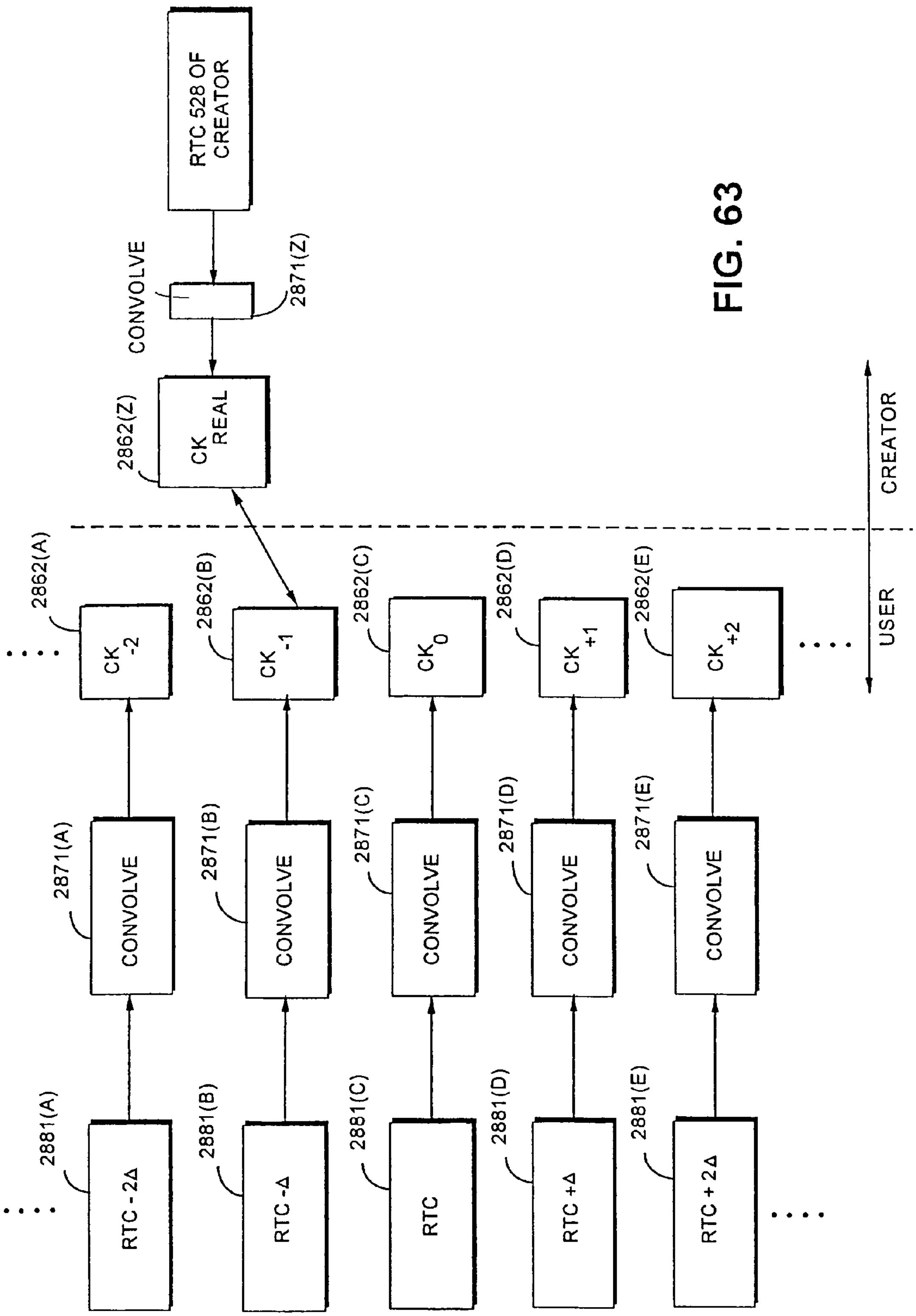
FIG. 63 shows an example of how different keys may be generated using a key convolution process to determine a "true" key.

FIG. 63 shows how an appropriate convoluted key may be picked in order to compensate for skew between the user's RTC 528 and the producer's RTC 528. A sequence of convolution keys 2862(*a-e*) may be, generated by using different input values 2881(*a-e*), each derived from the site ID 2821 and the RTC 528 value plus or minus a differential (e.g., 2 days, −1 days, no delta, +1 days, +2 days). The convolution steps 2871(*a-e*) are used to generate the sequence of keys 2862(*a-e*).

Meanwhile, the creator site may use the convolution step 2871(*z*) based on his RTC 528 value (adjusted to correspond to the intended validity time for the key) to generate a convoluted key 2862(*z*), which may then be used to generate the content key 2863 in the object's PERC 808. To decrypt the object's content, the user site may use each of its sequence of convolution key 2862 (*a-e*) to attempt to generate the master content key 810. When this is attempted, as long as the RTC 538 of the creator site is within acceptable tolerance of the RTC 528 at the user site, one of keys 2862(*a-e*) will match key 2862(*z*) and the decryption will be successful. In this example, matching is determined by validity of decrypted output, not by direct comparison of keys.

Key convolution as described above need not use both site ID and time as a value. Some keys may be generated based on current real time, other keys might be generated on site ID, and still other keys might be generated based on both current real-time and site ID.

Key convolution can be used to provide "time-aged" keys. Such "time-aged" keys provide an automatic mechanism for allowing keys to expire and be replaced by "new" keys. They provide a way to give a user time-limited rights to make time-limited use of an object, or portions of an object, without requiring user re-registration but retaining significant control in the hands of the content provider or administrator. If secure database 610 is sufficiently secure, similar capabilities can be accomplished by checking an expiration date/time associated with a key, but this requires using more storage space for each key or group of keys.

In the preferred embodiment, PERCs, 808 can include an expiration date and/or time after which access to the VDE-protected information they correspond to is no longer authorized. Alternatively or in addition, after a duration of time related to some aspect of the use of the electronic appliance 600 or one or more VDE objects 300, a PERC 808 can force a user to send audit history information to a clearinghouse, distributor, client administrator, or object creator in order to regain or retain the right to use the object(s). The PERC 808 can enforce such time-based restrictions by checking/enforcing parameters that limit key usage and/or availability past time of authorized use. "Time aged" keys may be used to enforce or enhance this type of time-related control of access to VDE protected information.

"Time aged" keys can be used to encrypt and decrypt a set of information for a limited period of time, thus requiring re-registration or the receipt of new permissions or the passing of audit information, without which new keys are not provided for user use. Time aged keys can also be used to improve system security since one or more keys would be automatically replaced based on the time aging criteria—and thus, cracking secure database 610 and locating one or more keys may have no real value. Still another advantage of using time aged keys is that they can be generated dynamically—thereby obviating the need to store decryption keys in secondary and/or secure memory.

A "time aged key" in the preferred embodiment is not a "true key" that can be used for encryption/decryption, but rather is a piece of information that a PPE 650, in conjunction with other information, can use to generate a "true key." This other information can be time-based, based on the particular "ID" of the PPE 650, or both. Because the "true key" is never exposed but is always generated within a secure PPE 650 environment, and because secure PPEs are required to generate the "true key," VDE 100 can use "time aged" keys to significantly enhance security and flexibility of the system.

The process of "aging" a key in the preferred embodiment involves generating a time-aged "true key" that is a function of: (a) a "true key," and (b) some other information (e.g., real time parameters, site ID parameters, etc.) This information is combined/transformed (e.g., using the "key convolution" techniques discussed above) to recover or provide a "true key." Since the "true key" can be recovered, this avoids having to store the "true key" within PERC 808, and allow different "true keys" to correspond to the same information within PERC 808. Because the "true key" is not stored in the PERC 808, access to the PERC does not provide access to the information protected by the "true key." Thus, "time aged" keys allows content creators/providers to impose a limitation (e.g., site based and/or time based) on information access that is, in a sense, "external of" or auxiliary to the permissioning provided by one or more PERCs 808. For example, a "time aged" key may enforce an additional time limitation on access to certain protected information, this additional time limitation being independent of any information or permissioning contained within the PERC 808 and being instead based on one or more time and/or site ID values.

As one example, time-aged decryption keys may be used to allow the purchaser of a "trial subscription" of an electronically published newspaper to access each edition of the paper for a period of one week, after which the decryption keys will no longer work. In this example, the user would need to purchase one or more new PERCs 808, or receive an update to an existing one or more permissions records, to access editions other than the ones from that week. Access to those other editions which might be handled with a totally different pricing structure (e.g., a "regular" subscription rate as opposed to a free or minimal "trial" subscription rate).

In the preferred embodiment, time-aged-based "true keys" can be generated using a one-way or invertible "key convolution" function. Input parameters to the convolution function may include the supplied time-aged keys; user and/or site specific values; a specified portion (e.g., a certain number of high order bits) of the time value from an RTC 528 (if present) or a value derived from such time value in a predefined manner; and a block or record identifier that may be used to ensure that each time aged key is unique. The output of the "key convolution" function may be a "true key" that is used for decryption purposes until discarded. Running the function with a time-aged key and inappropriate time values typically yields a useless key that will not decrypt.

Generation of a new time aged key can be triggered based on some value of elapsed, absolute or relative time (e.g., based on a real time value from a clock such as RTC 528). At that time, the convolution would produce the wrong key and decryption could not occur until the time-aged key is updated. The criteria used to determine when a new "time aged key" is to be created may itself be changed based on time or some other input variable to provide yet another level of security. Thus, the convolution function and/or the event invoking it may change, shift or employ a varying quantity as a parameter.

One example of the use of time-aged keys is as follows:

1) A creator makes a "true" key, and encrypts content with it.
2) A creator performs a "reverse convolution" to yield a "time aged key" using, as input parameters to the "reverse convolution":
   a) the "true" key,
   b) a time parameter (e.g., valid high-order time bits of RTC 528), and
   c) optional other information (e.g., site ID and/or user ID).
3) The creator distributes the "time-aged key" to content users (the creator may also need to distribute the convolution algorithm, and/or parameters if she is not using a convolution algorithm already available to the content users' PPE 650).
4) The content user's PPE 650 combines:
   a) "time-aged" key
   b) high-order time bits
   c) required other information (same as 2c).

It performs a convolution function (i.e., the inverse of reverse convolution" algorithm in step (2) above) to obtain the "true" key. If the supplied time and/or other information is "wrong," the convolution function will not yield the "true" key, and therefore content cannot be decrypted.

Any of the key blocks associated with VDE objects 300 or other items can be either a regular key block or a time-aged key block, as specified by the object creator during the object configuration process, or where appropriate, a distribution or client administrator.

"Time aged" keys can also be used as part of protocols to provide secure communications between PPEs 650. For example, instead of providing "true" keys to PPE 650 for communications, VDE 100 may provide only "partial" communication keys to the PPE. These "partial" keys may be provided to PPE 650 during initialization, for example. A predetermined algorithm may produce "true keys" for use to encrypt/decrypt information for secure communications. The predetermined algorithm can "age" these keys the same way in all PPEs 650, or PPEs 650 can be required to contact a VDE administrator at some predetermined time so a new set of partial communications keys can be downloaded to the PPEs. If the PPE 650 does not generate or otherwise obtain "new" partial keys, then it will be disabled from communicating with other PPEs (a further, "fail safe" key may be provided to ensure that the PPE can communicate with a VDE administrator for reinitialization purposes). Two sets of partial keys can be maintained within a PPE 650 to allow a fixed amount of overlap time across all VDE appliances 600. The older of the two sets of partial keys can be updated periodically.

The following additional types of keys (to be discussed below) can also be "aged" in the preferred embodiment:

- individual message keys (i.e., keys used for a particular message),
- administrative, stationary and travelling object shared keys, secure database keys, and
- private body and content keys.

Initial Installation Key Management

Figure 64:
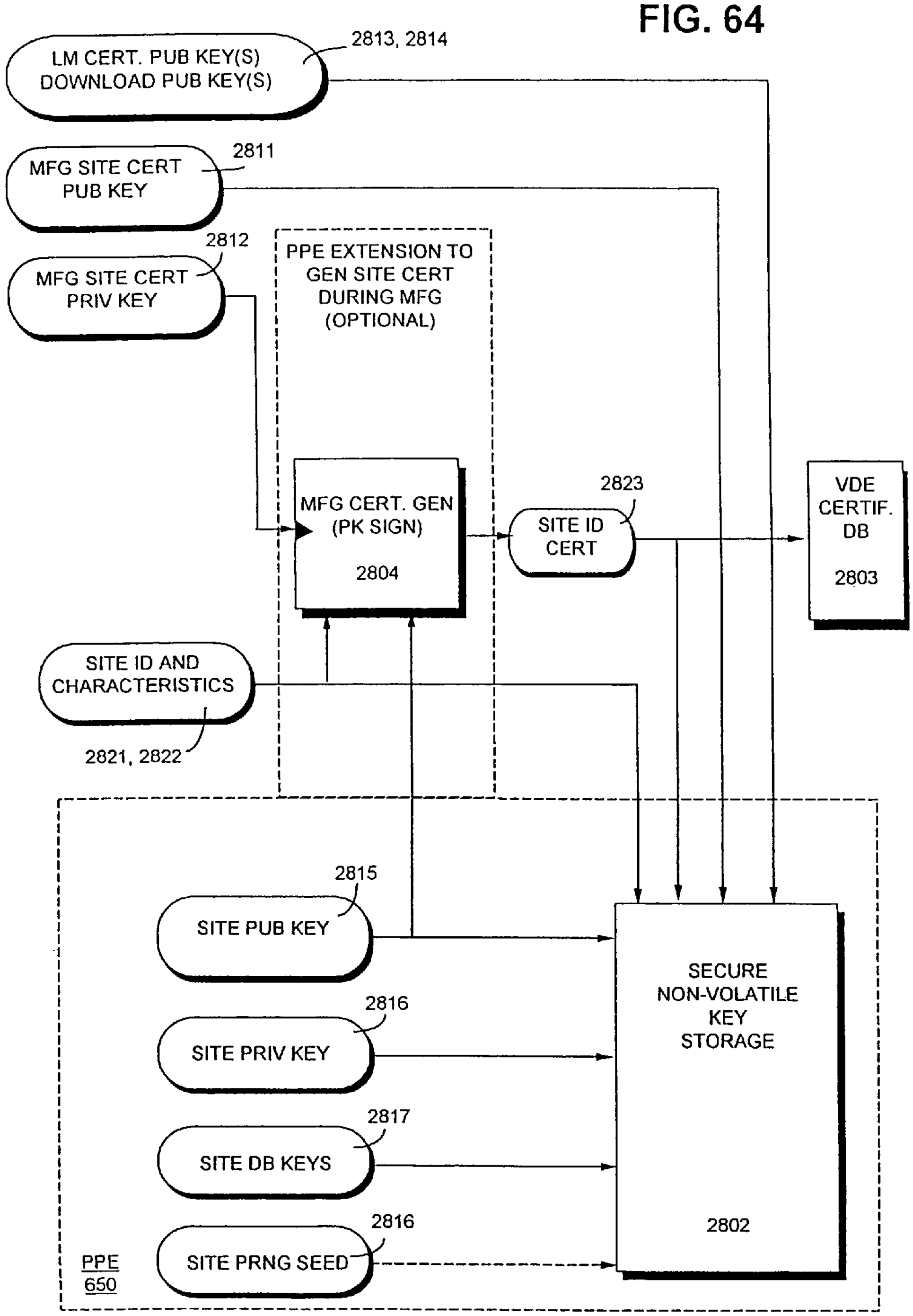
FIGS. 64 and 65 show an example of how protected processing environment keys may be initialized.

FIG. 64 shows the flow of universe-wide, or "master," keys during creating of a PPE 650. In the preferred embodiment, the PPE 650 contains a secure non-volatile key storage 2802 (e.g. SPU 500 non-volatile RAM 534 B or protected storage maintained by HPE 655) that is initialized with keys generated by the manufacturer and, by the PPE itself.

The manufacturer possesses (i.e., knows, and protects from disclosure or modification) one or more public key 2811/private key 2812 key pairs used for signing and validating site identification certificates 2821. For each site, the manufacturer generates a site ID 2821 and list of site characteristics 2822. In addition, the manufacturer possesses the public keys 2813, 2814 for validating load modules and initialization code downloads. To enhance security, there may be a plurality of such certification keys, and each PPE 650 may be initialized using only a subset of such keys of each type.

As part of the initialization process, the PPE 650 may generate internally or the manufacturer may generate and supply, one or more pairs of site-specific public keys 2815 and private keys 2816. These are used by the PPE 650 to prove its identity. Similarly, site-specific database key(s) 2817 for the site are generated, and if needed (i.e., if a Random Number Generator 542 is not available), a random initialization seed 2818 is generated.

The initialization may begin by generating site ID 2821 and characteristics 2822 and the site, public key 2815/private key 2816 pair(s). These values are combined and may be used to generate one or more site identity certificates 2823. The site identity certificates 2823 may be generated by the public key generation process 2804, and may be stored both in the PPE's protected key storage 2802 and in the manufacturer's VDE site certificate database 2803.

The certification process 2804 maybe performed either by the manufacturer or internally to the PPE 650. If performed by the PPE 650, the PPE will temporarily receive the identity certification private key(s) 2812, generate the certificate 2823, store the certificate in local key storage 2802 and transmit it to the manufacturer, after which the PPE 650 must erase its copy of the identity certification private key(s) 2812.

Subsequently, initialization may require generation, by the PPE 650 or by the manufacturer, of site-specific database key(s) 2817 and of site-specific seed value(s) 2818, which are stored in the 'key storage 2802. In addition, the download certification key(s) 2814 and the load module certification key(s) 2813 maybe supplied by the manufacturer and stored in the key storage 2802.

These may be used by the PPE 650 to validate all further communications with external entities.

At this point, the PPE 650 may be further initialized with executable code and data by downloading information certified by the load module key(s) 2813 and download key(s) 2814. In the preferred embodiment, these keys may be used to digitally sign data to be loaded into the PPE 650, guaranteeing its validity, and additional key(s) encrypted using the site-specific public key(s) 2815 may be used to encrypt such data and protect it from disclosure.

Installation and Update Key Management

Figure 65:
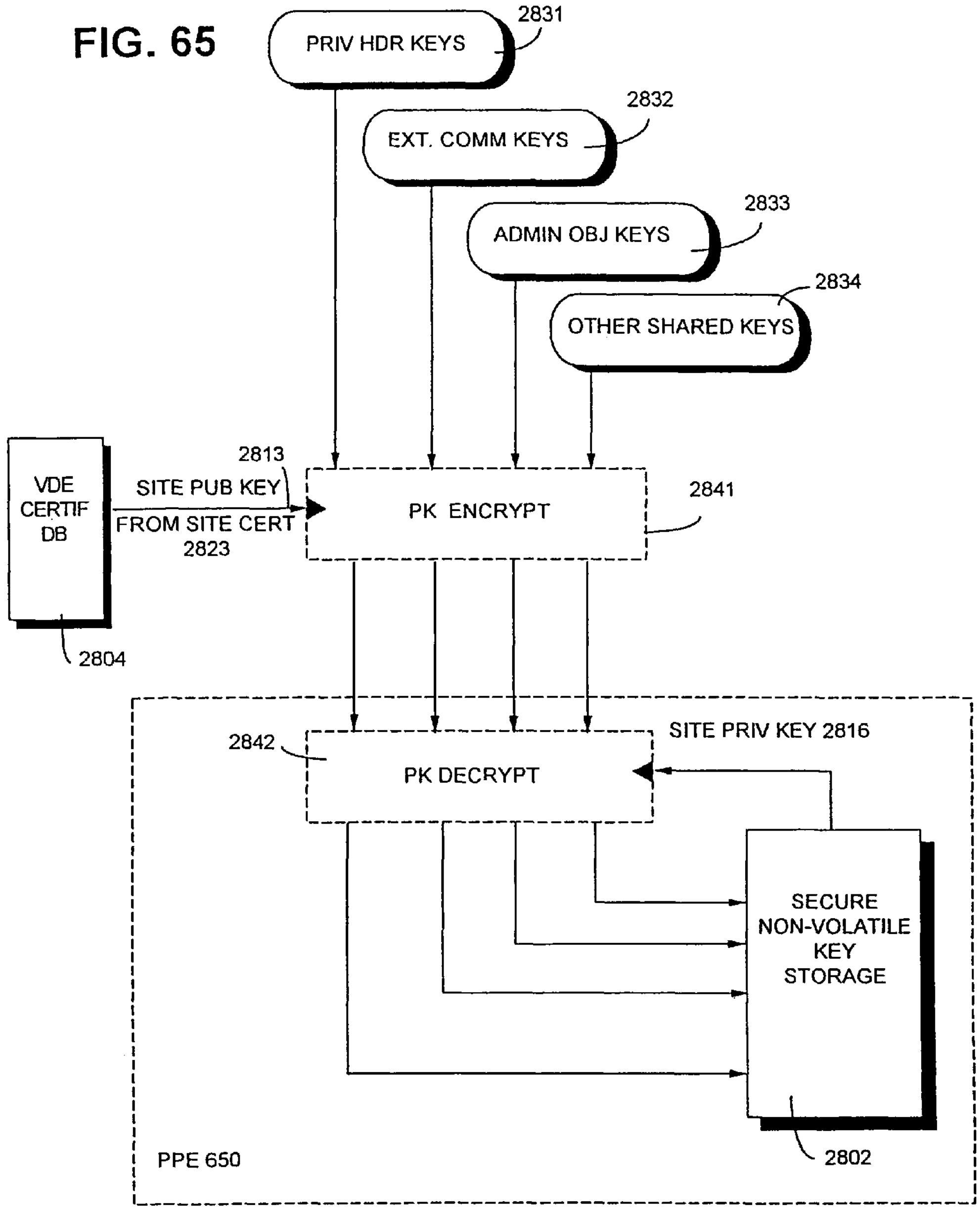

FIG. 65 illustrates an example of further key installation either by the manufacturer or by a subsequent update by a VDE administrator. The manufacturer or administrator may supply initial or new values for private header key(s) 2831, external communication key(s) 2832, administrative object keys 2833, or other shared key(s) 2834. These keys may be universe-wide in the same sense as the global certification keys 2811, 2813, and 2814, or they may be restricted to use within a defined group of VDE instances.

To perform this installation, the installer retrieves the destination site's identity certificate(s) 2823, and from that extracts the site public key(s) 2815. These key(s) may be used in an encryption process 2841 to protect the keys being installed. The key(s) being installed are then transmitted inside the destination site's PPE 650. Inside the PPE 650, the decryption process 2842 may use the site private key(s) 2816 to decrypt the transmission. The PPE 650 then stores the installed or updated keys in its key storage 2802.

Object-Specific Key Use

Figure 66:
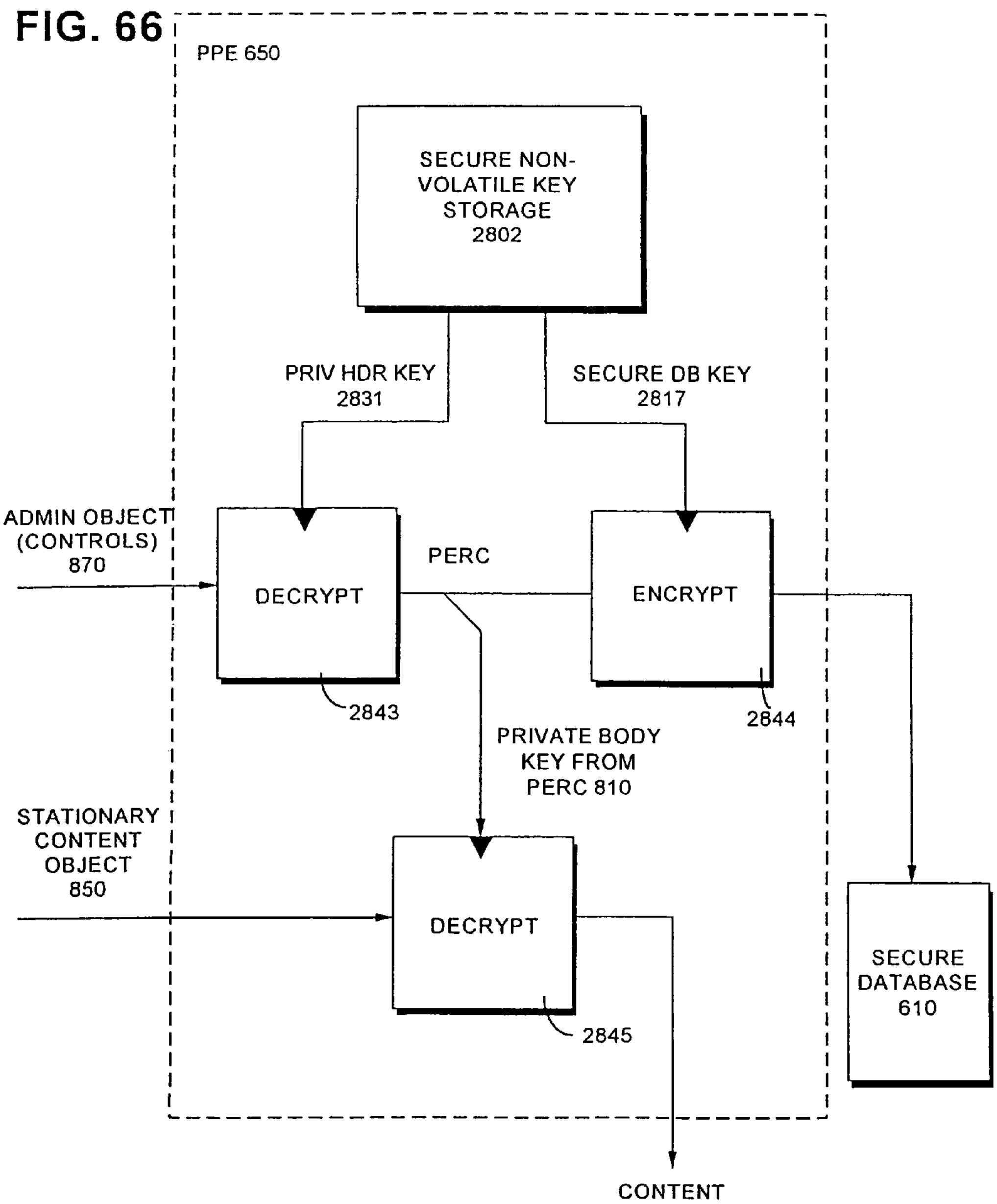
FIGS. 66 and 67 show example processes for decrypting information contained within stationary and traveling objects, respectively.
Figure 67:
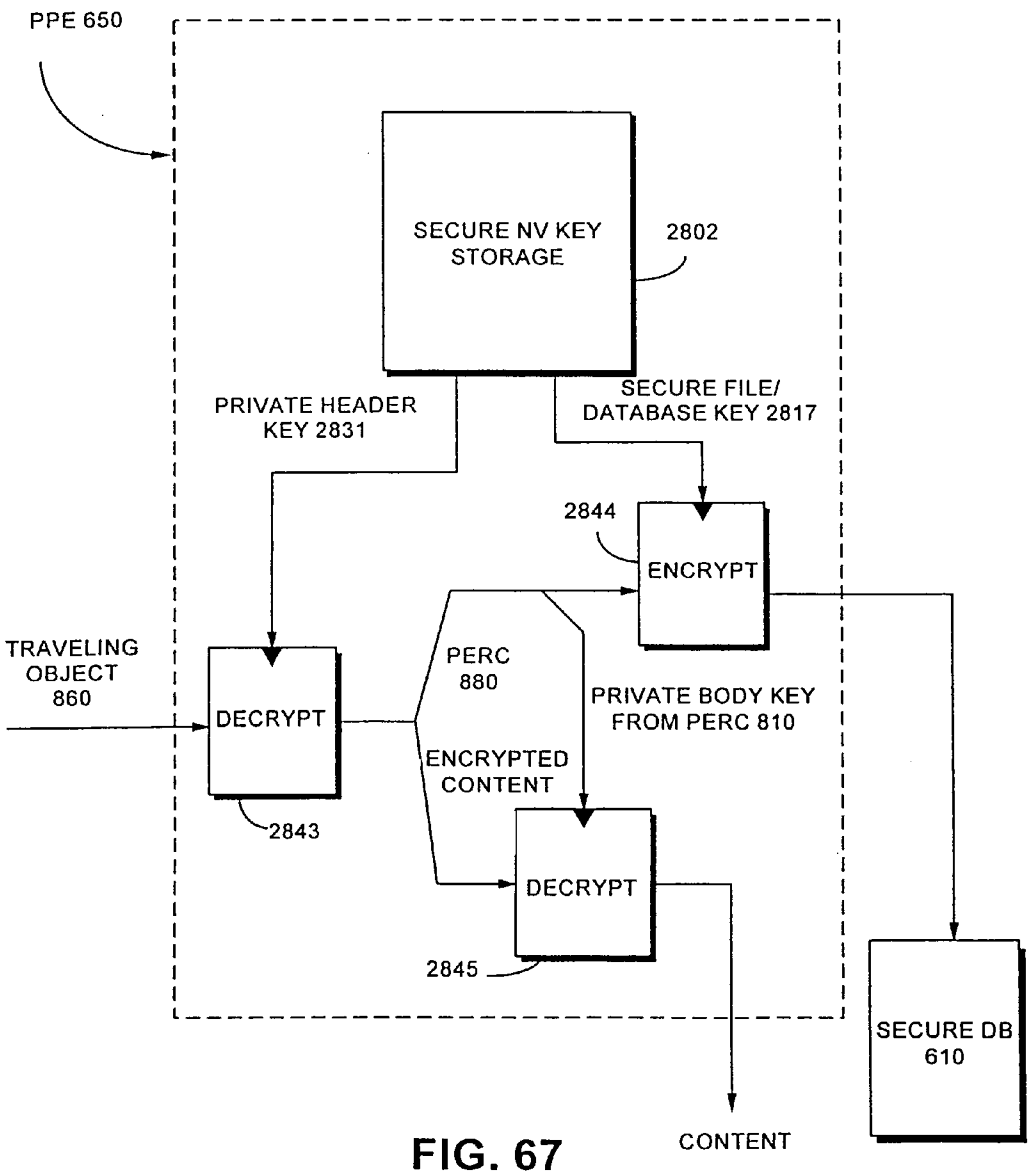

FIGS. 66 and 67 illustrate the use of keys in protecting data and control information associated with VDE objects 300.

FIG. 66, shows use of a stationary content object 850 whose control information is derived from an administrative object 870. The objects may be received by the PPE 650 (e.g., by retrieval from an object repository 728 over a network or retrieved from local storage). The administrative object decryption process 2843 may use the private header key(s) 2815 to decrypt the administrative object 870, thus retrieving the PERC 808 governing access to the content object 850. The private body key(s) 810 may then be extracted from the PERC 808 and used by the content decryption process 2845 to make the content available outside the PPE 650. In addition, the database key(s) 2817 may be used by the encryption process 2844 to prepare the PERC for storage outside the PPE 650 in the secure database 610. In subsequent access to the content object 850, the PERC 808 may be retrieved from the secure database 610, decrypted with database key(s) 2817, and used directly, rather than being extracted from administrative object 870.

FIG. 67 shows the similar process involving a traveling object 860. The principal distinction between FIGS. 66 and 67 is that the PERC 808 is stored directly within the traveling object 860, and therefore may be used immediately after the decryption process 2843 to provide a private header key(s) 2831. This private header key 2831 is used to process content within the traveling object 860.

Secret-Key Variations

FIGS. 64 through 67 illustrate the preferred public-key embodiment, but may also be used to help understand the secret-key versions. In secret-key embodiments, the certification process and the public key encryptions/decryptions are replaced with private-key encryptions, and the public key/private-key pairs are replaced with individual secret keys that are shared between the PPE 650 instance and the other parties (e.g., the load module supplier(s), the PPE manufacturer). In addition, the certificate generation process 2804 is not performed in secret-key embodiments, and no site identity certificates 2823 or VDE certificate database 2803 exist.

Key Types

The detailed descriptions of key types below further explain secret-key embodiments, this summary is not intended as a complete description. The preferred embodiment PPE 650 can use different types of keys and/or different "shared secrets" for different purposes. Some key types apply to a Public-Key/Secret Key implementation, other keys apply to a Secret Key only implementation, and still other key types apply to both. The following table lists examples of various key and "shared secret" information used in the preferred embodiment, and where this information is used and stored:

| Key/Secret Information Type, | Used in PK or Non-PK | Example Storage Location(s) |
|---|---|---|
| Master Key(s) (may include some of the specific keys mentioned below) | Both | PPE Manufacturing facility VDE administrator |
| Manufacturing Key | Both (PK optional) | PPE (PK case) Manufacturing facility |
| Certification key pair | PK | PPE Certification repository |
| Public/private key pair | PK | PPE Certification repository (Public Key only) |
| Initial secret key | Non-PK | PPE |
| PPE manufacturing ID | Non-PK | PPE |
| Site ID, shared code, shared keys and shared secrets | Both | PPE |
| Download authorization key | Both | PPE VDE administrator |
| External communication keys and other info | Both | PPE Secure Database |
| Administrative object keys | Both | Permission record |
| Stationary object keys | Both | Permission record |
| Traveling object shared keys | Both | Permission record |
| Secure database keys | Both | PPE |
| Private body keys | Both | Secure database Some objects |
| Content keys | Both | Secure database Some objects |
| Authorization shared secrets | Both | Permission record |
| Secure Database Back up keys | Both | PPE Secure database |

Master Keys

A "master" key is a key used to encrypt other keys. An initial or "master" key may be provided within PPE 650 for communicating other keys in a secure way. During initialization of PPE 650, code and shared keys are downloaded to the PPE. Since the code contains secure convolution algorithms and/or coefficients, it is comparable to a "master key" The shared keys may also be considered "master keys."

If public-key cryptography is used as the basis for external communication with PPE 650, then a master key is required during the PPE Public-key pair certification process. This master key may be, for example, a private key used by the manufacturer or VDE administrator to establish the digital certificate (encrypted public key and other information of the PPE), or it may, as another example, be a private key used by a VDE administrator to encrypt the entries in a certification repository. Once certification has occurred, external communications between PPEs 650 may be established using the certificates of communicating PPEs.

If shared secret keys are used as the basis for external communications, then an initial secret key is required to establish external communications for PPE 650 initialization. This initial secret key is a "master key" in the sense that it is used to encrypt other keys. A set of shared partial external communications keys (see discussion above) may be downloaded during the PPE initialization process, and these keys are used to establish subsequent external PPE communications.

Manufacturing Key

A manufacturing key is used at the time of PPE manufacture to prevent knowledge by the manufacturing staff of PPE-specific key information that is downloaded into a PPE at initialization time. For example, a PPE 650 that operates as part of the manufacturing facility may generate information for download into the PPE being initialized. This information must be encrypted during communication between the PPEs 650 to keep it confidential, or otherwise the manufacturing staff could read the information. A manufacturing key is used to protect the information. The manufacturing key maybe used, to protect various other keys downloaded into the PPE such as, for example, a certification private key, a PPE public/private key pair, and/or other keys such as shared secret keys specific to the PPE. Since the manufacturing key is used to encrypt other keys, it is a "master key."

A manufacturing key may be public-key based, or it may be based on a shared secret. Once the information is downloaded, the now initialized PPE 650 can discard (or simply not use) the manufacturing key. A manufacturing key may be hardwired into PPE 650 at manufacturing time, or sent to the PPE as its first key and discarded after it is no longer needed. As indicated in the table above and in the preceding discussion, a manufacturing key is not required if PK capabilities are included in the PPE.

Certification Key Pair

A certification key pair may be used as part of a "certification" process for PPEs 650 and VDE electronic appliances 600. This certification process in the preferred embodiment may be used to permit a VDE electronic appliance to present one or more "certificates" authenticating that it (or its key) can be trusted. As described above, this "certification" process may be used by one PPE 650 to "certify" that it is an authentic VDE PPE, it has a certain level of security and capability set (e.g., it is hardware based rather than merely software based), etc. Briefly, the "certification" process may involve using a certificate private key of a certification key pair to encrypt a message including another VDE node's public-key. The private key of a certification key pair is preferably used to generate a PPE certificate. It is used to encrypt a public-key of the PPE. A PPE certificate can either be stored in the PPE, or it may be stored in a certification repository.

Depending on the authentication technique chosen, the, public key and the private key of a certification key pair may need to be protected. In the preferred embodiment, the certification public key(s) is distributed amongst PPEs such that they may make use of them in decrypting certificates as an aspect of authentication. Since, in the preferred embodiment, this public key is used inside a PPE 650, there is no need for this public key to be available in plaintext, and in any event it is important that such key be maintained and transmitted with integrity (e.g., during initialization and/or update by a VDE administrator). If the certification public key is kept confidential (i.e., only available in plaintext inside the PPE 650), it may make cracking security much more difficult. The private key of a certification key pair should be kept confidential and only be stored by a certifying authority (i.e., should not be distributed).

In order to allow, in the preferred embodiment, the ability to differentiate installations with different levels/degrees of trustedness/security, different certification key pairs may be used (e.g., different certification keys may be used to certify SPEs 503 then are used to certify HPEs 655).

PPE Public/Private Key Pair

In the preferred embodiment, each PPE 650 may have its own unique "device" (and/or user) public/private key pair. Preferably, the private key of this key pair is generated within the PPE and is never exposed in any form outside of the PPE. Thus, in one embodiment, the PPE 650 may be provided with an internal capability for generating key pairs internally. If the PPE generates its own public-key cryptosystem key pairs internally, a manufacturing key discussed above may not be needed. If desired, however, for cost reasons a key pair may be exposed only at the time a PPE 650 is manufactured, and may be protected at that time using a manufacturing key. Allowing PPE 650 to generate its public key pair internally allows the key pair to be concealed, but may in some applications be outweighed by the cost of putting a public-key key pair generator into PPE 650.

Initial Secret Key

The initial secret key is used as a master key by a secret key only based PPE 650 to protect information downloaded into the PPE during initialization. It is generated by the PPE 650, and is sent from the PPE to a secure manufacturing database encrypted using a manufacturing key. The secure database sends back a unique PPE manufacturing ID encrypted using the initial secret key in response.

The initial secret key is likely to be a much longer key than keys used for "standard" encryption due to its special role in PPE initialization. Since the resulting decryption overhead occurs only during the initialization process, multiple passes through the decryption hardware with selected portions of this key are tolerable.

PPE Manufacturing ID

The PPE manufacturing ID is not a "key," but, does fall within the classic definition of a "shared secret." It preferably uniquely identifies a PPE 650 and may be used by the secure database 610 to determine the PPE's initial secret key during the PPE initialization process.

Site ID, Shared Code, Shared Keys and Shared Secrets

The VDE site ID along with shared code, keys and secrets are preferably either downloaded into PPE 650 during the PPE initialization process, or are generated internally by a PPE as part of that process. In the preferred embodiment, most or all of this information is downloaded.

The PPE site ID uniquely identifies the PPE 650. The site ID is preferably unique so as to uniquely identify the PPE 650 and distinguish that PPE from all other PPEs. The site ID in the preferred embodiment provides a unique address that may be used for various purposes, such as for example to provide "address privacy" functions. In some cases, the site ID may be the public key of the PPE 650. In other cases, the PPE site ID may be assigned during the manufacturing and/or initialization process. In the case of a PPE 650 that is not public-key capable, it would not be desirable to use the device secret key as the unique site ID because this would expose too many bits of the key—and therefore a different information string should be used as the site ID.

Shared code comprises those code fragments that provide at least a portion of the control program for the PPE 650. In the preferred embodiment, a basic code fragment is installed during PPE manufacturing that permits the PPE to bootstrap and begin the initialization process. This fragment can be replaced during the initialization process, or during subsequent download processing, with updated control logic.

Shared keys may be downloaded into PPE 650 during the initialization process. These keys may be used, for example, to decrypt the private headers of many object structures.

When PPE 650 is operating in a secret key only mode, the initialization and download processes may import shared secrets into the PPE 650. These shared secrets may be used during communications processes to permit PPEs 650 to authenticate the identity of other PPEs and/or users.

Download Authorization Key

The download authorization key is received by PPE 650 during the initialization download process. It is used to authorize further PPE 650 code updates, key updates, and may also be used to protect PPE secure database 610 backup to allow recovery by a VDE administrator (for example) if the PPE fails. It may be used along with the site ID, time and convolution algorithm to derive a site ID specific key. The download authorization key may also be used to encrypt the key block used to encrypt secure database 610 backups. It may also be used to form a site specific key that is used to enable future downloads to the PPE 650. This download authorization key is not shared among all PPEs 650 in the preferred embodiment; it is specific to functions performed by authorized VDE administrators.

External Communications Keys and Related Secret and Public Information

There are several cases where keys are required when PPEs 650 communicate. The process of establishing secure communications may also require the use of related public and secret information about the communicating electronic appliances 600. The external communication keys and other information are used to support and authenticate secure communications. These keys comprise a public-key pair in the preferred embodiment although shared secret keys may be used alternatively or in addition.

Administrative Object Keys

In the preferred embodiment, an administrative object shared key may be used to decrypt the private header of an administrative object 870. In the case of administrative objects, a permissions record 808 may be present in the private header. In some cases, the permissions record 808 may be distributed as (or within) an administrative object that performs the function of providing a right to process the content of other administrative objects. The permissions record 808 preferably contains the keys for the private body, and the keys for the content that can be accessed would be budgets referenced in that permissions record 808. The administrative object shared keys may incorporate tune as a component, and may be replaced when expired.

Stationary Object Keys

A stationary object shared key may be used to decrypt a private header of stationary objects 850. As explained above, in some cases a permissions record 808 may be present in the private header of stationary objects. If present, the permissions record 808 may contain the keys for the private body but will not contain the keys for the content. These shared keys may incorporate time a component, and may be replaced when expired.

Traveling Object Shared Keys

A traveling object shared key may be used to decrypt the private header of traveling objects 860. In the preferred embodiment, traveling objects contain permissions record 808 in their private headers. The permissions record 808 preferably contains the keys for the private body and the keys for the content that can be accessed as permitted by the permissions record 808. These shared keys may incorporate time as a component, and may be replaced when expired.

Secure Database Keys

PPE 650 preferably generates these secure database, keys and never exposes them outside of the PPE. They are site-specific in the preferred embodiment, and may be "aged" as described above. As described above, each time an updated record is written to secure database 610, a new key may be used and kept in a key list within the PPE. Periodically (and when the internal list has no more room), the PPE 650 may generate a new key to encrypt new or old records. A group of keys may be used instead of a single key, depending on the size of the secure database 610.

Private Body Keys

Private body keys are unique to an object 300, and are not dependent on key information shared between PPEs 650. They are preferably generated by the PPE 650 at the time the private body is encrypted, and may incorporate real time as a component to "age" them. They are received in permissions records 808, and their usage may be controlled by budgets.

Content Keys

Content Keys are unique to an object 300, and are not dependent on key information shared between PPEs 650. They are preferably generated by the PPE 650 at the time the content is encrypted. They may incorporate time as a component to "age" them. They are received in permissions records 808, and their usage may be controlled by budgets.

Authorization Shared Secrets

Access to and use of information within a PPE 650 or within a secure database 610 may be controlled using authorization "shared secrets" rather than keys. Authorization shared secrets may be stored within the records they authorize (permissions records 808, budget records, etc.). The authorization shared secret may be formulated when the corresponding record is created. Authorization shared secrets can be generated by an authorizing PPE 650, and may be replaced when record updates occur. Authorization shared secrets have some characteristics associated with "capabilities" used in capabilities based operating systems. Access tags (described below) are an important set of authorization shared secrets in the preferred embodiment.

Backup Keys

As described above, the secure database 610 backup consists of reading all secure database records and current audit "roll ups" stored in both PPE 650 and externally. Then, the backup process decrypts and re-encrypts this information using a new set of generated keys. These keys, the time of the backup, and other appropriate information to identify the backup, may be encrypted multiple times and stored with the previously encrypted secure database files and roll up data within the backup files. These files may then all be encrypted using a "backup key" that is generated, and stored within PPE 650. This backup key 500 may be used by the PPE to recover a backup if necessary. The backup keys may also be securely encrypted (e.g., using a download authentication key and/or a VDE administrator public key) and stored within the backup itself to permit a VDE administrator to recover the backup in case of PPE 650 failure.

Cryptographic Sealing

Sealing is used to protect the integrity of information when it may be subjected to modifications outside the control of the PPE 650, either accidentally or as an attack on the VDE security. Two specific applications may be the computation of check values for database records and the protection of data blocks that are swapped out of an SPE 500.

There are two types of sealing: keyless sealing, also known as cryptographic hashing, and keyed sealing. Both employ a cryptographically strong hash function, such as MD5 or SHA. Such a function takes an input of arbitrary size and yields a size hash, or "digest." The digest has the property that it is infeasible to compute two inputs that yield the same digest, and infeasible to compute one input that yields a specific digest value, where "infeasible" is with reference to a work factor based on the size of the digest value in bits. If, for example, a 256 bit hash function is to be called strong, it must require approximately on average 10^38 (2^128) trials before a duplicated or specified digest value is likely to be produced.

Keyless seals may be employed as check values in database records (e.g., in PERC 808) and similar applications. A keyless seal may be computed based on the content of the body of the record, and the seal stored with the rest of the record. The combination of seal and record may be encrypted to protect it in storage. If someone modifies the encrypted record without knowing the encryption key (either in the part representing the data or the part representing the seal), the decrypted content will be different, and the decrypted check value will not match the digest computed from the record's data. Even though the hash algorithm is known, it is not feasible to modify both the record's data and its seal to correspond because both are encrypted.

Keyed seals may be employed as protection for data stored outside a protected environment without encryption, or as a validity proof between two protected environments. A keyed seal is computed similarly to a keyless seal, except that a secret initial value is logically prefixed to the data being sealed. The digest value thus depends both on the secret and the data, and it is infeasible to compute a new seal to correspond to modified data even though the data itself is visible to an attacker. A keyed seal may protect data in storage with a single secret value, or may protect data in transit between two environments that share a single secret value.

The choice of keys or keyless seals depends on the nature of the data being protected and whether it is additionally protected by encryption.

Tagging

Tagging is particularly useful for supporting the secure storage of important component assembly and related information on secondary storage memory 652. Integrated use of information "tagging" and encryption strategies allows use of inexpensive mass storage devices to securely store information that, in part enables, limits and/or records the configuration, management and operation of a VDE node and the use of VDE protected content.

When encrypted or otherwise secured information is delivered into a user's secure VDE processing area (e.g., PPE 650), a portion of this information can be used as a "tag" that is first decrypted or otherwise unsecured and then compared to an expected value to confirm that the information represents expected information. The tag thus can be used as a portion of a process confirming the identity and correctness of received, VDE protected, information.

Three classes of tags that may be included in the control structures of the preferred embodiment:

access tags
validation tags
correlation tags.

These Tags Have Distinct Purposes.

An access tag may be used as a "shared secret" between VDE protected elements and entities authorized to read and/or modify the tagged element(s). The access tag may be broken into separate fields to control different activities independently. If an access tag is used by an element such as a method core 1000', administrative events that affect such an element must include the access tag (or portion of the access tag) for the affected element(s) and assert that tag when an event is submitted for processing. If access tags are maintained securely (e.g., created inside a PPE 650 when the elements are created, and only released from PPE 650 in encrypted structures), and only distributed to authorized parties, modification of structures can be controlled more securely. Of course, control structures (e.g., PERCs 808) may further limit or qualify modifications or other actions expressed in administrative events.

Correlation tags are used when one element references another element. For example, a creator might be required by a budget owner to obtain permission and establish a business relationship prior to referencing their budget within the creator's PERCs. After such relationship was formed, the budget owner might transmit one or more correlation tags to the creator as one aspect of allowing the creator to produce PERCs that reference the budget owner's budget.

Validation tags may be used to help detect record substitution attempts on the part of a tamperer.

In some respects, these three classes of tags overlap in function. For example, a correlation tag mismatch may prevent some classes of modification attempts that would normally be prevented by an access tag mismatch before an access tag check is performed. The preferred embodiment may use this overlap in some cases to reduce overhead by, for example, using access tags in a role similar to validation tags as described above.

In general, tagging procedures involve changing, within SPE 503, encryption key(s), securing techniques(s), and/or providing specific stored tag(s). These procedures can be employed with secure database 610 information stored on said inexpensive mass storage 652 and used within a hardware SPU 500 for authenticating, decrypting, or otherwise analyzing, using and making available VDE protected content and management database information. Normally, changing validation tags involves storing within a VDE node hardware (e.g., the PPE 650) one or more elements of information corresponding to the tagging changes. Storage of information outside of the hardware SPE's physically secure, trusted environment is a highly cost savings means of secure storage, and the security of important stored management database information is enhanced by this tagging of information. Performing this tagging "change" frequently (for example, every time a given record is decrypted) prevents the substitution of "incorrect" information for "correct" information, since said substitution will not carry information which will match the tagging information stored within the hardware SPE during subsequent retrieval of the information.

Another benefit of information tagging is the use of tags to help enforce and/or verify information and/or control mechanisms in force between two or more parties. If information is tagged by one party, and then passed to another party or parties, a tag can be used as an expected value associated with communications and/or transactions between the two parties regarding the tagged information; For example, if a tag is associated with a data element that is passed by Party A to Party B, Party B may require Party A to prove knowledge of the correct value of at least a portion of a tag before information related to, and/or part of, said data element is released by Party B to Party A, or vice versa. In another example, a tag may be used by Party A to verify that information sent by Party B is actually associated with, and/or part of, a tagged data element, or vice versa.

Establishing a Secure, Authenticated, Communication Channel

From time to time, two parties (e.g., PPEs A and B), will need to establish a communication channel that is known by both parties to be secure from eavesdropping, secure from tampering, and to be in use solely by the two parties whose identifies are correctly known to each other.

The following describes an example process for establishing such a channel and identifies how the requirements for security and authentication may be established and validated by the parties. The process is described in the abstract, in terms of the claims and belief each party must establish, and is not to be taken as a specification of any particular protocol. In particular, the individual sub-steps of each step are not required to be implemented using distinct operations; in practice, the establishment and validation of related proofs is often combined into a single operation.

The sub-steps need not be performed in the order detailed below, except to the extent that the validity of a claim cannot be proven before the claim is made by the other party. The steps may involve additional communications between the two parties than are implied by the enumerated sub-steps, as the "transmission" of information may itself be broken into sub-steps. Also, it is not necessary to protect the claims or the proofs from disclosure or modification during transmission. Knowledge of the claims (including the specific communication proposals and acknowledgements thereof) is not considered protected information. Any modification of the proofs will cause the proofs to become invalid and will cause the process, to fail.

Standard public-key or secret-key cryptographic techniques can be used to implement this process (e.g., X.509, Authenticated Diffie-Heliman, Kerberos). The preferred embodiment uses the three-way X.509 public key protocol steps.

The following may be the first two steps in the example process:

A. (precursor step): Establish means of creating validatable claims by A

B. (precursor step): Establish means of creating validatable claims by B

These two steps ensure that each party has a means of making claims that can be validated by the other party, for instance, by using a public key signature scheme in which both parties maintain a private key and make available, a public key that itself is authenticated by the digital signature of a certification authority.

The next steps may be:

A (proposal step):

1. Determine B's identity
2. Acquire means of validating claims made by B
3. Create a unique identity for this specific proposed communication
4. Create a communication proposal identifying the parties and the specific communication
5. Create validatable proof of A's identity and the origin of the communication proposal
6. Deliver communication proposal and associated proof to B.

These steps establish the identity of the correspondent party B and proposes a communication. Because establishment of the communication will require validation of claims made by B, a means must be provided for A to validate such claims. Because the establishment of the communication must be unique to a specific requirement by A for communication, this communication proposal and all associated traffic must be unambiguously distinguishable from all other such traffic. Because B must validate the proposal as a legitimate proposal from A, a proof must be provided that the proposal is valid.

The next steps may be as follows:

B (acknowledgement step):

1. Extract A's identity from the communication proposal
2. Acquire means of validating claims made by A
3. Validate A's claim of identity and communication proposal origin
4. Determine the unique identification of the communication proposal
5. Determine that the communication proposal does not duplicate an earlier proposal
6. Create an acknowledgement identifying the specific communication proposal
7. Create validatable proof of B's identity and the origin of the acknowledgement
8. Deliver the acknowledgement and associated proof to A.

These steps establish that party B has received A's communication proposal and is prepared to act on it. Because B must validate the proposal, B must first determine its origin and validate its authenticity. B must ensure that its response is associated with a specific proposal, and that the proposal is not a replay. If B accepts the proposal, it must prove both B's own identity and that B has received a specific proposal.

The next steps may be:

A (establishment step):

1. Validate B's claim acknowledgement of A's specific proposal
2. Extract the identity of the specific communication proposal from the acknowledgement
3. Determine that the acknowledgement is associated with an outstanding communication proposal
4. Create unique session key to be used for the proposed communication
5. Create proof of session key's creation by A
6. Create proof of session key's association with the specific communication proposal
7. Create proof of receipt of B's acknowledgement
8. Protect the session key from disclosure in transmission
9. Protect the session key from modification in transmission
10. Deliver protected session key and all proofs to B.

These steps allows A to specify a session key to be associated with all further traffic related to A's specific communication proposal. A must create the key, prove that A created it, and prove that it is associated with the specific proposed communication. In addition, A must prove that the session key is generated in response to B's acknowledgement of the proposal. The session key must be protected from disclosure of modification to ensure that an attacker cannot substitute a different value.

Transportability of VDE Installations Between PPEs 650

In a preferred embodiment, VDE objects 300 and other secure information may if appropriate, be transported from one PPE 650 to another securely using the various keys outlined above. VDE 100 uses redistribution of VDE administrative information to exchange ownership of VDE object 300, and to allow the portability of objects between electronic appliances 600.

The permissions record 808 of VDE objects 300 contains rights information that may be used to determine whether an object can be redistributed in whole, in part, or at all. If a VDE object 300 can be redistributed, then electronic appliance 600 normally must have a "budget" and/or other permissioning that allows it to redistribute the object. For example, an electronic appliance 600 authorized to redistribute an object may create an administrative object containing a budget or rights less than or equal to the budget or rights that it owns. Some administrative objects may be sent to other PPEs 650. A PPE 650 that receives one of the administrative objects may have the ability to use at least a portion of the budgets, or rights, to related objects.

Transfer of ownership of a VDE object 300 is a special case in which all of the permissions and/or budgets for a VDE object are redistributed to a different PPE 650. Some VDE objects may require that all object-related information be delivered (e.g., it's possible to "sell" all rights to the object). However, some VDE objects 300 may prohibit such a transfer. In the case of ownership transfer, the original providers for a VDE object 300 may need to be contacted by the new owner, informed of the transfer, and validated using an authorization shared secret that accompanies reauthorization, before transfer of ownership can be completed.

When an electronic appliance 600 receives a component assembly, an encrypted part of the assembly may contain a value that is known only to the party or PPE 650 that supplied the assembly. This value may be saved with information that must eventually returned to the assembly supplier (e.g., audit, billing and related information). When a component supplier requests that information be reported, the value may be provided by the supplier so that the local electronic appliance 600 can check it against the originally supplied value to ensure that the request is legitimate. When a new component is received, the value may be checked against an old component to determine whether the new component is legitimate (e.g., the new value for use in the next report process may be included with the new component).

Integrity of VDE Security

There are many ways in which a PPE 650 might be compromised. The goal of the security provided by VDE 100 is to reduce the possibility that the system will be compromised, and minimize the adverse effects if it is compromised.

The basic cryptographic algorithm that are used to implement VDE 100 are assumed to be safe (cryptographically strong). These include the secret-key encryption of content, public-key signatures for integrity verification, public-key encryption for privacy between PPEs 650 or between a PPE and a VDE administrator, etc. Direct attack on these algorithms is assumed to be beyond the capabilities of an attacker. For domestic versions of VDE 100 some of this is probably a safe assumption since the basic building blocks for control information have sufficiently long keys and are sufficiently proven.

The following risks of threat or attacks may be significant:
- Unauthorized creation or modification of component assemblies (e.g., budgets)
- Unauthorized bulk disclosure of content
- Compromise of one or more keys
- Software emulation of a hardware PPE
- Substitution of older records in place of newer records
- Introduction of "rogue" (i.e., unauthentic) load modules
- Replay attacks
- Defeating "fingerprinting"
- Unauthorized disclosure of individual content items
- Redistribution of individual content items.

A significant potential security breach would occur if one or more encryption keys are compromised. As discussed above, however, the encryption keys used by VDE 100 are sufficiently varied and compartmentalized so that compromising one key would have only limited value to an attacker in most cases. For example, if a certification private key is exposed, an attacker could pass the challenge/response protocol as discussed above but would then confront the next level of security that would entail cracking either the initialization challenge/response or the external communication keys. If the initialization challenge/response security is also defeated, the initialization code and various initialization keys would also be exposed. However, it would still be necessary to understand the code and data to find the shared VDE keys and to duplicate the key-generation ("convolution") algorithms. In addition, correct real-time clock values must be maintained by the spoof. If the attacker is able to accomplish all of this successfully, then all secure communications to the bogus PPE would be compromised. An object would be compromised if communications related to the permissions record 808 of that object are sent to the bogus PPE.

Knowledge of the PPE download authorization key and the algorithms that are used to derive the key that encrypts the keys for backup of secured database 610 would compromise the entire secured database at a specific electronic appliance 600. However, in order to use this information to compromise content of VDE objects 300, an understanding of appropriate VDE internals would also be required. In a preferred embodiment, the private body keys and content keys stored in a secured database 610 are "aged" by including a time component. Time is convoluted with the stored values to derive the "true keys" needed to decrypt content. If this process is also compromised, then object content or methods would be revealed. Since a backup of secured database 610 is not ever restored to a PPE 650 in the preferred embodiment without the intervention of an authorized VDE administrator, a "bogus" PPE would have to be used to make use of this information.

External communication shared keys are used in the preferred embodiment in conjunction with a key convolution algorithm based on site ID and time. If compromised, all of the steps necessary to allow communications with PPEs 650 must also be known to take advantage of this knowledge. In addition, at least one of the administrative object shared keys must be compromised to gain access to a decrypted permissions record 808.

Compromising an administrative object shared key has no value unless the "cracker" also has knowledge of external communication keys. All administrative objects are encrypted by unique keys exchanged using the shared external communications keys, site ID and time. Knowledge of PPE 650 internal details would be necessary to further decrypt the content of administrative objects.

The private header of a stationary object (or any other stationary object that uses the same shared key) if compromised, may provide the attacker with access to content until the shared key "ages" enough to no longer decrypt the private header. Neither the private body nor the content of the object is exposed unless a permissions record 808 for that object is also compromised. The private headers of these objects may remain compromised until the key "ages" enough to no longer decrypt the private header.

Secure database encryption keys in the preferred embodiment are frequently changing and are also site specific. The consequences of compromising a secured database 610 file or a record depends on the information that has been compromised. For example, permissions record 808 contain keys for the public body and content of a VDE object 300. If a permissions record 808 is compromised, the aspects of that object protected by the keys provided by the permissions record are also compromised—if the algorithm that generates the "true keys" is also known. If a private body key becomes known, the private body of the object is compromised until the key "ages" and expires. If the "aging" process for that key is also compromised, the breach is permanent. Since the private body may contain methods that are shared by a number of different objects, these methods may also become compromised. When the breach is detected, all administrative objects that provide budgets and permissions record should update the compromised methods. Methods stored in secure database 610 are only replaced by more recent versions, so the compromised version becomes unusable after the update is completed.

If a content key becomes compromised, the portion of the content encrypted with the key is also compromised until the key "ages" and expires. If the "aging" process for that key also becomes compromised, then the breach becomes permanent. If multiple levels of encryption are used, or portions of the content are encrypted with different keys, learning a single key would be insufficient to release some or all, of the content.

If an authorization shared secret (e.g., an access tag) becomes known, the record containing the secret may be modified by an authorized means if the "cracker" knows how to properly use the secret. Generally speaking, the external communications keys, the administrative object keys and the management file keys must also be "cracked" before a shared secret is useful. Of course, any detailed knowledge of the protocols would also be required to make use of this information.

In the preferred embodiment, PPE 650 may detect whether or not it has become compromised. For example, by comparing information stored in an SPE 503 (e.g., summary service information) with information stored in secure database 610 and/or transmitted to a VDE participant (e.g., a VDE clearinghouse), discrepancies may become evident. If PPE 650 (or a VDE administrator watching its activities or communicating with it) detects that it has been compromised, it may be updated with an initialization to use new code, keys and new encryption/decryption algorithms. This would limit exposure to VDE objects 300 that existed at the time the encryption scheme was broken. It is possible to require the PPE 650 to cease functioning after a certain period of time unless new code and key downloads occur. It is also possible to have VDE administrators force updates to occur. It is also likely that the desire to acquire a new VDE object 300 will provide an incentive for users to update their PPEs 650 at regular time intervals.

Finally, the end-to-end nature of VDE applications, in which content 108 flows in one direction, generating reports and bills 118 in the other, makes it possible to perform "back-end" consistency checks. Such checks, performed in clearinghouses 116, can detect patterns of use that may or do indicate fraud (e.g., excessive acquisition of protected content without any corresponding payment, usage records without corresponding billing records). The fine grain of usage reporting and the ready availability of usage records and reports in electronic form enables sophisticated fraud detection mechanisms to be built so that fraud related costs can be kept to an acceptable level.

PPE Initialization

Each PPE 650 needs to be initialized before it can be used. Initialization may occur at the manufacturer site, after the PPE 650 has been placed out in the field, or both. The manufacturing process for PPE 650 typically involves embedding within the PPE sufficient software that will allow the device to be more completely initialized at a later time. This manufacturing process may include, for example, testing the bootstrap loader and challenge response software permanently stored within PPE 650, and loading the PPE's unique ID. These steps provide a basic VDE-capable PPE 650 that may be further initialized (e.g., after it has been installed within an electronic appliance 600 and placed in the field). In some cases, the manufacturing and further initialization processes may be combined to produce "VDE ready" PPEs 65. This description elaborates on the summary presented above with respect to FIGS. 64 and 65.

Figure 68:
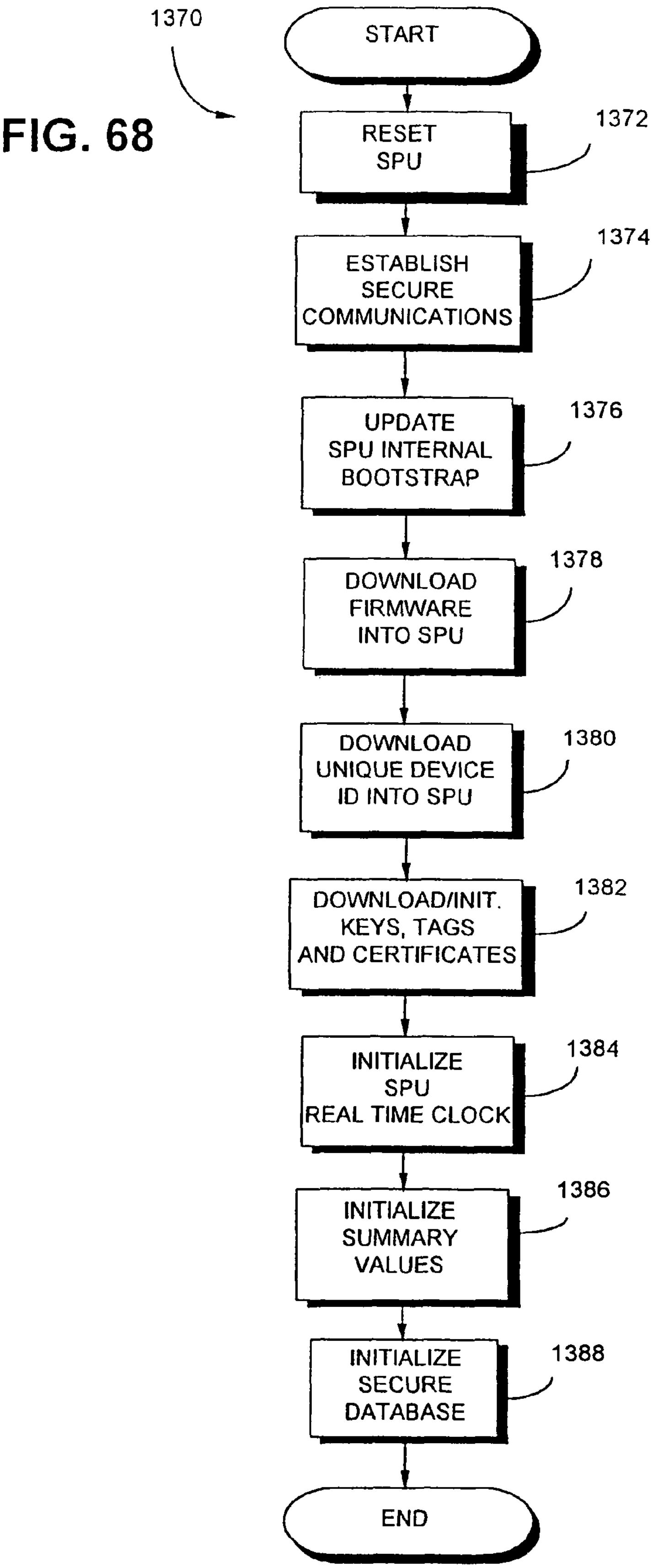
FIG. 68 shows an example of how a protected processing environment may be initialized.

FIG. 68 shows an example of steps that may be performed in accordance with one preferred embodiment to initialize a PPE 650. Some of the steps shown in this flowchart may be performed at the manufacturing site, and some may be performed remotely through contact between a VDE administrator and the PPE 650. Alternatively, all of the steps shown in the diagram may be performed at the manufacturing site, or all of the steps shown may be performed through remote communications between the PPE 500 and a VDE administrator If the initialization process 1370 is being performed at the manufacturer, PPE 650 may first be attached to a testbed. The manufacturing testbed may first reset the PPE 650 (e.g., with a power on clear) (Block 1372). If this reset is being performed at the manufacturer, then the PPE 650 preferably executes a special testbed bootstrap code that completely tests the PPE operation from a software standpoint and fails if something is wrong with the PPE. A secure communications exchange may then be established between the manufacturing testbed and the PPE 650 using an initial challenge-response interaction (Block 1374) that is preferably provided as part of the testbed bootstrap process. Once this secure communications has been established, the PPE 650 may report the results of the bootstrap tests it has performed to the manufacturing testbed. Assuming the PPE 650 has tested successfully, the manufacturing testbed may download new code into the PPE 650 to update its internal bootstrap code (Block 1376) so that it does not go through the testbed bootstrap process upon subsequent resets (Block 1376). The manufacturing testbed may then load new firmware into the PPE internal nonvolatile memory in order to provide additional standard and/or customized capabilities (Block 1378). For example, the manufacturing testbed may preload PPE 650 with the load modules appropriate for the particular manufacturing lot. This step permits the PPE 500 to be customized at the factory for specific applications.

The manufacturing testbed may next load a unique device ID into PPE 650 (Block 1380). PPE 650 now carries a unique ID that can be used for further interactions.

Blocks 1372-1380R typically are, in the preferred embodiment, performed at the manufacturing site. Blocks 1374 and 13821388 may be performed either at the manufacturing site, after the PPE 650 has been deployed, or both.

To further initialize PPE 650, once a secure communications has been established between the PPE and the manufacturing testbed or a VDE administrator (Block 1374), any required keys, tags or certificates are loaded into PPE 650 (Block 1382). For example, the manufacturing test bed may load its information into PPE 650 so the PPE may be initialized at a later time. Some of these values may be generated internally within PPE 650. The manufacturing testbed or VDE administrator may then initialize the PPE real time clock 528 to the current real time value (Block 1384). This provides a time and date reference for the PPE 650. The manufacturing testbed or the VDE administrator may next initialize the summary values maintained internally to the PPE 500 (Block 1386). If the PPE 650 is already installed as part of an electronic appliance 600, the PPE may at this point initialize its secure database 610 (Block 1388).

Figure 69:
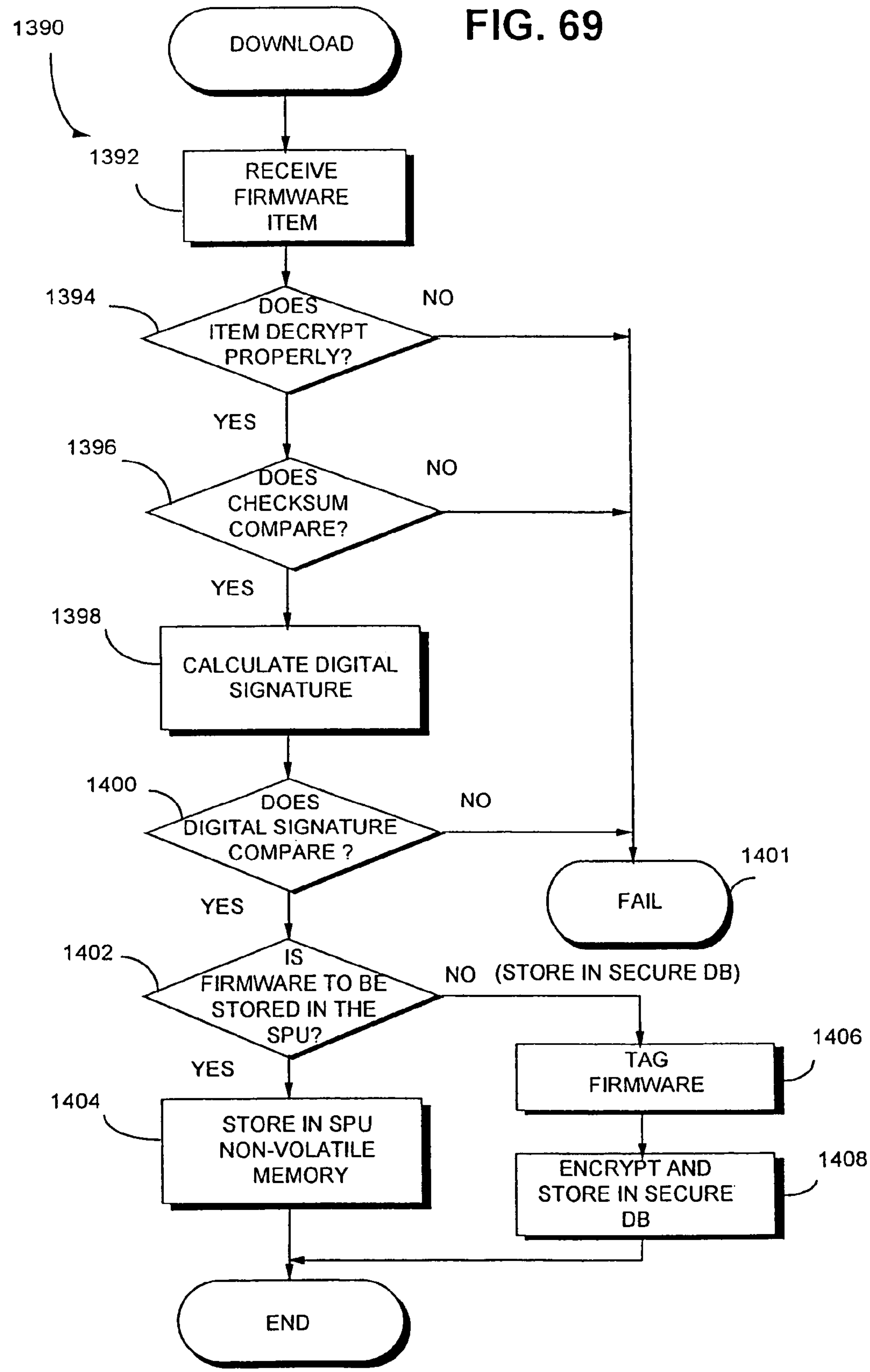
FIG. 69 shows an example of how firmware may be downloaded into a protected processing environment.

FIG. 69 shows an example of program control steps performed by PPE 650 as part of a firmware download process (See FIG. 68, Block 1378). The PPE download process is used to load externally provided firmware and/or data elements into the PPE. Firmware loads may take two forms: permanent loads for software that remains resident in the PPE 650; and transient loads for software that is being loaded for execution. A related process for storing into the secure database 610 is performed for elements that have been sent to a VDE electronic appliance 600.

PPE 650 automatically performs several checks to ensure that firmware being downloaded into the PPE has not been tampered with, replaced, or substituted before it was loaded. The download routine 1390 shown in the figure illustrates an example of such checks. Once the PPE 650 has received a new firmware item (Block 1392), it may check the item to ensure that it decrypts properly using the predetermined download or administrative object key (depending on the source of the element) (decision Block 1394). If the firmware decrypts properly ("yes" exits to decision Block 1394), the firmware as check valve may be calculated and compared against the, check valve stored under the encryption wrapper of the firmware (decision Block 1396). If the two check summed values compare favorably ("yes" exit to decision Block 1396, then the PPE 650 may compare the public and private header identification tags associated with the firmware to ensure that the proper firmware was provided and had not been substituted (step not shown in the figure). Assuming this test also passes, the PPE 500 may calculate the digital signatures of the firmware (assuming digital signatures are supported by the PPE 650 and the firmware is "signed") and may check the calculated signature to ensure that it compares favorably to the digital signatures under the firmware encryption wrapper (Blocks 1398, 1400). If any of these tests fail, then the download will be aborted ("fail" termination 1401).

Assuming all of the tests described above pass, then PPE 650 determines whether the firmware is to be stored within the PPE (e.g., an internal non-volatile memory), or whether it is to be stored in the secure database 610 (decision Block 1402). If the firmware is to be stored within the PPE ("yes" exit to decision Block 1402), then the PPE 500 may simply store the information internally (Block 1404). If the firmware is to be stored within the secure database 610 ("no" exit to decision Block 1402), then the firmware may be tagged with a unique PPE specific tag designed to prevent record substitution (Block 1406), and the firmware may then be encrypted using the appropriate secure database key and released to the secure database 610 (Block 1408).

Networking SPUs 500 and/or VDE Electronic Appliances 600

In the context of many computers interconnected by a local or wide area network, it would be possible for one or a few of them to be VDE electronic appliances 600. For example, a VDE capable server might include one or more SPUs 500. This centralized VDE server could provide all VDE services required within the network or it can share VDE service with VDE server nodes; that is, it can perform a few, some, or most VDE service activities. For example, a user's non-VDE computer could issue a request over the network for VDE protected content. In response to the request, the VDE server could comply by accessing the appropriate VDE object 300, releasing the requested content and delivering the content over the network 672 to the requesting user. Such an arrangement would allow VDE capabilities to be easily integrated into existing networks without requiring modification or replacement of the various computers and other devices connected to the networks.

For example, a VDE server having one or more protected processing environments 650 could communicate over a network with workstations that do not have a protected processing environment. The VDE server could perform all secure VDE processing, and release resulting content and other information to the workstations on the network. This arrangement would require no hardware or, software modification to the workstations.

However, some applications may require greater security, flexibility and/or performance that may be obtained by providing multiple VDE electronic appliances 600 connected to the same network 672. Because commonly used local area networks constitute an insecure channel that may be subject to tampering and/or eavesdropping, it is desirable in most secure applications to protect the information communicated across the network. It would be possible to use conventional network security techniques to protect VDE released-content or other VDE information communicated across a network 672 between a VDE electronic appliance 600 and a non-VDE electronic appliance. However, advantages are obtained by providing multiple networked VDE electronic appliances 600 within the same system.

As discussed above in connection with FIG. 8, multiple VDE electronic appliances 600 may communicate with one another over a network 672 or other communications path. Such networking of VDE electronic appliances 600 can provide advantages. Advantages include, for example, the possibility of centralizing VDE resources, storing and/or archiving metering information on a server VDE and delivering information and services efficiently across the network 672 to multiple electronic appliances 600.

For example, in a local area network topology, a "VDE server" electronic appliance 600 could store VDE protected information and make it available to one or more additional electronic appliances 600 or computers that may communicate with the server over network 672. As one example, an object repository 728 storing VDE objects could be maintained at the centralized server, and each of many networked electronic appliance 600 users could access the centralized object repository over the network 672 as needed. When a user needs to access a particular VDE object 300, her electronic appliance 600 could issue a request over network 672 to obtain a copy of the object. The "VDE server" could deliver all or a portion of the requested object 300 in response to the request. Providing such a centralized object repository 728 would have the advantage of minimizing mass storage requirements local to each electronic appliance 600 connected to the network 672, eliminate redundant copies of the same information, ease information management burdens, provide additional physical and/or other security for particularly important VDE processes and/or information occurring at the server, where providing such security at VDE nodes may be commercially impractical for certain business models, etc.

It may also be desirable to centralize secure database 610 in a local area network topology. For example, in the context of a local area network, a secure database 610 server could be provided at a centralized location. Each of several electronic appliances 600 connected to a local area network 672 could issue requests for secure database 610 records over the network, and receive those records via the network. The records could be provided over the network in encrypted form. "Keys" needed to decrypt the records could be shared by transmitting them across the network in secure communication exchanges. Centralizing secure database 610 in a network 672 has potential advantages of minimizing or eliminating secondary storage and/or other memory requirements for each of the networked electronic appliances 600, avoiding redundant information storage, allowing centralized backup services to be provided, easing information management burdens, etc.

One way to inexpensively and conveniently deploy multiple instances of VDE electronic appliances 600 across a network would be to provide network workstations with software defining an HPE 655. This arrangement requires no hardware modification of the workstations; an HPE 655 can be defined using, software only. An SPE(s) 503 and/or HPE(s) 655 could also be provided within a VDE server. This arrangement has the advantage of allowing distributed VDE network processing without requiring workstations to be customized or modified (except for loading a new program(s) into them). VDE functions requiring high levels of security may be restricted to an SPU-based VDE server. "Secure" HPE-based workstations could perform VDE functions requiring less security, and could also coordinate their activities with the VDE server.

Thus, it may be advantageous to provide multiple VDE electronic appliances 600 within the same network. It may also be advantageous to provide multiple VDE electronic appliances 600 within the same workstation or other electronic appliance 600. For example, an electronic appliance

600 may include multiple electronic appliances 600 each of which have a SPU 500 and are capable of performing VDE functions.

For example, one or more VDE electronic appliances 600 can be used as input/output device(s) of a computer system. This may eliminate the need to decrypt information in one device and then move it in unencrypted form across some bus or other unsecured channel to another device such as a peripheral. If the peripheral device itself is a VDE electronic appliance 600 having a SPU 500, VDE protected information may be securely sent to the peripheral across the insecure channel for processing (e.g., decryption) at the peripheral device. Giving the peripheral device the capability of handling VDE protected information directly also increases flexibility. For example, the VDE electronic appliance 600 peripheral device may control VDE object 300 usage. It may, for example, meter the usage or other parameters associated with the information it processes, and it may gather audit trials and other information specific to the processing it performs in order to provide greater information gathering about VDE object usage. Providing multiple cooperating VDE electronic appliances 600 may also increase performance by eliminating the need to move encrypted information to a VDE electronic appliance 600 and then move it again in unencrypted form to a non-VDE device. The VDE protected information can be moved directly to its destination device which, if VDE capable, may directly process it without requiring involvement by some other VDE electronic appliance 600.

Figure 70:
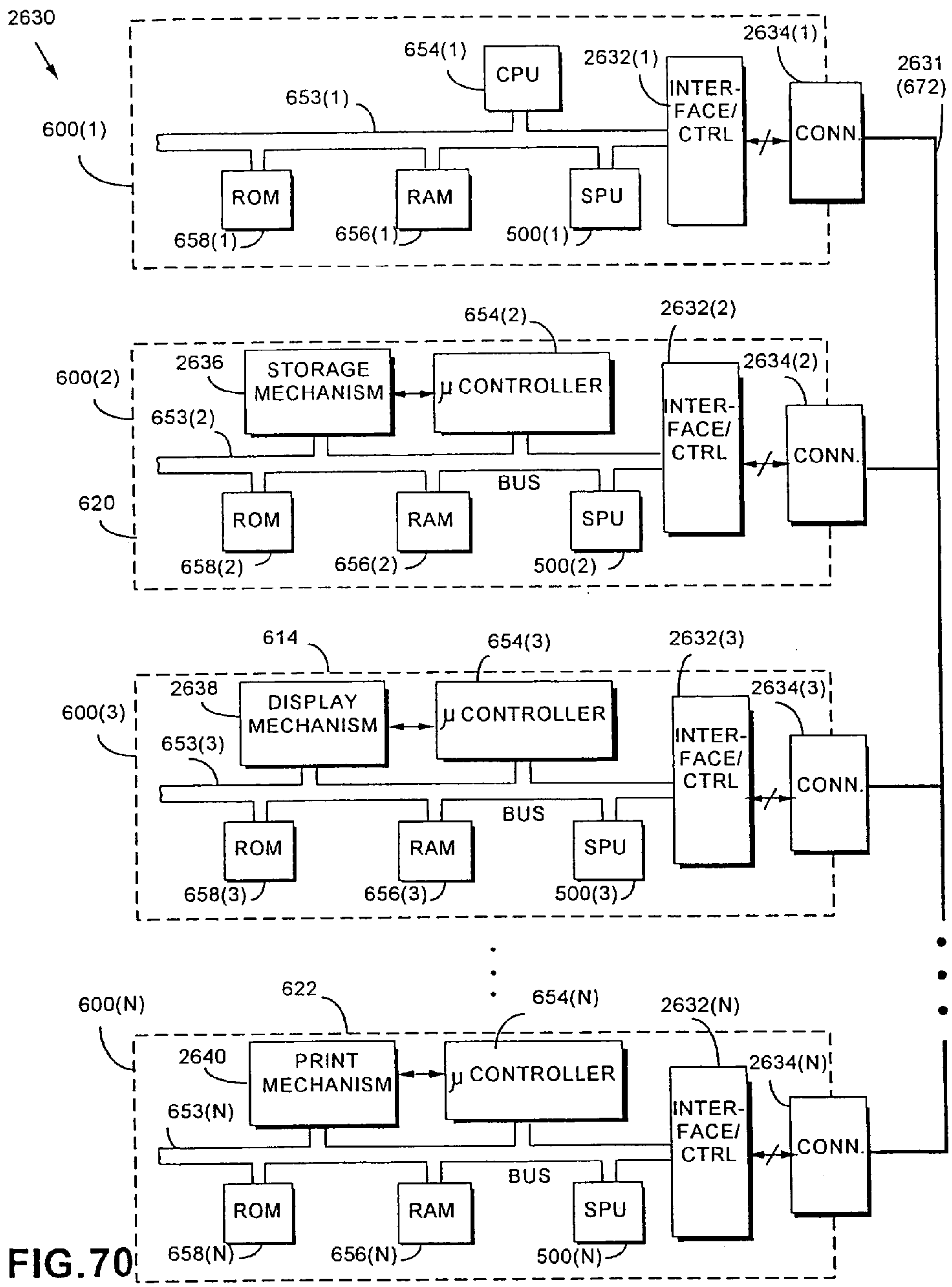
FIG. 70 shows an example of multiple VDE electronic appliances connected together with a network or other communications means.

FIG. 70 shows an example of an arrangement 2630 comprising multiple VDE electronic appliances 600(1), 600(2), 600(3), . . . , 600(N). VDE electronic appliances 600(1) . . . 600(N) may communicate with one another over a communications path 2631 (e.g., the system bus of a work station, a telephone or other wire, a cable, a backplane, a network 672, or any other communications mechanism). Each of the electronic appliances 600 shown in the figure may have the same general architecture shown in FIG. 8, i.e., they may each include a CPU (or microcontroller) 654, SPU 500, RAM 656, ROM 658, and system bus 653. Each of the electronic appliances 600 shown in the figure may have an interface/controller 2632 (which may be considered to be a particular kind of I/O controller 660 and/or communications controller 666 shown in FIG. 8). This interface/controller 2632 provides an interface between the electronic appliance system bus 653 and an appropriate electrical connector 2634. Electrical connectors 2634 of each of the respective electronic appliances 600(1), . . . 600(N) provide a connection to a common network 672 or other communication paths.

Although each of electronic appliances 600 shown in the figure may have a generally similar architecture, they may perform different specialized tasks. For example, electronic appliance 600(1) might comprise a central processing section of a workstation responsible for managing the overall operation of the workstation and providing computation resources. Electronic appliance 600(2) might be a mass storage device 620 for the same workstation, and could provide a storage mechanism 2636 that might, for example, read information from and write information to a secondary storage device 652. Electronic appliance 600(3) might be a display device 614 responsible for performing display tasks, and could provide a displaying mechanism 2638 such as a graphics controller and associated video or other display. Electronic appliance 600(N) might be a printer 622 that performs printing related tasks and could include, for example, a print mechanism 2640.

Each of electronic appliances 600(1), . . . 600(N) could comprise a different module of the same workstation device all contained within a common housing, or the different electronic appliances could be located within different system components. For example, electronic appliance 600(2) could be disposed within a disk controller unit, electronic appliance 600(3) could be disposed within a display device 614 housing, and the electronic appliance 600(N) could be disposed within the housing of a printer 622. Referring back to FIG. 7, scanner 626, modem 618, telecommunication means 624, keyboard 612 and/or voice recognition box 613 could each comprise a VDE electronic appliance 600 having its own SPU 500. Additional examples include RF or otherwise wireless interface controller, a serial interface controller, LAN controllers, MPEG (video) controllers, etc.

Because electronic appliances 600(1) . . . 600(N) are each VDE-capable, they each have the ability to perform encryption and/or decryption of VDE-protected information. This means that information communicated across network 672 or other communications path 2631 connecting the electronic appliances can be VDE-protected (e.g., it may be packaged in the form of VDE administrative and/or content objects and encrypted as discussed above). One of the consequences of this arrangement is that an eavesdropper who taps into communications path 2631 will not be able obtain information except in VDE-protected form. For example, information generated by electronic appliance 600 (1) to be printed could be packaged in a VDE content object 300 and transmitted over path 2631 to electronic appliance 600 (N) for printing. An attacker would gain little benefit from intercepting this information since it is transmitted in protected form; she would have to compromise electronic appliance 600(1) or 600(N) (or the SPU 500(1), 500(N)) in order to access this information in unprotected form.

Another advantage provided by the arrangement shown in the diagram is that each of electronic appliances 600(1), . . . 600(N) may perform their own metering, control and/or other VDE-related functions. For example, electronic appliance 600(N) may meter and/or perform any other VDE control functions related to the information to be printed, electronic appliance 600(3) may meter and/or perform any other VDE control functions related to the information to be displayed, electronic appliance 600(2) may meter and/or perform any other VDE control functions related to the information to be stored and/or retrieved from mass storage 620, and electronic appliance 600(1) may meter and/or perform any other VDE control functions related to the information it processes.

In one specific arrangement, each of electronic appliances 600(1), 600(N) would receive a command that indicates that the information received by or sent to the electronic appliance is to use its SPU 500 to process the information to follow. For example, electronic appliance 600(N) might receive a command that indicates that information it is about to receive for printing is in VDE-protected form (or the information that is sent to it may itself indicate this). Upon receiving this command or other information, electronic appliance 600(N) may decrypt the received information using SPU 500, and might also meter the information the SPU provides to the print mechanism 2644 for printing. An additional command might be sent to electronic appliance 600(N) to disable the decryption process or 600(N)'s VDE secure subsystem may determine that the information should not be decrypted and/or printed. Additional commands, for example, may exist to load encryption/decryption keys, load "limits," establish "fingerprinting" requirements, and read metered usage. These additional commands may be sent in encrypted or unencrypted form as appropriate.

Suppose, for example, that electronic appliance 600(1) produces information it wishes to have printed by a VDE-capable printer 622. SPU 500(1) could establish a secure communications across path 2631 with SPU 500(N) to provide a command instructing SPU 500(N) to decrypt the next block of data and store it as a decryption key and a limit. SPU 500(1) might then send a further command to SPU 500(N) to use the decryption key and associated limit to process any following encrypted print stream (or this command could be sent by CPU 654(1) to microcontroller 654(N)). Electronic appliance 600(1) could then begin sending encrypted information on path 672 for decryption and printing by printer 622. Upon receipt of each new block of information by printer 622, SPU 500(N) might first check to ensure that the limit is greater than zero. SPU 500(N) could then increment a usage meter value it maintains, and decrement the limit value. If the limit value is non-zero, SPU 500(N) could decrypt the information it has received and provide it to print mechanism 2640 for printing. If the limit is zero, then SPU 500(N) would not send the received information to the print mechanism 2640, nor would it decrypt it. Upon receipt of a command to stop, printer 622 could revert to a "non-secure" mode in which it would print everything received by it across path 2631 without permitting VDE processing.

The SPU 500(N) associated with printer 622 need not necessarily be disposed within the housing of the printer, but could instead be placed within an I/O controller 660 for example (see FIG. 8). This would allow at least some of the advantages similar to the ones discussed above to be provided without requiring a special VDE-capable printer 622. Alternatively, a SPU 500(N) could be provided both within printer 622 and within I/O controller 660 communicating with the printer to provide advantages in terms of coordinating I/O control and relieving processing burdens from the SPU 500 associated with the central processing electronic appliance 600(1). When multiple VDE instances occur within an electronic appliance, one or more VDE secure subsystems may be "central" subsystems, that is "secondary" VDE instances may pass encrypted usage related information to one or more central secure subsystems so as to allow said central subsystem to directly control storage of said usage related information. Certain control information may also be centrally stored by a central subsystem and all or a portion of such information may be securely provided to the secondary secure subsystem upon its secure VDE request.

Portable Electronic Appliance

Figure 71:
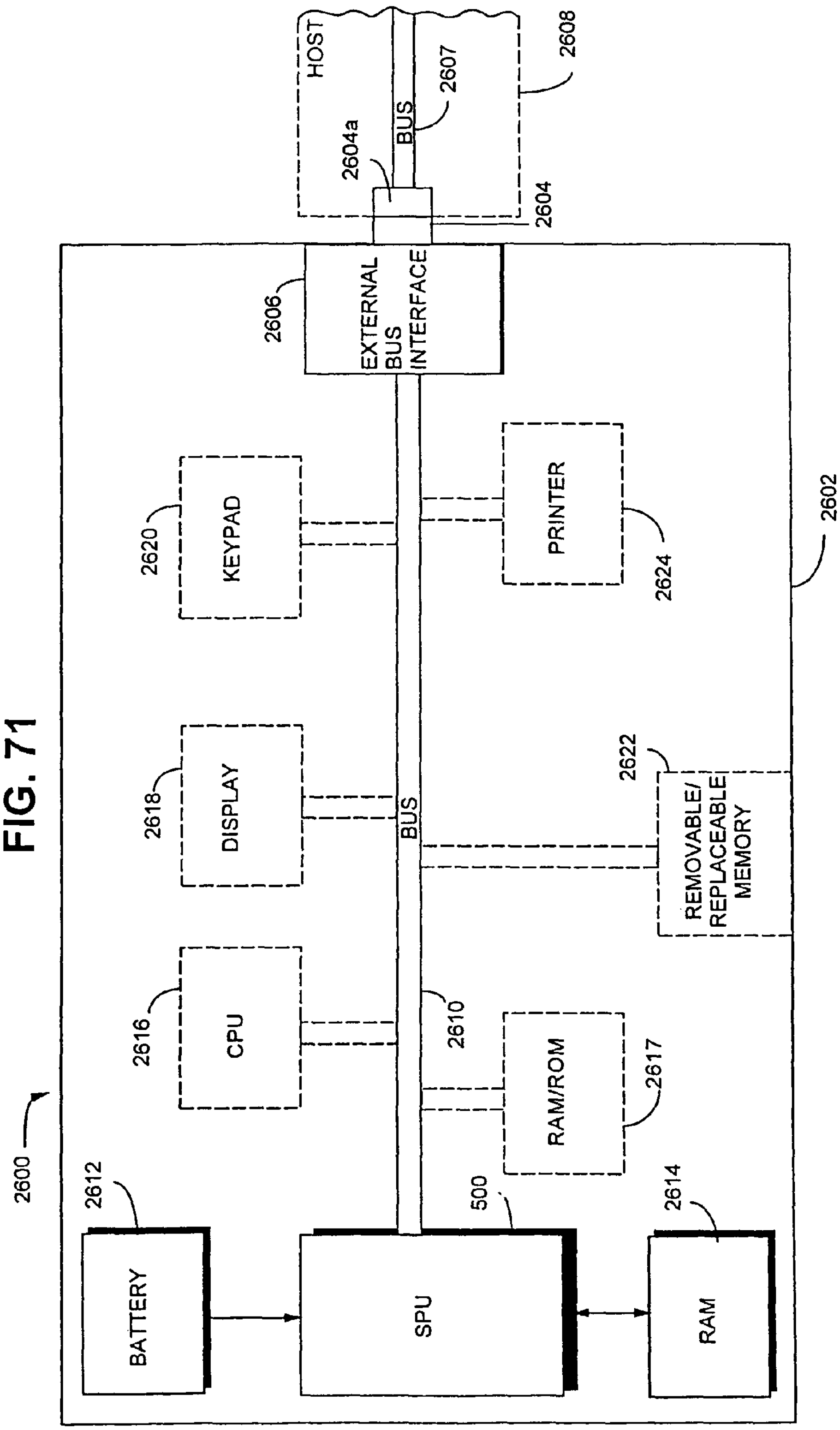
FIG. 71 shows an example of a portable VDE electronic appliance.

Electronic appliance 600 provided by the present invention may be portable. FIG. 71 shows one example of a portable electronic appliance 2600. Portable appliance 2600 may include a portable housing 2602 that may be about the size of a credit card in one example. Housing 2602 may connect to the outside world through, for example, an electrical connector 2604 having one or more electrical contact pins (not shown). Connector 2604 may electrically connect an external bus interface 2606 internal to housing 2602 to a mating connector 2604*a* of a host system 2608. External bus interface 2606 may, for example, comprise a PCMCIA (or other standard) bus interface to allow portable appliance 2600 to interface with and communicate over a bus 2607 of host system 2608. Host 2608 may, for example, be almost any device imaginable, such as a computer, a pay telephone, another VDE electronic appliance 600, a television, an arcade video game, or a washing machine, to name a few examples.

Housing 2602 may be tamper resistant. (See discussion above relating to tamper resistance of SPU barrier 502.)

Portable appliance 2600 in the preferred embodiment includes one or more SPUs 500 that may be disposed within housing 2602. SPU 500 may be connected to external bus interface 2606 by a bus 2610 internal to housing 2602. SPU 500 communicates with host 2608 (through external bus interface 2606) over this internal bus 2610.

SPU 500 may be powered by a battery 2612 or other portable power supply that is preferably disposed within housing 2602. Battery 2612 may be, for example, a miniature battery of the type found in watches or credit card sized calculators. Battery 2612 may be supplemented (or replaced) by solar cells, rechargeable batteries, capacitive storage cells, etc.

A random access memory (RAM) 2614 is preferably provided within housing 2602. RAM 2614 may be connected to SPU 500 and not directly connected to bus 2610, so that the contents of RAM 2614 may be accessed only by the SPU and not by host 2608 (except through and as permitted by the SPU). Looking at FIG. 9 for a moment, RAM 2614 may be part of RAM 534 within the SPU 500, although it need not necessarily be contained within the same integrated circuit or other package that houses the rest of the SPU.

Portable appliance 2600 RAM 534 may contain, for example, information which can be used to uniquely identify each instance of the portable appliance. This information may be employed (e.g. as at least a portion of key or password information) in authentication, verification, decryption, and/or encryption processes.

Portable appliance 2600 may, in one embodiment, comprise means to perform substantially all of the functions of a VDE electronic appliance 600. Thus, for example, portable appliance 2600 may include the means for storing and using permissions, methods, keys, programs, and/or other information, and can be capable of operating as a "stand alone" VDE node.

In a further embodiment, portable appliance 2600 may perform preferred embodiment VDE functions once it has been coupled to an additional external electronic appliance 600. Certain information, such as database management permission(s), method(s), key(s), and/or other important information (such as at least a portion of other VDE programs administrative, user-interface, analysis, etc.) may be stored (for example as records) at an external VDE electronic appliance 600 that may share information with portable appliance 2600.

One possible "stand alone" configuration for tamper-resistant, portable appliance 2600 arrangements includes a tamper-resistant package (housing 2602) containing one or more processors (500, 2616) and/or other computing devices and/or other control logic, along with random-access-memory 2614. Processors 500, 2616 may execute permissions and methods wholly (or at least in part) within the portable appliance 2600. The portable appliance 2600 may have the ability to encrypt information before the information is communicated outside of the housing 2602 and/or decrypt received information when said received information is received from outside of the housing. This version would also possess the ability to store at least a portion of permission, method, and/or key information securely within said tamper resistant portable housing 2602 on non-volatile memory.

Another version of portable appliance 2600 may obtain permissions and/or methods and/or keys from a local VDE electronic appliance 600 external to the portable appliance 2600 to control, limit, or otherwise manage a user's use of a VDE protected object. Such a portable appliance 600 may be contained within, received by, installed in, or directly connected to, another electronic appliance 2600.

One example of a "minimal" configuration of portable appliance 2600 would include only SPU 500 and battery 2612 within housing 2602 (the external bus interface 2606 and the RAM 2614 would in this case each be incorporated into the SPU block shown in the Figure). In other, enhanced examples of portable appliance 2600, any or all of the following optional components may also be included within housing 2602:

- one or more CPUs 2616 (with associated support components such as RAM-ROM 2617, I/O controllers (not shown), etc.);
- one or more display devices 2618;
- one or more keypads or other user input buttons/control information 2620;
- one or more removable/replaceable memory device(s) 2622; and
- one or more printing device(s) 2624.

In such more enhanced versions, the display 2618, keypad 2620, memory device 2622 and printer 2624 may be connected to bus 2610 or they might be connected to CPU 2616 through an I/O port/controller portion (not shown) of the CPU. Display 2618 may be used to display information from SPU 500, CPU 2616 and/or host 2608. Keypad 2620 may be used to input information to SPU 500, CPU 2616 and/or host 2608. Printer 2624 may be used to print information from any/all of these sources. Removable/replaceable memory 2622 may comprise a memory cartridge or memory medium such as a bulk storage device, for providing additional long-term or short-term storage. Memory 2622 may be easily removable from housing 2602 if desired:

In one example embodiment, portable appliance 2600 may have the form factor of a "smart card" (although a "smart card" form factor may provide certain advantages, housing 2602 may have the same or different form factor as "conventional" smart cards). Alternatively, such a portable electronic appliance 2600 may, for example, be packaged in a PCMCIA card configuration (or the like) which is currently becoming quite popular on personal computers and is predicted to become common for desk-top computing devices and Personal Digital Assistants. One advantageous form factor for the portable electronic appliance housing 2602 may be, for example, a Type 1, 2, or 3 PCMCIA card (or other derivations) having credit card or somewhat larger dimensions. Such a form factor is conveniently portable, and may be insertable into a wide array of computers and consumer appliances, as well as receptacles at commercial establishments such as retail establishments and banks, and at public communications points, such as telephone or other telecommunication "booths."

Housing 2602 may be insertable into and removable from a port, slot or other receptacle provided by host, 2608 so as to be physically (or otherwise operatively) connected to a computer or other electronic appliance. The portable appliance connector 2604 may be configured to allow easy removability so that appliance 2600 may be moved to another computer or other electronic appliance at a different location for a physical connection or other operative connection with that other device.

Portable electronic appliance 2600 may provide a valuable and relatively simple means for a user to move permissions and methods between their (compatible) various electronic appliances 600, such as between a notebook computer, a desktop computer and an office computer. It could also be used, for example, to allow a consumer to visit a next door neighbor and allow that neighbor to watch a movie that the consumer had acquired a license to view, or perhaps to listen to an audio record on a large capacity optical disk that the consumer had licensed for unlimited plays.

Portable electronic appliance 2600 may also serve as a "smart card" for financial and other transactions for users to employ in a variety of other applications such as, for example, commercial applications. The portable electronic appliance 2600 may, for example, carry permission and/or method information used to authorize (and possibly record) commercial processes and services.

An advantage of using the preferred embodiment VDE portable appliance 2600 for financial transactions such as those typically performed by banks and credit card companies is that VDE allows financial clearinghouses (such as VISA, MasterCard, or American Express) to experience significant reductions in operating costs. The clearinghouse reduction in costs result from the fact that the local metering and budget management that occurs at the user site through the use of a VDE electronic appliance 600 such as portable appliance 2600 frees the clearinghouse from being involved in every transaction. In contrast to current requirements, clearinghouses will be able to perform their functions by periodically updating their records (such as once a month). Audit and/or budget "rollups" may occur during a connection initiated to communicate such audit and/or budget information and/or through a connection that can occur at periodic or relatively periodic intervals and/or during a credit updating, purchasing, or other portable appliance 2600 transaction.

Clearinghouse VDE digital distribution transactions would require only occasional authorization and/or audit or other administrative "roll-ups" to the central service, rather than far more costly connections during each session. Since there would be no requirement for the maintenance of a credit card purchase "paper trail" (the authorization and then forwarding of the credit card slip), there could be substantial cost reductions for clearinghouses (and, potentially, lower costs to users) due to reduction in communication costs, facilities to handle concurrent processing of information, and paper handling aspects of transaction processing costs. This use of a portable appliance 2600 would allow credit enforcement to exploit distributed processing employing the computing capability in each VDE electronic appliance 600. These credit cost and processing advantages may also apply to the use of non-smart card and non-portable VDE electronic appliance 600*s*.

Since VDE 100 may be configured as a highly secure commercial environment, and since the authentication processes supported by VDE employ digital signature processes which provide a legal validation that should be equivalent to paper documentation and handwritten signatures, the need for portable appliance 2600 to maintain paper trails, even for more costly transactions, is eliminated. Since auditable billing and control mechanisms are built into VDE 100 and automated, they may replace traditional electronic interfaces to VISA, Master Card, AMEX, and bank debit accounts for digitally distributed other products and services, and may save substantial operating costs for such clearinghouses.

Portable appliance 2600 may, if desired, maintain for a consumer a portable electronic history. The portable history can be, for example, moved to an electronic "dock" or other receptacle, in or operatively connected to, a computer or other consumer host appliance 2608. Host appliance 2608 could be, for example, an electronic organizer that has control logic at least in part in the form of a microcomputer and that stores information in an organized manner, e.g., according to tax and/or other transaction categories (such as type of use or activity). By use of this arrangement, the consumer no longer has to maintain receipts or otherwise manually track transactions but nevertheless can maintain an electronic, highly secure audit trail of transactions and transaction descriptions. The transaction descriptions may, for example, securely include the user's digital signature, and optionally, the service or goods provider's digital signature.

When a portable appliance 2600 is "docked" to a host 2608 such as a personal computer or other electronic appliance (such as an electronic organizer), the portable appliance 2600 could communicate interim audit information to the host. In one embodiment, this information could be read, directly or indirectly, into a computer or electronic organizer money and/or tax management program (for example, Quicken or Microsoft Money and/or Turbo Tax and/or Andrew Tobias' Managing Your Money). This automation of receipt management would be an enormous boon to consumers, since the management and maintenance of receipts is difficult and time-consuming, receipts are often lost or forgotten, and the detail from credit card billings is often wholly inadequate for billing and reimbursement purposes since credit card billings normally don't provide sufficient data on the purchased items or significant transaction parameters.

In one embodiment, the portable appliance 2600 could support secure (in this instance encrypted and/or authenticated) two-way communications with a retail terminal which may contain a VDE electronic appliance 600 or communicate with a retailer's or third party provider's VDE electronic appliance 600. During such a secure two-way communication between, for example, each participant's secure VDE subsystem, portable appliance 2600 VDE secure subsystem may provide authentication and appropriate credit or debit card information to the retail terminal VDE secure subsystem. During the same or different communication session, the terminal could similarly, securely communicate back to the portable appliance 2600 VDE secure subsystem details as to the retail transaction (for example, what was purchased and price, the retail establishment's digital signature, the retail terminal's identifier, tax related information, etc.).

For example, a host 2608 receptacle for receiving and/or attaching to portable appliance 2600 could be incorporated into or operatively connected to, a retail or other commercial establishment terminal. The host terminal 2608 could be operated by either a commercial establishment employee or by the portable appliance 2600 holder. It could be used to, for example, input specific keyboard and/or voice input specific information such as who was taken to dinner, why something was purchased, or the category that the information should be attached to. Information could then be automatically "parsed" and routed into securely maintained (for example encrypted) appropriate database management records within portable appliance 2600. Said "parsing" and routing would be securely controlled by VDE secure subsystem processes and could, for example, be based on category information entered in by the user and/or based on class of establishment and/or type (category) of expenditure information (or other use). Categorization can be provided by the retail establishment, for example, by securely communicating electronic category information as a portion, for example, of electronic receipt information or alternatively by printing a hard copy receipt using printer 2624. This process of categorization may take place in the portable appliance 2600 or, alternatively, it could be performed by the retail establishment and periodically "rolled-up" and communicated to the portable appliance 2600 holder.

Retail, clearinghouse, or other commercial organizations may maintain and use by securely communicating to appliance 2600 one or more of generic classifications of transaction types (for example, as specified by government taxation rules) that can be used to automate the parsing of information into records and/or for database information "roll-ups" for; and/or in portable appliance 2600 or one or more associated VDE nodes. In such instances, host 2608 may comprise an auxiliary terminal, for example, or it could comprise or be incorporated directly within a commercial establishments cash registers or other retail transactions devices. The auxiliary terminal could be menu and/or icon driven, and allow very easy user selection of categorization. It could also provide templates, based on transaction type, that could guide the user through specifying useful or required transaction specific information (for example, purpose for a business dinner and/or who attended the dinner). For example, a user might select a business icon, then select from travel, sales, meals, administration, or purchasing icons for example, and then might enter in very specific information and/or a key word, or other code that might cause the downloading of a transaction's detail into the portable appliance 2600. This information might also be stored by the commercial establishment, and might also be communicated to the appropriate government and/or business organizations for validation of the reported transactions (the high level of security of auditing and communications and authentication and validation of VDE should be sufficiently trusted so as not to require the maintenance of a parallel audit history, but parallel maintenance may be supported, and maintained at least for a limited period of time so as to provide backup information in the event of loss or "failure" of portable appliance 2600 and/or one or more appliance 2600 associated VDE installations employed by appliance 2600 for historical and/or status information record maintenance). For example, of a retail terminal maintained necessary transaction information concerning a transaction involving appliance 2600, it could communicate such information to a clearinghouse for archiving (and/or other action) or it could periodically, for example, at the end of a business day, securely communicate such information, for example, in the form of a VDE content container object, to a clearinghouse or clearinghouse agent. Such transaction history (and any required VDE related status information such as available credit) can be maintained and if necessary, employed to reconstruct the information in a portable appliance 2600 so as to allow a replacement appliance to be provided to an appliance 2600 user or properly reset internal information in data wherein such replacement and/or resetting provides all necessary transaction and status information.

In a retail establishment, the auxiliary terminal host 2608 might take the form of a portable device presented to the user, for example at the end of a meal. The user might place his portable appliance 2600 into a smart card receptacle such as a PCMCIA slot, and then enter whatever additional information that might appropriately describe the transaction as well as satisfying whatever electronic appliance 600 identification procedure(s) required. The transaction, given the availability of sufficient credit, would be approved, and transaction related information would then be communicated back from the auxiliary terminal directly into the portable appliance 2600. This would be a highly convenient mode of credit usage and record management.

The portable device auxiliary terminal might be "on-line," that is electronically communicating back to a commercial establishment and/or third party information collection point through the use of cellular, satellite, radio frequency, or other communications means. The auxiliary terminal might, after a check by a commercial party in response to receipt of certain identification information at the collection point, communicate back to the auxiliary terminal whether or not to accept the portable appliance 2600 based on other information, such as a bad credit record or a stolen portable appliance 2600. Such a portable auxiliary terminal would also be very useful at other commercial establishments, for example at gasoline stations, rental car return areas, street and stadium vendors, bars, and other commercial establishments where efficiency would be optimized by allowing clerks and other personnel to consummate transactions at points other than traditional cash register locations.

As mentioned above, portable appliance 2600 may communicate from time to time with other electronic appliances 600 such as, for example, a VDE administrator. Communication during a portable appliance 2600 usage session may result from internally stored parameters dictating that the connection should take place during that current session (or next or other session) of use of the portable appliance. The portable appliance 600 can carry information concerning a real-time date or window of time or duration of time that will, when appropriate, require the communication to take place (e.g., perhaps before the transaction or other process which has been contemplated by the user for that session or during it or immediately following it). Such a communication can be accomplished quickly, and could be a secure, VDE two-way communication during which information is communicated to a central information handler. Certain other information may be communicated to the portable appliance 2600 and/or the computer or other electronic appliance to which the portable appliance 2600 has been connected. Such communicated other information can enable or prevent a contemplated process from proceeding, and/or make the portable appliance 2600, at least in part, unusable or useable. Information communicated to the portable appliance 2600 could include one or more modifications to permissions and methods, such as a resetting or increasing of one or more budgets, adding or withdrawing certain permissions, etc.

The permissions and/or methods (i.e., budgets) carried by the portable appliance 2600 may have been assigned to it in conjunction with an "encumbering" of another, stationary or other portable VDE electronic appliance 600. In one example, a portable appliance 2600 holder or other VDE electronic appliance 600 and/or VDE electronic appliance 600 user could act as "guarantor" of the financial aspects of a transaction performed by another party. The portable appliance 2600 of the holder would record an "encumbrance," which may be, during a secure communication with a clearinghouse, be recorded and maintained by the clearinghouse and/or some other financial services party until all or a portion of debt responsibilities of the other party were paid or otherwise satisfied. Alternatively or in addition, the encumbrance may also be maintained within the portable appliance 2600, representing the contingent obligation of the guarantor. The encumbrance may be, by some formula, included in a determination of the credit available to the guarantor. The credit transfer, acceptance, and/or record management, and related processes, may be securely maintained by the security features provided by aspects of the present invention. Portable appliance 600 may be the sole location for said permissions and/or methods for one or more VDE objects 300, or it may carry budgets for said objects that are independent of budgets for said objects that are found on another, non-portable VDE electronic appliance 600. This may allow budgets, for example, to be portable, without requiring "encumbering" and budget reconciliation.

Portable VDE electronic appliance 2600 may carry (as may other VDE electronic appliance 600*s* described) information describing credit history details, summary of authorizations, and usage history information (e.g., audit of some degree of transaction history or related summary information such as the use of a certain type/class of information) that allows re-use of certain VDE protected information at no cost or at a reduced cost. Such usage or cost of usage may be contingent, at least in part, on previous use of one or more objects or class of objects or amount of use, etc., of VDE protected information.

Portable appliance 2600 may also carry certain information which may be used, at least in part, for identification purposes. This information may be employed in a certain order (e.g. a pattern such as, for example, based on a pseudo-random algorithm) to verify the identity of the carrier of the portable appliance 2600. Such information may include, for example, one's own or a wife's and/or other relatives maiden names, social security number or numbers of one's own and/or others, birth dates, birth hospital(s), and other identifying information. It may also or alternatively provide or include one or more passwords or other information used to identify or otherwise verify/authenticate an individual's identity, such as voice print and retinal scan information. For example, a portable appliance 2600 can be used as a smart card that carries various permissions and/or method information for authorizations and budgets. This information can be stored securely within portable appliance 2600 in a secure database 610 arrangement. When a user attempts to purchase or license an electronic product or otherwise use the "smart card" to authorize a process, portable appliance 2600 may query the user for identification information or may initiate an identification process employing scanned or otherwise entered information (such as user fingerprint, retinal or voice analysis or other techniques that may, for example, employ mapping and/or matching of provided characteristics to information securely stored within the portable appliance 2600). The portable appliance 2600 may employ different queries at different times (and/or may present a plurality of queries or requests for scanning or otherwise entering identifying information) so as to prevent an individual who has come into possession of appropriate information for one or more of the "tests" of identity from being able to successfully employ the portable appliance 2600.

A portable appliance 600 could also have the ability to transfer electronic currency or credit to another portable appliance 2600 or to another individual's account, for example, using secure VDE communication of relevant content between secure VDE subsystems. Such transfer may be accomplished, for example, by telecommunication to, or presentation at, a bank which can transfer credit and/or currency to the other account. The transfer could also occur by using two cards at the same portable appliance 2600 docking station. For example, a credit transaction workstation could include dual PCMCIA slots and appropriate credit and/or currency transfer application software which allows securely debiting one portable appliance 2600 and "crediting" another portable appliance (i.e., debiting from one appliance can occur upon issuing a corresponding credit and/or currency to the other appliance). One portable appliance 600, for example, could provide an authenticated credit to another user. Employing two "smart card" portable appliance 600 would enable the user of the providing of "credit" "smart card" to go through a transaction process in which said user provides proper identification (for example, a password) and identifies a "public key" identifying another "smart card" portable appliance 2600. The other portable appliance 2600 could use acceptance processes, and provide proper identification for a digital signature (and the credit and/or currency sender may also digitally sign a transaction certificate so the sending act may not be repudiated and this certificate may accompany the credit and/or currency as VDE container content. The transactions may involve, for example, user interface interaction that stipulates interest and/or other terms of the transfer. It may employ templates for common transaction types where the provider of the credit is queried as to certain parameters describing the agreement between the parties. The receiving portable appliance 2600 may iteratively or as a whole be queried as to the acceptance of the terms. VDE negotiation techniques described elsewhere in this application may be employed in a smart card transfer of electronic credit and/or currency to another VDE smart card or other VDE installation.

Such VDE electronic appliance 600/portable appliance 2600 credit transfer features would significantly reduce the overhead cost of managing certain electronic credit and/or currency activities by significantly automating these processes through extending the computerization of credit control and credit availability that was begun with credit cards and extended with debit cards. The automation of credit extension and/or currency transfer and the associated distributed processing advantages described, including the absence of any requirement for centralized processing and telecommunications during each transaction, truly make credit and/or currency, for many consumers and other electronic currency and/or credit users, an efficient, trusted, and portable commodity.

The portable appliance 2600 or other VDE electronic appliance 600, can, in one embodiment, also automate many tax collection functions. A VDE electronic appliance 600 may, with great security, record financial transactions, identify the nature of the transaction, and identify the required sales or related government transaction taxes, debit the taxes from the users available credit, and securely communicate this information to one or more government agencies directly at some interval (for example monthly), and/or securely transfer this information to, for example, a financial clearinghouse, which would then transfer one or more secure, encrypted (or unsecure, calculated by clearinghouse, or otherwise computed) information audit packets (e.g., VDE content containers and employing secure VDE communication techniques) to the one or more appropriate, participating government agencies. The overall integrity and security of VDE 100 could ensure, in a coherent and centralized manner, that electronic reporting of tax related information (derived from one or more electronic commerce activities) would be valid and comprehensive. It could also act as a validating source of information on the transfer of sales tax collection (e.g., if, for example, said funds are transferred directly to the government by a commercial operation and/or transferred in a manner such that reported tax related information cannot be tampered with by other parties in a VDE pathway of tax information handling). A government agency could select transactions randomly, or some subset or all of the reported transactions for a given commercial operation can be selected. This could be used to ensure that the commercial operation is actually paying to the government all appropriate collected funds required for taxes, and can also ensure that end-users are charged appropriate taxes for their transactions (including receipt of interest from bank accounts, investments, gifts, etc.

Portable appliance 2600 financial and tax processes could involve template mechanisms described elsewhere herein. While such an electronic credit and/or currency management capability would be particularly interesting if managed at least in part, through the use of a portable appliance 2600, credit and/or currency transfer and similar features would also be applicable for non-portable VDE electronic appliance 600's connected to or installed within a computer or other electronic device.

User Notification Exception Interface ("Pop Up") 686

As described above, the User Modification Exception Interface 686 may be a set of user interface programs for handling common VDE functions. These applications may be forms of VDE templates and are designed based upon certain assumptions regarding important options, specifically, appropriate to a certain VDE user model and important messages that must be reported given certain events. A primary function of the "pop-up" user interface 686 is to provide a simple, consistent user interface to, for example, report metering events and exceptions (e.g., any condition for which automatic processing is either impossible or arguably undesirable) to the user, to enable the user to configure certain aspects of the operation of her electronic appliance 600 and, when appropriate, to allow the user to interactively control whether to proceed with certain transaction processes. If an object contains an exception handling method, that method will control how the "pop-up" user interface 686 handles specific classes of exceptions.

The "pop-user" interface 686 normally enables handling of tasks not dedicated to specific objects 300, such as for example:

- Logging onto an electronic appliance 600 and/or entering into a VDE related activity or class of activities,
- Configuring an electronic appliance 600 for a registered user, and/or generally for the installation, with regard to user preferences, and automatic handling of certain types of exceptions,
- Where appropriate, user selecting of meters for use with specific properties, and
- Providing an interface for communications with other electronic appliances 600, including requesting and/or for purchasing or leasing content from distributors, requesting clearinghouse credit and/or budgets from a clearinghouse, sending and/or receiving information to and/or from other electronic appliances, and so on.

FIG. 72A shows an example of a common "logon" VDE electronic appliance 600 function that may use user interface 686. "Log-on" can be done by entering a user name, account name, and/or password. As shown in the provided example, a configuration option provided by the "pop-up" user interface 686 dialog can be "Login at Setup", which, if selected, will initiate a VDE Login procedure automatically every time the user's electronic appliance 600 is turned on or reset. Similarly, the "pop-up" user interface 686 could provide an interface option called "Login at Type" which, if selected, will initiate a procedure automatically every time, for example, a certain type of object or specific content type application is opened such as a file in a certain directory, a computer application or file with a certain identifying extension, or the like.

FIG. 72B shows an example of a "pop-up" user interface 686 dialog that is activated when an action by the user has been "trapped," in this case to warn the user about the amount of expense that will be incurred by the user's action, as well as to alert the user about the object 300 which has been requested and what that particular object will cost to use. In this example, the interface dialog provides a button allowing the user to request further detailed information about the object, including full text descriptions, a list of associated files, and perhaps a history of past usage of the object including any residual rights to use the object or associated discounts.

Figure 72C:
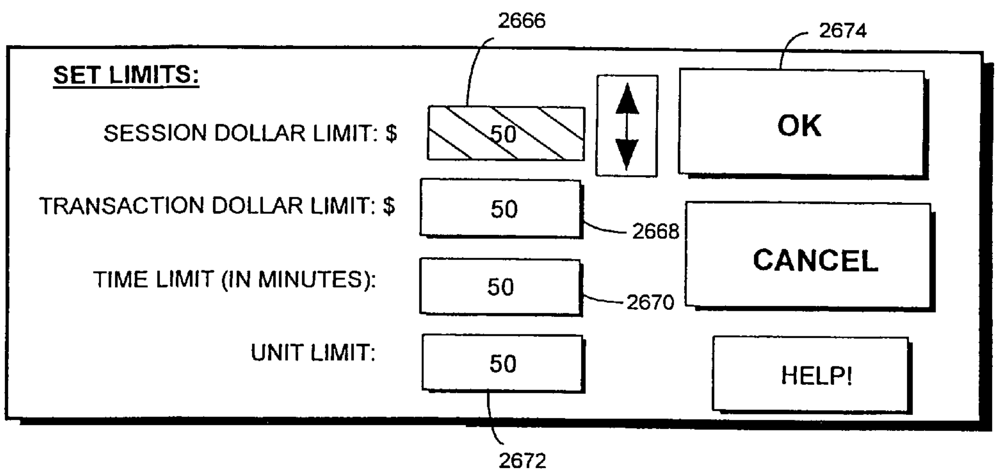

The "Cancel" button 2660 in FIG. 72B cancels the user's trapped request. "Cancel" is the default in this example for this dialog and can be activated, for example, by the return and enter keys on the user's keyboard 612, by a "mouse click" on that button, by voice command, or other command mechanisms. The "Approve button" 2662, which must be explicitly selected by a mouse click or other command procedure, allows the user to approve the expense and proceed. The "More options" control 2664 expands the dialog to another level of detail which provides further options, an example of which is shown in FIG. 72C.

FIG. 72C shows a secondary dialog that is presented to the user by the "pop-up" user interface 686 when the "More options" button 2664 in FIG. 72B is selected by the user. As shown, this dialog includes numerous buttons for obtaining further information and performing various tasks.

In this particular example, the user is permitted to set "limits" such as, for example, the session dollar limit amount (field 2666), a total transaction dollar limit amount (field 2668), a time limit (in minutes) (field 2670), and a "unit limit" (in number of units such as paragraphs, pages, etc.) (field 2672). Once the user has made her selections, she may "click on" the OKAY button (2674) to confirm the limit selections and cause them to take effect.

Thus, pop-up user interface dialogues can be provided to specify user preferences, such as setting limits on budgets and/or other aspects of object content usage during any one session or over a certain duration of time or until a certain point in time. Dialogs can also be provided for selecting object related usage options such as selecting meters and budgets to be used with one or more objects. Selection of options may be applied to types (that is classes) of objects by associating the instruction with one or more identifying parameters related to the desired one or more types. User specified configuration information can set default values to be used in various situations, and can be used to limit the number or type of occasions on which the user's use of an object is interrupted by a "pop-up" interface 686 dialog. For example, the user might specify that a user request for VDE protected content should be automatically processed without interruption (resulting from an exceptions action) if the requested processing of information will not cost more than $25.00 and if the total charge for the entire current session (and/or day and/or week, etc.) is not greater than $200.00 and if the total outstanding and unpaid charge for use hasn't exceeded $2500.00.

Pop-up user interface dialogs may also be used to notify the user about significant conditions and events. For example, interface 686 may be used to:

- remind the user to send audit information to a clearinghouse,
- inform a user that a budget value is low and needs replenishing,
- remind the user to back up secure database 610, and
- inform the user about expirations of PERCs or other dates/times events.

Figure 72D:
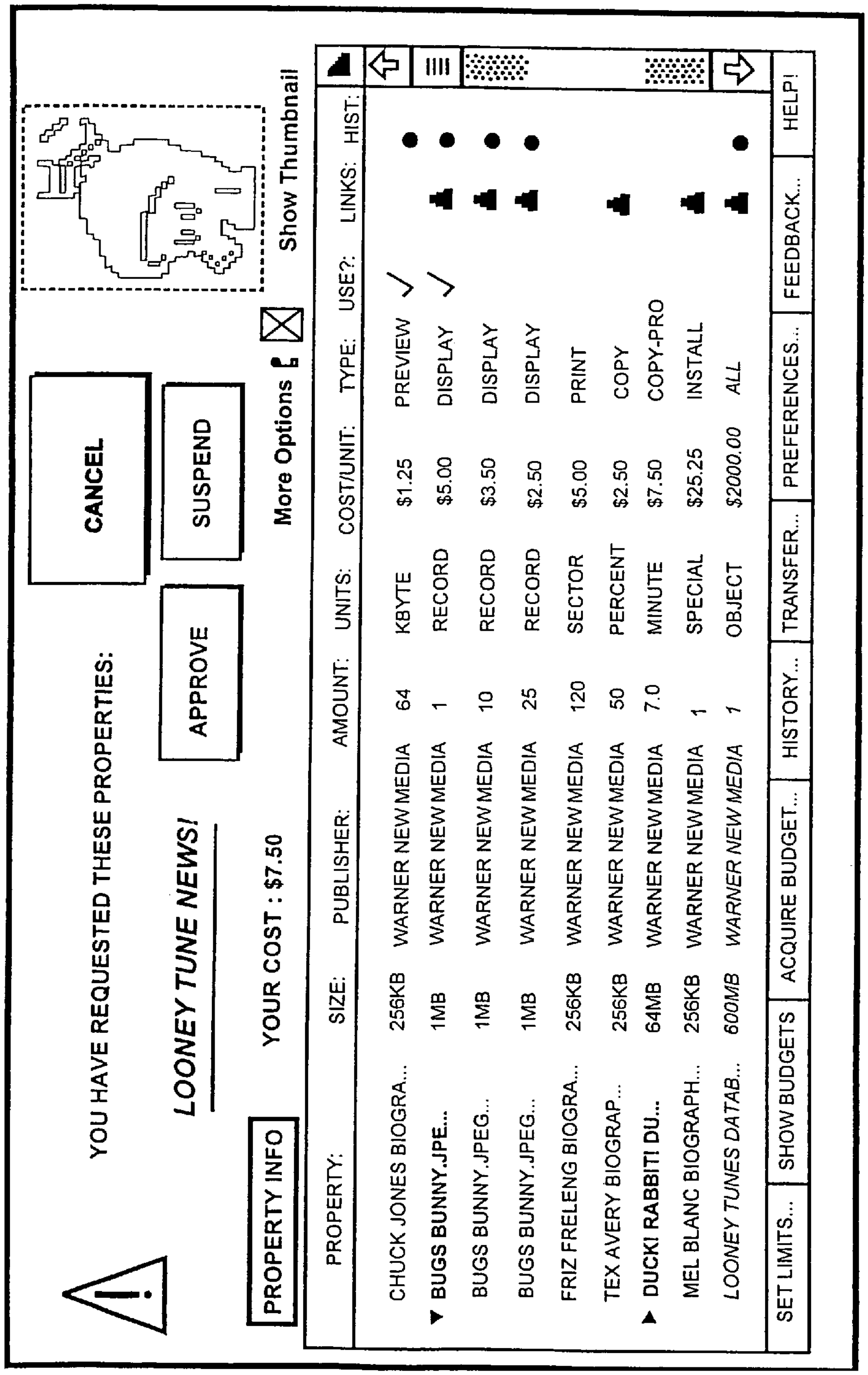

Other important "pop-up" user interface 686 functions include dialogs which enable flexible browsing through libraries of properties or objects available for licensing or purchase, either from locally stored VDE protected objects and/or from one or more various, remotely located content providers. Such function may be provided either while the user's computer is connected to a remote distributor's or clearinghouse's electronic appliance 600, or by activating an electronic connection to a remote source after a choice (such as a property, a resource location, or a class of objects or resources is selected). A browsing interface can allow this electronic connection to be made automatically upon a user selection of an item, or the connection itself can be explicitly activated by the user. See FIG. 72D for an example of such a "browsing" dialog.

Smart Objects

VDE 100 extends its control capabilities and features to "intelligent agents." Generally, an "intelligent agent" can act as an emissary to allow a process that dispatches it to achieve a result the originating process specifies. Intelligent agents that are capable of acting in the absence of their dispatch process are particularly useful to allow the dispatching process to access, through its agent, the resources of a remote electronic appliance. In such a scenario, the dispatch process may create an agent (e.g., a computer program and/or control information associated with a computer program) specifying a particular desired task(s), and dispatch the agent to the remote system. Upon reaching the remote system, the "agent" may perform its assigned task(s) using the remote system's resources. This allows the dispatch process to, in effect, extend its capabilities to remote systems where it is not present.

Using an "agent" in this manner increases flexibility. The dispatching process can specify, through its agent, a particular desired task(s) that may not exist or be available on the remote system. Using such an agent also provides added trustedness; the dispatch process may only need to "trust" its agent, not the entire remote system. Agents have additional advantages.

Software agents require a high level of control and accountability to be effective, safe and useful. Agents in the form of computer viruses have had devastating effects worldwide. Therefore, a system that allows an agent to access it should be able to control it or otherwise prevent the agent from damaging important resources. In addition, systems allowing themselves to be accessed by an agent should sufficiently trust the agent and/or provide mechanisms capable of holding the true dispatcher of the agent responsible for the agent's activities. Similarly, the dispatching process should be able to adequately limit and/or control the authority of the agents it dispatches or else it might become responsible for unforeseen activities by the agent (e.g., the agent might run up a huge bill in the course of following imprecise instructions it was given by the process that dispatched it).

These significant problems in using software agents have not be adequately addressed in the past. The open, flexible control structures provided by VDE 100 addresses these problems by providing the desired control and accountability for software agents (e.g., agent objects). For example, VDE 100 positively controls content access and usage, provides guarantee of payment for content used, and enforces budget limits for accessed content. These control capabilities are well suited to controlling the activities of a dispatched agent by both the process that dispatches the agent and the resource accessed by the dispatched agent.

One aspect of the preferred embodiment provided by the present invention provides a "smart object" containing an agent. Generally, a "smart object" may be a VDE object 300 that contains some type(s) of software programs ("agents") for use with VDE control information at a VDE electronic appliance 600. A basic "smart object" may comprise a VDE object 300 that, for example, contains (physically and/or virtually):

- a software agent, and
- at least one rule and/or control associated with the software agent that governs the agent's operation.

Figure 73:
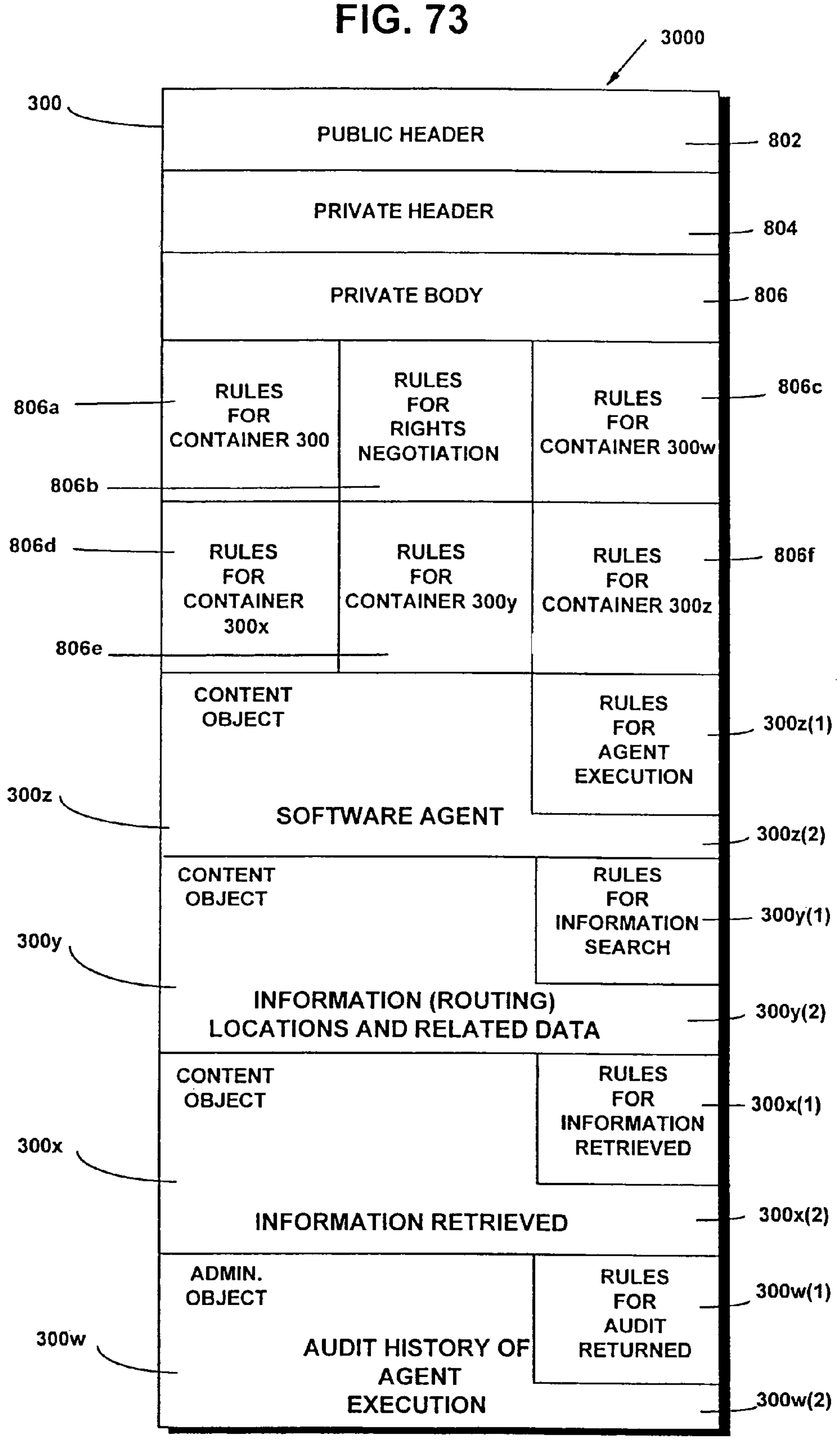
FIG. 73 shows an example of a "smart object"

Although this basic structure is sufficient to define a "smart object," FIG. 73 shows a combination of containers and control information that provides one example of a particularly advantageous smart object structure for securely managing and controlling the operation of software agents.

As shown in FIG. 73, a smart object 3000 may be constructed of a container 300, within which is embedded one or more further containers (300*z*, 300*y*, etc.). Container 300 may further contain rules and control information for accessing and using these embedded containers 300*z*, 300*y*, etc. Container 300*z* embedded in container 300 is what makes the object 3000 a "smart object." It contains an "agent" that is managed and controlled by VDE 100.

The rules and control information 806*f* associated with container 300*z* govern the circumstances under which the agent may be released and executed at a remote VDE site, including any limitations on execution based on the cost of execution for example. This rule and control information may be specified entirely in container 300*z*, and/or may be delivered as part of container 300, as part of another container (either within container 300 or a separately deliverable container), and/or may be already present at the remote VDE site.

The second container 300*y* is optional, and contains content that describes the locations at which the agent stored in container 300*z* may be executed. Container 300*y* may also contain rules and control information 806*e* that describe the manner in which the contents of container 300*y* may be used or altered. This rule and control information 806*e* and/or further rules 300*y*(1) also contained within container 300*y* may describe searching and routing mechanisms that may be used to direct the smart object 3000 to a desired remote information resource. Container 300*y* may contain and/or reference rules and control information 300*y*(1) that specify the manner in which searching and routing information use and any changes may be paid for.

Container 300*x* is an optional content container that is initially "empty" when the smart object 3000 is dispatched to a remote site. It contains rules and control information 300*x* (1) for storing the content that is retrieved by the execution of the agent contained in container 300*z*. Container 300*x* may also contain limits on the value of content that is stored in the retrieval container so as to limit the amount of content that is retrieved.

Other containers in the container 300 may include administrative objects that contain audit and billing trails that describe the actions of the agent in container 300*z* and any charges incurred for executing an agent at a remote VDE node. The exact structure of smart object 3000 is dependent upon the type of agent that is being controlled, the resources it will need for execution, and the types of information being retrieved.

Figure 74:
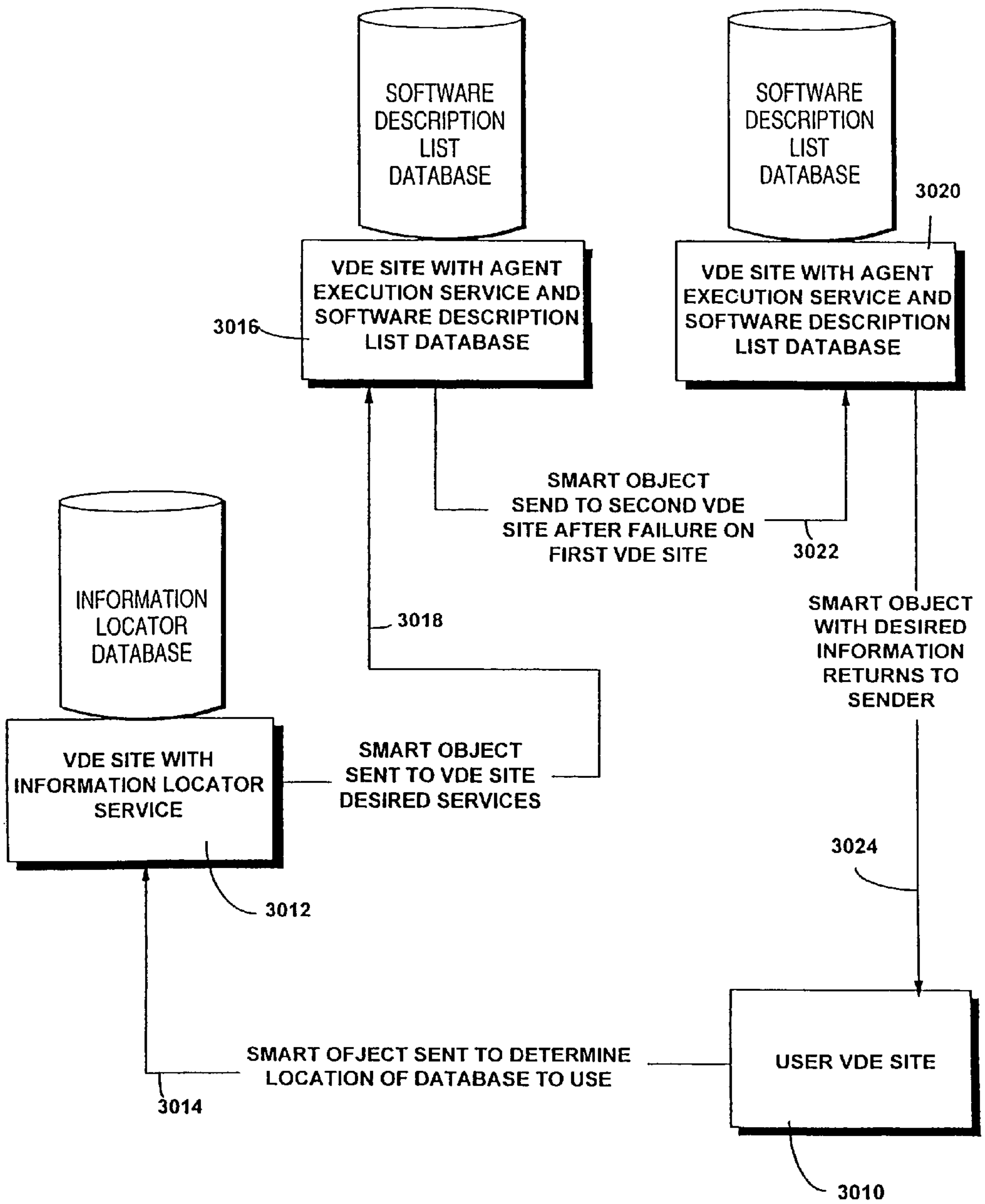
FIG. 74 shows an example of a process using "smart objects"

The smart object 3000 in the example shown in FIG. 73 may be used to control and manage the operation of an agent in VDE 100. The following detailed explanation of an example smart object transaction shown in FIG. 74 may provide a helpful, but non-limiting illustration. In this particular example, assume a user is going to create a smart object 3000 that performs a library search using the "Very Fast and Efficient" software agent to search for books written about some subject of interest (e.g., "fire flies"). The search engine is designed to return a list of books to the user. The search engine in this example may spend no more than $10.00 to find the appropriate books, may spend no more than $3.00 in library access or communications charges to get to the library, and may retrieve no more than $15.00 in information. All information relating to the search or use is to be returned to the user and the user will permit no information pertaining to the user or the agent to be released to a third party.

In this example, a dispatching VDE electronic appliance 3010 constructs a smart object 3000 like the one shown in FIG. 73. The rule set in 806*a* is specified as a control set that contains the following elements:

1. a smart_agent_execution event that specifies the smart agent is stored in embedded container 300*z* and has rules controlling its execution specified in that container;
2. a smart_agent_use event that specifies the smart agent will operate using information and parameters stored in container 300;
3. a routing_use event that specifies the information routing information is stored in container 300*y* and has rules controlling this information stored in that container;
4. an information_write event that specifies information written will be stored in container 300*y*, 300*x*, or 300*w* depending on its type (routing, retrieved, or administrative), and that these containers have independent rules that control how information is written into them.

The rule set in control set 806*b* contains rules that specify the rights desired by this smart object 3000. Specifically, this control set specifies that the software agent desires:

1. A right to use the "agent execution" service on the remote VDE site. Specific billing and charge information for this right is carried in container 300*z*.
2. A right to use the "software description list" service on the remote VDE site. Specific billing and charge information for this for this right is carried in container 300*y*.
3. A right to use an "information locator service" on a remote VDE site.
4. A right to have information returned to the user without charge (charges to be incurred on release of information and payment will be by a VISA budget)
5. A right to have all audit information returned such that it is readable only by the sender.

The rule set in control set 806*c* specifies that container 300*w* specifies the handling of all events related to its use. The rule set in control set 806*d* specifies that container 300*x* specifies the handling of all events related to its use. The rule set in control set 806*e* specifies that container 300*y* specifies the handling of all events related to its use. The rule set in control set 806*f* specifies that container 300*z* specifies the handling of all events related to its use.

Container 300*z* is specified as containing the "Very Fast and Efficient" agent content, which is associated with the following rules set:

1. A use event that specifies a meter and VISA budget that limits the execution to $10.00 charged against the owner's VISA card. Audits of usage are required and will be stored in object 300*w* under control information specified in that object.

After container 300*z* and its set are specified, they are constructed and embedded in the smart object container 300.

Container 300*y* is specified as a content object with two types of content. Content type A is routing information and is read/write in nature. Content type A is associated with a rules set that specifies:

1. A use event that specifies no operation for the release of the content. This has the effect of not charging for the use of the content.
2. A write event that specifies a meter and a VISA budget that limits the value of writing to $3.00. The billing method used by the write is left unspecified and will be specified by the control method that uses this rule.
3. Audits of usage are required and will be stored in object 300*w* under control information specified in that object.

Content type B is information that is used by the software agent to specify parameters for the agent. This content is specified as the string "fire fly" or "fire flies". Content type B is associated with the following rule set:

1. A use event that specifies that the use may only be by the software agent or a routing agent. The software agent has read only permission, the routing agent has read/write access to the information. There are no charges associated with using the information, but two meters; one by read and one by write are kept to track use of the information by various steps in the process.

2. Audits of usage are required and will be stored in object 300*w* under control information specified in that object.

After container 300*y* and its control sets are specified, they are constructed and embedded in the smart object container 300.

Container 300*x* is specified as a content object that is empty of content. It contains a control set that contains the following rules:

1. A write_without_billing event that specifies a meter and a general budget that limits the value of writing to $15.00.
2. Audits of usage are required and will be stored in object 300*w* under control information specified in that object.
3. An empty use control set that may be filled in by the owner of the information using predefined methods (method options).

After container 300*x* and its control sets are specified, they are constructed and embedded in the smart object container 300.

Container 300*w* is specified as an empty administrative object with a control set that contains the following rules:

1. A use event that specifies that the information contained in the administrative object may only be released to the creator of smart object container 300.
2. No other rules may be attached to the administrative content in container 300*w*.

After container 300*w* and its control sets are specified, they are constructed and embedded in the smart object container 300.

At this point, the smart object has been constructed and is ready to be dispatched to a remote VDE site. The smart object is sent to a remote VDE site (e.g., using electronic mail or another transport mechanism) that contains an information locator service 3012 via path 3014. The smart object is registered at the remote site 3012 for the "item locator service." The control set in container related to "item locator service" is selected and the rules contained within it activated at the remote site 3012. The remote site 3012 then reads the contents of container 300*y* under the control of rule set 806*f* and 300*y*(1), and permits writes of a list of location information into container 300*y* pursuant to these rules. The item locator service writes a list of three items into the smart object, and then "deregisters" the smart object (now containing the location information) and sends it to a site 3016 specified in the list written to the smart object via path 3018. In this example, the user may have specified electronic mail for transport and a list of remote sites that may have the desired information is stored as a forwarding list.

The smart object 3000, upon arriving at the second remote site 3016, is registered with that second site. The site 3016 provides agent execution and software description list services compatible with VDE as a service to smart objects. It publishes these services and specifies that it requires $10.00 to start the agent and $20/piece for all information returned. The registration process compares the published service information against the rules stored within the object and determines that an acceptable overlap does not exist. Audit information for all these activities is written to the administrative object 300*w*. The registration process then fails (the object is not registered), and the smart object is forwarded by site 3016 to the next VDE site 3020 in the list via path 3022.

The smart object 3000, upon arriving at the third remote site 3020, is registered with that site. The site 3020 provides agent execution and software description list services compatible with VDE as a service to smart objects. It publishes these services and specifies that it requires $1.00 to start the agent and $0.50/piece for all information returned. The registration process compares the published service information against the rules stored within the object and determines that an acceptable overlap exists. The registration process creates a URT that specifies the agreed upon control information. This URT is used in conjunction with the other control information to execute the software agent under VDE control.

The agent software starts and reads its parameters out of container 300*y*. It then starts searching the database and obtains 253 "hits" in the database. The list of hits is written to container 300*x* along with a completed control set that specifies the granularity of each item and that each item costs $0.50. Upon completion of the search, the budget for use of the service is incremented by $1.00 to reflect the use charge for the service. Audit information for all these activities is written to the administrative object 300*w*.

The remote site 3020 returns the now "full" smart object 3000 back to the original sender (the user) at their VDE node 3010 via path 3024. Upon arrival, the smart object 3000 is registered and the database records are available. The control information specified in container 300*x* is now a mix of the original control information and the control information specified by the service regarding remote release of their information. The user then extracts 20 records from the smart object 3000 and has $10.00 charged to her VISA budget at the time of extraction.

In the above smart agent VDE examples, a certain organization of smart object 3000 and its constituent containers is described. Other organizations of VDE and smart object related control information and parameter data may be created and may be used for the same purposes as those ascribed to object 3000 in the above example.

Negotiation and Electronic Contracts

An electronic contract is an electronic form of an agreement including rights, restrictions, and obligations of the parties to the agreement. In many cases, electronic agreements may surround the use of digitally provided content; for example, a license to view a digitally distributed movie. It is not required, however, that an electronic agreement be conditioned on the presence or use of electronic content by one or more parties to the agreement. In its simplest form, an electronic agreement contains a right and a control that governs how that right is used.

Electronic agreements, like traditional agreements, may be negotiated between their parties (terms and conditions submitted by one or more parties may simply be accepted (cohesion contract) by one or more other parties and/or such other parties may have the right to select certain of such terms and conditions (while others may be required)). Negotiation is defined in the dictionary as "the act of bringing together by mutual agreement." The preferred embodiment provides electronic negotiation processes by which one or more rights and associated controls can be established through electronic automated negotiation of terms. Negotiations normally require a precise specification of rights and controls associated with those rights. PERC and URT structures provide a mechanism that may be used to provide precise electronic representations of rights and the controls associated with those rights. VDE thus provides a "vocabulary" and mechanism by which users and creators may specify their desires. Automated processes may interpret these desires and negotiate to reach a common middle ground based on these desires.

The results of said negotiation may be concisely described in a structure that may be used to control and enforce the results of the electronic agreement. VDE further enables this process by providing a secure execution space in which the negotiation process(es) are assured of integrity and confidentiality in their operation. The negotiation process(es) may also be executed in such a manner that inhibits external tampering with the negotiation.

A final desirable feature of agreements in general (and electronic representations of agreements in particular) is that they be accurately recorded in a non-repudiatable form. In traditional terms, this involves creating a paper document (a contract) that describes the rights, restrictions, and obligations of all parties involved. This document is read and then signed by all parties as being an accurate representation of the agreement. Electronic agreements, by their nature, may not be initially rendered in paper. VDE enables such agreements to be accurately electronically described and then electronically signed to prevent repudiation. In addition, the preferred embodiment provides a mechanism by which human-readable descriptions of terms of the electronic contract can be provided.

VDE provides a concise mechanism for specifying control sets that are VDE site interpretable. Machine interpretable mechanisms are often not human readable. VDE often operates the negotiation process on behalf of at least one human user. It is thus desirable that the negotiation be expressible in "human readable form." VDE data structures for objects, methods, and load modules all have provisions to specify one or more DTDs within their structures. These DTDs may be stored as part of the item or they may be stored independently. The DTD describes one or more data elements (MDE, UDE, or other related data elements) that may contain a natural language description of the function of that item. These natural language descriptions provide a language independent, human readable description for each item. Collections of items (for example, a BUDGET method) can be associated with natural language text that describes its function and forms a term of an electronically specified and enforceable contract. Collections of terms (a control set) define a contract associated with a specific right. VDE thus permits the electronic specification, negotiation, and enforcement of electronic contracts that humans can understand and adhere to.

VDE 100 enables the negotiation and enforcement of electronic contracts in several ways:

- it enables a concise specification of rights and control information that permit a common vocabulary and procedure for negotiation,
- it provides a secure processing environment within which to negotiate,
- it provides a distributed environment within which rights and control specifications may be securely distributed,
- it provides a secure processing environment in which negotiated contracts may be electronically rendered and signed by the processes that negotiate them, and
- it provides a mechanism that securely enforces a negotiated electronic contract.

Types of Negotiations

A simple form of a negotiation is a demand by one party to form an "adhesion" contract. There are few, if any, options that may be chosen by the other party in the negotiation. The recipient of the demand has a simple option; she may accept or reject the terms and conditions (control information) in the demand. If she accepts the conditions, she is granted rights subject to the specified control information. If she rejects the conditions, she is not granted the rights. PERC and URT structures may support negotiation by demand; a PERC or control set from a PERC may be presented as a demand, and the recipient may accept or reject the demand (selecting any permitted method options if they are presented).

A common example of this type of negotiation today is the purchase of software under the terms of a "shrink-wrap license." Many widely publicized electronic distribution schemes use this type of negotiation. CompuServe is an example of an on-line service that operates in the same manner. The choice is simple: either pay the specified charge or don't use the service or software. VDE supports this type of negotiation with its capability to provide PERCs and URTs that describe rights and control information, and by permitting a content owner to provide a REGISTER method that allows a user to select from a set of predefined method options. In this scenario, the REGISTER method may contain a component that is a simplified negotiation process.

A more complex form of a negotiation is analogous to "haggling." In this scenario, most of the terms and conditions are fixed, but one or more terms (e.g., price or payment terms) are not. For these terms, there are options, limits, and elements that may be negotiated over. A VDE electronic negotiation between two parties may be used to resolve the desired, permitted, and optional terms. The result of the electronic negotiation may be a finalized set of rules and control information that specify a completed electronic contract. A simple example is the scenario for purchasing software described above adding the ability of the purchaser to select a method of payment (VISA, Mastercard, or American Express). A more complex example is a scenario for purchasing information in which the price paid depends on the amount of information about the user that is returned along with a usage audit trail. In this second example, the right to use the content may be associated with two control sets. One control set may describe a fixed ("higher") price for using the content. Another control set may describe a fixed ("lower") price for using the content with additional control information and field specifications requiring collection and return the user's personal information. In both of these cases, the optional and permitted fields and control sets in a PERC may describe the options that may be selected as part of the negotiation. To perform the negotiation, one party may propose a control set containing specific fields, control information, and limits as specified by a PERC; the other party may pick and accept from the control sets proposed, reject them, or propose alternate control sets that might be used. The negotiation process may use the permitted, required, and optional designations in the PERC to determine an acceptable range of parameters for the final rule set. Once an agreement is reached, the negotiation process may create a new PERC and/or URT that describes the result of the negotiation. The resulting PERCs and/or URTs may be "signed" (e.g., using digital signatures) by all of the negotiation processes involved in the negotiation to prevent repudiation of the agreement at a later date.

Additional examples of negotiated elements are: electronic cash, purchase orders, purchase certificates (gift certificates, coupons), bidding and specifications, budget "rollbacks" and reconciliation, currency exchange rates, stock purchasing, and billing rates.

A set of PERCs that might be used to support the second example described above is presented in FIGS. 75A (PERC sent by the content owner), 75B (PERC created by user to represent their selections and rights), and 75C (PERC for controlling the negotiation process). These PERCs might be used in conjunction with any of the negotiation process(es) and protocols described later in this section.

Figure 75A:
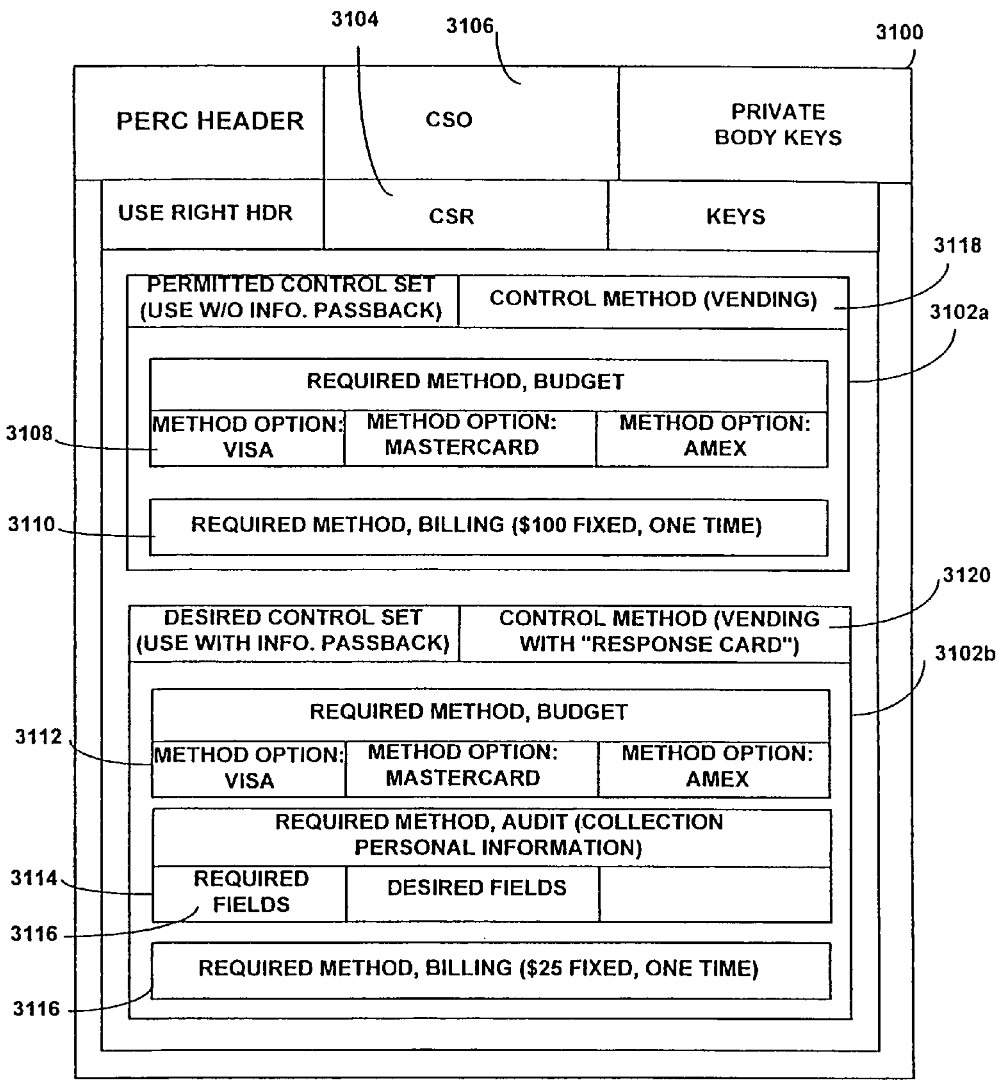
FIGS. 75A-75D show examples of data structures used for electronic negotiation.

FIG. 75A shows an example of a PERC 3100 that might be created by a content provider to describe their rights options. In this example, the PERC contains information regarding a single USE right. Two alternate control sets 3102*a*, 3102*b* are presented for this right in the example. Control set 3102*a* permits the use of the content without passing back information about the user, and another control set 3102*b* permits the use of the content and collects "response card" type information from the user. Both control sets 3102*a*, 3102*b* may use a common set of methods for most of the control information. This common control information is represented by a CSR 3104 and CSO 3106.

Control set 3102*a* in this PERC 3100 describes a mechanism by which the user may obtain the content without providing any information about its user to the content provider. This control set 3102*a* specifies a well-known vending control method and set of required methods and method options. Specifically, in this example, control set 3102*a* defines a BUDGET method 3108 (e.g., one of VISA, Mastercard, or American Express) and it defines a BILLING method 3110 that specifies a charge (e.g., a one-time charge of $100.00).

Control set 3102*b* in this PERC 3100 describes another mechanism by which the user may obtain the content. In this example, the control set 3102*b* specifies a different vending control method and a set of required methods and method options. This second control set 3102*b* specifies a BUDGET method 3112 (e.g., one of VISA, Mastercard, or American Express), a BILLING method 3116 that specifies a charge (e.g., a lesser one-time charge such as $25.00) and an AUDIT method 3114 that specifies a set of desired and required fields. The required and desired field specification 3116 may take the form of a DTD specification, in which, for example, the field names are listed.

The content creator may "prefer" one of the two control sets (e.g., control set 2) over the other one. If so, the "preferred" control set may be "offered" first in the negotiation process, and withdrawn in favor of the "non-preferred" control set if the other party to the negotiation "rejects" the "preferred" control set.

In this example, these two control sets 3102*a*, 3102*b* may share a common BUDGET method specification. The BUDGET method specification may be included in the CSR 3104 or CSO 3106 control sets if desired. Selecting control set 3102*a* (use with no information passback) causes a unique component assembly to be assembled as specified by the PERC 3100. Specifically, in this example it selects the "Vending" CONTROL method 3118, the BILLING method 3110 for a $100 fixed charge, and the rest of the control information specified by CSR 3104 and CSO 3106. It also requires the user to specify her choice of acceptable BUDGET method (e.g., from the list including VISA, Mastercard, and American Express). Selecting control set 3102*b* assembles a different component assembly using the "Vending with 'response card'" CONTROL method 3120, the BILLING method 3116 (e.g., for a $25 fixed charge), an AUDIT method 3114 that requires the fields listed in the Required Fields DTD 3116. The process may also select as many of the fields listed in the Desired Fields DTD 3116 as are made available to it. The rest of the control information is specified by CSR 3104 and CSO 3106. The selection of control set 3102*b* also forces the user to specify their choice of acceptable BUDGET methods (e.g., from the list including VISA, Mastercard, and American Express).

Figure 75B:
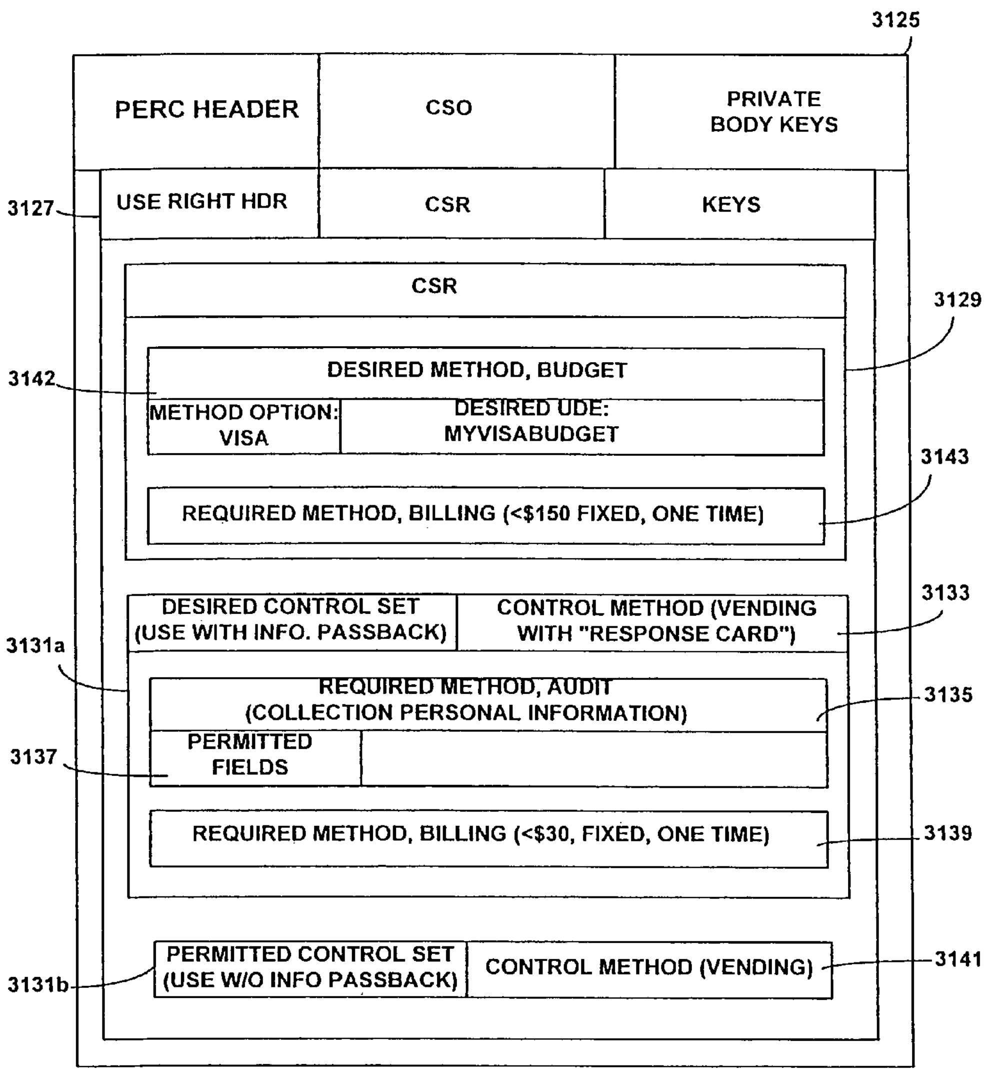

FIG. 75B shows an example of a control set 3125 that might be used by a user to specify her desires and requirements in a negotiation process. This control set has a USE rights section 3127 that contains an aggregated CSR budget specification 3129 and two optional control sets 3131*a*, 3131*b* for use of the content. Control set 3131*a* requires the use of a specific CONTROL method 3133 and AUDIT method 3135. The specified AUDIT method 3135 is parameterized with a list of fields 3137 that may be released in the audit trail. Control set 3131*a* also specifies a BILLING method 3139 that can cost no more than a certain amount (e.g., $30.00). Control set 3131*b* in this example describes a specific CONTROL method 3141 and may reference a BILLING method 3143 that can cost no more than a certain amount (e.g., $150.00) if this option is selected.

Figure 75C:
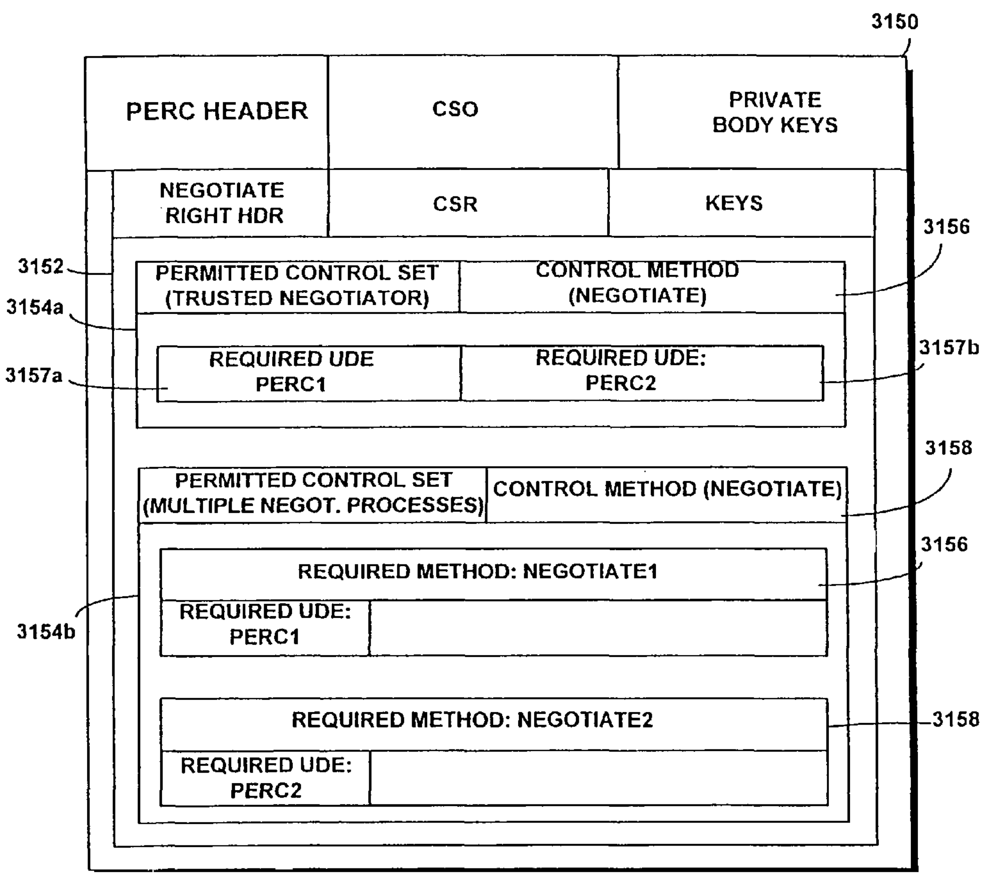
Figure 75D:
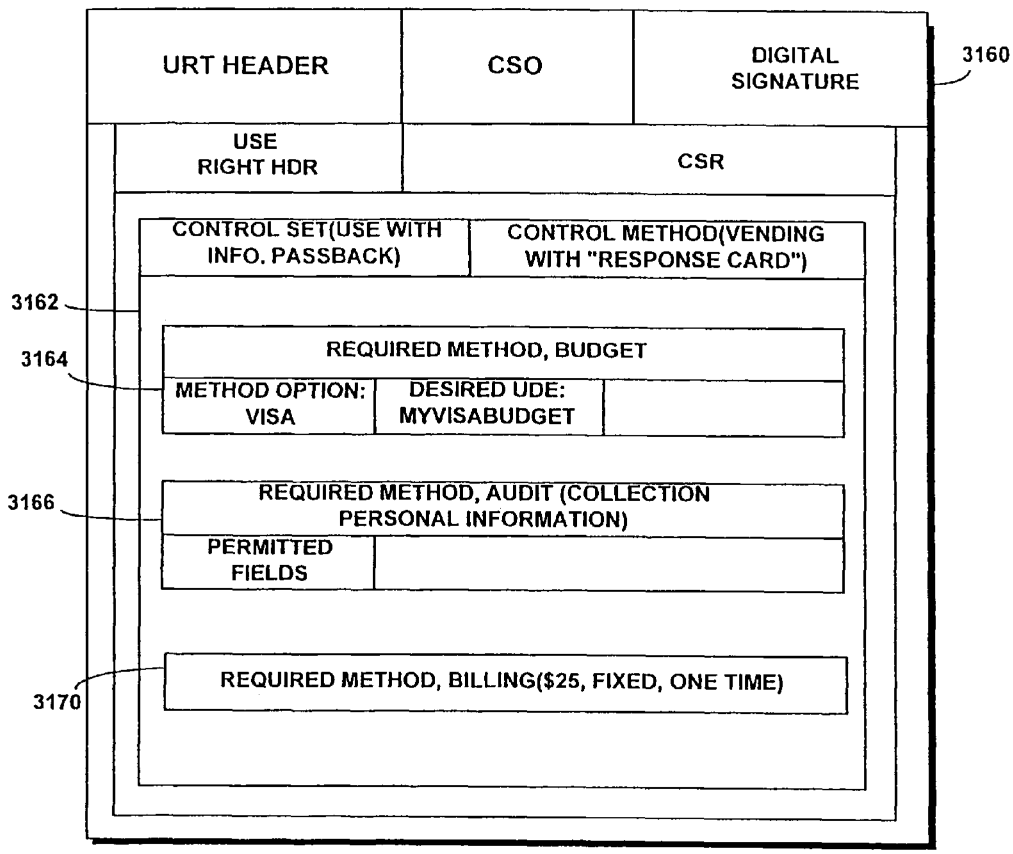
Figure 75E:
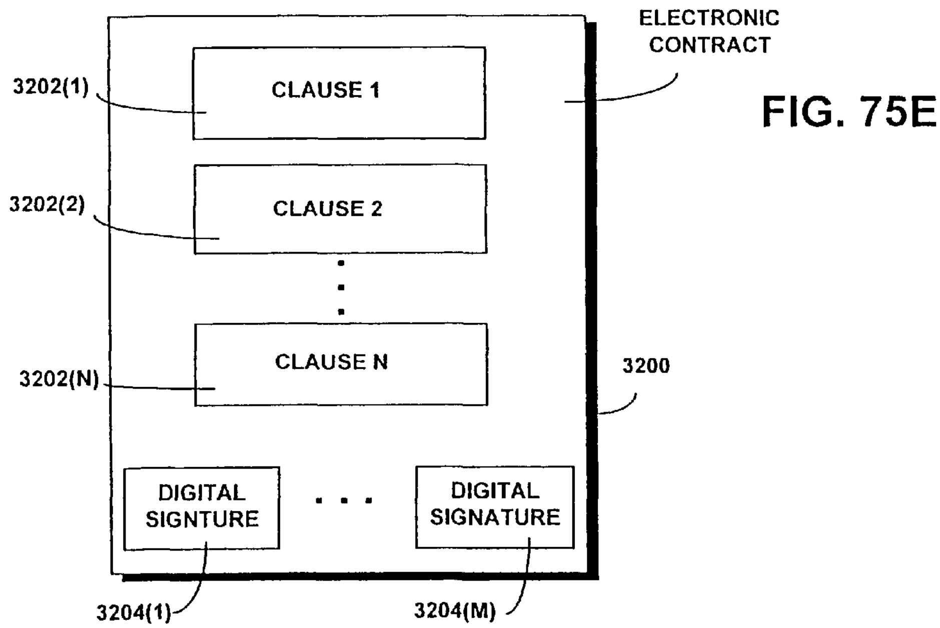
FIGS. 75E-75F show example structures relating to an electronic agreement.
Figure 75F:
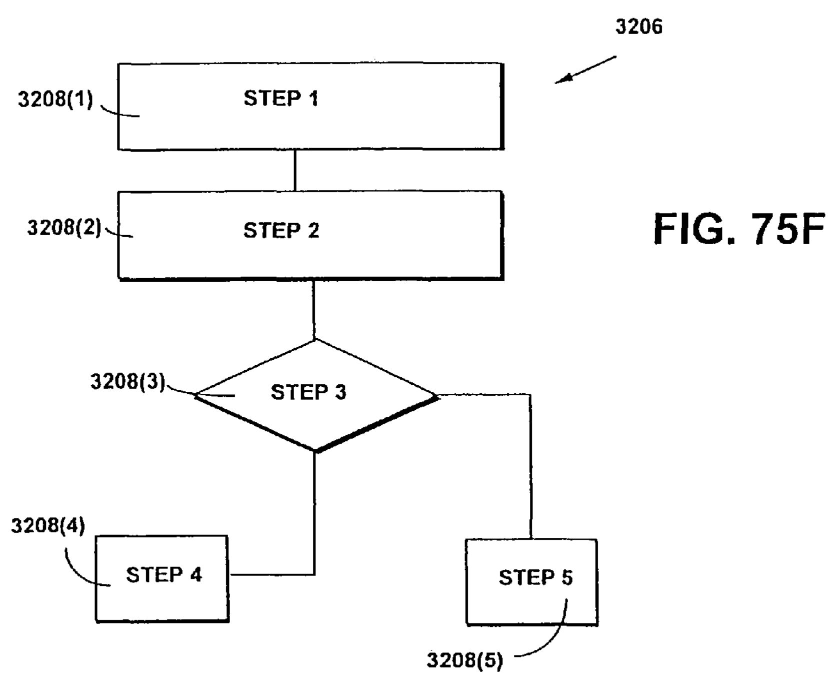

FIG. 75E shows a more high-level view of an electronic contract 3200 formed as a "result" of a negotiation process as described above. Electronic contract 3200 may include multiple clauses 3202 and multiple digital signatures 3204. Each clause 3202 may comprise a PERC/URT such as item 3160 described above and shown in FIG. 75D. Each "clause" 3202 of electronic contract 3200 thus corresponds to a component assembly 690 that may be assembled and executed by a VDE electronic appliance 600. Just as in normal contracts, there may be as many contract clauses 3202 within electronic contract 3200 as is necessary to embody the "agreement" between the "parties." Each of clauses 3202 may have been electronically negotiated and may thus embody a part of the "agreement" (e.g., a "compromise") between the parties. Electronic contract 3200 is "self-executing" in the sense that it may be literally executed by a machine, i.e., a VDE electronic appliance 600 that assembles component assemblies 690 as specified by various electronic clauses 3202. Electronic contract 3200 may be automatically "enforced" using the same VDE mechanisms discussed above that are used in conjunction with any component assembly 690. For example, assuming that a clause 3202(2) corresponds to a payment or BILLING condition or term, its corresponding component assembly 690 when assembled by a user's VDE electronic appliance 600 may automatically determine whether conditions are right for payment and, when they are, automatically access an appropriate payment mechanism (e.g., a virtual "credit card" object for the user) to arrange that payment to be made. As another example, assuming that electronic contract clause N 3202(N) corresponds to a user's obligation to provide auditing information to a particular VDE participant, electronic contract 3200 will cause VDE electronic appliance 600 to assemble a corresponding component assembly 690 that may, for example, access the appropriate audit trails within secure database 610 and provide them in an administrative object to the correct participant. FIG. 75F shows that clause 3202(N) may, for example, specify a component assembly 690 that arranges for multiple steps in a transaction 3206 to occur. Some of these steps (e.g., step 3208(4), 3208(5)) may be conditional on a test (e.g., 3208(3)) such as, for example, whether content usage has exceeded a certain amount, whether a certain time period has expired, whether a certain calendar date has been reached, etc.

Digital signatures 3204 shown in the FIG. 75E electronic contract 3200 may comprise, for example, conventional digital signatures using public key techniques as described above. Some electronic contracts 3200 may not bear any digital signatures 3204. However, it may be desirable to require the electronic appliance 600 of the user who is a party to the electronic contract 3200 to digitally "sign" the electronic contract so that the user cannot later repudiate the contract, for evidentiary purposes, etc. Multiple parties to the same contract may each digitally "sign" the same electronic contract 3200 similarly to the way multiple parties to a contract memorialized in a written instrument use an ink pen to sign the instrument.

Although each of the clauses 3202 of electronic contract 3200 may ultimately correspond to a collection of data and code that may be executed by a PPE 650, there may in some instances be a need for rendering a human readable version of the electronic contract. This need can be accommodated by, as mentioned above, providing text within one or more DTDs associated with the component assembly or assemblies 690 used to "self-execute" the contract. Such text might, for example, describe from a functional point of view what the corresponding electronic contract clause 3202 means or involves, and/or might describe in legally enforceable terms what the legal obligation under the contract is or represents. "Templates" (described elsewhere herein) might be used to supply such text from a text library. An expert system and/or artificial intelligence capability might be used to impose syntax rules that bind different textual elements together into a coherent, humanly readable contract document. Such text could, if necessary, be reviewed and modified by a "human" attorney in order customize it for the particular agreement between the parties and/or to add further legal obligations augmenting the "self-executing" electronic obligations embodied within and enforced by the associated component assemblies 690 executing on a VDE electronic appliance 600. Such text could be displayed automatically or on demand upon execution of the electronic contract, or it could be used to generate a printed humanly-readable version of the contract at any time. Such a document version of the electronic contract 3200 would not need to be signed in ink by the parties to the agreement (unless desired) in view of the fact that the digital signatures 3204 would provide a sufficiently secure and trusted evidentiary basis for proving the parties' mutual assent to all the terms and conditions within the contract.

In the preferred embodiment, the negotiation process executes within a PPE 650 under the direction of a further PERC that specifies the process. FIG. 75C shows an example of a PERC 3150 that specifies a negotiation process. The PERC 3150 contains a single right 3152 for negotiation, with two permitted control sets 3154*a*, 3154*b* described for that right. The first control set 3154*a* may be used for a "trusted negotiation"; it references the desired negotiation CONTROL method ("Negotiate") 3156 and references (in fields 3157*a*, 3157*b*) two UDEs that this CONTROL method will use. These UDEs may be, for example, the PERCs 3100, 3125 shown in FIGS. 75A and 75B. The second control set 3154*b* may be used by "multiple negotiation" processes to manage the negotiation, and may provide two negotiation methods: "Negotiate1," and "Negotiate2". Both negotiation processes may be described as required methods ("Negotiate1" and "Negotiate2") 3156, 3158 that take respective PERCs 3100, 3125 as their inputs. The CONTROL method 3158 for this control set in this example may specify the name of a service that the two negotiation processes will use to communicate with each other, and may also manage the creation of the URT resulting from the negotiation.

When executed, the negotiation process(es) specified by the PERC 3150 shown in FIG. 75C may be provided with the PERCs 3100, 3125 as input that will be used as the basis for negotiation. In this example, the choice of negotiation process type (trusted or multiple) may be made by the executing VDE node. The PERC 3150 shown in FIG. 75C might be, for example, created by a REGISTER method in response to a register request from a user. The process specified by this PERC 3150 may then be used by a REGISTER method to initiate negotiation of the terms of an electronic contract.

During this example negotiation process, the PERCs 3100, 3125 shown in FIGS. 75A and 75B act as input data structures that are compared by a component assembly created based on PERC 3150 shown in FIG. 35C. The component assembly specified by the control sets may be assembled and compared, starting with required "terms," and progressing to preferred/desired "terms" and then moving on to permitted "terms," as the negotiation continues. Method option selections are made using the desired method and method options specified in the PERCs 3100, 3125. In this example, a control set for the PERC 3100 shown in FIG. 75A may be compared against the PERC 3125 shown in FIG. 75B. If there is a "match," the negotiation is successfully concluded and "results" are generated.

In this embodiment, the results of such negotiation will generally be written as a URT and "signed" by the negotiation process(es) to indicate that an agreement has been reached. These electronic signatures provide the means to show that a (virtual) "meeting of minds" was reached (one of the traditional legal preconditions for a contract to exist). An example of the URT 3160 that would have been created by the above example is shown in FIG. 75D.

This URT 3160 (which may itself be a PERC 808) includes a control set 3162 that reflects the "terms" that were "agreed upon" in the negotiation. In this example, the "agreed upon" terms must "match" terms required by input PERCs 3100, 3125 in the sense that they must be "as favorable as" the terms required by those PERCs. The negotiation result shown includes, for example, a "negotiated" control set 3162 that in some sense corresponds to the control set 3102*a* of the FIG. 75A PERC 3100 and to the control set 3131*a* of the FIG. 75B control set 3125. Resulting "negotiated" control set 3162 thus includes a required BUDGET method 3164 that corresponds to the control set 3125 desired BUDGET method 3142 but which is "within" the range of control sets allowed by control set 3100 required BUDGET method 3112. Similarly, resulting negotiated control set 3162 includes a required AUDIT method 3166 that complies with the requirements of both PERC 3100 required AUDIT method 3114 and PERC 3125 required AUDIT method 3135. Similarly, resulting negotiated control set 3162 includes a required BILLING method 3170 that "matches" or complies with each of PERC 3100 required BILLING method 3116 and PERC 3125 required BILLING method 3170.

Another class of negotiation is one under which no rules are fixed and only the desired goals are specified. The negotiation processes for this type of negotiation may be very complex. It may utilize artificial intelligence, fuzzy logic, and/or related algorithms to reach their goals. VDE supports these types of processes by providing a mechanism for concisely specifying rights, control information, fields and goals (in the form of desired rights, control information, and fields). Goals for these types of processes might be specified as one more control sets that contain specific elements that are tagged as optional, permitted, or desired.

Types of Negotiations

Negotiations in the preferred embodiment may be structured in any of the following ways:

1 shared knowledge 2 trusted negotiator

3 "zero-based" knowledge

Figure 76A:
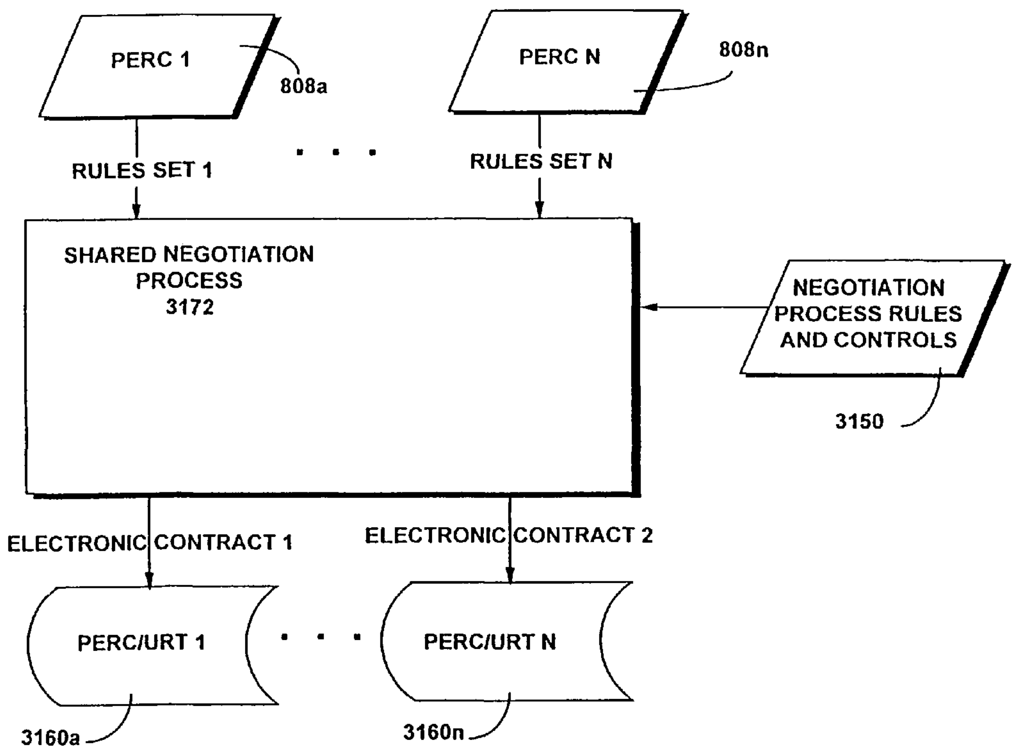
FIGS. 76A-76B show examples of electronic negotiation processes.
Figure 76B:
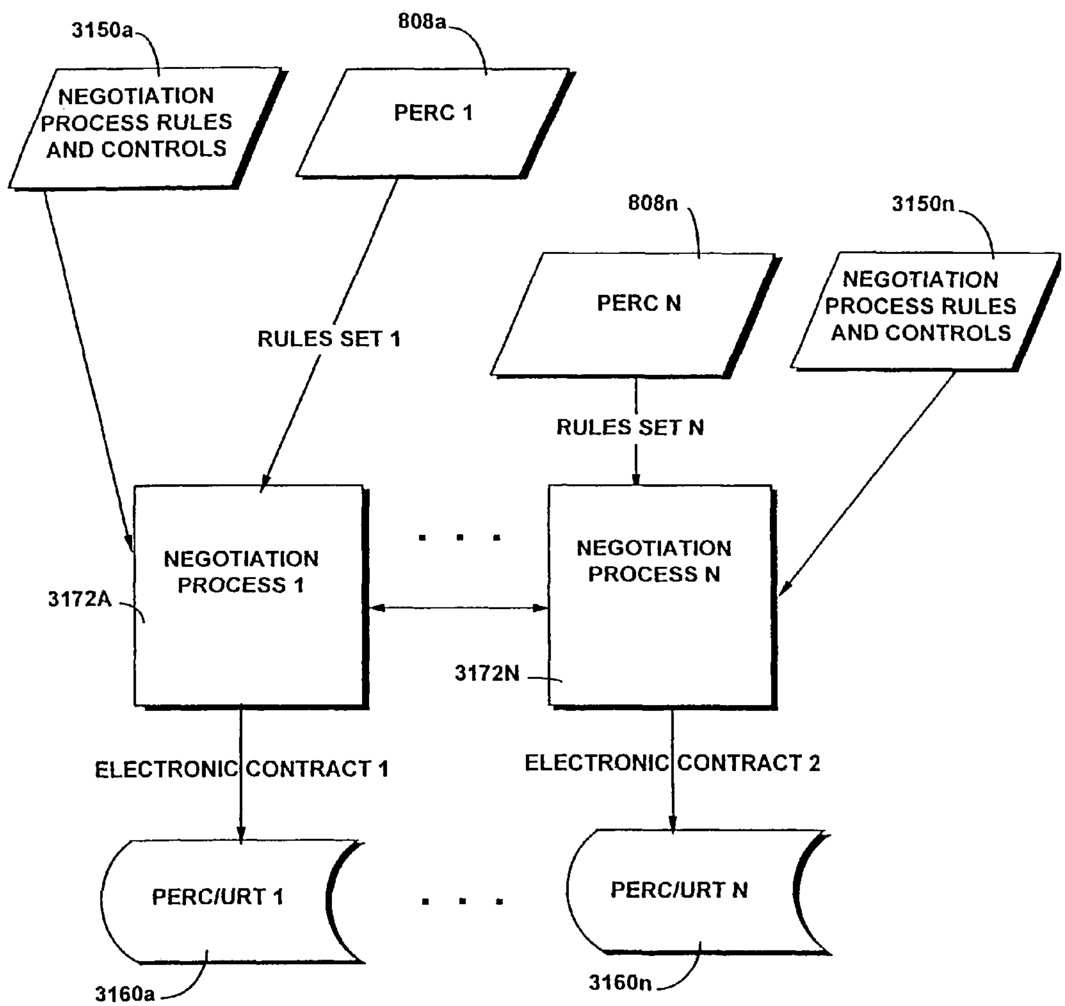

"Shared knowledge" negotiations are based on all parties knowing all of the rules and constraints associated with the negotiation. Demand negotiations are a simple case of shared knowledge negotiations; the demander presents a list of demands that must be accepted or rejected together. The list of demands comprises a complete set of knowledge required to accept or reject each item on the list. VDE enables this class of negotiation to occur electronically by providing a mechanism by which demands may be encoded, securely passed, and securely processed between and with secure VDE subsystems using VDE secure processing, and communication capabilities. Other types of shared knowledge negotiations employed by VDE involve the exchange of information between two or more negotiating parties; the negotiation process(es) can independently determine desired final outcome(s) based on their independent priorities. The processes can then negotiate over any differences. Shared knowledge negotiations may require a single negotiation process (as in a demand type negotiation) or may involve two or more cooperative processes. FIGS. 76A and 76B illustrate scenarios in which one and two negotiation processes are used in a shared knowledge negotiation.

FIG. 76A shows a single negotiation process 3172 that takes any number of PERCs 808 (e.g., supplied by different parties) as inputs to the negotiation. The negotiation process 3172 executes at a VDE node under supervision of "Negotiation Process Rules and Control information" that may be supplied by a further PERC (e.g., PERC 3150 shown in FIG. 75C). The process 3172 generates one or more PERCs/URTs 3160 as results of the negotiation.

FIG. 76B shows multiple negotiation processes 3172A-3172N each of which takes as input a PERC 808 from a party and a further PERC 3150 that controls the negotiation process, and each of which generates a negotiated "result" PERC/URT 3160 as output. Processes 3172A-3172N may execute at the same or different VDE nodes and may communicate using a "negotiation protocol."

Single and multiple negotiation processes may be used for specific VDE sites. The negotiation processes are named, and can be accessed using well known method names. PERCs and URTs may be transported in administrative or smart objects to remote VDE sites for processing at that site, as may the control PERCs and REGISTER method that controls the negotiation.

Multiple negotiation processes require the ability to communicate between these processes 3172; including secure communication between secure processes that are present at physically separate VDE sites (secure subsystems). VDE generalizes the inter-process communication into a securely provided service that can be used if the configuration requires it. The inter-process communication uses a negotiation protocol to exchange information about rule sets between processes 3172. An example of a negotiation protocol includes the following negotiation "primitives":

| | |
|---|---|
| WANT | Want a set of terms and conditions |
| ACCEPT | Accept a set of terms and conditions |
| REJECT | Reject a set of terms and conditions |
| OFFER | Offer a set of terms and conditions in exchange for other terms and conditions |
| HAVE | Assert a set of terms and conditions are possible or desirable |
| QUIT | Assert the end of the negotiation without reaching an agreement |
| AGREEMENT | Conclude the negotiation and pass the rule set for signature |

The WANT primitive takes rights and control set (or parts of control sets) information, and asserts to the other process(es) 3172 that the specified terms are desired or required. Demand negotiations are a simple case of a WANT primitive being used to assert the demand. This example of a protocol may introduce a refined form of the WANT primitive, REQUIRE. In this example, REQUIRE allows a party to set terms that she decides are necessary for a contract to be formed, WANT may allow the party to set terms that are desirable but not essential. This permits a distinction between "must have" and "would like to have."

In this example, WANT primitives must always be answered by an ACCEPT, REJECT, or OFFER primitive. The ACCEPT primitive permits a negotiation process 3172 to accept a set of terms and conditions. The REJECT primitive permits a process 3172 to reject an offered set of terms and conditions. Rejecting a set of required terms and conditions may terminate the negotiation. OFFER permits a counter-offer to be made.

The HAVE, QUIT, and AGREEMENT primitives permit the negotiation protocols to pass information about rule sets. Shared knowledge negotiations may, for example; start with all negotiation processes 3172A-3172N asserting HAVE (my PERC) to the other processes. HAVE is also used when an impasse is reached and one process 3172 needs to let the other process 3172 know about permitted options. QUIT signals an unsuccessful end of the negotiation without reaching an agreement, while AGREEMENT signals a successful end of an agreement and passes the resulting "negotiated" PERC/URT 3160 to the other process(es) 3172 for signature.

In "trusted negotiator" negotiations, all parties provide their demands and preferences to a "trusted" negotiator and agree to be bound by her decision. This is similar to binding arbitration in today's society. VDE enables this mode of negotiation by providing an environment in which a "trusted" negotiation service may be created. VDE provides not only the mechanism by which demands, desires, and limits may be concisely specified (e.g., in PERCs), but in which the PERCs may be securely transferred to a "trusted" negotiation service along with a rule set that specifies how the negotiation will be conducted, and by providing a secure execution environment so that the negotiation process may not be tampered with. Trusted negotiator services can be used at VDE sites where the integrity of the site is well known. Remote trusted negotiation services can be used by VDE sites that do not possess sufficient computing resources to execute one or more negotiation process(es); they can establish a communication link to a VDE site that provides this service and permits the service to handle the negotiation on their behalf.

"Zero-based" knowledge negotiations share some characteristics of the zero-based knowledge protocols used for authentication. It is well understood in the art how to construct a protocol that can determine if a remote site is the holder of a specific item without exchanging or exposing the item. This type of protocol can be constructed between two negotiation processes operating on at least one VDE site using a control set as their knowledge base. The negotiation processes may exchange information about their control sets, and may make demands and counter proposals regarding using their individual rule sets. For example, negotiation process A may communicate with negotiation process B to negotiate rights to read a book. Negotiation process A specifies that it will pay not more than $10.00 for rights to read the book, and prefers to pay between $5.00 and $6.00 for this right. Process A's rule set also specifies that for the $5.00 option, it will permit the release of the reader's name and address. Process B's rule set specifies that it wants $50.00 for rights to read the book, and will provide the book for $5.50 if the user agrees to release information about himself. The negotiation might go something like this:

| Process A | <---> | Process B |
| --- | --- | --- |
| Want (right to read, unrestricted) | ---> | |
| | <--- | Have(right to read, unrestricted, $50) |
| Offer (right to read, tender user info) | ---> | |
| | <--- | Have(right to read, tender user info, $5.50) |
| Accept(right to read, tender user info, $5.50) | ---> | |

In the above example, process A first specifies that it desires the right to read the book without restrictions or other information release. This starting position is specified as a rights option in the PERC that process A is using as a rule. Process B checks its rules and determines that an unrestricted right to read is indeed permitted for a price of $50. It replies to process A that these terms are available. Process A receives this reply and checks it against the control set in the PERC it uses as a rule base. The $50 is outside the $10 limit specified for this control set, so Process A cannot accept the offer. It makes a counter offer (as described in another optional rights option) of an unrestricted right to read coupled with the release of the reader's name and address. The name and address fields are described in a DTD referenced by Process A's PERC. Process B checks its rules PERC and determines that an unrestricted right to read combined with the release of personal information is a permitted option. It compares the fields that would be released as described in the DTD provided by Process A against the desired fields in a DTD in its own PERC, and determines an acceptable match has occurred. It then sends an offer for unrestricted rights with the release of specific information for the cost of $5.50 to Process A. Process A compares the right, restrictions, and fields against its rule set and determines that $5.50 is within the range of $5-$6 described as acceptable in its rule set. It accepts the offer as made. The offer is sealed by both parties "signing" a new PERC that describes the results of the final negotiation (unrestricted rights, with release of user information, for $5.50). The new PERC may be used by the owner of Process A to read the content (the book) subject to the described terms and conditions.

Further Chain of Handling Model

As described in connection with FIG. 2, there are four (4) "participant" instances of VDE 100 in one example of a VDE chain of handling and control used, for example, for content distribution. The first of these participant instances, the content creator 102, is manipulated by the publisher, author, rights owner or distributor of a literary property to prepare the information for distribution to the consumer. The second participant instance, VDE rights distributor 106, may distribute rights and may also administer and analyze customers' use of VDE authored information. The third participant instance, content user 112, is operated by users (included end-users and distributors) when they use information. The fourth participant instance, financial clearinghouse 116 enables the VDE related clearinghouse activities. A further participant, a VDE administrator, may provide support to keep VDE 100 operating properly. With appropriate authorizations and Rights Operating System components installed, any VDE electronic appliance 600 can play any or all of these participant roles.

Literary property is one example of raw material for VDE 100. To transfer this raw material into finished goods, the publisher, author, or rights owner uses tools to transform digital information (such as electronic books, databases, computer software and movies) into protected digital packages called "objects." Only those consumers (or others along the chain of possession such as a redistributor) who receive permission from a distributor 106 can open these packages. VDE packaged content can be constrained by "rules and control information" provided by content creator 102 and/or content distributor 106—or by other VDE participants in the content's distribution pathway, i.e., normally by participants "closer" to the creation of the VDE secured package than the participant being constrained.

Once the content is packaged in an "object," the digital distribution process may begin. Since the information packages themselves are protected, they may be freely distributed on CD-ROM disks, through computer networks, or broadcast through cable or by airwaves. Informal "out of channel" exchange of protected packages among end-users does not pose a risk to the content property rights. This is because only authorized individuals may use such packages. In fact, such "out of channel" distribution may be encouraged by some content providers as a marginal cost method of market penetration. Consumers with usage authorizations (e.g., a VISA clearinghouse budget allowing a certain dollar amount of usage) may, for example, be free to license classes of out of channel VDE protected packages provided to them, for example, by a neighbor.

To open a VDE package and make use of its content, an end-user must have permission. Distributors 106 can grant these permissions, and can very flexibly (if permitted by senior control information) limit or otherwise specify the ways in which package contents may be used. Distributors 106 and financial clearinghouses 116 also typically have financial responsibilities (they may be the same organization in some circumstances if desired). They ensure that any payments required from end-users fulfill their own and any other participant's requirements. This is achieved by auditing usage.

Distributors 106 using VDE 100 may include software publishers, database publishers, cable, television, and radio broadcasters, and other distributors of information in electronic form. VDE 100 supports all forms of electronic distribution, including distribution by broadcast or telecommunications, or by the physical transfer of electronic storage media. It also supports the delivery of content in homogeneous form, seamlessly integrating information from multiple distribution types with separate delivery of permissions, control mechanisms and content.

Distributors 106 and financial clearinghouses 116 may themselves be audited based on secure records of their administrative activities and a chain of reliable, "trusted" processes ensures the integrity of the overall digital distribution process. This allows content owners, for example, to verify that they are receiving appropriate compensation based on actual content usage or other agreed-upon bases.

Since the end-user 112 is the ultimate consumer of content in this example, VDE 100 is designed to provide protected content in a seamless and transparent way—so long as the end-user stays within the limits of the permissions she has received. The activities of end-user 112 can be metered so that an audit can be conducted by distributors 106. The auditing process may be filtered and/or generalized to satisfy user privacy concerns. For example, metered, recorded VDE content and/or appliance usage information may be filtered prior to reporting it to distributor 106 to prevent more information than necessary from being revealed about content user 112 and/or her usage.

VDE 100 gives content providers the ability to recreate important aspects of their traditional distribution strategies in electronic form and to innovatively structure new distribution mechanisms appropriate to their individual needs and circumstances. VDE 100 supports relevant participants in the chain of distribution, and also enables their desired pricing strategies, access and redistribution permissions, usage rules, and related administrative and analysis procedures. The reusable functional primitives of VDE 100 can be flexibly combined by content providers to reflect their respective distribution objectives. As a result, content providers can feed their information into established distribution channels and also create their own personalized distribution channels.

A summary of the roles of the various participants of virtual distribution environment 100 is set forth in the table below:

| Role | Description |
|---|---|
| "Traditional" Participants | |
| Content creator | Packager and initial distributor of digital information |
| Content owner | Owner of the digital information. |
| Distributors | Provide rights distribution services for budgets and/or content. |
| Auditor | Provides services for processing and reducing usage based audit trails. |
| Clearinghouse | Provides intermediate store and forward services for content and audit information. Also, typically provides a platform for other services, including third party financial providers and auditors. |
| Network provider | Provides communication services between sites and other participants. |
| Financial providers | Provider of third party sources of electronic funds to end-users and distributors. Examples of this class of users are VISA, American Express, or a government. |
| End Users | Consumers of information. |
| Other Participants | |
| Redistributor | Redistributes rights to use content based on chain of handling restrictions from content providers and/or other distributors. |
| VDE Administrator | Provider of trusted services for support of VDE nodes. |
| Independent Audit Processor | Provider of services for processing and summarizing audit trail data. Provides anonymity to end-users while maintaining the comprehensive audit capabilities required by the content providers. |
| Agents | Provides distributed presence for end-users and other VDE participants. |

Of these various VDE participants, the "redistributor," "VDE Administrator," "independent audit processor" and "agents" are, in certain respects "new" participants that may have no counterpart in many "traditional" business models. The other VDE participants (i.e., content provider, content owner, distributors, auditor, clearinghouse, network provider and financial providers) have "traditional" business model counterparts in the sense that traditional distribution models often included non-electronic participants performing some of the same business roles they serve in the virtual distribution environment 100.

Figure 77:
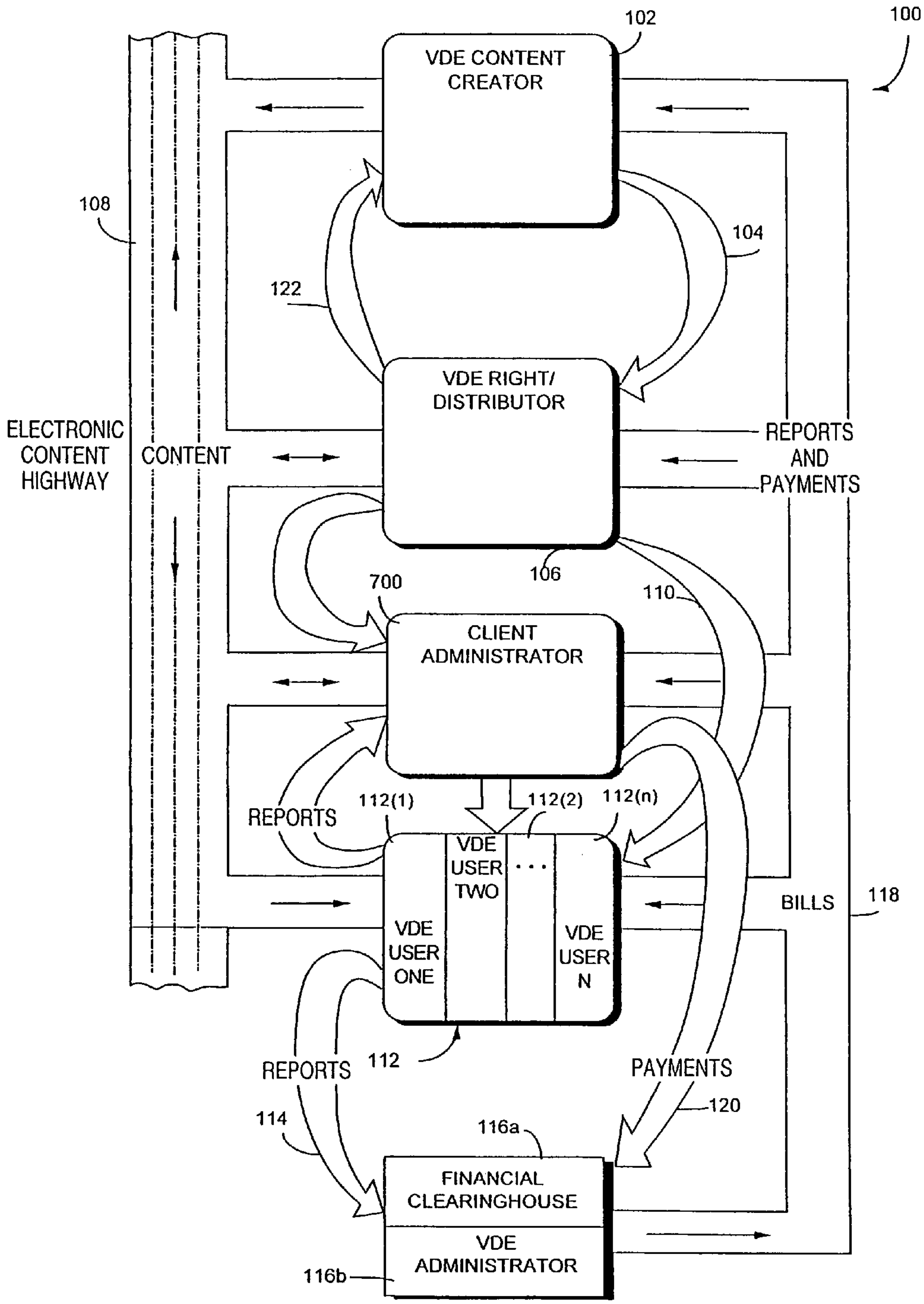
FIG. 77 shows a further example of a chain of handling and control.

VDE distributors 106 may also include "end-users" who provide electronic information to other end-users. For example, FIG. 77 shows a further example of a virtual distribution environment 100 chain of handling and control provided by the present invention. As compared to FIG. 2, FIG. 77 includes a new "client administrator" participant 700. In addition, FIG. 77 shows several different content users 112 (1), 112(2), . . . , 112(n) that may all be subject to the "jurisdiction" of the client administrator 700. Client administrator 700 may be, for example, a further rights distributor within a corporation or other organization that distributes rights to employees or other organization participant units (such as divisions, departments, networks, and or groups, etc.) subject to organization-specific "rules and control information." The client administrator 700 may fashion rules and control information for distribution, subject to "rules and control" specified by creator 102 and/or distributor 106.

As mentioned above, VDE administrator 116*b* is a trusted VDE node that supports VDE 100 and keeps it operating properly. In this example, VDE administrator 116*b* may provide, among others, any of all of the following:

VDE appliance initialization services
VDE appliance reinitialization/update services
Key management services
"Hot lists" of "rogue" VDE sites
Certification authority services
Public key registration
Client participant unit content budgets and other authorizations All participants of VDE 100 have the innate ability to participate in any role. For example, users may gather together existing protected packages, add (create new content) packages of their own, and create new products. They may choose to serve as their own distributor, or delegate this responsibility to others. These capabilities are particularly important in the object oriented paradigm which is entering the marketplace today. The production of compound objects, object linking and embedding, and other multi-source processes will create a need for these capabilities of VDE 100. The distribution process provided by VDE 100 is symmetrical; any end-user may redistribute information received to other end-users, provided they possess permission from and follow the rules established by the distribution chain VDE control information governing redistribution. End-users also may, within the same rules and permissions restriction, encapsulate content owned by others within newly published works and distribute these works independently. Royalty payments for the new works may be accessed by the publisher, distributors, or end-users, and may be tracked and electronically collected at any stage of the chain.

Independent financial providers can play an important role in VDE 100. The VDE financial provider role is similar to the role played by organizations such as VISA in traditional distribution scenarios. In any distribution model, authorizing payments for use of products or services and auditing usage for consistency and irregularities, is critical. In VDE 100, these are the roles filled by independent financial providers. The independent financial providers may also provide audit services to content providers. Thus, budgets or limits on use, and audits, or records of use, may be processed by (and may also be put in place by) clearinghouses 116, and the clearinghouses may then collect usage payments from users 112. Any VDE user 112 may assign the right to process information or perform services on their behalf to the extend allowed by senior control information. The arrangement by which one VDE participant acts on behalf of another is called a "proxy." Audit, distribution, and other important rights may be "proxied" if permitted by the content provider. One special type of "proxy" is the VDE administrator 116*b*. A VDE administrator is an organization (which may be acting also as a financial clearinghouse 116) that has permission to manage (for example, "intervene" to reset) some portion or all of VDE secure subsystem control information for VDE electronic appliances. This administration right may extend only to admitting new appliances to a VDE infrastructure and to recovering "crashed" or otherwise inoperable appliances, and providing periodic VDE updates.

More On Object Creation, Distribution Methods, Budgets, and Audits

VDE node electronic appliances 600 in the preferred embodiment can have the ability to perform object creation, distribution, audit collection and usage control functions provided by the present invention. Incorporating this range of capabilities within each of many electronic appliances 600 provided by the preferred embodiment is important to a general goal of creating a single (or prominent) standard for electronic transactions metering, control, and billing, that, in its sum of installations, constitutes a secure, trusted, virtual transaction/distribution management environment. If, generally speaking, certain key functions were generally or frequently missing, at least in general purpose VDE node electronic appliances 600, then a variety of different products and different standards would come forth to satisfy the wide range of applications for electronic transaction/distribution management; a single consistent set of tools and a single "rational," trusted security and commercial distribution environment will not have been put in place to answer the pressing needs of the evolving "electronic highway." Certain forms of certain electronic appliances 600 containing VDE nodes which incorporate embedded dedicated VDE microcontrollers such as certain forms of video cassette players, cable television converters and the like may not necessarily have or need full VDE capabilities. However, the preferred embodiment provides a number of distributed, disparately located electronic appliances 600 each of which desirably include authoring, distribution, extraction, audit, and audit reduction capabilities, along with object authoring capabilities.

The VDE object authoring capabilities provided by the preferred embodiment provides an author, for example, with a variety of menus for incorporating methods in a VDE object 300, including:

- menus for metering and/or billing methods which define how usage of the content portion of a VDE object is to be controlled,
- menus related to extraction methods for limiting and/or enabling users of a VDE object from extracting information from that object, and may include placing such information in a newly created and/or pre-existing VDE content container,
- menus for specifying audit methods—that is, whether or not certain audit information is to be generated and communicated in some secure fashion back to an object provider, object creator, administrator, and/or clearinghouse, and
- menus for distribution methods for controlling how an object is distributed, including for example, controlling distribution rights of different participant's "down" a VDE chain of content container handling.

The authoring capabilities may also include procedures for distributing administrative budgets, object distribution control keys, and audit control keys to distributors and other VDE participants who are authorized to perform distribution and/or auditing functions on behalf of the author, distributors, and/or themselves. The authoring capabilities may also include procedures for selecting and distributing distribution methods, audit methods and audit reduction methods, including for example, securely writing and/or otherwise controlling budgets for object redistribution by distributors to subsequent VDE chain of content handling participants.

The content of an object 300 created by an author may be generated with the assistance of a VDE aware application program or a non-VDE aware application program. The content of the object created by an author in conjunction with such programs may include text, formatted text, pictures, moving pictures, sounds, computer software, multimedia, electronic games, electronic training materials, various types of files, and so on, without limitation. The authoring process may encapsulate content generated by the author in an object, encrypt the content with one or more keys, and append one or more methods to define parameters of allowed use and/or required auditing of use and/or payment for use of the object by users (and/or by authorized users only). The authoring process may also include some or all aspects of distributing the object.

In general, in the preferred embodiment, an author can:

A. Specify what content is to be included in an object.

B. Specify content oriented methods including:
   - Information—typically abstract, promotional, identifying, scheduling, and/or other information related to the content and/or author
   - Content—e.g. list of files and/or other information resources containing content, time variables, etc.

C. Specify control information (typically a collection of methods related to one another by one or more permissions records, including any method defining variables) and any initial authorized user list including, for example:
   - Control information over Access & Extraction
   - Control information over Distribution
   - Control information over Audit Processing A VDE node electronic appliance 600 may, for example, distribute an object on behalf of an object provider if a VDE node receives from an object provider administrative budget information for distributing the object and associated distribution key information.

A VDE node electronic appliance 600 may receive and process audit records on behalf of an object provider if that VDE node receives any necessary administrative budget, audit method, and audit key information (used, for example, to decrypt audit trails), from the object provider. An auditing-capable VDE electronic appliance 600 may control execution of audit reduction methods. "Audit reduction" in the preferred embodiment is the process of extracting information from audit records and/or processes that an object provider (e.g., any object provider along a chain of handling of the object) has specified to be reported to an object's distributors, object creators, client administrators, and/or any other user of audit information. This may include, for example, advertisers who may be required to pay for a user's usage of object content. In one embodiment, for example, a clearinghouse can have the ability to "append" budget, audit method, and/or audit key information to an object or class or other grouping of objects located at a user site or located at an object provider site to ensure that desired audit processes will take place in a "trusted" fashion. A participant in a chain of handling of a VDE content container and/or content container control information object may act as a "proxy" for another party in a chain of handling of usage auditing information related to usage of object content (for example a clearinghouse, an advertiser, or a party interested in market survey and/or specific customer usage information). This may be done by specifying, for that other party, budget, audit method, and/or key information that may be necessary to ensure audit information is gathered and/or provided to, in a proper manner, said additional party. For example, employing specification information provided by said other party.

Object Creation and Initial Control Structures

The VDE preferred embodiment object creation and control structure design processes support fundamental configurability of control information. This enables VDE 100 to support a full range of possible content types, distribution pathways, usage control information, auditing requirements, and users and user groups. VDE object creation in the preferred embodiment employs VDE templates whose atomic elements represent at least in part modular control processes. Employing VDE creation software (in the preferred embodiment a GUI programming process) and VDE templates, users may create VDE objects 300 by, for example, partitioning the objects, placing "meta data" (e.g., author's name, creation date, etc.) into them, and assigning rights associated with them and/or object content to, for example, a publisher and/or content creator. When an object creator runs through this process, she normally will go through a content specification procedure which will request required data. The content specification process, when satisfied, may proceed by, for example, inserting data into a template and encapsulating the content. In addition, in the preferred embodiment, an object may also automatically register its presence with the local VDE node electronic appliance 600 secure subsystem, and at least one permissions record 808 may be produced as a result of the interaction of template instructions and atomic methods, as well as one or more pieces of control structure which can include one or more methods, budgets, and/or etc. A registration process may require a budget to be created for the object. If an object creation process specifies an initial distribution, an administrative object may also be created for distribution. The administrative object may contain one or more permission records 808, other control structures, methods, and/or load modules.

Permissions records 808 may specify various control relationships between objects and users. For example, VDE 100 supports both single access (e.g., one-to-one relationship between a user and a right user) and group access (any number of people may be authorized as a group). A single permissions record 808 can define both single and group access. VDE 100 may provide "sharing," a process that allows multiple users to share a single control budget as a budget. Additional control structure concepts include distribution, redistribution, and audit, the latter supporting meter and budget information reduction and/or transfer. All of these processes are normally securely controlled by one or more VDE secure subsystems.

Templates and Classes

VDE templates, classes, and flexible control structures support frameworks for organizations and individuals that create, modify, market, distribute, redistribute, consume, and otherwise use movies, audio recordings and live performances, magazines, telephony based retail sales, catalogs, computer software, information databases, multimedia, commercial communications, advertisements, market surveys, infomercials, games, CAD/CAM services for numerically controlled machines, and the like. As the context surrounding these classes changes or evolves, the templates provided by the preferred embodiment of the present invention can be modified to meet these changes for broad use, or more focused activities.

VDE 100 authoring may provide three inputs into a create process: Templates, user input and object content. Templates act as a set of control instructions and/or data for object control software which are capable of creating (and/or modifying) VDE objects in a process that interacts with user instructions and provided content to create a VDE object. Templates are usually specifically associated with object creation and/or control structures. Classes represent user groups which can include "natural" groups within an organization, such as department members, specific security clearance levels, etc., or ad hoc lists of individual's and/or VDE nodes.

For example, templates may be represented as text files defining specific structures and/or component assemblies. Templates, with their structures and/or component assemblies may serve as VDE object authoring or object control applications. A creation template may consist of a number of sub-templates, which, at the lowest level, represent an "atomic level" of description of object specification. Templates may present one or more models that describe various aspects of a content object and how the object should be created including employing secure atomic methods that are used to create, alter, and/or destroy permissions records 808 and/or associated budgets, etc.

Templates, classes (including user groups employing an object under group access), and flexible control structures including object "independent" permissions records (permissions that can be associated with a plurality of objects) and structures that support budgeting and auditing as separate VDE processes, help focus the flexible and configurable capabilities inherent within authoring provided by the present invention in the context of specific industries and/or businesses and/or applications. VDE rationalizes and encompasses distribution scenarios currently employed in a wide array of powerful industries (in part through the use of application or industry specific templates). Therefore, it is important to provide a framework of operation and/or structure to allow existing industries and/or applications and/or businesses to manipulate familiar concepts related to content types, distribution approaches, pricing mechanisms, user interactions with content and/or related administrative activities, budgets, and the like.

The VDE templates, classes, and control structures are inherently flexible and configurable to reflect the breadth of information distribution and secure storage requirements, to allow for efficient adaptation into new industries as they evolve, and to reflect the evolution and/or change of an existing industry and/or business, as well as to support one or more groups of users who may be associated with certain permissions and/or budgets and object types. The flexibility of VDE templates, classes, and basic control structures is enhanced through the use of VDE aggregate and control methods which have a compound, conditional process impact on object control. Taken together, and employed at times with VDE administrative objects and VDE security arrangements and processes, the present invention truly achieves a content control and auditing architecture that can be configured to most any commercial distribution embodiment. Thus, the present invention fully supports the requirements and biases of content providers without forcing them to fit a predefined application model. It allows them to define the rights, control information, and flow of their content (and the return of audit information) through distribution channels.

Modifying Object Content (Adding, Hiding, Modifying, Removing and/or Extending)

Adding new content to objects is an important aspect of authoring provided by the present invention. Providers may wish to allow one or more users to add, hide, modify, remove and/or extend content that they provide. In this way, other users may add value to, alter for a new purpose, maintain, and/or otherwise change, existing content. The ability to add content to an empty and/or newly created object is important as well.

When a provider provides content and accompanying control information, she may elect to add control information that enables and/or limits the addition, modification, hiding and/or deletion of said content. This control information may concern:

- the nature and/or location of content that may be added, hidden, modified, and/or deleted;
- portions of content that may be modified, hidden, deleted and/or added to;
- required secure control information over subsequent VDE container content usage in a chain of control and/or locally to added, hidden, and/or modified content;
- requirements that provider-specified notices and/or portions of content accompany added, hidden, deleted and/or modified content and/or the fact that said adding, hiding, modification and/or deletion occurred;
- secure management of limitations and/or requirements concerning content that may be removed, hidden and/or deleted from content, including the amount and/or degree of addition, hiding, modification and/or deletion of content;
- providing notice to a provider or providers that modification, hiding, addition and/or deletion has occurred and/or the nature of said occurrence; and
- other control information concerned with modification, addition, hiding, and/or deleting provider content.

A provider may use this control information to establish an opportunity for other users to add value to and/or maintain existing content in a controlled way. For example, a provider of software development tools may allow other users to add commentary and/or similar and/or complementary tools to their provided objects. A provider of movies may allow commentary and/or promotional materials to be added to their materials. A provider of CAD/CAM specifications to machine tool owners may allow other users to modify objects containing instructions associated with a specification to improve and/or translate said instructions for use with their equipment. A database owner may allow other users to add and/or remove records from a provided database object to allow flexibility and/or maintenance of the database.

Another benefit of introducing control information is the opportunity for a provider to allow other users to alter content for a new purpose. A provider may allow other users to provide content in a new setting.

To attach this control information to content, a provider may be provided with, or if allowed, design and implement, a method or methods for an object that govern addition, hiding, modification and/or deletion of content. Design and implementation of such one or more methods may be performed using VDE software tools in combination with a PPE 650. The provider may then attach the method(s) to an object and/or provide them separately. A permissions record 808 may include requirements associated with this control information in combination with other control information, or a separate permissions record 808 may be used.

An important aspect of adding or modifying content is the choice of encryption/decryption keys and/or other relevant aspects of securing new or altered content. The provider may specify in their method(s) associated with these processes a technique or techniques to be used for creating and/or selecting the encryption/decryption keys and/or other relevant aspect of securing new and/or altered content. For example, the provider may include a collection of keys, a technique for generating new keys, a reference to a load module that will generate keys, a protocol for securing content, and/or other similar information.

Another important implication is the management of new keys, if any are created and/or used. A provider may require that such keys and reference to which keys were used must be transmitted to the provider, or she may allow the keys and/or securing strategy to remain outside a provider's knowledge and/or control. A provider may also choose an intermediate course in which some keys must be transmitted and others may remain outside her knowledge and/or control.

An additional aspect related to the management of keys is the management of permissions associated with an object resulting from the addition, hiding, modification and/or deletion of content. A provider may or may not allow a VDE chain of control information user to take some or all of the VDE rules and control information associated with granting permissions to access and/or manipulate VDE managed content and/or rules and control information associated with said resulting object. For example, a provider may allow a first user to control access to new content in an object, thereby requiring any other user of that portion of content to receive permission from the first user. This may or may not, at the provider's discretion, obviate the need for a user to obtain permission from the provider to access the object at all.

Keys associated with addition, modification, hiding and/or deletion may be stored in an independent permissions record or records 808. Said permissions record(s) 808 may be delivered to a provider or providers and potentially merged with an existing permissions record or records, or may remain solely under the control of the new content provider. The creation and content of an initial permissions record 808 and any control information over the permissions record(s) are controlled by the method(s) associated with activities by a provider. Subsequent modification and/or use of said permission record(s) may involve a provider's method(s), user action, or both. A user's ability to modify and/or use permissions record(s) 808 is dependent on, at least in part, the senior control information associated with the permissions record(s) of a provider.

Distribution Control information

To enable a broad and flexible commercial transaction environment, providers should have the ability to establish firm control information over a distribution process without unduly limiting the possibilities of subsequent parties in a chain of control. The distribution control information provided by the present invention allow flexible positive control. No provider is required to include any particular control, or use any particular strategy, except as required by senior control information. Rather, the present invention allows a provider to select from generic control components (which may be provided as a subset of components appropriate to a provider's specific market, for example, as included in and/or directly compatible with, a VDE application) to establish a structure appropriate for a given chain of handling/control. A provider may also establish control information on their control information that enable and limit modifications to their control information by other users.

The administrative systems provided by the present invention generate administrative "events." These "events" correspond to activities initiated by either the system or a user that correspond to potentially protected processes within VDE. These processes include activities such as copying a permissions record, copying a budget, reading an audit trail record, copying a method, updating a budget, updating a permissions record, updating a method, backing up management files, restoring management files, and the like. Reading, writing, modifying, updating, processing, and/or deleting information from any portion of any VDE record may be administrative events. An administrative event may represent a process that performs one or more of the aforementioned activities on one or more portions of one or more records.

When a VDE electronic appliance 600 encounters an administrative event, that event is typically processed in conjunction with a VDE PPE 650. As in the case of events generally related to access and/or use of content, in most cases administrative events are specified by content providers (including, for example, content creators, distributors, and/or client administrators) as an aspect of a control specified for an object, group and/or class of objects.

For example, if a user initiates a request to distribute permission to use a certain object from a desktop computer to a notebook computer, one of the administrative events generated may be to create a copy of a permissions record that corresponds to the object. When this administrative event is detected by ROS 602, an EVENT method for this type of event may be present. If an EVENT method is present, there may also be a meter, a billing, and a budget associated with the EVENT method. Metering, billing, and budgeting can allow a provider to enable and limit the copying of a permissions record 808.

For example, during the course of processing a control program, a meter, a billing, and a budget and/or audit records may be generated and/or updated. Said audit records may record information concerning circumstances surrounding an administrative event and processing of said event. For example, an audit record may contain a reference to a user and/or system activity that initiated an event, the success or failure of processing said event, the date and/or time, and/or other relevant information.

Referring to the above example of a user with both a desktop and notebook computer, the provider of a permissions record may require an audit record each time a meter for copying said permissions record is processed. The audit record provides a flexible and configurable control and/or recording environment option for a provider.

In some circumstances, it may be desirable for a provider to limit which aspects of a control component may be modified, updated, and/or deleted. "Atomic element definitions" may be used to limit the applicability of events (and therefore the remainder of a control process, if one exists) to certain "atomic elements" of a control component. For example, if a permissions record 808 is decomposed into "atomic elements" on the fields described in FIG. 26, an event processing chain may be limited, for example, to a certain number of modifications of expiration date/time information by specifying only this field in an atomic element definition. In another example, a permissions record 808 may be decomposed into atomic elements based on control sets. In this example, an event chain may be limited to events that act upon certain control sets.

In some circumstances, it may be desirable for a provider to control how administrative processes are performed. The provider may choose to include in distribution records stored in secure database 610 information for use in conjunction with a component assembly 690 that controls and specifies, for example, how processing for a given event in relation to a given method and/or record should be performed. For example, if a provider wishes to allow a user to make copies of a permissions record 808, she may want to alter the permissions record internally. For example, in the earlier example of a user with a desktop and a notebook computer, a provider may allow a user to make copies of information necessary to enable the notebook computer based on information present in the desktop computer, but not allow any further copies of said information to be made by the notebook VDE node. In this example, the distribution control structure described earlier would continue to exist on the desktop computer, but the copies of the enabling information passed to the notebook computer would lack the required distribution control structure to perform distribution from the notebook computer. Similarly, a distribution control structure may be provided by a content provider to a content provider who is a distributor in which a control structure would enable a certain number of copies to be made of a VDE content container object along with associated copies of permissions records, but the permissions records would be altered (as per specification of the content provider, for example) so as not to allow end-users who received distributor created copies from making further copies for distribution to other VDE nodes.

Although the preceding example focuses on one particular event (copying) under one possible case, similar processes may be used for reading, writing, modifying, updating, processing, and/or deleting information from records and/or methods under any control relationship contemplated by the present invention. Other examples include: copying a budget, copying a meter, updating a budget, updating a meter, condensing an audit trail, and the like.

Creating Custom Methods

In the preferred embodiment of the present invention, methods may be created "at will," or aliased to an other method. These two modes contribute to the superior configurability, flexibility, and positive control of the VDE distribution process. Generally, creating a method involves specifying the required attributes or parameters for the data portion of the method, and then "typing" the method. The typing process typically involves choosing one or more load modules to process any data portions of a method. In addition to the method itself, the process of method creation may also result in a method option subrecord for inclusion in, or modification of, a permissions record, and a notation in the distribution records. In addition to any "standard" load module(s) required for exercise of the method, additional load modules, and data for use with those load modules, may be specified if allowed. These event processing structures control the distribution of the method.

For example, consider the case of a security budget. One form of a typical budget might limit the user to 10 Mb of decrypted data per month. The user wishes to move their rights to use the relevant VDE content container object to their notebook. The budget creator might have limited the notebook to the same amount, half the original amount, a prorated amount based on the number of moves budgeted for an object, etc. A distribute method (or internal event processing structure) associated with the budget allows the creator of the budget to make a determination as to the methodology and parameters involved. Of course, different distribution methods may be required for the case of redistribution, or formal distribution of the method. The aggregate of these choices is stored in a permissions record for the method.

An example of the process steps used for the move of a budget record might look something like this:

1) Check the move budget (e.g., to determine the number of moves allowed)
2) Copy static fields to new record (e.g., as an encumbrance)
3) Decrement the Decr counter in the old record (the original budget)
4) Increment the Encumbrance counter in the old record
5) Write a distribution record
6) Write a Distribution Event Id to the new record
7) Increment the move meter
8) Decrement the move budget
9) Increment the Decr counter in the new record Creating a Budget In the preferred embodiment, to create a budget, a user manipulates a Graphical User Interface budget distribution application (e.g., a VDE template application). The user fills out any required fields for type(s) of budget, expiration cycle(s), auditor(s), etc. A budget may be specified in dollars, deutsche marks, yen, and/or in any other monetary or content measurement schema and/or organization. The preferred embodiment output of the application, normally has three basic elements. A notation in the distribution portion of secure database 610 for each budget record created, the actual budget records, and a method option record for inclusion in a permissions record. Under some circumstances, a budget process may not result in the creation of a method option since an existing method option may be being used. Normally, all of this output is protected by storage in secure database 610 and/or in one or more administrative objects.

There are two basic modes of operation for a budget distribution application in the preferred embodiment. In the first case, the operator has an unlimited ability to specify budgets. The budgets resulting from this type of activity may be freely used to control any aspect of a distribution process for which an operator has rights, including for use with "security" budgets such as quantities limiting some aspect of usage. For example, if the operator is a "regular person," he may use these budgets to control his own utilization of objects based on a personal accounting model or schedule. If the operator is an authorized user at VISA, the resulting budgets may have broad implications for an entire distribution system. A core idea is that this mode is controlled strictly by an operator.

The second mode of operation is used to create "alias" budgets. These budgets are coupled to a preexisting budget in an operator's system. When an operator fills a budget, an encumbrance is created on the aliased budget. When these types of budgets are created, the output includes two method option subrecords coupled together: the method option subrecord for the aliased budget, and a method option subrecord for the newly created budget. In most cases, the alias budget can be used in place of the original budget if the budget creator is authorized to modify the method options within the appropriate required method record of a permissions record.

For example, assume that a user (client administrator) at a company has the company's VISA budget on her electronic appliance 600. She wants to distribute budget to a network of company users with a variety of preexisting budgets and requirements. She also wants to limit use of the company's VISA budget to certain objects. To do this, she aliases a company budget to the VISA budget. She then modifies (if so authorized) the permissions record for all objects that the company will allow their users to manipulate so that they recognize the company budget in addition to, or instead of, the VISA budget. She then distributes the new permissions records and budgets to her users. The audit data from these users is then reduced against the encumbrance on the company's VISA budget to produce a periodic billing.

In another example, a consumer wants to control his family's electronic appliance use of his VISA card, and prevent his children from playing too many video games, while allowing unlimited use of encyclopedias. In this case, he could create two budgets. The first budget can be aliased to his VISA card, and might only be used with encyclopedia objects (referenced to individual encyclopedia objects and/or to one or more classes of encyclopedia objects) that reference the aliased budget in their explicitly modified permissions record. The second budget could be, for example, a time budget that he redistributes to the family for use with video game objects (video game class). In this instance, the second budget is a "self-replenishing" security/control budget, that allows, for example, two hours of use per day. The first budget operates in the same manner as the earlier example. The second budget is added as a new required method to permissions records for video games. Since the time budget is required to access the video games, an effective control path is introduced for requiring the second budget—only permissions records modified to accept the family budget can be used by the children for video games and they are limited to two hours per day.

Sharing and Distributing Rights and Budgets

Move

The VDE "move" concept provided by the preferred embodiment covers the case of "friendly sharing" of rights and budgets. A typical case of "move" is a user who owns several machines and wishes to use the same objects on more than one of them. For example, a user owns a desktop and a notebook computer. They have a subscription to an electronic newspaper that they wish to read on either machine, i.e., the user wishes to move rights from one machine to the other.

An important concept within "move" is the idea of independent operation. Any electronic appliance 600 to which rights have been moved may contact distributors or clearinghouses independently. For example, the user mentioned above may want to take their notebook on the road for an extended period of time, and contact clearinghouses and distributors without a local connection to their desktop.

To support independent operation, the user should be able to define an account with a distributor or clearinghouse that is independent of the electronic appliance 600 she is using to connect. The transactions must be independently traceable and reconcilable among and between machines for both the end user and the clearinghouse or distributor. The basic operations of moving rights, budgets, and bitmap or compound meters between machines is also supported.

Redistribution

Redistribution forms a UDE middle ground between the "friendly sharing" of "move," and formal distribution. Redistribution can be thought of as "anonymous distribution" in the sense that no special interaction is required between a creator, clearinghouse, or distributor and a redistributor. Of course, a creator or distributor does have the ability to limit or prevent redistribution.

Unlike the "move" concept, redistribution does not imply independent operation. The redistributor serves as one point of contact for users receiving redistributed rights and/or budgets, etc. These users have no knowledge of, or access to, the clearinghouse (or and/or distributor) accounts of the redistributor. The redistributor serves as an auditor for the rights and/or budgets, etc. that they redistribute, unless specifically overridden by restrictions from distributors and/or clearinghouses. Since redistributees (recipients of redistributed rights and/or budgets, etc.) would place a relatively unquantifiable workload on clearinghouses, and furthermore, since a redistributor would be placing himself at an auditable risk (responsible for all redistributed rights and/or budgets, etc.), the audit of rights, budgets, etc. of redistributees by redistributors is assumed as the default case in the preferred embodiment.

Distribution

Distribution involves three types of entity. Creators usually are the source of distribution. They typically set the control structure "context" and can control the rights which are passed into a distribution network. Distributors are users who form a link between object (content) end users and object (content) creators. They can provide a two-way conduit for rights and audit data. Clearinghouses may provide independent financial services, such as credit and/or billing services, and can serve as distributors and/or creators. Through a permissions and budgeting process, these parties collectively can establish fine control over the type and extent of rights usage and/or auditing activities.

Encumbrance

An "encumbrance" is a special type of VDE budget. When that a budget distribution of any type occurs, an "encumbrance" may be generated. An encumbrance is indistinguishable from an original budget for right exercise (e.g., content usage payment) purposes, but is uniquely identified within distribution records as to the amount of the encumbrance, and all necessary information to complete a shipping record to track the whereabouts of an encumbrance. For right exercise purposes, an encumbrance is identical to an original budget; but for tracking purposes, it is uniquely identifiable.

In the preferred embodiment of the present invention, a Distribution Event ID will be used by user VDE nodes and by clearinghouse services to track and reconcile encumbrances, even in the case of asynchronous audits. That is, the "new" encumbrance budget is unique from a tracking point of view, but indistinguishable from a usage point of view.

Unresolved encumbrances are a good intermediate control for a VDE distribution process. A suitable "grace period" can be introduced during which encumbrances must be resolved. If this period elapses, an actual billing or payment may occur. However, even after the interval has expired and the billing and/or payment made, an encumbrance may still be outstanding and support later reconciliation. In this case, an auditor may allow a user to gain a credit, or a user may connect to a VDE node containing an encumbered budget, and resolve an amount as an internal credit. In some cases, missing audit trails may concern a distributor sufficiently to revoke redistribution privileges if encumbrances are not resolved within a "grace period," or if there are repeated grace period violations or if unresolved encumbrances are excessively large.

Encumbrances can be used across a wide variety of distribution modes. Encumbrances, when used in concert with aliasing of budgets, opens important additional distribution possibilities. In the case of aliasing a budget, the user places himself in the control path for an object—an aliased budget may only be used in conjunction with permissions records that have been modified to recognize it. An encumbrance has no such restrictions.

For example, a user may want to restrict his children's use of his electronic, VDE node VISA budget. In this case, the user can generate an encumbrance on his VISA budget for the children's family alias budget, and another for his wife that is a transparent encumbrance of the original VISA budget. BigCo may use a similar mechanism to distribute VISA budget to department heads, and aliased BigCo budget to users directly.

Account Numbers and User IDs

In the preferred embodiment, to control access to clearinghouses, users are assigned account numbers at clearinghouses. Account numbers provide a unique "instance" value for a secure database record from the point of view of an outsider. From the point of view of an electronic appliance 600 site, the user, group, or group/user ids provide the unique instance of a record. For example, from the point of view of VISA, your Gold Card belongs to account number #123456789. From the point of view of the electronic appliance site (for example, a server at a corporation), the Gold card might belong to user id 1023. In organizations which have plural users and/or user groups using a VDE node, such users and/or user groups will likely be assigned unique user IDs. differing budgets and/or other user rights may be assigned to different users and/or user groups and/or other VDE control information may be applied on a differing manner to electronic content and/or appliance usage by users assigned with different such IDs. Of course, both a clearinghouse and a local site will likely have both pieces of information, but "used data" versus the "comment data" may differ based on perspective.

In the preferred embodiment case of "move," an account number stored with rights stays the same. In the preferred embodiment of other forms of distribution, a new account number is required for a distributee. This may be generated automatically by the system, or correspond to a methodology developed by a distributor or redistributor. Distributors maintain account numbers (and associated access secrets) in their local name services for each distributee. Conversely, distributees' name services may store account numbers based on user id for each distributor. This record usually is moved with other records in the case of move, or is generated during other forms of distribution.

Organizations (including families) may automatically assign unique user IDs when creating control information (e.g., a budget) for a new user or user group.

Requirements Record

In order to establish the requirements, and potentially options, for exercising a right associated with a VDE content container object before one or more required permissions records are received for that object, a requirements record may exist in the private header of such an object. This record will help the user establish what they have, and what they need from a distributor prior to forming a connection. If the requirements or possibilities for exercising a particular right have changed since such an object was published, a modified requirements record may be included in a container with an object (if available and allowed), or a new requirements record may be requested from a distributor before registration is initiated. Distributors may maintain "catalogs" online, and/or delivered to users, of collections of requirements records and/or descriptive information corresponding to objects for which they may have ability to obtain and/or grant rights to other users.

Passing an Audit

In the preferred embodiment of VDE there may be at least two types of auditing. In the case of budget distribution, billing records that reflect consumption of a budget generally need to be collected and processed. In the case of permissions distribution, usage data associated with an object are also frequently required.

In order to effect control over an object, a creator may establish the basic control information associated with an object. This is done in the formulation of permissions, the distribution of various security, administrative and/or financial budgets, and the level of redistribution that is allowed, etc. Distributors (and redistributors) may further control this process within the rights, budgets, etc. (senior control information) they have received.

For example, an object creator may specify that additional required methods may be added freely to their permissions records, establish no budget for this activity, and allow unlimited redistribution of this right. As an alternative example, a creator may allow moving of usage rights by a distributor to half a dozen subdistributors, each of whom can distribute 10,000 copies, but with no redistribution rights being allowed to be allocated to subdistributors' (redistributors') customers. As another example, a creator may authorize the moving of usage rights to only 10 VDE nodes, and to only one level of distribution (no redistribution). Content providers and other contributors of control information have the ability through the use of permissions records and/or component assemblies to control rights other users are authorized to delegate in the permissions records they send to those users, so long as such right to control one, some, or all such rights of other users is either permitted or restricted (depending on the control information distribution model). It is possible and often desirable, using VDE, to construct a mixed model in which a distributor is restricted from controlling certain rights of subsequent users and is allowed to control other rights. VDE control of rights distribution in some VDE models will in part or whole, at least for certain one or more "levels" of a distribution chain, be controlled by electronic content control information providers who are either not also providers of the related content or provide only a portion of the content controlled by said content control information. For example, in certain models, a clearinghouse might also serve as a rights distribution agent who provides one or more rights to certain value chain participants, which one or more rights may be "attached" to one or more rights to use the clearinghouse's credit (if said clearinghouse is, at least in part, a financial clearinghouse (such a control information provider may alternatively, or in addition, restrict other users' rights.

A content creator or other content control information provider may budget a user (such as a distributor) to create an unlimited number of permissions records for a content object, but revoke this right and/or other important usage rights through an expiration/termination process if the user does not report his usage (provide an audit report) at some expected one or more points in time and/or after a certain interval of time (and/or if the user fails to pay for his usage or violates other aspects of the agreement between the user and the content provider). This termination (or suspension or other specified consequence) can be enforced, for example, by the expiration of time-aged encryption keys which were employed to encrypt one or more aspects of control information. This same termination (or other specified consequence such as budget reduction, price increase, message displays on screen to users, messages to administrators, etc.) can also be the consequence of the failure by a user or the users VDE installation to complete a monitored process, such as paying for usage in electronic currency, failure to perform backups of important stored information (e.g., content and/or appliance usage information, control information, etc.), failure to use a repeated failure to use the proper passwords or other identifiers, etc.).

Generally, the collection of audit information that is collected for reporting to a certain auditor can be enforced by expiration and/or other termination processes. For example, the user's VDE node may be instructed (a) from an external source to no longer perform certain tasks, (b) carries within its control structure information informing it to no longer perform certain tasks, or (c) is elsewise no longer able to perform certain tasks. The certain tasks might comprise one or more enabling operations due to a user's (or installation's) failure to either report said audit information to said auditor and/or receive back a secure confirmation of receipt and/or acceptance of said audit information. If an auditor fails to receive audit information from a user (or some other event fails to occur or occur properly), one or more time-aged keys which are used, for example, as a security component of an embodiment of the present invention, may have their aging suddenly accelerated (completed) so that one or more processes related to said time-aged keys can no longer be performed.

Authorization Access Tags and Modification Access Tags

In order to enable a user VDE installation to pass audit information to a VDE auditing party such as a Clearinghouse, VDE allows a VDE auditing party to securely, electronically communicate with the user VDE installation and to query said installation for certain or all information stored within said installation's secure sub-system, depending on said auditing party's rights (said party shall normally be unable to access securely stored information that said party is not expressly authorized to access, that is one content provider will normally not be authorized to access content usage information related to content provided by a different content provider). The auditing party asserts a secure secret (e.g., a secure tag) that represents the set of rights of the auditor to access certain information maintained by said subsystem. If said subsystem validates said tag, the auditing party may then receive auditing information that it is allowed to request and receive.

Great flexibility exists in the enforcement of audit trail requirements. For example, a creator (or other content provider or control information provider or auditor in an object's or audit report's chain of handling) may allow changes by an auditor for event trails, but not allow anyone but themselves to read those trails, and limit the redistribution of this right to, for example, six levels. Alternatively, a creator or other controlling party may give a distributor the right to process, for example, 100,000 audit records (and/or, for example, the right to process 12 audit records from a given user) before reporting their usage. If a creator or other controlling party desires, he may allow (and/or require) separate (and containing different, a subset of, overlapping, or the same information) audit "packets" containing audit information, certain of said audit information to be processed by a distributor and certain other of said audit information to be passed back to the creator and/or other auditors (each receiving the same, overlapping, a subset of, or different audit information). Similarly, as long as allowed by, for example, an object creator, a distributor (or other content and/or control information provider) may require audit information to be passed back to it, for example, after every 50,000 audit records are processed (or any other unit of quantity and/or after a certain time interval and/or at a certain predetermined date) by a redistributor. In the preferred embodiment, audit rules, like other control structures, may be stipulated at any stage of a distribution chain of handling as long as the right to stipulate said rules has not been restricted by a more "senior" object and/or control information distributing (such as an auditing) participant.

Audit information that is destined for different auditors may be encrypted by different one or more encryption keys which have been securely provided by each auditor's VDE node and communicated for inclusion in a user's permissions record(s) as a required step, for example, during object registration. This can provide additional security to further ensure (beyond the use of passwords and/or other identification information and other VDE security features) that an auditor may only access audit information to which he is authorized. In one embodiment, encrypted (and/or unencrypted) "packets" of audit information (for example, in the form of administrative objects) may be bound for different auditors including a clearinghouse and/or content providers and/or other audit information users (including, for example, market analysts and/or list purveyors). The information may pass successively through a single chain of handling, for example, user to clearinghouse to redistributor to distributor to publisher/object creator, as specified by VDE audit control structures and parameters. Alternatively, encrypted (or, normally less preferably, unencrypted) audit packets may be required to be dispersed directly from a user to a plurality of auditors, some one or more who may have the responsibility to "pass along" audit packets to other auditors. In another embodiment, audit information may be passed, for example, to a clearinghouse, which may then redistribute all and/or appropriate subsets of said information (and/or some processed result) to one or more other parties, said redistribution employing VDE secure objects created by said clearinghouse.

An important function of an auditor (receiver of audit information) is to pass administrative events back to a user VDE node in acknowledgement that audit information has been received and/or "recognized." In the preferred embodiment, the receipt and/or acceptance of audit information may be followed by two processes. The first event will cause the audit data at a VDE node which prepared an audit report to be deleted, or compressed into, or added to, one or more summary values. The second event, or set of events, will "inform" the relevant security (for example, termination and/or other consequence) control information (for example, budgets) at said VDE node of the audit receipt, modify expiration dates, provide key updates, and/or etc. In most cases, these events will be sent immediately to a site after an audit trail is received. In some cases, this transmission may be delayed to, for example, first allow processing of the audit trail and/or payment by a user to an auditor or other party.

In the preferred embodiment, the administrative events for content objects and independently distributed methods/component assemblies are similar, but not necessarily identical. For example, key updates for a budget may control encryption of a billing trail, rather than decryption of object content. The billing trail for a budget is in all respects a method event trail. In one embodiment, this trail must include sufficient references into distribution records for encumbrances to allow reconciliation by a clearinghouse. This may occur, for example, if a grace period elapses and the creator of a budget allows unresolved encumbrances to ultimately yield automatic credits if an expired encumbrance is "returned" to the creator.

Delivery of audit reports through a path of handling may be in part insured by an inverse (return of information) audit method. Many VDE methods have at least two pieces: a portion that manages the process of producing audit information at a user's VDE node; and a portion that subsequently acts on audit data. In an example of the handling of audit information bound for a plurality of auditors, a single container object is received at a clearinghouse (or other auditor). This container may contain (a) certain encrypted audit information that is for the use of the clearinghouse itself, and (b) certain other encrypted audit information bound for other one or more auditor parties. The two sets of information may have the same, overlapping and in part different, or entirely different, information content. Alternatively, the clearinghouse VDE node may be able to work with some or all of the provided audit information. The audit information may be, in part, or whole, in some summary and/or analyzed form further processed at the clearinghouse and/or may be combined with other information to form a, at least in part, derived set of information and inserted into one or more at least in part secure VDE objects to be communicated to said one or more (further) auditor parties. When an audit information container is securely processed at said clearinghouse VDE node by said inverse (return) audit method, the clearinghouse VDE node can create one or more VDE administrative objects for securely carrying audit information to other auditors while separately processing the secure audit information that is specified for use by said clearinghouse. Secure audit processes and credit information distribution between VDE participants normally takes place within the secure VDE "black box," that is processes are securely processed within secure VDE PPE 650 and audit information is securely communicated between the VDE secure subsystems of vDE participants employing VDE secure communication techniques (e.g., public key encryption, and authentication).

This type of inverse audit method may specify the handling of returned audit information, including, for example, the local processing of audit information and/or the secure passing along of audit information to one or more auditor parties. If audit information is not passed to one or more other auditor parties as may be required and according to criteria that may have been set by said one or more other auditor parties and/or content providers and/or control information providers during a permissions record specification and/or modification process, the failure to, for example, receive notification of successful transfer of required audit information by an auditor party, e.g., a content provider, can result in the disablement of at least some capability of the passing through party's VDE node (for example, disablement of the ability to further perform certain one or more VDE managed business functions that are related to object(s) associated with said audit or party). In this preferred embodiment example, when an object is received by an auditor, it is automatically registered and permissions record(s) contents are entered into the secure management database of the auditor's VDE node.

One or more permissions records that manage the creation and use of an audit report object (and may manage other aspects of object use as well) may be received by a user's system during an audit information reporting exchange (or other electronic interaction between a user and an auditor or auditor agent). Each received permissions record may govern the creation of the next audit report object. After the reporting of audit information, a new permissions record may be required at a user's VDE node to refresh the capability of managing audit report creation and audit information transfer for the next audit reporting cycle. In our above example, enabling an auditor to supply one or more permissions records to a user for the purpose of audit reporting may require that an auditor (such as a clearinghouse) has received certain, specified permissions records itself from "upstream" auditors (such as, for example, content and/or other content control information providers). Information provided by these upstream permissions records may be integrated into the one or more permissions records at an auditor VDE (e.g., clearinghouse) installation that manage the permissions record creation cycle for producing administrative objects containing permissions records that are bound for users during the audit information reporting exchange. If an upstream auditor fails to receive, and/or is unable to process, required audit information, this upstream auditor may fail to provide to the clearinghouse (in this example) the required permissions record information which enables a distributor to support the next permission record creation/auditing cycle for a given one or more objects (or class of objects). As a result, the clearinghouse's VDE node may be unable to produce the next cycle's permissions records for users, and/or perform some other important process. This VDE audit reporting control process may be entirely electronic process management involving event driven VDE activities at both the intended audit information receiver and sender and employing both their secure PPE 650 and secure VDE communication techniques.

In the preferred embodiment, each time a user registers a new object with her own VDE node, and/or alternatively, with a remote clearinghouse and/or distributor VDE node, one or more permissions records are provided to, at least in part, govern the use of said object. The permissions records may be provided dynamically during a secure UDE registration process (employing the VDE installation secure subsystem), and/or may be provided following an initial registration and received at some subsequent time, e.g. through one or more separate secure VDE communications, including, for example, the receipt of a physical arrangement containing or otherwise carrying said information. At least one process related to the providing of the one or more permissions records to a user can trigger a metering event which results in audit information being created reflecting the user's VDE node's, clearinghouse's, and/or distributor's permissions records provision process. This metering process may not only record that one or more permissions records have been created. It may also record the VDE node name, user name, associated object identification information, time, date, and/or other identification information. Some or all of this information can become part of audit information securely reported by a clearinghouse or distributor, for example, to an auditing content creator and/or other content provider. This information can be reconciled by secure VDE applications software at a receiving auditor's site against a user's audit information passed through by said clearinghouse or distributor to said auditor. For each metered one or more permissions records (or set of records) that were created for a certain user (and/or VDE node) to manage use of certain one or more VDE object(s) and/or to manage the creation of VDE object audit reports, it may be desirable that an auditor receive corresponding audit information incorporated into an, at least in part, encrypted audit report. This combination of metering of the creation of permissions records; secure, encrypted audit information reporting processes; secure VDE subsystem reconciliation of metering information reflecting the creation of registration and/or audit reporting permissions with received audit report detail; and one or more secure VDE installation expiration and/or other termination and/or other consequence processes; taken together significantly enhances the integrity of the VDE secure audit reporting process as a trusted, efficient, commercial environment.

Secure Document Management Example

VDE 100 may be used to implement a secure document management environment. The following are some examples of how this can be accomplished.

In one example, suppose a law firm wants to use VDE 100 to manage documents. In this example, a law firm that is part of a litigation team might use VDE in the following ways:

1. to securely control access to, and/or other usage of, confidential client records,
2. to securely control access, distribution, and/or other rights to documents and memoranda created at the law firm,
3. to securely control access and other use of research materials associated with the case,
4. to securely control access and other use, including distribution of records, documents, and notes associated with the case,
5. to securely control how other firms in the litigation team may use, including change, briefs that have been distributed for comment and review,
6. to help manage client billing.

The law firm may also use VDE to electronically file briefs with the court (presuming the court is also VDE capable) including providing secure audit verification of the ID (e.g., digital signature) of filers and other information pertinent to said filing procedure.

In this example, the law firm receives in VDE content containers documents from their client's VDE installation secure subsystem(s). Alternatively, or in addition, the law firm may receive either physical documents which may be scanned into electronic form, and/or they receive electronic documents which have not yet been placed in VDE containers. The electronic form of a document is stored as a VDE container (object) associated with the specific client and/or case. The VDE container mechanism supports a hierarchical ordering scheme for organizing files and other information within a container; this mechanism may be used to organize the electronic copies of the documents within a container. A VDE container is associated with specific access control information and rights that are described in one or more permissions control information sets (PERCs) associated with that container. In this example, only those members of the law firm who possess a VDE instance, an appropriate PERC, and the VDE object that contains the desired document, may use the document. Alternatively or in addition, a law firm member may use a VDE instance which has been installed on the law firm's network server. In this case, the member must be identified by an appropriate PERC and have access to the document containing VDE object (in order to use the server VDE installation). Basic access control to electronic documents is enabled using the secure subsystem of one or more user VDE installations.

VDE may be used to provide basic usage control in several ways. First, it permits the "embedding" of multiple containers within a single object. Embedded objects permit the "nesting" of control structures within a container. VDE also extends usage control information to an arbitrary granular level (as opposed to a file based level provided by traditional operating systems) and provides flexible control information over any action associated with the information which can be described as a VDE controlled process. For example, simple control information may be associated with viewing the one or more portions of documents and additional control information may be associated with editing, printing and copying the same and/or different one or more portions of these same documents.

In this example, a "client" container contains all documents that have been provided by the client (documents received in other containers can be securely extracted and embedded into the VDE client container using VDE extraction and embedding capabilities). Each document in this example is stored as an object within the parent, client VDE container. The "client" container also has several other objects embedded within it; one for each attorney to store their client notes, one (or more) for research results and related information, and at least one for copies of letters, work papers, and briefs that have been created by the law firm. The client container may also contain other information about the client, including electronic records of billing, time, accounting, and payments. Embedding VDE objects within a parent VDE content container provides a convenient way to securely categorize and/or store different information that shares similar control information. All client provided documents may, for example, be subject to the same control structures related to use and non-disclosure. Attorney notes may be subject to control information, for example, their use may be limited to the attorney who created the notes and those attorneys to whom such creating attorney expressly grants access rights. Embedded containers also provide a convenient mechanism to control collections of dissimilar information. For example, the research object(s) may be stored in the form of (or were derived from) VDE "smart objects" that contain the results of research performed by that object. Research results related to one aspect of the case retrieved from a VDE enabled LEXIS site might be encapsulated as one smart object; the results of another session related to another (or the same) aspect of the case may be encapsulated as a different object. Smart objects are used in this example to help show that completely disparate and separately delivered control information may be incorporated into a client container as desired and/or required to enforce the rights of providers (such as content owners).

Control structures may be employed to manage any variety of desired granularities and/or logical document content groupings; a document, page, paragraph, topically related materials, etc. In this example, the following assumptions are made: client provided documents are controlled at the page level, attorney notes are controlled at the document level on an attorney by attorney basis, court filings and briefs are controlled at a document level, research information is controlled at whatever level the content provider specifies at the time the research was performed, and certain highly confidential information located in various of the above content may be identified as subject to display and adding comments only, and only by the lead partner attorneys, with only the creator and/or embedder of a given piece of content having the right to be otherwise used (printed, extracted, distributed, etc).

In general, container content in this example is controlled with respect to distribution of rights. This control information are associated at a document level for all internally generated documents, at a page level for client level documents, and at the level specified by the content provider for research documents.

VDE control information can be structured in either complex or simple structures, depending on the participant's desires. In some cases, a VDE creator will apply a series of control structure definitions that they prefer to use (and that are supported by the VDE application managing the specification of rules and control information, either directly, or through the use of certified application compatible VDE component assemblies.

In this example, the law firm sets up a standard VDE client content container for a new client at the time they accept the case. A law firm VDE administrator would establish a VDE group for the new client and add the VDE IDs of the attorneys at the firm that are authorized to work on the case, as well as provide, if appropriate, one or more user template applications. These templates provide, for example, one or more user interfaces and associated control structures for selection by users of additional and/or alternative control functions (if allowed by senior control information), entry of control parameter data, and/or performing user specific administrative tasks. The administrator uses a creation tool along with a predefined creation template to create the container. This creation template specifies the document usage (including distribution control information) for documents as described above. Each electronic document from the client (including letters, memoranda, E-mail, spreadsheet, etc.) are then added to the container as separate embedded objects. Each new object is created using a creation template that satisfies that the default control structures specified with the container as required for each new object of a given type.

As each attorney works on the case, they may enter notes into an object stored within the client's VDE container. These notes may be taken using a VDE aware word processor already in use at the law firm. In this example, a VDE redirector handles the secure mapping of the word processor file requests into the VDE container and its objects through the use of VDE control processes operating with one or more VDE PPEs. Attorney note objects are created using the default creation template for the document type with assistance from the attorney if the type cannot be automatically determined from the content. This permits VDE to automatically detect and protect the notes at the predetermined level, e.g., document, page, paragraph.

Research can be automatically managed using VDE. Smart objects can be, used to securely search out, pay for if necessary, and retrieve information from VDE enabled information resources on the information highway.

Examples of such resources might include LEXIS, Westlaw, and other related legal databases. Once the information is retrieved, it may be securely embedded in the VDE content client container. If the smart object still contains unreleased information, the entire smart object may be embedded in the client's VDE container. This places the unreleased information under double VDE control requirements: those associated with releasing the information from smart object (such as payment and/or auditing requirements) and those associated with access to, or other usage of, client information of the specified type.

Briefs and other filings may be controlled in a manner similar to that for attorney notes. The filings may be edited using the standard word processors in the law firm; with usage control structures controlling who may review, change, and/or add to the document (or, in a more sophisticated example, a certain portion of said document). VDE may also support electronic filing of briefs by providing a trusted source for time/date stamping and validation of filed documents.

When the client and attorney want to exchange confidential information over electronic mail or other means, VDE can play an important role in ensuring that information exchanged under privilege, properly controlled, and not inappropriately released and/or otherwise used. The materials (content) stored in a VDE content container object will normally be encrypted. Thus wrapped, a VDE object may be distributed to the recipient without fear of unauthorized access and/or other use. The one or more authorized users who have received an object are the only parties who may open that object and view and/or manipulate and/or otherwise modify its contents and VDE secure auditing ensures a record of all such user content activities. VDE also permits the revocation of rights to use client/attorney privileged information if such action becomes necessary, for example, after an administrator review of user usage audit information.

Large Organization Example

In a somewhat more general example, suppose an organization (e.g., a corporation or government department) with thousands of employees and numerous offices disposed throughout a large geographic area wishes to exercise control over distribution of information which belongs to said organization (or association). This information may take the form of formal documents, electronic mail messages, text files, multimedia files, etc, which collectively are referred to as "documents."

Such documents may be handled by people (referred to as "users") and/or by computers operating on behalf of users. The documents may exist both in electronic form for storage and transmission and in paper form for manual handling.

These documents may originate wholly within the organization, or may be created, in whole or in part, from information received from outside the organization. Authorized persons within the organization may choose to release documents, in whole or in part, to entities outside the organization. Some such entities may also employ VDE 100 for document control, whereas others may not.

Document Control Policies

The organization as a whole may have a well-defined policy for access control to, and/or other usage control of documents. This policy may be based on a "lattice model" of information flow, in which documents are characterized as having one or more hierarchical "classification" security attributes 9903 and zero or more non-hierarchical "compartment" security attributes, all of which together comprise a sensitivity security attribute.

The classification attributes may designate the overall level of sensitivity of the document as an element of an ordered set. For example, the set "unclassified," "confidential," "secret," "top secret" might be appropriate in a government setting, and the set "public," "internal," "confidential," "registered confidential" might be appropriate in a corporate setting.

The compartment attributes may designate the document's association with one or more specific activities within the organization, such as departmental subdivisions (e.g., "research," "development," "marketing") or specific projects within the organization.

Each person using an electronic appliance 600 would be assigned, by an authorized user, a set of permitted sensitivity attributes to designate those documents, or one or more portions of certain document types, which could be processed in certain one or more ways, by the person's electronic appliance. A document's sensitivity attribute would have to belong to the user's set of permitted sensitivity values to be accessible.

In addition, the organization may desire to permit users to exercise control over specific documents for which the user has some defined responsibility. As an example, a user (the "originating user") may wish to place an "originator controlled" ("ORCON") restriction on a certain document, such that the document may be transmitted and used only by those specific other users whom he designates (and only in certain, expressly authorized ways). Such a restriction may be flexible if the "distribution list" could be modified after the creation of the document, specifically in the event of someone requesting permission from the originating user to transmit the document outside the original list of authorized recipients. The originating user may wish to permit distribution only to specific users, defined groups of users, defined geographic areas, users authorized to act in specific organizational roles, or a combination of any or all such attributes.

In this example, the organization may also desire to permit users to define a weaker distribution restriction such that access to a document is limited as above, but certain or all information within the document may be extracted and redistributed without further restriction by the recipients.

The organization and/or originating users may wish to know to what uses or geographic locations a document has been distributed. The organization may wish to know where documents with certain protection attributes have been distributed, for example, based on geographic information stored in site configuration records and/or name services records.

A user may wish to request a "return receipt" for a distributed document, or may wish to receive some indication of how a document has been handled by its recipients (e.g., whether it has been viewed, printed, edited and/or stored), for example, by specifying one or more audit requirements (or methods known to have audit requirements) in a PERC associated with such document(s).

User Environment

In an organization (or association) such as that described above, users may utilize a variety of electronic appliances 600 for processing and managing documents. This may include personal computers, both networked and otherwise, powerful single-user workstations, and servers or mainframe computers. To provide support for the control information described in this example, each electronic appliance that participates in use and management of VDE-protected documents may be enhanced with a VDE secure subsystem supporting an SPE 503 and/or HPE 655.

In some organizations, where the threats to secure operation are relatively low, an HPE 655 may suffice. In other organizations (e.g., government defense), it may be necessary to employ an SPE 503 in all situations where VDE-protected documents are processed. The choice of enhancement environment and technology may be different in different of the organization. Even if different types of PPE 650 are used within an organization to serve different requirements, they may be compatible and may operate on the same types (or subsets of types) of documents.

Users may employ application programs that are customized to operate in cooperation with the VDE for handling of VDE-protected documents. Examples of this may include VDE-aware document viewers, VDE aware electronic mail systems, and similar applications. Those programs may communicate with the PPE 650 component of a user's electronic appliance 600 to make VDE-protected documents available for use while limiting the extent to which their contents may be copied, stored, viewed, modified, and/or transmitted and/or otherwise further distributed outside the specific electronic appliance.

Users may wish to employ commercial, off-the-shelf ("COTS") operating systems and application programs to process the VDE-protected documents. One approach to permit the use of COTS application programs and operating systems would be to allow such use only for documents without restrictions on redistribution. The standard VDE operating system redirector would allow users to access VDE-protected documents in a manner equivalent to that for files. In such an approach, however, a chain of control for metering and/or auditing use may be "broken" to some extent at the point that the protected object was made available to the COTS application. The fingerprinting (watermarking) techniques of VDE may be used to facilitate further tracking of any released information.

A variety of techniques may be used to protect printing of protected documents, such as, for example: server-based decryption engines, special fonts for "fingerprinting," etc.

Another approach to supporting COTS software would use the VDE software running on the user's electronic appliance to create one or more "virtual machine" environments in which COTS operating system and application programs may run, but from which no information may be permanently stored or otherwise transmitted except under control of VDE. Such an environment would permit VDE to manage all VDE-protected information, yet may permit unlimited use of COTS applications to process that information within the confines of a restricted environment. The entire contents of such an environment could be treated by VDE 100 as an extension to any VDE-protected documents read into the environment. Transmission of information out of the environment could be governed by the same rules as the original document(s).

"Coarse-Grain" Control Capabilities

As mentioned above, an organization may employ VDE-enforced control capabilities to manage the security, distribution, integrity, and control of entire documents. Some examples of these capabilities may include:

1) A communication channel connecting two or more electronic appliances 600 may be assigned a set of permitted sensitivity attributes. Only documents whose sensitivity attributes belong to this set would be permitted to be transmitted over the channel. This could be used to support the Device Labels requirement of the Trusted Computer System Evaluation Criteria (TCSEC).

2) A writable storage device (e.g., fixed disk, diskette, tape drive, optical disk) connected to or incorporated in an electronic appliance 600 may be assigned a set of permitted sensitivity attributes. Only documents whose sensitivity attributes belong to this set would be permitted to be stored on the device. This could be used to support the TCSEC Device Labels requirement.
3) A document may have a list of users associated with it representing the users who are permitted to "handle" the document. This list of users may represent, for example, the only users who may view the document, even if other users receive the document container, they could not manipulate the contents. This could be used to support the standard ORCON handling caveat.
4) A document may have an attribute designating its originator and requiring an explicit permission to be granted by an originator before the document's content could be viewed. This request for permission may be made at the time the document is accessed by a user, or, for example, at the time one user distributes the document to another user. If permission is not granted, the document could not be manipulated or otherwise used.
5) A document may have an attribute requiring that each use of the document be reported to the document's originator. This may be used by an originator to gauge the distribution of the document. Optionally, the report may be required to have been made successfully before any use of the document is permitted, to ensure that the use is known to the controlling party at the time of use. Alternatively, for example, the report could be made in a deferred ("batch") fashion.
6) A document may have an attribute requiring that each use of the document be reported to a central document tracking clearinghouse. This could be used by the organization to track specific documents, to identify documents used by any particular user and/or group of users to track documents with specific attributes (e.g., sensitivity), etc. Optionally, for example, the report may be required to have been made successfully before any use of the document is permitted.
7) A VDE protected document may have an attribute requiring that each use of the document generate a "return receipt," to an originator. A person using the document may be required to answer specific questions in order to generate a return receipt, for example by indicating why the document is of interest, or by indicating some knowledge of the document's contents (after reading it). This may be used as assurance that the document had been handled by a person, not by any automated software mechanism.
8) A VDE protected document's content may be made available to a VDE-unaware application program in such a way that it is uniquely identifiable (traceable) to a user who caused its release. Thus, if the released form of the document is further distributed, its origin could be determined. This may be done by employing VDE "fingerprinting" for content release. Similarly, a printed VDE protected document may be marked in a similar, VDE fingerprinted unique way such that the person who originally printed the document could be determined, even if copies have since been made.
9) Usage of VDE protected documents could be permitted under control of budgets that limit (based on size, time of access, etc.) access or other usage of document content. This may help prevent wholesale disclosure by limiting the number of VDE documents accessible to an individual during a fixed time period. For example, one such control might permit a user, for some particular class of documents, to view at most 100 pages/day, but only print 10 pages/day and permit printing only on weekdays between nine and five. As a further example, a user might be restricted to only a certain quantity of logically related, relatively "contiguous" and/or some other pattern (such as limiting the use of a database's records based upon the quantity of records that share a certain identifier in field) of VDE protected document usage to identify, for example, the occurrence of one or more types of excessive database usage (under normal or any reasonable circumstances). As a result, VDE content providers can restrict usage of VDE content to acceptable usage characteristics and thwart and/or identify (for example, by generating an exception report for a VDE administrator or organization supervisor) user attempts to inappropriately use, for example, such an information database resource.

These control capabilities show some examples of how VDE can be used to provide a flexible, interactive environment for tracking and managing sensitive documents. Such an environment could directly trace the flow of a document from person to person, by physical locations, by organizations, etc. It would also permit specific questions to be answered such as "what persons outside the R&D department have received any R&D-controlled document." Because the control information is carried with each copy of a VDE protected document, and can ensure that central registries are updated and/or that originators are notified of document use, tracking can be prompt and accurate.

This contrasts with traditional means of tracking paper documents: typically, a paper-oriented system of manually collected and handled receipts is used. Documents may be individually copy-numbered and signed for, but once distributed are not actively controlled. In a traditional paper-oriented system, it is virtually impossible to determine the real locations of documents; what control can be asserted is possible only if all parties strictly follow the handling rules (which are at best inconvenient).

The situation is no better for processing documents within the context of ordinary computer and network systems. Although said systems can enforce access control information based on user identity, and can provide auditing mechanisms for tracking accesses to files, these are low-level mechanisms that do not permit tracking or controlling the flow of content. In such systems, because document content can be freely copied and manipulated, it is not possible to determine where document content has gone, or where it came from. In addition, because the control mechanisms in ordinary computer operating systems operate at a low level of abstraction, the entities they control are not necessarily the same as those that are manipulated by users. This particularly causes audit trails to be cluttered with voluminous information describing uninteresting activities.

"Fine-Grain" Control Capabilities

In addition to controlling and managing entire documents, users may employ customized VDE-aware application software to control and manage individual modifications to documents. Examples of these capabilities include the following:

1) A VDE content user may be permitted to append further information to a VDE document to indicate a proposed alternative wording. This proposed alteration would be visible to all other users (in addition to the original text) of the document but would (for example) be able to be incorporated into the actual text only by the document's owner.

2) A group of VDE users could be permitted to modify one or more parts of a document in such a way that each individual alteration would be unambiguously traceable to the specific user who performed it. The rights to modify certain portions of a document, and the extension of differing sets of rights to different users, allows an organization or secure environment to provide differing permissions enabling different rights to users of the same content.

3) A group of users could create a VDE document incrementally, by building it from individual contributions. These contributions would be bound together within a single controlled document, but each would be individually identified, for example, through their incorporation in VDE content containers as embedded container objects.

4) VDE control and management capabilities could be used to track activities related to individual document areas, for instance recording how many times each section of a document was viewed.

Example—VDE Protected Content Repository

As the "Digital Highway" emerges, there is increased discussion concerning the distribution of content across networks and, in particular, public networks such as the Internet. Content may be made available across public networks in several ways including:

"mailing" content to a user in response to a request or advance purchase (sending a token representing the commitment of electronic funds or credit to purchase an item);

supporting content downloadable from an organization's own content repository, such a repository comprising, for example, a store of products (such as software programs) and/or a store of information resources, normally organized into one or more databases; and supporting a public repository into which other parties can deposit their products for redistribution to customers (normally by making electronic copies for distribution to a customer in response to a request).

One possible arrangement of VDE nodes involves use of one or more "repositories." A repository, for example, may serve as a location from which VDE participants may retrieve VDE content containers. In this case, VDE users may make use of a network to gain access to a "server" system that allows one or more VDE users to access an object repository containing VDE content containers.

Some VDE participants may create or provide content and/or VDE content container objects, and then store content and/or content objects at a repository so that other participants may access such content from a known and/or efficiently organized (for retrieval) location. For example, a VDE repository (portion of a VDE repository, multiple VDE repositories, and/or providers of content to such repositories) may advertise the availability of certain types of VDE protected content by sending out email to a list of network users. If the network users have secure VDE subsystems in their electronic appliances, they may then choose to access such a repository directly, or through one or more smart agents and, using an application program for example, browse (and/or electronically search) through the offerings of VDE managed content available at the repository, download desirable VDE content containers, and make use of such containers. If the repository is successful in attracting users who have an interest in such content, VDE content providers may determine that such a repository is a desirable location(s) to make their content available for easy access by users. If a repository, such as CompuServe, stores content in non-encrypted (plaintext) form, it may encrypt "outgoing" content on an "as needed" basis through placing such content in VDE content containers with desired control information, and may employ VDE secure communications techniques for content communication to VDE participants.

VDE repositories may also offer other VDE services. For example, a repository may choose to offer financial services in the form of credit from the repository that may be used to pay fees associated with use of VDE objects obtained from the repository. Alternatively or in addition, a VDE repository may perform audit information clearinghouse services on behalf of VDE creators or other participants (e.g. distributors, redistributors, client administrators, etc.) for usage information reported by VDE users. Such services may include analyzing such usage information, creating reports, collecting payments, etc.

A "full service" VDE repository may be very attractive to both providers and users of VDE managed content. Providers of VDE managed content may desire to place their content in a location that is well known to users, offers credit, and/or performs audit services for them. In this case, providers may be able to focus on creating content, rather than managing the administrative processes associated with making content available in a "retail" fashion, collecting audit information from many VDE users, sending and receiving bills and payments, etc. VDE users may find the convenience of a single location (or an integrated arrangement of repositories) appealing as they are attempting to locate content of interest. In addition, a full service VDE repository may serve as a single location for the reporting of usage information generated as a consequence of their use of VDE managed content received from a VDE repository and/or, for example, receiving updated software (e.g. VDE-aware applications, load modules, component assemblies, non VDE-aware applications, etc.) VDE repository services may be employed in conjunction with VDE content delivery by broadcast and/or on physical media, such as CD-ROM, to constitute an integrated array of content resources that may be browsed, searched, and/or filtered, as appropriate, to fulfill the content needs of VDE users.

A public repository system may be established and maintained as a non-profit or for-profit service. An organization offering the service may charge a service fee, for example, on a per transaction basis and/or as a percentage of the payments by, and/or cost of, the content to users. A repository service may supply VDE authoring tools to content creators, publishers, distributors, and/or value adding providers such that they may apply rules and controls that define some or all of the guidelines managing use of their content and so that they may place such content into VDE content container objects.

A repository may be maintained at one location or may be distributed across a variety of electronic appliances, such as a variety of servers (e.g. video servers, etc.) which may be at different locations but nonetheless constitute a single resource. A VDE repository arrangement may employ VDE secure communications and VDE node secure subsystems ("protected processing environments"). The content comprising a given collection or unit of information desired by a user may be spread across a variety of physical locations. For example, content representing a company's closing stock price and the activity (bids, lows, highs, etc.) for the stock might be located at a World Wide Web server in New York, and content representing an analysis of the company (such as a discussions of the company's history, personnel, products, markets, and/or competitors) might be located on a server in Dallas. The content might be stored using VDE mechanisms to secure and audit use. The content might be maintained in clear form if sufficient other forms of security are available at such one or more of sites (e.g. physical security, password, protected operating system, data encryption, or other techniques adequate for a certain content type). In the latter instances, content may be at least in part encrypted and placed in VDE containers as it streams out of a repository so as to enable secure communication and subsequent VDE usage control and usage consequence management.

A user might request information related to such a company including stock and other information. This request might, for example, be routed first through a directory or a more sophisticated database arrangement located in Boston. This arrangement might contain pointers to, and retrieve content from, both the New York and Dallas repositories. This information content may, for example, be routed directly to the user in two containers (e.g. such as a VDE content container object from Dallas and a VDE content container object from New York). These two containers may form two VDE objects within a single VDE container (which may contain two content objects containing the respective pieces of content from Dallas and New York) when processed by the user's electronic appliance. Alternatively, such objects might be integrated together to form a single VDE container in Boston so that the information can be delivered to the user within a single container to simplify registration and control at the user's site. The information content from both locations may be stored as separate information objects or they may be joined into a single, integrated information object (certain fields and/or categories in an information form or template may be filled in by one resource and other fields and/or categories may be filled by information provided by a different resource). A distributed database may manage such a distributed repository resource environment and use VDE to secure the storing, communicating, auditing, and/or use of information through VDE's electronic enforcement of VDE controls. VDE may then be used to provide both consistent content containers and content control services.

Figure 78:
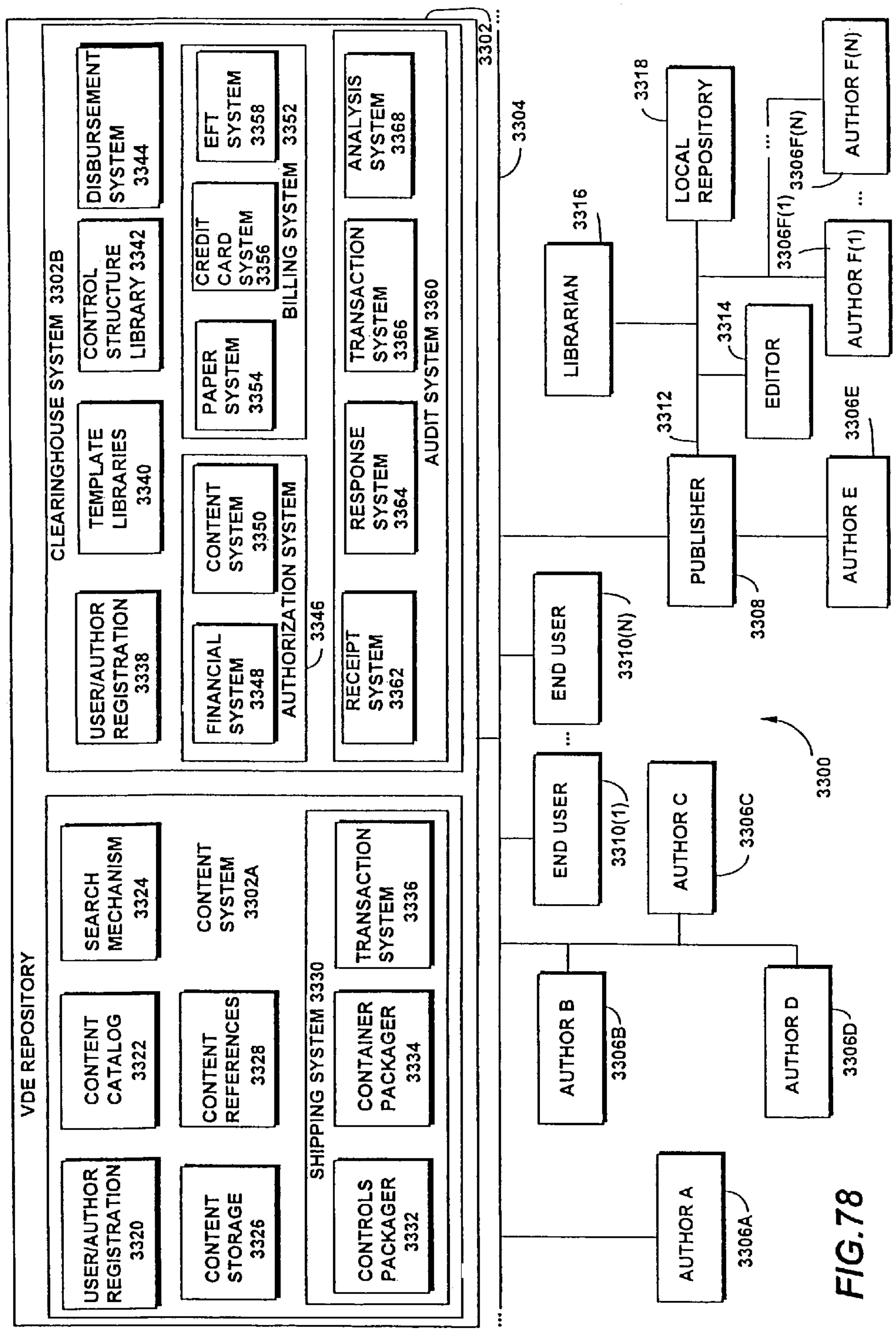
FIG. 78 shows an example of a VDE "repository"

An example of one possible repository arrangement 3300 is shown in FIG. 78. In this example, a repository 3302 is connected to a network 3304 that allows authors 3306A, 3306B, 3306C, and 3306D; a publisher 3308; and one or more end users 3310 to communicate with the repository 3302 and with each other. A second network 3312 allows the publisher 3308, authors 3306E and 3306F, an editor 3314, and a librarian 3316 to communicate with each other and with a local repository 3318. The publisher 3308 is also directly connected to author 3306E. In this example, the authors 3306 and publisher 3308 connect to the repository 3302 in order to place their content into an environment in which end users 3310 will be able to gain access to a broad selection of content from a common location.

In this example, the repository has two major functional areas: a content system 3302A and a clearinghouse system 3302B. The content system 3302A is comprised of a user/author registration system 3320, a content catalog 3322, a search mechanism 3324, content storage 3326, content references 3328, and a shipping system 3330 comprised of a controls packager 3322, a container packager 3334, and a transaction system 3336. The clearinghouse system 3302B is comprised of a user/author registration system 3338; template libraries 3340; a control structure library 3342; a disbursement system 3344; an authorization system 3346 comprised of a financial system 3348 and a content system 3350; a billing system 3352 comprised of a paper system 3354, a credit card system 3356, and an electronic funds transfer (EFT) system 3358, and an audit system 3360 comprised of a receipt system 3362, a response system 3364, a transaction system 3366, and an analysis system 3368.

In this example, author 3306A creates content in electronic form that she intends to make broadly available to many end users 3310, and to protect her rights through use of VDE. Author 3306A transmits a message to the repository 3302 indicating her desire to register with the repository to distribute her content. In response to this message, the user/author registration system 3320 of the content system 3302A; and the user/author registration system 3338 of the clearinghouse system 3302B transmit requests for registration information to author 3306A using the network 3304. These requests may be made in an on-line interactive mode; or they may be transmitted in a batch to author 3306A who then completes the requested information and transmits it as a batch to the repository 3302; or some aspects may be handled on-line (such as basic identifying information) and other information may be exchanged in a batch mode.

Registration information related to the content system 3302A may, for example, include:

- a request that Author 3306A provide information concerning the types and/or categories of content proposed for storage and access using the repository,
- the form of abstract and/or other identifying information required by the repository—in addition to providing author 3306A with an opportunity to indicate whether or not author 3306A generally includes other information with content submissions (such as promotional materials, detailed information regarding the format of submitted content, any equipment requirements that should or must be met for potential users of submitted content to successfully exploit its value, etc.),
- requests for information from author 3306A concerning where the content is to be located (stored at the repository, stored at author 3306A's location, stored elsewhere, or some combination of locations),
- what general search characteristics should be associated with content submissions (e.g. whether abstracts should be automatically indexed for searches by users of the repository, the manner in which content titles, abstracts, promotional materials, relevant dates, names of performers and/or authors, or other information related to content submissions may or should be used in lists of types of content and/or in response to searches, etc.), and/or
- how content that is stored at and/or passed through the repository should be shipped (including any container criteria, encryption requirements, transaction requirements related to content transmissions, other control criteria, etc.)

The information requested from author 3306A by the user/author registration system of the clearinghouse may, for example, consist of:

- VDE templates that author 3306A may or must make use of in order to correctly format control information such that, for example, the audit system 3360 of the clearinghouse system 3302B is properly authorized to receive and/or process usage information related to content submitted by author 3306A,
- VDE control information available from the clearinghouse 3302B that may or must be used by author 3306A (and/or included by reference) in some or all of the VDE component assemblies created and/or used by author 3306A associated with submitted content, the manner in which disbursement of any funds associated with usage of content provided by, passed through, or collected by the repository clearinghouse system 3302B should be made, the form and/or criteria of authorizations to use submitted content and/or financial transactions associated with content, the acceptable forms of billing for use of content and/or information associated with content (such as analysis reports that may be used by others), how VDE generated audit information should be received, how responses to requests from users should be managed, how transactions associated with the receipt of audit information should be formatted and authorized, how and what forms of analysis should be performed on usage information, and/or under what circumstances (if any) usage information and/or analysis results derived from VDE controlled content usage information should be managed (including to whom they may or must be delivered, the form of delivery, any control information that may be associated with use of such information, etc.)

The repository 3302 receives the completed registration information from author 3306A and uses this information to build an account profile for author 3306A. In addition, software associated with the authoring process may be transmitted to author 3306A. This software may, for example, allow author 3306A to place:content into a VDE content container with appropriate controls in such a way that many of the decisions associated with creating such containers are made automatically to reflect the use of the repository 3302 as a content system and/or a clearinghouse system (for example, the location of content, the party to contact for updates to content and/or controls associated with content, the party or parties to whom audit information may and/or must be transmitted and the pathways for such communication, the character of audit information that is collected during usage, the forms of payment that are acceptable for use of content, the frequency of audit transmissions required, the frequency of billing, the form of abstract and/or other identifying information associated with content, the nature of at least a portion of content usage control information, etc.)

Author 3306A makes use of a VDE authoring application to specify the controls and the content that she desires to place within a VDE content container, and produces such a container in accordance with any requirements of the repository 3302. Such a VDE authoring application may be, for example, an application provided by the repository 3302 which can help ensure adherence to repository content control requirements such as the inclusion of one or more types of component assemblies or other VDE control structures and/or required parameter data, an application received from another party, and/or an application created by author 3306A in whole or in part. Author 3306A then uses the network 3304 to transmit the container and any deviations from author 3306A's account profile that may relate to such content to the repository 3302. The repository 3302 receives the submitted content, and then—in accordance with any account profile requirements, deviations and/or desired options in this example—makes a determination as to whether the content was produced within the boundaries of any content and/or control information requirements of the repository and therefore should be placed within content storage or referenced by a location pointer or the like. In addition to placing the submitted content into content storage or referencing such content's location, the repository 3302 may also make note of characteristics associated with such submitted content in the search mechanism 3324, content references 3328, the shipping system 3330, and/or the relevant systems of the clearinghouse system 3302B related to templates and control structures, authorizations, billing and/or payments, disbursements, and/or audits of usage information.

During an authoring process, author 3306A may make use of VDE templates. Such templates may be used as an aspect of a VDE authoring application. For example, such templates may be used in the construction of a container as described above. Alternatively or in addition, such templates may also be used when submitted content is received by the repository 3302. References to such templates may be incorporated by author 3306A as an aspect of constructing a container for submitted content (in this sense the container delivered to the repository may be in some respects "incomplete" until the repository "completes" the container through use of indicated templates). Such references may be required for use by the repository 3302 (for example, to place VDE control information in place to fulfill an aspect of the repository's business or security models such as one or more map tables corresponding to elements of content necessary for interacting with other VDE control structures to accommodate certain metering, billing, budgeting, and/or other usage and/or distribution related controls of the repository).

For example, if content, submitted by author 3306A consists of a periodical publication, a template delivered to the author by the repository 3302 when the author registers at the repository may be used as an aspect of an authoring application manipulated by the author in creating a VDE content container for such a periodical. Alternatively or in addition, a template designed for use with periodical publications may be resident at the repository 3302, and such a template may be used by the repository to define, in whole or in part, control structures associated with such a container. For example, a VDE template designed to assist in formulating control structures for periodical publications might indicate (among other things) that:

usage controls should include a meter method that records each article within a publication that a user opens, a certain flat rate fee should apply to opening the periodical regardless of the number of articles opened, and/or a record should be maintained of every advertisement that is viewed by a user.

If content is maintained in a known and/or identifiable format, such a template may be used during initial construction of a container without author 3306A's intervention to identify any map tables that may be required to support such recording and billing actions. If such a VDE template is unavailable to author 3306A, she may choose to indicate that the container submitted should be reconstructed (e.g. augmented) by the repository to include the VDE control information specified in a certain template or class of templates. If the format of the content is known and/or identifiable by the repository, the repository may be able to reconstruct (or "complete") such a container automatically.

One factor in a potentially ongoing financial relationship between the repository and author 3306A may relate to usage of submitted content by end users 3310. For example, author 3306A may negotiate an arrangement with the repository wherein the repository is authorized to keep 20% of the total revenues generated from end users 3310 in exchange for maintaining the repository services (e.g. making content available to end users 3310, providing electronic credit, performing billing activities, collecting fees, etc.) A financial relationship may be recorded in control structures in flexible and configurable ways. For example, the financial relationship described above could be created in a VDE container and/or installation control structure devised by author 3306A to reflect author 3306A's financial requirements and the need for a 20% split in revenue with the repository wherein all billing activities related to usage of submitted content could be processed by the repository, and control structures representing reciprocal methods associated with various component assemblies required for use of author 3306A's submitted content could be used to calculate the 20% of revenues. Alternatively, the repository may independently and securely add and/or modify control structures originating from author 3306A in order to reflect an increase in price. Under some circumstances, author 3306A may not be directly involved (or have any knowledge of) the actual price that the repository charges for usage activities, and may concern herself only with the amount of revenue and character of usage analysis information that she requires for her own purposes, which she specifies in VDE control information which governs the use, and consequences of use, of VDE controlled content.

Another aspect of the relationship between authors and the repository may involve the character of transaction recording requirements associated with delivery of VDE controlled content and receipt of VDE controlled content usage audit information. For example, author 3306A may require that the repository make a record of each user that receives a copy of content from the repository. Author 3306A may further require collection of information regarding the circumstances of delivery of content to such users (e.g. time, date, etc.) In addition, the repository may elect to perform such transactions for use internally (e.g. to determine patterns of usage to optimize systems, detect fraud, etc.)

In addition to recording information regarding delivery of such VDE controlled content, author 3306A may have required or requested the repository to perform certain VDE container related processes. For example, author 3306A may want differing abstract and/or other descriptive information delivered to different classes of users. In addition, author 3306A may wish to deliver promotional materials in the same container as submitted content depending on, for example, the character of usage exhibited by a particular user (e.g. whether the user has ever received content from author 3306A, whether the user is a regular subscriber to author 3306A's materials, and/or other patterns that may be relevant to author 3306A and/or the end user that are used to help determine the mix of promotional materials delivered to a certain VDE content end user.) In another example, author 3306A may require that VDE fingerprinting be performed on such content prior to transmission of content to an end user.

In addition to the form and/or character of content shipped to an end user, authors may also require certain encryption related processes to be performed by the repository as an aspect of delivering content. For example, author 3306A may have required that the repository encrypt each copy of shipped content using a different encryption key or keys in order to help maintain greater protection for content (e.g. in case an encryption key was "cracked" or inadvertently disclosed, the "damage" could be limited to the portion(s) of that specific copy of a certain content deliverable). In another example, encryption functions may include the need to use entirely different encryption algorithms and/or techniques in order to fulfill circumstantial requirements (e.g. to comply with export restrictions). In a further example, encryption related processes may include changing the encryption techniques and/or algorithms based on the level of trustedness and/or tamper resistance of the VDE site to which content is delivered.

In addition to transaction information gathered when content is shipped from a VDE repository to an end user, the repository may be required to keep transaction information related to the receipt of usage information, requests, and/or responses to and/or from end users 3310. For example, author 3306A may require the repository to keep a log of some or all connections made by end users 3310 related to transmissions and or reception of information related to the use of author 3306A's content (e.g. end user reporting of audit information, end user requests for additional permissions information, etc.)

Some VDE managed content provided to end users 3310 through the repository may be stored in content storage. Other information may be stored elsewhere, and be referenced through the content references. In the case where content references are used, the repository may manage the user interactions in such a manner that all repository content, whether stored in content storage or elsewhere (such as at another site), is presented for selection by end users 3310 in a uniform way, such as, for example, a consistent or the same user interface. If an end user requests delivery of content that is not stored in content storage, the VDE repository may locate the actual storage site for the content using information stored in content references (e.g. the network address where the content may be located, a URL, a file system reference, etc.) After the content is located, the content may be transmitted across the network to the repository or it may be delivered directly from where it is stored to the requesting end user. In some circumstances (e.g. when container modification is required, when encryption must be changed, if financial transactions are required prior to release, etc.), further processing may be required by the repository in order to prepare such VDE managed content and/or VDE content container for transmission to an end user.

In order to provide a manageable user interface to the content available to VDE repository end users 3310 and to provide administrative information used in the determination of control information packaged in VDE content containers shipped to end users 3310, the repository in this example includes a content catalog 3322. This catalog is used to record information related to the VDE content in content storage, and/or content available through the repository reflected in content references. The content catalog 3322 may consist of titles of content, abstracts, and other identifying information. In addition, the catalog may also indicate the forms of electronic agreement and/or agreement VDE template applications (offering optional, selectable control structures and/or one or more opportunities to provide related parameter data) that are available to end users 3310 through the repository for given pieces of content in deciding, for example, options and/or requirements for: what type(s) of information is recorded during such content's use, the charge for certain content usage activities, differences in charges based on whether or not certain usage information is recorded and/or made available to the repository and/or content provider, the redistribution rights associated with such content, the reporting frequency for audit transmissions, the forms of credit and/or currency that may be used to pay certain fees associated with use of such content, discounts related to certain volumes of usage, discounts available due to the presence of rights associated with other content from the same and/or different content providers, sales, etc. Furthermore, a VDE repository content catalog 3322 may indicate some or all of the component assemblies that are required in order to make use of content such that the end user's system and the repository can exchange messages to help ensure that any necessary VDE component assemblies or other VDE control information is identified, and if necessary and authorized, are delivered along with such content to the end user (rather than, for example, being requested later after their absence has been detected during a registration and/or use attempt).

In order to make use of the VDE repository in this example, an end user must register with the repository. In a manner similar to that indicated above in the case of an author, a VDE end user transmits a message from her VDE installation to the repository across the network indicating that she wishes to make use of the services provided by the repository (e.g. access content stored at and/or referenced by the repository, use credit provided by the repository, etc.) In response to this message, the user/author registration systems of the content system 3302A and the clearinghouse system 3302B of the repository transmit requests for information from the end user (e.g. in an on-line and/or batch interaction). The information requested by the user/author registration system of the content system 3302A may include type(s) of content that the user wishes to access, the characteristics of the user's electronic appliance 600, etc. The information requested by the user/author registration system of the clearinghouse system 3302B may include whether the user wishes to establish a credit account with the clearinghouse system 3302B, what other forms of credit the user may wish to use for billing purposes, what other clearinghouses may be used by the end user in the course of interacting with content obtained from the repository, any general rules that the user has established regarding their preferences for release and handling of usage analysis information, etc. Once the end user has completed the registration information and transmitted it to the repository, the repository may construct an account profile for the user. In this example, such requests and responses are handled by secure VDE communications between secure VDE subsystems of both sending and receiving parties.

In order to make use of the repository, the end user may operate application software. In this example, the end user may either make use of a standard application program (e.g. a World Wide Web browser such as Mosaic), or they may make use of application software provided by the repository after completion of the registration process. If the end user chooses to make use of the application software provided by the repository, they may be able to avoid certain complexities of interaction that may occur if a standard package is used. Although standardized packages are often relatively easy to use, a customized package that incorporates VDE aware functionality may provide an easier to use interface for a user. In addition, certain characteristics of the repository may be built in to the interface to simplify use of the services (e.g. similar to the application programs provided by America Online).

The end user may connect to the repository using the network. In this example, after the user connects to the repository, an authentication process will occur. This process can either be directed by the user (e.g. through use of a login and password protocol) or may be established by the end user's electronic appliance secure subsystems interacting with a repository electronic appliance in a VDE authentication. In either event, the repository and the user must initially ensure that they are connected to the correct other party. In this example, if secured information will flow between the parties, a VDE secured authentication must occur, and a secure session must be established. On the other hand, if the information to be exchanged has already been secured and/or is available without authentication (e.g. certain catalog information, containers that have already been encrypted and do not require special handling, etc.), the "weaker" form of login/password may be used.

Once an end user has connected to the VDE repository and authentication has occurred, the user may begin manipulating and directing their user interface software to browse through a repository content catalog 3322 (e.g. lists of publications, software, games, movies, etc.), use the search mechanism to help locate content of interest, schedule content for delivery, make inquiries of account status, availability of usage analysis information, billing information, registration and account profile information, etc. If a user is connecting to obtain content, the usage requirements for that content may be delivered to them. If the user is connecting to deliver usage information to the repository, information related to that transmission may be delivered to them. Some of these processes are described in more detail below.

In this example, when an end user requests content from the VDE repository (e.g. by selecting from a menu of available options), the content system 3302A locates the content either in the content references and/or in content storage. The content system 3302A may then refer to information stored in the content catalog 3322, the end user's account profile, and/or the author's account profile to determine the precise nature of container format and/or control information that may be required to create a VDE content container to fulfill the end user's request. The shipping system then accesses the clearinghouse system 3302B to gather any necessary additional control structures to include with the container, to determine any characteristics of the author's and/or end user's account profiles that may influence either the transaction(s) associated with delivering the content to the end user or with whether the transaction may be processed. If the transaction is authorized, and all elements necessary for the container are available, the controls packager forms a package of control information appropriate for this request by this end user, and the container packager takes this package of control information and the content and forms an appropriate container (including any permissions that may be codeliverable with the container, incorporating any encryption requirements, etc.) If required by the repository or the author's account profile, transactions related to delivery of content are recorded by the transaction system of the shipping system. When the container and any transactions related to delivery have been completed, the container is transmitted across the network to the end user.

An end user may make use of credit and/or currency securely stored within the end user's VDE installation secure subsystem to pay for charges related to use of VDE content received from the repository, and/or the user may maintain a secure credit and/or currency account remotely at the repository, including a "virtual" repository where payment is made for the receipt of such content by an end user. This later approach may provide greater assurance for payment to the repository and/or content providers particularly if the end user has only an HPE based secure subsystem. If an end user electronic credit and/or currency account is maintained at the repository in this example, charges are made to said account based on end user receipt of content from the repository. Further charges to such a remote end user account may be made based on end user usage of such received content and based upon content usage information communicated to the repository clearinghouse system 3302B.

In this example, if an end user does not have a relationship established with a financial provider (who has authorized the content providers whose content may be obtained through use of the repository to make use of their currency and/or credit to pay for any usage fees associated with such provider's content) and/or if an end user desires a new source of such credit, the end user may request credit from the repository clearinghouse system 3302B. If an end user is approved for credit, the repository may extend credit in the form of credit amounts (e.g. recorded in one or more UDEs) associated with a budget method managed by the repository. Periodically, usage information associated with such a budget method is transmitted by the end user to the audit system of the repository. After such a transmission (but potentially before the connection is terminated), an amount owing is recorded for processing by the billing system, and in accordance with the repository's business practices, the amount of credit available for use by the end user may be replenished in the same or subsequent transmission. In this example, the clearinghouse of the repository supports a billing system with a paper system for resolving amounts owed through the mail, a credit card system for resolving amounts owed through charges to one or more credit cards, and an electronic funds transfer system for resolving such amounts through direct debits to a bank account. The repository may automatically make payments determined by the disbursement system for monies owed to authors through use of similar means. Additional detail regarding the audit process is provided below.

As indicated above, end users 3310 in this example will periodically contact the VDE repository to transmit content usage information (e.g. related to consumption of budget, recording of other usage activities, etc.), replenish their budgets, modify their account profile, access usage analysis information, and perform other administrative and information exchange activities. In some cases, an end user may wish to contact the repository to obtain additional control structures. For example, if an end user has requested and obtained a VDE content container from the repository, that container is typically shipped to the end user along with control structures appropriate to the content, the author's requirements and account profile, the end user's account profile, the content catalog 3322, and/or the circumstances of the delivery (e.g. the first delivery from a particular author, a subscription, a marketing promotion, presence and/or absence of certain advertising materials, requests formulated on behalf of the user by the user's local VDE instance, etc.) Even though, in this example, the repository may have attempted to deliver all relevant control structures, some containers may include controls structures that allow for options that the end user did not anticipate exercising (and the other criteria did not automatically select for inclusion in the container) that the end user nonetheless determines that they would like to exercise. In this case; the end user may wish to contact the repository and request any additional control information (including, for example, control structures) that they will need in order to make use of the content under such option.

For example, if an end user has obtained a VDE content container with an overall control structure that includes an option that records of the number of times that certain types of accesses are made to the container and further bases usage fees on the number of such accesses, and another option within the overall control structure allows the end user to base the fees paid for access to a particular container based on the length of time spent using the content of the container, and the end user did not originally receive controls that would support this latter form of usage, the repository may deliver such controls at a later time and when requested by the user. In another example, an author may have made changes to their control structures (e.g. to reflect a sale, a new discounting model, a modified business strategy, etc.) which a user may or must receive in order to use the content container with the changed control structures. For, example, one or more control structures associated with a certain VDE content container may require a "refresh" for continued authorization to employ such structures, or the control structures may expire. This allows (if desired) a VDE content provider to periodically modify and/or add to VDE control information at an end user's site (employing the local VDE secure subsystem).

Audit information (related to usage of content received from the repository) in this example is securely received from end users 3310 by the receipt system 3362 of the clearinghouse. As indicated above, this system may process the audit information and pass some or all of the output of such a process to the billing system and/or transmit such output to appropriate content authors. Such passing of audit information employs secure VDE pathway of reporting information handling techniques. Audit information may also be passed to the analysis system in order to produce analysis results related to end user content usage for use by the end user, the repository, third party market researchers, and/or one or more authors. Analysis results may be based on a single audit transmission, a portion of an audit transmission, a collection of audit transmissions from a single end user and/or multiple end users 3310, or some combination of audit transmissions based on the subject of analysis (e.g. usage patterns for a given content element or collection of elements, usage of certain categories of content, payment histories, demographic usage patterns, etc.) The response system 3364 is used to send information to the end user to, for example, replenish a budget, deliver usage controls, update permissions information, and to transmit certain other information and/or messages requested and/or required by an end user in the course of their interaction with the clearinghouse. During the course of an end user's connections and transmissions to and from the clearinghouse, certain transactions (e.g. time, date, and/or purpose of a connection and/or transmission) may be recorded by the transaction system of the audit system to reflect requirements of the repository and/or authors.

Certain audit information may be transmitted to authors. For example, author 3306A may require that certain information gathered from an end user be transmitted to author 3306A with no processing by the audit system. In this case, the fact of the transmission may be recorded by the audit system, but author 3306A may have elected to perform their own usage analysis rather than (or in addition to) permitting the repository to access, otherwise process and/or otherwise use this information. The repository in this example may provide author 3306A with some of the usage information related to the repository's budget method received from one or more end users 3310 and generated by the payment of fees associated with such users' usage of content provided by author 3306A. In this case, author 3306A may be able to compare certain usage information related to content with the usage information related to the repository's budget method for the content to analyze patterns of usage (e.g. to analyze usage in light of fees, detect possible fraud, generate user profile information, etc.) Any usage fees collected by the clearinghouse associated with author 3306A's content that are due to author 3306A will be determined by the disbursement system of the clearinghouse. The disbursement system may include usage information (in complete or summary form) with any payments to author 3306A resulting from such a determination. Such payments and information reporting may be an entirely automated sequence of processes occurring within the VDE pathway from end user VDE secure subsystems, to the clearinghouse secure subsystem, to the author's secure subsystem.

In this example, end users 3310 may transmit VDE permissions and/or other control information to the repository 3302 permitting and/or denying access to usage information collected by the audit system for use by the analysis system. This, in part, may help ensure end user's privacy rights as it relates to the usage of such information. Some containers may require, as an aspect of their control structures, that an end user make usage information available for analysis purposes. Other containers may give an end user the option of either allowing the usage information to be used for analysis, or denying some or all such uses of such information. Some users may elect to allow analysis of certain information, and deny this permission for other information. End users 3310 in this example may, for example, elect to limit the granularity of information that may be used for analysis purposes (e.g. an end user may allow analysis of the number of movies viewed in a time period but disallow use of specific titles, an end user may allow release of their ZIP code for demographic analysis, but disallow use of their name and address, etc.) Authors and/or the repository 3302 may, for example, choose to charge end users 3310 smaller fees if they agree to release certain usage information for analysis purposes.

In this example, the repository 3302 may receive content produced by more than one author. For example, author B, author C, and author D may each create portions of content that will be delivered to end users 3310 in a single container. For example, author B may produce a reference work. Author C may produce a commentary on author B's reference work, and author D may produce a set of illustrations for author B's reference work and author C's commentary. Author B may collect together author C's and author D's content and add further content (e.g. the reference work described above) and include such content in a single container which is then transmitted to the repository 3302. Alternatively, each of the authors may transmit their works to the repository 3302 independently, with an indication that a template should be used to combine their respective works prior to shipping a container to an end user. Still alternatively, a container reflecting the overall content structure may be transmitted to the repository 3302 and some or all of the content may be referenced in the content references rather than delivered to the repository 3302 for storage in content storage.

When an end user makes use of container content, their content usage information may, for example, be segregated in accordance with control structures that organize usage information based at least in part on the author who created that segment. Alternatively, the authors and/or the VDE repository 3302 may negotiate one or more other techniques for securely dividing and/or sharing usage information in accordance with VDE control information. Furthermore, control structures associated with a container may implement models that differentiate any usage fees associated with portions of content based on usage of particular portions, overall usage of the container, particular patterns of usage, or other mechanism negotiated (or otherwise agreed to) by the authors. Reports of usage information, analysis results, disbursements, and other clearinghouse processes may also be generated in a manner that reflects agreements reached by repository 3302 participants (authors, end users 3310 and/or the repository 3302) with respect to such processes. These agreements may be the result of a VDE control information negotiation amongst these participants.

In this example, one type of author is a publisher 3308. The publisher 3308 in this example communicates over an "internal" network with a VDE based local repository 3302 and over the network described above with the public repository 3302. The publisher 3308 may create or otherwise provide content and/or VDE control structure templates that are delivered to the local repository 3302 for use by other participants who have access to—the "internal" network. These templates may be used to describe the structure of containers, and may further describe whom in the publisher 3308's organization may take which actions with respect to the content created within the organization related to publication for delivery to (and/or referencing by) the repository 3302. For example, the publisher 3308 may decide (and control by use of said temple) that a periodical publication will have a certain format with respect to the structure of its content and the types of information that may be included (e.g. text, graphics, multimedia presentations, advertisements, etc.), the relative location and/or order of presentation of its content, the length of certain segments, etc. Furthermore, the publisher 3308 may, for example, determine (through distribution of appropriate permissions) that the publication editor is the only party that may grant permissions to write into the container, and that the organization librarian is the only party that may index and/or abstract the content. In addition, the publisher 3308 may, for example, allow only certain one or more parties to finalize a container for delivery to the repository 3302 in usable form (e.g. by maintaining control over the type of permissions, including distribution permissions, that may be required by the repository 3302 to perform subsequent distribution activities related to repository end users 3310).

In this example, author 3306E is connected directly to the publisher 3308, such that the publisher 3308 can provide templates for that author that establish the character of containers for author 3306E's content. For example, if author 3306E creates books for distribution by the publisher 3308, the publisher 3308 may define the VDE control structure template which provides control method options for author 3306E to select from and which provides VDE control structures for securely distributing author 3306E's works. Author 3306E and the publisher 3308 may employ VDE negotiations for the template characteristics, specific control structures, and/or parameter data used by author 3306E. Author 3306E may then use the template(s) to create control structures for their content containers. The publisher 3308 may then deliver these works to the repository 3302 under a VDE extended agreement comprising electronic agreements between author 3306E and the publisher 3308 and the repository 3302 and the publisher 3308.

In this example, the publisher 3308 may also make author 3306E's work available on the local repository 3302. The editor may authorize (e.g. through distribution of appropriate permissions) author F to create certain portions of content for a publication. In this example, the editor may review and/or modify author F's work and further include it in a container with content provided by author 3306E (available on the local repository 3302). The editor may or may not have permissions from the publisher 3308 to modify author 3306E's content (depending on any negotiation(s) that may have occurred between the publisher 3308 and author 3306E, and the publisher 3308's decision to extend such rights to the editor if permissions to modify author 3306E's content are held in redistributable form by the publisher 3308). The editor may also include content from other authors by (a) using a process of granting permissions to authors to write directly into the containers and/or (b) retrieving containers from the local repository 3302 for inclusion. The local repository 3302 may also be used for other material used by the publisher 3308's organization (e.g. databases, other reference works, internal documents, draft works for review, training videos, etc.), such material may, given appropriate permissions, be employed in VDE container collections of content created by the editor.

The librarian in this example has responsibility for building and/or editing inverted indexes, keyword lists (e.g. from a restricted vocabulary), abstracts of content, revision histories, etc. The publisher 3308 may, for example, grant permissions to only the librarian for creating this type of content. The publisher 3308 may further require that this building and/or editing occur prior to release of content to the repository 3302.

Example—Evolution and Transformation of VDE Managed Content and Control Information The VDE content control architecture allows content control information (such as control information for governing content usage) to be shaped to conform to VDE control information requirements of multiple parties. Formulating such multiple party content control information normally involves securely deriving control information from control information securely contributed by parties who play a role in a content handling and control model (e.g. content creator(s), provider(s), user(s), clearinghouse(s), etc.). Multiple party control information may be necessary in order to combine multiple pieces of independently managed VDE content into a single VDE container object (particularly if such independently managed content pieces have differing, for example conflicting, content control information). Such secure combination of VDE managed pieces of content will frequently require VDE's ability to securely derive content control information which accommodates the control information requirements, including any combinatorial rules, of the respective VDE managed pieces of content and reflects an acceptable agreement between such plural control information sets.

The combination of VDE managed content pieces may result in a VDE managed composite of content. Combining VDE managed content must be carried out in accordance with relevant content control information associated with said content pieces and processed through the use of one or more secure VDE sub-system PPEs 650. VDE's ability to support the embedding, or otherwise combining, of VDE managed content pieces, so as to create a combination product comprised of various pieces of VDE content, enables VDE content providers to optimize their VDE electronic content products. The combining of VDE managed content pieces may result in a VDE content container which "holds" consolidated content and/or concomitant, separate, nested VDE content containers.

VDE's support for creation of content containers holding distinct pieces of VDE content portions that were previously managed separately allows VDE content providers to develop products whose content control information reflects value propositions consistent with the objectives of the providers of content pieces, and further are consistent with the objectives of a content aggregator who may be producing a certain content combination as a product for commercial distribution. For example, a content product "launched" by a certain content provider into a commercial channel (such as a network repository) may be incorporated by different content providers and/or end-users into VDE content containers (so long as such incorporation is allowed by the launched product's content control information). These different content providers and/or end-users may, for example, submit differing control information for regulating use of such content. They may also combine in different combinations a certain portion of launched content with content received from other parties (and/or produced by themselves) to produce different content collections, given appropriate authorizations.

VDE thus enables copies of a given piece of VDE managed content to be securely combined into differing consolidations of content, each of which reflects a product strategy of a different VDE content aggregator. VDE's content aggregation capability will result in a wider range of competitive electronic content products which offer differing overall collections of content and may employ differing content control information for content that may be common to such multiple products. Importantly, VDE securely and flexibly supports editing the content in, extracting content from, embedding content into, and otherwise shaping the content composition of, VDE content containers. Such capabilities allow VDE supported product models to evolve by progressively reflecting the requirements of "next" participants in an electronic commercial model. As a result, a given piece of VDE managed content, as it moves through pathways of handling and branching, can participate in many different content container and content control information commercial models.

VDE content, and the electronic agreements associated with said content, can be employed and progressively manipulated in commercial ways which reflect traditional business practices for non-electronic products (though VDE supports greater flexibility and efficiency compared with most of such traditional models). Limited only by the VDE control information employed by content creators, other providers, and other pathway of handling and control participants, VDE allows a "natural" and unhindered flow of, and creation of, electronic content product models. VDE provides for this flow of VDE products and services through a network of creators, providers, and users who successively and securely shape and reshape product composition through content combining, extracting, and editing within a Virtual Distribution Environment.

VDE provides means to securely combine content provided at different times, by differing sources, and/or representing differing content types. These types, timings, and/or different sources of content can be employed to form a complex array of content within a VDE content container. For example, a VDE content container may contain a plurality of different content container objects, each containing different content whose usage can be controlled, at least in part, by its own container's set of VDE content control information.

A VDE content container object may, through the use of a secure VDE sub-system, be "safely" embedded within a "parent" VDE content container. This embedding process may involve the creation of an embedded object, or, alternatively, the containing, within a VDE content container, of a previously independent and now embedded object by, at minimum, appropriately referencing said object as to its location.

An embedded content object within a parent VDE content container:

(1) may have been a previously created VDE content container which has been embedded into a parent VDE content container by securely transforming it from an independent to an embedded object through the secure processing of one or more VDE component assemblies within a VDE secure sub-system PPE 650. In this instance, an embedded object may be subject to content control information, including one or more permissions records associated with the parent container, but may not, for example, have its own content control information other than content identification information, or the embedded object may be more extensively controlled by its own content control information (e.g. permissions records).

(2) may include content which was extracted from another VDE content container (along with content control information, as may be applicable) for inclusion into a parent VDE content container in the form of an embedded VDE content container object. In this case, said extraction and embedding may use one or more VDE processes which run securely within a VDE secure sub-system PPE 650 and which may securely remove (or copy) the desired content from a source VDE content container and place such content in a new or existing container object, either of which may be or become embedded into a parent VDE content container.

(3) may include content which was first created and then placed in a VDE content container object. Said receiving container may already be embedded in a parent VDE content container and may already contain other content. The container in which such content is placed may be specified using a VDE aware application which interacts with content and a secure VDE subsystem to securely create such VDE container and place such content therein followed by securely embedding such container into the destination, parent container. Alternatively, content may be specified without the use of a VDE aware application, and then manipulated using a VDE aware application in order to manage movement of the content into a VDE content container. Such an application may be a VDE aware word processor, desktop and/or multimedia publishing package, graphics and/or presentation package, etc. It may also be an operating system function (e.g. part of a VDE aware operating system or mini-application operating with an O/S such as a Microsoft Windows compatible object packaging application) and movement of content from "outside" VDE to within a VDE object may, for example, be based on a "drag and drop" metaphor that involves "dragging" a file to a VDE container object using a pointing device such as a mouse. Alternatively, a user may "cut" a portion of content and "paste" such a portion into a VDE container by first placing content into a "clipboard," then selecting a target content object and pasting the content into such an object. Such processes may, at the direction of VDE content control information and under the control of a VDE secure subsystem, put the content automatically at some position in the target object, such as at the end of the object or in a portion of the object that corresponds to an identifier carried by or with the content such as a field identifier, or the embedding process might pop-up a user interface that allows a user to browse a target object's contents and/or table of contents and/or other directories, indexes, etc. Such processes may further allow a user to make certain decisions concerning VDE content control information (budgets limiting use, reporting pathway(s), usage registration requirements, etc.) to be applied to such embedded content and/or may involve selecting the specific location for embedding the content, all such processes to be performed as transparently as practical for the application.

(4) may be accessed in conjunction with one or more operating system utilities for object embedding and linking, such as utilities conforming to the Microsoft OLE standard. In this case, a VDE container may be associated with an OLE "link." Accesses (including reading content from, and writing content to) to a VDE protected container may be passed from an OLE aware application to a VDE aware OLE application that accesses protected content in conjunction with control information associated with such content.

A VDE aware application may also interact with component assemblies within a PPE to allow direct editing of the content of a VDE container, whether the content is in a parent or embedded VDE content container. This may include the use of a VDE aware word processor, for example, to directly edit (add to, delete, or otherwise modify) a VDE container's content. The secure VDE processes underlying VDE container content editing may be largely or entirely transparent to the editor (user) and may transparently enable the editor to securely browse through (using a VDE aware application) some or all of the contents of and securely modify one or more of the VDE content containers embedded in, a VDE content container hierarchy.

The embedding processes for all VDE embedded content containers normally involves securely identifying the appropriate content control information for the embedded content. For example, VDE content control information for a VDE installation and/or a VDE content container may securely, and transparently to an embedder (user), apply the same content control information to edited (such as modified or additional) container content as is applied to one or more portions (including all, for example) of previously "in place" content of said container and/or securely apply control information generated through a VDE control information negotiation between control sets, and/or it may apply control information previously applied to said content. Application of control information may occur regardless of whether the edited content is in a parent or embedded container. This same capability of securely applying content control information (which may be automatically and/or transparently applied), may also be employed with content that is embedded into a VDE container through extracting and embedding content, or through the moving, or copying and embedding, of VDE container objects. Application of content control information normally occurs securely within one or more VDE secure sub-system PPEs 650. This process may employ a VDE template that enables a user, through easy to use GUI user interface tools, to specify VDE content control information for certain or all embedded content, and which may include menu driven, user selectable and/or definable options, such as picking amongst alternative control methods (e.g. between different forms of metering) which may be represented by different icons picturing (symbolizing) different control functions and apply such functions to an increment of VDE secured content, such as an embedded object listed on an object directory display:

Extracting content from a VDE content container, or editing or otherwise creating VDE content with a VDE aware application, provides content which may be placed within a new VDE content container object for embedding into said parent VDE container, or such content may be directly placed into a previously existing content container. All of these processes may be managed by processing VDE content control information within one or more VDE installation secure subsystems.

VDE content container objects may be embedded in a parent object through control information referenced by a parent object permissions record that resolves said embedded object's location and/or contents. In this case, little or no change to the embedded object's previously existing content control information may be required. VDE securely managed content which is relocated to a certain VDE content container may be relocated through the use of VDE sub-system secure processes which may, for example, continue to maintain relocated content as encrypted or otherwise protected (e.g. by secure tamper resistant barrier 502) during a relocation/embedding process.

Embedded content (and/or content objects) may have been contributed by different parties and may be integrated into a VDE container through a VDE content and content control information integration process securely managed through the use of one or more secure VDE subsystems. This process may, for example, involve one or more of:

(1.) securely applying instructions controlling the embedding and/or use of said submitted content, wherein said instructions were securely put in place, at least in part, by a content provider and/or user of said VDE container. For example, said user and/or provider may interact with one or more user interfaces offering a selection of content embedding and/or control options (e.g. in the form of a VDE template). Such options may include which, and/or whether, one or more controls should be applied to one or more portions of said content and/or the entry of content control parameter data (such a time period before which said content may not be used, cost of use of content, and/or pricing discount control parameters such as software program suite sale discounting). Once required and/or optional content control information is established by a provider and/or user, it may function as content control information which may be, in part or in full, applied automatically to certain, or all, content which is embedded in a VDE content container.

(2.) secure VDE managed negotiation activities, including the use of a user interface interaction between a user at a receiving VDE installation and VDE content control information associated with the content being submitted for embedding. For example, such associated control information may propose certain content information and the content receiver may, for example, accept, select from a plurality, reject, offer alternative control information, and/or apply conditions to the use of certain content control information (for example, accept a certain one or more controls if said content is used by a certain one or more users and/or if the volume of usage of certain content exceeds a certain level).

(3.) a secure, automated, VDE electronic negotiation process involving VDE content control information of the receiving VDE content container and/or VDE installation and content control information associated with the submitted content (such as control information in a permissions record of a contributed VDE object, certain component assemblies, parameter data in one or more UDEs and/or MDEs, etc.).

Content embedded into a VDE content container may be embedded in the form of:

(1.) content that is directly, securely integrated into previously existing content of a VDE content container (said container may be a parent or embedded content container) without the formation of a new container object. Content control information associated with said content after embedding must be consistent with any pre-embedding content control information controlling, at least in part, the establishment of control information required after embedding. Content control information for such directly integrated, embedded content may be integrated into, and/or otherwise comprise a portion of, control information (e.g. in one or more permissions records containing content control information) for said VDE container, and/or (2.) content that is integrated into said container in one or more objects which are nested within said VDE content container object. In this instance, control information for said content may be carried by either the content control information for the parent VDE content container, or it may, for example, be in part or in full carried by one or more permissions records contained within and/or specifically associated with one or more content containing nested VDE objects. Such nesting of VDE content containing objects within a parent VDE content container may employ a number of levels, that is a VDE content container nested in a VDE content container may itself contain one or more nested VDE content containers.

VDE content containers may have a nested structure comprising one or more nested containers (objects) that may themselves store further containers and/or one or more types of content, for example, text, images, audio, and/or any other type of electronic information (object content may be specified by content control information referencing, for example, byte offset locations on storage media). Such content may be stored, communicated, and/or used in stream (such as dynamically accumulating and/or flowing) and/or static (fixed, such as predefined, complete file) form. Such content may be derived by extracting a subset of the content of one or more VDE content containers to directly produce one or more resulting VDE content containers. VDE securely managed content (e.g. through the use of a VDE aware application or operating system having extraction capability) may be identified for extraction from each of one or more locations within one or more VDE content containers and may then be securely embedded into a new or existing VDE content container through processes executing VDE controls in a secure subsystem PPE 650. Such extraction and embedding (VDE "exporting") involves securely protecting, including securely executing, the VDE exporting processes.

A VDE activity related to VDE exporting and embedding involves performing one or more transformations of VDE content from one secure form to one or more other secure forms. Such transformation(s) may be performed with or without moving transformed content to a new VDE content container (e.g. by component assemblies operating within a PPE that do not reveal, in unprotected form, the results or other output of such transforming processes without further VDE processes governing use of at least a portion of said content). One example of such a transformation process may involve performing mathematical transformations and producing results, such as mathematical results, while retaining, none, some, or all of the content information on which said transformation was performed. Other examples of such transformations include converting a document format (such as from a WordPerfect format to a Word for Windows format, or an SGML document to a Postscript document), changing a video format (such as a QuickTime video format to a MPEG video format), performing an artificial intelligence process (such as analyzing text to produce a summary report), and other processing that derives VDE secured content from other VDE secured content.

Figure 79:
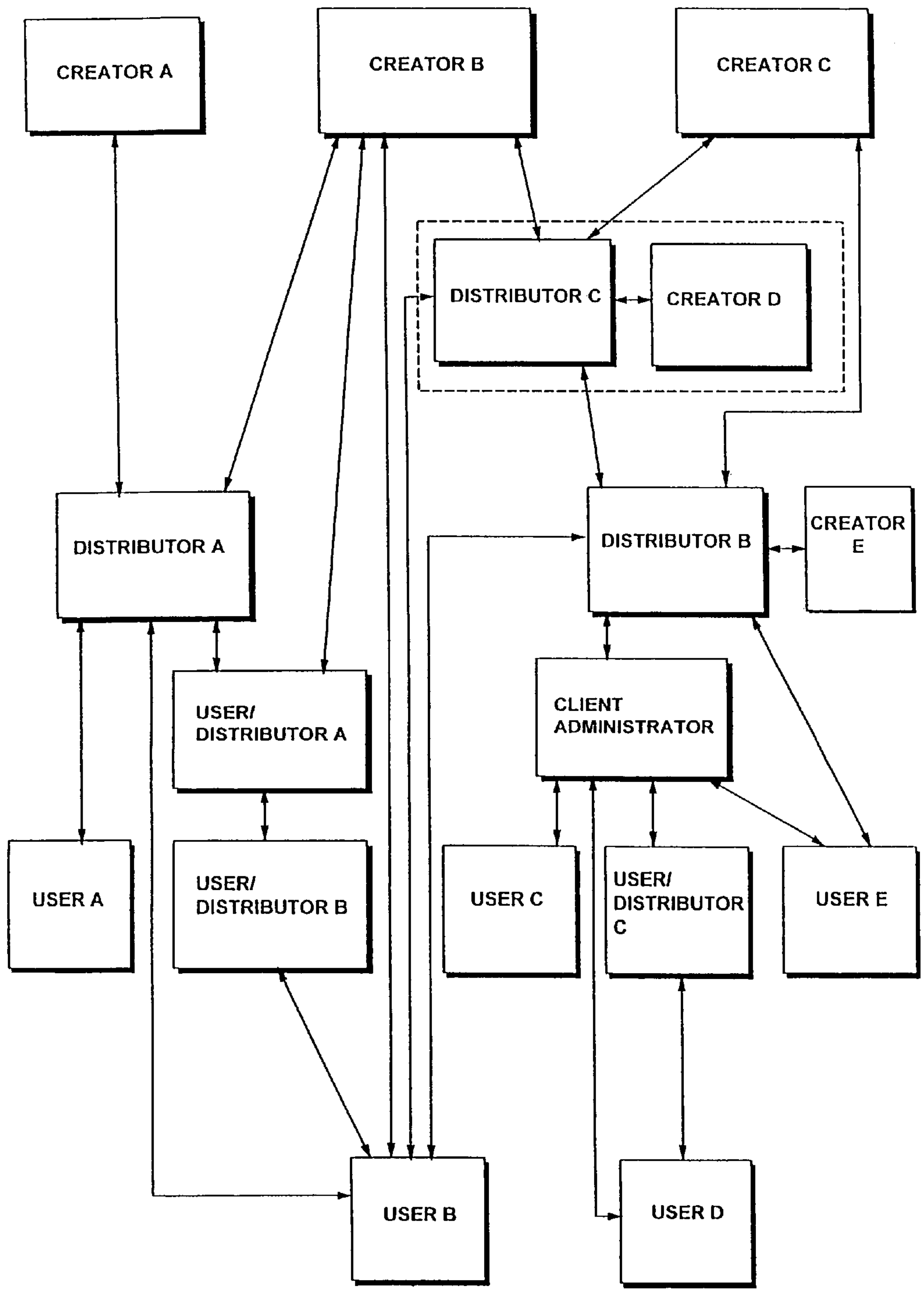
FIGS. 79-83 show an example illustrating a chain of handling and control to evolve and transform VDE managed content and control information.

FIG. 79 shows an example of an arrangement of commercial VDE users. The users in this example create, distribute, redistribute, and use content in a variety of ways. This example shows how certain aspects of control information associated with content may evolve as control information passes through a chain of handling and control. These VDE users and controls are explained in more detail below.

Figure 80:
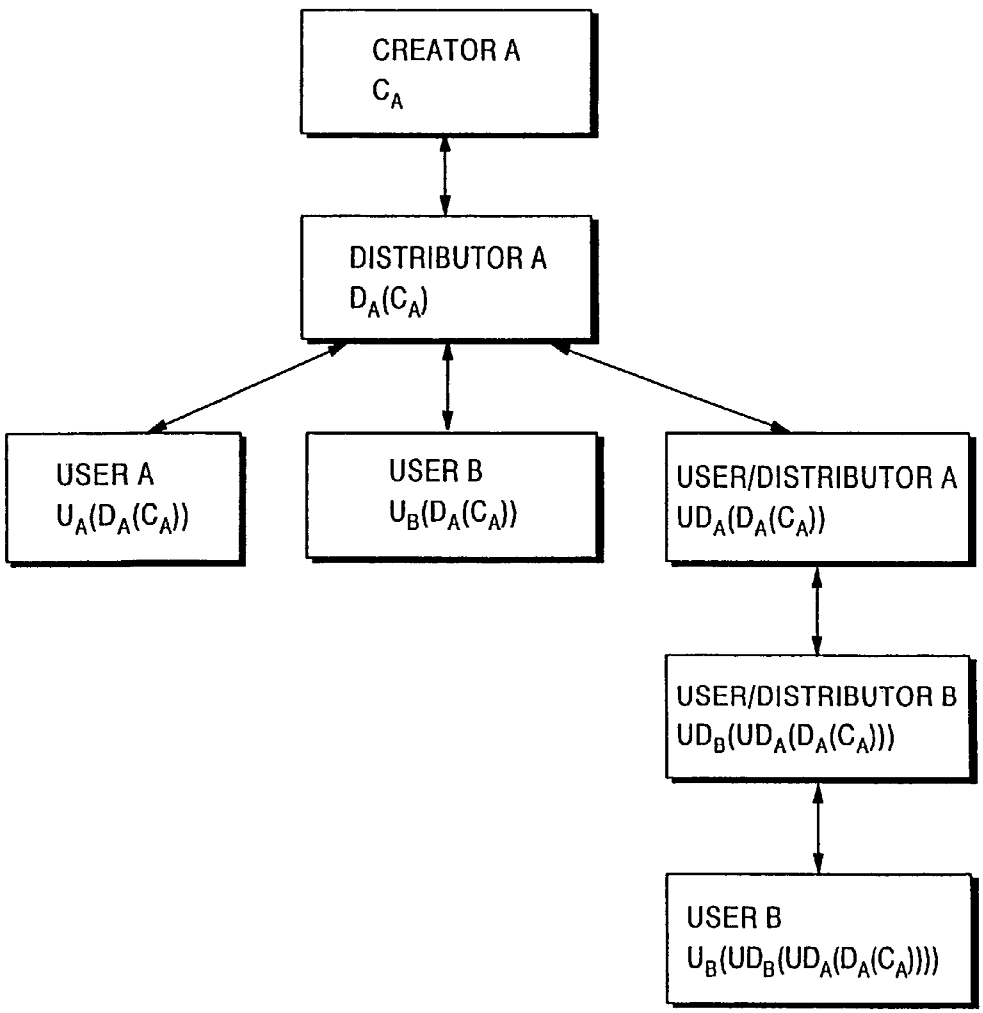

Creator A in this example creates a VDE container and provides associated content control information that includes references (amongst other things) to several examples of possible "types" of VDE control information. In order to help illustrate this example, some of the VDE control information passed to another VDE participant is grouped into three categories in the following more detailed discussion: distribution control information, redistribution control information, and usage control information. In this example, a fourth category of embedding control information can be considered an element of all three of the preceding categories. Other groupings of control information are possible (VDE does not require organizing control information in this way). The content control information associated with this example of a container created by creator A is indicated on FIG. 80 as $C_A$. FIG. 80 further shows the VDE participants who may receive enabling control information related to creator A's VDE content container. Some of the control information in this example is explained in more detail below.

Some of the distribution control information (in this example, control information primarily associated with creation, modification, and/or use of control information by distributors) specified by creator A includes: (a) distributors will compensate creator A for each active user of the content of the container at the rate of $10 per user per month, (b) distributors are budgeted such that they may allow no more than 100 independent users to gain access to such content (i.e. may create no more than 100 permissions records reflecting content access rights) without replenishing this budget, and (c) no distribution rights may be passed on in enabling control information (e.g. permissions records and associated component assemblies) created for distribution to other participants.

Some of the content redistribution control information (in this example, control information produced by a distributor within the scope permitted by a more senior participant in a chain of handling and control and passed to user/providers (in this example, user/distributors) and associated with controls and/or other requirements associated with redistribution activities by such user/distributors) specified by creator A includes: (a) a requirement that control information enabling content access may be redistributed by user/distributors no more than 2 levels, and further requires that each redistribution decrease this value by one, such that a first redistributor is restricted to two levels of redistribution, and a second redistributor to whom the first redistributor delivers permissions will be restricted to one additional level of redistribution, and users receiving permissions from the second redistributor will be unable to perform further redistribution (such a restriction may be enforced, for example, by including as one aspect of a VDE control method associated with creating new permissions a requirement to invoke one or more methods that: (i) locate the current level of redistribution stored, for example, as an integer value in a UDE associated with such one or more methods, (ii) compare the level of redistribution value to a limiting value, and (iii) if such level of redistribution value is less than the limiting value, increment such level of redistribution value by one before delivering such a UDE to a user as an aspect of content control information associated with VDE managed content, or fail the process if such value is equal to such a limiting value), and (b) no other special restrictions are placed on redistributors.

Some of the usage control information (in this example, control information that a creator requires a distributor to provide in control information passed to users and/or user/distributors) specified by creator A may include, for example: (a) no moves (a form of distribution explained elsewhere in this document) of the content are permitted, and (b) distributors will be required to preserve (at a minimum) sufficient metering information within usage permissions in order to calculate the number of users who have accessed the container in a month and to prevent further usage after a rental has expired (e.g. by using a meter method designed to report access usages to creator A through a chain of handling and reporting, and/or the use of expiration dates and/or time-aged encryption keys within a permissions record or other required control information).

Some of the extracting and/or embedding control information specified by creator A in this example may include a requirement that no extracting and/or embedding of the content is or will be permitted by parties in a chain of handling and control associated with this control information, except for users who have no redistribution rights related to such VDE secured content provided by Creator A. Alternatively, or in addition, as regards different portions of said content, control information enabling certain extraction and/or embedding may be provided along with the redistribution rights described in this example for use by user/distributors (who may include user content aggregators, that is they may provide content created by, and/or received from, different sources so as to create their own content products).

Distributor A in this example has selected a basic approach that distributor A prefers when offering enabling content control information to users and/or user/distributors that favors rental of content access rights over other approaches. In this example, some of the control information provided by creators will permit distributor A to fulfill this favored approach directly, and other control structures may disallow this favored approach (unless, for example, distributor A completes a successful VDE negotiation allowing such an approach and supporting appropriate control information). Many of the control structures received by distributor A, in this example, are derived from (and reflect the results of) a VDE negotiation process in which distributor A indicates a preference for distribution control information that authorizes the creation of usage control information reflecting rental based usage rights. Such distribution control information may allow distributor A to introduce and/or modify control structures provided by creators in such a way as to create control information for distribution to users and/or user/distributors that, in effect, "rent" access rights. Furthermore, distributor A in this example services requests from user/distributors for redistribution rights, and therefore also favors distribution control information negotiated (or otherwise agreed to) with creators that permits distributor A to include such rights as an aspect of control information produced by distributor A.

In this example, distributor A and creator A may use VDE to negotiate (for example, VDE negotiate) for a distribution relationship. Since in this example creator A has produced a VDE content container and associated control information that indicates creator A's desire to receive compensation based on rental of usage rights, and such control information further indicates that creator A has placed acceptable restrictions in redistribution control information that distributor A may use to service requests from user/distributors, distributor A may accept creator A's distribution control information without any negotiated changes.

After receiving enabling distribution control information from creator A, distributor A may manipulate an application program to specify some or all of the particulars of usage control information for users and/or user/distributors enabled by distributor A (as allowed, or not prevented, by senior control information). Distributor A may, for example, determine that a price of $15 per month per user would meet distributor A's business objectives with respect to payments from users for creator A's container. Distributor A must specify usage control information that fulfill the requirements of the distribution control information given to distributor A by creator A. For example, distributor A may include any required expiration dates and/or time-aged encryption keys in the specification of control information in accordance with creator A's requirements. If distributor A failed to include such information (or to meet other requirements) in their specification of control information, the control method(s) referenced in creator A's permissions record and securely invoked within a PPE 650 to actually create this control information would, in this example, fail to execute in the desired way (e.g. based on checks of proposed values in certain fields, a requirement that certain methods be included in permissions, etc.) until acceptable information were included in distributor A's control information specification.

In this example, user A may have established an account with distributor A such that user A may receive VDE managed content usage control information from distributor A. User A may receive content usage control information from distributor A to access and use creator A's content. Since the usage control information has passed through (and been added to, and/or modified by) a chain of handling including distributor A, the usage control information requested from distributor A to make use of creator A's content will, in this example, reflect a composite of control information from creator A and distributor A. For example, creator A may have established a meter method that will generate an audit record if a user accesses creator A's VDE controlled content container if the user has not previously accessed the container within the same calendar month (e.g. by storing the date of the user's last access in a UDE associated with an open container event referenced in a method core of such a meter method and comparing such a date upon subsequent access to determine if such access has occurred within the same calendar month). Distributor A may make use of such a meter method in a control method (e.g. also created and/or provided by creator A, or created and/or provided by distributor A) associated with opening creator A's container that invokes one or more billing and/or budget methods created, modified, referenced in one or more permissions records and/or parameterized by distributor A to reflect a charge for monthly usage as described above. If distributor A has specified usage and/or redistribution control information within the boundaries permitted by creator A's senior control information, a new set of control information (shown as $D_A(C_A)$ in FIG. 80) may be associated with creator A's VDE content container when control information associated with that container by distributor A are delivered to users and/or user/distributors (user A, user B, and user/distributor A in this example).

In this example, user A may receive control information related to creator A's VDE content container from distributor A. This control information may represent an extended agreement between user A and distributor A (e.g. regarding fees associated with use of content, limited redistribution rights, etc.) and distributor A and creator A (e.g. regarding the character, extent, handling, reporting, and/or other aspects of the use and/or creation of VDE controlled content usage information and/or content control information received, for example, by distributor A from creator A, or vice versa, or in other VDE content usage information handling). Such an extended agreement is enforced by processes operating within a secure subsystem of each participant's VDE installation. The portion of such an extended agreement representing control information of creator A as modified by distributor A in this example is represented by $D_A(C_A)$, including, for example, (a) control structures (e.g. one or more component assemblies, one or more permissions records, etc.), (b) the recording of usage information generated in the course of using creator A's content in conformance with requirements stated in such control information, (c) making payments (including automatic electronic credit and/or currency payments "executed" in response to such usage) as a consequence of such usage (wherein such consequences may also include electronically, securely and automatically receiving a bill delivered through use of VDE, wherein such a bill is derived from said usage), (d) other actions by user A and/or a VDE secure subsystem at user A's VDE installation that are a consequence of such usage and/or such control information.

In addition to control information $D_A(C_A)$, user A may enforce her own control information on her usage of creator A's VDE content container (within the limits of senior content control information). This control information may include, for example, (a) transaction, session, time based, and/or other thresholds placed on usage such that if such thresholds (e.g. quantity limits, for example, self imposed limits on the amount of expenditure per activity parameter) are exceeded user A must give explicit approval before continuing, (b) privacy requirements of user A with respect to the recording and/or transmission of certain usage related details relating to user A's usage of creator A's content, (c) backup requirements that user A places on herself in order to help ensure a preservation of value remaining in creator A's content container and/or local store of electronic credit and/or currency that might otherwise be lost due to system failure or other causes. The right to perform in some or all of these examples of user A's control information, in some examples, may be negotiated with distributor A. Other such user specified control information may be enforced independent of any control information received from any content provider and may be set in relationship to a user's, or more generally, a VDE installation's, control information for one or more classes, or for all classes, of content and/or electronic appliance usage. The entire set of VDE control information that may be in place during user A's usage of creator A's content container is referred to on FIG. 80 as $U_A(D_A(C_A))$. This set may represent the control information originated by creator A, as modified by distributor A, as further modified by user A, all in accordance with control information from value chain parties providing more senior control information, and therefore constitutes, for this example, a "complete" VDE extended agreement between user A, distributor A, and creator A regarding creator A's VDE content container. User B may, for example, also receive such control information $D_A(C_A)$ from distributor A, and add her own control information in authorized ways to form the set $U_B(D_A(C_A))$.

User/distributor A may also receive VDE control information from distributor A related to creator A's VDE content container. User/distributor A may, for example, both use creator A's content as a user and act as a redistributor of control information. In this example, control information $D_A(C_A)$ both enables and limits these two activities. To the extent permitted by $D_A(C_A)$, user/distributor A may create their own control information based on $D_A(C_A)$—$UD_A(D_A(C_A))$—that controls both user/distributor A's usage (in a manner similar to that described above in connection with user A and user B), and control information redistributed by user/distributor A (in a manner similar to that described above in connection with distributor A); For example, if user/distributor A redistributes $UD_A(D_A(C_A))$ to user/distributor B, user/distributor B may be required to report certain usage information to user/distributor A that was not required by either creator A or distributor A. Alternatively or in addition, user/distributor B may, for example, agree to pay user/distributor A a fee to use creator A's content based on the number of minutes user/distributor B uses creator A's content (rather than the monthly fee charged to user/distributor A by distributor A for user/distributor B's usage).

In this example, user/distributor A may distribute control information $UD_A(D_A(C_A))$ to user/distributor B that permits user/distributor B to further redistribute control information associated with creator A's content. User/distributor B may make a new set of control information $UD_B(UD_A(D_A(C_A)))$. If the control information $UD_A(D_A(C_A))$ permits user/distributor B to redistribute, the restrictions on redistribution from creator A in this example will prohibit the set $UD_B(UD_A(D_A(C_A)))$ from including further redistribution rights (e.g. providing redistribution rights to user B) because the chain of handling from distributor A to user/distributor A (distribution) and the continuation of that chain from user/distributor A to user/distributor B (first level of redistribution) and the further continuation of that chain to another user represents two levels of redistribution, and, therefore, a set $UD_B(UD_A(D_A(C_A)))$ may not, in this example, include further redistribution rights.

As indicated in FIG. 79, user B may employ content from both user/distributor B and distributor A (amongst others). In this example, as illustrated in FIG. 80, user B may receive control information associated with creator A's content from distributor A and/or user/distributor B. In either case, user B may be able to establish their own control information on $D_A(C_A)$ and/or $UD_B(UD_A(D_A(C_A)))$, respectively (if allowed by such control information. The resulting set(s) of control information, $U_B(D_A(C_A))$ and/or $U_B(UD_B(UD_A(D_A(C_A))))$ respectively, may represent different control scenarios, each of which may have benefits for user B. As described in connection with an earlier example, user B may have received control information from user/distributor B along a chain of handling including user/distributor A that bases fees on the number of minutes that user B makes use of creator A's content (and requiring user/distributor A to pay fees of $15 per month per user to distributor A regardless of the amount of usage by user B in a calendar month). This may be more favorable under some circumstances than the fees required by a direct use of control information provided by distributor A, but may also have the disadvantage of an exhausted chain of redistribution and, for example, further usage information reporting requirements included in $UD_B(UD_A(D_A(C_A)))$. If the two sets of control information $D_A(C_A)$ and $UD_B(UD_A(D_A(C_A)))$ permit (e.g. do not require exclusivity enforced, for example, by using a registration interval in an object registry used by a secure subsystem of user B's VDE installation to prevent deregistration and reregistration of different sets of control information related to a certain container (or registration of plural copies of the same content having different control information and/or being supplied by different content providers) within a particular interval of time as an aspect of an extended agreement for a chain of handling and control reflected in $D_A(C_A)$ and/or $UD_B(UD_A(D_A(C_A)))$ ), user B may have both sets of control information registered and may make use of the set that they find preferable under a given usage scenario.

Figure 81:
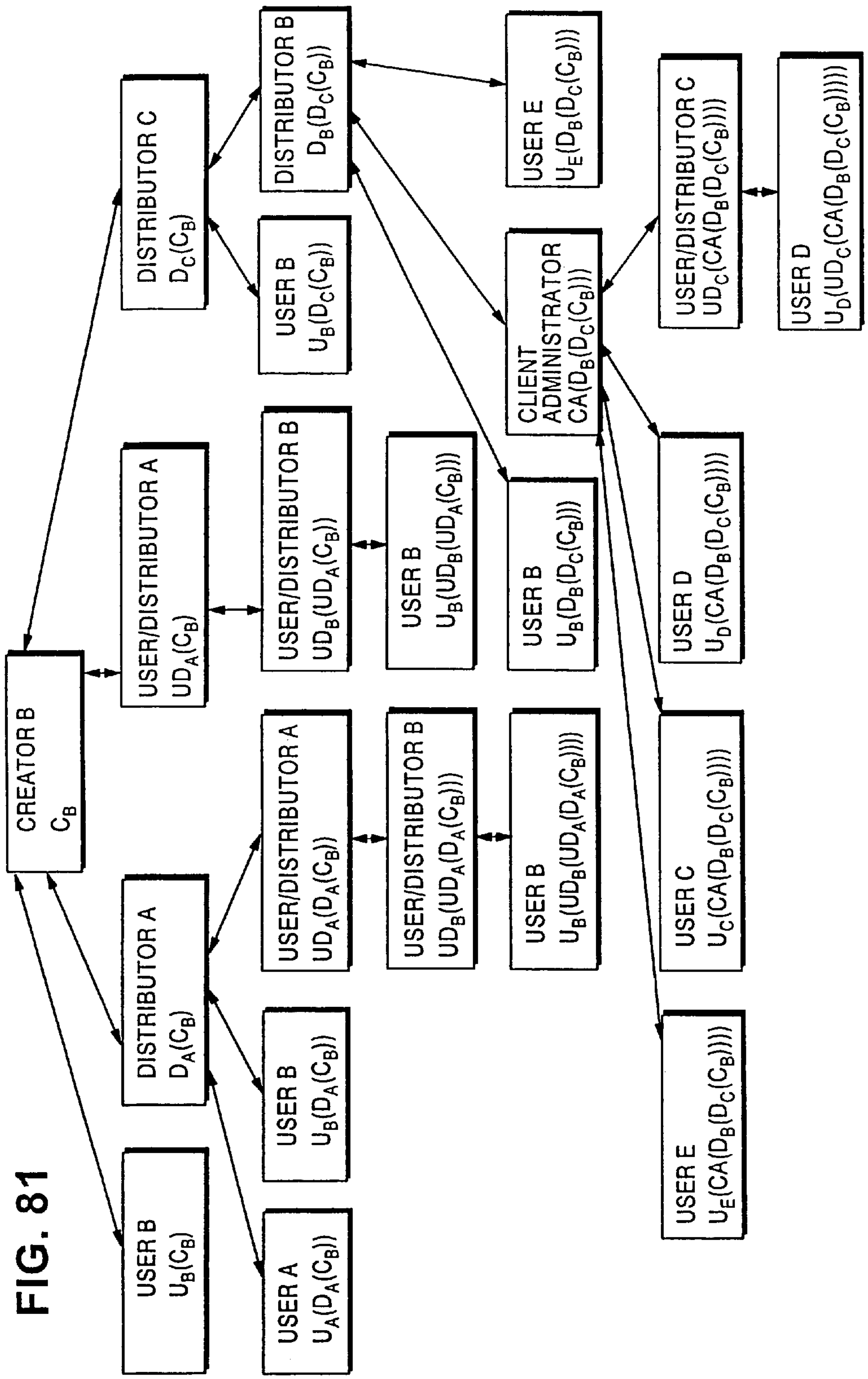

In this example, creator B creates a VDE content container and associates a set of VDE control information with such container indicated in FIG. 81 as $C_B$. FIG. 81 further shows the VDE participants who may receive enabling control information related to creator B's VDE content container. In this example, control information may indicate that distributors of creator B's content: (a) must pay creator B $0.50 per kilobyte of information decrypted by users and/or user/distributors authorized by such a distributor, (b) may allow users and/or user/distributors to embed their content container in another container while maintaining a requirement that creator B receive $0.50 per kilobyte of content decrypted, (c) have no restrictions on the number of enabling control information sets that may be generated for users and/or user/distributors, (d) must report information concerning the number of such distributed control information sets at certain time intervals (e.g. at least once per month), (e) may create control information that allows users and/or user/distributors to perform up to three moves of their control information, (f) may allow redistribution of control information by user/distributors up to three levels of redistribution, (g) may allow up to one move per user receiving redistributed control information from a user/distributor.

In this example, distributor A may request control information from creator B that enables distributor A to distribute control information to users and/or user/distributors that is associated with the VDE container described above in connection with creator B. As stated earlier, distributor A has established a business model that favors "rental" of access rights to users and user/distributors receiving such rights from distributor A. Creator B's distribution control information in this example does not force a model including "rental" of rights, but rather bases payment amounts on the quantity of content decrypted by a user or user/distributor. In this example, distributor A may use VDE to negotiate with creator B to include a different usage information recording model allowed by creator B. This model may be based on including one or more meter methods in control structures associated with creator B's container that will record the number of bytes decrypted by end users, but not charge users a fee based on such decryptions; rather distributor A proposes, and creator B's control information agrees to allow, a "rental" model to charge users, and determines the amount of payments to creator B based on information recorded by the bytes decrypted meter methods and/or collections of payment from users.

Creator B may, for example, (a) accept such a new control model with distributor A acting as the auditor (e.g. trusting a control method associated with processing audit information received by distributor A from users of creator B's content using a VDE secure subsystem at distributor A's site, and further to securely calculate amounts owed by distributor A to creator B and, for example, making payments to creator B using a mutually acceptable budget method managing payments to creator B from credit and/or currency held by distributor A), (b) accept such a new control model based on distributor A's acceptance of a third party to perform all audit functions associated with this content, (c) may accept such a model if information associated with the one or more meter methods that record the number of bytes decrypted by users is securely packaged by distributor B's VDE secure subsystem and is securely, employing VDE communications techniques, sent to creator B in addition to distributor A, and/or (d) other mutually acceptable conditions. Control information produced by distributor A based on modifications performed by distributor A as permitted by $C_B$ are referred to in this example as $D_A(C_B)$.

User A may receive a set of control information $D_A(C_B)$ from distributor A. As indicated above in connection with content received from creator A via a chain of handling including distributor A, user A may apply their own control information to the control information $D_A(C_B)$, to the extent permitted by $D_A(C_B)$, to produce a set of control information $U_A(D_A(C_B))$. The set of control information $D_A(C_B)$ may include one or more meter methods that record the number of bytes of content from creator B's container decrypted by user A (in order to allow correct calculation of amounts owed by distributor A to creator B for user A's usage of creator B's content in accordance with the control information of $C_B$ that requires payment of $0.50 per kilobyte of decrypted information), and a further meter method associated with recording usage such that distributor A may gather sufficient information to securely generate billings associated with user A's usage of creator B's content and based on a "rental" model (e.g. distributor A may, for example, have included a meter method that records each calendar month that user A makes use of creator B's content, and relates to further control information that charges user A $10 per month for each such month during which user A makes use of such content.)

User/distributor A may receive control information $C_B$ directly from creator B. In this case, creator B may use VDE to negotiate with user/distributor A and deliver a set of control information $C_B$ that may be the same or differ from that described above in connection with the distribution relationship established between creator B and distributor A. For example, user/distributor A may receive control information $C_B$ that includes a requirement that user/distributor A pay creator B for content decrypted by user/distributor A (and any participant receiving distributed and/or redistributed control information from user/distributor A) at the rate of $0.50 per kilobyte. As indicated above, user/distributor A also may receive control information associated with creator B's VDE content container from distributor A. In this example, user/distributor A may have a choice between paying a "rental" fee through a chain of handling passing through distributor A, and a fee based on the quantity of decryption through a chain of handling direct to creator B. In this case, user/distributor A may have the ability to choose to use either or both of $C_B$ and $D_A(C_B)$. As indicated earlier in connection with a chain of handling including creator A and distributor A, user/distributor A may apply her own control information to the extent permitted by $C_B$ and/or $D_A(C_B)$ to form the sets of control information $UD_A(C_B)$ and $UD_A(D_A(C_B))$, respectively.

As illustrated in FIG. 81, in this example; user B may receive control information associated with creator B's VDE content container from six different sources: $C_B$ directly from creator B, $D_A(C_B)$ from distributor A, $UD_B(UD_A(D_A(C_B)))$ and/or $UD_B(UD_A(C_B))$ from user/distributor B, $D_C(C_B)$ from distributor C, and/or $D_B(D(C_B))$ from distributor B. This represents six chains of handling through which user B may enter into extended agreements with other participants in this example. Two of these chains pass through user/distributor B. Based on a VDE negotiation between user/distributor B and user B, an extended agreement may be reached (if permitted by control information governing both parties) that reflects the conditions under which user B may use one or both sets of control information. In this example, two chains of handling and control may "converge" at user/distributor B, and then pass to user B (and if control information permits, later diverge once again based on distribution and/or redistribution by user B).

Figure 82:
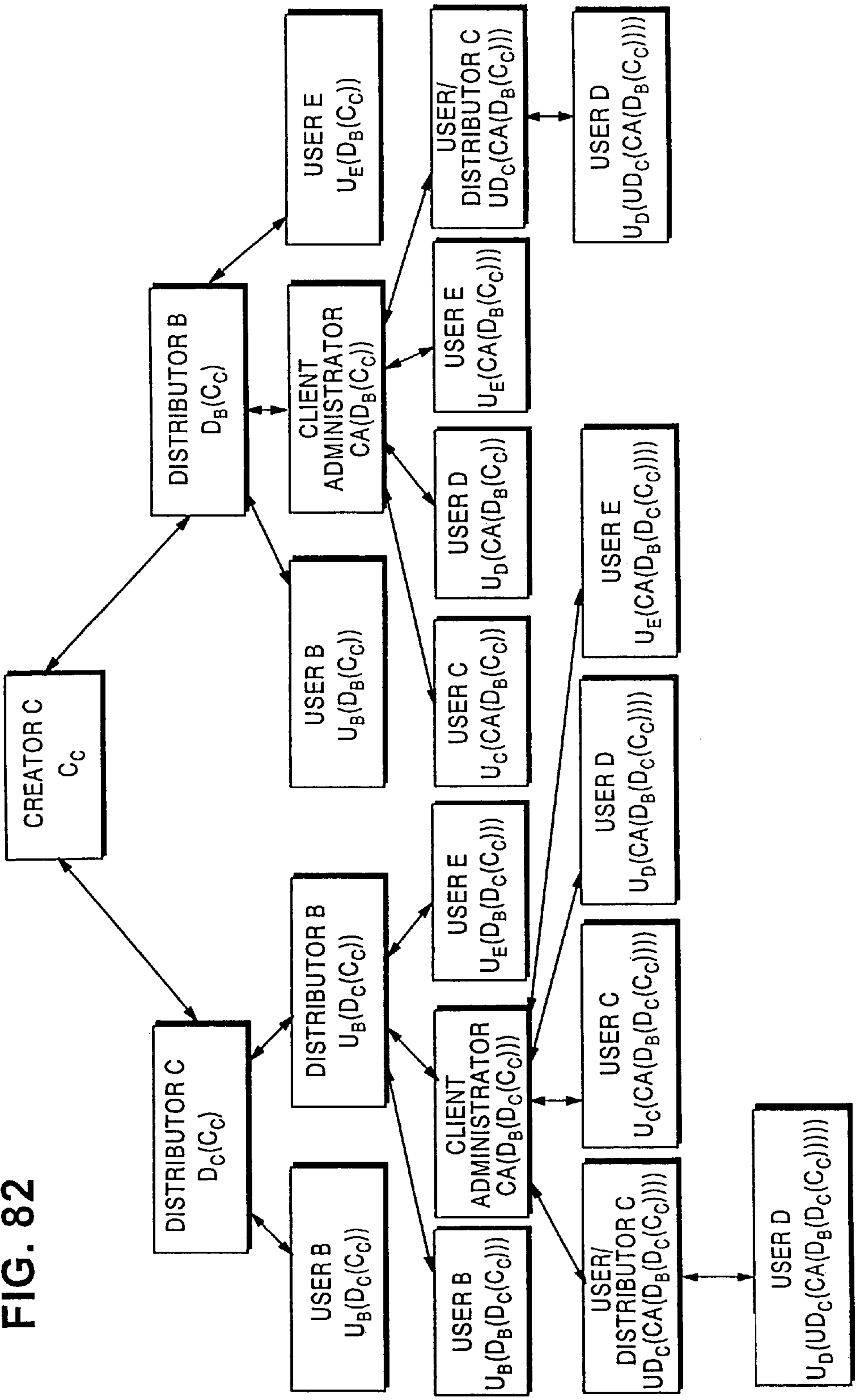

In this example, creator C produces one or more sets of control information $C_C$ associated with a VDE content container created by creator C, as shown in FIG. 82. FIG. 82 further shows the VDE participants who may receive enabling control information related to creator C's VDE content container. The content in such a container is, in this example, organized into a set of text articles. In this example control information may include one or more component assemblies that describe the articles within such a container (e.g. one or more event methods referencing map tables and/or algorithms that describe the extent of each article). $C_C$ may further include, for example: (a) a requirement that distributors ensure that creator C received $1 per article accessed by users and/or user/distributors, which payment allows a user to access such an article for a period of no more than six months (e.g. using a map-type meter method that is aged once per month, time aged decryption keys, expiration dates associated with relevant permissions records, etc.), (b) control information that allows articles from creator C's container to be extracted and embedded into another container for a one time charge per extract/embed of $10, (c) prohibits extracted/embedded articles from being reextracted, (d) permits distributors to create enabling control information for up to 1000 users or user/distributors per month, (e) requires that information regarding the number of users and user/distributors enabled by a distributor be reported to creator C at least once per week, (f) permits distributors to enable users or user/distributors to perform up to one move of enabling control information, and (g) permits up to 2 levels of redistribution by user/distributors.

In this example, distributor B may establish a distribution relationship with creator C. Distributor B in this example may have established a business model that favors the distribution of control information to users and user/distributors that bases payments to distributor B based on the number of accesses performed by such VDE participants. In this example, distributor B may create a modified set $D_B(C_C)$ of enabling control information for distribution to users and/or user/distributors. This set $D_B(C_C)$ may, for example, be based on a negotiation using VDE to establish a fee of $0.10 per access per user for users and/or user/distributors who receive control information from distributor B. For example, if one or more map-type meter methods have been included in $C_C$ to ensure that adequate information may be gathered from users and/or user/distributors to ensure correct payments to creator C by distributor B based on $C_C$, such methods may be preserved in the set $D_B(C_C)$, and one or more further meter methods (and any other necessary control structures such as billing and/or budget methods) may be included to record each access such that the set $D_B(C_C)$ will also ensure that distributor B will receive payments based on each access.

The client administrator in this example may receive a set of content control information $D_B(C_C)$ that differs, for example, from control information received by user B from distributor B. For example, the client administrator may use VDE to negotiate with distributor B to establish a set of control information for content from all creators for whom distributor B may provide enabling content control information to the client administrator. For example, the client administrator may receive a set of control information $D_B(C_C)$ that reflects the results of a VDE negotiation between the client administrator and distributor B. The client administrator may include a set of modifications to $D_B(C_C)$ and form a new set $CA(D_B(C_C))$ that includes control information that may only be available to users and user/distributors within the same organization as the client administrator (e.g. coworkers, employees, consultants, etc.). In order to enforce such an arrangement, $CA(D_B(C_C))$ may, for example, include control structures that examine name services information associated with a user or user/distributor during registration, establish a new budget method administered by the client administrator and required for use of the content, etc.

A distributor may provide redistribution rights to a client administrator which allows said administrator to redistribute rights to create permissions records for certain content (redistribute rights to use said content) only within the administrator's organization and to no other parties. Similarly, such administrator may extend such a "limited" right to redistribute to department and/or other administrator within his organization such that they may redistribute such rights to use content based on one or more restricted lists of individuals and/or classes and/or other groupings of organization personnel as defined by said administrator. This VDE capability to limit redistribution to certain one or more parties and/or classes and/or other groupings of VDE users and/or installations can be applied to content by any VDE content provider, so long as such a control is allowed by senior control information.

User D in this example may receive control information from either the client administrator and/or user/distributor C. User/distributor C may, for example, distribute control information $U_D(CA(D_B(C)_C)))$ to user D that includes a departmental budget method managed by user/distributor C to allow user/distributor C to maintain an additional level of control over the actions of user D. In this case, $UD_C(CA(D_B(C_C)))$ may include multiple levels of organizational controls (e.g. controls originating with the client administrator and further controls originating with user/distributor C) in addition to controls resulting from a commercial distribution channel. In addition or alternatively, the client administrator may refuse to distribute certain classes of control information to user D even if the client administrator has adequate control information (e.g. control information distributed to user/distributor C that allows redistribution to users such as user D) to help ensure that control information flows through the client administrator's organization in accordance with policies, procedures, and/or other administrative processes.

In this example, user E may receive control information from the client administrator and/or distributor B. For example, user E may have an account with distributor B even though some control information may be received from the client administrator. In this case, user E may be permitted to request and receive control information from distributor B without restriction, or the client administrator may have, as a matter of organizational policy, control information in place associated with user E's electronic appliance that limits the scope of user E's interaction with distributor B. In the latter case, the client administrator may, for example, have limited user E to registering control information with the secure subsystem of user E's electronic appliance that is not available from the client administrator, is from one or more certain classes of distributors and/or creators, and/or has a cost for usage, such as a certain price point (e.g. $50 per hour of usage). Alternatively or in addition, the client administrator may, for example, limit user E to receiving control information from distributor B in which user E receives a more favorable price (or other control information criteria) than the price (or other criteria) available in control information from the client administrator.

Figure 83:
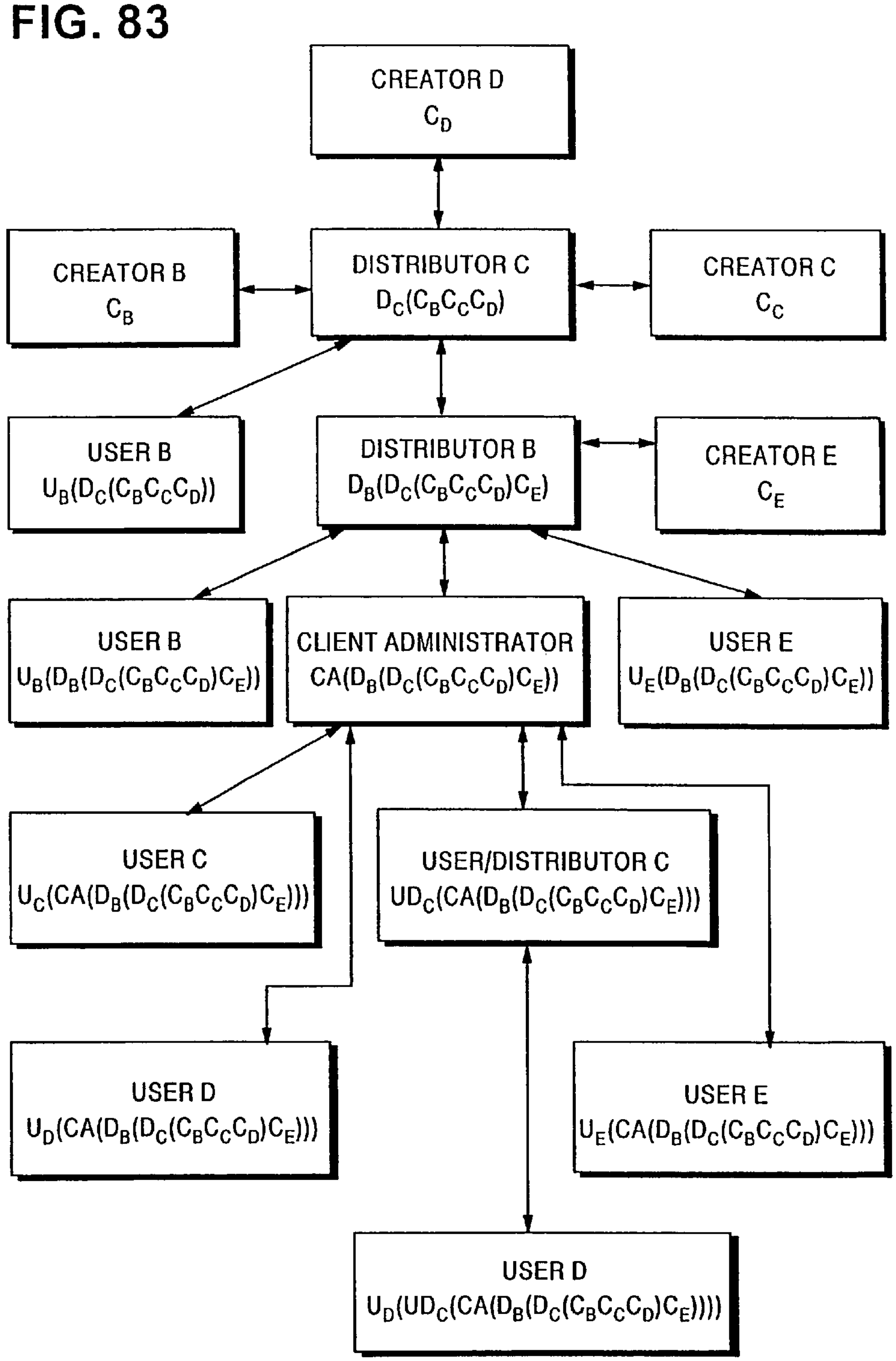

In this example, creator D may create a VDE content container that is designed primarily for integration with other content (e.g. through use of a VDE extracting/embedding process), for example, content provided by creator B and creator C. FIG. 83 shows the VDE participants who may receive enabling control information related a VDE content container produced by creator D. Control information associated with creator D's content ($C_D$ in FIG. 83) may include, for example: (a) a requirement that distributors make payment of either $1.50 per open per user, or $25 per user for an unlimited number of opens, (b) a discount of 20% for any user that has previously paid for an unlimited number of opens for certain other content created by creator D (e.g. implemented by including one or more billing methods that analyze a secure database of a user's VDE installation to determine if any of such certain other containers are registered, and further determines the character of rights held by a user purchasing rights to this container), (c) a requirement that distributors report the number of users and user/distributors enabled by control information produced in accordance with $C_D$ after such number exceeds 1000, (d) a requirement that distributors limit the number of moves by users and/or user/distributors to no more than one, (e) a requirement that distributors limit user/distributors to no more than four levels of redistribution, and (f) that distributors may create enabling control information that permits other distributors to create control information as distributors, but may not pass this capability to such enabled distributors, and further requires that audit information associated with use of control information by such enabled distributors shall pass directly to creator D without processing by such enabling distributor and that creator D shall pay such an enabling distributor 10% of any payments received by creator D from such an enabled distributor.

In this example, distributor C may receive VDE content containers from creator B, creator C, and creator D, and associated sets of control information $C_B$, $C_C$ and $C_D$. Distributor C may use the embedding control information and other control information to produce a new container with two or more VDE objects received from creator B, creator C, and creator D. In addition or alternatively, distributor C may create enabling control information for distribution to users and/or user/distributors (or in the case of $C_D$, for distributors) for such received containers individually. For example, distributor C may create a container including content portions (e.g. embedded containers) from creator B, creator C, and creator D in which each such portion has control information related to its access and use that records, and allows an auditor to gather, sufficient information for each such creator to securely and reliably receive payments from distributor C based on usage activities related to users and/or user/distributors enabled by distributor C. Furthermore, distributor C may negotiate using VDE with some or all of such creators to enable a model in which distributor C provides overall control information for the entire container based on a "uniform" fee (e.g. calculated per month, per access, from a combined model, etc.) charged to users and/or user/distributors, while preserving the models of each such creator with respect to payments due to them by distributor C based on $C_B$, $C_C$, and/or $C_D$, and, for example, resulting from each of their differing models for the collection of content usage information and any related (e.g. advertising) information.

In this example, distributor B may receive a VDE content container and associated content control information $C_E$ from creator E as shown in FIG. 83. If $C_E$ permits, distributor B may extract a portion of the content in such a container. Distributor B may then, for example, embed this portion in a container received from distributor C that contains an aggregation of VDE objects created by creator B, creator C, and creator D. Depending on the particular restrictions and/or permissions in the sets of control information received from each creator and distributor C, distributor B may, for example, be able to embed such an extracted portion into the container received from distributor C as an independent VDE object, or directly into content of "in place" objects from creator B, creator C, and/or creator D. Alternatively, or in addition, distributor B may, if permitted by $C_E$, choose to distribute such an extracted portion of content as an independent VDE object.

User B may, in this example, receive a VDE content container from distributor C that is comprised of VDE objects created by creator B, creator C, and creator D. In addition, user B may receive a VDE content container from distributor B that contains the same content created by creator B, creator C, and creator D in addition to one or more extracted/embedded portions of content created by creator E. User B may base decisions concerning which of such containers they choose to use (including which embedded containers she may wish to use), and under which circumstances, based on, for example, the character of such extracted/embedded portions (e.g. multimedia presentations illustrating potential areas of interest in the remainder of the content, commentary explaining and/or expositing other elements of content, related works, improved application software delivered as an element of content, etc.); the quality, utility, and/or price (or other attributes of control information) of such portions; and other considerations which distinguish the containers and/or content control information received, in this example, from distributor B and distributor C.

User B may receive content control information from distributor B for such a VDE content container that permits user B to add and/or modify content contained therein. User B may, for example, desire an ability to annotate content in such a container using a VDE aware word processor or other application(s). If permitted by senior control information, some or all of the content may be available to user B for modification and/or additions. In this case, user B is acting as a VDE creator for added and/or modified content. User B may, for example, provide new control information for such content, or may be required (or desire to) make use of existing control information (or control information included by senior members of a chain of handling for this purpose) to manage such content (based on control information related to such a container and/or contained objects).

In this example, VDE 100 has been used to enable an environment including, for example, content distribution, redistribution, aggregation (extracting and/or embedding), reaggregation, modification, and usage. The environment in this example allows competitive models in which both control information and content may be negotiated for and have different particulars based on the chain of handling through which control information and/or content has been passed. Furthermore, the environment in this example permits content to be added to, and/or modified by, VDE participants receiving control information that enables such activities.

Example—Content Distribution Through a Content VDE Chain of Handling

Figure 84:
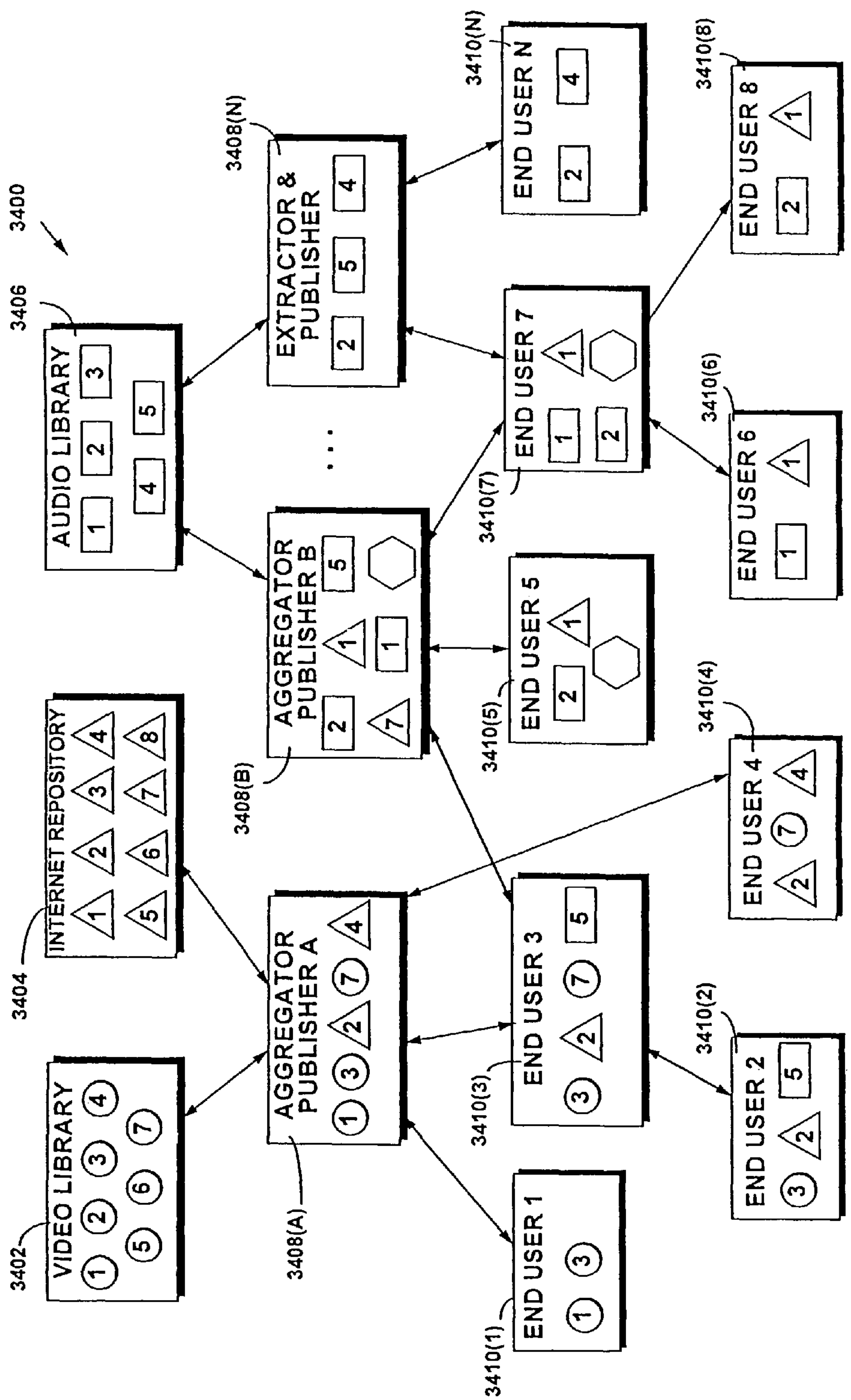
FIG. 84 shows a further example of a chain of handling and control involving several categories of VDE participants.

FIG. 84 reflects certain aspects of a relatively simple model 3400 of VDE content distribution involving several categories of VDE participants. In this instance, and for simplicity of reference purposes, various portions of content are represented as discrete items in the form of VDE content container objects. One or more of such content portions may also be integrated together in a single object and may (as may the contents of any VDE content container object if allowed by content control information) be extracted in whole or part by a user. In this example, publishers of historical/educational multimedia content have created VDE content containers through the use of content objects available from three content resources:

- a Video Library 3402 product available to Publishers on optical discs and containing video clip VDE objects representing various historical situations,
- an Internet Repository 3404 which stores history information text and picture resources in VDE objects which are available for downloading to Publishers and other users, and
- an Audio Library 3406, also available, on optical discs, and containing various pieces of musical performances and vocal performances (for example, historical narrations) which can be used alone or to accompany other educational historical materials.

The information provided in library 3402, repository 3404, and library 3406 may be provided to different publishers 3408(*a*), 3408(*b*), . . . , 3408(*n*). Publishers 3408 may, in turn, provide some or all of the information they obtain to end users 3410.

In this example, the Video Library 3402 control information allows publishers to extract objects from the Video Library product container and content control information enabling use of each extracted object during a calendar year if the object has a license cost of $50 or less, and is shorter than 45 minutes in duration, and 20,000 copies of each of any other extracted objects, and further/requires all video objects to be VDE fingerprinted upon decryption. The Audio Library 3404 has established similar controls that match its business model. The Internet Repository 3406 VDE containerizes, including encrypts, selected object content as it streams out of the Repository in response to an online, user request to download an object. The Repository 3406 may fingerprint the identification of the receiving VDE installation into its content prior to encryption and communication to a publisher, and may further require user identification fingerprinting of their content when decrypted by said Publisher or other content user.

The Publishers 3408 in this example have selected, under terms and conditions VDE negotiated (or otherwise agreed to) with the providing resources, various content pieces which they combine together to form their VDE object container products for their teacher customers. Publisher 3408(A) has combined video objects extracted from the Video Library 3402 (as indicated by circles), text and image objects extracted from the Internet Repository 3404 (indicated by diamonds), and one musical piece and one historical narration extracted from the Audio Library 3406 (as indicated by rectangles). Publisher 3408(B) has extracted a similar array of objects to be combined into his product, and has further added graphical elements (indicated by a hexagon) created by Publisher 3408(B) to enhance the product. Publisher 3408(C) has also created a product by combining objects from the Internet Repository 3404 and the Audio Library 3406. In this example, all publisher products are delivered, on their respective optical discs, in the form of VDE content container objects with embedded objects, to a modern high school for installation on the high school's computer network.

In this particular example, End-Users 3410 are teachers who use their VDE node's secure subsystems to access the VDE installation on their high school server that supports the publishers' products (in an alternative example, the high school may maintain only a server based VDE installation). These teachers license the VDE products from one or more of the publishers and extract desired objects from the VDE product content containers and either download the extracted VDE content in the form of VDE content containers for storage on their classroom computers and/or as appropriate and/or efficient. The teachers may store extracted content in the form of VDE content containers on server mass storage (and/or if desired and available to an end-user, and further according to acceptable pricing and/or other terms and conditions and/or senior content control information, they may store extracted information in "clear" unencrypted form on their nodes' and/or server storage means). This allows the teachers to play, and/or otherwise use, the selected portions of said publishers' products, and as shown in two instances in this example, add further teacher and/or student created content to said objects. End-user 3410(2), for example, has selected a video piece 1 received from Publisher A, who received said object from the Video Library. End-user 3410(3) has also received a video piece 3 from the same Publisher 3408(A) wherein said piece was also available to her from Publisher 3408(B), but perhaps under not as favorable terms and conditions (such as a support consultation telephone line). In addition, end-user 3410(3) has received an audio historical narration from Publisher 3408(B) which corresponds to the content of historical reference piece 7. End-user 3410(3) has also received a corresponding historical reference piece 7 (a book) from publisher 3408(2) who received said book from the Internet Repository 3404. In this instance, perhaps publisher 3408(2) charged less for said book because end-user 3410(3) has also licensed historical reference piece 7 from him, rather than publisher 3408(1), who also carried the same book. End-user 3410(3), as a teacher, has selected the items she considers most appropriate in her classes and, through use of VDE, has been able to flexibly extract such items from resources available to her (in this instance, extracting objects from various optical products provided by publishers and available on the local high school network server).

Example—Distribution of Content Control Information Within an Organization

Figure 85:
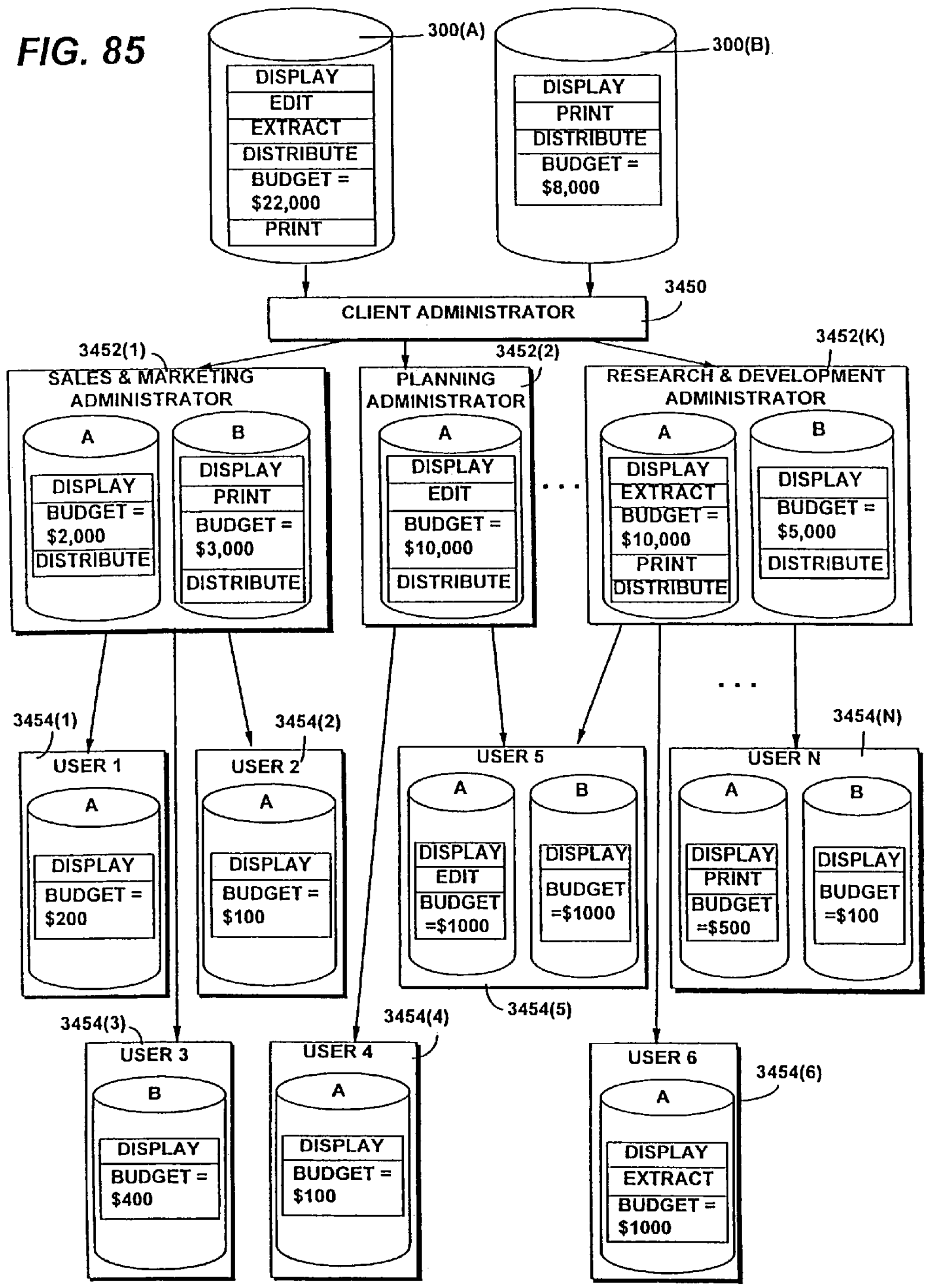
FIG. 85 shows a further example of a chain of distribution and handling within an organization.

FIG. 85 shows two VDE content containers, Container 300(A) and Container 300(B), that have been distributed to a VDE Client Administrator 3450 in a large organization. As shown in the figure, Container 300(A) and Container 300(B), as they arrive at the corporation, carry certain control information specifying available usage rights for the organization. As can be further seen in FIG. 85, the client administrator 3450 has distributed certain subsets of these rights to certain department administrators 3452 of her organization, such as Sales and Marketing Administrator 3452(1), Planning Administrator 3452(2), and Research and Development Administrator 3452(*k*). In each instance, the Client Administrator 3450 has decided which usage options and how much budget should be made available to each department.

FIG. 85 is a simplified example and, for example, the Client Administrator 3450 could have added further VDE controls created by herself and/or modified and/or deleted in place controls (if allowed by senior content control information) and/or (if allowed by control information) she could have further divided the available monetary budget (or other budgets) among specific usage activities. In this example, departmental administrators have the same rights to determine the rights of departmental end-users as the client administrator has in regard to departments. In addition, in this example (but not shown in FIG. 85) the client administrator 3450 and/or content provider(s) may also determine certain control information which must directly control (including providing rights related to) end-user content usage and/or the consequences of said usage for all or certain classes of end-users. In the example shown in FIG. 85, there are only three levels of VDE participants within the organization:

a Client Administrator 3450,
department administrators 3452, and
end-users 3454.

In other examples, VDE will support many levels of VDE administration (including overlapping groups) within an organization (e.g., division, department, project, network, group, end-users, etc). In addition, administrators in a VDE model may also themselves be VDE content users.

Within an organization, VDE installations may be at each end-user 3454 node only on servers or other multiple user computers or other electronic appliances, or there may be a mixed environment. Determination as to the mix of VDE server and/or node usage may be based on organization and/or content provider security, performance, cost overhead, or other considerations.

In this example, communications between VDE participants in FIG. 85 employs VDE secure communication techniques between VDE secure subsystems supporting PPEs and other VDE secure system components at each VDE installation within the organization.

Example—Another Content Distribution Example

Creators of VDE protected content may interact with other VDE participants in many different ways. A VDE creator 102 may, for example, distribute content and/or content control information directly to users, distribute content and/or content control information to commercial content repositories, distribute content and/or content control information to corporate content repositories, and/or distribute content and/or content control information to other VDE participants. If a creator 102 does not interact directly with all users of her content, she may transmit distribution permissions to other VDE participants that permit such participants to further distribute content and/or content control information. She may also allow further distribution of VDE content and/or content control information by, for example, not restricting redistribution of control information, or allowing a VDE participant to act as a "conduit" for one or more permissions records that can be passed along to another party, wherein said permissions record provides for including the identification of the first receiving party and/or the second receiving party.

Figures 86, 86A:
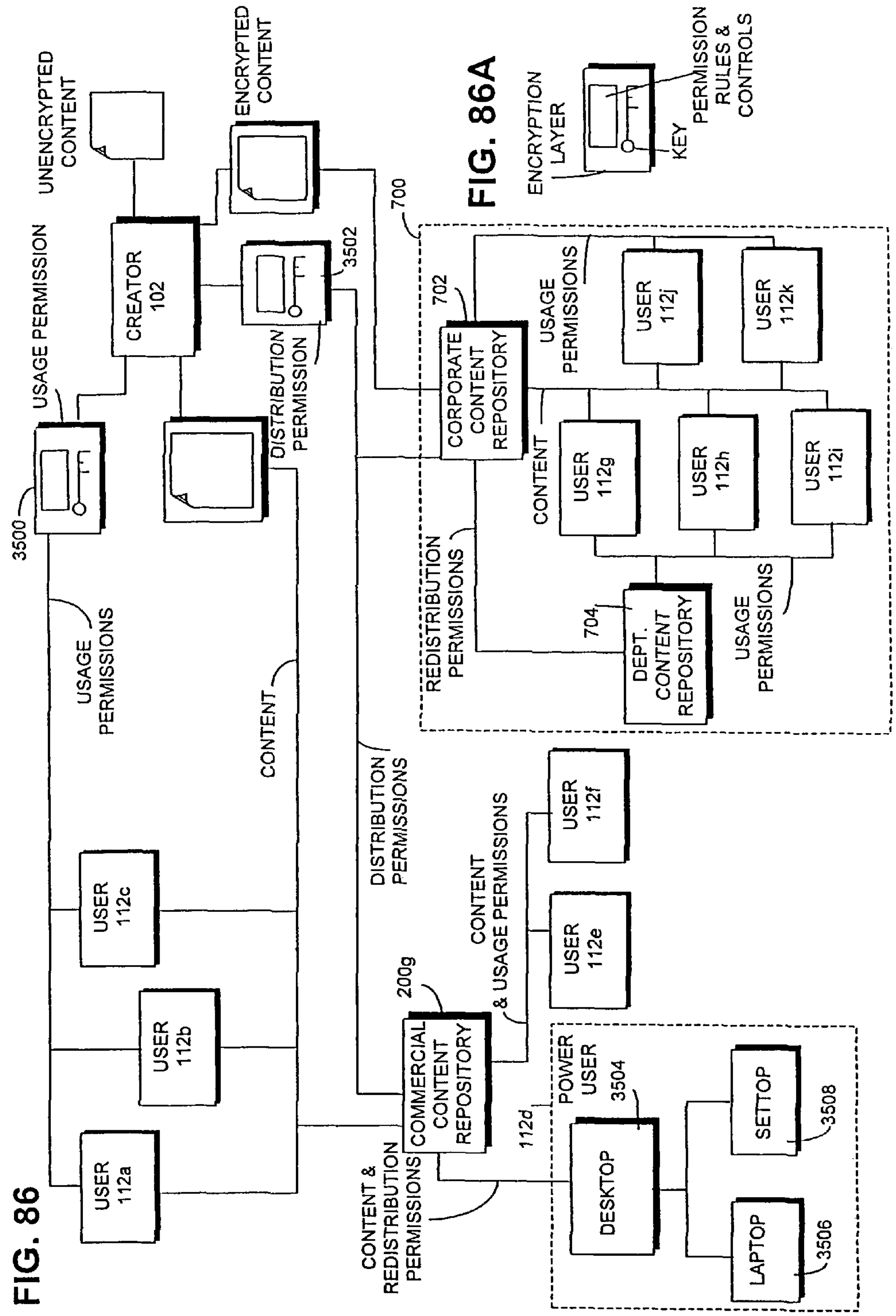
FIGS. 86 and 86A show a further example of a chain of handling and control.

FIG. 86 shows one possible arrangement of VDE participants. In this example, creator 102 may employ one or more application software programs and one or more VDE secure subsystems to place unencrypted content into VDE protected form (i.e., into one or more VDE content containers). In addition, creator 102 may produce one or more distribution permissions 3502 and/or usage permissions 3500 as an aspect of control information associated with such VDE protected content. Such distribution and/or usage permissions 3500, 3502 may be the same (e.g., all distribution permissions may have substantively all the same characteristics), or they may differ based on the category and/or class of participant for whom they are produced, the circumstances under which they are requested and/or transmitted, changing content control models of either creator 102 or a recipient, etc.

In this example, creator 102 transmits (e.g., over a network, via broadcast, and/or through transfer of physical media) VDE protected content to user 112*a*, user 112*b*, and/or user 112*c*. In addition, creator 102 transmits, using VDE secure communications techniques, usage permissions to such users. User 112*a*, user 112*b*, and user 112*c* may use such VDE protected content within the restrictions of control information specified by usage permissions received from creator 102. In this case, creator 102 may, for example, manage all aspects of such users activities related to VDE protected content transmitted to them by creator 102. Alternatively, creator 102 may, for example, include references to control information that must be available to users that is not provided by creator 102 (e.g., component assemblies managed by another party).

Commercial content repository 200*g*, in this example, may receive VDE protected (or otherwise securely delivered) content and distribution, permissions and/or other content usage control information from creator 102. Commercial content repository 200*g* may store content securely such that users may obtain such, when any required conditions are met, content from the repository 200*g*. The distribution permissions 3502 may, for example, permit commercial content repository 200*g* to create redistribution permissions and/or usage permissions 3500, 3502 using a VDE protected subsystem within certain restrictions described in content control information received from creator 102 (e.g., not to exceed a certain number of copies, requiring certain payments by commercial content repository 200*g* to creator 102, requiring recipients of such permissions to meet certain reporting requirements related to content usage information, etc.). Such content control information may be stored at the repository installation and be applied to unencrypted content as it is transmitted from said repository in response to a user request, wherein said content is placed into a VDE container as a step in a secure process of communicating such content to a user. Redistribution permissions may, for example, permit a recipient of such permissions to create a certain number of usage permissions within certain restrictions (e.g., only to members of the same household, business other organization, etc.). Repository 200*g* may, for example, be required by control information received from creator 102 to gather and report content usage information from all VDE participants to whom the repository has distributed permissions.

In this example, power user 112*d* may receive VDE protected content and redistribution permissions from commercial content repository 200g using the desktop computer 3504. Power user 112d may, for example, then use application software in conjunction with a VDE secure subsystem of such desktop computer 3504 in order to produce usage permissions for the desktop computer 3504, laptop computer 3506 and/or settop appliance 3508 (assuming redistribution permissions received from commercial content repository 200g permit such activities). If permitted by senior control information (for example, from creator 102 as may be modified by the repository 200g), power user 112d may add her own restrictions to such usage permissions (e.g., restricting certain members of power user 112d's household using the settop appliance to certain times of day, amounts of usage, etc. based on their user identification information). Power user 112d may then transmit such VDE protected content and usage permissions to the laptop computer 3506 and the settop appliance 3508 using VDE secure communications techniques. In this case, power user 112d has redistributed permissions from the desktop computer 3504 to the settop appliance 3508 and the laptop computer 3506, and periodically the settop appliance and the laptop computer may be required to report content usage information to the desktop computer, which in turn may aggregate, and/or otherwise process, and report user usage information to the repository 200g.

User 112e and/or user 112f may receive usage permissions and VDE protected content from commercial content repository 200g. These users may be able to use such content in ways authorized by such usage information. In contrast to power user 112d, these users may not have requested and/or received redistribution permissions from the repository 200g. In this case, these users may still be able to transfer some or all usage rights to another electronic appliance 600, and/or they may be permitted to move some of their rights to another electronic appliance, if such transferring and/or moving is permitted by the usage permissions received from the repository 200g. In this case, such other appliances may be able to report usage information directly to the repository 200g.

In this example, corporate content repository 702 within corporation 700 may receive VDE protected content and distribution permissions from creator 102. The distribution permissions received by corporate repository 702 may, for example, include restrictions that limit repository 702 to distribution activities within corporation 700.

The repository 702 may, for example, employ an automated system operating in conjunction with a VDE secure subsystem to receive and/or transmit VDE protected content, and/or redistribution and/or usage permissions. In this case, an automated system may, for example, rely on criteria defined by corporate policies, departmental policies, and/or user preferences to determine the character of permissions and/or content delivered to various parties (corporation groups and/or individuals) within corporation 700. Such a system may, for example, automatically produce redistribution permissions for a departmental content repository 704 in response to corporation 700 receiving distribution permissions from creator 102, and/or produce usage permissions for user 112j and/or user 112k.

The departmental repository 704 may automatically produce usage permissions for user 112g, user 112h, and/or user 112i. Such users may access content from the corporate content repository 702, yet receive usage permissions from departmental repository 704. In this case, user 112g, user 112h, and/or user 112i may receive usage permissions from departmental repository 704 that incorporate departmental restrictions in addition to restrictions imposed by senior control information (in this example, from creator 102, as may be modified by corporate repository 702, as may be further modified by departmental repository 704, that reflect a VDE extended agreement incorporating commercial requirements of creator 102 and corporation 700 in addition to corporate and/or departmental policies and agreements with corporate personnel of corporation 700).

Example—"Virtual Silicon Container"

Figure 87:
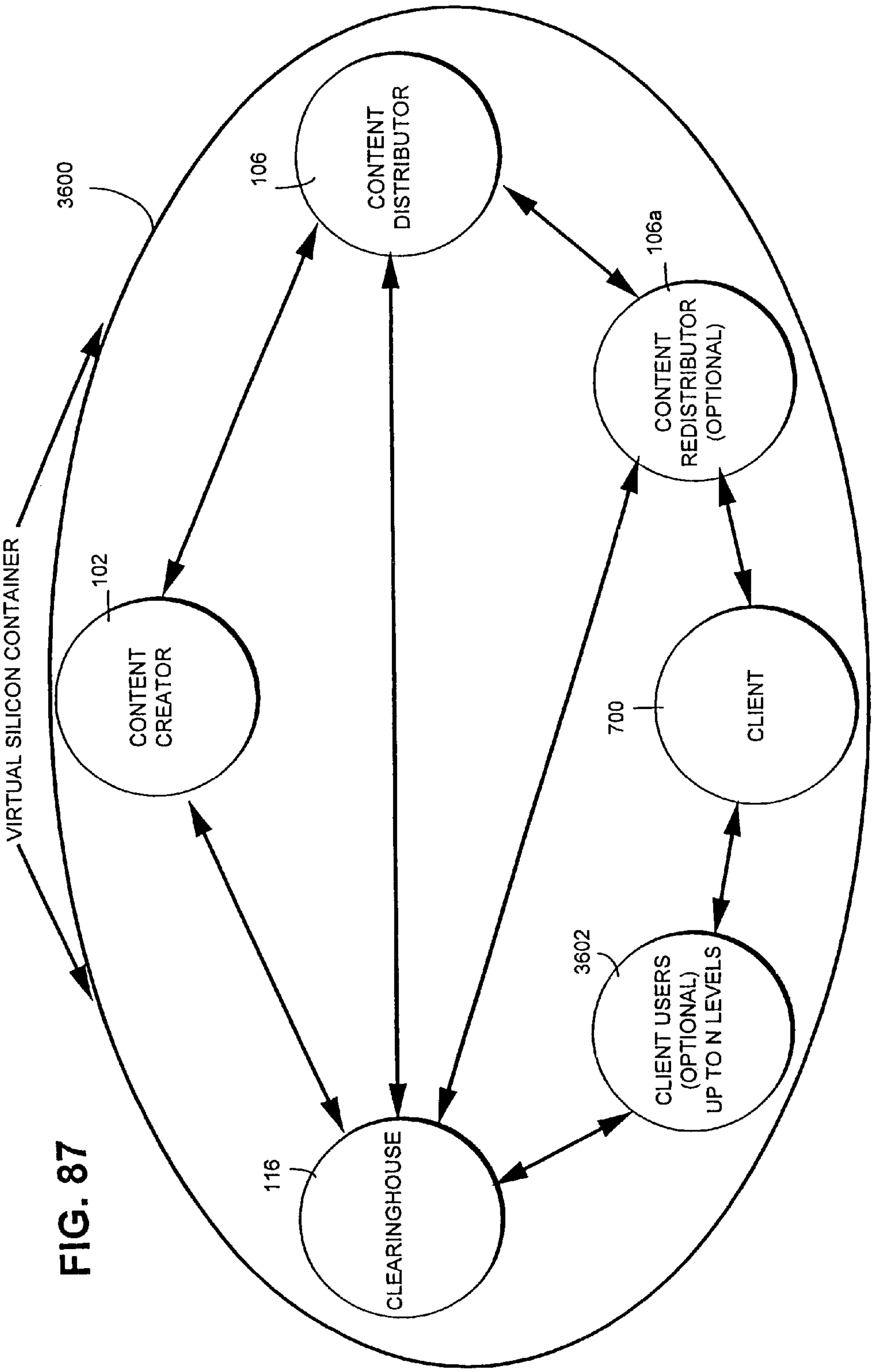
FIG. 87 shows an example of a virtual silicon container model.

As discussed above, VDE in one example provides a "virtual silicon" container ("virtual black box") in that several different instances of SPU 500 must securely communicate together to provide an overall secure healthcare environment that "virtually" exists at multiple locations and multiple electronic appliances 600. FIG. 87 shows one model 3600 of a virtual silicon container. This virtual container model 3600 includes a content creator 102, a content distributor 106, one or more content redistributors 106a, one or more client administrators 700, one or more client users 3602, and one or more clearinghouses 116. Each of these various VDE participants has an electronic appliance 600 including a protected processing environment 655 that may comprise, at least in part, a silicon-based semiconductor hardware element secure processing unit 500. The various SPUs 500 each encapsulate a part of the virtual distribution environment, and thus, together form the virtual silicon container 3600.

Example—Testing/Examinations

A scheduled SAT examination for high school seniors is prepared by the Educational Testing Service. The examination is placed in a VDE container for scheduled release on Nov. 15, 1994 at 1:00 PM Eastern Standard time. The SAT prepares one copy of the container for each school or other location which will conduct the examination. The school or other location ("test site") will be provided with a distributed examination container securely containing the VDE identification for the "administration" electronic appliance and/or test administrator at the test site (such as, a testing organization) and a budget enabling, for example, the creation of 200 test VDE content containers. Each container created at the test site may have a permissions record containing secure identification information for each electronic appliance 600, on the test site's network, that will be used by a test taker, as well as, for example, an identification for the student who will take the test. The student identification could, for example, be in the form of a secure PIN password which is entered by the student prior to taking the test (a test monitor or administrator might verify the student identification by entering in a PIN password). Of course, identification might take the firm of automated voice recognition, handwriting recognition (signature recognition), fingerprint information, eye recognition, or similar one or more recognition forms which may be used either to confirm the identity of the test taker (and/or test monitor/administrator) and/or may be stored with the test results in a VDE container or the like or in a location pointed to by certain container information. This identification may be stored in encrypted or unencrypted form. If stored in encrypted or otherwise protected form, certain summary information, such as error correction information, may be stored with the identification information to authenticate the associated test as corresponding to the identification.

As the student takes the test using the computer terminal, the answers selected may be immediately securely stored (but may be changed by the student during the test session). Upon the completion of the test, the student's answers, along with a reference to the test, are securely stored in a VDE reporting object which is passed along to the network to the test administrator and the administration electronic appliance 600. All test objects for all students could then be placed in a VDE object 300 for communication to the Educational Testing Service, along with whatever other relevant information (which may also be secured by VDE 100), including summary information giving average and mean scores, and other information that might be desirable to summarize and/or act as an authentication of the test objects sent. For example, certain information might be sent separately from each student summary object containing information which helps validate the object as an "authentic" test object.

Applying VDE to testing scenarios would largely eliminate cheating resulting from access to tests prior to testing (normally the tests are stolen from a teacher or test administrator). At ETS, individuals who have access to tests could be limited to only a portion of the test to eliminate the risk of the theft of a "whole" test. Employing VDE would also ensure against processing errors or other manipulation of test answers, since absolutely authentic test results can be archived for a reasonable period of time.

Overall, employing VDE 100 for electronic testing will enable the benefits of electronic testing to be provided without the substantial risks associated with electronic storing, communicating, and processing of test materials and testing results. Electronic testing will provide enormous efficiency improvements, significantly lowering the cost of conducting and processing tests by eliminating printing, shipping, handling, and human processing of tests. At the same time, electronic testing will allow users to receive a copy (encrypted or unencrypted) of their test results when they leave the test sessions. This will help protect the tested individual against lost of, or improperly processed, test results. Electronic testing employing VDE 100 may also ensure that timing related variables of testing (for example precise starting, duration, and stopping times) can be reliably managed. And, of course, proper use of VDE 100 for the testing process can prevent improper access to test contents prior to testing and ensure that test taking is properly audited and authenticated, that is which person took which test, at which time, on which electronic appliance, at which location. Retesting due to lost, stolen, improperly timed, or other variables can be avoided or eliminated.

VDE assisted testing may, of course, be employed for many different applications including secure identification of individuals for security/authentication purposes, for employment (e.g. applying for jobs) applications, and for a full range of evaluation testing. For example, an airline pilot, or a truck, train, or bus driver might take a test immediately prior to departing or during travel, with the test evaluating alertness to test for fatigue, drug use, etc. A certain test may have a different order and/or combination of test activities each time, or each group of times, the test is taken. The test or a master test might be stored in a VDE container (the order of, and which, test questions might be determined by a process executed securely within an PPE 650). The test responses may be encrypted as they occur and either locally stored for aggregated (or other test result) transmission or dynamically transmitted (for example, to a central test administration computer). If the test taker "flunks" the test, perhaps he or she is then prevented from operating the vehicle, either by a local PPE 650 issuing control instructions to that effect on some portion of the vehicle's electronic control system or a local PPE failing to decrypt or otherwise provide certain key information required for vehicle operation.

Example—Appliance Rental

Through use of the present invention, electronic appliances can be "leased" or otherwise provided to customers who, rather than purchasing a given appliance for unlimited usage, may acquire the appliance (such as a VCR, television, microwave oven, etc.) and be charged according to one or more aspects of use. For example, the charge for a microwave might be for each time it is used to prepare an item and/or for the duration of time used. A telephone jack could be attached, either consistently or periodically, to an inexpensive modem operatively attached or within the microwave (the modem might alternatively be located at a location which services a plurality of items and/or functions—such as burglar alarm, light and/or heat control). Alternatively, such appliances may make use of a network formed by the power cables in a building to transmit and receive signals.

At a periodic interval, usage information (in summary form and/or detailed) could be automatically sent to a remote information utility that collects information on appliance usage (the utility might service a certain brand, a certain type of appliance, and/or a collection of brands and/or types). The usage information would be sent in VDE form (e.g. as a VDE object 300). The information utility might then distribute information to financial clearinghouse(s) if it did not itself perform the billing function, or the information "belonging" to each appliance manufacturer and/or lesser (retailer) might be sent to them or to their agents. In this way a new industry would be enabled of leased usage of appliances where the leases might be analogous to car leasing.

With VDE installed, appliances could also be managed by secure identification (PIN, voice or signature recognition, etc.). This might be required each time a unit is used, or on some periodic basis. Failure to use the secure identification or use it on a timely basis could disable an appliance if a PPE 650 issued one or more instructions (or failed to decrypt or otherwise provide certain information critical to appliance operation) that prevented use of a portion or all of the appliance's functions. This feature would greatly reduce the desirability of stealing an electronic appliance. A further, allied use of VDE is the "registration" of a VDE secure subsystem in a given appliance with a VDE secure subsystem at some control location in a home or business. This control location might also be responsible for VDE remote communications and/or centralized administrator (including, for example, restricting your children from viewing R rated movies either on television or videocassettes through the recognition of data indicating that a given movie, song, channel, game, etc. was R rated and allowing a parent to restrict viewing or listening). Such a control location may, for example, also gather information on consumption of water, gas, electricity, telephone usage, etc. (either through use of PPEs 650 integrated in control means for measuring and/or controlling such consumption, or through one or more signals generated by non-VDE systems and delivered to a VDE secure subsystem, for example, for processing, usage control (e.g. usage limiting), and/or billing), transmit such information to one or more utilities, pay for such consumption using VDE secured electronic currency and/or credit, etc.

In addition, one or more budgets for usage could be managed by VDE which would prevent improper, excessive use of a certain, leased appliance, that might, for example lead to failure of the appliance, such as making far more copies using a photocopier than specified by the duty cycle. Such improper use could result in a message, for example on a display panel or television screen, or in the form of a communication from a central clearinghouse, that the user should upgrade to a more robust model.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A method comprising:

executing end user content processing application software in one or more virtual machine environments that are executed by a host operating system of a computer system;

executing rights management software by the host operating system of the computer system, wherein the rights management software executes outside the one or more virtual machine environments in which the end user content processing application software is executing;

processing a protected piece of digital content using the end user content processing application software; and using the rights management software to make a determination as to whether to allow the protected piece of digital content to be transmitted between the one or more virtual machine environments and a resource external to the one or more virtual machine environments, wherein the determination is based at least in part on one or more controls associated with the protected piece of digital content that define usage conditions for the protected piece of digital content.

2. The method of claim 1, in which the end user content processing application software runs on an operating system that executes within the one or more virtual machine environments.

3. The method of claim 1, in which the resource is a communication channel.

4. The method of claim 1, in which the resource is a writable storage device.

5. The method of claim 1, in which the one or more controls identify a list of users permitted to access or use the protected piece of digital content.

6. The method of claim 1, in which the one or more controls include a requirement for an explicit permission to be granted from an originator of the protected piece of digital content.

7. The method of claim 1, in which the one or more controls include a requirement for use of the protected piece of digital content to be reported to an originator of the protected piece of digital content.

8. The method of claim 1, in which the one or more controls include a requirement for use of the protected piece of digital content to be reported to a clearinghouse.

9. The method of claim 1, in which the one or more controls include a requirement for use of the protected piece of digital content to generate a notice to an originator of the protected piece of digital content, the notice including information supplied interactively by a person using the protected piece of digital content.

10. The method of claim 1, in which the one or more controls include a requirement for information identifying a redistributor of the protected piece of digital content to be embedded in the protected piece of digital content prior to redistribution.

11. The method of claim 1, in which the one or more controls include a budget limiting usage.

12. The method of claim 11, in which the budget includes a limit involving a time of access.

13. The method of claim 1, in which the protected piece of digital content comprises a document.

* * * * *